US010035192B2

(12) United States Patent
Pierce et al.

(10) Patent No.: US 10,035,192 B2
(45) Date of Patent: Jul. 31, 2018

(54) CONTINUOUS, SEMICONTINUOUS AND BATCH METHODS FOR TREATING LIQUIDS AND MANUFACTURING CERTAIN CONSTITUENTS (E.G.,NANOPARTICLES) IN LIQUIDS, APPARATUSES AND NANOPARTICLES AND NANOPARTICLE/LIQUID SOLUTION(S) AND COLLOIDS RESULTING THEREFROM

(71) Applicants: David Kyle Pierce, Elkton, MD (US); Mark Gordon Mortenson, North East, MD (US); David Andrew Bryce, Elkton, MD (US); Adam Robert Dorfman, Baltimore, MD (US); Mikhail Merzliakov, Parkville, MD (US); Arthur Maxwell Grace, Baltimore, MD (US)

(72) Inventors: David Kyle Pierce, Elkton, MD (US); Mark Gordon Mortenson, North East, MD (US); David Andrew Bryce, Elkton, MD (US); Adam Robert Dorfman, Baltimore, MD (US); Mikhail Merzliakov, Parkville, MD (US); Arthur Maxwell Grace, Baltimore, MD (US)

(73) Assignee: Clene Nanomedicine, Inc., North East, MO (US)

( * ) Notice: Subject to any disclaimer, the term of this patent is extended or adjusted under 35 U.S.C. 154(b) by 108 days.

(21) Appl. No.: 14/338,868

(22) Filed: Aug. 25, 2014

(65) Prior Publication Data

US 2015/0167189 A1 Jun. 18, 2015

Related U.S. Application Data

(63) Continuation of application No. 13/144,221, filed as application No. PCT/US2010/000088 on Jan. 13, 2010, now Pat. No. 9,067,263.

(60) Provisional application No. 61/144,928, filed on Jan. 15, 2009.

(51) Int. Cl.

| | |
|---|---|
| ***B22F 9/14*** | (2006.01) |
| ***B82Y 40/00*** | (2011.01) |
| ***B01J 19/08*** | (2006.01) |
| ***B22F 9/20*** | (2006.01) |

(Continued)

(52) U.S. Cl.

CPC ............... *B22F 9/20* (2013.01); *B01J 19/088* (2013.01); *B82Y 40/00* (2013.01); *C25C 1/20* (2013.01); *C25C 1/22* (2013.01); *B01J 2219/0809* (2013.01); *B01J 2219/0841* (2013.01); *B01J 2219/0877* (2013.01); *B01J 2219/0894* (2013.01); *B22F 2999/00* (2013.01)

(58) Field of Classification Search

CPC ....... B01J 2219/0811; B01J 2219/0894; B22F 9/14; B82Y 40/00; H05H 1/48; H05H 2001/483; C25C 1/20; C25C 5/02

See application file for complete search history.

(56) References Cited

U.S. PATENT DOCUMENTS

| | | | |
|---|---|---|---|
| 4,093,527 | A | 6/1978 | Tanno et al. |
| 5,478,533 | A | 12/1995 | Inculet |
| 5,876,663 | A | 3/1999 | Laroussi |

(Continued)

FOREIGN PATENT DOCUMENTS

| | | |
|---|---|---|
| DE | 432101 | 7/1935 |
| EP | 12908 | 5/1910 |

(Continued)

OTHER PUBLICATIONS

Wu, C.; Zeng, T., Size-Tunable Synthesis of Metallic Nanoparticles in a Continuous and Steady-Flow Reactor, Chem. Mater. 2007, 112-125, vol. 19, No. 2.

(Continued)

*Primary Examiner* — Steven A. Friday

(74) *Attorney, Agent, or Firm* — Mark G. Mortenson

(57) ABSTRACT

This invention relates generally to novel methods and novel devices for the continuous manufacture of nanoparticles, microparticles and nanoparticle/liquid solution(s) (e.g., colloids). The nanoparticles (and/or micron-sized particles) comprise a variety of possible compositions, sizes and shapes. The particles (e.g., nanoparticles) are caused to be present (e.g., created and/or the liquid is predisposed to their presence (e.g., conditioned)) in a liquid (e.g., water) by, for example, preferably utilizing at least one adjustable plasma (e.g., created by at least one AC and/or DC power source), which plasma communicates with at least a portion of a surface of the liquid. At least one subsequent and/or substantially simultaneous adjustable electrochemical processing technique is also preferred. Multiple adjustable plasmas and/or adjustable electrochemical processing techniques are preferred. Processing enhancers can be utilized alone or with a plasma. Semicontinuous and batch processes can also be utilized. The continuous processes cause at least one liquid to flow into, through and out of at least one trough member, such liquid being processed, conditioned and/or effected in said trough member(s). Results include constituents formed in the liquid including ions, micron-sized particles and/or nanoparticles (e.g., metallic-based nanoparticles) of novel size, shape, composition, concentration, zeta potential and certain other novel properties present in a liquid.

20 Claims, 220 Drawing Sheets

(51) Int. Cl.
*C25C 1/20* (2006.01)
*C25C 1/22* (2006.01)

(56) References Cited

U.S. PATENT DOCUMENTS

| | | | | |
|---|---|---|---|---|
| 5,965,994 | A | 10/1999 | Seo et al. | |
| 6,214,299 | B1 | 4/2001 | Holladay et al. | |
| 6,358,398 | B1 | 3/2002 | Halldorson et al. | |
| 6,743,348 | B2 | 6/2004 | Holladay et al. | |
| 6,749,759 | B2 | 6/2004 | Denes et al. | |
| 6,802,981 | B2 | 10/2004 | Ryazanova et al. | |
| 7,033,415 | B2 | 4/2006 | Mirkin | |
| 7,118,852 | B2 | 10/2006 | Purdum | |
| 7,135,054 | B2 | 11/2006 | Jin | |
| 7,135,055 | B2 | 11/2006 | Mirkin et al. | |
| 7,135,195 | B2 | 11/2006 | Holladay et al. | |
| 7,276,283 | B2 | 10/2007 | Denes et al. | |
| 7,348,882 | B2 | 10/2008 | Goodwin et al. | |
| 8,088,193 | B2 | 1/2012 | Zeng et al. | |
| 8,540,942 | B2 | 9/2013 | Pierce et al. | |
| 8,617,360 | B2 * | 12/2013 | Pierce | B22F 3/003 204/164 |
| 9,067,263 | B2 * | 6/2015 | Pierce | B22F 9/20 |
| 2002/0014400 | A1 | 2/2002 | Zadiraka et al. | |
| 2004/0022702 | A1 | 2/2004 | Christensen | |
| 2004/0084325 | A1 | 5/2004 | Weinberg et al. | |
| 2004/0131524 | A1 | 7/2004 | Josephson et al. | |
| 2006/0037177 | A1 | 2/2006 | Blum et al. | |
| 2006/0060464 | A1 * | 3/2006 | Chang | H05H 1/24 204/164 |
| 2006/0068026 | A1 | 3/2006 | Hu et al. | |
| 2006/0074117 | A1 | 7/2006 | Holladay et al. | |
| 2006/0249705 | A1 | 11/2006 | Wang et al. | |
| 2007/0080054 | A1 | 4/2007 | Parkansky et al. | |
| 2007/0108056 | A1 | 5/2007 | Nyberg et al. | |
| 2007/0267289 | A1 | 11/2007 | Jabs et al. | |
| 2008/0169182 | A1 | 7/2008 | Denes | |
| 2008/0248350 | A1 | 10/2008 | Little et al. | |
| 2008/0277272 | A1 | 11/2008 | Pierce et al. | |
| 2009/0071843 | A1 | 3/2009 | Miyashita et al. | |
| 2009/0178933 | A1 * | 7/2009 | Zeng | C25B 1/00 205/766 |
| 2013/0259903 | A1 | 10/2013 | Mortensen et al. | |
| 2015/0064278 | A1 | 3/2015 | Pierce et al. | |
| 2015/0093453 | A1 | 4/2015 | Pierce et al. | |

FOREIGN PATENT DOCUMENTS

| | | | | |
|---|---|---|---|---|
| EP | 432101 | | 7/1935 | |
| EP | 0857695 | A2 | 4/2001 | |
| WO | WO1997019896 | | 6/1997 | |
| WO | WO 2006105648 | A1 | 10/2006 | |
| WO | WO 2007002504 | A1 | 1/2007 | |
| WO | WO 2007079452 | A2 * | 7/2007 | B01J 19/088 |

OTHER PUBLICATIONS

Ultra Professional Instructions for Making Premium AC Colloidal Silver with your HVAC Ultra Professional System.

HVAC ARC Silver Solutions, System Tech Engineering, http://web.archive.org/web/20021125133241/http://www.hvacsilver.com. Nov. 12, 2008.

Plasma (physics); Wikipedia; http://en.wikipedia.org/wiki/plasma_(physics); 2010.

Taylor cone; Wikipeia; http://en.wikipedia.org/wiki/Taylor_cone; 2010.

Manolache, S; Shamamian, V.; Denes F., Dense Medium Plasma-Plasma-Enhanced Decontamination of Water of Aromatic Compounds, J. of Environ Eng. Jan. 17-25, 2004.

Riegel, E.R.; Osthoff, R.C.; Flach, D.O. Bredig Sols: A Lecture Demonstration, J. Chem. Educ, 1949, p. 519, vol. 26, No. 10.

Weiser, Harry Boyer, Inorganic Colloid Chemistry, 1933, p. 1, 8-17, 45-46, 116-117, 124-125, 132-135, John & Wiley Sons, Inc., New York.

Kraemer, E.O., Svedberg, T., Formation of Colloid Solutions by Electrical Pulverization in the High-Frequency Alternating Current Arc, J. Am. Chem Soc. 1924, 46(9) p. 1980-1991.

Rodriguez-Sanchez, L., Blanco, M.C., Lopez-Quintela, M.A., Electrochemical Synthesis of Silver Nanoparticles, J. Phys. Chem. B., 2000, 104, p. 9683-9688.

Liu, Yu-Chuan, et al., Active Catalysts of Electrochemically Prepared Gold Nanoparticles for the Decomposition of Aldehyde in Alcohol Solutions. Electrochemistry Communications, 2006, 1163-1167, 8.

Hickling, A., et al. Contact Glow-Discharge Electrolysis. Trans Faraday Soc., 1964, 783-793, 60.

Toriyabe, Yu, et al. Controlled Formation of Metallic Nanoballs During Plasma Electrolysis. Applied Physics Letters, 2007, 041501-1-041501-3, 91.

Wuthrich, Rolf, et al., Electrochemical Discharges-Discovery and Early Applications. Eletrochimica Acta, 2009, 4031-4035, 54.

Locke, B. R., et al., Electrohydraulic Discharge and Nonthermal Plasma for Water Treatment., Ind. Eng. Chem. Res., 2006, 882-905, 45.

Meiss, Sebastian A., Employing Plasmas as Gaseous Electrodes at the Free Surfacte of Ionic Liquids: Deposition of Nanocrystalline Silver Particles. ChemPhsyChem, 2007, 50-53, 8.

Hickling, A., et al., Glow-Discharge Electrolysis. J. Electroanal. Chem, 1964, 65-81, 8.

Chaffin, John H., et al., Hydrogen Production by Plasma Electrolysis. Journal of Energy Engineering, 2006, 104-108, 132:3.

Aqil, A., et al.; Preparation of Stable Suspensions of Gold Nanoparticles in Water by Sonoelectrochemistry. Ultrasonics Sonochemistry, 2008, 1055-1061, 15.

Liu, Yu-Chen, et al. Size-Controlled Synthesis of Gold Nanoparticles from Bulk Gold Substrates by Sonoelectrochemical Methods. J. Phys. Chem. B, 2004, 19237-19240, 108.

Torimoto, Tsukasa, et al. Sputter deposition onto ionic liquids: Simple and clean synthesis of highly dispersed ultrafine metal nanoparticles. Applied Physics Letters, 2006, 243117-1-243117-3, 89.

Nagata, Yoshio, et al. Sonochemical Formation of Gold Particles in Aqueous Solution. Radiation Research, 1996, 333-338, 146.

Saez, Veronica, et al. Sonoelectrochemical Synthesis of Nanoparticles. Molecules, 2009, 4284-4299, 14.

Fujimoto, Taku, et al. Sonolytical Preparation of Various Types of Metal Nanoparticles in Aqueous Solution. Scripta mater., 2001, 2183-2186, 44.

Vasudevamurthy, Gokul, et al. "Effect of System Parameters on Size Distribution of 304 Stainless Steel Particles Produced by Electrical Discharge Mechanism", Materials Letters, 2007, p. 4872-4874, vol. 61.

Staack, David, et al. Nanoscale Corona Discharge in Liquids, Enabling Nanosecond Optical Emission Spectroscopy. Angew. Chem.Int.Ed., 2008, 8020-8024, 47.

Xu, Z.P.; Zeng, Q.H.; Lu, G.Q.; Yu, A.B.; Inorganic Nanoparticles as Carriers for Efficient Cellular Delivery. Chemical Engineering Science. Nov. 3, 2005. vol. 61. pp. 1027-1040.

Burda, et al., Chemistry and Properties of Nanocrystals of Different Shapes; Chem. Rev. 2005, 1025-1102.

Cushing, et al., Recent Advances in the Liquid-Phase Synthesis of Inorganic Nanoparticles; Chem. Rev. 2004, 104, 3893-3946.

Wiley, et al., Shape-Controlled Synthesis of Metal Nanostructures: the Case of Silver, Chem. Eur. J. 2005, 11, 454-463.

Tas, M.A., Van Hardeveld, R., Van Veldhuizen, E.M.; Reactions of NO in a Positive Streamer Corona Plasma; Plasma Chem and Plasma Proc; 1997, p. 371-391, vol. 17, No. 4.

Yan, K., Corona Plasma Generation, 2001, Technische Universiteit Eindhoven.

Hoeben, W.F.L.M., Pulsed Corona-Induced Degradation of Organic Materials in Water, 2000, Technische Universiteit Eindhoven.

Lofton, C., Sigmund, W.; Mechanisms Controlling Crystal Habits of Gold and Silver Colloids, Adv. Funct. Mater. 2005, p. 1197-1208, 15.

(56) References Cited

OTHER PUBLICATIONS

Martinez, S.S., Gallegos, A.A., Martinez, E.; Electrolytically Generated Silver and Copper Ions to Treat Cooling Water: An Environmentally Friendly Novel Alternative, International Journal of Hydrogen Energy, 2004, p. 921-932, 29.

Bhattacharyya, S., et al.; Localized Synthesis of Metal Nanoparticles, Using Nanoscale Corona Discharge in Aqueous Solutions, Adv. Mater, 2009, p. 4039-4044, 21.

Mucalo, M.R., Bullen, C.R.; Electric Arc Generated (Bredig) Palladium Nanoparticles: Surface Analysis by X-Ray Photoelectron Spectroscopy for Samples Prepared at Different pH, J. Mat. Sci. Let., 2001, p. 1853-1856, 20.

Lange, H., et al., Nanocarbon Production by Arc Discharge in Water, Carbon, 2003, pp. 1617-1623, 41.

Ma, H; Yin, B; Wang, S; Jiao, Y; Pan, W; Huang, S; Chen, S; Meng, F; Synthesis of Silver and Gold Nanoparticles by a Novel Electrochemical Method, ChemPhysChem, 2004, 5, 68-75.

Powell, J., Our Mightiest Germ Fighter, Science Digest, 1978, p. 57-59.

Svedberg, T., The Formation of Colloids, 1921, p. 22-41, D. Van Nostrand Company, New York.

Zsigmondy, R., The Chemistry of Colloids, 1917, p. 11, 19, 30, 68, 86-95, 114-119, 122-123, 127-128, John Wiley & Sons, Inc., New York.

Bechhold, H., Colloids in Biology and Medicine, 1919, p. 89-127, D. Van Nostrand Company, New York.

Federal Register vol. 64, No. 158/Aug. 17, 1999/Rules and Regulations, p. 44653-44658.

Gibbs, R. J., Silver Coolids, Do They Work?, 1999, Ronald J. Gibbs, Newark, DE.

Grier, Silver and Its Compounds. Disinfection, Sterilization, and Preservation, 2001, p. 403-407, Lippincott Williams & Wilkins, Philadelphia.

Pacheco, G., Studies on the Action of Metallic Colloids on Immunisation. Mem. Inst. Oswaldo Cruz. 1925, vo1. 18, n. 1, pp. 119-149.

DeVries, C.A.M.; De Hoog, F.J.; Schram, D.C.; Ionic Species in a Negative Corona in Humid Air, 1983, p. 317-321, Eindhoven University of Technology, The Netherlands.

Liu, Yu-Chuan, et al., New Pathway for the Synthesis of Ultrafine Silver Nanoparticles From Bulk Silver Substrates in Aqueous Solutions by Sonoelectrochemical Methods, Electrochemistry Communications, 2004, 1163-1168, 6.

Bruggeman, Peter, et al., Non-Thermal Plasmas in and in Contact With Liquids; J.Phys.D:Appl.Phys, 2009, 053001-053029, 42.

Kravchenko, A.V., et al.; On the Change in Properties of Water Subjected to Low-Temperature Plasma Electrolysis. High Energy Chemistry, 2004, 333-337, 38-5.

Koo, IL Gyo, et al.; Platinum Nanoparticles Prepared by a Plasma-Chemical Reduction Method. J.Mater.Chem., 2005, 4125-4128, 15.

Lelievre, J., et al.; Electrolysis Processes in D.C. Corona Discharges in Humid Air. J. Phys. III France 5 (1995) 447-457.

Machala, Z., et al., Emission Spectroscopy of Atmospheric Pressure Plasmas for Bio-Medical and Environmental Applications. Journal of Molecular Spectroscopy 243 (2007) 194-201 (Elsevier).

Lukes, P., et al., Generation of Ozone by Pulsed Corona Discharge Over Water Surface in Hybrid Gas-Liquid Electrical Discharge Reactor. J. Phys. D: Apply. Phys. 38 (2005) 409-416.

Lu, Xin Pei; Leipold, Frank; Laroussi, Mounir; Optical and Electrical Diagnostics of a Non-Equilibrium Air Plasma. J. Phys. D: Appl. Phys. 36 (2003) 2662-2666.

Laroussi, M.; Lu, X.; Room-Temperature Atmospheric Pressure Plasma Plume for Biomedical Applications. American Institute of Physics; Applied Physics Letters 87, 113902 (2005).

Wu, Chunwei; Zeng, Taofang. Size-Tunable Synthesis of Metallic Nanoparticles in a Continuous and Steady-Flow Reactor. American Chemical Society; Chemistry of Materials, vol. 19 No. 2 (Jan. 23, 2007).

* cited by examiner

Figure 4a
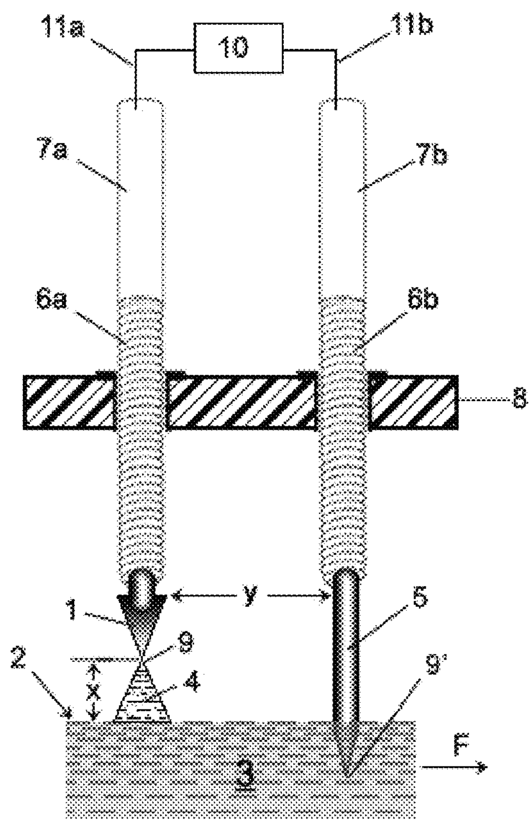
Figure 4b
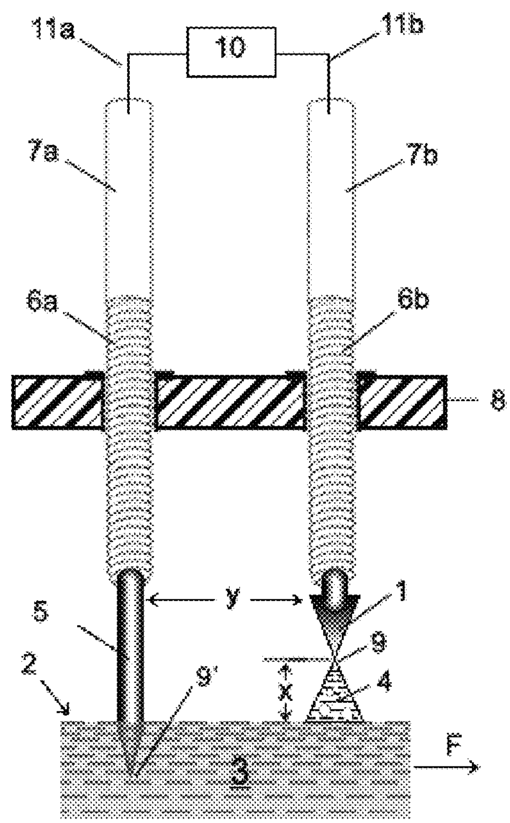
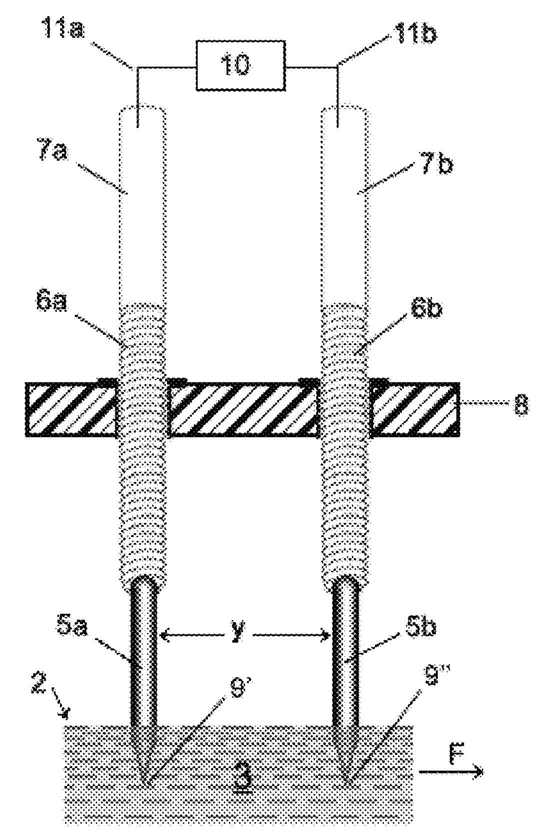
Figure 4c
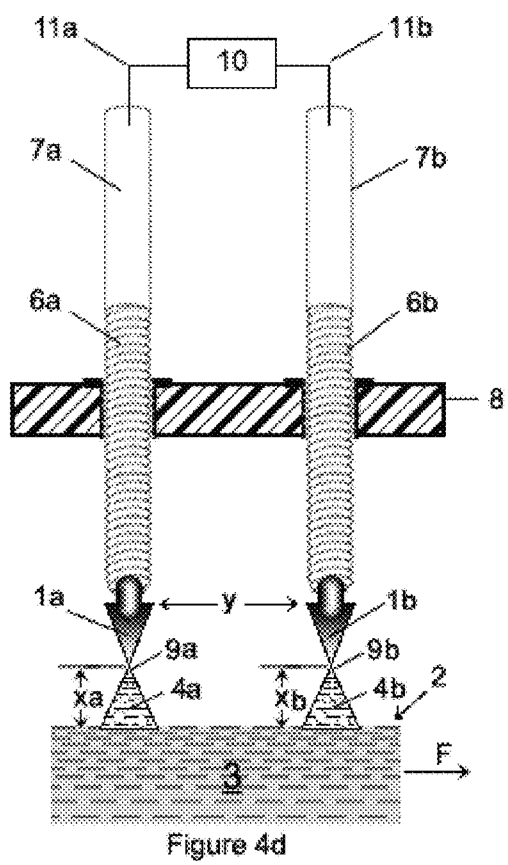
Figure 4d $$V_{out} = \frac{V_1(R_2||R_L)}{(R_1 + R_2||R_L)}$$

$R_L$ = 10M Ohm input impedance of Multimeter $$I_{out} = \frac{V_{out}}{(R||R_L)}$$

$R_L$ = 10M Ohm input impedance of Multimeter

GD-007 TEM Size Distribution

Au GD-007-03
Sample a
4.8545% transmission
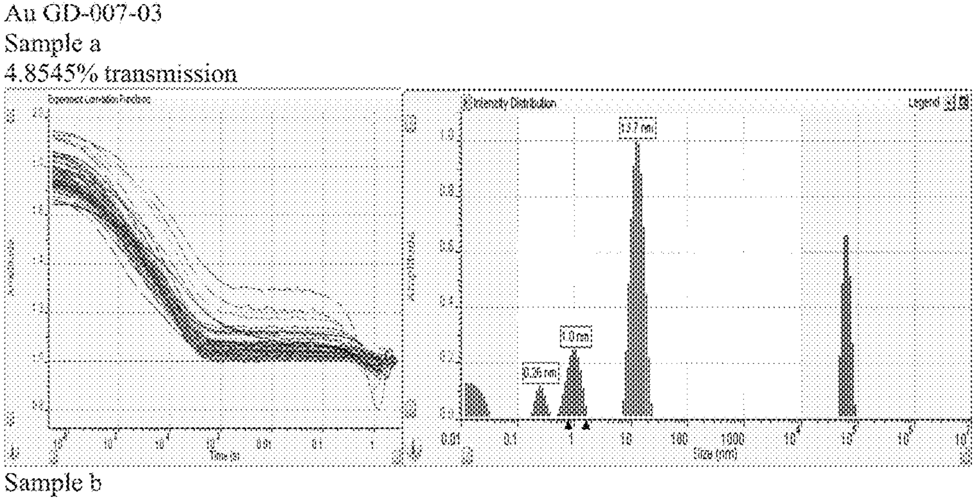
Sample b
5.0688% transmission
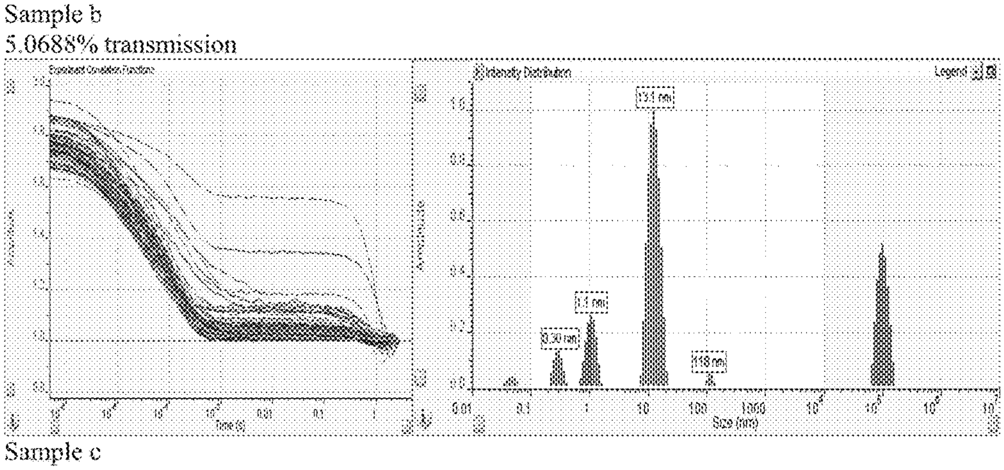
Sample c
4.5534% transmission
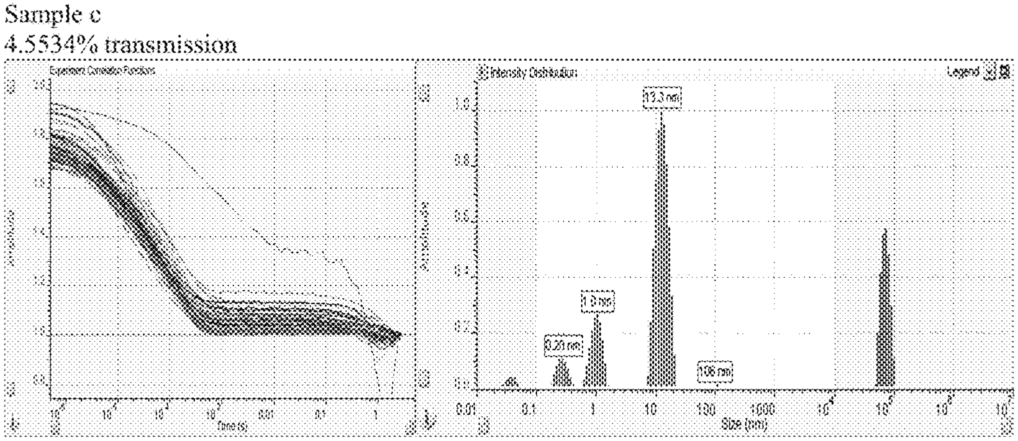
Figure 44c GD-016 TEM Size Distribution Gold GD-016
Sample a
6.0500% transmission
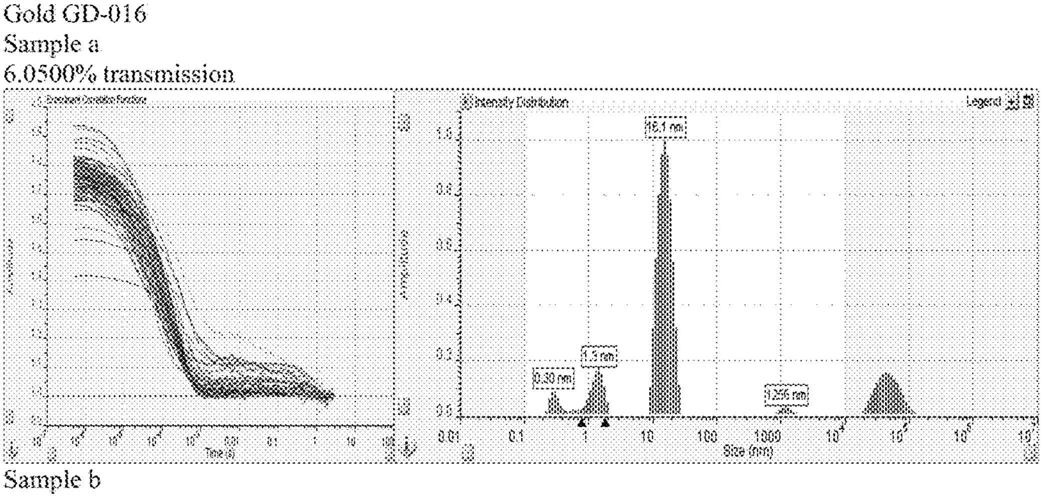
Sample b
5.4620% transmission
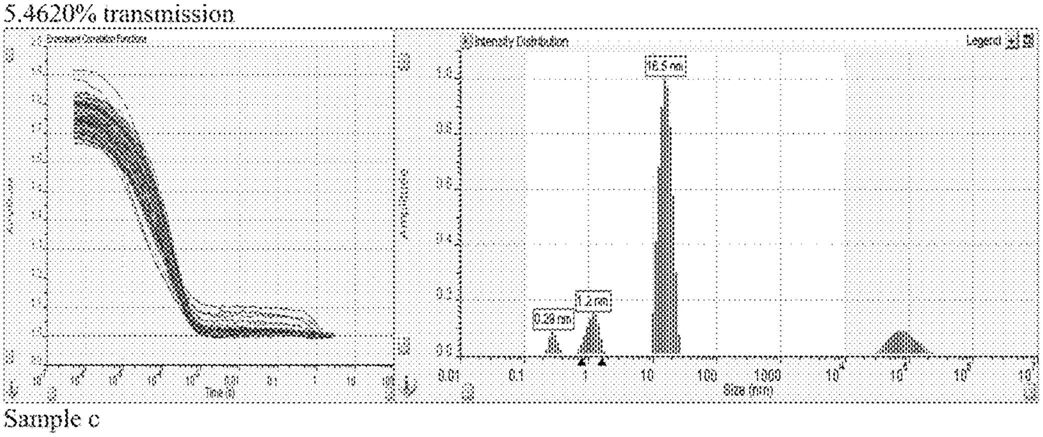
Sample c
5.0543% transmission
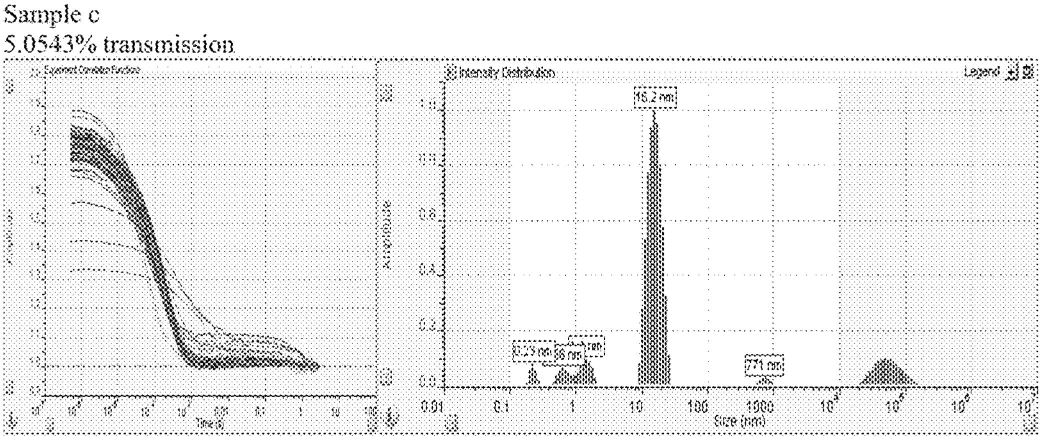
Figure 45c GD-015 TEM Size Distribution Gold GD-015
Sample a
4.9679% transmission
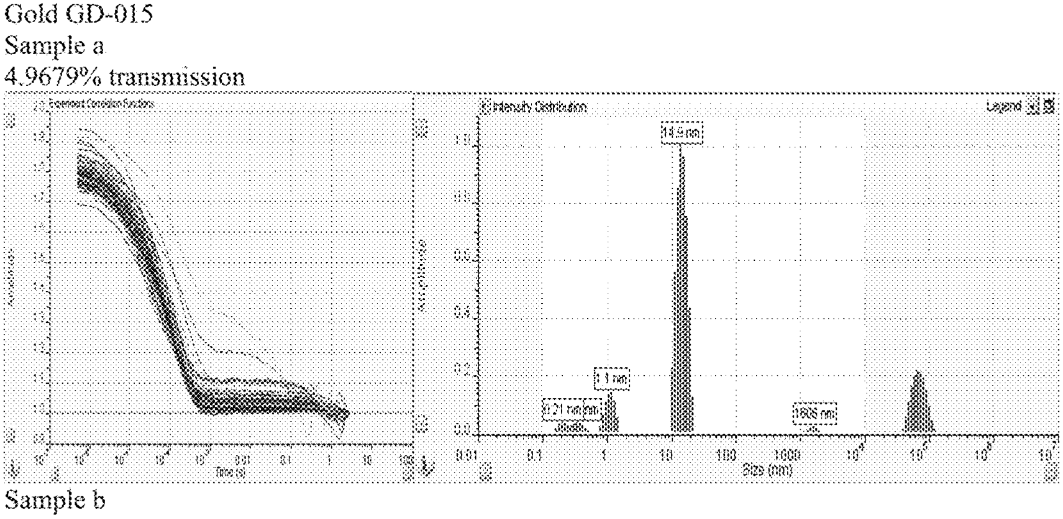
Sample b
5.7200% transmission
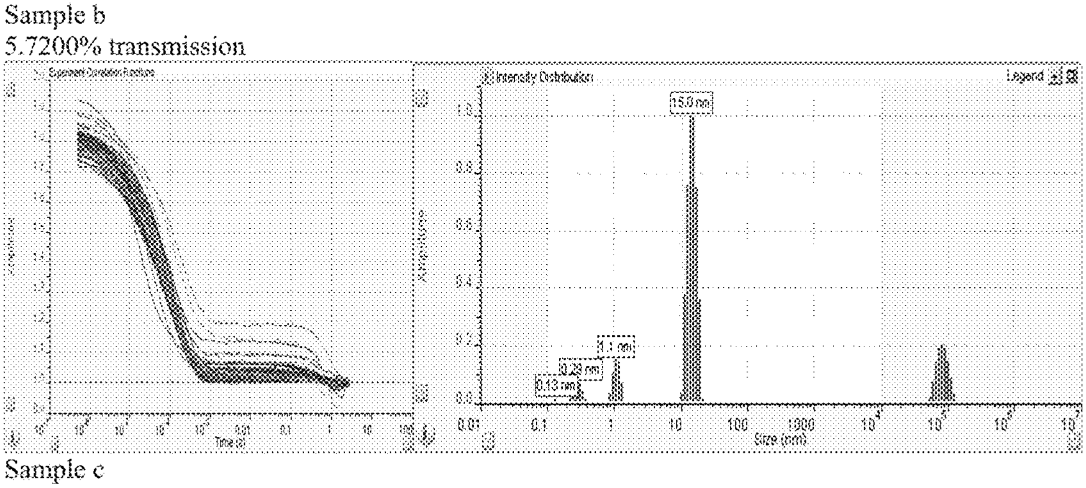
Sample c
6.5497% transmission
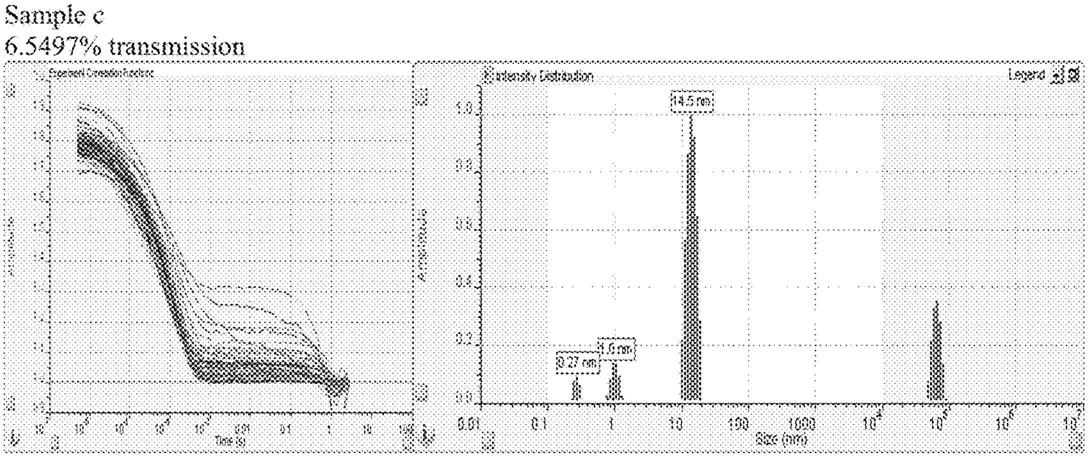
Figure 46c GB-18 TEM Size Distribution GB-018
Sample a
11.3542% transmission
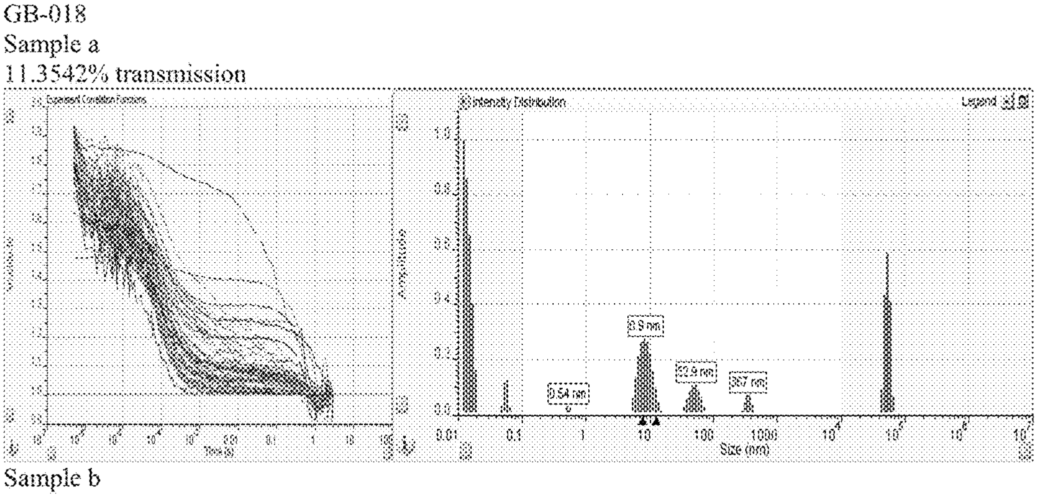
Sample b
48.6000% transmission
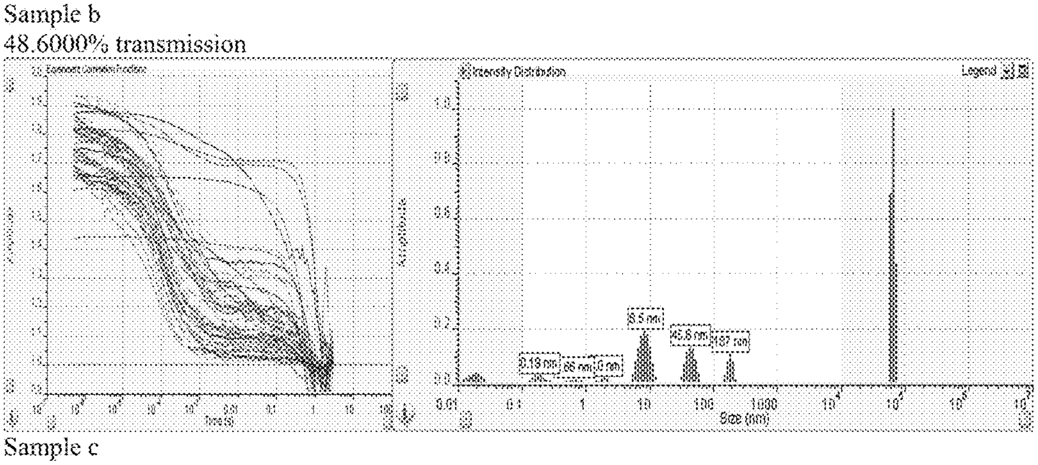
Sample c
80.4000% transmission
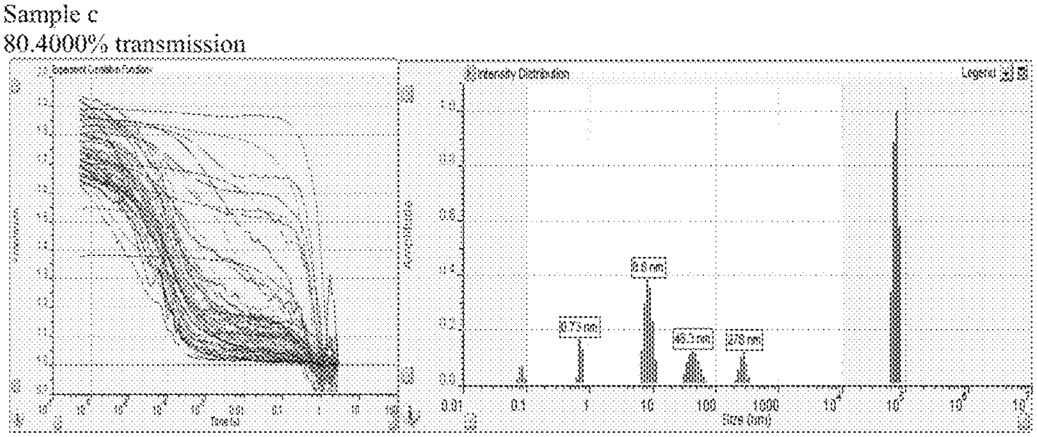
Figure 47c GB-019 TEM Size Distribution GB-019
Sample a
0.8097% transmission
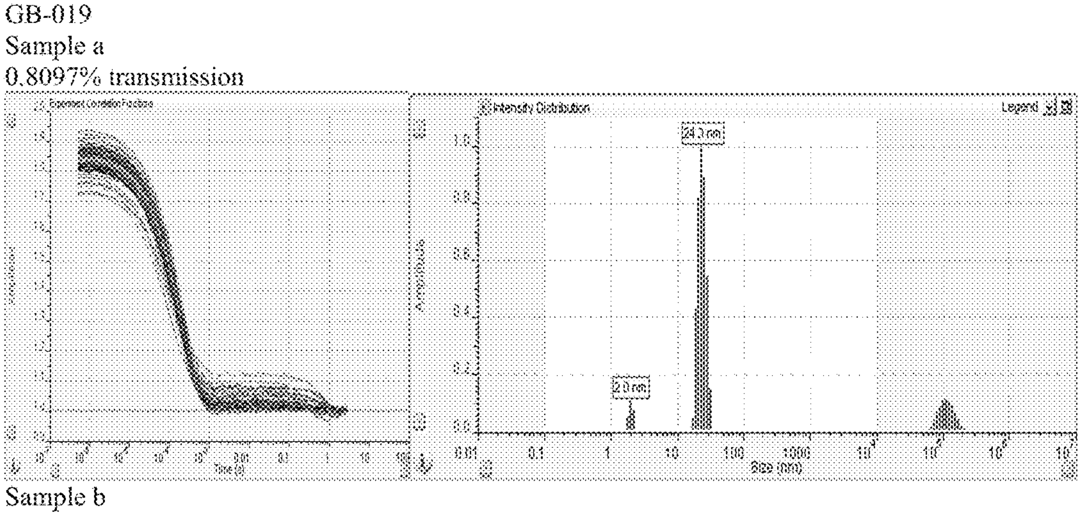
Sample b
0.9643% transmission
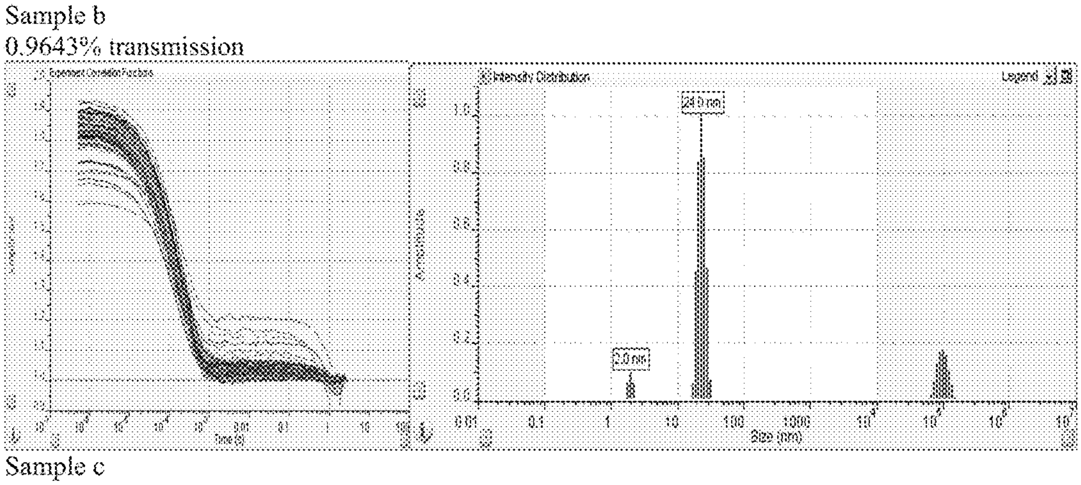
Sample c
0.7791% transmission
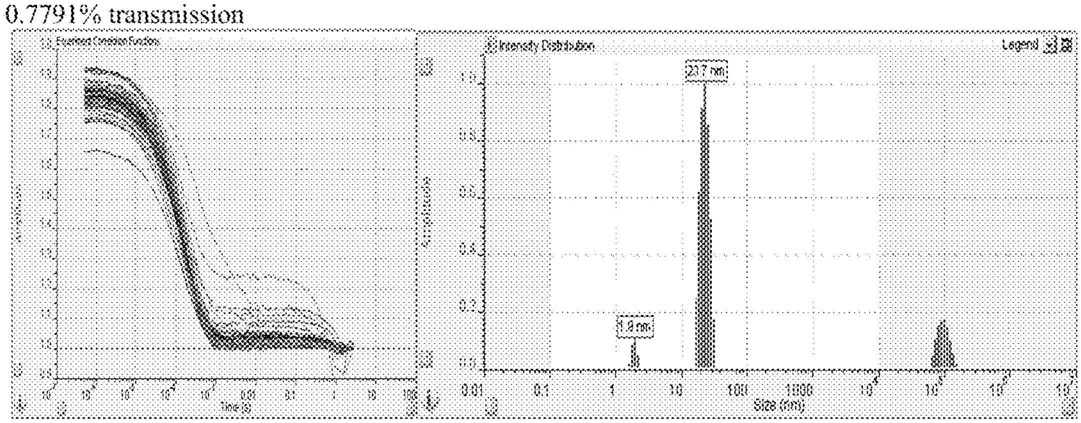
Figure 48c GB-020 TEM Size Distribution GB-020
Sample a
2.0102% transmission
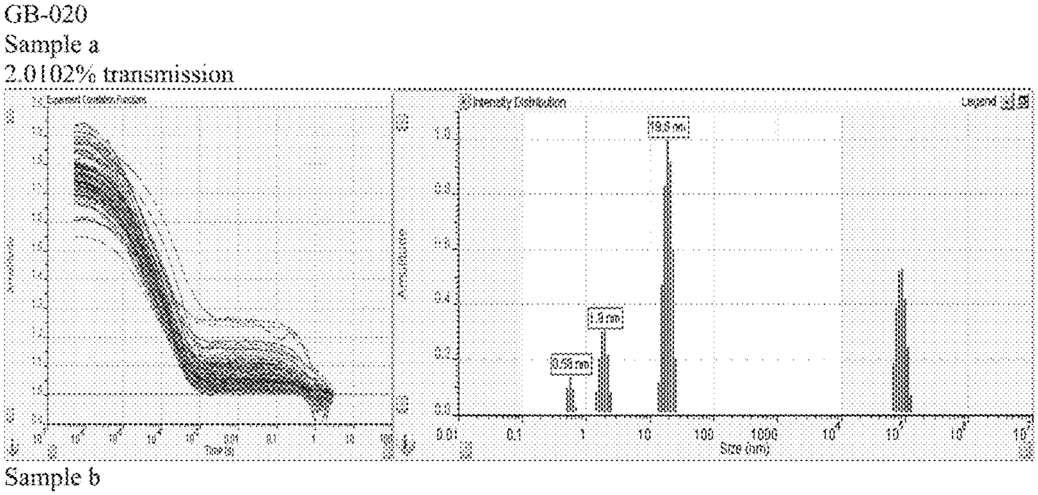
Sample b
2.2622% transmission
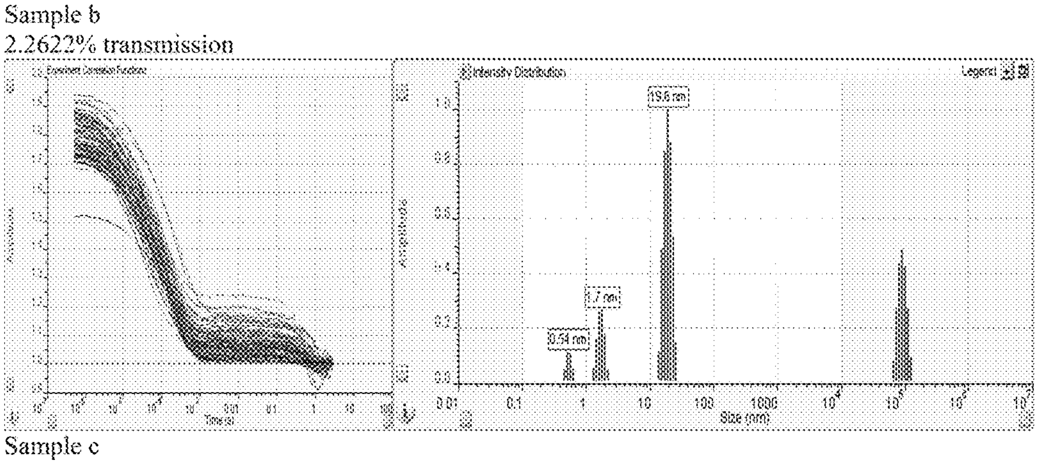
Sample c
3.1900% transmission
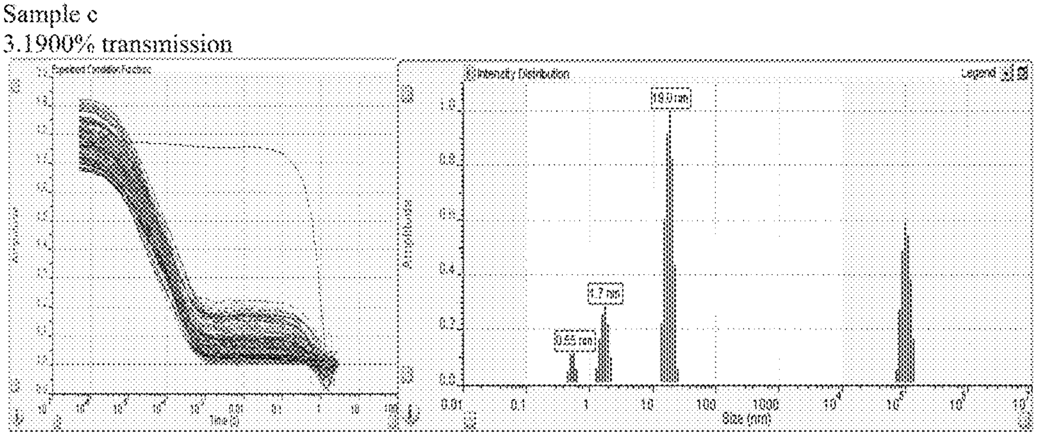
Figure 49c 1AC-202-7 TEM Size Distribution Gold 1AC-202-7
Sample a
1.5701% transmission
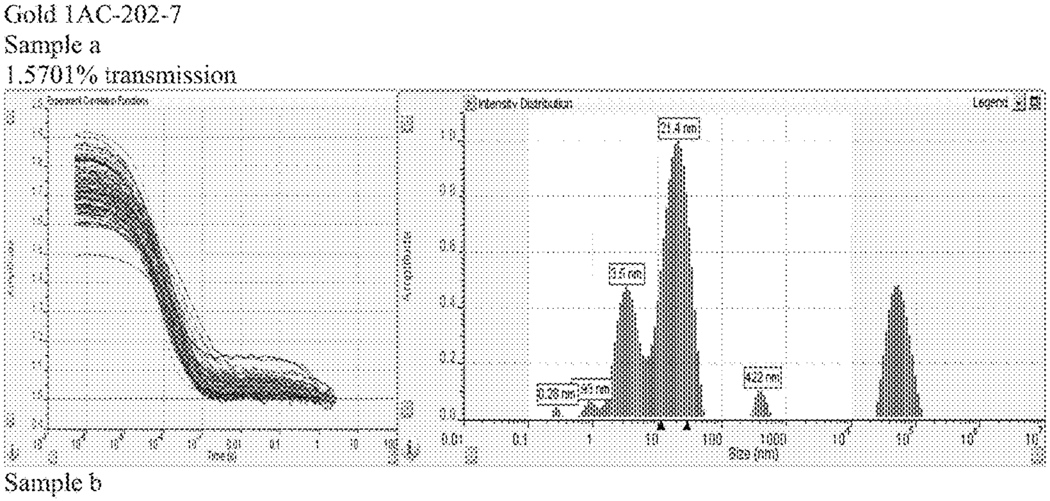
Sample b
1.0808% transmission
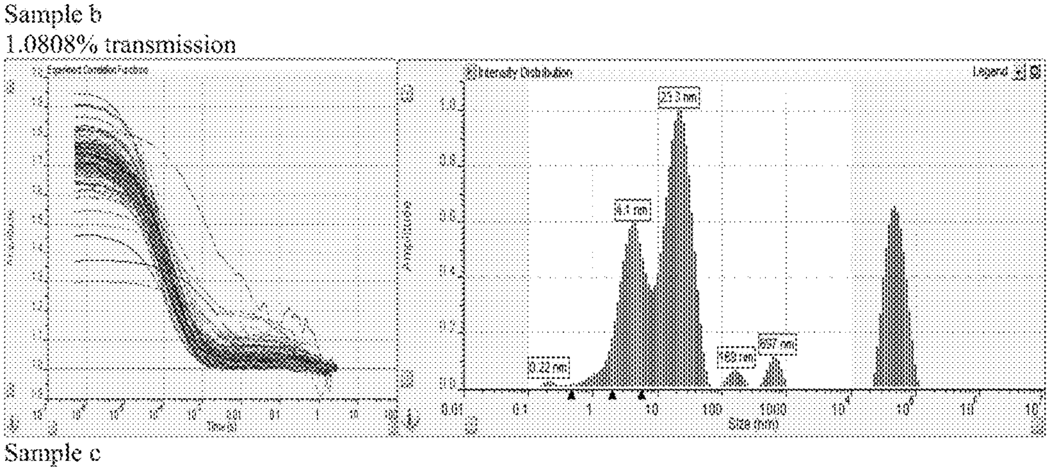
Sample c
1.1880% transmission
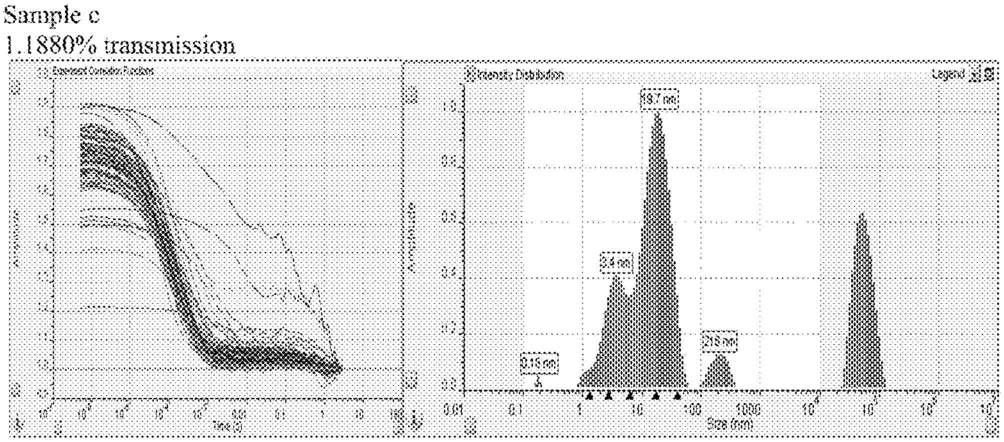
Figure 50c Au GT-033
Sample a
16.5259% transmission
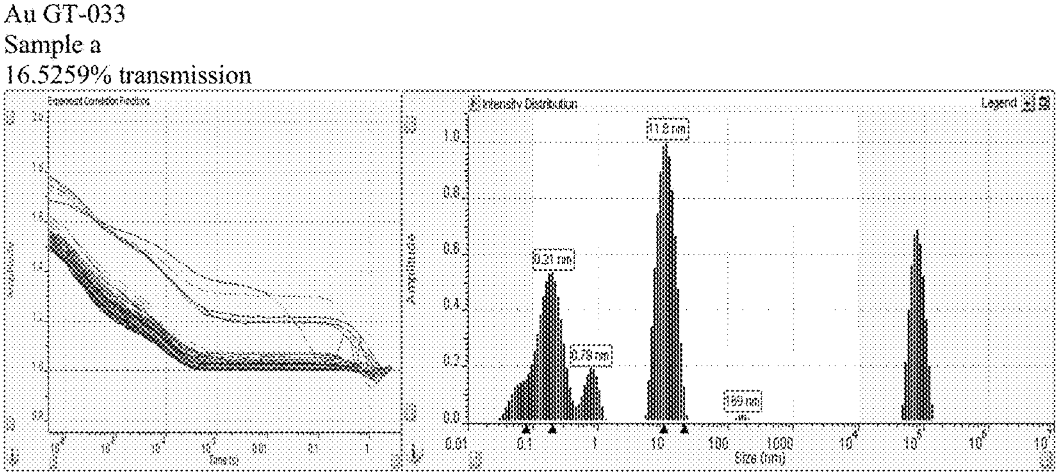
Sample b
22.9995% transmission
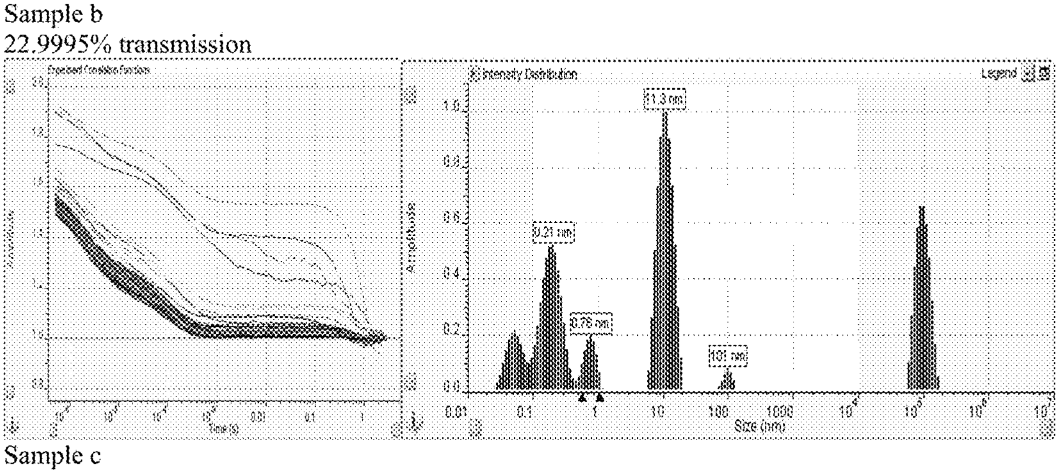
Sample c
41.1366% transmission
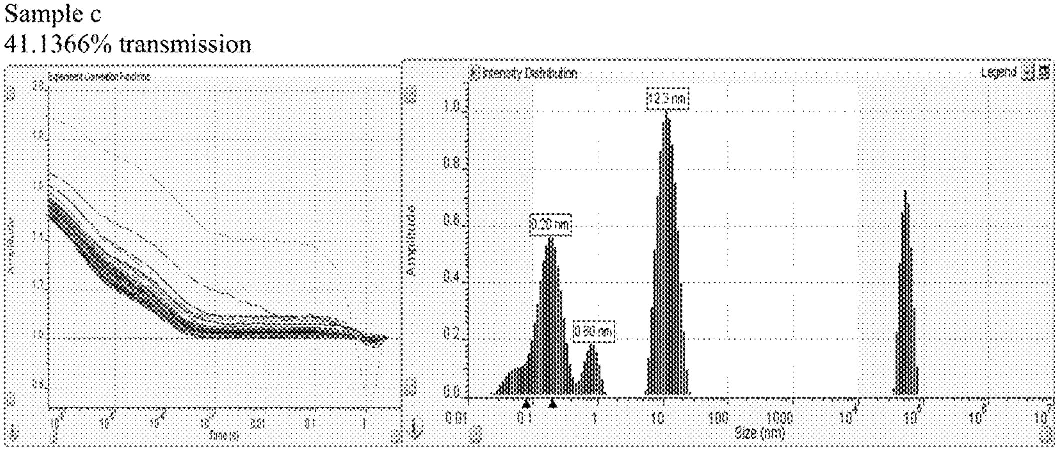
Figure 51b GD-006-01
Sample a
18.2621% transmission
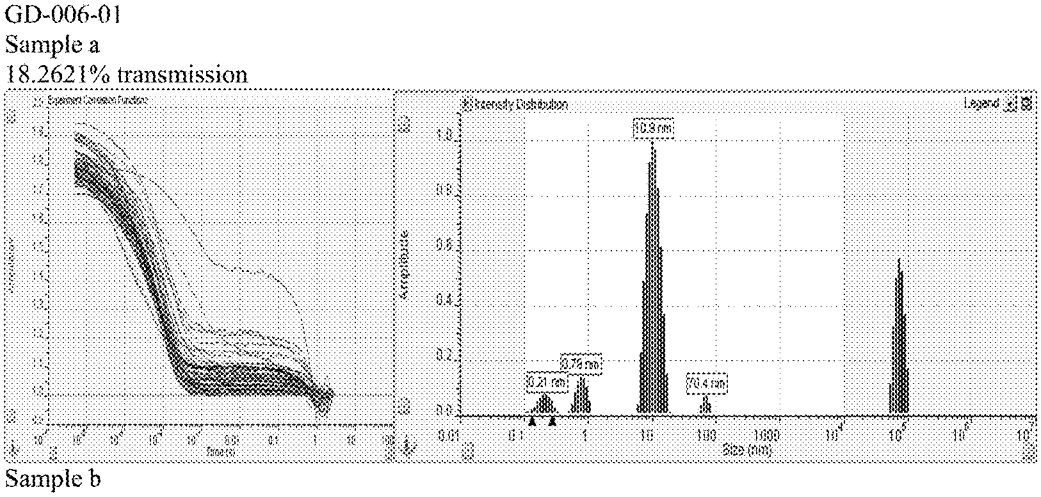
Sample b
29.0000% transmission
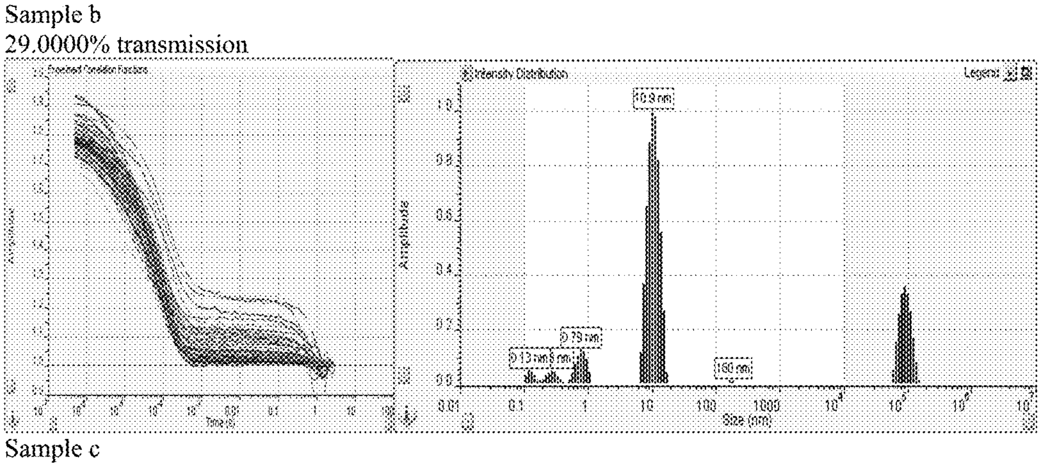
Sample c
22.5950% transmission
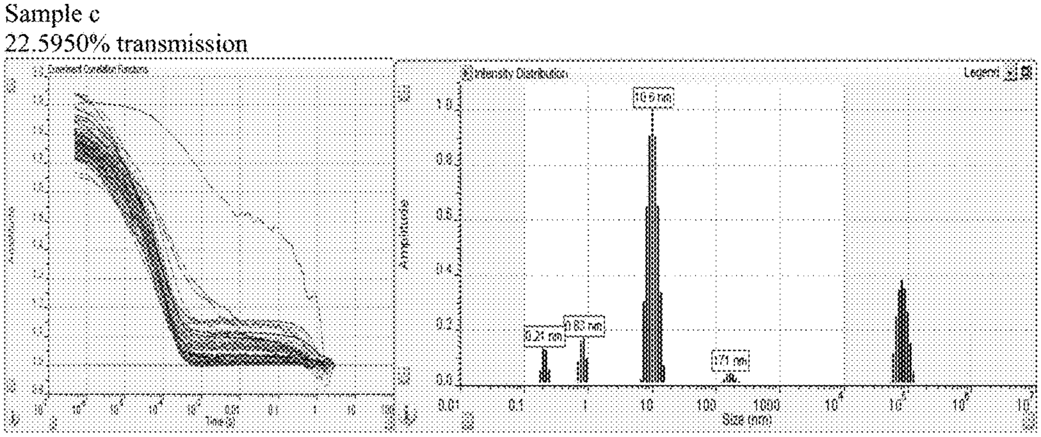
Figure 52

GB-056:

Gold GB-056 DLS Size Distribution
Sample a
10.0213% transmission
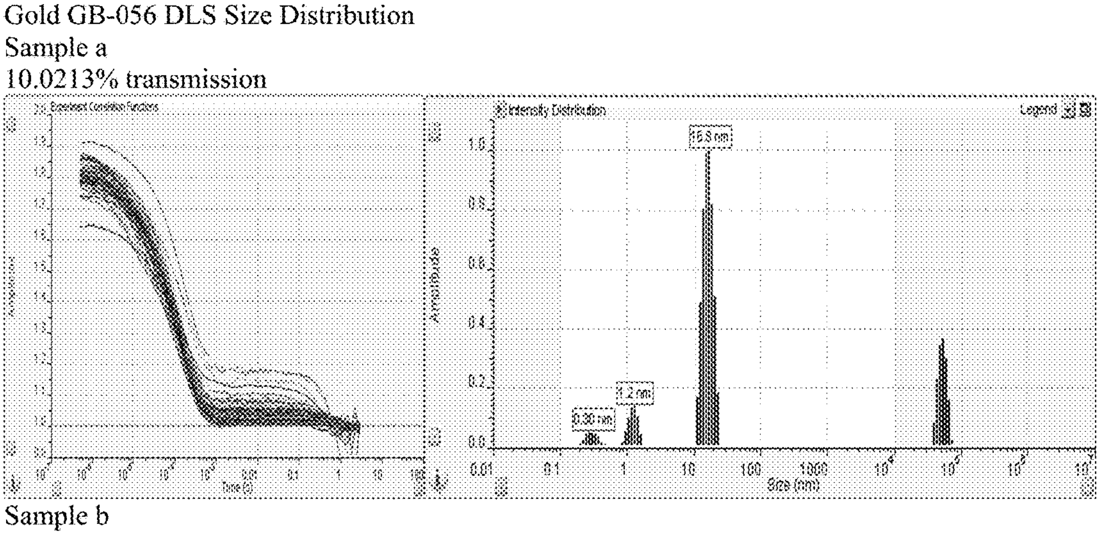
Sample b
8.7643% transmission
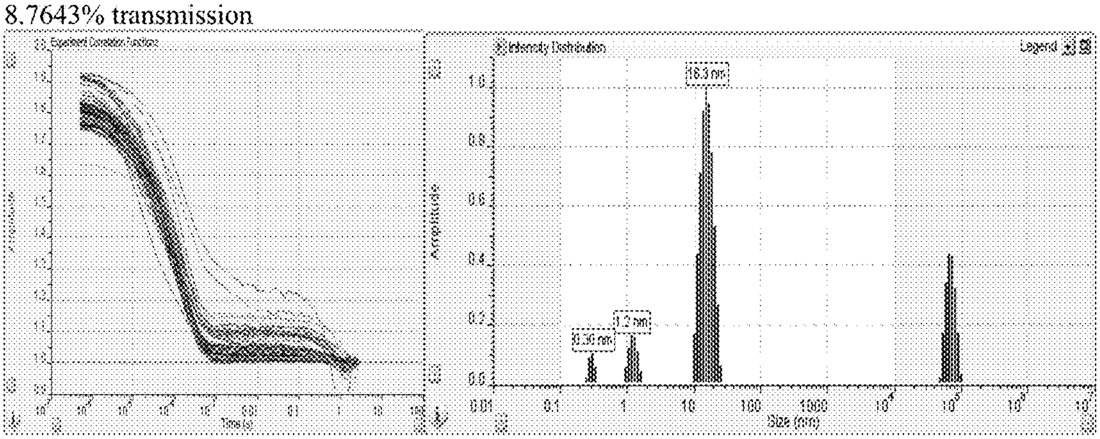
Sample c
10.3460% transmission
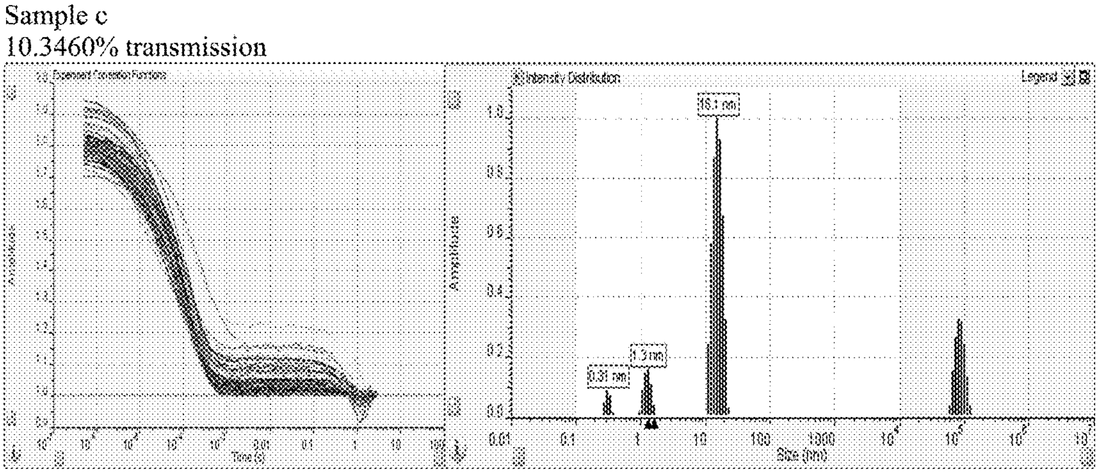
Figure 55

GB-098

GB-098 TEM Size Distribution

Gold GB-098
Sample a
1.2659% transmission
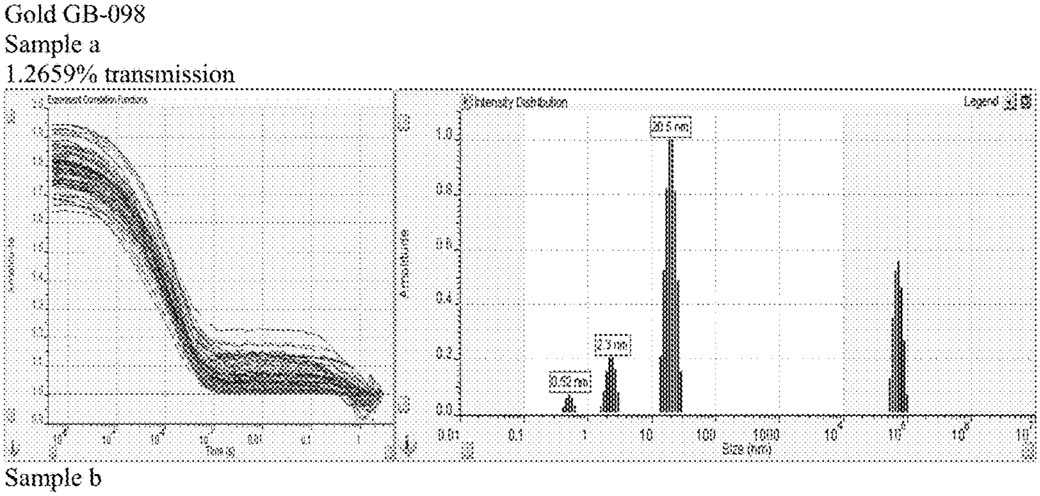
Sample b
2.2228% transmission
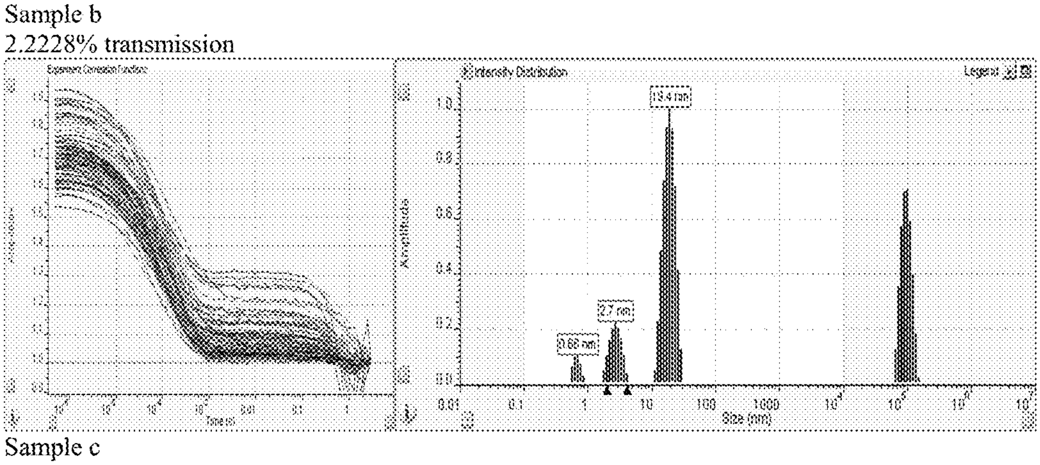
Sample c
1.6909% transmission
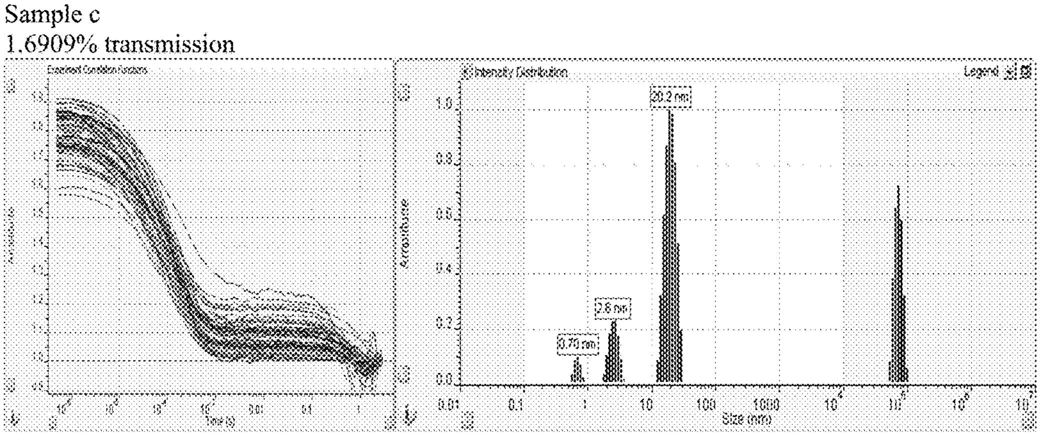
Figure 56c GB-113 TEM Size Distribution Gold GB-113
Sample a
14.10% transmission
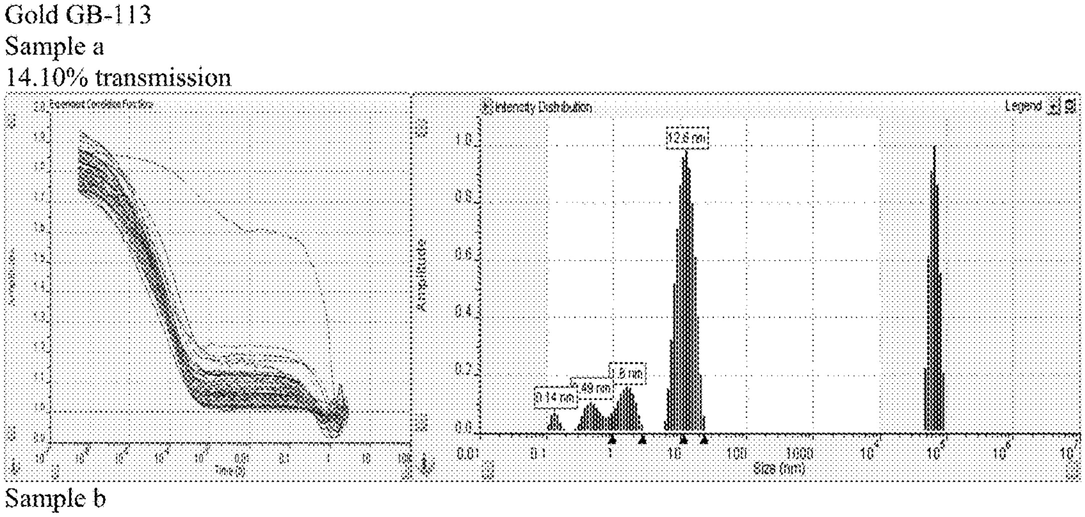
Sample b
10.56% transmission
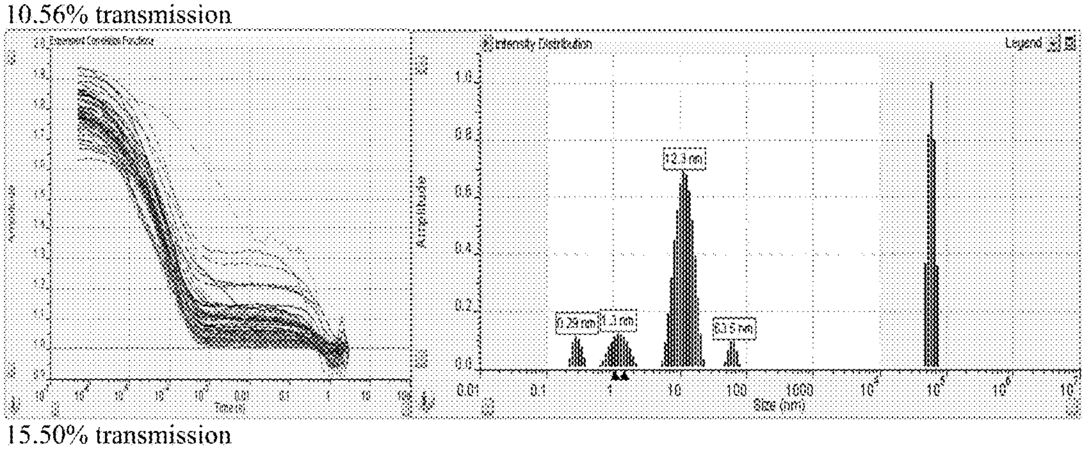
15.50% transmission
Sample c
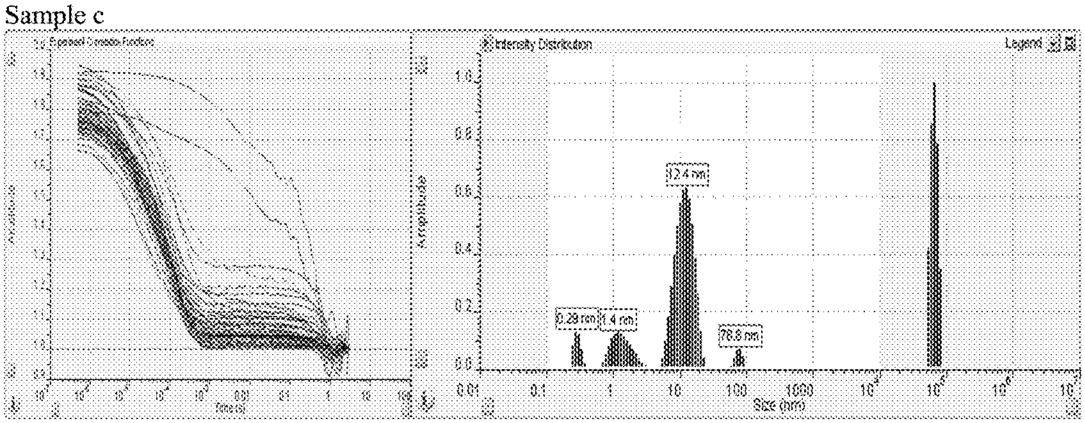
Figure 57c

GB-118 TEM Size Distribution

Gold GB-118
Sample a
6.0801% transmission
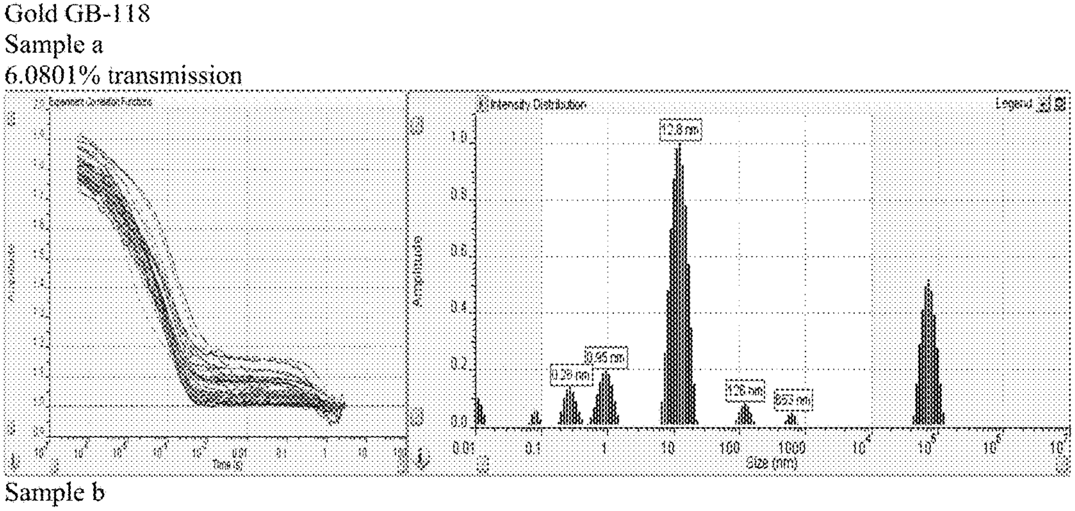
Sample b
6.6000% transmission
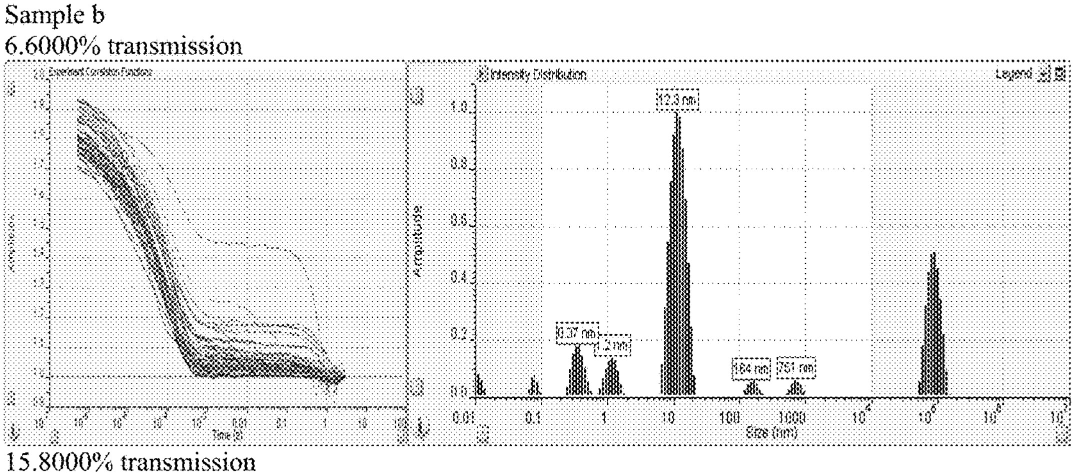
15.8000% transmission
Sample c
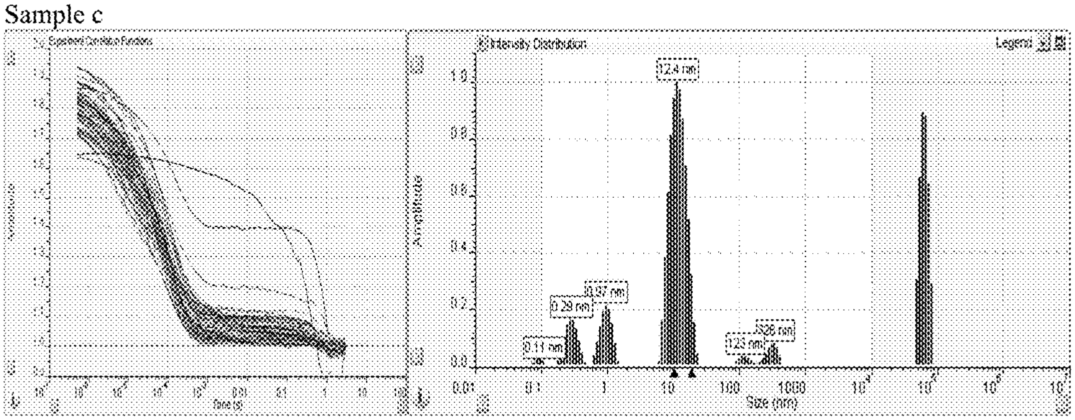
Figure 58c

GB-120

GB-120 TEM Size Distribution

Gold GB-120
Sample a
12.5000% transmission
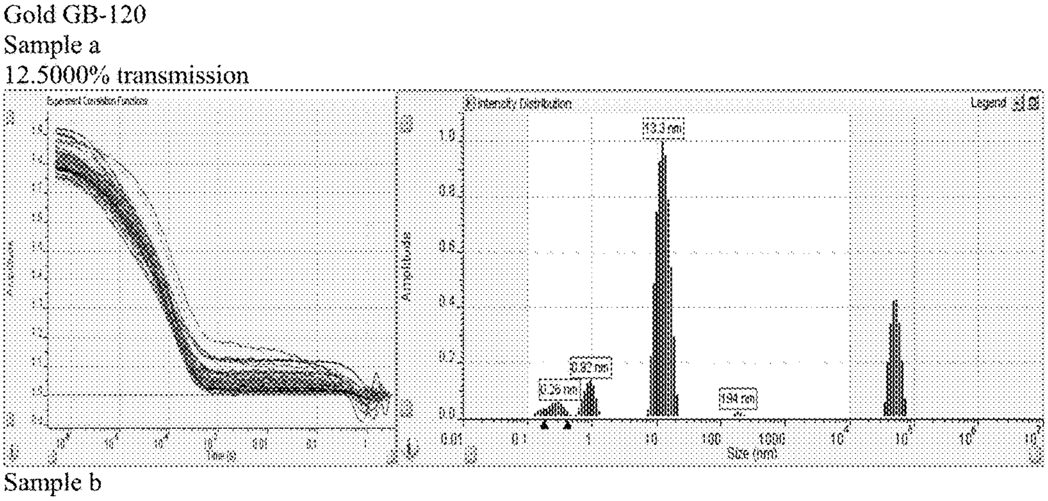
Sample b
17.3603% transmission
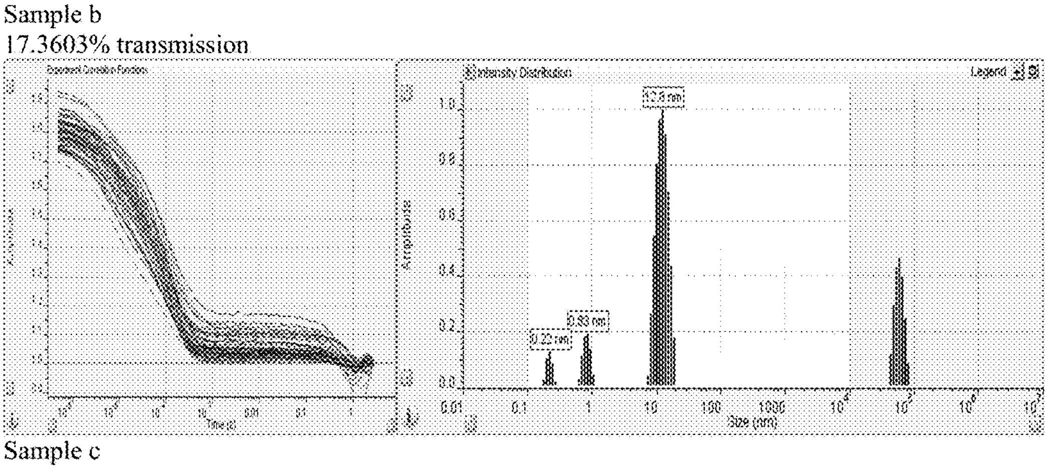
Sample c
21.5998% transmission
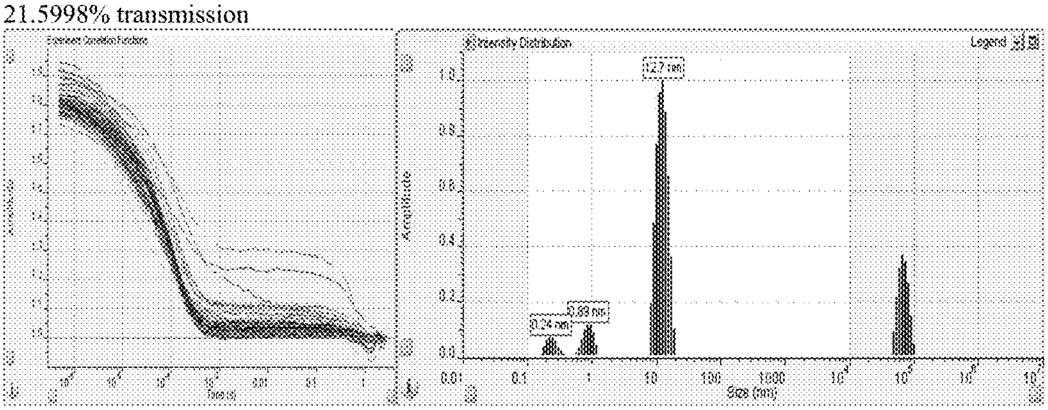
Figure 59c

GB-123

GB-123 TEM Size Distribution

Gold GB-123
Sample a
22.2805% transmission
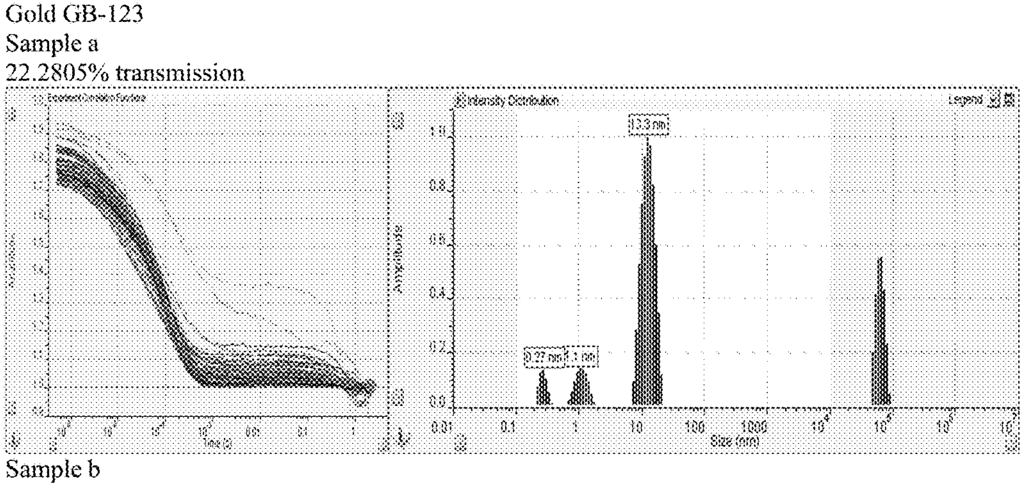
Sample b
14.0000% transmission
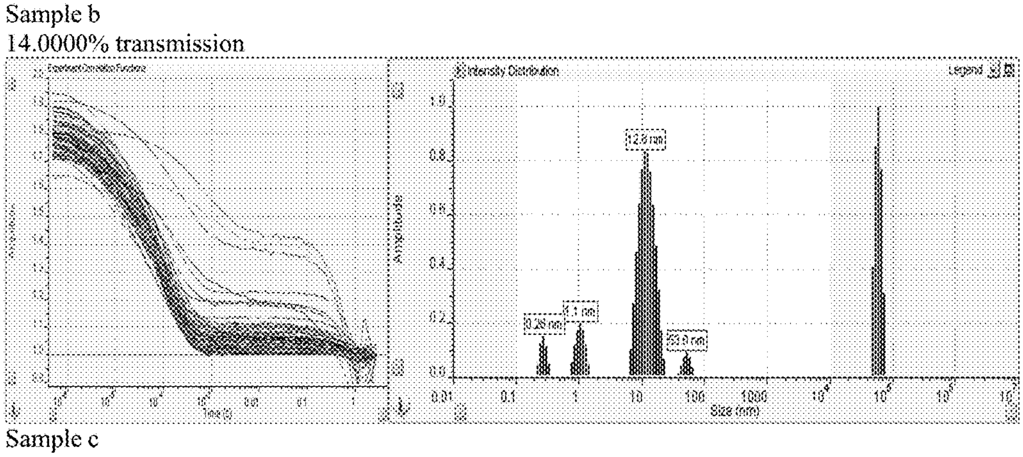
Sample c
11.5000% transmission
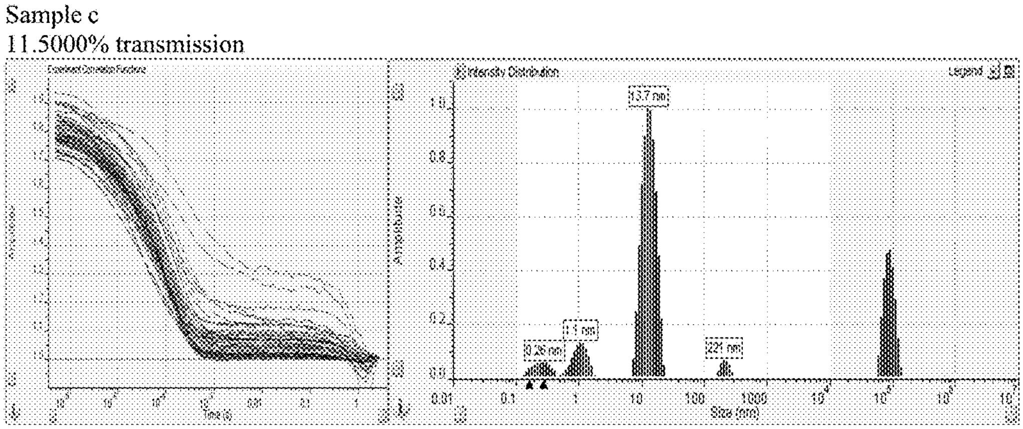
Figure 60c

GB-139

GB-139 TEM Size Distribution

Gold GB-139
Sample a
5.2768% transmission
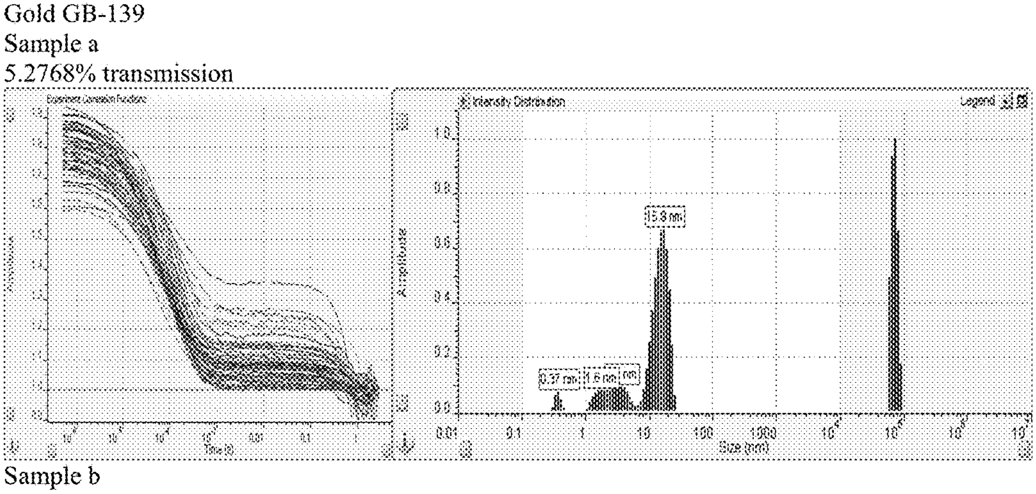
Sample b
5.2593% transmission
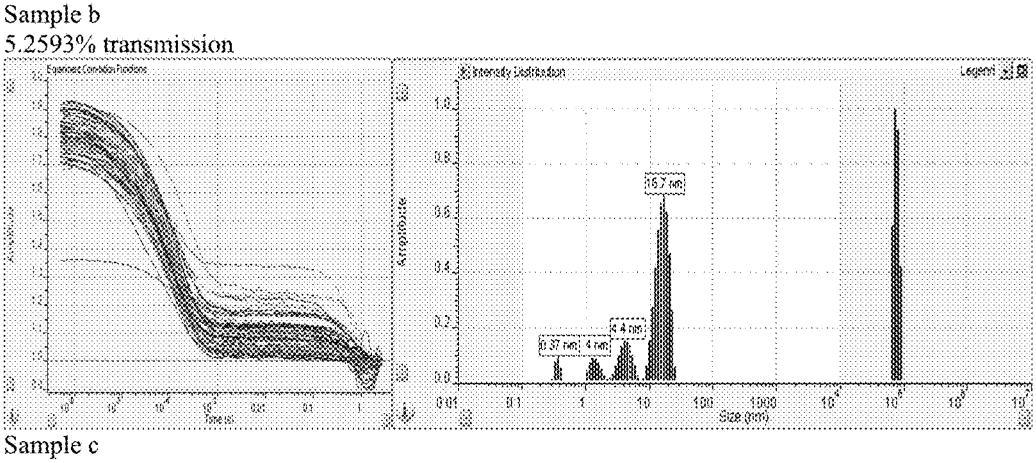
Sample c
6.5042% transmission
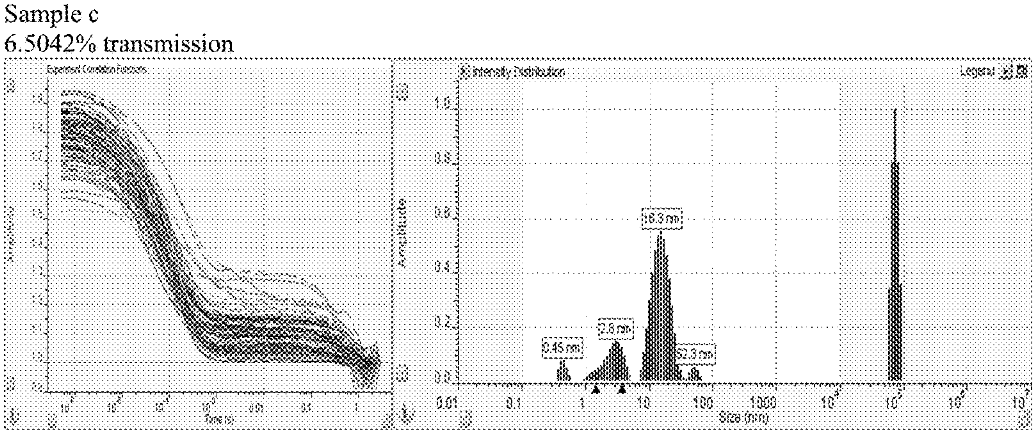
Figure 61c GB-139 Current vs Time
Electrode #7
Electrode # 4
Electrode # 13
Electrode # 6
Electrode # 11
Electrode # 5
Electrode # 12
Electrode # 9
Electrode # 15
Electrode # 10
Electrode # 14
Electrode # 8
Electrode # 16
Electrode # 3
Equilibrium
Current (A)
Time
0.73
0.68
0.63
0.58
0.53
0.48
0.43
0.38
0.33
9:00
10:12
11:24
12:36
13:48
15:00
16:12
17:24

GB-141

GB-141 TEM Size Distribution

Gold GB-141
Sample a
10.1598% transmission
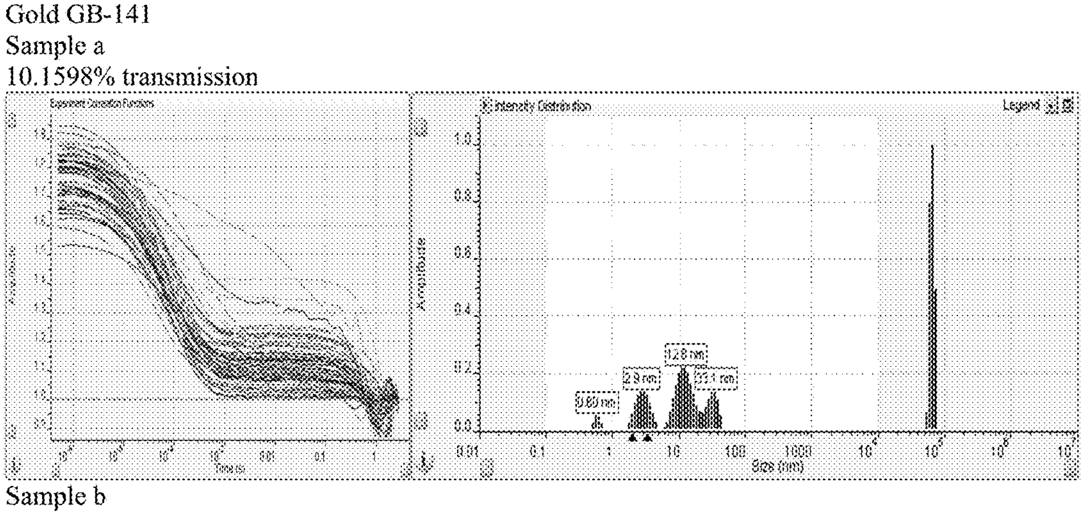
Sample b
5.42% transmission
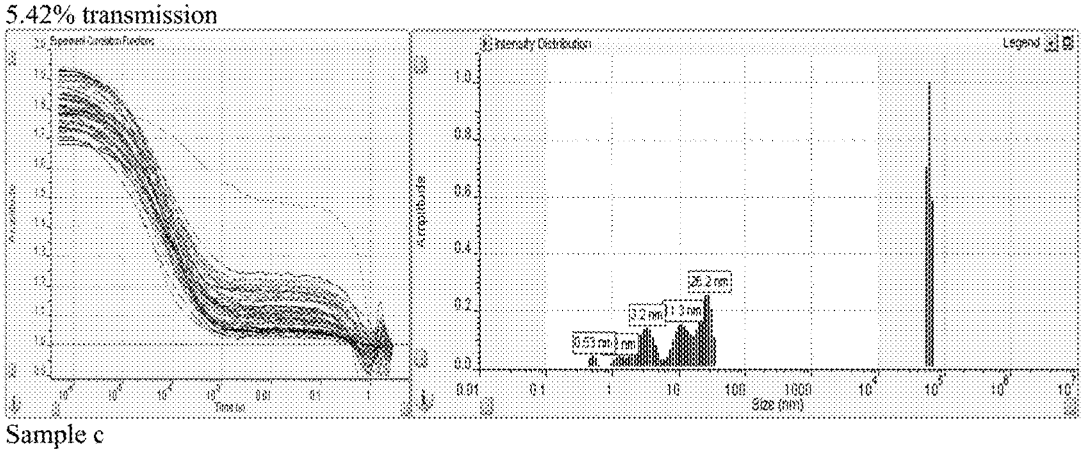
Sample c
2.73% transmission
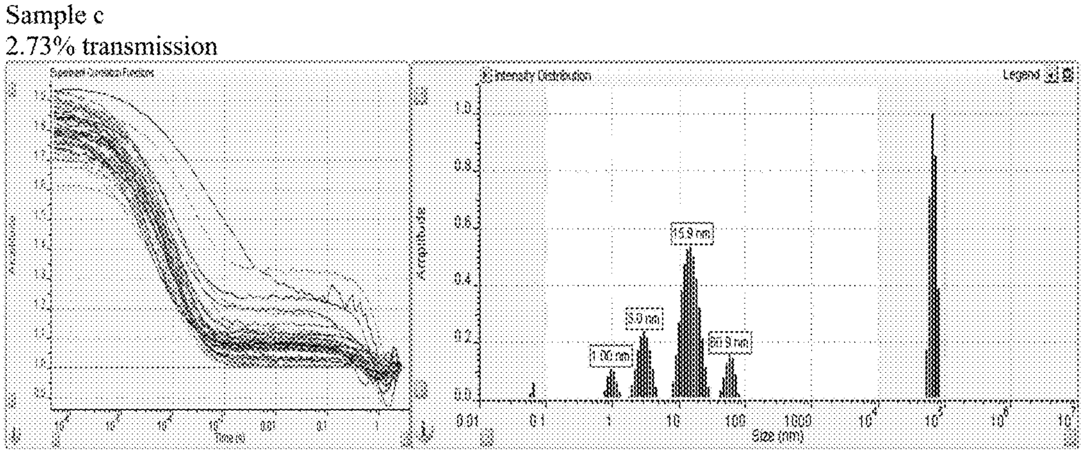
Figure 62c

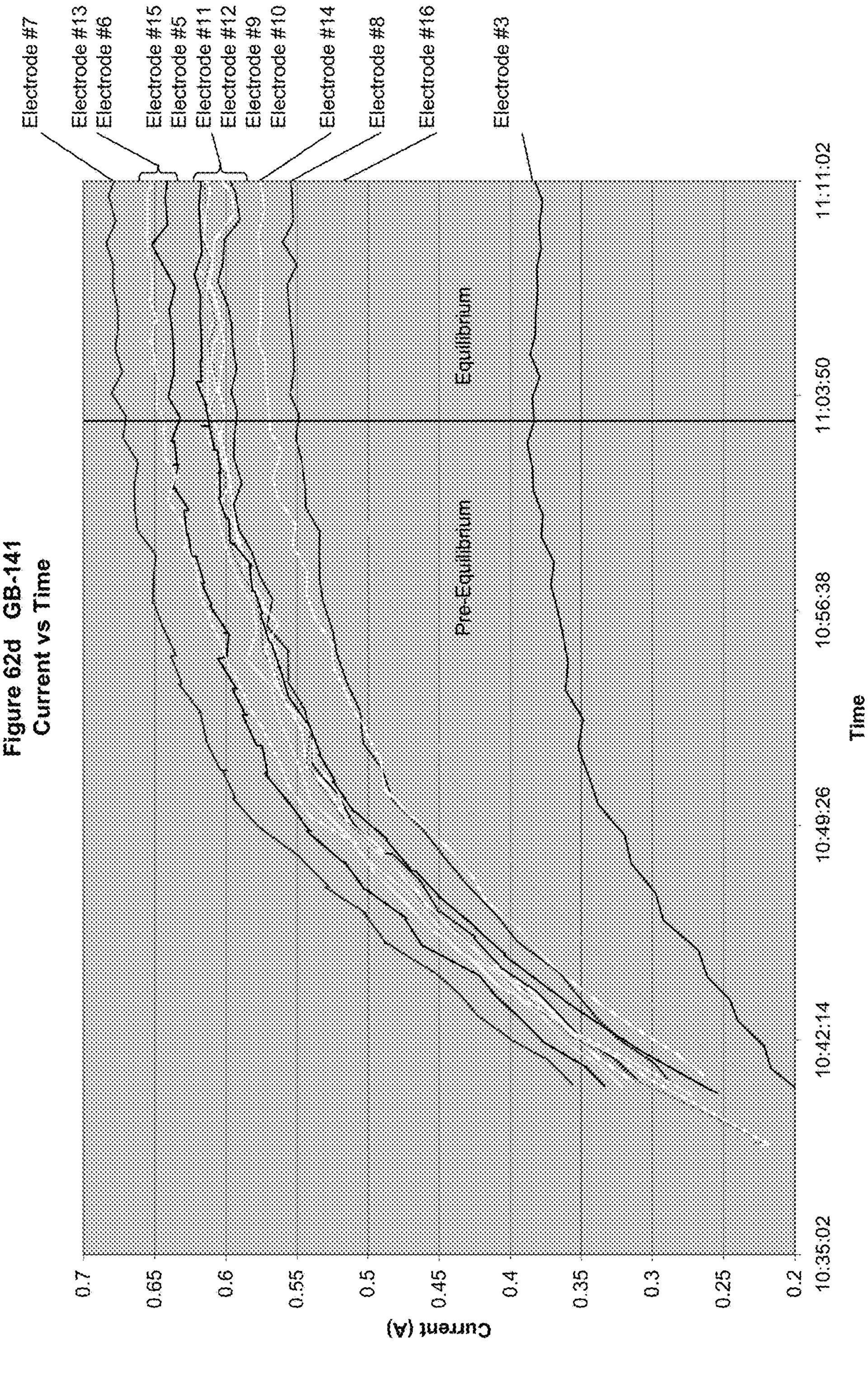
Figure 62d GB-141
Current vs Time

GB-144 TEM Size Distribution

Gold GB-144
Sample a
4.0151% transmission
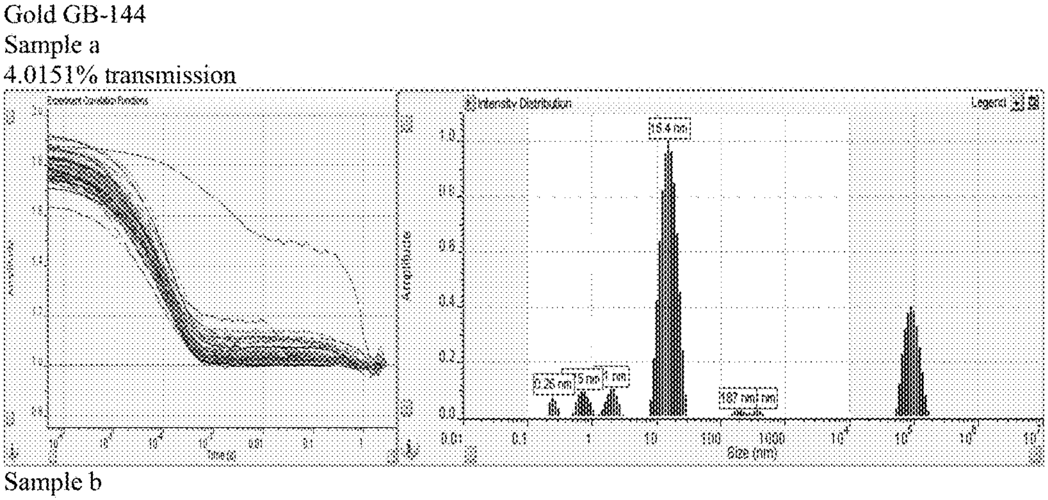
Sample b
3.5043% transmission
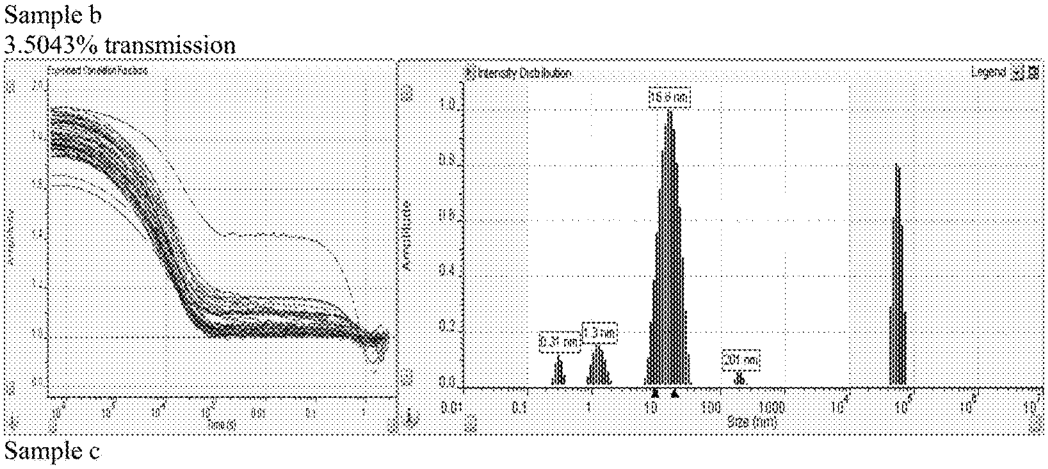
Sample c
2.4708% transmission
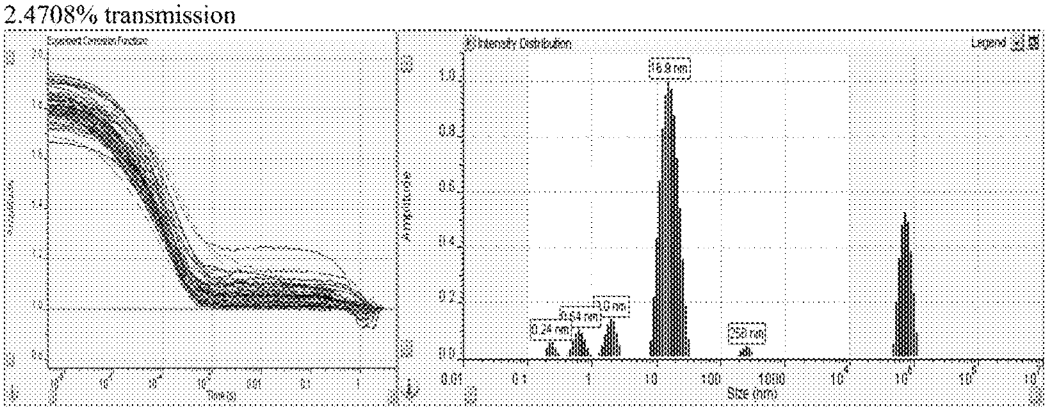
Figure 63c

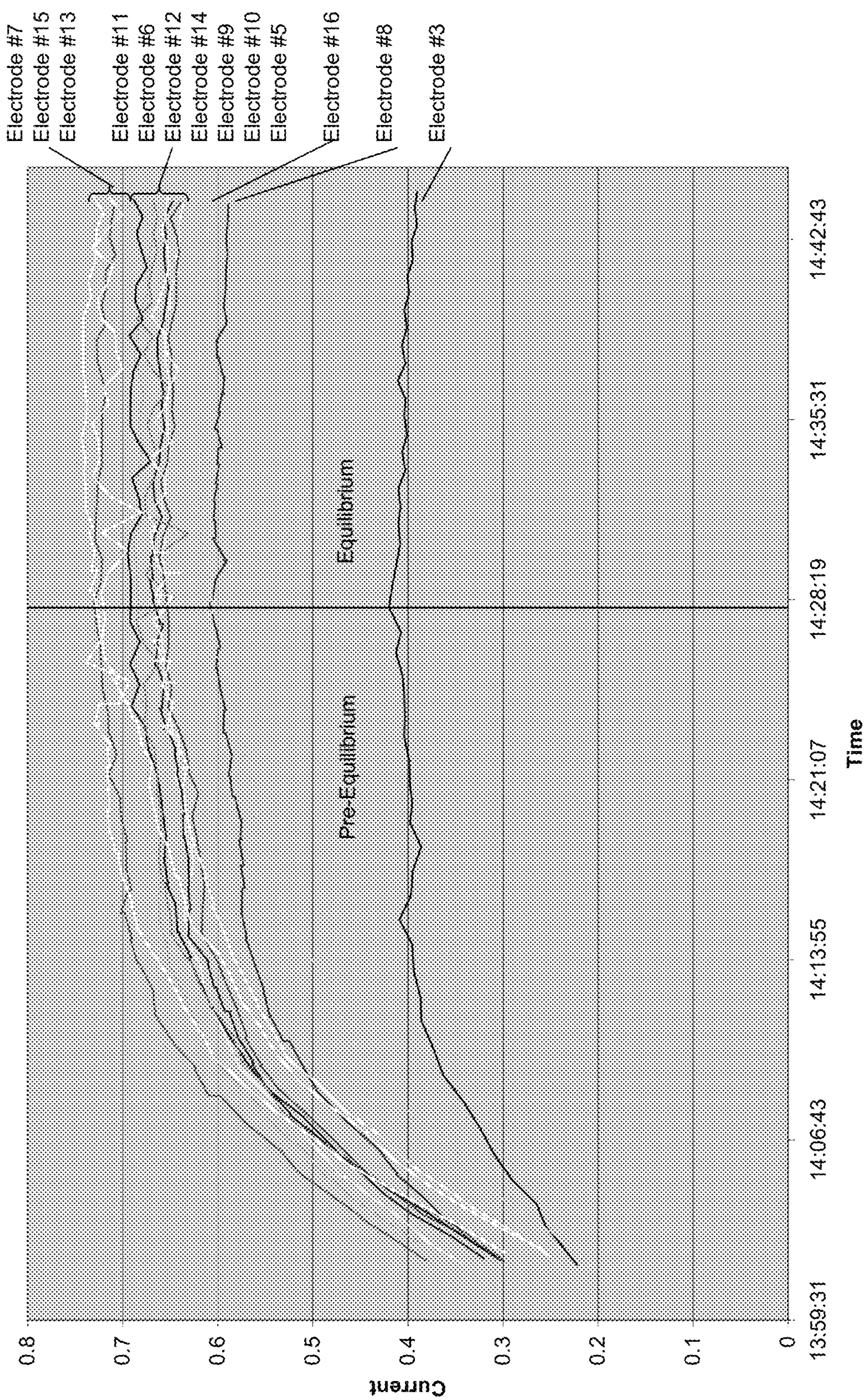
Figure 63d GB-144
Current vs Time

GB-079

GB-079 TEM Size Distribution

Gold GB-079
Sample a
7.97% transmission
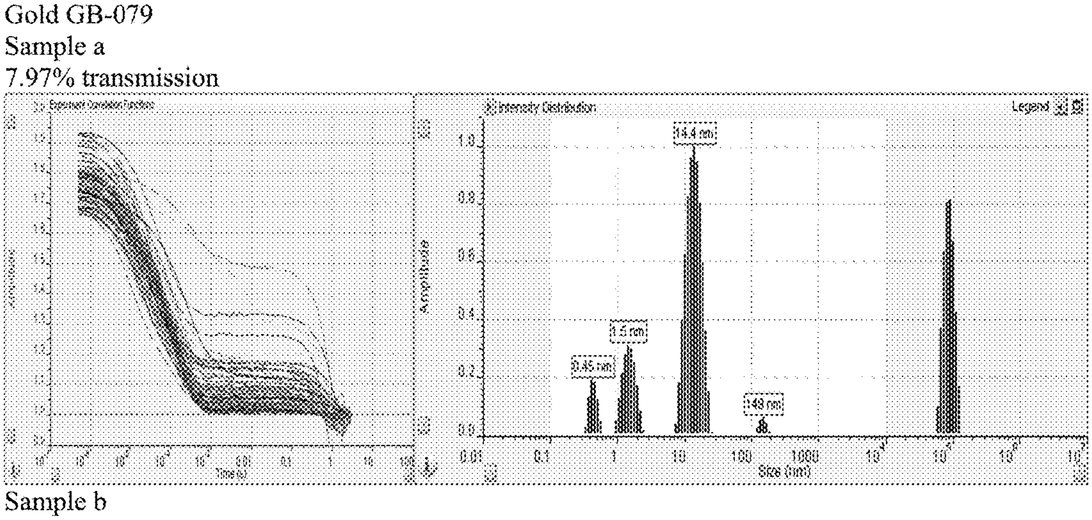
Sample b
5.83% transmission
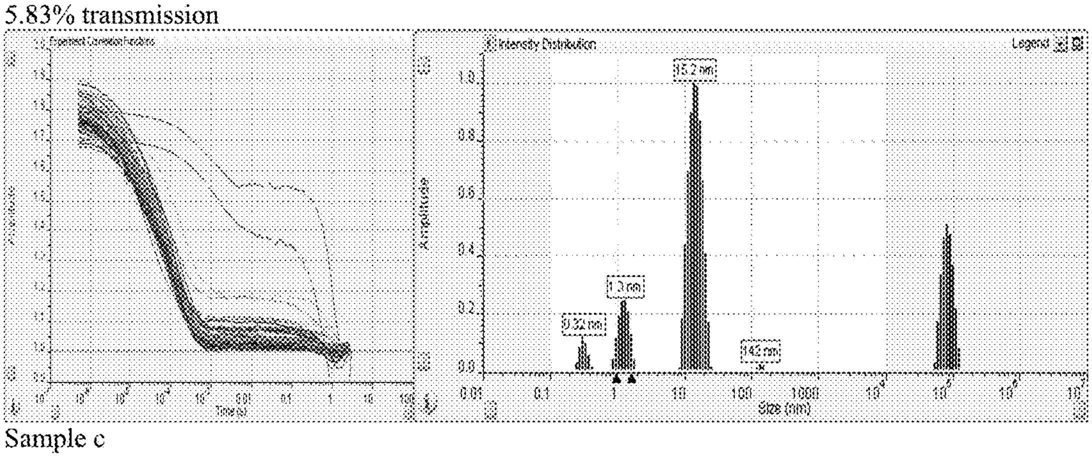
Sample c
6.64% transmission
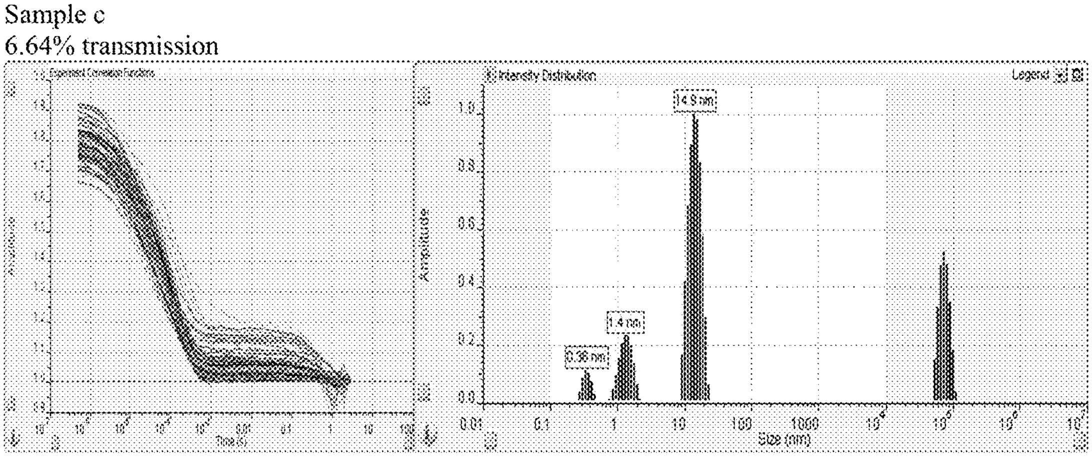
Figure 64c

GB-089

GB-089 TEM Size Distribution

Gold GB-089
Sample a
5.50% transmission
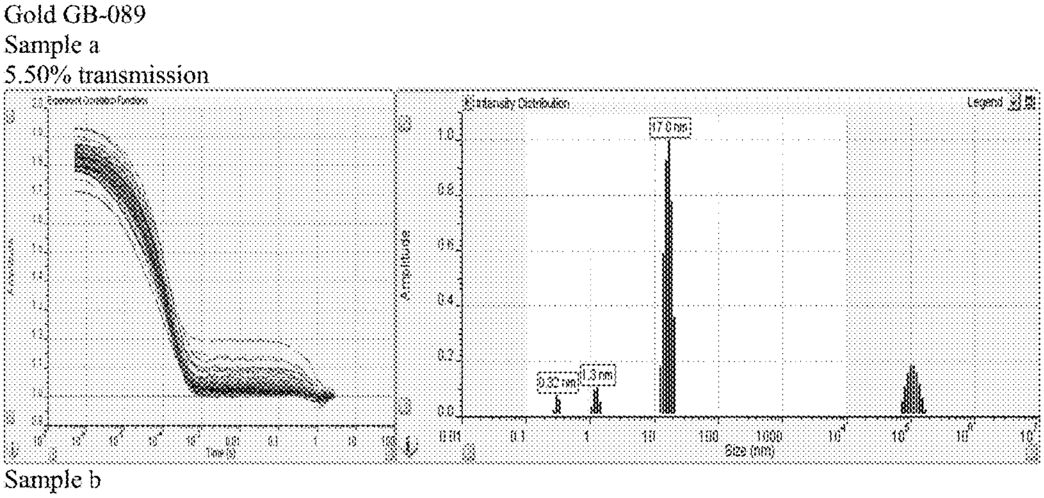
Sample b
6.86% transmission
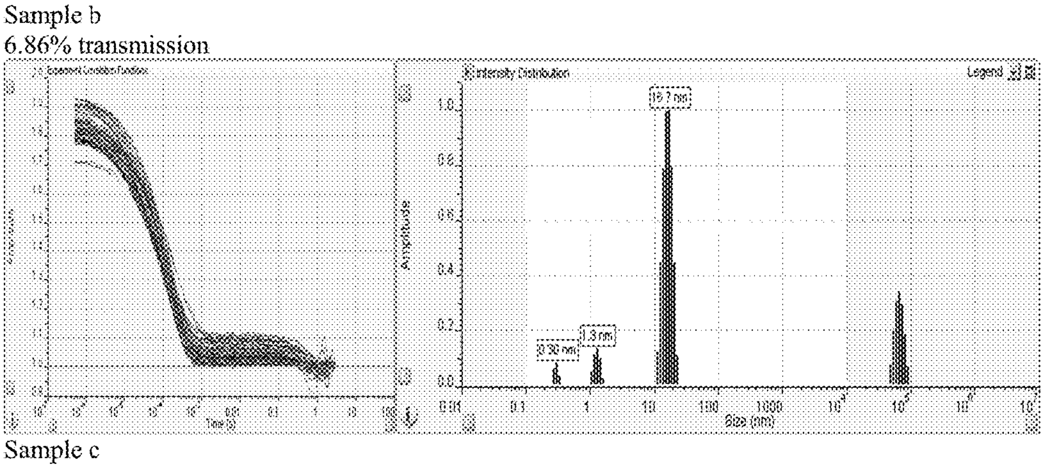
Sample c
5.70% transmission
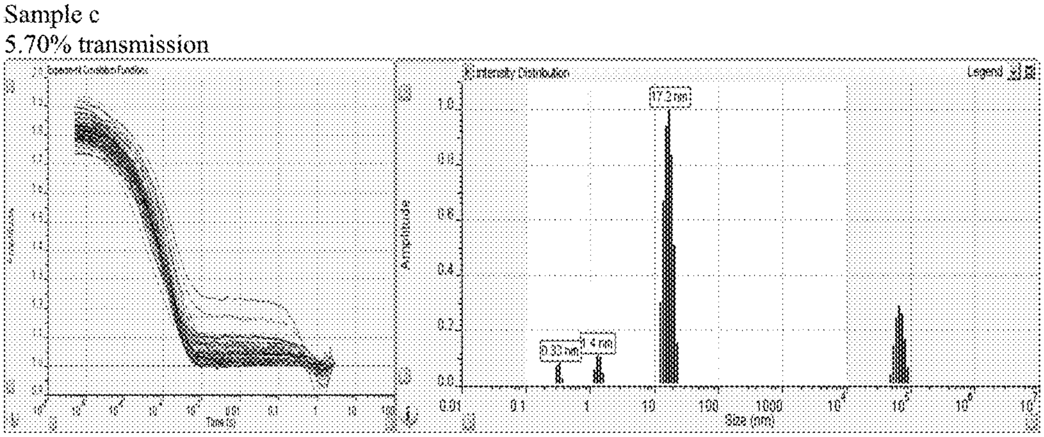
Figure 65c

GB-062

GB-062 TEM Size Distribution

Gold GB-62
Sample a
2.2888% transmission

Sample b
2.7411% transmission

Sample c
2.0627% transmission

GB-076

GB-076 TEM Size Distribution

Gold GB-076
Sample a
100.0000% transmission
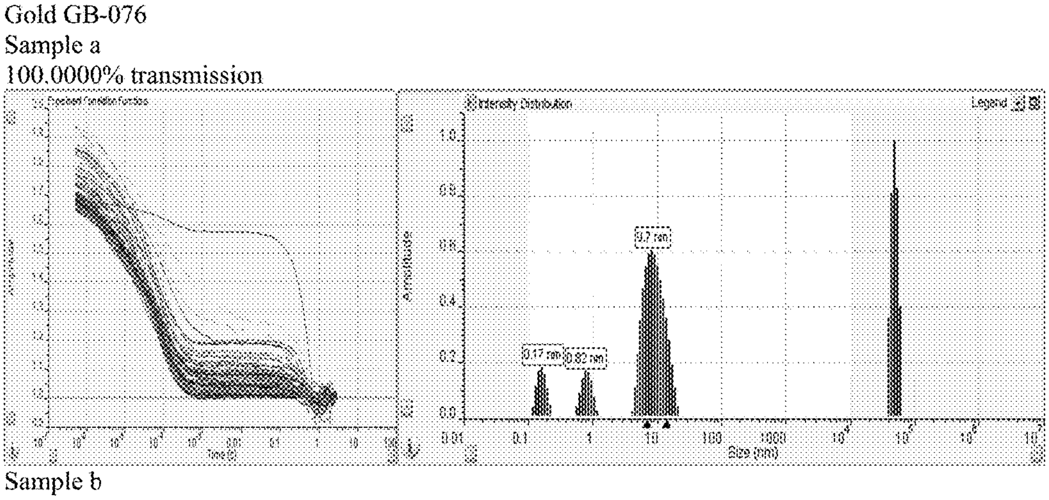
Sample b
53.8000% transmission
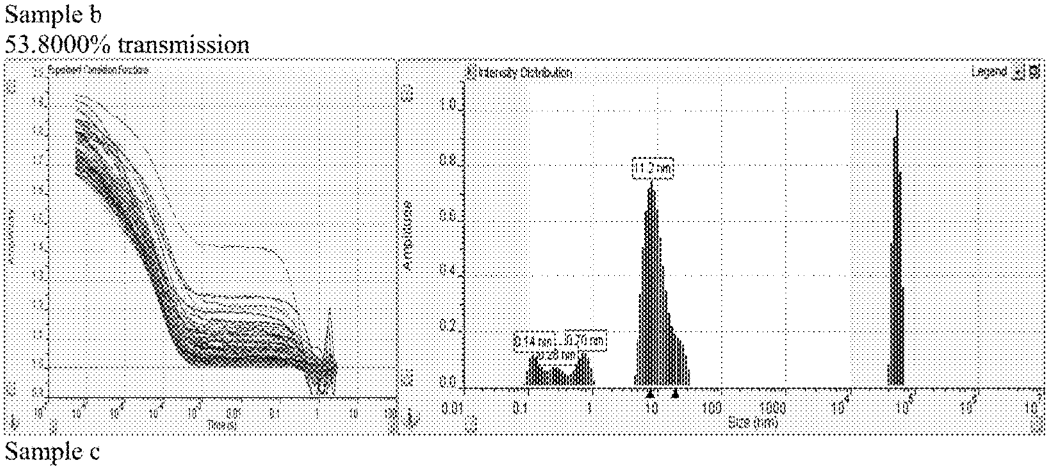
Sample c
63.6000% transmission
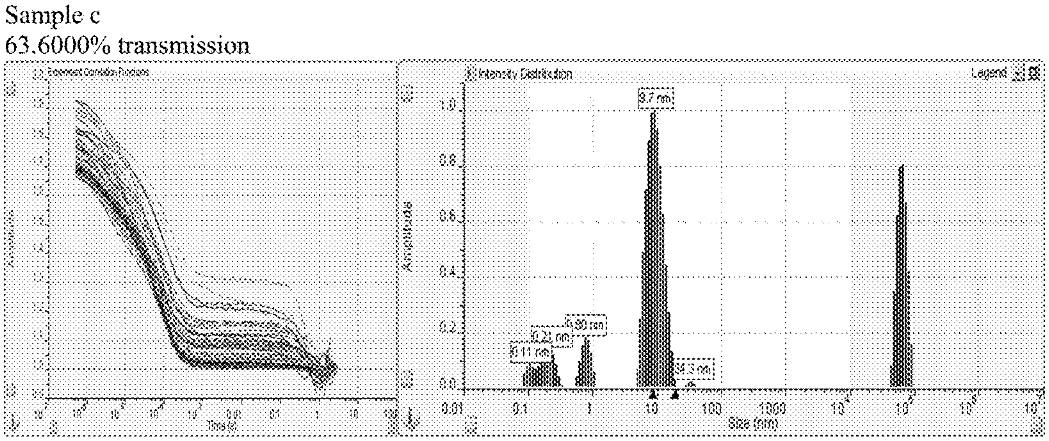
Figure 67c GB-077 TEM Size Distribution Gold GB-077
Sample a
25.0000% transmission
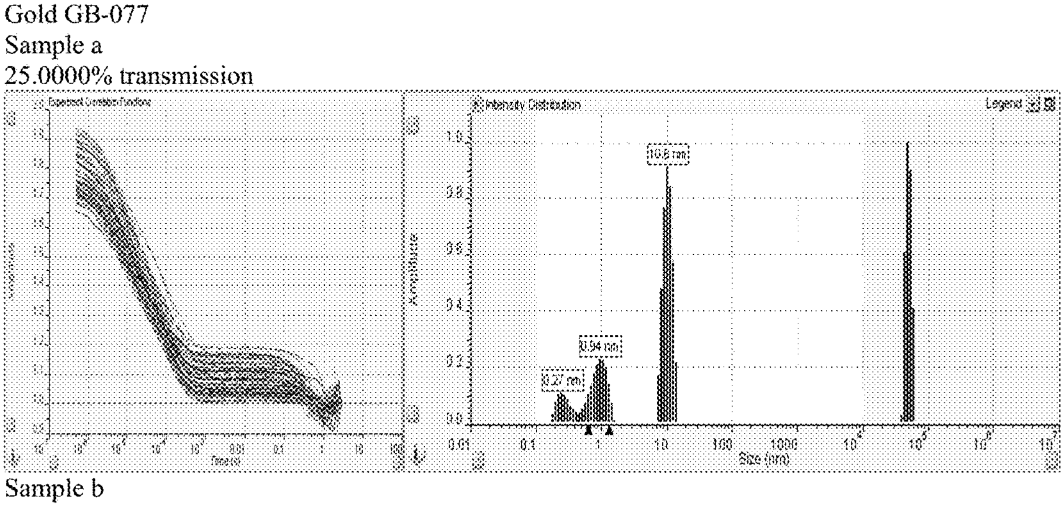
Sample b
15.1000% transmission
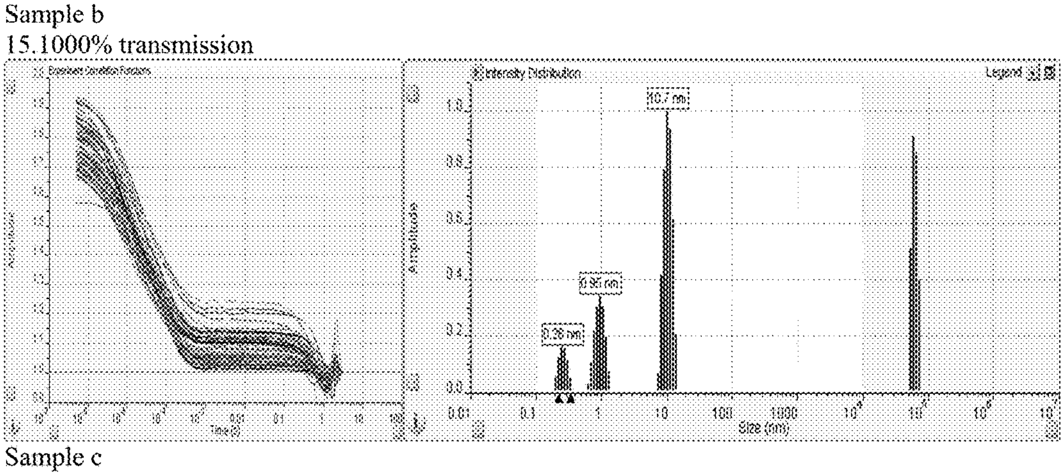
Sample c
20.0000% transmission
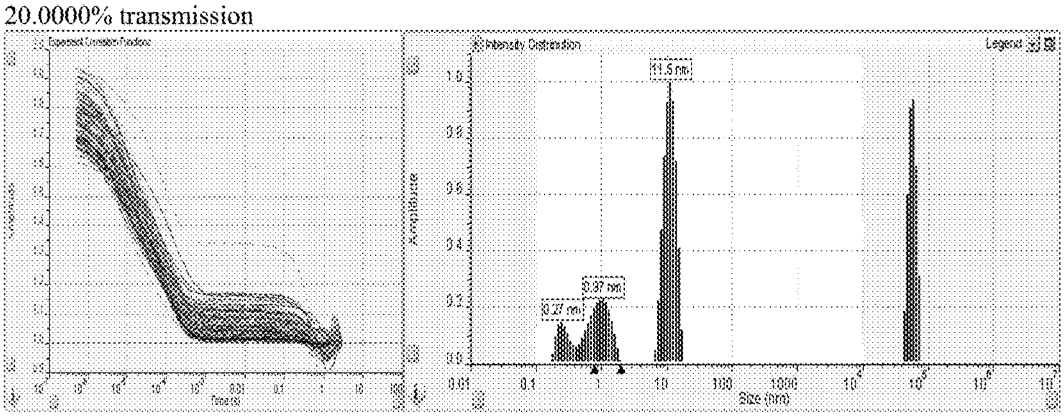
Figure 68c Aurora-020

Aurora-020 TEM Size Distribution

Gold Aurora-020
Sample a
0.1% transmission
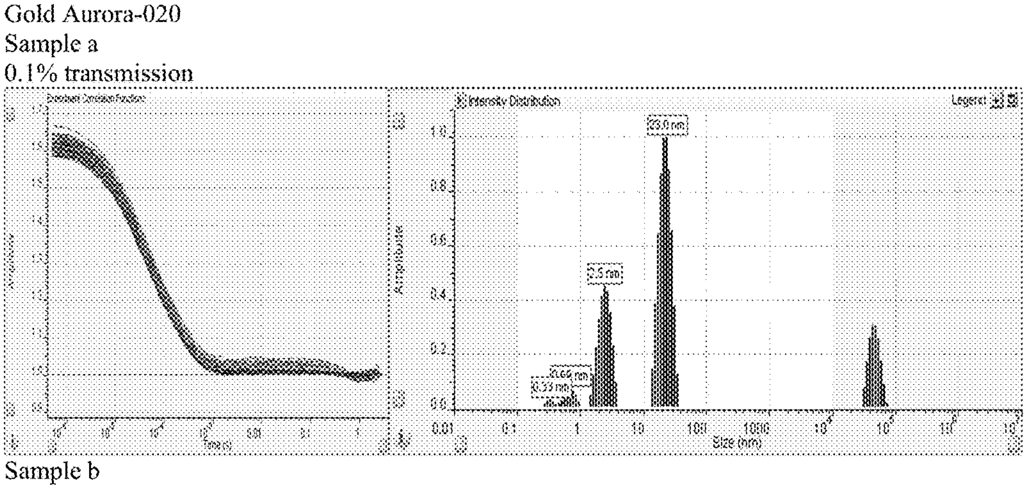
Sample b
0.0724% transmission
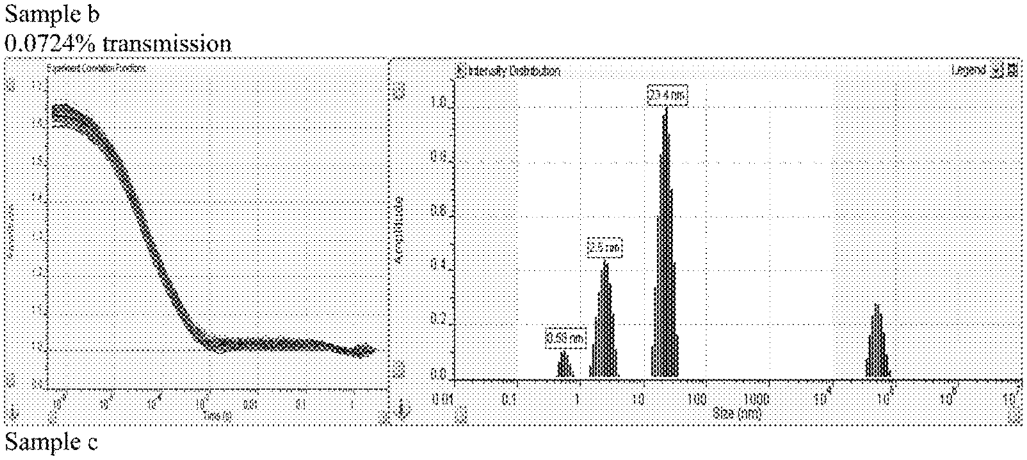
Sample c
0.0710% transmission
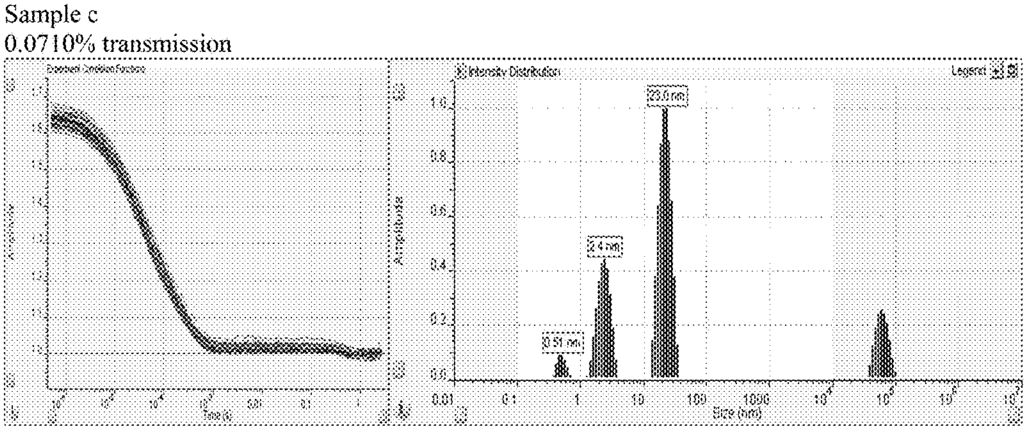
Figure 69c

GA-002

GA-002 TEM Size Distribution

Gold GA-002
Sample a
16.8% transmission
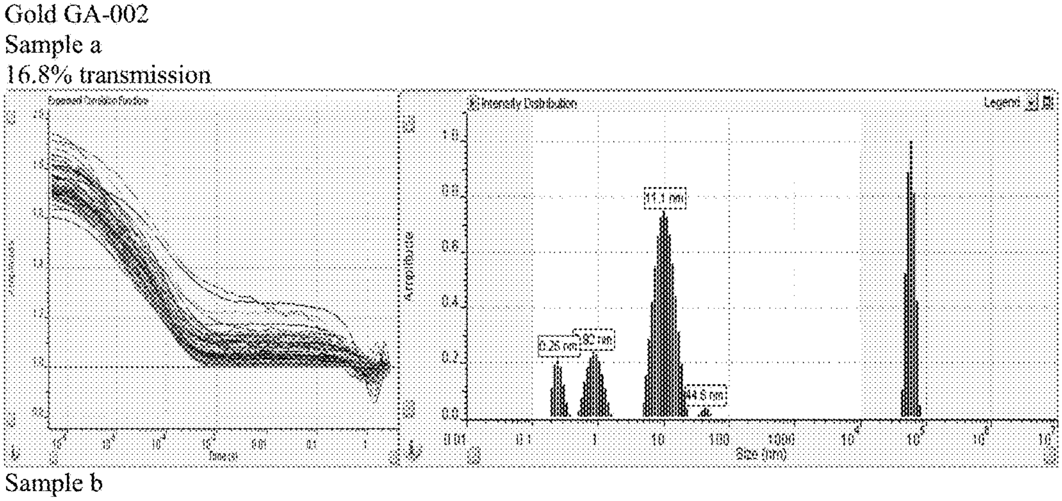
Sample b
14.1% transmission
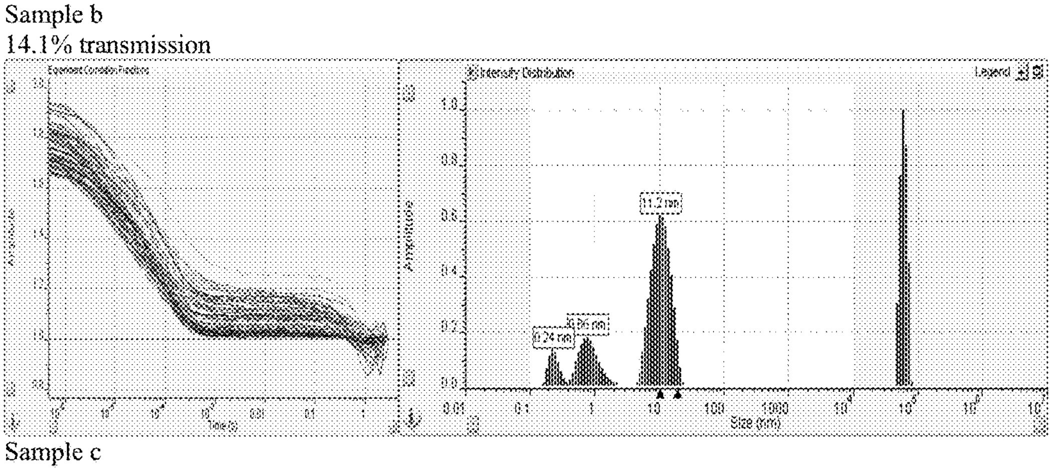
Sample c
16.5594% transmission
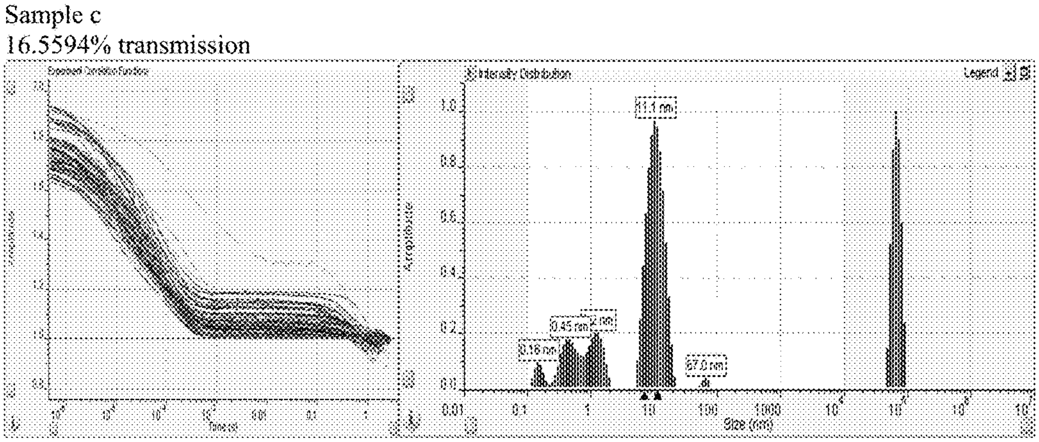
Figure 70c

GA-003

GA-003 TEM Size Distribution

Gold GA-003
Sample a
11.70% transmission
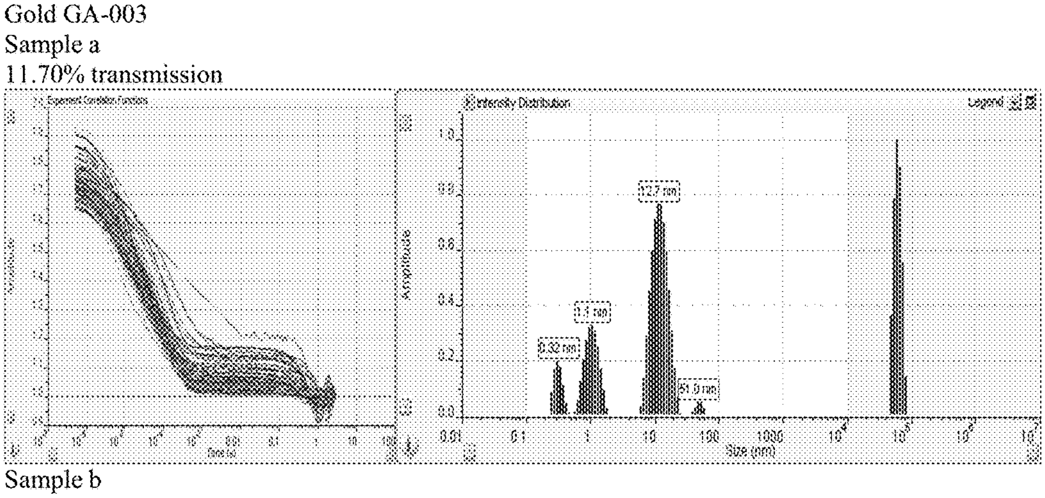
Sample b
10.40% transmission
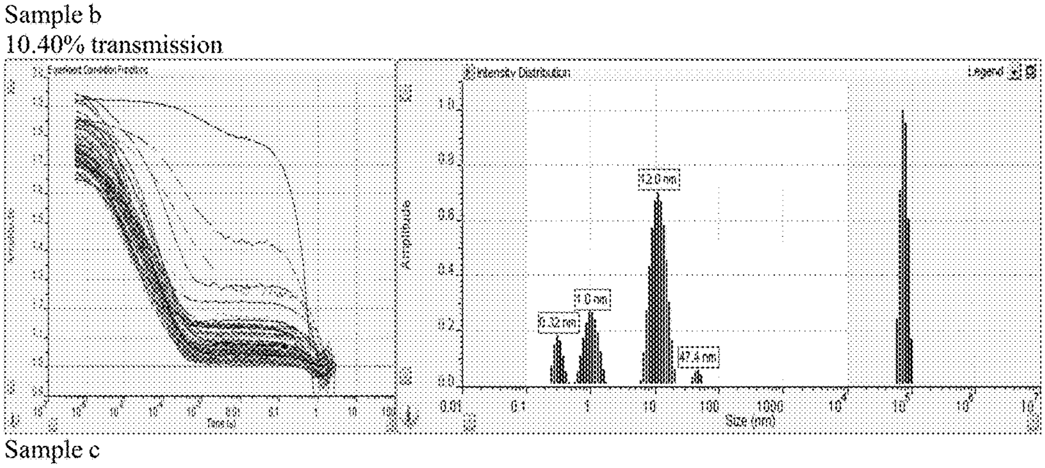
Sample c
7.95% transmission
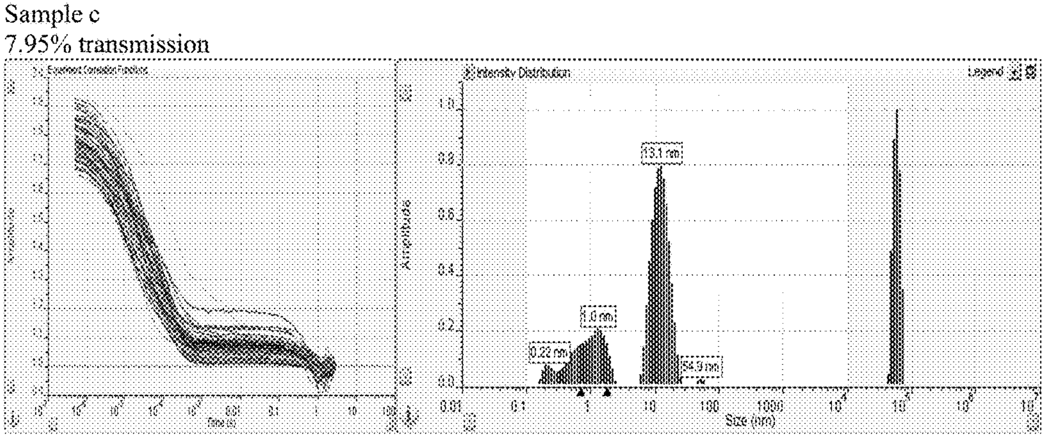
Figure 71c

GA-004

GA-004 TEM Size Distribution

Gold GA-004
Sample a
7.3676% transmission
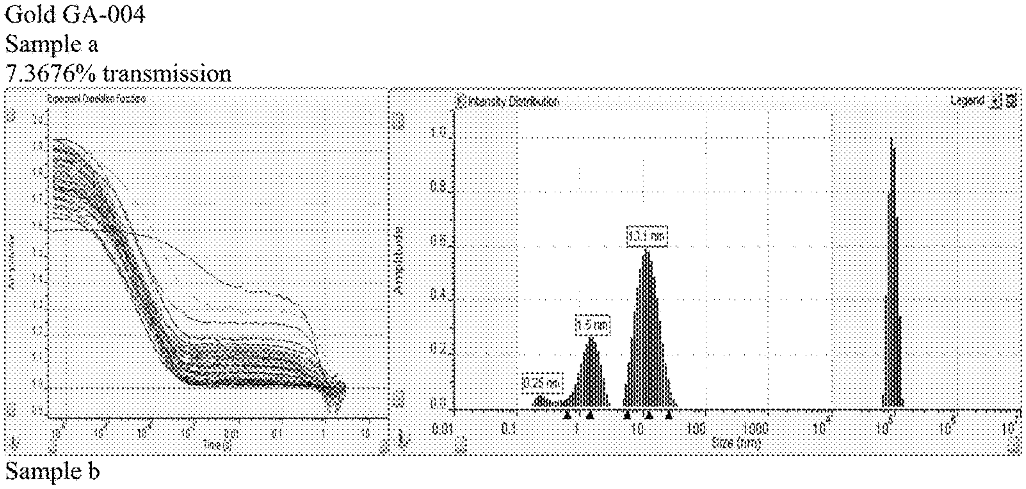
Sample b
13.1% transmission
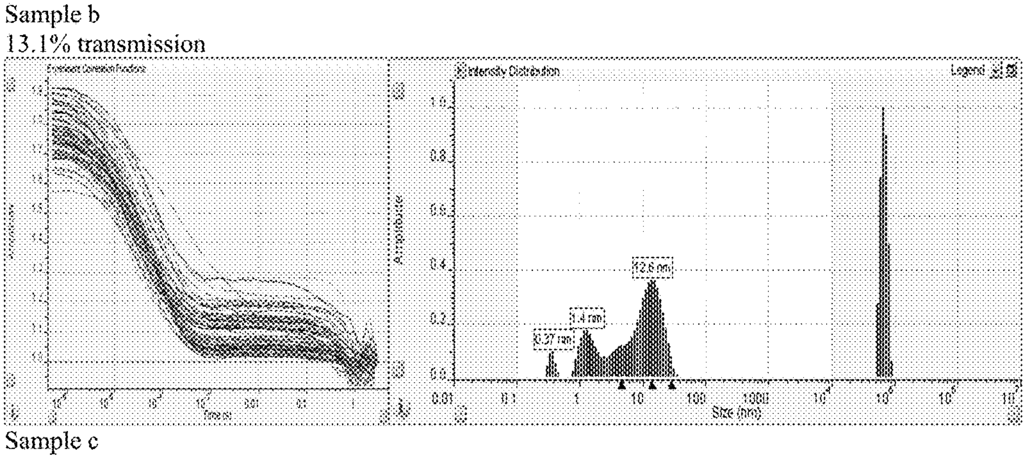
Sample c
8.43% transmission
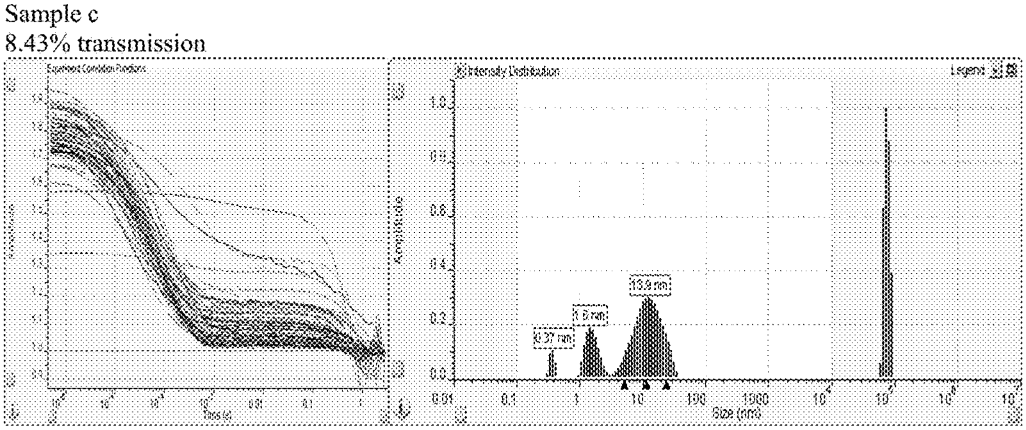
Figure 72c

GA-005

GA-005 TEM Size Distribution

Gold GA-005
Sample a
8.2404% transmission
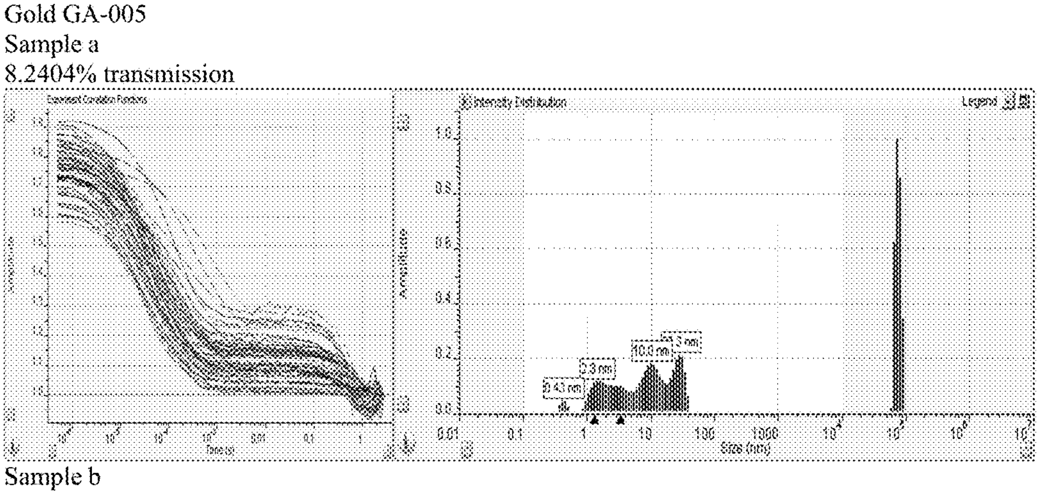
Sample b
2.0946% transmission
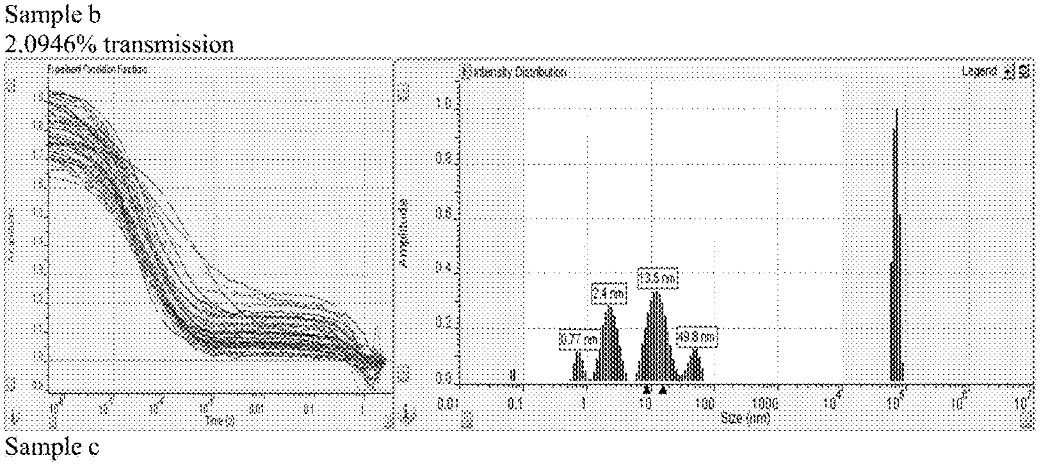
Sample c
3.6085% transmission
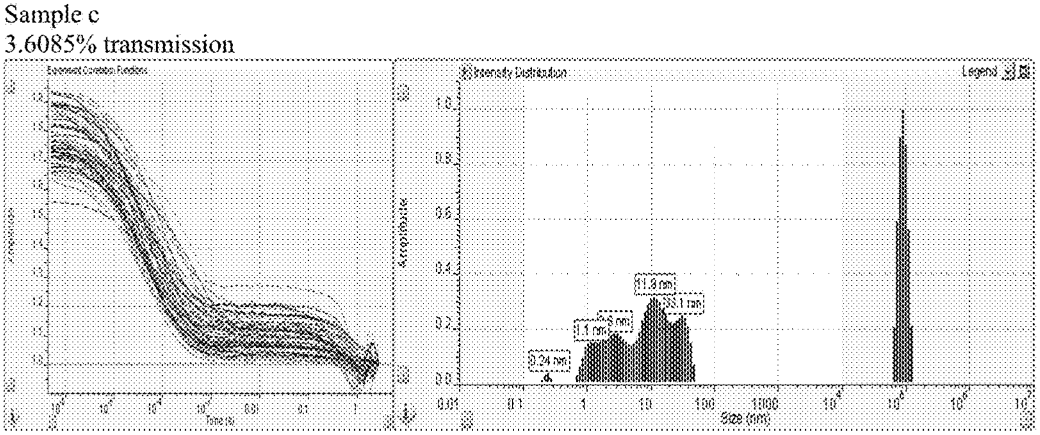
Figure 73c

GA-009

GA-009 TEM Size Distribution

Gold GA-009
Sample a
19.8538% transmission
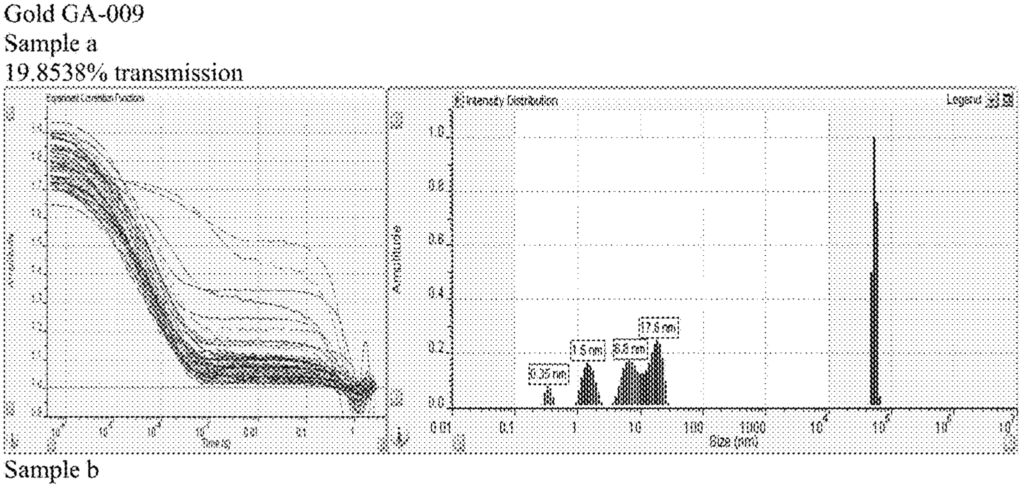
Sample b
26.925% transmission
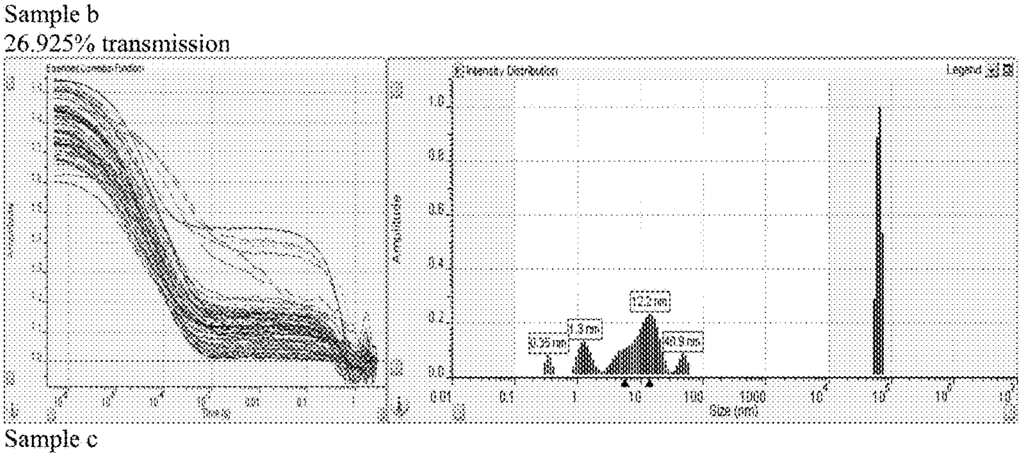
Sample c
13.8101% transmission
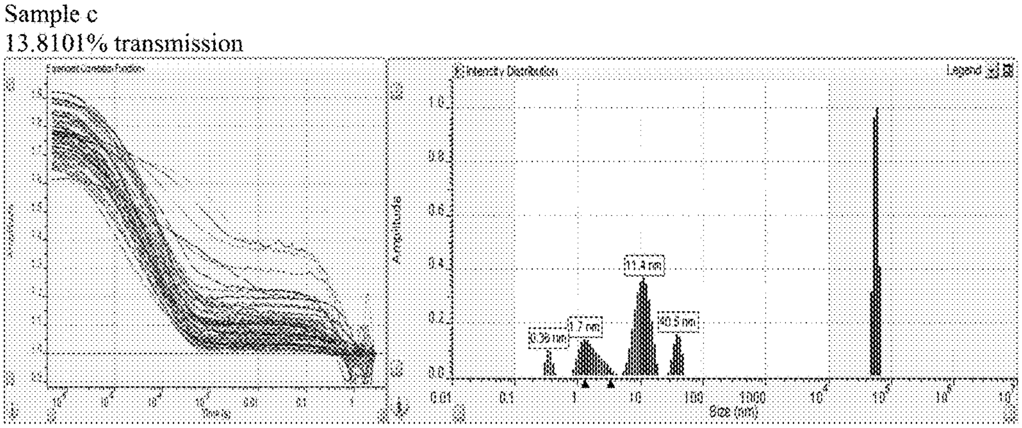
Figure 74c

GA-011

GA-011 TEM Size Distribution

Gold GA-011
Sample a
2.4185% transmission
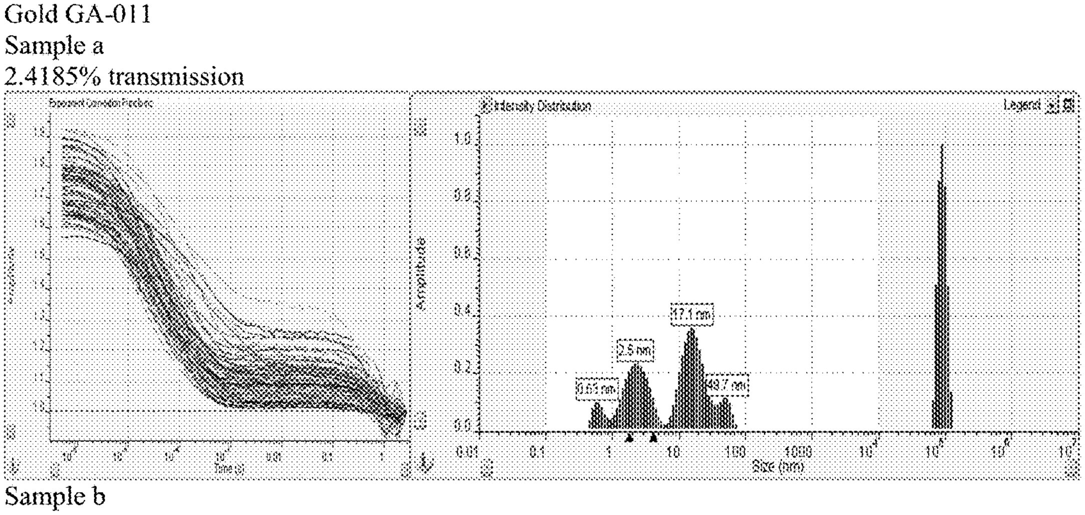
Sample b
4.3245% transmission
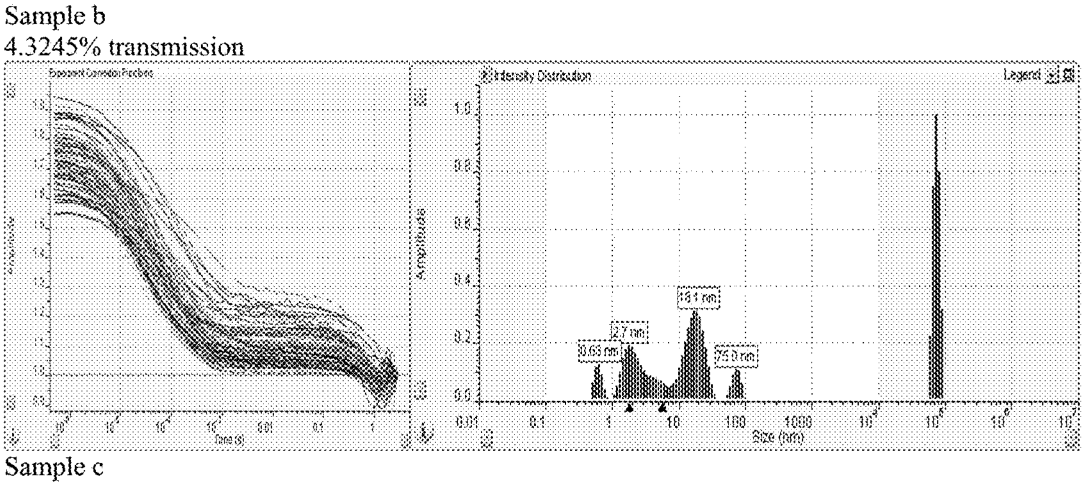
Sample c
1.16% transmission
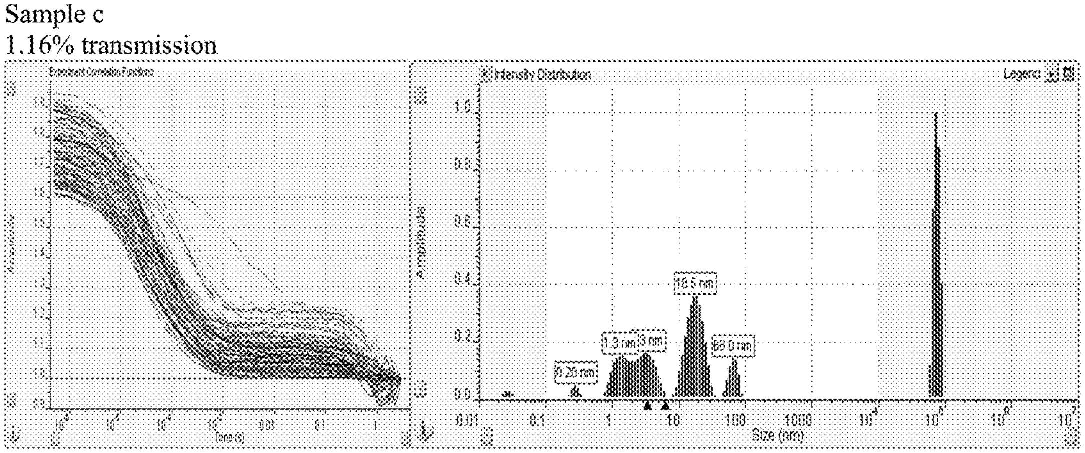
Figure 75c

GA-013

GA-013 TEM Size Distribution

Gold GA-013

Sample a 14.4000% transmission

Sample b 5.0000% transmission

Sample c 14.700% transmission

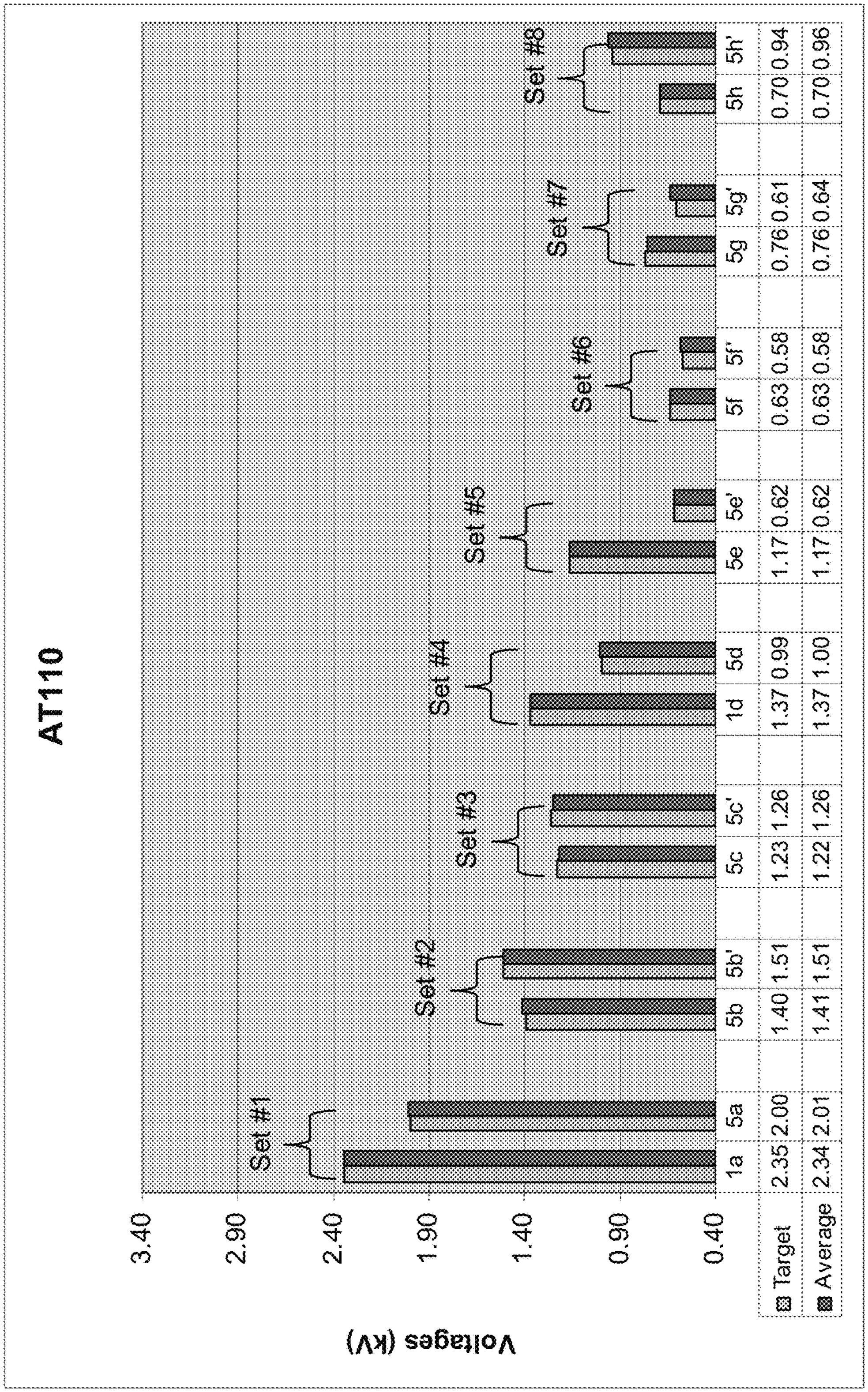
Figure 77a: Cold (2°C) Input Water

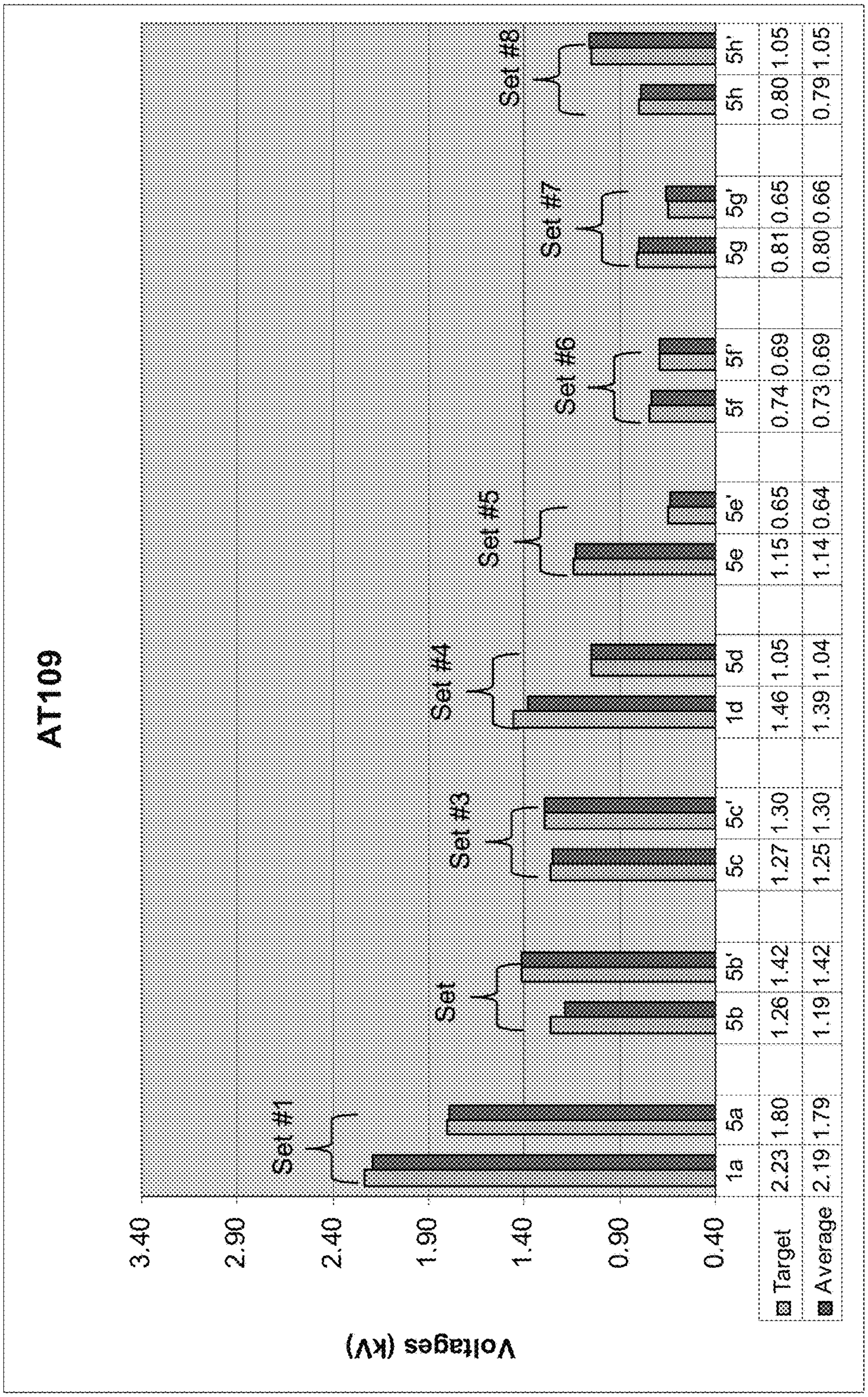
Figure 77b: RT (21°C) Input Water

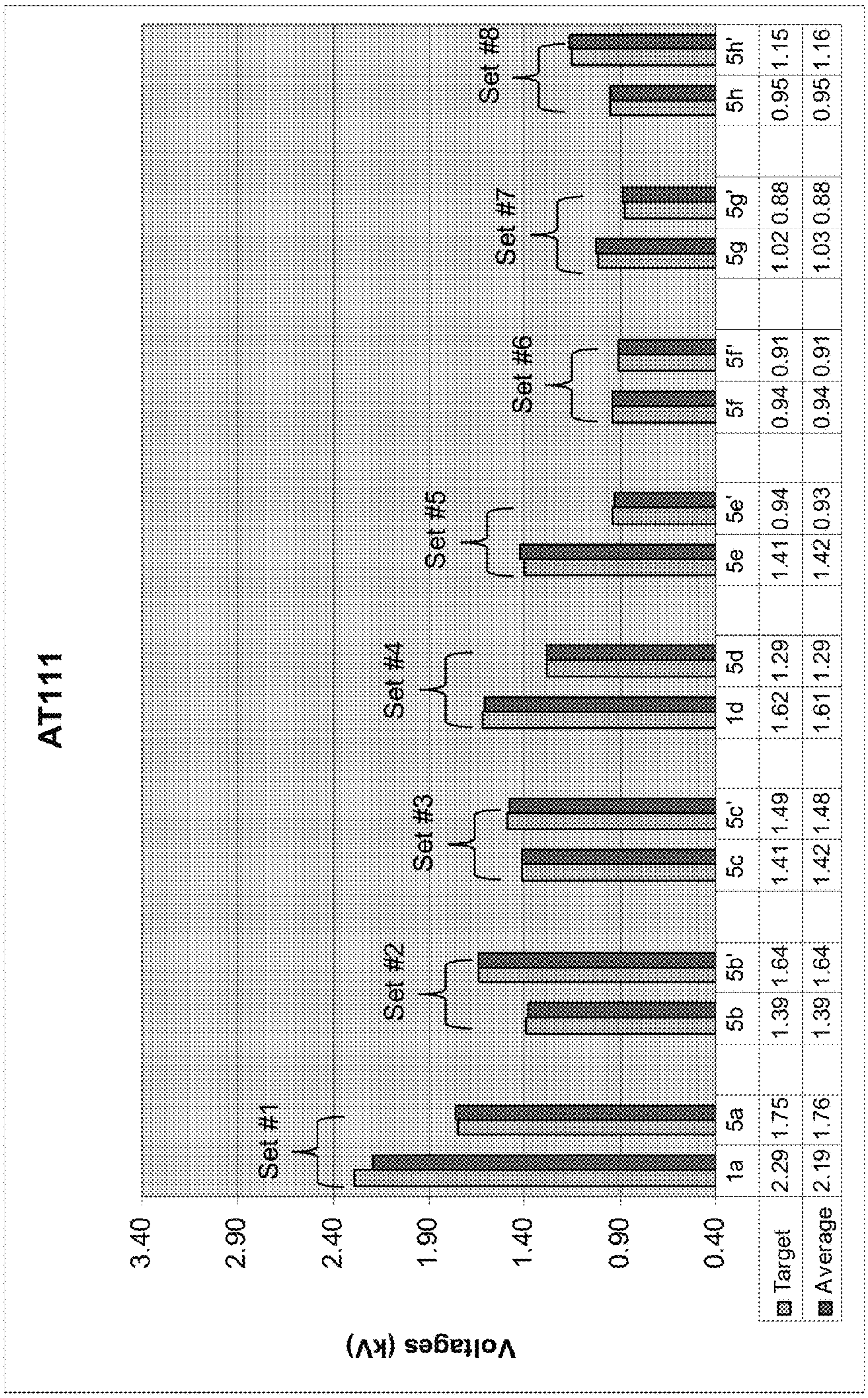
Figure 77c: Hot (68°C) Input Water

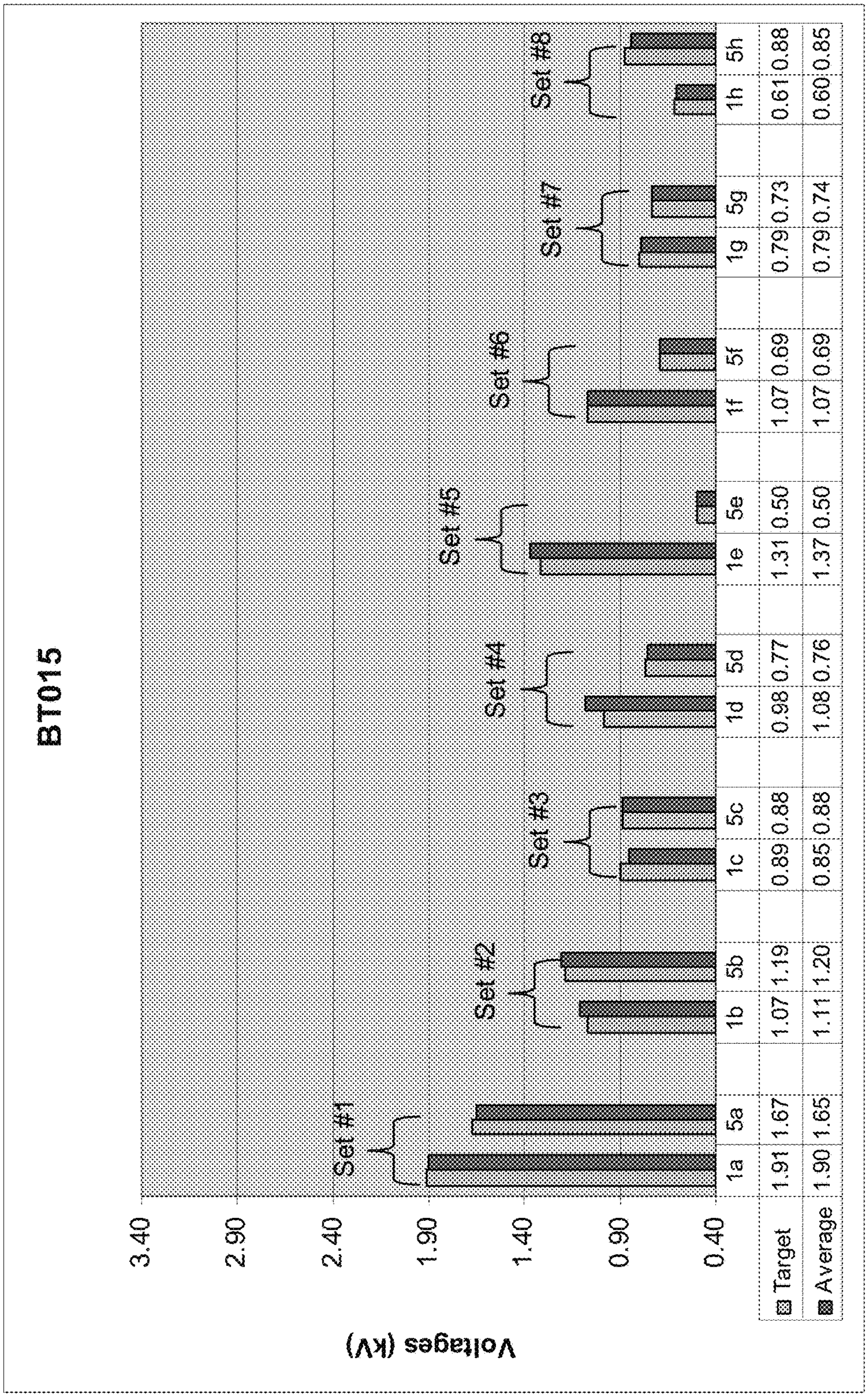
Figure 77d: Cold (2 °C) Input Water

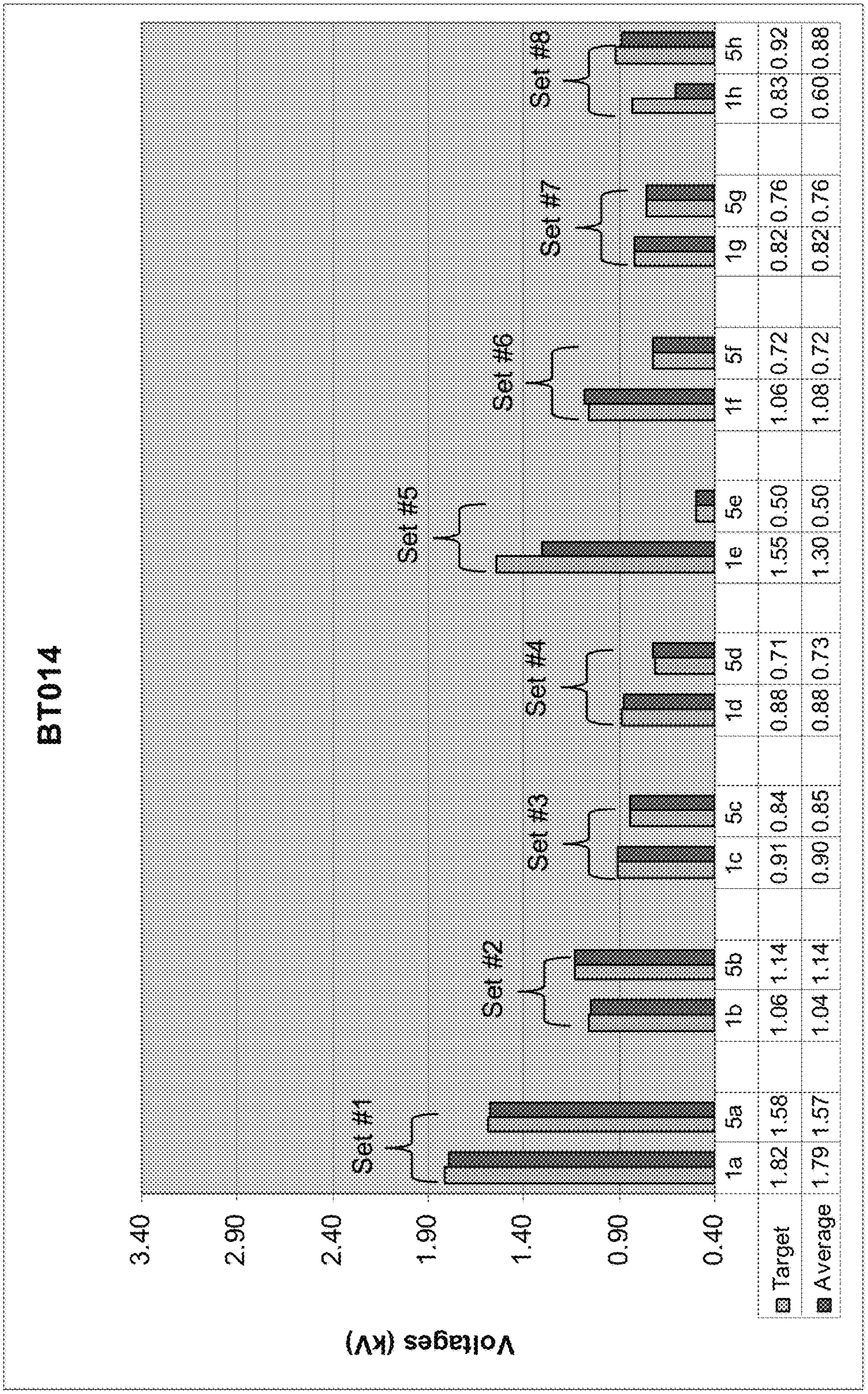
Figure 77e: RT (21 °C) Input Water

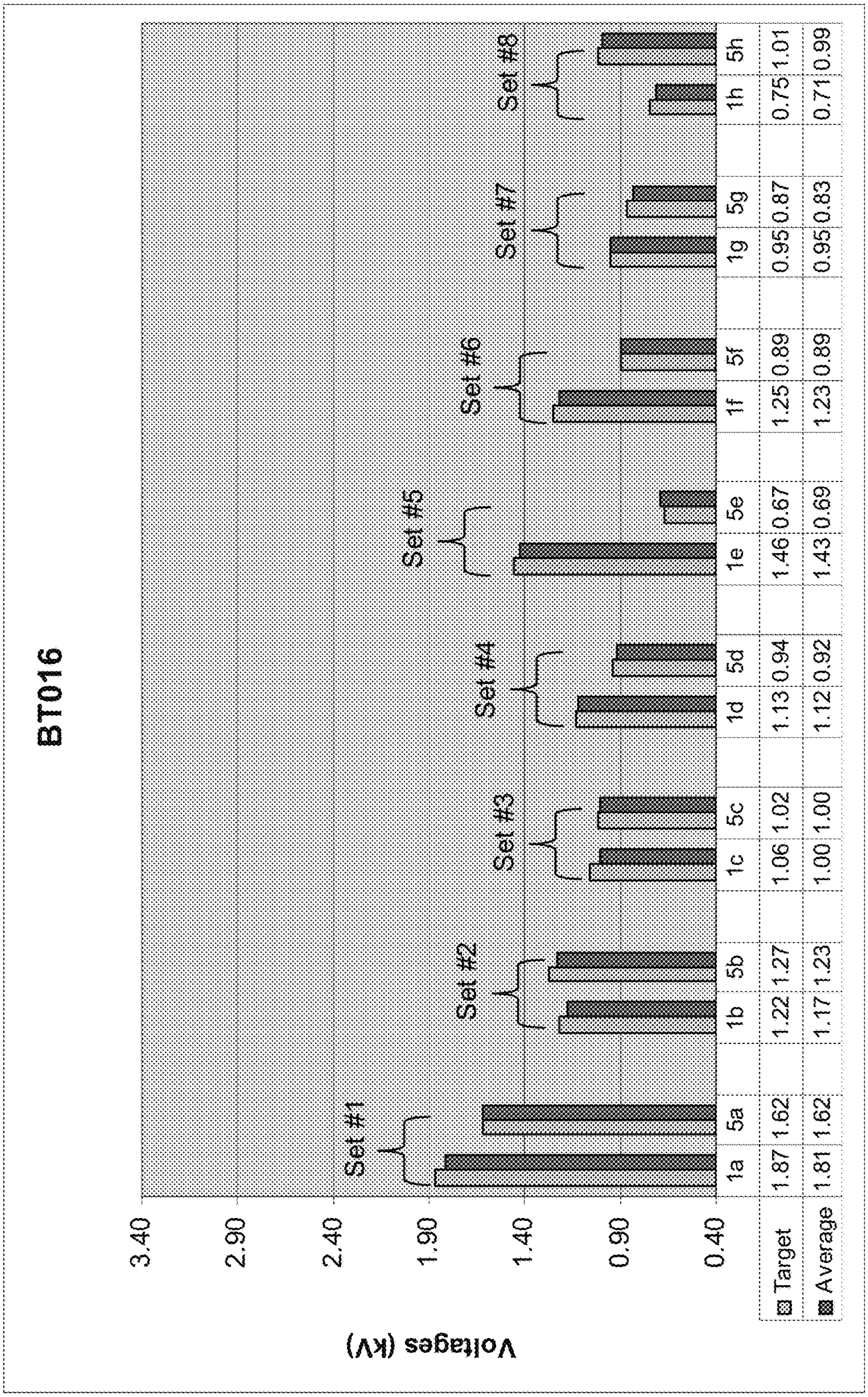
Figure 77f: Cold (66 °C) Input Water

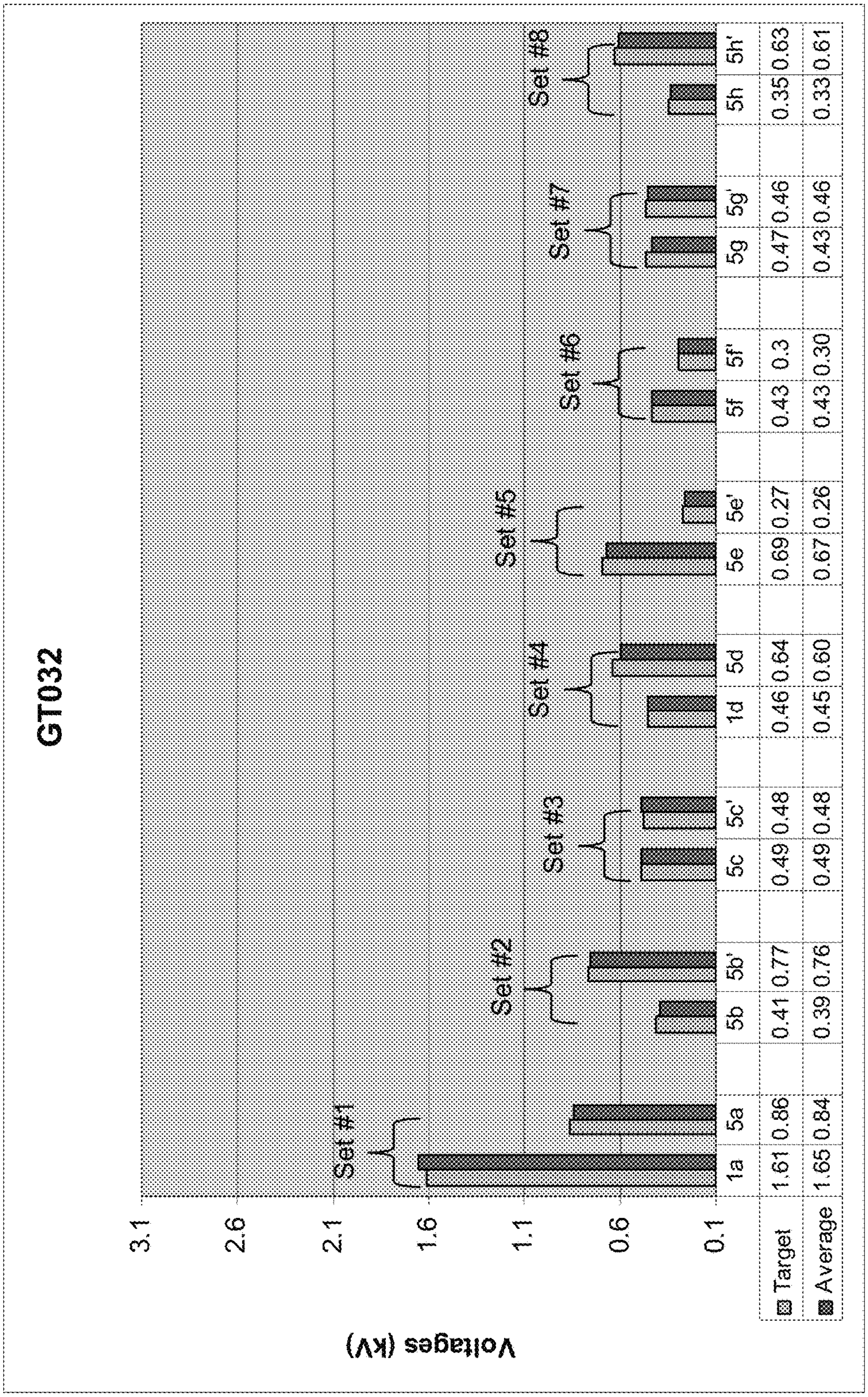
| | 1a | 5a | 5b | 5b' | 5c | 5c' | 1d | 5d | 5e | 5e' | 5f | 5f' | 5g | 5g' | 5h | 5h' |
|---|---|---|---|---|---|---|---|---|---|---|---|---|---|---|---|---|
| Target | 1.61 | 0.86 | 0.41 | 0.77 | 0.49 | 0.48 | 0.46 | 0.64 | 0.69 | 0.27 | 0.43 | 0.3 | 0.47 | 0.46 | 0.35 | 0.63 |
| Average | 1.65 | 0.84 | 0.39 | 0.76 | 0.49 | 0.48 | 0.45 | 0.60 | 0.67 | 0.26 | 0.43 | 0.30 | 0.43 | 0.46 | 0.33 | 0.61 |
Figure 78a: Cold (4 °C) Input Water

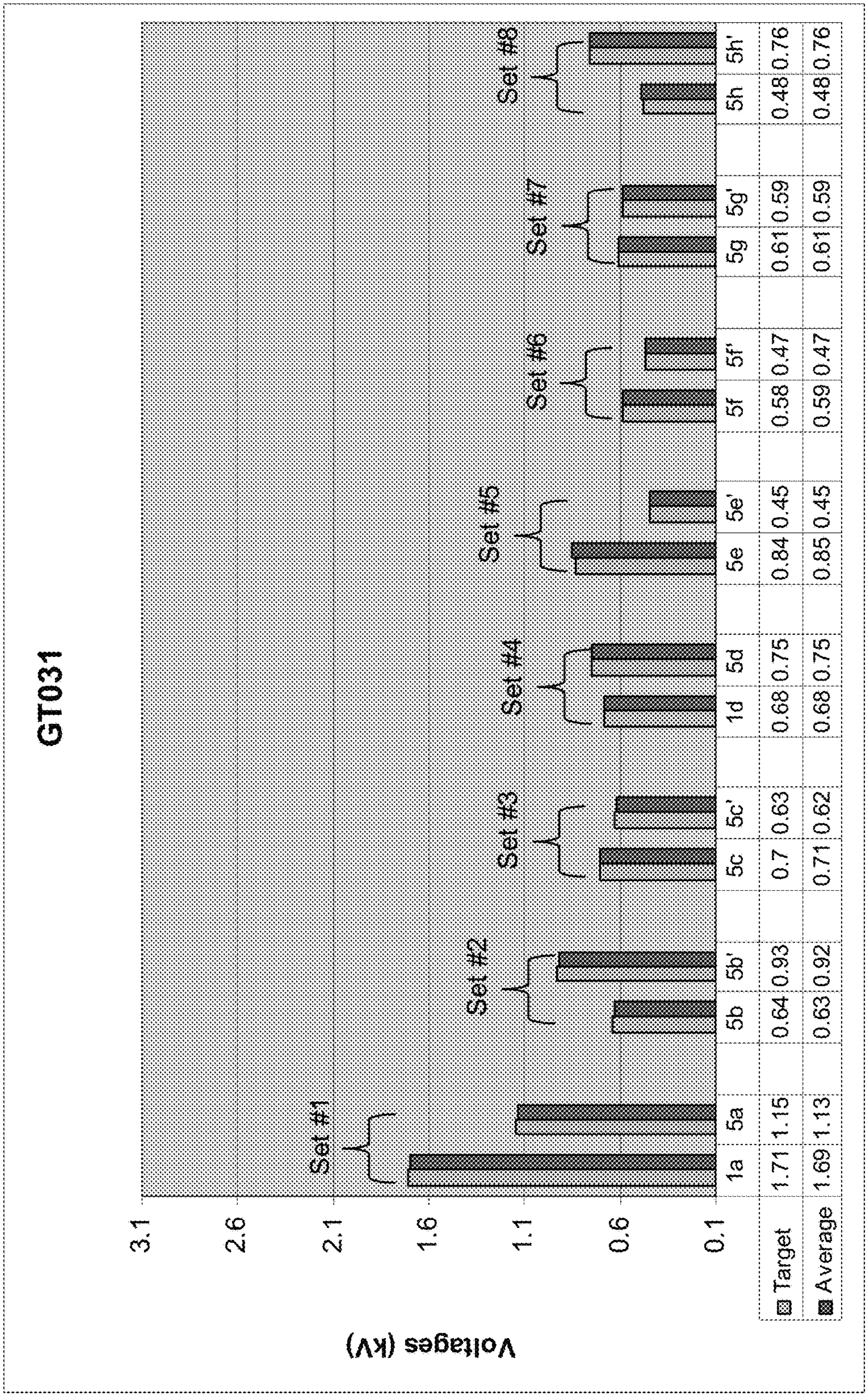
| | 1a | 5a | 5b | 5b' | 5c | 5c' | 1d | 5d | 5e | 5e' | 5f | 5f' | 5g | 5g' | 5h | 5h' |
|---|---|---|---|---|---|---|---|---|---|---|---|---|---|---|---|---|
| Target | 1.71 | 1.15 | 0.64 | 0.93 | 0.7 | 0.63 | 0.68 | 0.75 | 0.84 | 0.45 | 0.58 | 0.47 | 0.61 | 0.59 | 0.48 | 0.76 |
| Average | 1.69 | 1.13 | 0.63 | 0.92 | 0.71 | 0.62 | 0.68 | 0.75 | 0.85 | 0.45 | 0.59 | 0.47 | 0.61 | 0.59 | 0.48 | 0.76 |
Figure 78b: Soda ($NaHCO_3$) (38.3 mg/L)

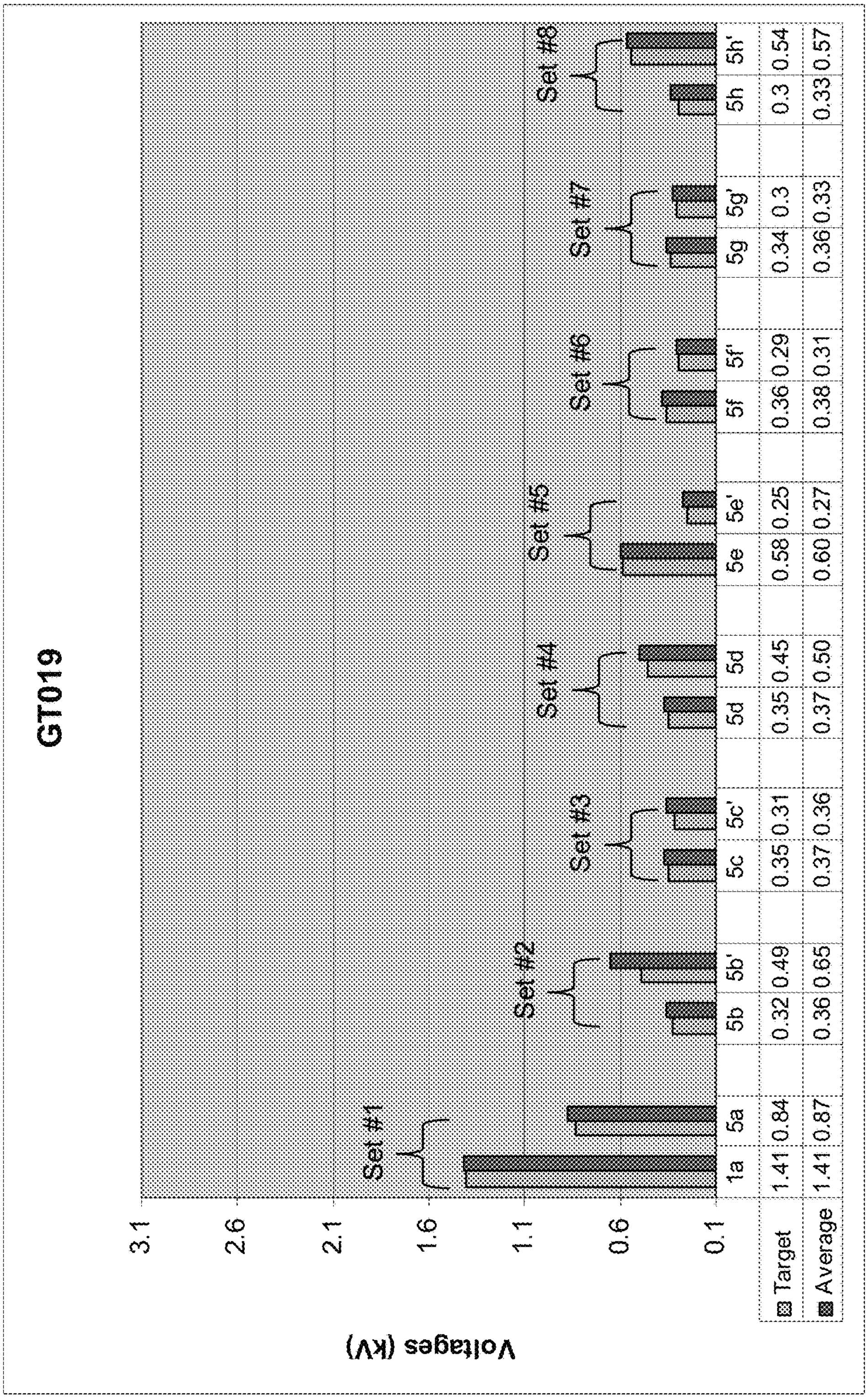
Figure 78c: NaCl (45mg/L)

Figure 81 a. Ag Electrode Plasma Irradiance
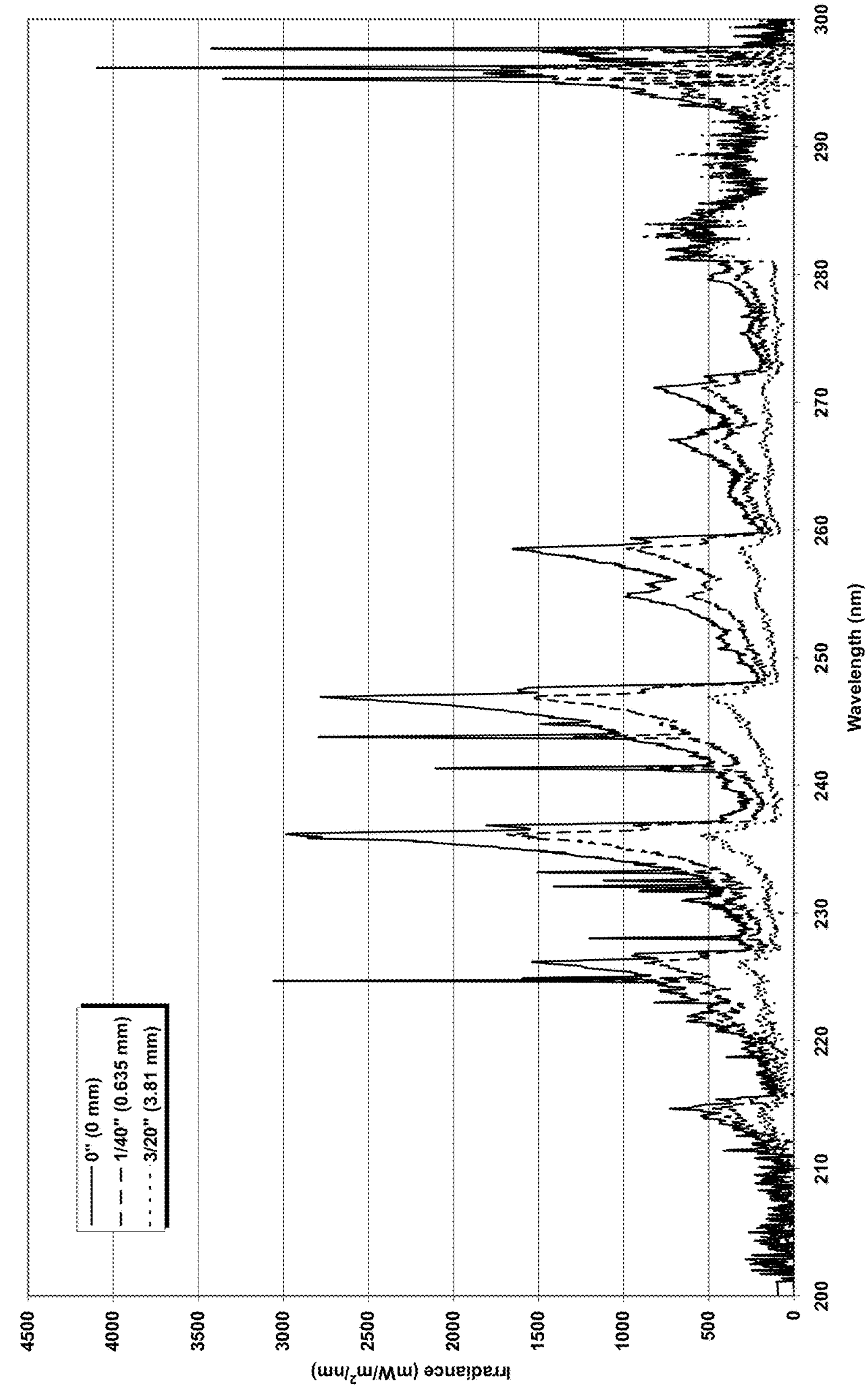

Figure 81 b. Ag Electrode Plasma Irradiance
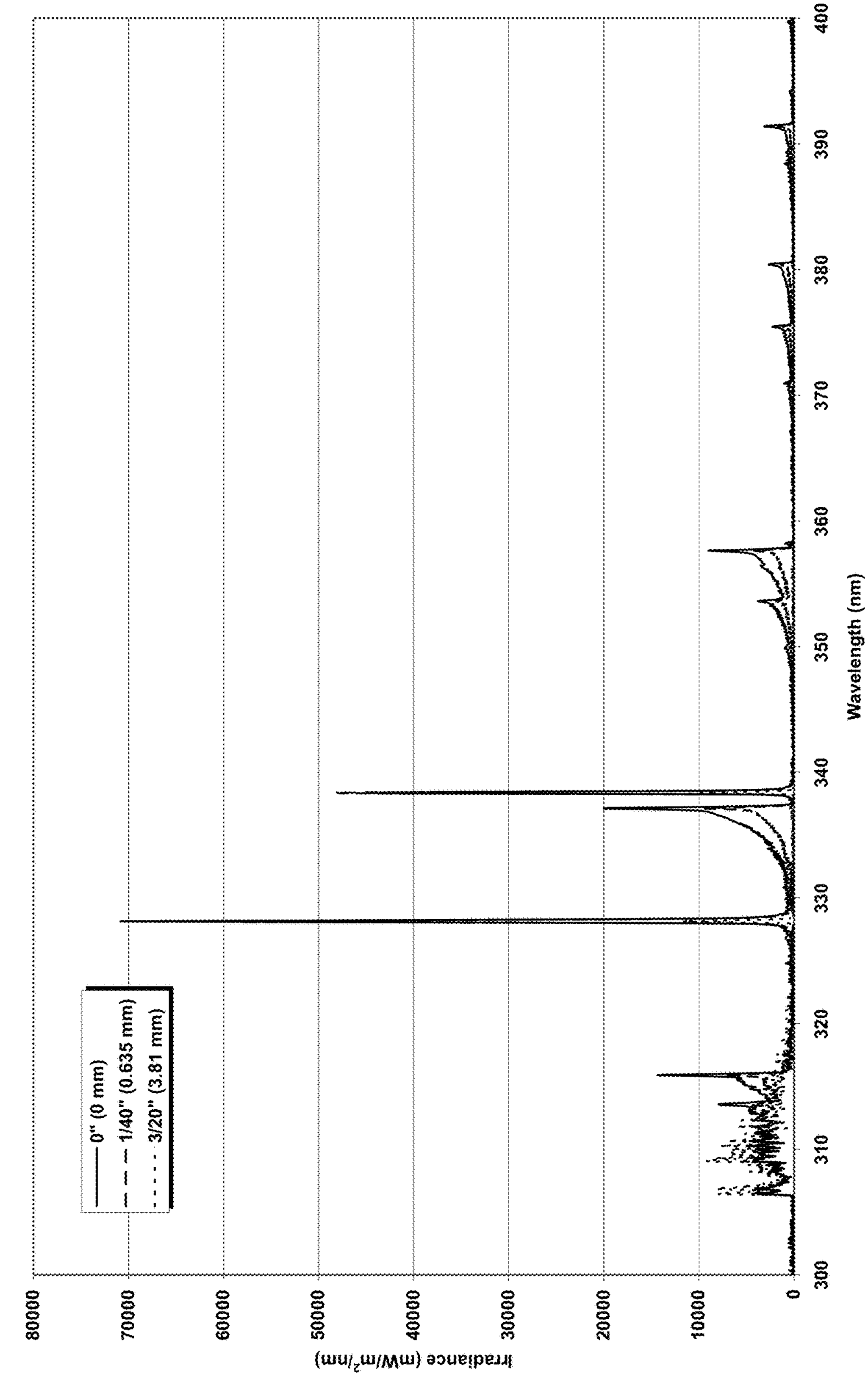

Figure 81 c. Ag Electrode Plasma Irradiance
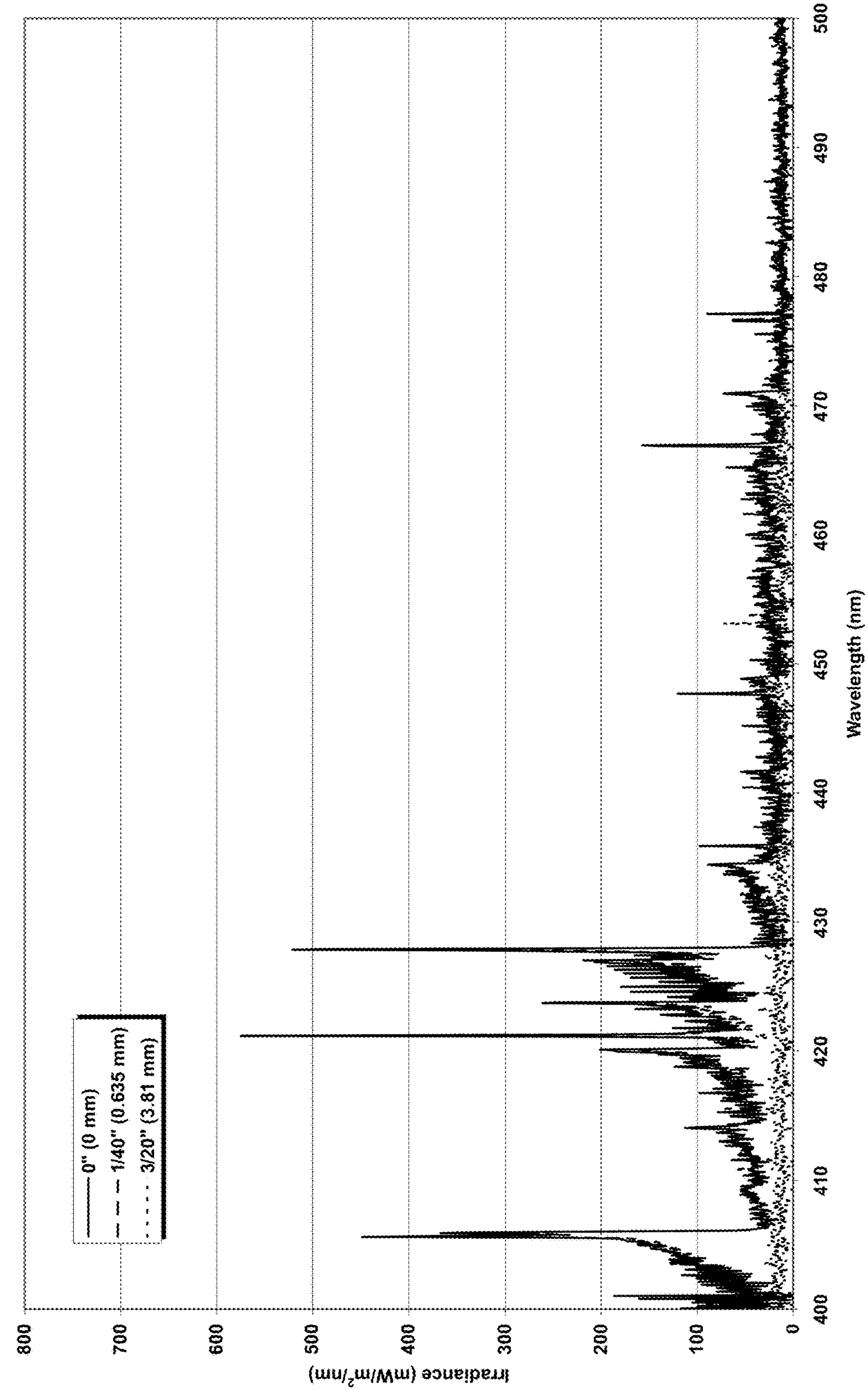

Figure 81 d. Ag II ($Ag^+$) Spectra
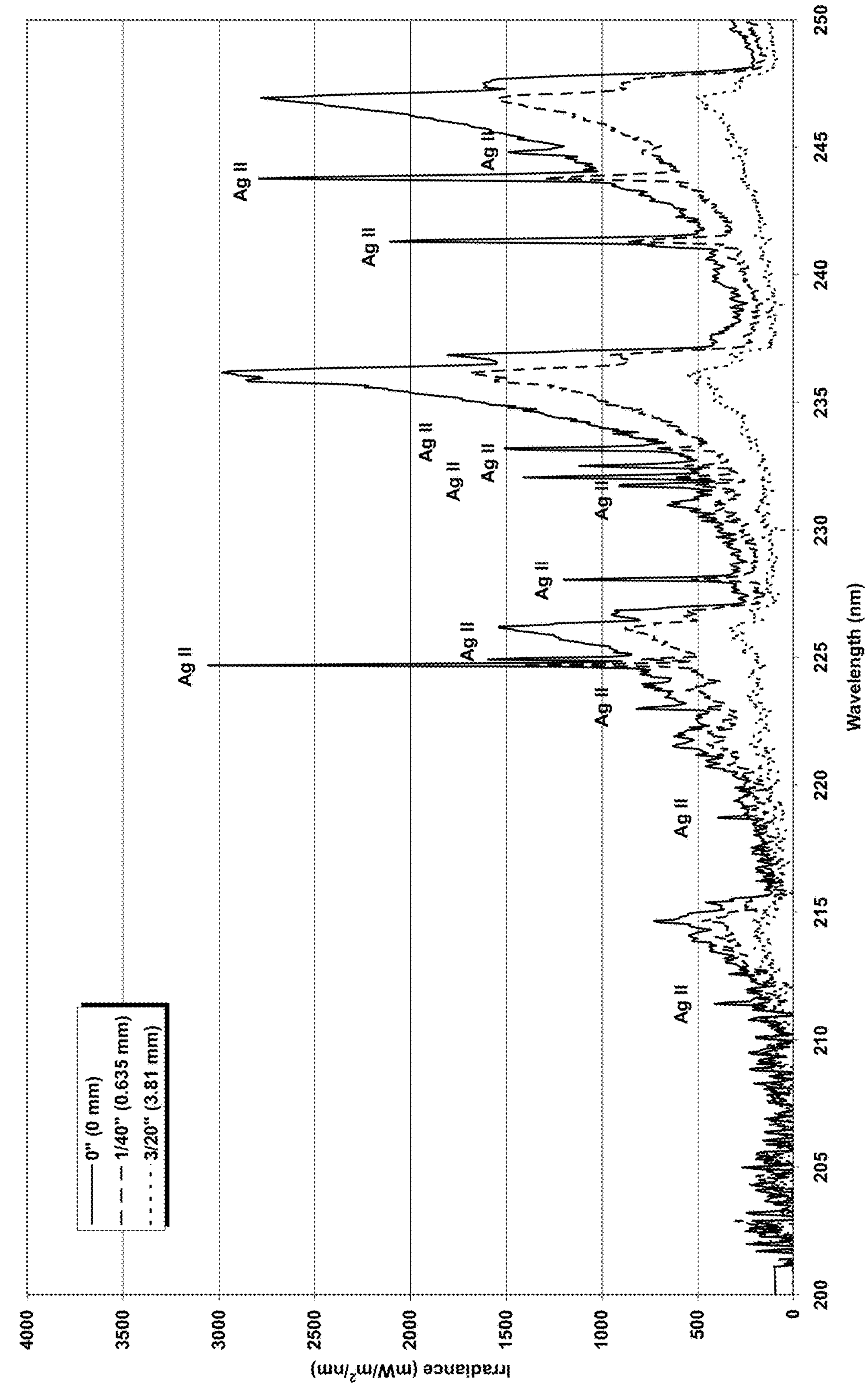

Figure 82 a. Au Electrode Plasma Irradiance
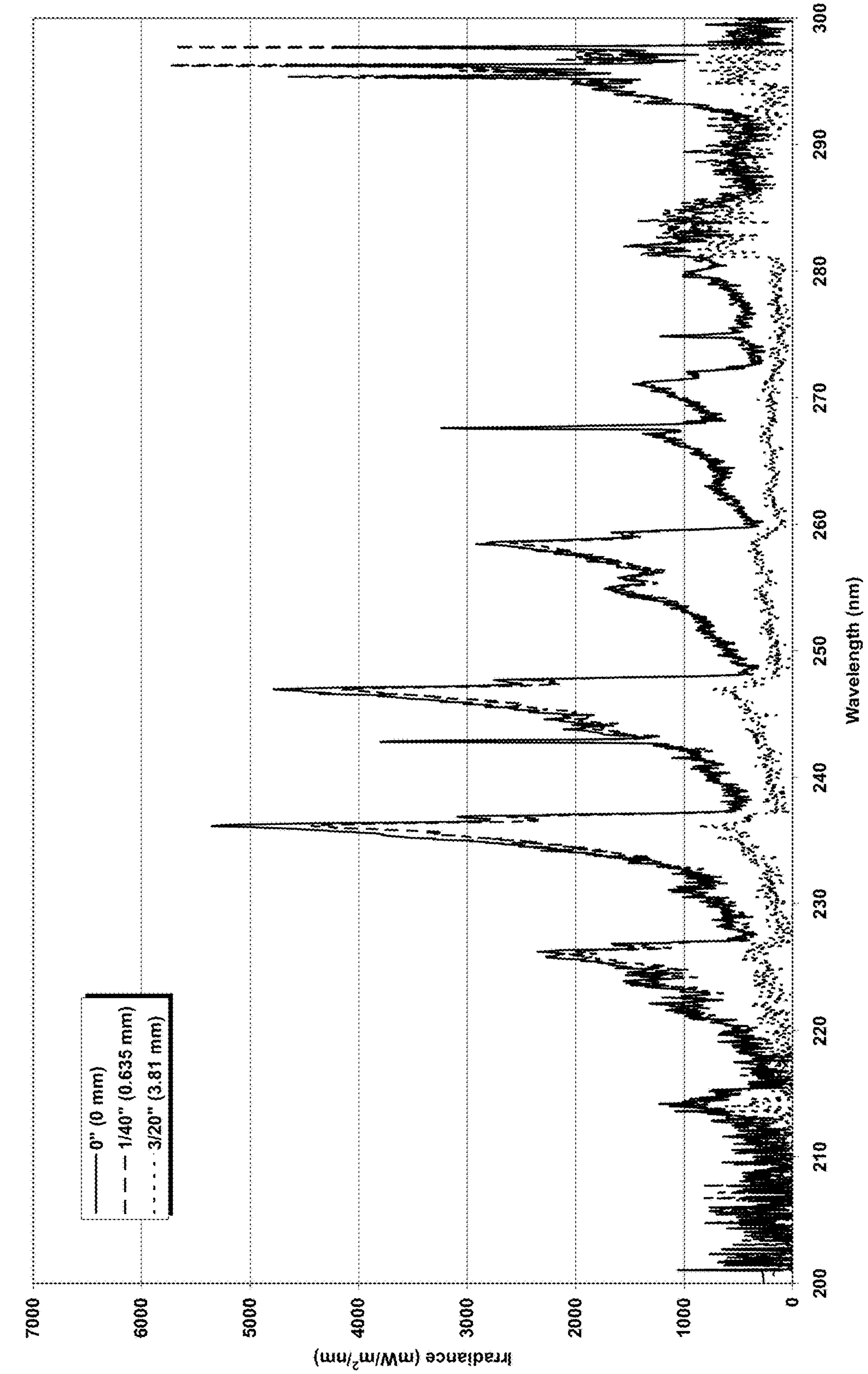

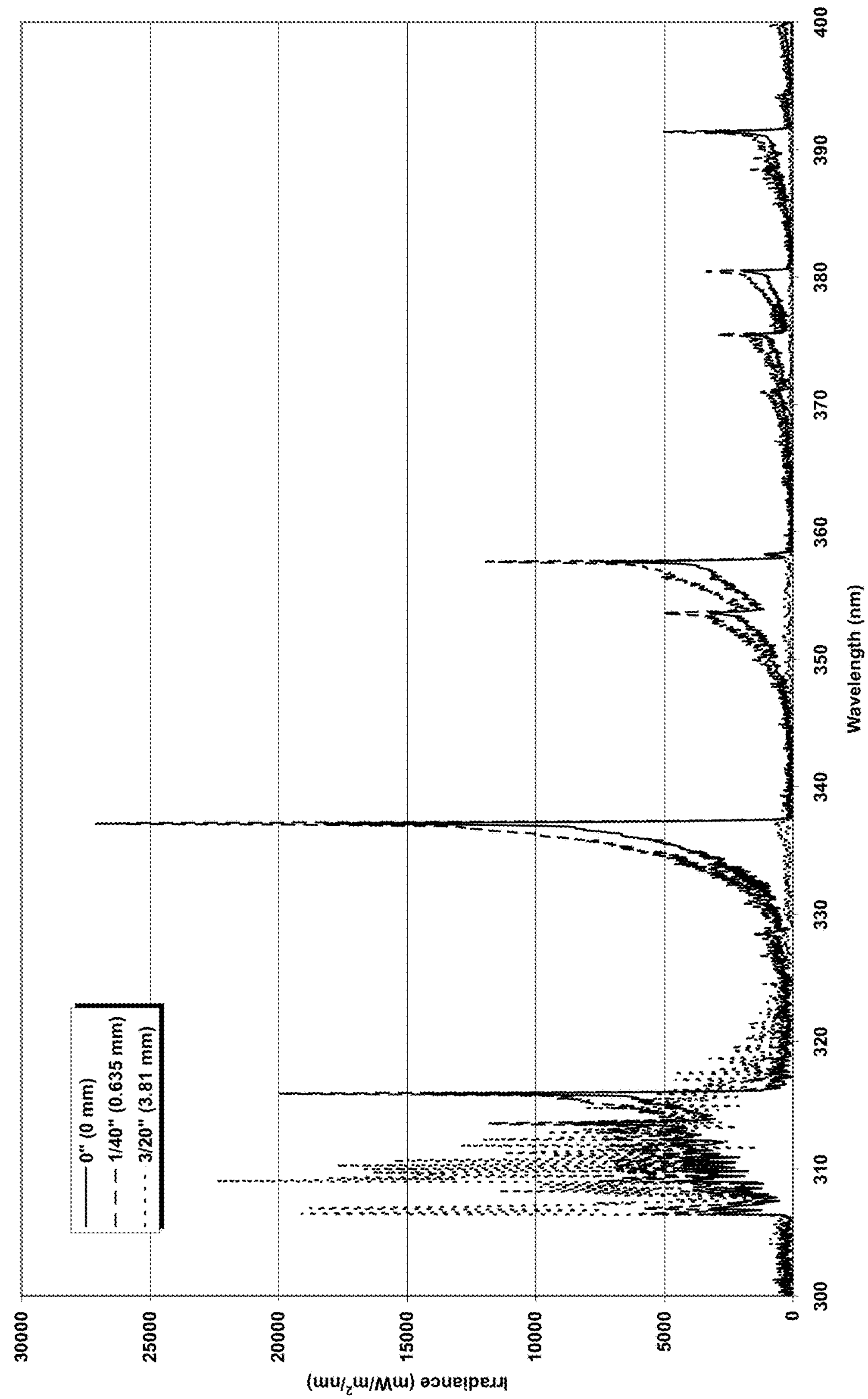
Figure 82 b. Au Electrode Plasma Irradiance

Figure 82 c. Au Electrode Plasma Irradiance
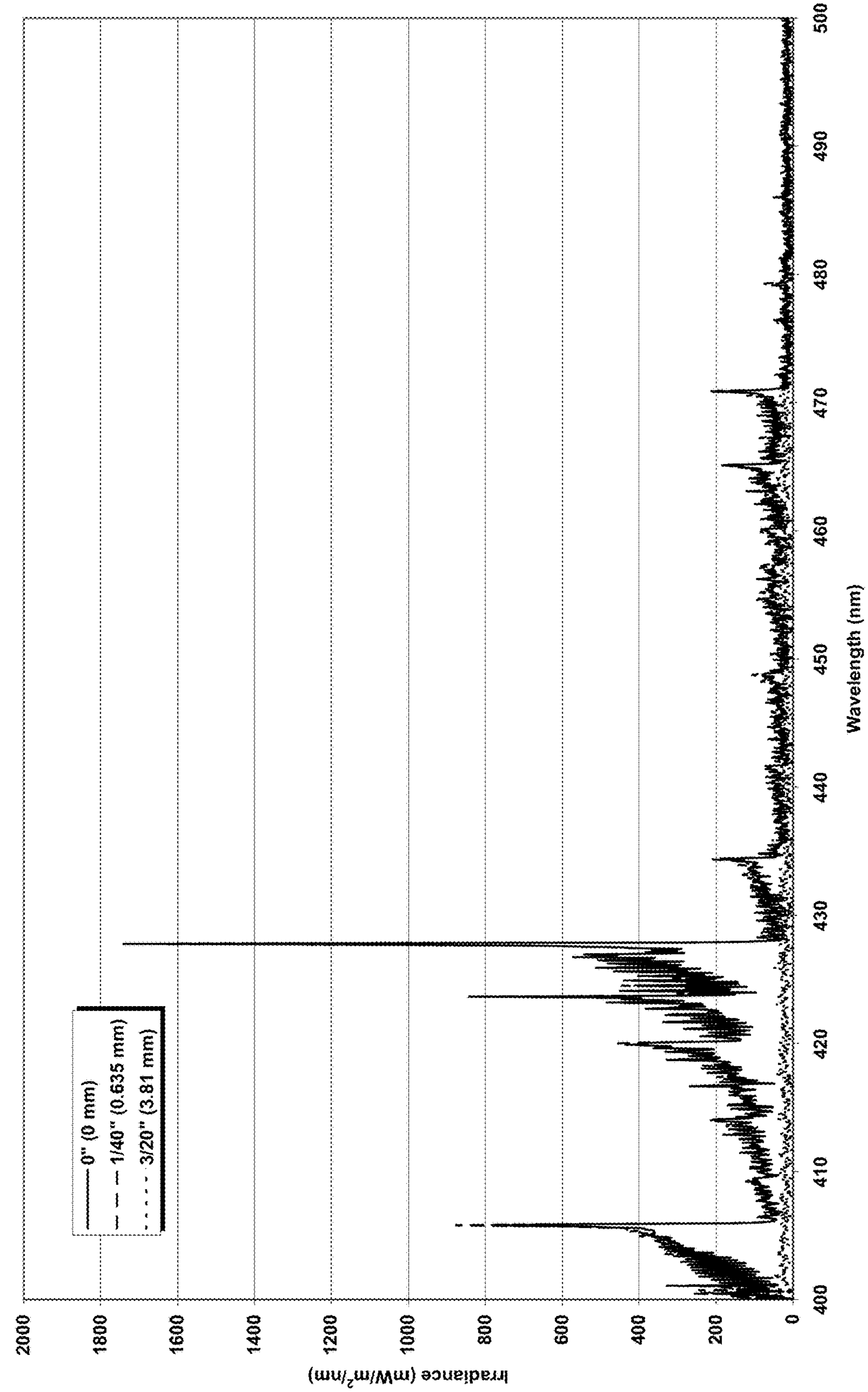

Figure 82 d. Au I Spectra
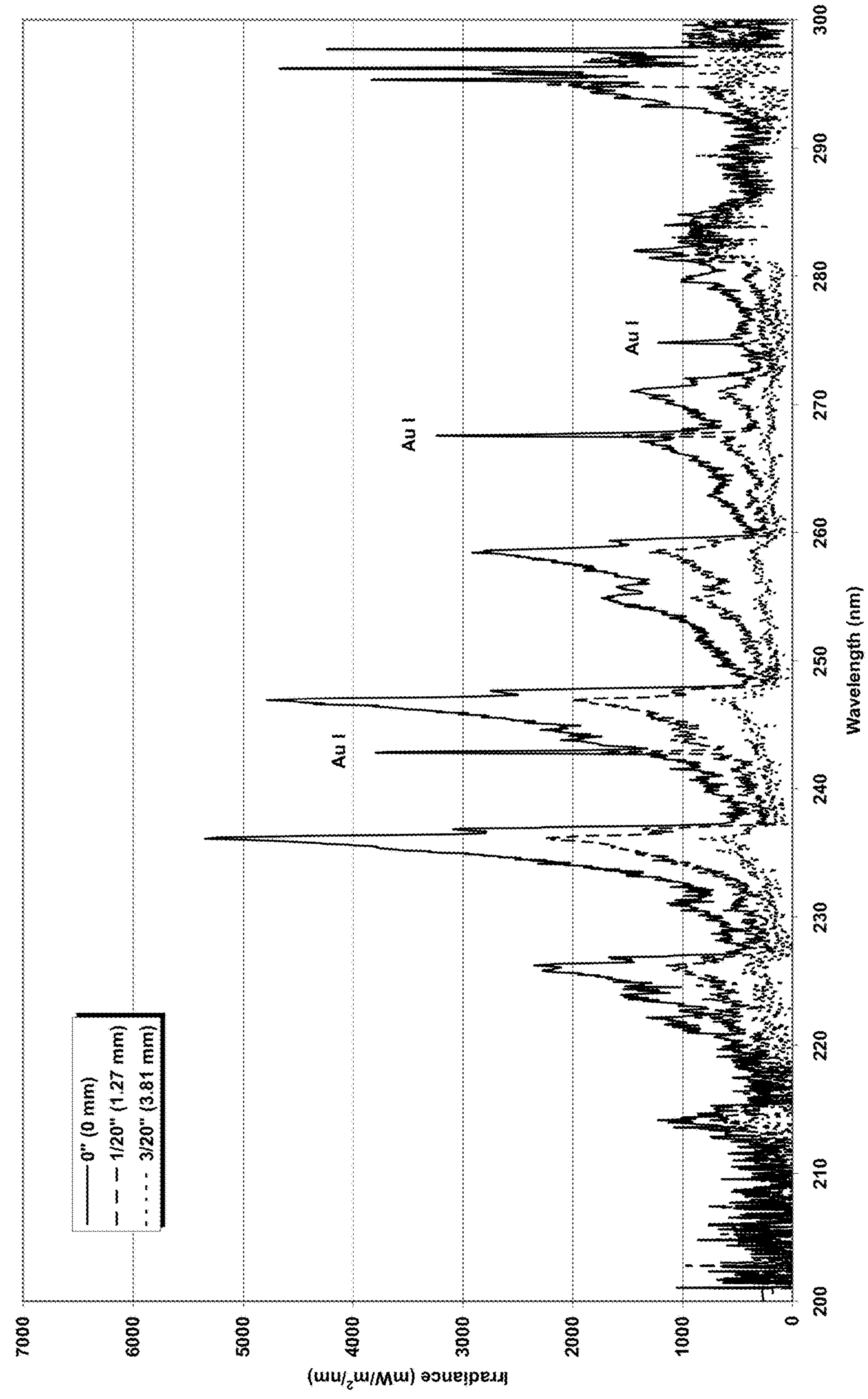

Figure 83 a. Pt Electrode Plasma Irradiance
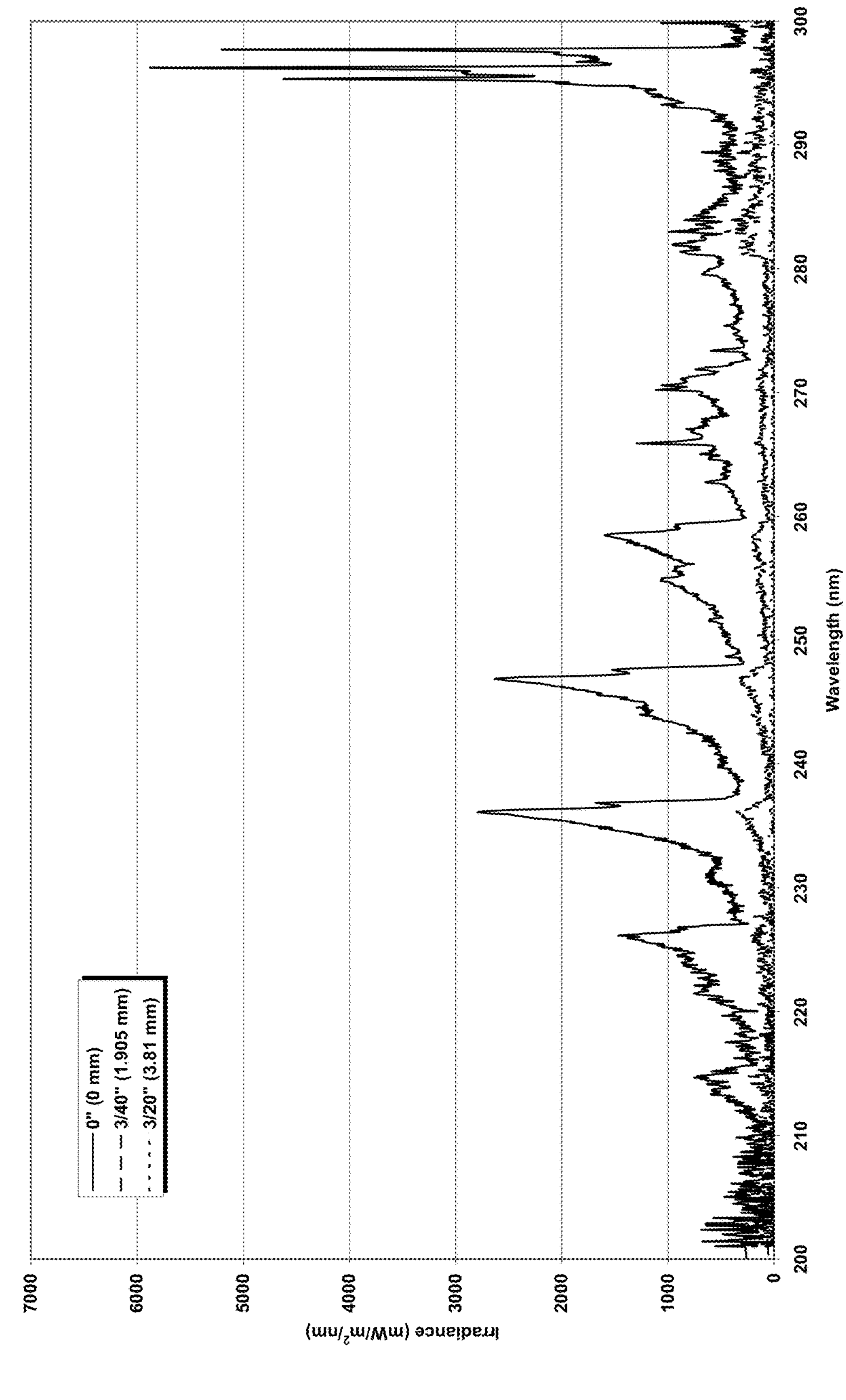

Figure 83 b. Pt Electrode Plasma Irradiance
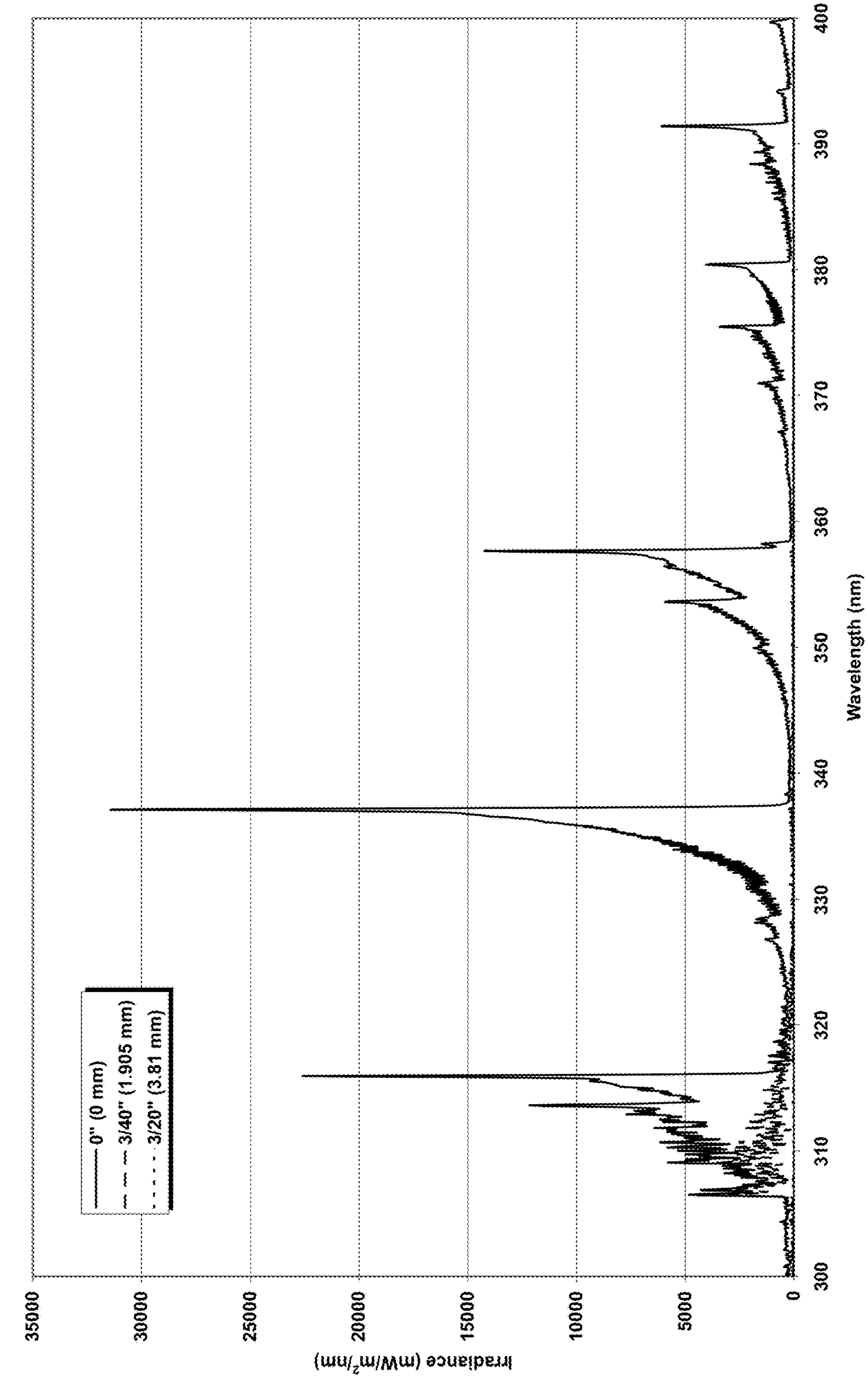

Figure 83 c. Pt Electrode Plasma Irradiance
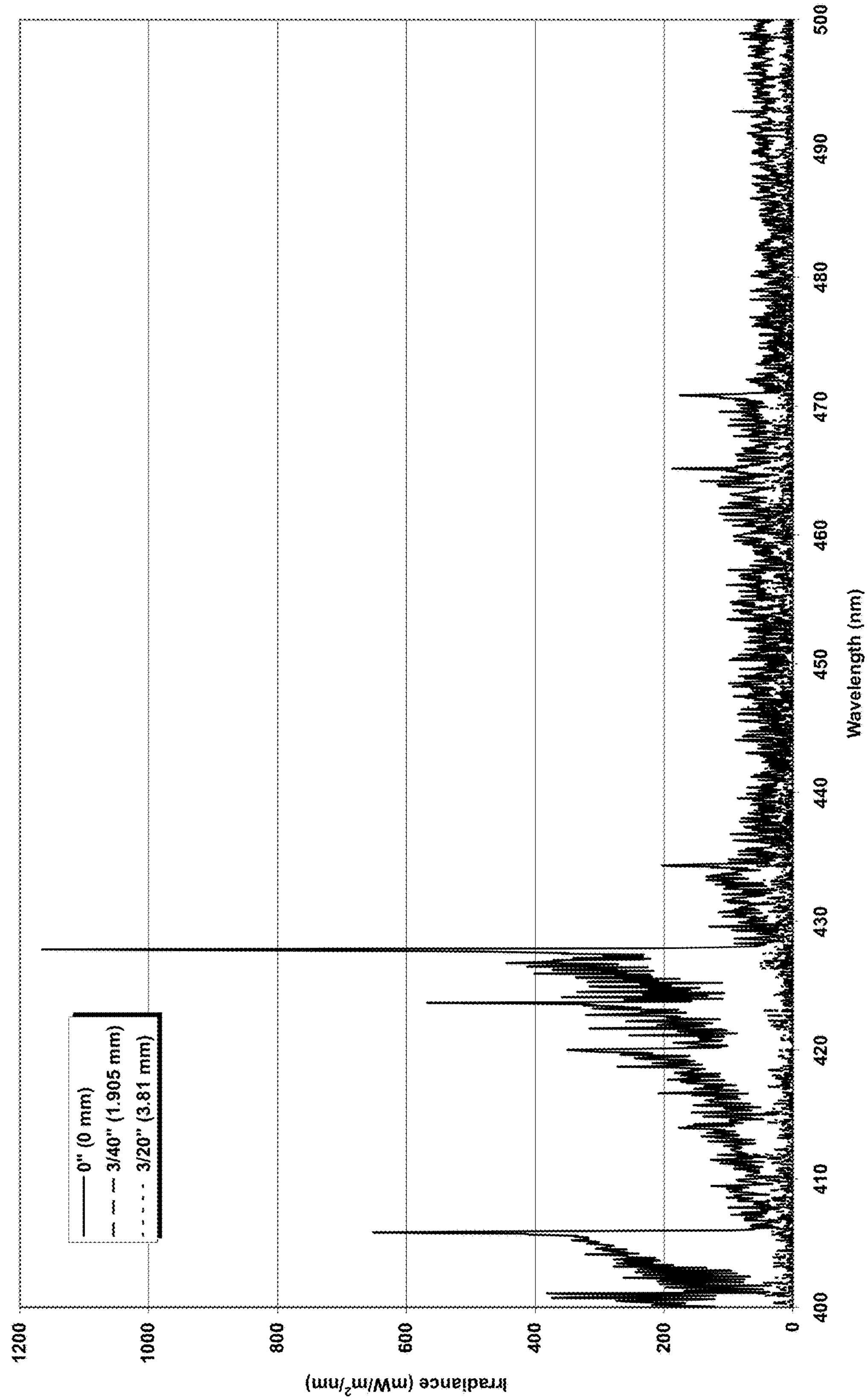

Figure 83 d. Pt I Spectra
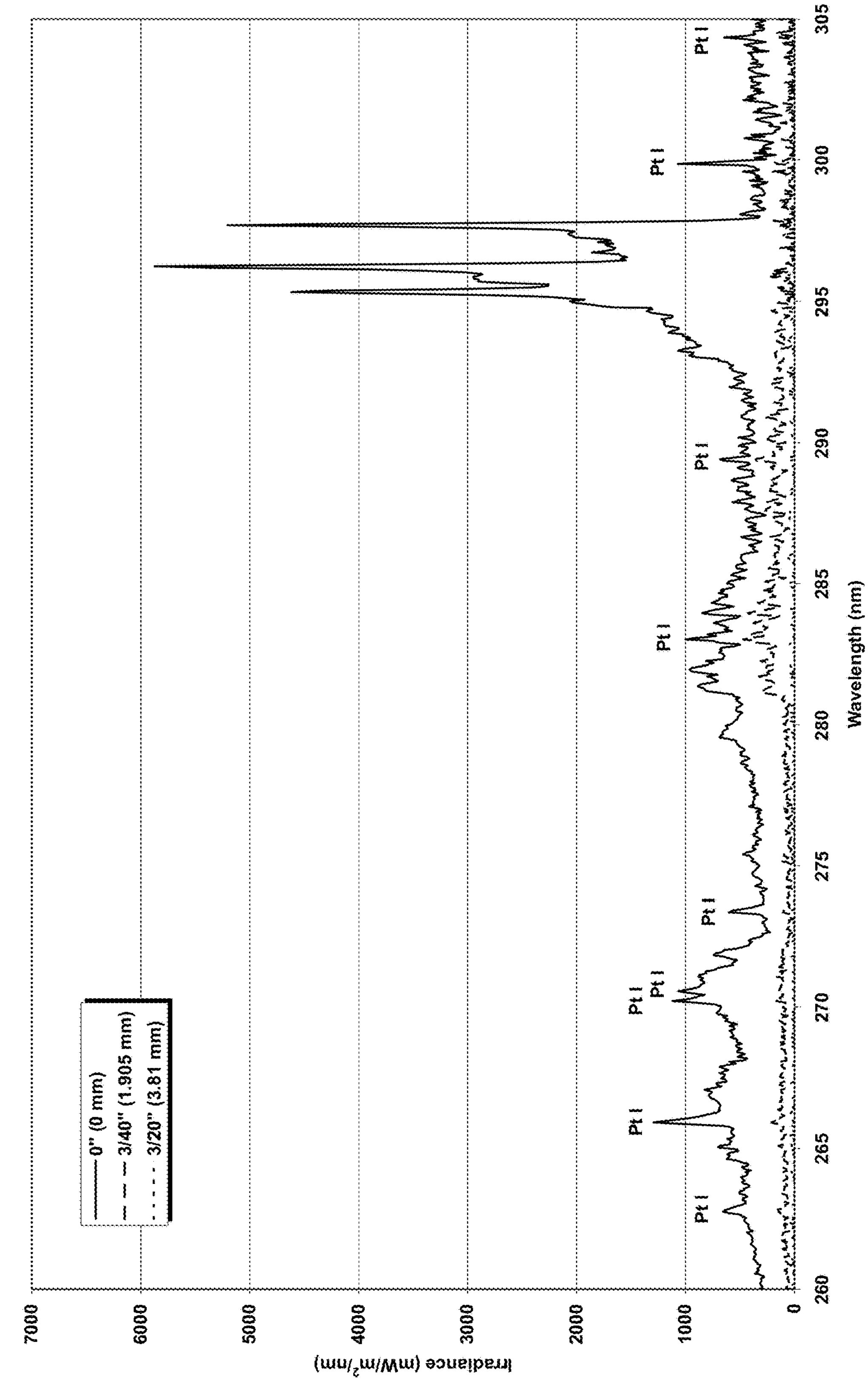

Figure 83e. Pt I Spectra (2)
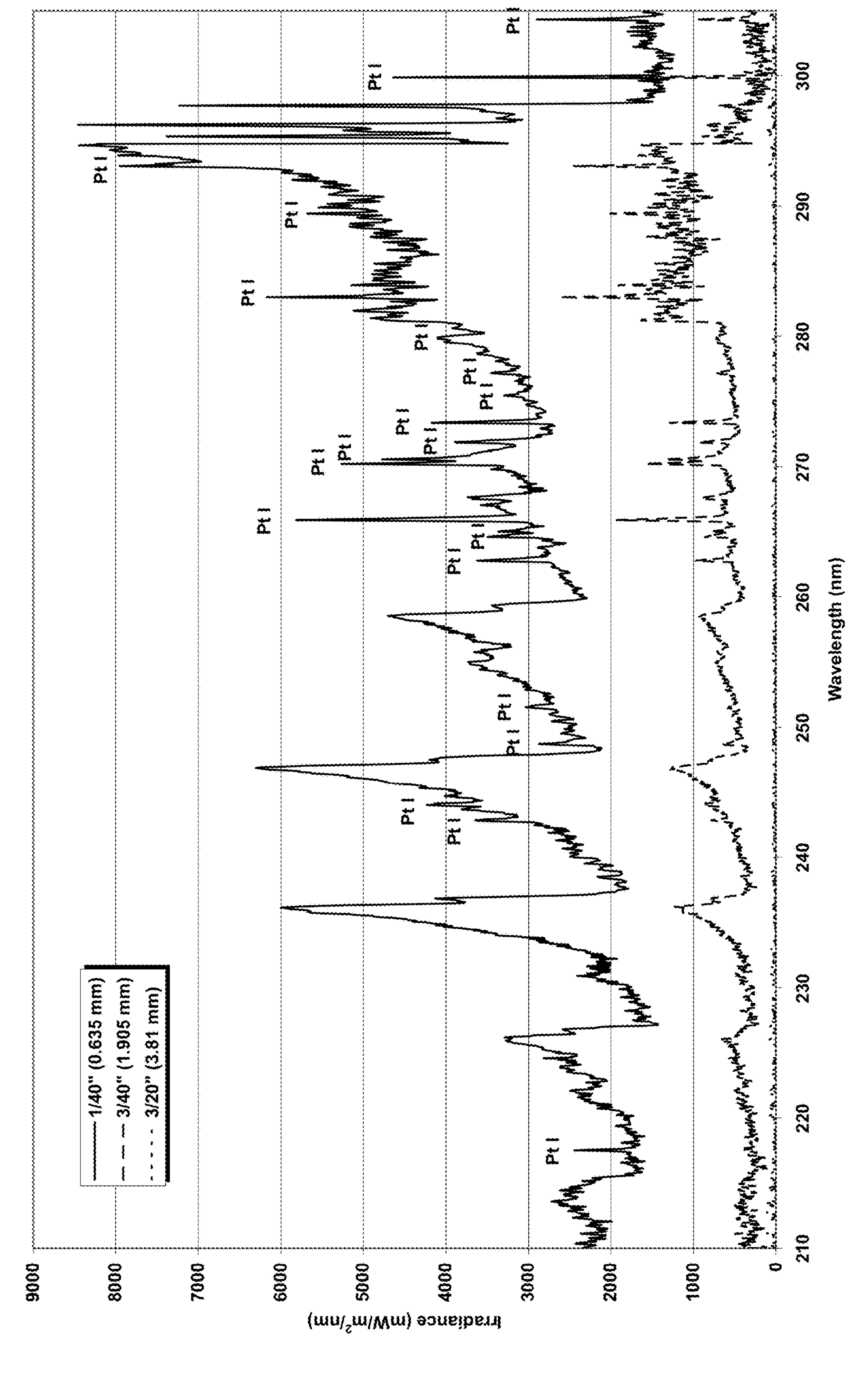

Figure 84 a. OH Temperatures in Ag Electrode Plasma
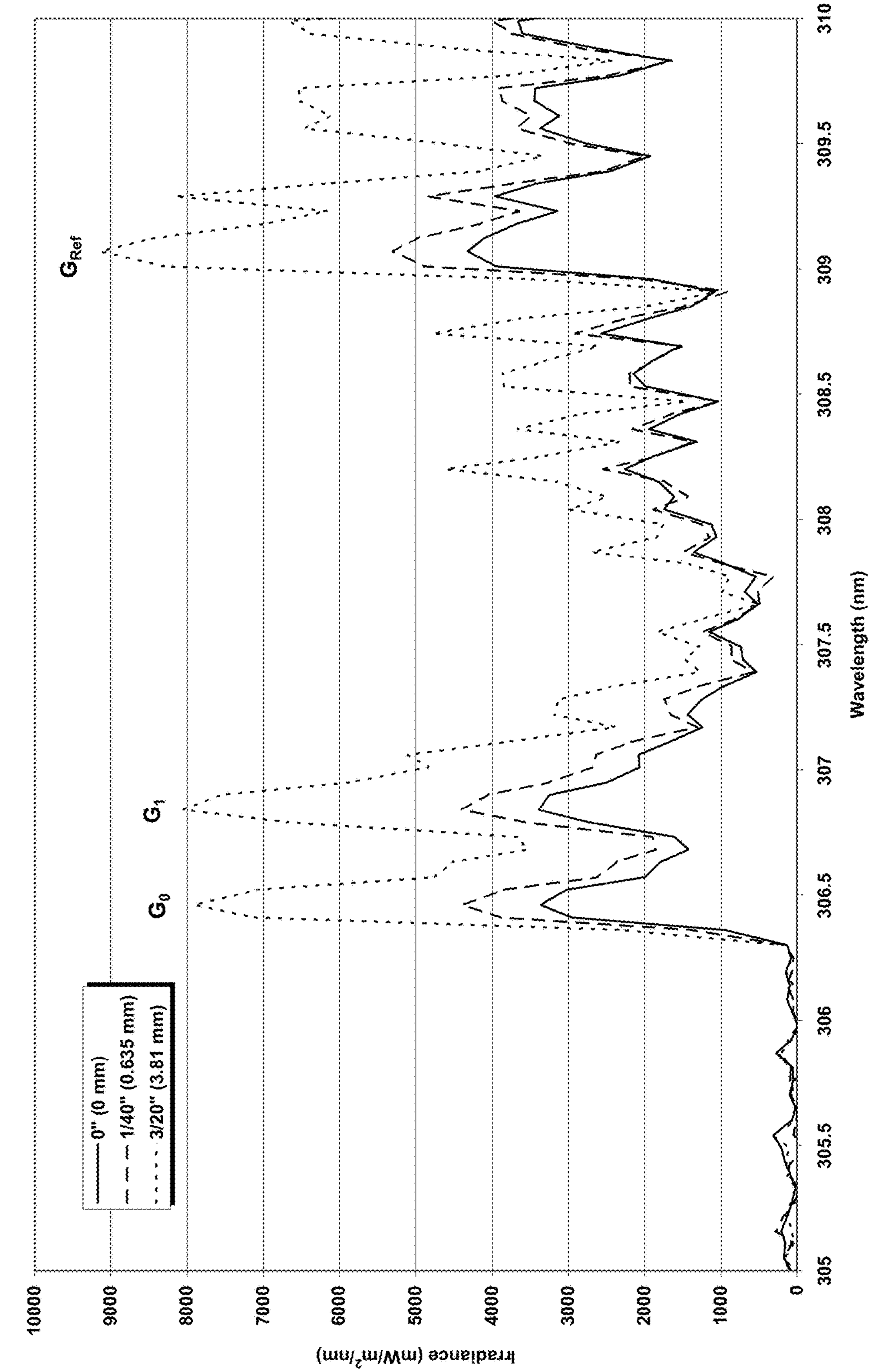

Figure 84 b. Ag Electrode Plasma Temperatures
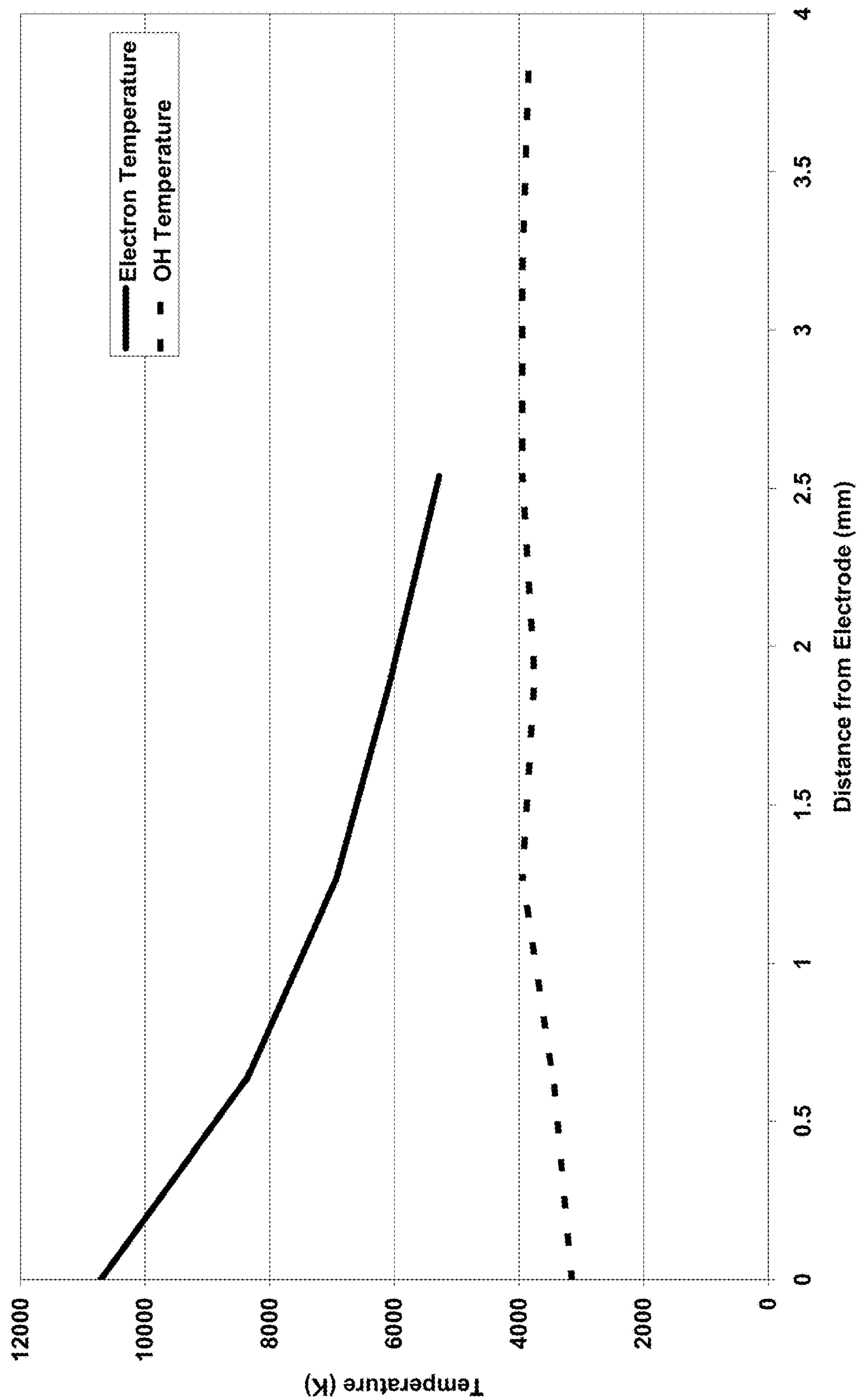

Figure 84 c. NO Integrated Line Intensities in 210-274 nm Range for Various Metal Electrodes
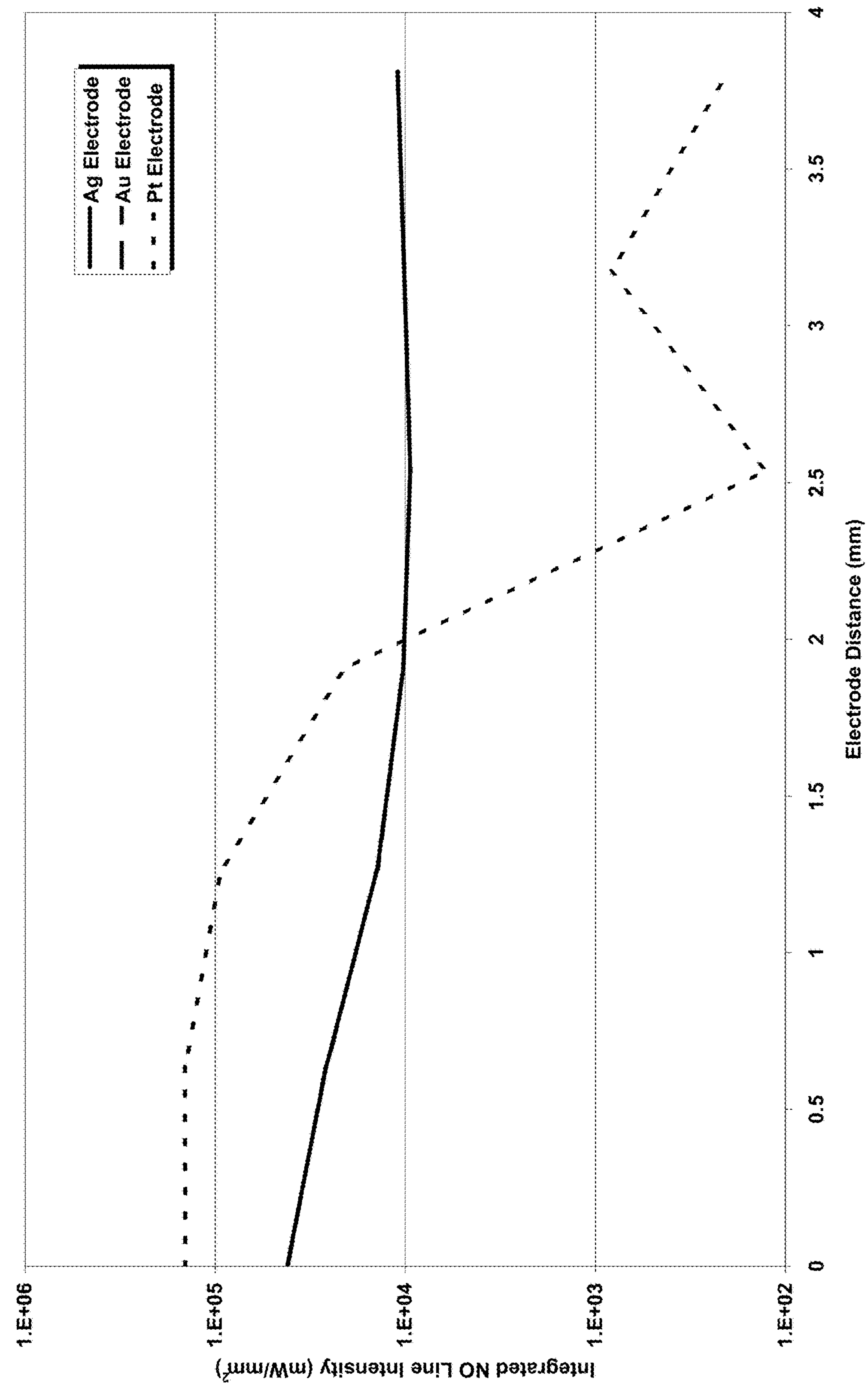

Figure 84 d. OH Integrated Line Intensities in 306-316 nm Range for Various Metal Electrodes
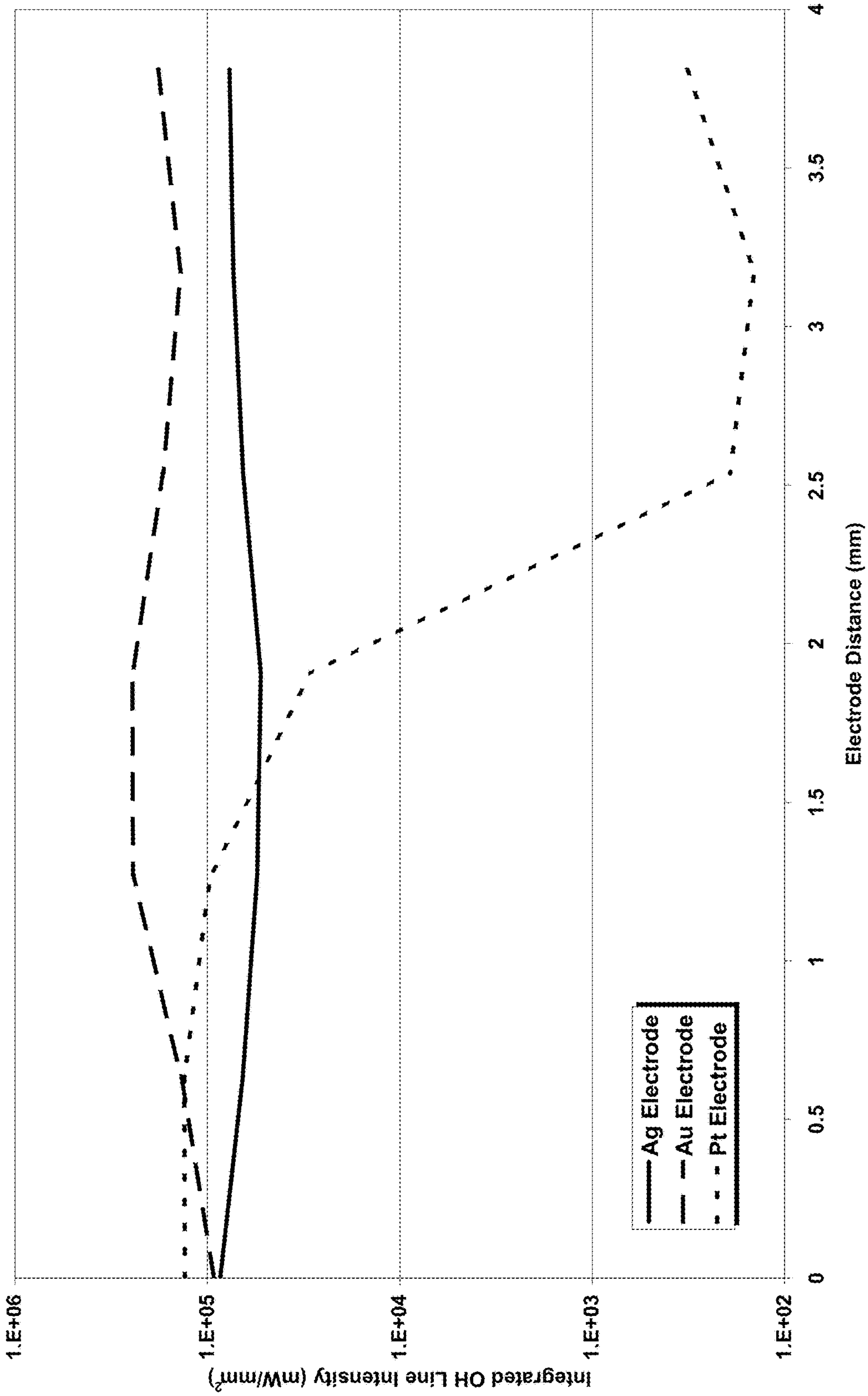

3AC-037

3AC-037 TEM Size Distribution

Gold 3AC-037 – 70min
Sample a
0.808% transmission
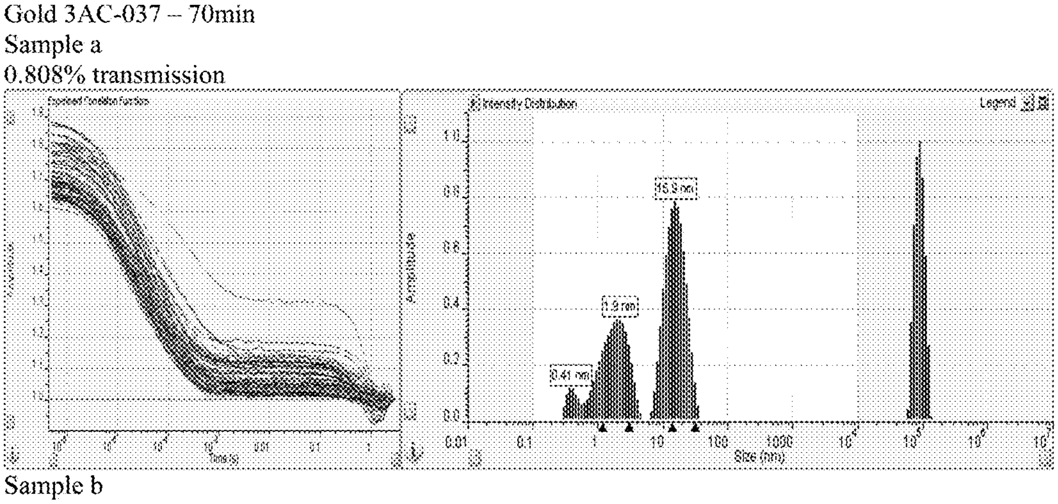
Sample b
1.3242% transmission
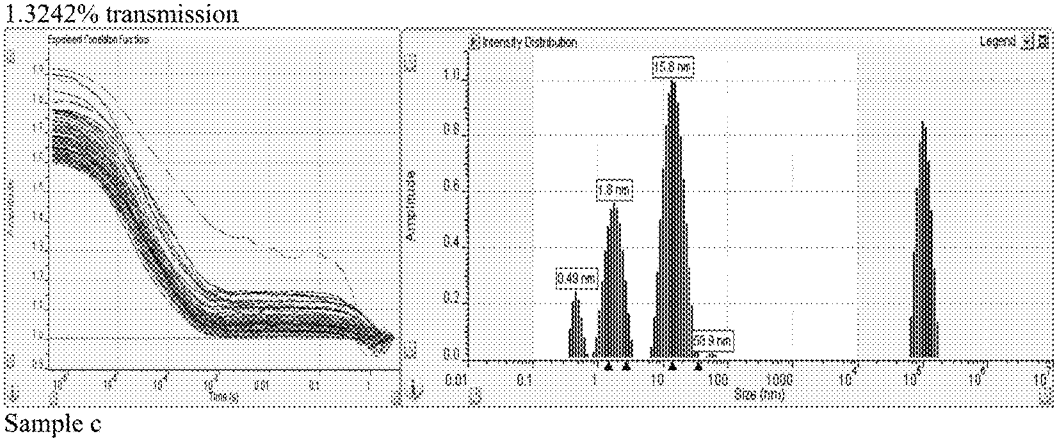
Sample c
0.7608% transmission
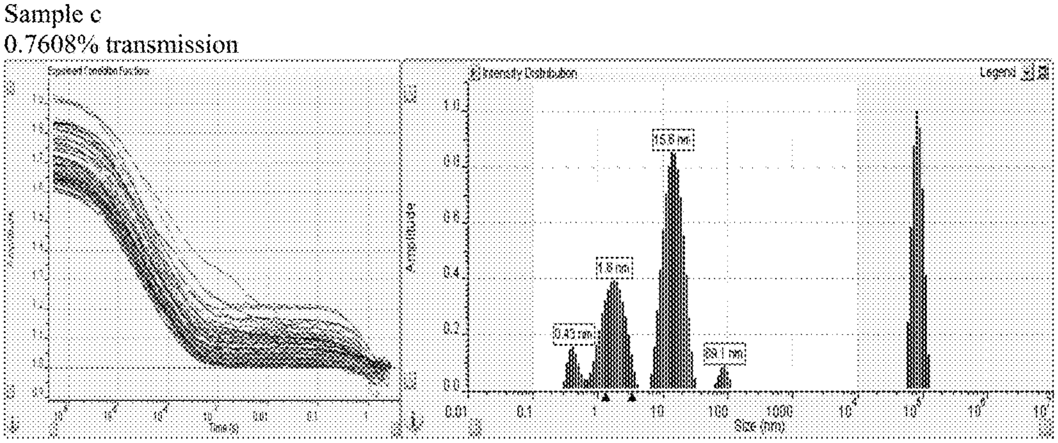
Figure 86c1

Gold 3AC-037 -- 300min
Sample a
0.3392% transmission
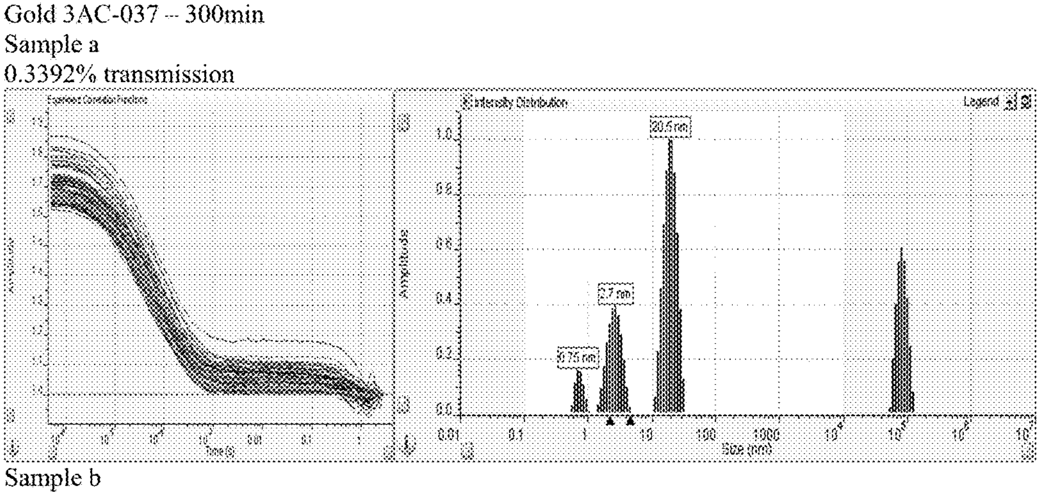
Sample b
0.3133% transmission
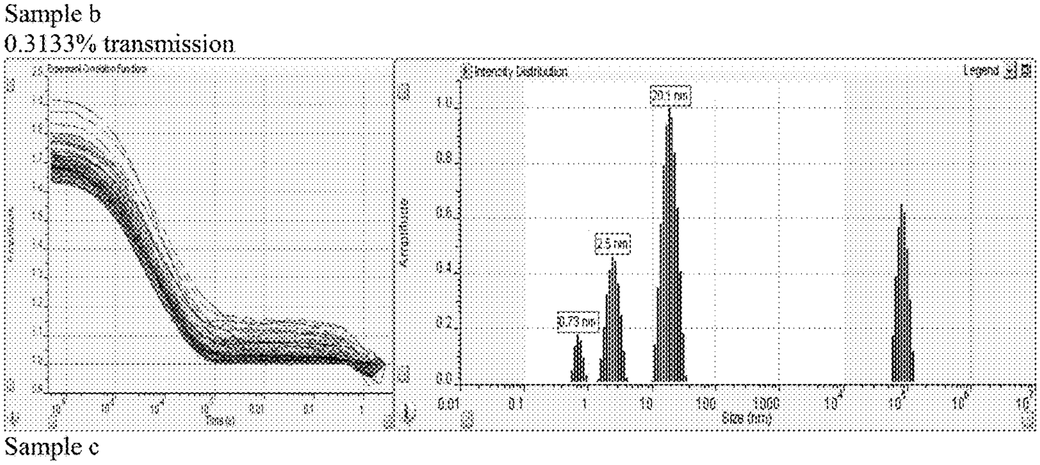
Sample c
0.5421% transmission
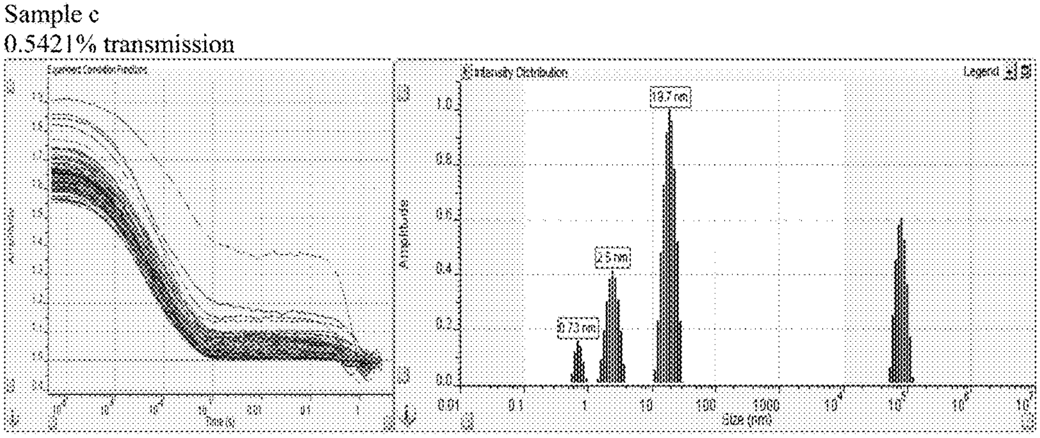
Figure 86c2

CONTINUOUS, SEMICONTINUOUS AND BATCH METHODS FOR TREATING LIQUIDS AND MANUFACTURING CERTAIN CONSTITUENTS (E.G.,NANOPARTICLES) IN LIQUIDS, APPARATUSES AND NANOPARTICLES AND NANOPARTICLE/LIQUID SOLUTION(S) AND COLLOIDS RESULTING THEREFROM

FIELD OF THE INVENTION

This invention relates generally to novel methods and novel devices for the continuous manufacture of nanoparticles, microparticles and nanoparticle/liquid solution(s) (e.g., colloids). The nanoparticles (and/or micron-sized particles) comprise a variety of possible compositions, sizes and shapes. The particles (e.g., nanoparticles) are caused to be present (e.g., created and/or the liquid is predisposed to their presence (e.g., conditioned)) in a liquid (e.g., water) by, for example, preferably utilizing at least one adjustable plasma (e.g., created by at least one AC and/or DC power source), which plasma communicates with at least a portion of a surface of the liquid. At least one subsequent and/or substantially simultaneous adjustable electrochemical processing technique is also preferred. Multiple adjustable plasmas and/or adjustable electrochemical processing techniques are preferred. Processing enhancers can be utilized alone or with a plasma. Semicontinuous and batch processes can also be utilized. The continuous processes cause at least one liquid to flow into, through and out of at least one trough member, such liquid being processed, conditioned and/or effected in said trough member(s). Results include constituents formed in the liquid including ions, micron-sized particles and/or nanoparticles (e.g., metallic-based nanoparticles) of novel size, shape, composition, concentration, zeta potential and certain other novel properties present in a liquid.

BACKGROUND OF THE INVENTION

Many techniques exist for the production of nanoparticles including techniques set forth in "Recent Advances in the Liquid-Phase Syntheses of Inorganic Nanoparticles" written by Brian L. Cushing, Vladimire L. Kolesnichenko and Charles J. O'Connor; and published in *Chemical Reviews*, volume 104, pages 3893-3946 in 2004 by the American Chemical Society; the subject matter of which is herein expressly incorporated by reference.

Further, the article "Chemistry and Properties of Nanocrystals of Different Shapes" written by Clemens Burda, Xiaobo Chen, Radha Narayanan and Mostafa A. El-Sayed; and published in *Chemical Reviews*, volume 105, pages 1025-1102 in 2005 by the American Chemical Society; discloses additional processing techniques, the subject matter of which is herein expressly incorporated by reference.

The article "Shape Control of Silver Nanoparticles" written by Benjamin Wiley, Yugang Sun, Brian Mayers and Younan Xia; and published in *Chemistry—A European Journal*, volume 11, pages 454-463 in 2005 by Wiley-VCH; discloses additional important subject matter, the subject matter of which is herein expressly incorporated by reference.

Still further, U.S. Pat. No. 7,033,415, issued on Apr. 25, 2006 to Mirkin et al., entitled Methods of Controlling Nanoparticle Growth; and U.S. Pat. No. 7,135,055, issued on Nov. 14, 2006, to Mirkin et al., entitled Non-Alloying Core Shell Nanoparticles; both disclose additional techniques for the growth of nanoparticles; the subject matter of both are herein expressly incorporated by reference.

Moreover, U.S. Pat. No. 7,135,054, which issued on Nov. 14, 2006 to Jin et al., and entitled Nanoprisms and Method of Making Them; is also herein expressly incorporated by reference.

The present application claims priority to U.S. Provisional Patent Application No. 61/144,928, which was filed on Jan. 15, 2009, the subject matter of which is hereby expressly incorporated by reference.

Similarly, WIPO Publication No., WO/2009/009143, entitled, "Continuous Methods for Treating Liquids and Manufacturing Certain Constituents (e.g., Nanoparticles) in Liquids, Apparatuses and Nanoparticles and Nanoparticle/Liquid Solution(s) Resulting Therefrom", which published on Jan. 15, 2009, discloses a variety of methods related to some of the materials disclosed herein. The subject matter of that application is herein expressly incorporated by reference.

The present invention has been developed to overcome a variety of deficiencies/inefficiencies present in known processing techniques and to achieve a new and controllable process for making nanoparticles of a variety of shapes and sizes and/or new nanoparticle/liquid materials not before achievable.

SUMMARY OF THE INVENTION

Methods for making novel metallic-based nanoparticle solutions or colloids according to the invention relate generally to novel methods and novel devices for the continuous, semi-continuous and batch manufacture of a variety of constituents in a liquid including micron-sized particles, nanoparticles, ionic species and aqueous-based compositions of the same, including, nanoparticle/liquid(s), solution(s), colloid(s) or suspension(s). The constituents and nanoparticles produced can comprise a variety of possible compositions, concentrations, sizes, crystal planes and/or shapes, which together can cause the inventive compositions to exhibit a variety of novel and interesting physical, catalytic, biocatalytic and/or biophysical properties. The liquid(s) used and created/modified during the process can play an important role in the manufacturing of, and/or the functioning of the constituents (e.g., nanoparticles) independently or synergistically with the liquids which contain them. The particles (e.g., nanoparticles) are caused to be present (e.g., created and/or the liquid is predisposed to their presence (e.g., conditioned)) in at least one liquid (e.g., water) by, for example, preferably utilizing at least one adjustable plasma (e.g., created by at least one AC and/or DC power source), which adjustable plasma communicates with at least a portion of a surface of the liquid. However, effective constituent (e.g., nanoparticle) solutions or colloids can be achieved without the use of such plasmas as well.

Metal-based electrodes of various composition(s) and/or unique configurations or arrangements are preferred for use in the formation of the adjustable plasma(s), but non-metallic-based electrodes can also be utilized for at least a portion of the process. Utilization of at least one subsequent and/or substantially simultaneous adjustable electrochemical processing technique is also preferred. Metal-based electrodes of various composition(s) and/or unique configurations are preferred for use in the electrochemical processing technique(s). Electric fields, magnetic fields, electromagnetic fields, electrochemistry, pH, zeta potential, etc., are just some of the variables that can be positively affected by the adjustable plasma(s) and/or adjustable electrochemical processing technique(s) of the invention. Multiple adjustable plasmas and/or adjustable electrochemical techniques are preferred in many embodiments of the invention to achieve many of the processing advantages of the present invention, as well as many of the novel compositions which result from practicing the teachings of the preferred embodiments to make an almost limitless set of inventive aqueous solutions and colloids.

The continuous process embodiments of the invention have many attendant benefits, wherein at least one liquid, for example water, flows into, through and out of at least one trough member and such liquid is processed, conditioned, modified and/or effected by said at least one adjustable plasma and/or said at least one adjustable electrochemical technique. The results of the continuous processing include new constituents in the liquid, micron-sized particles, ionic constituents, nanoparticles (e.g., metallic-based nanoparticles) of novel and/or controllable size, hydrodynamic radius, concentration, crystal plane, shape, composition, zeta potential and/or properties, such nanoparticle/liquid mixture being produced in an efficient and economical manner.

Certain processing enhancers may also be added to or mixed with the liquid(s). The processing enhancers include solids, liquids and gases. The processing enhancer may provide certain processing advantages and/or desirable final product characteristics.

Additional processing techniques such as applying certain crystal growth techniques disclosed in copending patent application entitled Methods for Controlling Crystal Growth, Crystallization, Structures and Phases in Materials and Systems; which was filed on Mar. 21, 2003, and was published by the World Intellectual Property Organization under publication number WO 03/089692 on Oct. 30, 2003 and the U.S. National Phase application, which was filed on Jun. 6, 2005, and was published by the United States Patent and Trademark Office under publication number 20060037177 on Feb. 23, 2006 (the inventors of each being Bentley J. Blum, Juliana H. J. Brooks and Mark G. Mortenson). The subject matter of both applications is herein expressly incorporated by reference. These applications teach, for example, how to grow preferentially one or more specific crystals or crystal shapes from solution. Further, drying, concentrating and/or freeze drying can also be utilized to remove at least a portion of, or substantially all of, the suspending liquid, resulting in, for example, dehydrated nanoparticles.

BRIEF DESCRIPTION OF THE DRAWINGS

FIGS. 4A-4D show four alternative electrode configurations for the electrodes 1 and 5 which are manually controlled.

FIGS. 28D-28M show a variety of perspective views of different control devices 20, with and without localized atmospheric control devices.

FIG. 44C shows dynamic light scattering data (i.e., hydrodynamic radii) for gold nanoparticles made according to Example 5.

FIG. 45C shows dynamic light scattering data (i.e., hydrodynamic radii) for gold nanoparticles made according to Example 6.

FIG. 46C shows dynamic light scattering data (i.e., hydrodynamic radii) for gold nanoparticles made according to Example 7.

FIG. 47C shows dynamic light scattering data (i.e., hydrodynamic radii) for gold nanoparticles made according to Example 8.

FIG. 48C shows dynamic light scattering data (i.e., hydrodynamic radii) for gold nanoparticles made according to Example 9.

FIG. 49C shows dynamic light scattering data (i.e., hydrodynamic radii) for gold nanoparticles made according to Example 10.

FIG. 50C shows the dynamic light scattering data (i.e., hydrodynamic radii) for gold nanoparticles made according to Example 11.

FIG. 51B shows dynamic light scattering data (i.e., hydrodynamic radii) for gold nanoparticles made according to Example 4.

FIG. 52 shows dynamic light scattering data (i.e., hydrodynamic radii) for the nanoparticles made according to Example 12a.

FIG. 55 shows dynamic light scattering data (i.e., hydrodynamic radii) for gold nanoparticles made according to Example 14.

FIGS. 56B-68B show the particle size distribution histogram from TEM measurements for the nanoparticles corresponding to dried samples GB-098, GB-113, GB-118, GB-120, GB-123, GB-139, GB-141, GB-144, GB-079, GB-089, GB-062, GB-076 and GB-077, respectively, made according to Example 15.

FIGS. 56C-68C show dynamic light scattering data (i.e., hydrodynamic radii) for gold nanoparticles corresponding to samples GB-098, GB-113, GB-118, GB-120, GB-123, GB-139, GB-141, GB-144, GB-079, GB-089, GB-062, GB-076 and GB-077, respectively, made according to Example 15.

FIGS. 61D, 62D and 63D show measured current (in amps) as a function of process time for the samples GB-139, GB-141 and GB-144 made according to Example 15.

FIG. 69C shows dynamic light scattering data (i.e., hydrodynamic radii) for gold nanoparticles corresponding to sample Aurora-020.

FIGS. 70B-76B show the particle size distribution histogram from TEM measurements for the nanoparticles corresponding to dried samples GA-002, GA-003, GA-004, GA-005, GA-009, GA-011 and GA-013, respectively.

FIGS. 70C-76C show dynamic light scattering data (i.e., hydrodynamic radii) for gold nanoparticles corresponding to samples GA-002, GA-003, GA-004, GA-005, GA-009, GA-011 and GA-013, respectively.

FIGS. 77A-77F show bar charts of various target and actual voltages applied to six different, 8 electrode sets used in Example 13 to manufacture both silver-based and zinc-based nanoparticles and nanoparticle solutions.

FIGS. 78A-78C show bar charts of various target and actual voltages applied to three different, 8 electrode sets that were used in Example 14 to manufacture gold-based nanoparticles and nanoparticle solutions.

FIGS. 81A-81D show plasma irradiance using a silver electrode.

FIGS. 82A-82D show plasma irradiance using a gold electrode.

FIGS. 83A-83D show plasma irradiance using a platinum electrode.

FIG. 83E shows a plasma emission spectroscopy when two transformers are connected in parallel.

FIGS. 84A-84D show temperature measurements and relative presence of "NO" and "OH".

FIGS. 86CA and 86CB each show graphically three dynamic light scattering data measurement sets for the nanoparticles (i.e., the hydrodynamic radii) made according to two different processing times (i.e., 70 minutes and 300 minutes, respectively) for the solution or colloid referenced in Table 19.

DETAILED DESCRIPTION OF THE PREFERRED EMBODIMENTS

Figure 1A:
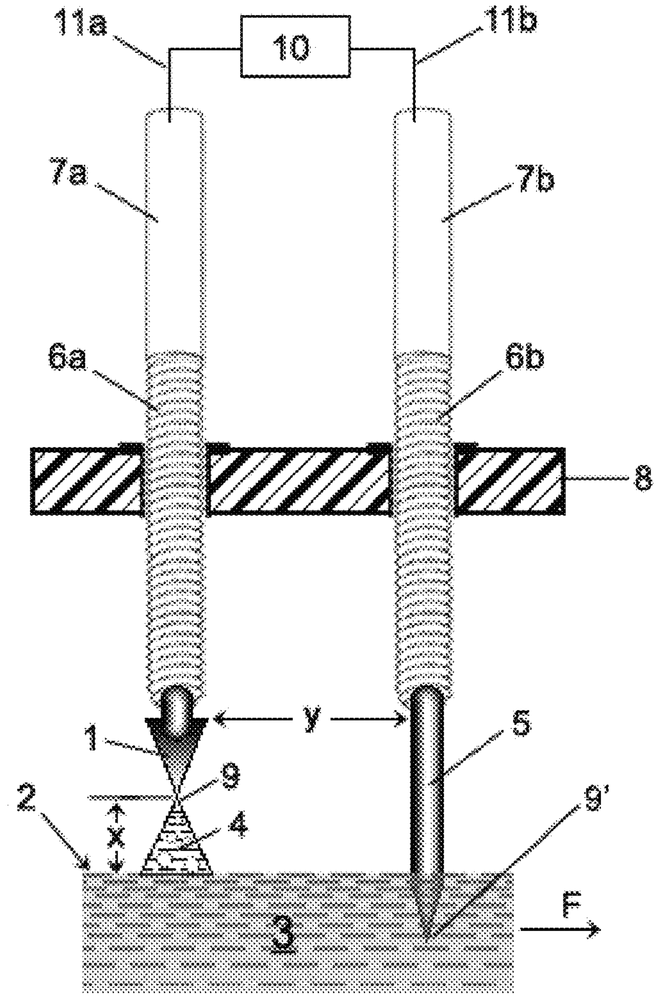
FIGS. 1A, 1B and 1C show schematic cross-sectional views of a manual electrode assembly according to the present invention.

The embodiments disclosed herein relate generally to novel methods and novel devices for the batch, semicontinuous or continuous manufacture of a variety of constituents in a liquid including nanoparticles, and nanoparticle/liquid(s) solution(s) or colloids. The nanoparticles produced in the various liquids can comprise a variety of possible compositions, sizes and shapes, zeta potential (i.e., surface change), conglomerates, composites and/or surface morphologies which exhibit a variety of novel and interesting physical, catalytic, biocatalytic and/or biophysical properties. The liquid(s) used and/or created/modified during the process play an important role in the manufacturing of and/or the functioning of the nanoparticles and/or nanoparticle/liquid(s) solutions(s) or colloids. The atmosphere(s) used play an important role in the manufacturing and/or functioning of the nanoparticle and/or nanoparticle/liquid(s) solution(s). The nanoparticles are caused to be present (e.g., created) in at least one liquid (e.g., water) by, for example, preferably utilizing at least one adjustable plasma (e.g., formed in one or more atmosphere(s)), which adjustable plasma communicates with at least a portion of a surface of the liquid. The power source(s) used to create the plasma(s) play(s) an important role in the manufacturing of and/or functioning of the nanoparticles and/or nanoparticle/liquid(s) solution(s) or colloids. For example, the voltage, amperage, polarity, etc., all can influence processing and/or final properties of produced products. Metal-based electrodes of various composition(s) and/or unique configurations are preferred for use in the formation of the adjustable plasma(s), but non-metallic-based electrodes can also be utilized. Utilization of at least one subsequent and/or substantially simultaneous adjustable electrochemical processing technique is also preferred. Metal-based electrodes of various composition(s) and/or unique configurations are preferred for use in the adjustable electrochemical processing technique(s).

In one preferred embodiment, the gold-based nanoparticle solutions or colloids are made or grown by electrochemical techniques in either a batch, semi-continuous or continuous process, wherein the amount, average particle size, crystal plane(s) and/or particle shape(s) are controlled and/or optimized to result in high catalytic activity. Desirable average particle sizes include a variety of different ranges, but the most desirable ranges include average particle sizes that are predominantly less than 100 nm and more preferably, for many uses, less than 50 nm and even more preferably for a variety of, for example, oral uses, less than 30 nm, as measured by drying such solutions and constructing particle size histograms from TEM measurements (as described in detail later herein). Further, the particles desirably contain crystal planes, such desirable crystal planes including crystals having {111}, {110} and/or {100} facets, which can result in desirable crystal shapes and high reactivity, for example, of the gold nanoparticles relative to spherical-shaped particles of the same or similar composition. Still further, concentrations of these therapeutically active MIF antagonists can be with a few parts per million (i.e., μg/ml) up to a few hundred ppm, but in the typical range of 2-200 ppm (i.e., 2 μg/ml-200 μg/ml) and preferably 2-50 ppm (i.e., 2 μg/ml-50 μg/ml).

Further, by following the inventive electrochemical manufacturing processes of the invention, such gold-based metallic nanoparticles can be alloyed or combined with other metals such that gold "coatings" may occur on other metals (or other non-metal species such as $SiO_2$, for example) or alternatively, gold-based nanoparticles may be coated by other metals. In such cases, gold-based composites or alloys within solutions or colloids may result.

Still further, gold-based metallic nanoparticle solutions or colloids of the present invention can be mixed or combined with other metallic-based solutions or colloids to form novel solution mixtures (e.g., in this case distinct metal species can still be discernable).

Definitions

For purposes of the present invention, the terms and expressions below, appearing in the Specification and Claims, are intended to have the following meanings:

"Carbomer", as used herein means a class of synthetically derived cross-linked polyacrylic acid polymers that provide efficient rheology modification with enhanced self-wetting for ease of use. In general, a carbomer/solvent mixture is neutralized with a base such as triethanolamine or sodium hydroxide to fully open the polymer to achieve the desired thickening, suspending, and emulsion stabilization properties to make creams or gels.

As used herein, the term "processing-enhancer" or processing-enhanced" means a material (solid, liquid and/or gas) which when added to liquids to be processed by the inventive electrochemical techniques disclosed herein, permit the formation of desirable particles (e.g., nanoparticles) in solution (e.g., in colloids). Likewise, "processing-enhanced" means a fluid that has had a processing-enhancer added thereto.

As used herein, the term "solution" should be understood as being broader than the classical chemistry definition of a solute dissolved in a solvent and includes both colloids and in some cases suspensions. Thus, it should be understood as meaning solute(s) dissolved in solvent(s); a dispersed phase in a contiguous phase or dispersion medium; and/or a mixture of first component in a continuous phase where the first component may have a tendency to settle. In some instances the term "solution" may be used by itself, but it should be understood as being broader than the classical meaning in chemistry.

The phrase "trough member" is used throughout the text. This phrase should be understood as meaning a large variety of fluid handling devices including, pipes, half pipes, channels or grooves existing in materials or objects, conduits, ducts, tubes, chutes, hoses and/or spouts, so long as such are compatible with the process disclosed herein.

Adjustable Plasma Electrodes and Adjustable Electrochemical Electrodes

An important aspect of one embodiment of the invention involves the creation of an adjustable plasma, which adjustable plasma is located between at least one electrode (or plurality of electrodes) positioned above at least a portion of the surface of a liquid and at least a portion of the surface of the liquid itself. The surface of the liquid is in electrical communication with at least one second electrode (or a plurality of second electrodes). This configuration has certain characteristics similar to a dielectric barrier discharge configuration, except that the surface of the liquid is an active participant in this configuration.

Figure 1B:
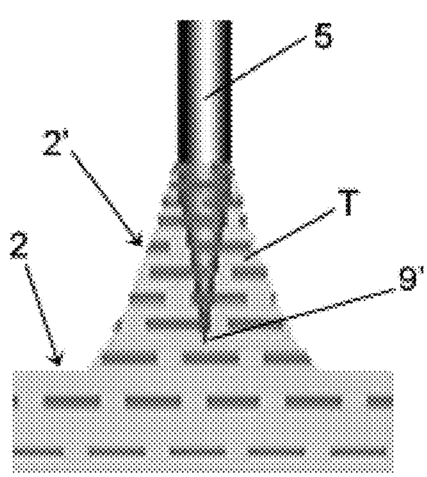

FIG. 1A shows a partial cross-sectional view of one embodiment of an electrode 1 having a triangular shape located a distance "x" above the surface 2 of a liquid 3 flowing, for example, in the direction "F". The electrode 1 shown is an isosceles triangle, but may be shaped as a right angle or equilateral triangle as well. An adjustable plasma 4 is generated between the tip or point 9 of the electrode 1 and the surface 2 of the liquid 3 when an appropriate power source 10 is connected between the point source electrode 1 and the electrode 5, which electrode 5 communicates with the liquid 3 (e.g., is at least partially below the surface 2 (e.g., bulk surface or effective surface) of the liquid 3). It should be noted that under certain conditions the tip 9' of the electrode 5 may actually be located physically slightly above the bulk surface 2 of the liquid 3, but the liquid still communicates with the electrode through a phenomena known as "Taylor cones" thereby creating an effective surface 2'. Taylor cones are discussed in U.S. Pat. No. 5,478,533, issued on Dec. 26, 1995 to Inculet, entitled Method and Apparatus for Ozone Generation and Treatment of Water; the subject matter of which is herein expressly incorporated by reference. In this regard, FIG. 1B shows an electrode configuration similar to that shown in FIG. 1A, except that a Taylor cone "T" is utilized to create an effective surface 2' to achieve electrical connection between the electrode 5 and the surface 2 (2') of the liquid 3. Taylor cones are referenced in the Inculet patent as being created by an "impressed field". In particular, Taylor cones were first analyzed by Sir Geoffrey Taylor in the early 1960's wherein Taylor reported that the application of an electrical field of sufficient intensity will cause a water droplet to assume a conical formation. It should be noted that Taylor cones, while a function of the electric field, are also a function of the conductivity of the fluid. Accordingly, as conductivity changes, the shape and or intensity of a Taylor cone can also change. Accordingly, Taylor cones of various intensity can be observed near tips 9' at electrode(s) 5 of the present invention as a function of not only the electric field which is generated around the electrode(s) 5, but also is a function of constituents in the liquid 3 (e.g., conductive constituents provided by, for example, the adjustable plasma 4) and others. Further, electric field changes are also proportional to the amount of current applied.

The adjustable plasma region 4, created in the embodiment shown in FIG. 1A, can typically have a shape corresponding to a cone-like structure for at least a portion of the process, and in some embodiments of the invention, can maintain such cone-like shape for substantially all of the process. In other embodiments, the shape of the adjustable plasma region 4 may be shaped more like lightning bolts. The volume, intensity, constituents (e.g., composition), activity, precise locations, etc., of the adjustable plasma(s) 4 will vary depending on a number of factors including, but not limited to, the distance "x", the physical and/or chemical composition of the electrode 1, the shape of the electrode 1, the location of the electrode 1 relative to other electrode(s) 1 located upstream from the electrode 1, the power source 10 (e.g., DC, AC, rectified AC, polarity of DC and/or rectified AC, RF, etc.), the power applied by the power source (e.g., the volts applied, the amps applied, frequency of pulsed DC source or AC source, etc.) the electric and/or magnetic fields created at or near the plasma 4, the composition of the naturally occurring or supplied gas or atmosphere between and/or around the electrode 1 and the surface 2 of the liquid 3, temperature, pressure, flow rate of the liquid 3 in the direction "F", composition of the liquid 3, conductivity of the liquid 3, cross-sectional area (e.g., volume) of the liquid near and around the electrodes 1 and 5 (e.g., the amount of time the liquid 3 is permitted to interact with the adjustable plasma 4 and the intensity of such interactions), the presence of atmosphere flow (e.g., air flow) at or near the surface 2 of the liquid 3 (e.g., cooling fan(s) or atmosphere movement means provided), etc. Specifically, for example, the maximum distance "x" that can be utilized for the adjustable plasma 4 is where such distance "x" corresponds to, for example, the breakdown electric field "$E_c$" shown in Equation 1. In other words, achieving breakdown of the gas or atmosphere provided between the tip 9 of the electrode 1 and the surface 2 of the liquid 3. If the distance "x" exceeds the maximum distance required to achieve electric breakdown ("$E_c$"), then no plasma 4 will be observed absent the use of additional techniques or interactions. However, whenever the distance "x" is equal to or less than the maximum distance required to achieve the formation of the adjustable plasma 4, then various physical and/or chemical adjustments of the plasma 4 can be made. Such changes will include, for example, diameter of the plasma 4 at the surface 2 of the liquid 3, intensity (e.g., brightness and/or strength and/or reactivity) of the plasma 4, the strength of the electric wind created by the plasma 4 and blowing toward the surface 2 of the liquid 3, etc.

The composition of the electrode 1 can also play an important role in the formation of the adjustable plasma 4. For example, a variety of known materials are suitable for use as the electrode(s) 1 of the embodiments disclosed herein. These materials include metals such as platinum, gold, silver, zinc, copper, titanium, and/or alloys or mixtures thereof, etc. However, the electrode(s) 1 (and 5) can be made of any suitable material which may comprise metal(s) (e.g., including appropriate oxides, carbides, nitrides, carbon, silicon and mixtures or composites thereof, etc.). Still further, alloys of various metals are also desirable for use with the present invention. Specifically, alloys can provide chemical constituents of different amounts, intensities and/or reactivities in the adjustable plasma 4 resulting in, for example, different properties in and/or around the plasma 4 and/or different constituents being present transiently, semi-permanently or permanently within the liquid 3. For example, different spectra can be emitted from the plasma 4 due to different constituents being excited within the plasma 4, different fields can be emitted from the plasma 4, etc. Thus, the plasma 4 can be involved in the formation of a variety of different nanoparticles and/or nanoparticle/solutions and/or desirable constituents, or intermediate(s) present in the liquid 3 required to achieve desirable end products. Still further, it is not only the chemical composition and shape factor(s) of the electrode(s) 1, 5 that play a role in the formation of the adjustable plasma 4, but also the manor in which any electrode(s) 1, 5 have been manufactured can also influence the performance of the electrode(s) 1, 5. In this regard, the precise shaping technique(s) including forging, drawing and/or casting technique(s) utilized to from the electrode(s) 1, 5 can have an influence on the chemical and/or physical activity of the electrode(s) 1, 5, including thermodynamic and/or kinetic and/or mechanical issues.

The creation of an adjustable plasma 4 in, for example, air above the surface 2 of a liquid 3 (e.g., water) will, typically, produce at least some gaseous species such as ozone, as well as certain amounts of a variety of nitrogen-based compounds and other components. Various exemplary materials can be produced in the adjustable plasma 4 and include a variety of materials that are dependent on a number of factors including the atmosphere between the electrode 1 and the surface 2 of the liquid 3. To assist in understanding the variety of species that are possibly present in the plasma 4 and/or in the liquid 3 (when the liquid comprises water), reference is made to a 15 Jun. 2000 thesis by Wilhelmus Frederik Laurens Maria Hoeben, entitled "Pulsed corona-induced degradation of organic materials in water", the subject matter of which is expressly herein incorporated by reference. The work in the aforementioned thesis is directed primarily to the creation of corona-induced degradation of undesirable materials present in water, wherein such corona is referred to as a pulsed DC corona. However, many of the chemical species referenced therein, can also be present in the adjustable plasma 4 of the embodiments disclosed herein, especially when the atmosphere assisting in the creation of the adjustable plasma 4 comprises humid air and the liquid 3 comprises water. In this regard, many radicals, ions and meta-stable elements can be present in the adjustable plasma 4 due to the dissociation and/or ionization of any gas phase molecules or atoms present between the electrode 1 and the surface 2. When humidity in air is present and such humid air is at least a major component of the atmosphere "feeding" the adjustable plasma 4, then oxidizing species such as hydroxyl radicals, ozone, atomic oxygen, singlet oxygen and hydropereoxyl radicals can be formed. Still further, amounts of nitrogen oxides like $NO_x$ and $N_2O$ can also be formed. Accordingly, Table A lists some of the reactants that could be expected to be present in the adjustable plasma 4 when the liquid 3 comprises water and the atmosphere feeding or assisting in providing raw materials to the adjustable plasma 4 comprises humid air.

TABLE A

| Reaction/Species | | | Equation |
|---|---|---|---|
| $H_2O + e_-$ | $\rightarrow OH + H + e_-$ | dissociation | 2 |
| $H_2O + e_-$ | $\rightarrow H_2O_+ + 2e_-$ | ionization | 3 |
| $H_2O_+ + H_2O$ | $\rightarrow H_3O_+ + OH$ | dissociation | 4 |
| $N_2 + e_-$ | $\rightarrow N_2{}^* + e_-$ | excitation | 5 |
| $O_2 + e_-$ | $\rightarrow O_2{}^* + e_-$ | excitation | 6 |
| $N_2 + e_-$ | $\rightarrow 2N + e_-$ | dissociation | 7 |
| $O_2 + e_-$ | $\rightarrow 2O + e_-$ | dissociation | 8 |
| $N_2 + e_-$ | $\rightarrow N_{2+} + 2e_-$ | ionization | 9 |
| $O_2 + e_-$ | $\rightarrow O_{2+} + 2e_-$ | ionization | 10 |
| $O_2 + e_-$ | $\rightarrow O_{2-}$ | attachment | 11 |
| $O_2 + e_-$ | $\rightarrow O_- + O$ | dissociative attachment | 12 |
| $O_2 + O$ | $\rightarrow O_3$ | association | 13 |
| $H + O_2$ | $\rightarrow HO_2$ | association | 14 |
| $H + O_3$ | $\rightarrow HO_3$ | association | 15 |
| $N + O$ | $\rightarrow NO$ | association | 16 |
| $NO + O$ | $\rightarrow NO_2$ | association | 17 |
| $N_{2+} + O_{2-}$ | $\rightarrow 2NO$ | recombination | 18 |
| $N_2 + O$ | $\rightarrow N_2O$ | association | 19 |

An April, 1995 article, entitled "Electrolysis Processes in D.C. Corona Discharges in Humid Air", written by J. Lelievre, N. Dubreuil and J.-L. Brisset, and published in the *J. Phys. III France* 5 on pages 447-457 therein (the subject matter of which is herein expressly incorporated by reference) was primarily focused on DC corona discharges and noted that according to the polarity of the active electrode, anions such as nitrites and nitrates, carbonates and oxygen anions were the prominent ions at a negative discharge; while protons, oxygen and $NO_x$ cations were the major cationic species created in a positive discharge. Concentrations of nitrites and/or nitrates could vary with current intensity. The article also disclosed in Table I therein (i.e., Table B reproduced herein) a variety of species and standard electrode potentials which are capable of being present in the DC plasmas created therein. Accordingly, one would expect such species as being capable of being present in the adjustable plasma(s) 4 of the present invention depending on the specific operating conditions utilized to create the adjustable plasma(s) 4.

TABLE B

| | |
|---|---|
| $O_3/O_2$ | [2.07] |
| $N_2/NH_4^+$ | [0.27] |
| $NO_3^-/N_2O_4$ | [0.81] |
| $NO_3^-/N_2O$ | [1.11] |
| $N_2O/N_2$ | [1.77] |
| $CO_2/HCO_2H$ | [−0.2] |
| $O_2/H_2O_2$ | [0.69] |
| $NO_3^-/NO$ | [0.96] |
| $H_3NOH^+/N_2H_5^+$ | [1.42] |
| $H_2O/e_{aq.}$ | [−2.07] |
| $NO_3^-/N_2$ | [1.24] |
| $HN_3/NH_4^+$ | [1.96] |
| $O_2/HO_2^-$ | [−0.08] |
| $NO_3^-/NO_2$ | [0.81] |
| $N_2O_4/HNO_2$ | [1.07] |
| $NO/N_2O$ | [1.59] |
| $N_2/N_2H_5^+$ | [−0.23] |
| $NO_3^-/NO_2^-$ | [0.49] |
| $NO_3^-/HNO_2$ | [0.94] |
| $N_2H_5/NH_4^+$ | [1.27] |
| $HO_2^-/OH^-$ | [0.88] |
| $O_2/H_2O$ | [1.23] |
| $H_2O_2/H_2O$ | [1.77] |
| $CO_2/CO$ | [−0.12] |
| $NO/H_2N_2O_2$ | [0.71] |
| $HNO_2/NO$ | [0.98] |
| $NO^+/NO$ | [1.46] |
| $CO_2/H_2C_2O_4$ | [−0.49] |
| $O_2/OH^-$ | [0.41] |

An article published 15 Oct. 2003, entitled, "Optical and electrical diagnostics of a non-equilibrium air plasma", authored by XinPei Lu, Frank Leipold and Mounir Laroussi, and published in the *Journal of Physics D: Applied Physics*, on pages 2662-2666 therein (the subject matter of which is herein expressly incorporated by reference) focused on the application of AC (60 Hz) high voltage (<20 kV) to a pair of parallel electrodes separated by an air gap. One of the electrodes was a metal disc, while the other electrode was a surface of water. Spectroscopic measurements performed showed that light emission from the plasma was dominated by OH (A-X, $N_2$ (C—B) and $N_2^+$ (B—X) transitions.

An article by Z. Machala, et al., entitled, "Emission spectroscopy of atmospheric pressure plasmas for bio-medical and environmental applications", published in 2007 in the *Journal of Molecular Spectroscopy*, discloses additional emission spectra of atmospheric pressure plasmas.

An article by M. Laroussi and X. Lu, entitled, "Room-temperature atmospheric pressure plasma plume for bio-medical applications", published in 2005 in *Applied Physics Letters,* discloses emission spectra fro OH, $N_2$, $N_2^+$, He and O.

Also known in the art is the generation of ozone by pulsed-corona discharge over a water surface as disclosed by Petr Lukes, et al, in the article, "Generation of ozone by pulsed corona discharge over water surface in hybrid gas-liquid electrical discharge reactor", published in *J. Phys. D: Appl. Phys.* 38 (2005) 409-416 (the subject matter of which is herein expressly incorporated by reference). Lukes, et al, disclose the formation of ozone by pulse-positive corona discharge generated in a gas phase between a planar high voltage electrode (made from reticulated vitreous carbon) and a water surface, said water having an immersed ground stainless steel "point" mechanically-shaped electrode located within the water and being powered by a separate electrical source. Various desirable species are disclosed as being formed in the liquid, some of which species, depending on the specific operating conditions of the embodiments disclosed herein, could also be expected to be present.

Further, U.S. Pat. No. 6,749,759 issued on Jun. 15, 2004 to Denes, et al, and entitled Method for Disinfecting a Dense Fluid Medium in a Dense Medium Plasma Reactor (the subject matter of which is herein expressly incorporated by reference), discloses a method for disinfecting a dense fluid medium in a dense medium plasma reactor. Denes, et al, disclose decontamination and disinfection of potable water for a variety of purposes. Denes, et al, disclose various atmospheric pressure plasma environments, as well as gas phase discharges, pulsed high voltage discharges, etc. Denes, et al, use a first electrode comprising a first conductive material immersed within the dense fluid medium and a second electrode comprising a second conductive material, also immersed within the dense fluid medium. Denes, et al then apply an electric potential between the first and second electrodes to create a discharge zone between the electrodes to produce reactive species in the dense fluid medium.

All of the constituents discussed above, if present, can be at least partially (or substantially completely) managed, controlled, adjusted, maximized, minimized, eliminated, etc., as a function of such species being helpful or harmful to the resultant nanoparticles and/or nanoparticle/solutions or colloids produced, and then may need to be controlled by a variety of different techniques (discussed in more detail later herein). As shown in FIG. 1A, the adjustable plasma 4 contacts the actual surface 2 of the liquid 3. In this embodiment of the invention, material (e.g., metal) from the electrode 1 may comprise a portion of the adjustable plasma 4 and may be caused, for example, to be "sputtered" onto and/or into the liquid (e.g., water). Accordingly, when metal(s) are used as the electrode(s) 1, elementary metal(s), metal ions, Lewis acids, Bronsted-Lowry acids, metal oxides, metal nitrides, metal hydrides, metal hydrates, metal carbides, and/or mixtures thereof etc., can be found in the liquid (e.g., for at least a portion of the process), depending upon the particular set of operating conditions associated with the adjustable plasma 4 (as well as other operating conditions).

Additionally, by controlling the temperature of the liquid 3 in contact with the adjustable plasma 4, the amount(s) of certain constituents present in the liquid 3 (e.g., for at least a portion of the process and/or in final products produced) can be maximized or minimized. For example, if a gaseous species such as ozone created in the adjustable plasma 4 was desired to be present in relatively larger quantities, the temperature of the liquid 3 could be reduced (e.g., by a chilling or refrigerating procedure) to permit the liquid 3 to contain more of the gaseous species. In contrast, if a relatively lesser amount of a particular gaseous species was desired to be present in the liquid 3, the temperature of the liquid 3 could be increased (e.g., by thermal heating, microwave heating, etc.) to contain less of the gaseous species. Similarly, often species in the adjustable plasma 4 being present in the liquid 3 could be adjusting/controlling the temperature of the liquid 3 to increase or decrease the amount of such species present in the liquid 3.

Certain processing enhancers may also be added to or mixed with the liquid(s) before and/or during certain electrochemical processing steps. The processing enhancers include both solids and liquids. The processing enhancers may provide certain processing advantages and/or desirable final product characteristics in each of the continuous, semi-continuous and batch processing techniques. Additional processing techniques such as applying certain crystal growth techniques disclosed in copending patent application entitled Methods for Controlling Crystal Growth, Crystallization, Structures and Phases in Materials and Systems; which was filed on Mar. 21, 2003, and was published by the World Intellectual Property Organization under publication number WO 03/089692 on Oct. 30, 2003 and the U.S. National Phase application, which was filed on Jun. 6, 2005, and was published by the United States Patent and Trademark Office under publication number 20060037177 on Feb. 23, 2006 (the inventors of each being Bentley J. Blum, Juliana H. J. Brooks and Mark G. Mortenson). The subject matter of both applications is herein expressly incorporated by reference. These applications teach, for example, how to grow preferentially one or more specific crystals or crystal shapes from solution.

Further, depending upon the specific formed products, drying, concentrating and/or freeze drying can also be utilized to remove at least a portion of, or substantially all of, the suspending liquid, resulting in, for example, partially or substantially completely dehydrated nanoparticles. If solutions or colloids are completely dehydrated, the metal—based species should be capable of being rehydrated by the addition of liquid (e.g., of similar or different composition than that which was removed). However, not all compositions of the present invention can be completely dehydrated without adversely affecting performance of the composition. For example, many nanoparticles formed in a liquid tend to clump or stick together (or adhere to surfaces) when dried. If such clumping is not reversed during a subsequent rehydration step, dehydration should be avoided.

In general, in a preferred embodiment herein relating to gold colloids, it is possible to concentrate, several folds, a solution or colloid of gold made according to the invention, without destabilizing the solution. However, complete evaporation is difficult to achieve due to, for example, agglomeration effects. Such agglomeration effects seem to begin at an approximate volume of 30% of the initial or starting reference volume. Additionally, one can evaporate off a certain volume of liquid and subsequently reconstitute to achieve a very similar product, as characterized by FAAS, DLS, and UV-Vis techniques. Specifically, two 500 ml solutions of gold similar to GB-139 (discussed in detail later herein) were each placed into a glass beaker and heated on a hot plate until boiling. The solutions were evaporated to 300 mL and 200 mL, respectively, and later reconstituted with that amount of liquid which was removed (i.e., with DI/RO water in 200 mL and 300 mL quantities, respectively) and subsequently characterized. Additionally, in another instance, two GB-139 solutions were again evaporated to 300 mL and 200 mL and then characterized without rehydration. It was found that through these dehydration processes, there were little to no detrimental effects on the particle sizes (i.e. particle size did not change dramatically when the colloid was dehydrated; or dehydrated and rehydrated to its initial concentration).

WIPO Publication No., WO/2009/009143, entitled, "Continuous Methods for Treating Liquids and Manufacturing Certain Constituents (e.g., Nanoparticles) in Liquids, Apparatuses and Nanoparticles and Nanoparticle/Liquid Solution(s) Resulting Therefrom", which published on Jan. 15, 2009, discloses a variety of methods related to some of the materials disclosed herein. The subject matter of that application is herein expressly incorporated by reference.

In certain situations, the material(s) (e.g., metal(s), metal ion(s), metal composite(s) or constituents (e.g., Lewis acids, Bronsted-Lowry acids, etc.) and/or inorganics found in the liquid 3 (e.g., after processing thereof) may have very desirable effects, in which case relatively large amounts of such material(s) will be desirable; whereas in other cases, certain materials found in the liquid (e.g., undesirable by—products) may have undesirable effects, and thus minimal amounts of such material(s) may be desired in the final product. Further, the structure/composition of the liquid 3 per se may also be beneficially or negatively affected by the processing conditions of the present invention. Accordingly, electrode composition can play an important role in the ultimate material(s) (e.g., nanoparticles and/or nanoparticle/solutions or colloids) that are formed according to the embodiments disclosed herein. As discussed above herein, the atmosphere involved with the reactions occurring at the electrode(s) 1 (and 5) plays an important role. However, electrode composition also plays an important role in that the electrodes 1 and 5 themselves can become part of, at least partially, intermediate and/or final products formed. Alternatively, electrodes may have a substantial role in the final products. In other words, the composition of the electrodes may be found in large part in the final products of the invention or may comprise only a small chemical part of products produced according to the embodiments disclosed herein. In this regard, when electrode(s) 1, 5 are found to be somewhat reactive according to the process conditions of the various embodiments disclosed herein, it can be expected that ions and/or physical particles (e.g., metal-based particles of single or multiple crystals) from the electrodes can become part of a final product. Such ions and/or physical components may be present as a predominant part of a particle in a final product, may exist for only a portion of the process, or may be part of a core in a core-shell arrangement present in a final product. Further, the core-shell arrangement need not include complete shells. For example, partial shells and/or surface irregularities or specific desirable surface shapes on a formed nanoparticle can have large influence on the ultimate performance of such nanoparticles in their intended use.

Also, the nature and/or amount of the surface change (i.e., positive or negative) on formed nanoparticles can also have a large influence on the behavior and/or effects of the nanoparticle/solution or colloid of final products and their relative performance.

Such surface changes are commonly referred to as "zeta potential". In general, the larger the zeta potential (either positive or negative), the greater the stability of the nanoparticles in the solution. However, by controlling the nature and/or amount of the surface changes of formed nanoparticles the performance of such nanoparticle solutions in a variety of systems can be controlled (discussed in greater detail later herein). It should be clear to an artisan of ordinary skill that slight adjustments of chemical composition, reactive atmospheres, power intensities, temperatures, etc., can cause a variety of different chemical compounds (both semi-permanent and transient) nanoparticles (and nanoparticle components) to be formed, as well as different nanoparticle/solutions (e.g., including modifying the structures of the liquid 3 (such as water) per se).

Still further, the electrode(s) 1 and 5 may be of similar chemical composition or completely different chemical compositions and/or made by similar or completely different forming processes in order to achieve various compositions of ions, compounds, and/or physical particles in liquid and/or structures of liquids per se and/or specific effects from final resultant products. For example, it may be desirable that electrode pairs, shown in the various embodiments herein, be of the same or substantially similar composition, or it may be desirable for the electrode pairs, shown in the various embodiments herein, to be of different chemical composition(s). Different chemical compositions may result in, of course, different constituents being present for possible reaction in the various plasma and/or electrochemical embodiments disclosed herein. Further, a single electrode 1 or 5 (or electrode pair) can be made of at least two different metals, such that components of each of the metals, under the process conditions of the disclosed embodiments, can interact with each other, as well as with other constituents in the plasma(s) 4 and or liquid(s) 3, fields, etc., present in, for example, the plasma 4 and/or the liquid 3.

Further, the distance between the electrode(s) 1 and 5; or 1 and 1 (e.g., see FIGS. 3D, 4D, 8D and 9D) or 5 and 5 (e.g., see FIGS. 3C, 4C, 8C and 9C) is one important aspect of the invention. In general, the location of the smallest distance "y" between the closest portions of the electrode(s) used in the present invention should be greater than the distance "x" in order to prevent an undesirable arc or formation of an unwanted corona or plasma occurring between the electrode (e.g., the electrode(s) 1 and the electrode(s) 5). Various electrode design(s), electrode location(s) and electrode interaction(s) are discussed in more detail in the Examples section herein.

The power applied through the power source 10 may be any suitable power which creates a desirable adjustable plasma 4 and desirable adjustable electrochemical reaction under all of the process conditions of the present invention. In one preferred mode of the invention, an alternating current from a step-up transformer (discussed in the "Power Sources" section and the "Examples" section) is utilized. In other preferred embodiments of the invention, polarity of an alternating current power source is modified by diode bridges to result in a positive electrode 1 and a negative electrode 5; as well as a positive electrode 5 and a negative electrode 1. In general, the combination of electrode(s) components 1 and 5, physical size and shape of the electrode(s) 1 and 5, electrode manufacturing process, mass of electrodes 1 and/or 5, the distance "x" between the tip 9 of electrode 1 above the surface 2 of the liquid 3, the composition of the gas between the electrode tip 9 and the surface 2, the flow rate and/or flow direction "F" of the liquid 3, compositions of the liquid 3, conductivity of the liquid 3, temperature of the liquid 3, voltage, amperage, polarity of the electrodes, etc., all contribute to the design, and thus power requirements (e.g., breakdown electric field or "$E_c$" of Equation 1) all influence the formation of a controlled or adjustable plasma 4 between the surface 2 of the liquid 3 and the electrode tip 9.

In further reference to the configurations shown in FIGS. 1A and 1B, electrode holders 6*a* and 6*b* are capable of being lowered and raised (and thus the electrodes are capable of being lowered and raised) in and through an insulating member 8 (shown in cross-section). The embodiment shown here are male/female screw threads. However, the electrode holders 6*a* and 6*b* can be configured in any suitable means which allows the electrode holders 6*a* and 6*b* to be raised and/or lowered reliably. Such means include pressure fits between the insulating member 8 and the electrode holders 6*a* and 6*b*, notches, mechanical hanging means, movable annulus rings, etc. In other words, any means for reliably fixing the height of the electrode holders 6*a* and 6*b* should be considered as being within the metes and bounds of the embodiments disclosed herein.

Figure 1C:
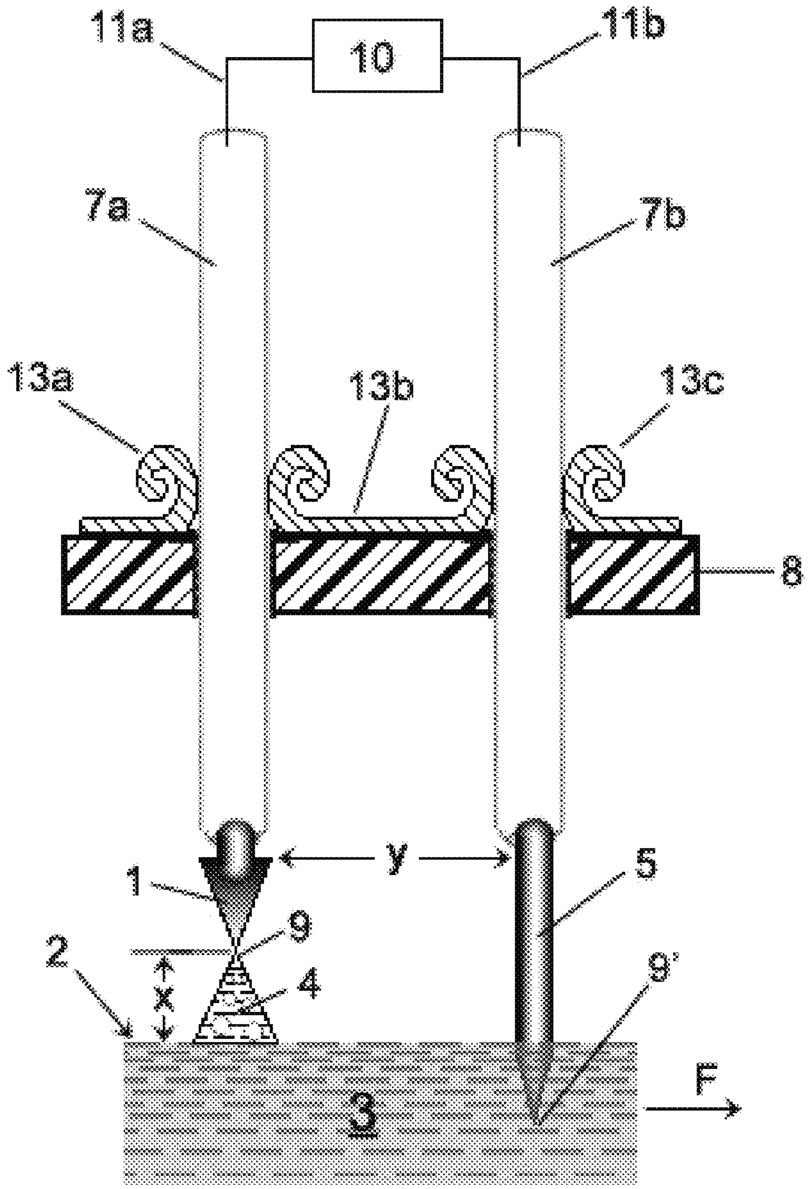

For example, FIG. 1C shows another embodiment for raising and lowering the electrodes 1, 5. In this embodiment, electrical insulating portions 7*a* and 7*b* of each electrode are held in place by a pressure fit existing between the friction mechanism 13*a*, 13*b* and 13*c*, and the portions 7*a* and 7*b*. The friction mechanism 13*a*, 13*b* and 13*c* could be made of, for example, spring steel, flexible rubber, etc., so long as sufficient contact is maintained thereafter.

The portions 6*a* and 6*b* can be covered by, for example, additional electrical insulating portions 7*a* and 7*b*. The electrical insulating portions 7*a* and 7*b* can be any suitable electrically insulating material (e.g., plastic, rubber, fibrous materials, etc.) which prevent undesirable currents, voltage, arcing, etc., that could occur when an individual interfaces with the electrode holders 6*a* and 6*b* (e.g., attempts to adjust the height of the electrodes). Moreover, rather than the electrical insulating portion 7*a* and 7*b* simply being a cover over the electrode holder 6*a* and 6*b*, such insulating portions 7*a* and 7*b* can be substantially completely made of an electrical insulating material. In this regard, a longitudinal interface may exist between the electrical insulating portions 7*a*/7*b* and the electrode holder 6*a*/6*b* respectively (e.g., the electrode holder 6*a*/6*b* may be made of a completely different material than the insulating portion 7*a*/7*b* and mechanically or chemically (e.g., adhesively) attached thereto.

Likewise, the insulating member 8 can be made of any suitable material which prevents undesirable electrical events (e.g., arcing, melting, etc.) from occurring, as well as any material which is structurally and environmentally suitable for practicing the present invention. Typical materials include structural plastics such as polycarbonate plexiglass (poly(methyl methacrylate), polystyrene, acrylics, and the like. Certain criteria for selecting structural plastics and the like include, but are not limited to, the ability to maintain shape and/or rigidity, while experiencing the electrical, temperature and environmental conditions of the process. Preferred materials include acrylics, plexiglass, and other polymer materials of known chemical, electrical and electrical resistance as well as relatively high mechanical stiffness. In this regard, desirable thicknesses for the member 8 are on the order of about 1/16"-3/4" (1.6 mm-19.1 mm).

The power source 10 can be connected in any convenient electrical manner to the electrodes 1 and 5. For example, wires 11*a* and 11*b* can be located within at least a portion of the electrode holders 6*a*, 6*b* with a primary goal being achieving electrical connections between the portions 11*a*, 11*b* and thus the electrodes 1, 5. Specific details of preferred electrical connections are discussed elsewhere herein.

Figure 2A:
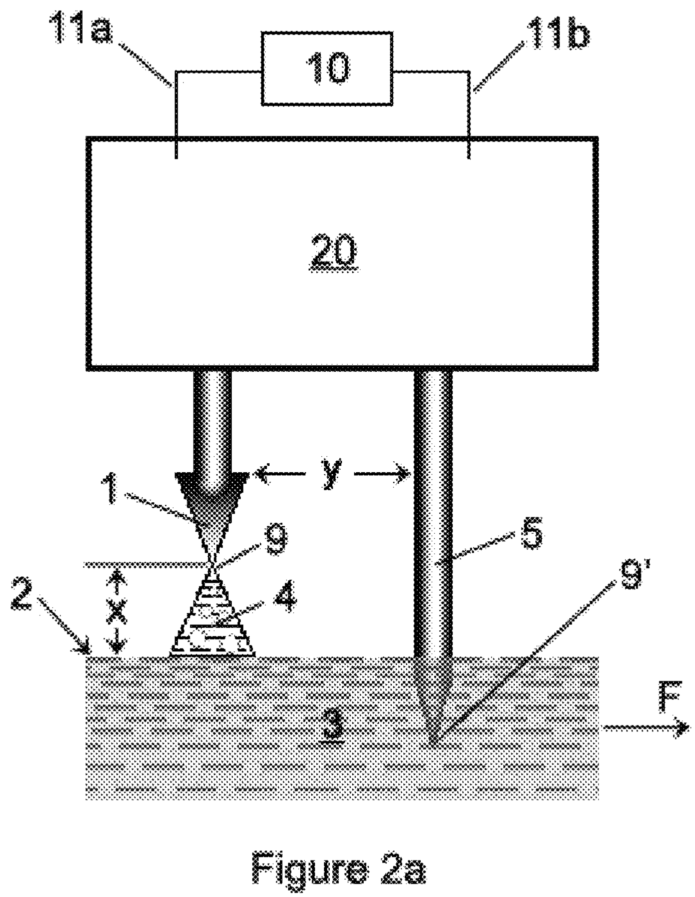
FIGS. 2A and 2B show schematic cross-sectional views of an automatic electrode assembly according to the present invention.
Figure 2B:
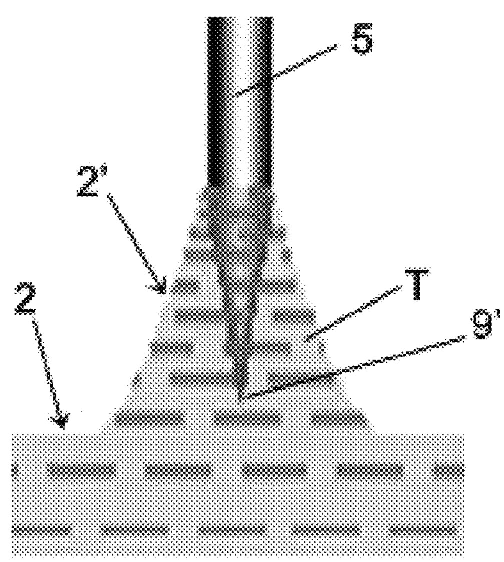

FIG. 2A shows another schematic view of a preferred embodiment of the invention, wherein an inventive control device 20 is connected to the electrodes 1 and 5, such that the control device 20 remotely (e.g., upon command from another device) raises and/or lowers the electrodes 1, 5 relative to the surface 2 of the liquid 3. The inventive control device 20 is discussed in more detail later herein. In this preferred embodiment of the invention, the electrodes 1 and 5 can be, for example, remotely lowered and controlled, and can also be monitored and controlled by a suitable controller or computer (not shown in FIG. 2A) containing a software program (discussed in detail later herein). In this regard, FIG. 2B shows an electrode configuration similar to that shown in FIG. 2A, except that a Taylor cone "T" is utilized for electrical connection between the electrode 5 and the effective surface 2' of the liquid 3. Accordingly, the embodiments shown in FIGS. 1A, 1B and 1C should be considered to be a manually controlled apparatus for use with the teachings of the present invention, whereas the embodiments shown in FIGS. 2A and 2B should be considered to include an automatic apparatus or assembly which can remotely raise and lower the electrodes 1 and 5 in response to appropriate commands. Further, the FIG. 2A and FIG. 2B preferred embodiments of the invention can also employ computer monitoring and computer control of the distance "x" of the tips 9 of the electrode(s) 1 (and tips 9' of the electrodes 5) away from the surface 2 (discussed in greater detail later herein). Thus, the appropriate commands for raising and/or lowering the electrodes 1 and 5 can come from an individual operator and/or a suitable control device such as a controller or a computer (not shown in FIG. 2A).

Figure 3A:
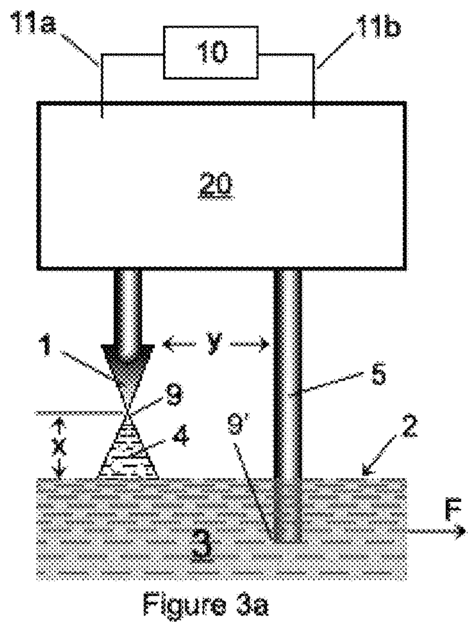
FIGS. 3A-3D show four alternative electrode configurations for the electrodes 1 and 5 controlled by an automatic device.
Figure 3B:
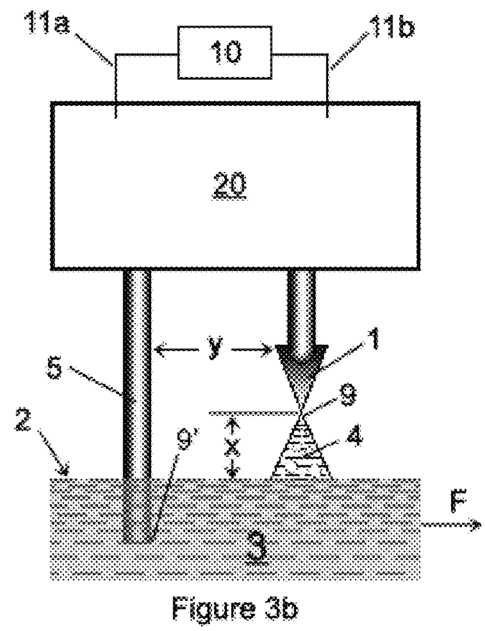
Figure 3C:
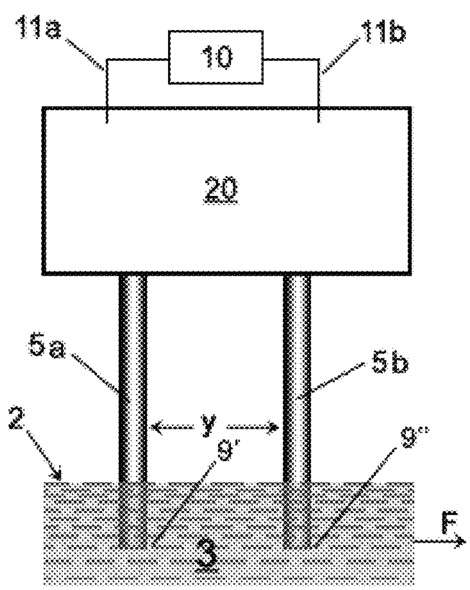
Figure 3D:
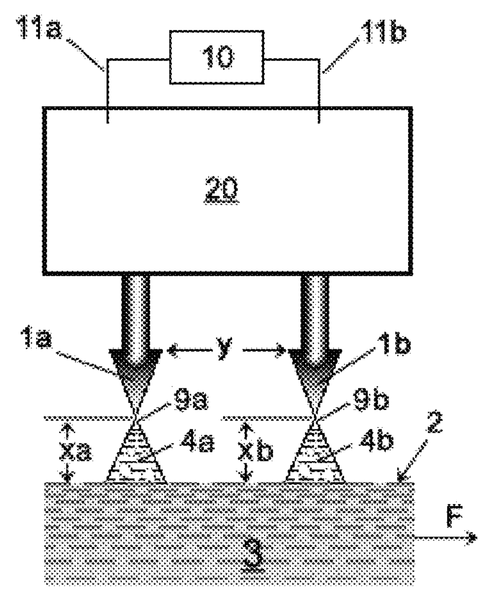

FIG. 3A corresponds in large part to FIGS. 2A and 2B, however, FIGS. 3B, 3C and 3D show various alternative electrode configurations that can be utilized in connection with certain preferred embodiments of the invention. FIG. 3B shows essentially a mirror image electrode assembly from that electrode assembly shown in FIG. 3A. In particular, as shown in FIG. 3B, with regard to the direction "F" corresponding to the flow direction of the liquid 3 in FIG. 3B, the electrode 5 is the first electrode which communicates with the fluid 3 when flowing in the longitudinal direction "F" and the electrode 1 subsequently contacts the fluid 3 already modified by the electrode 5. FIG. 3C shows two electrodes 5*a* and 5*b* located within the fluid 3. This particular electrode configuration corresponds to another preferred embodiment of the invention. In particular, any of the electrode configurations shown in FIGS. 3A-3D, can be used in combination with each other. For example, the electrode configuration (i.e., the electrode set) shown in FIG. 3A can be the first electrode set or configuration that a liquid 3 flowing in the direction "F" encounters. Thereafter, the liquid 3 could encounter a second electrode set or configuration 3*a*; or alternatively, the liquid 3 could encounter a second electrode set or configuration 3*b*; or, alternatively, the liquid 3 flowing in the direction "F" could encounter a second electrode set like that shown in FIG. 3C; or, alternatively, the liquid 3 flowing in the direction "F" could encounter a second electrode set similar to that shown in FIG. 3D. Alternatively, if the first electrode configuration or electrode set encountered by a liquid 3 flowing in the direction "F" is the electrode configuration shown in FIG. 3A, a second electrode set or configuration could be similar to that shown in FIG. 3C and a third electrode set or electrode configuration that a liquid 3 flowing in the direction "F" could encounter could thereafter be any of the electrode configurations shown in FIGS. 3A-3D. Alternatively, a first electrode set or configuration that a liquid 3 flowing in the direction "F" could encounter could be that electrode configuration shown in FIG. 3D; and thereafter a second electrode set or configuration that a liquid 3 flowing in the direction "F" could encounter could be that electrode configuration shown in FIG. 3C; and thereafter any of the electrode sets or configurations shown in FIGS. 3A-3D could comprise the configuration for a third set of electrodes. Still further, a first electrode configuration that a liquid 3 flowing in the direction "F" may encounter could be the electrode configuration shown in FIG. 3A; and a second electrode configuration could be an electrode configuration also shown in FIG. 3A; and thereafter a plurality of electrode configurations similar to that shown in FIG. 3C could be utilized. In another embodiment, all of the electrode configurations could be similar to that of FIG. 3A. In this regard, a variety of electrode configurations (including number of electrode sets utilized) are possible and each electrode configuration results in either very different resultant constituents in the liquid 3 (e.g., nanoparticle or nanoparticle/solution or colloid mixtures) or only slightly different constituents (e.g., nanoparticle/nanoparticle solution or colloid mixtures) all of which may exhibit different properties (e.g., different chemical properties, different reactive properties, different catalytic properties, etc.). In order to determine the desired number of electrode sets and desired electrode configurations and more particularly a desirable sequence of electrode sets, many factors need to be considered including all of those discussed herein such as electrode composition, plasma composition (and atmosphere composition) and intensity, power source, electrode polarity, voltage, amperage, liquid flow rate, liquid composition, liquid conductivity, processing enhancer(s) utilized cross-section (and volume of fluid treated), magnetic, electromagnetic and/or electric fields created in and around each of the electrodes in each electrode assembly, whether any field intensifiers are included, additional desired processing steps (e.g., electromagnetic radiation treatment) the desired amount of certain constituents in an intermediate product and in the final product, etc. Some specific examples of electrode assembly combinations are included in the "Examples" section later herein. However, it should be understood that the embodiments of the present invention allow a plethora of electrode combinations and numbers of electrode sets, any of which can result in very desirable nanoparticles/solutions for different specific chemical, catalytic, biological and/or physical applications.

With regard to the adjustable plasmas 4 shown in FIGS. 3A, 3B and 3D, the distance "x" (or in FIG. 3D "xa" and "xb") are one means for controlling certain aspects of the adjustable plasma 4. In this regard, if nothing else in FIG. 3A, 3B or 3D was changed except for the distance "x", then different intensity adjustable plasmas 4 can be achieved. In other words, one adjustment means for adjusting plasma 4 (e.g., the intensity) is adjusting the distance "x" between the tip 9 of the electrode 1 and the surface 2 of the fluid 3. Changing of such distance can be accomplished up to a maximum distance "x" where the combined voltage and amperage are no longer are sufficient to cause a breakdown of the atmosphere between the tip 9 and the surface 2 according to Equation 1. Accordingly, the maximum preferable distances "x" are just slightly within or below the range where "$E_c$" breakdown of the atmosphere begins to occur. Alternatively, the minimum distances "x" are those distances where an adjustable plasma 4 forms in contrast to the other phenomena discussed earlier herein where a Taylor cone forms. In this regard, if the distance "x" becomes so small that the liquid 3 tends to wick or contact the tip 9 of the electrode 1, then no visually observable plasma will be formed. Accordingly, the minimum and maximum distances "x" are a function of all of the factors discussed elsewhere herein including amount of power applied to the system, composition of the atmosphere, composition (e.g., electrical conductivity) of the liquid, etc. Further, intensity changes in the plasma(s) 4 may also result in certain species becoming active, relative to other processing conditions. This may result in, for example, different spectral emissions from the plasma(s) 4 as well as changes in amplitude of various spectral lines in the plasma(s) 4. Also, such species may have greater and/or lesser effects on the liquid 3 as a function of the temperature of the liquid 3. Certain preferred distances "x" for a variety of electrode configurations and compositions are discussed in the "Examples" section later herein.

Still further, with regard to FIG. 3D, the distances "xa" and "xb" can be about the same or can be substantially different. In this regard, in one preferred embodiment of the invention, for a liquid 3 flowing in the direction "F", it is desirable that the adjustable plasma 4*a* have different properties than the adjustable plasma 4*b*. In this regard, it is possible that different atmospheres can be provided so that the composition of the plasmas 4*a* and 4*b* are different from each other, and it is also possible that the height "xa" and "xb" are different from each other. In the case of differing heights, the intensity or power associated with each of the plasmas 4*a* and 4*b* can be different (e.g., different voltages can be achieved). In this regard, because the electrodes 1*a* and 1*b* are electrically connected, the total amount of power in the system will remain substantially constant, and the amount of power thus provided to one electrode 1*a* or 1*b* will increase at the expense of the power decreasing in the other electrode 1*a* or 1*b*. Accordingly, this is another inventive embodiment for controlling constituents and/or intensity and/or presence or absence of spectral peaks in the plasmas 4*a* and 4*b* and thus adjusting their interactions with the liquid 3 flowing in the direction "F".

Likewise, a set of manually controllable electrode configurations are shown in FIGS. 4A, 4B, 4C and 4D which are shown in a partial cross-sectional view. Specifically, FIG. 4A corresponds substantially to FIG. 1A. Moreover, FIG. 4B corresponds in electrode configuration to the electrode configuration shown in FIG. 3B; FIG. 4C corresponds to FIG. 3C and FIG. 4D corresponds to FIG. 3D. In essence, the manual electrode configurations shown in FIGS. 4A-4D can functionally result in similar materials produced according to the inventive aspects of the invention as those materials and compositions produced corresponding to remotely adjustable (e.g., remote-controlled) electrode configurations shown in FIGS. 3A-3D. However, one or more operators will be required to adjust manually those electrode configurations. Still further, in certain embodiments, a combination of manually controlled and remotely controlled electrode(s) and/or electrode sets may be desirable.

FIGS. 5A-5E show perspective views of various desirable electrode configurations for the electrode(s) 1 shown in the FIGS. herein. The electrode configurations shown in FIGS. SA-SE are representative of a number of different configurations that are useful in various embodiments of the present invention. Criteria for appropriate electrode selection for the electrode 1 include, but are not limited to the following conditions: the need for a very well defined tip or point 9, composition of the electrode 1, mechanical limitations encountered when forming the compositions comprising the electrode 1 into various shapes, shape making capabilities associated with forging techniques, wire drawing and/or casting processes utilized to make shapes, convenience, etc. In this regard, a small mass of material comprising the electrodes 1 shown in, for example, FIGS. 1-4 may, upon creation of the adjustable plasmas 4 according to the present invention, rise to operation temperatures where the size and or shape of the electrode(s) 1 can be adversely affected. The use of the phrase "small mass" should be understood as being a relative description of an amount of material used in an electrode 1, which will vary in amount as a function of composition, forming means, process conditions experienced in the trough member 30, etc. For example, if an electrode 1, comprises silver, and is shaped similar to the electrode shown in FIG. 5A, in certain preferred embodiments shown in the Examples section herein, its mass would be about 0.5 grams-8 grams with a preferred mass of about 1 gram-3 grams; whereas if an electrode 1, comprises copper, and is shaped similar to the electrode shown in FIG. 5A, in certain preferred embodiments shown in the Examples section herein, its mass would be about 0.5 grams-6 grams with a preferred mass of about 1 gram-3 grams; whereas if an electrode 1, comprises zinc, and is shaped similar to the electrode shown in FIG. 5A, in certain preferred embodiments shown in the Examples section herein, its mass would be about 0.5 grams-4 grams with a preferred mass of about 1 gram-3 grams; whereas if the electrode 1 comprises gold and is shaped similar to the electrode shown in FIG. 5E, its mass would be about 1.5 grams-20 grams with a preferred mass of about 8 grams-10 grams. In this regard, for example, when the electrode 1 comprises a relatively small mass, then certain power limitations may be associated with utilizing a small mass electrode 1. In this regard, if a large amount of power is applied to a relatively small mass and such power results in the creation of an adjustable plasma 4, then a large amount of thermal energy can be concentrated in the small mass electrode 1. If the small mass electrode 1 has a very high melting point, then such electrode may be capable of functioning as an electrode 1 in the present invention. However, if the electrode 1 is made of a composition which has a relatively low melting point (e.g., such as silver, aluminum, or the like) then under some (but not all) embodiments of the invention, the thermal energy transferred to the small mass electrode 1 could cause one or more undesirable effects including melting, cracking, or disintegration of the small mass electrode 1. Accordingly, one choice for utilizing lower melting point metals is to use larger masses of such metals so that thermal energy can be dissipated throughout such larger mass. Alternatively, if a small mass electrode 1 with low melting point is desired, then some type of cooling means could be required. Such cooling means include, for example, simple fans blowing ambient or applied atmosphere past the electrode 1, or other such means as appropriate. However, one potential undesirable aspect for providing a cooling fan juxtaposed a small mass electrode 1 is that the atmosphere involved with forming the adjustable plasma 4 could be adversely affected. For example, the plasma could be found to move or gyrate undesirably if, for example, the atmosphere flow around or between the tip 9 and the surface 2 of the liquid 3 was vigorous. Accordingly, the composition of (e.g., the material comprising) the electrode(s) 1 may affect possible suitable electrode physical shape(s) due to, for example, melting points, pressure sensitivities, environmental reactions (e.g., the local environment of the adjustable plasma 4 could cause chemical, mechanical and/or electrochemical erosion of the electrode(s)), etc.

Figure 6:
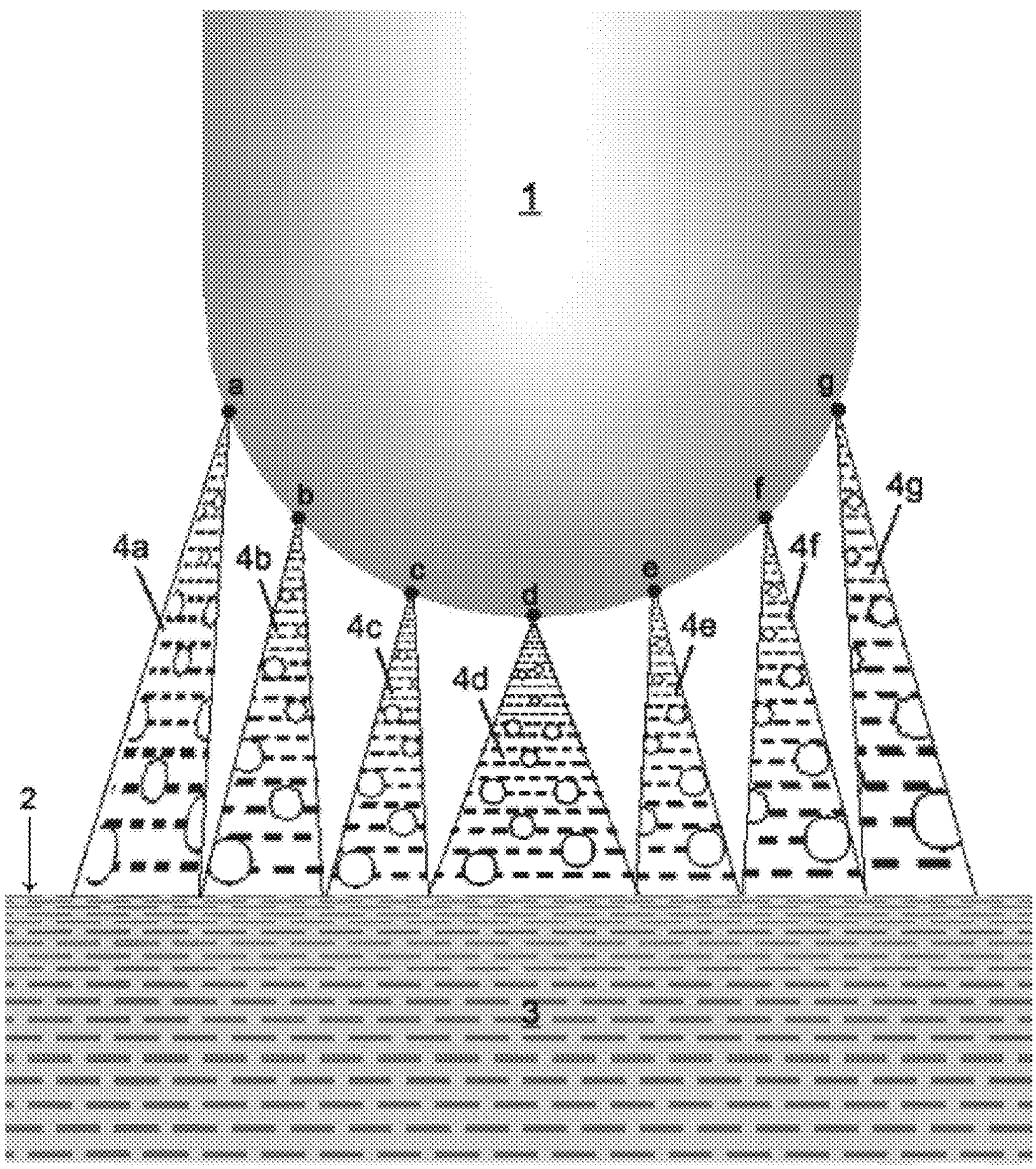
FIG. 6 shows a cross-sectional schematic view of plasmas produced utilizing one specific configuration of electrode 1.

Moreover, it should be understood that in alternative preferred embodiments of the invention, well defined sharp points for the tip 9 are not always required. In this regard, the electrode 1 shown in FIG. 5E (which is a perspective drawing) comprises a rounded point. It should be noted that partially rounded or arc-shaped electrodes can also function as the electrode 1 because often times the adjustable plasma 4, can be positioned or be located along various points of the electrode 1 shown in FIG. 5E. In this regard, FIG. 6 shows a variety of points "a-g" which correspond to initiating points 9 for the plasmas 4*a*-4*g* which occur between the electrode 1 and the surface 2 of the liquid 3. For example, in practicing certain preferred embodiments of the invention, the precise location of the adjustable plasma 4 will vary as a function of time. Specifically, a first plasma 4*d* may be formed at the point d on the tip 9 of the electrode 1. Thereafter, the exact location of the plasma contact point on the tip 9 may change to, for example, any of the other points 4*a*-4*g*. It should be noted that the schematic shown in FIG. 6 is greatly enlarged relative to the actual arrangement in the inventive embodiments, in order to make the point that the tip 9 on the electrode 1 may permit a variety of precise points a-g as being the initiating or contact point on tip 9 on the electrode 1. Essentially, the location of the adjustable plasma 4 can vary in position as a function of time and can be governed by electric breakdown of the atmosphere (according to Equation 1 herein) located between the electrode 1 and the surface 2 of the liquid 3. Further, while the plasmas 4*a*-4*g* are represented as being cone-shaped, it should be understood that the plasmas 4, formed in connection with any of the electrodes 1, shown in FIGS. 5A-5E, may comprise shapes other than cones for a portion of, or substantially all of, the process conditions. For example, shapes best described as lightning bolts or glowing cylinders can also be present. Further, the colors emitted by such plasmas 4 (e.g., in the visible spectrum) can vary wildly from reddish in color, bluish in color, yellow in color, orangish in color, violet in color, white in color, etc., which colors are a function of atmosphere present, voltage, amperage, electrode composition, liquid composition or temperature, etc.

Accordingly, it should be understood that a variety of sizes and shapes corresponding to electrode 1 can be utilized in accordance with the teachings of the present invention. Still further, it should be noted that the tips 9 of the electrodes 1 shown in various FIGS. herein may be shown as a relatively sharp point or a relatively blunt end. Unless specific aspects of these electrode tips are discussed in greater contextual detail, the actual shape of the electrode tip(s) shown in the FIGS. should not be given great significance.

Figure 7A:
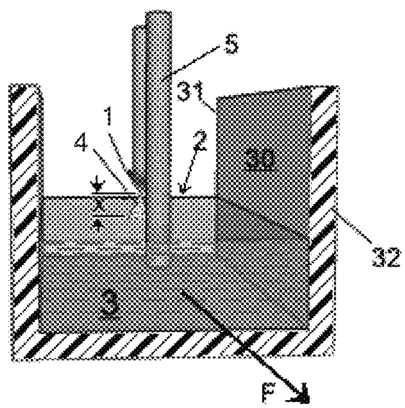
FIGS. 7A and 7B show a cross-sectional perspective view of two electrode assemblies utilized.

FIG. 7A shows a cross-sectional perspective view of the electrode configuration corresponding to that shown in FIG. 2A (and FIG. 3A) contained within a trough member 30. This trough member 30 has a liquid 3 supplied into it from the back side 31 of FIG. 7A and the flow direction "F" is out of the page toward the reader and toward the cross-sectional area identified as 32. The trough member 30 is shown here as a unitary of piece of one material, but could be made from a plurality of materials fitted together and, for example, fixed (e.g., glued, mechanically attached, etc.) by any acceptable means for attaching materials to each other. Further, the trough member 30 shown here is of a rectangular or square cross-sectional shape, but may comprise a variety of different cross-sectional shapes. Further, the trough member 30 does not necessarily need to be made of a single cross-sectional shape, but in another preferred embodiment herein, comprises a plurality of different cross-sectional shapes to accommodate different desirable processing steps. In a first preferred embodiment the cross-sectional shape is roughly the same throughout the longitudinal dimension of the trough member 30 but the size dimensions of the cross-sectional shape change in coordination with different plasma and/or electrochemical reactions. Further, more than two cross-sectional shapes can be utilized in a unitary trough member 30. The advantages of the different cross-sectional shapes include, but are not limited to, different power, electric field, magnetic field, electromagnetic interactions, electrochemical, effects, different chemical reactions in different portions, different temperatures, etc., which are capable of being achieved in different longitudinal portions of the same unitary trough member 30. Still further, some of the different cross-sectional shapes can be utilized in conjunction with, for example, different atmospheres being provided locally or globally such that at least one of the adjustable plasma(s) 4 and/or at least one of the electrochemical reactions occurring at the electrode(s) 5 are a function of different possible atmospheres and/or atmospheric concentrations of constituents therein. Further, the amount or intensity of applied and/or created fields can be enhanced by, for example, cross-sectional shape, as well as by providing, for example, various field concentrators at, near, adjacent to or juxtaposed against various electrode sets or electrode configurations to enhance or diminish one or more reactions occurring there. Accordingly, the cross-sectional shape of the trough member 30 can influence both liquid 3 interactions with the electrode(s) as well as adjustable plasma 4 interactions with the liquid 3.

Still further, it should be understood that a trough member need not be only linear or "I-shaped", but rather, may be shaped like a "Y" or like a "Ψ", each portion of which may have similar or dissimilar cross-sections. One reason for a "Y" or "Ψ"-shaped trough member 30 is that two different sets of processing conditions can exist in the two upper portions of the "Y"-shaped trough member 30. For example, one or more constituents produced in the portion(s) 30*a*, 30*b* and/or 30*c* could be transient and/or semi permanent. If such constituents) produced, for example, in portion 30*a* is to be desirably and controllably reacted with one or more constituents produced in, for example, portion 30*b*, then a final product (e.g., properties of a final product) which results from such mixing could be a function of when constituents formed in the portions 30*a* and 30*b* are mixed together. For example, final properties of products made under similar sets of conditions experienced in, for example, the portions 30*a* and 30*b*, if combined in, for example, the section 30*d* (or 30*d*'), could be different from final properties of products made in the portions 30*a* and 30*b* and such products are not combined together until minutes or hours or days later. Also, the temperature of liquids entering the section 30*d* (or 30*d*') can be monitored/controlled to maximize certain desirable properties of final products and/or minimize certain undesirable products. Further, a third set of processing conditions can exist in the bottom portion of the "Y"-shaped trough member 30. Thus, two different fluids 3, of different compositions and/or different reactants, could be brought together into the bottom portion of the "Y"-shaped trough member 30 and processed together to from a large variety of final products some of which are not achievable by separately manufacturing certain solutions and later mixing such solutions together. Still further, processing enhancers may be selectively utilized in one or more of the portions 30*a*, 30*b*, 30*c*, 30*d* and/or 30*o* (or at any point in the trough member 30).

Figure 11A:
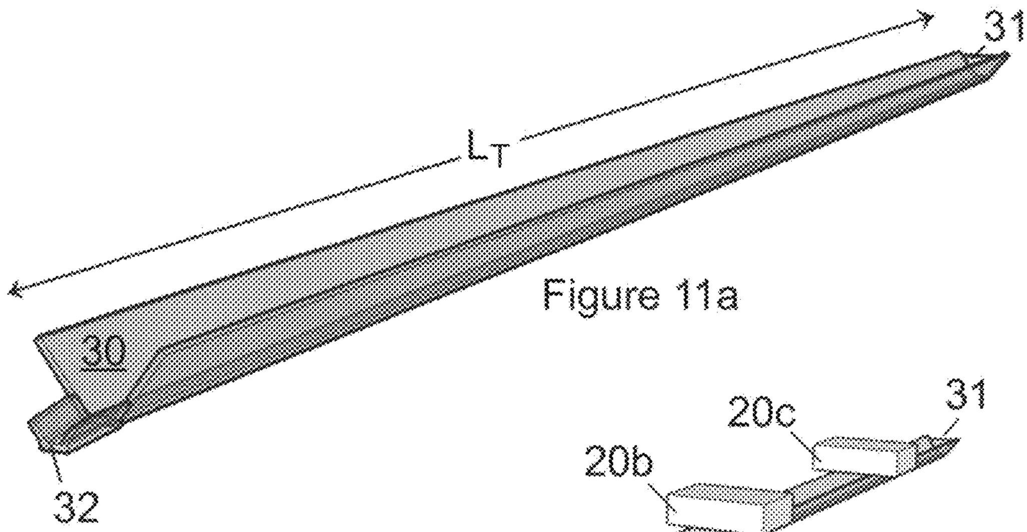
FIGS. 11A-11H show perspective views of various trough members and atmosphere control and support devices.
Figure 11B:
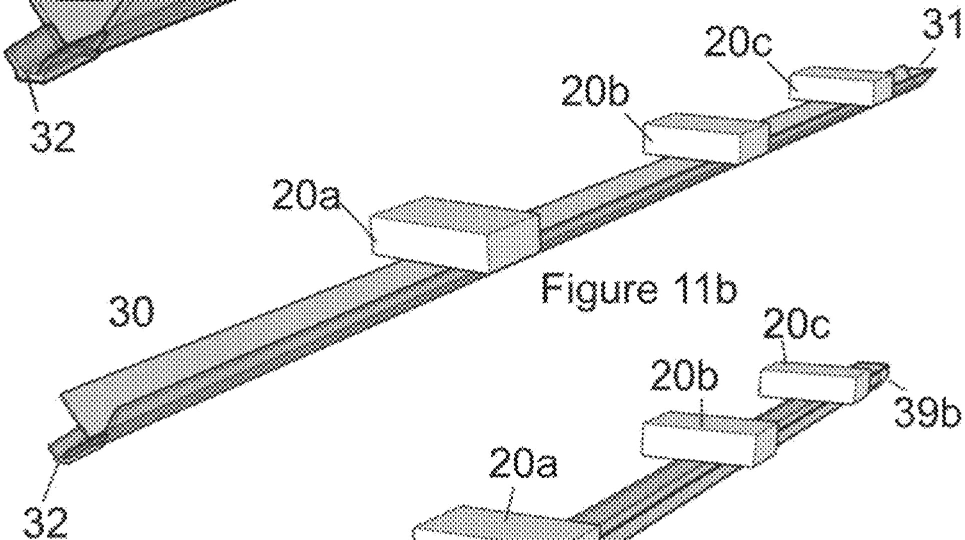
Figure 11C:
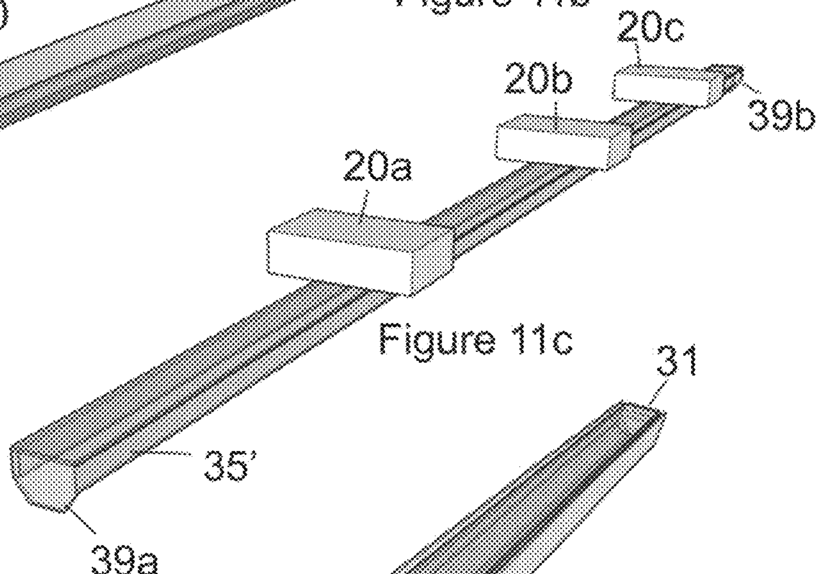
Figure 11D:
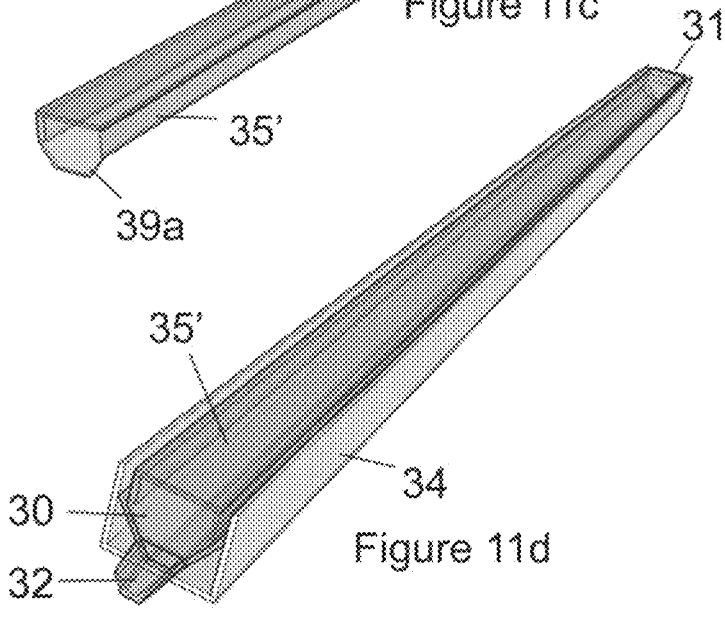
Figure 11E:
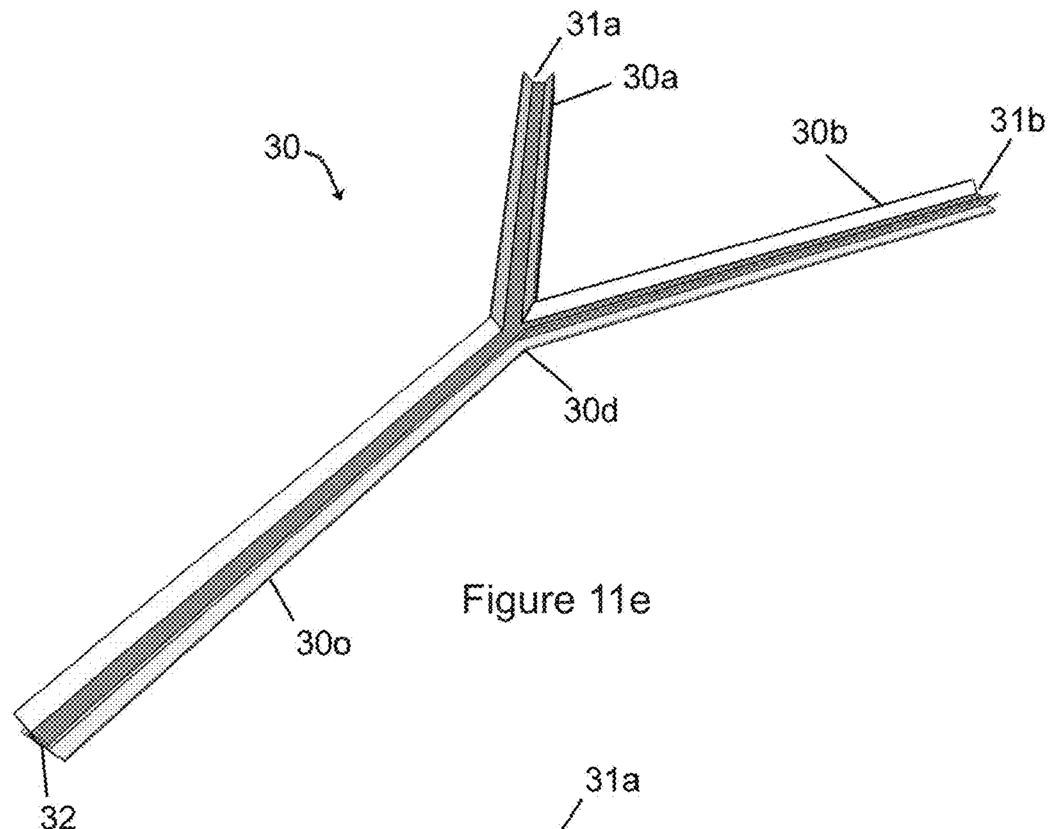

FIG. 11E shows an alternative configuration for the trough member 30. Specifically, the trough member 30 is shown in perspective view and is "Y-shaped". Specifically, the trough member 30 comprises top portions 30*a* and 30*b* and a bottom portion 30*o*. Likewise, inlets 31*a* and 31*b* are provided along with outlet 32. A portion 30*d* corresponds to the point where 30*a* and 30*b* meet 30*o*.

Figure 11F:
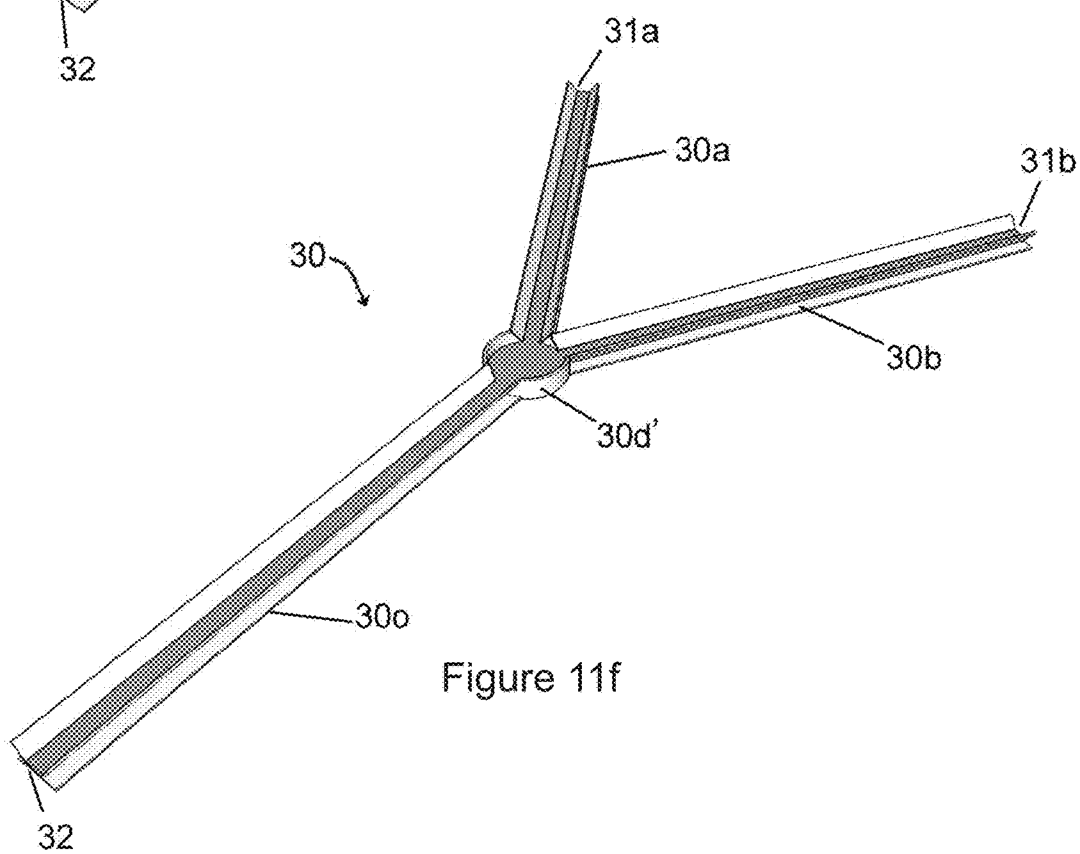

FIG. 11F shows the same "Y-shaped" trough member shown in FIG. 11E, except that the portion 30*d* of FIG. 11E is now shown as a mixing section 30*d*'. In this regard, certain constituents manufactured or produced in the liquid 3 in one or all of, for example, the portions 30*a*, 30*b* and/or 30*c*, may be desirable to be mixed together at the point 30*d* (or 30*d*').

Such mixing may occur naturally at the intersection 30*d* shown in FIG. 11E (i.e., no specific or special section 30*d*' may be needed), or may be more specifically controlled at the portion 30*d*'. It should be understood that the portion 30*d*' could be shaped in any effective shape, such as square, circular, rectangular, etc., and be of the same or different depth relative to other portions of the trough member 30. In this regard, the area 30*d* could be a mixing zone or subsequent reaction zone and may be a function of a variety of design and/or production considerations.

Figure 11G:
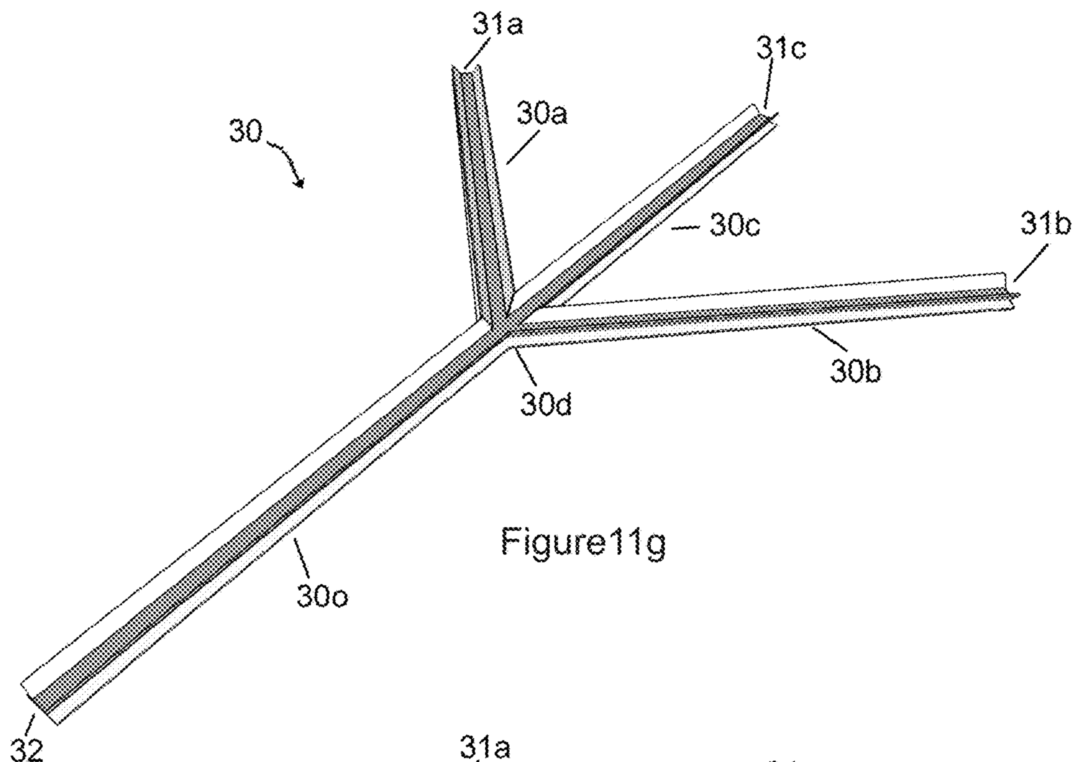
Figure 11H:
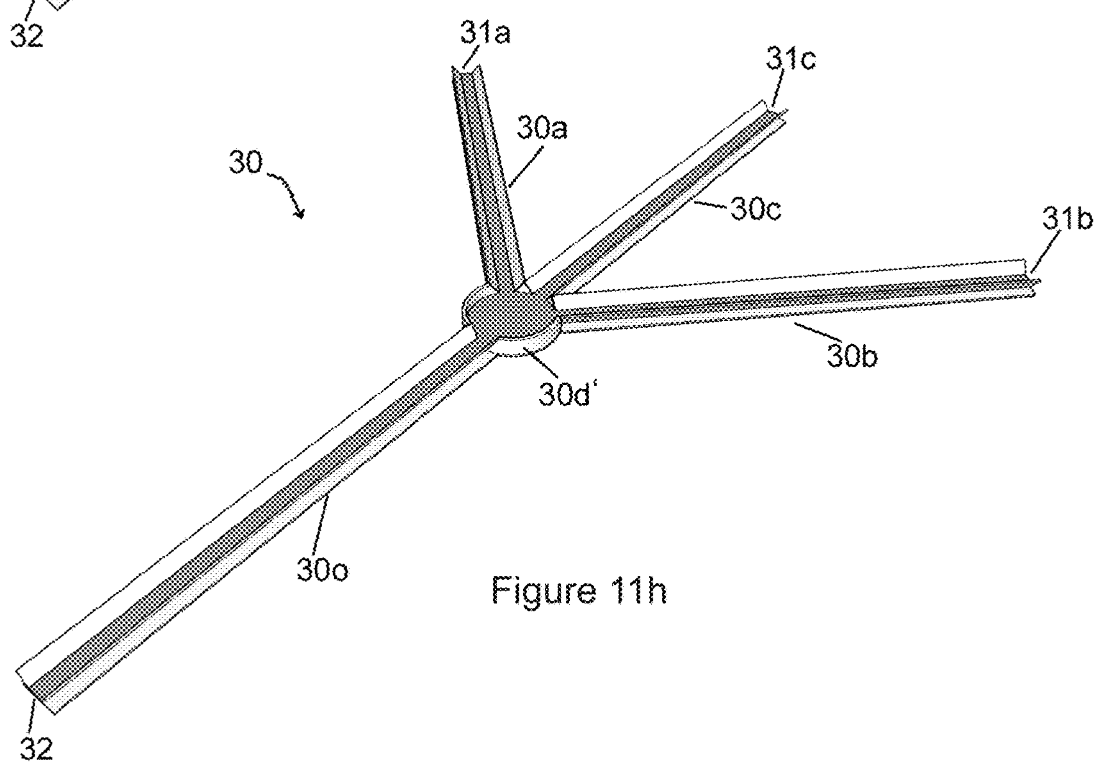

FIGS. 11G and 11H show a "Ψ-shaped" trough member 30. Specifically, a new portion 30*c* has been added. Other features of FIGS. 11G and 11H are similar to those features shown in FIGS. 11E and 11F.

It should be understood that a variety of different shapes can exist for the trough member 30, any one of which can produce desirable results.

Again with regard to FIG. 7A, the flow direction of the liquid 3 is out of the page toward the reader and the liquid 3 flows past each of the electrode(s) 1 and 5, sequentially, which are, in this embodiment, located substantially in line with each other relative to the longitudinal flow direction "F" of the liquid 3 within the trough member 30 (e.g., their arrangement is parallel to each other and the longitudinal dimensions of the trough member 30). This causes the liquid 3 to first experience an adjustable plasma 4 interaction with the liquid 3 (e.g., a conditioning reaction) and subsequently then the conditioned liquid 3 can thereafter interact with the electrode 5. As discussed earlier herein, a variety of constituents can be expected to be present in the adjustable plasma 4 and at least a portion of such constituents or components (e.g., chemical, physical and/or fluid components) will interact with at least of the portion of the liquid 3 and change the liquid 3. Accordingly, subsequent reactions (e.g., electrochemical) can occur at electrode(s) 5 after such components or constituents or alternative liquid structure(s) have been caused to be present in the liquid 3. Thus, it should be apparent from the disclosure of the various embodiments herein, that the type, amount and activity of constituents or components in the adjustable plasma 4 are a function of a variety of conditions associated with practicing the preferred embodiments of the present invention. Such constituents (whether transient or semi permanent), once present and/or having at least partially modified the liquid 3, can favorably influence subsequent reactions along the longitudinal direction of the trough member 30 as the liquid 3 flows in the direction "F" therethrough. By adjusting the types of reactions (e.g., electrode assemblies and reactions associated therewith) and sequentially providing additional similar or different electrode sets or assemblies (such as those shown in FIGS. 3A-3D) a variety of compounds, nanoparticles and nanoparticle/solution(s) or colloids can be achieved. For example, nanoparticles may experience growth (e.g., apparent or actual) within the liquid 3 as constituents within the liquid 3 pass by and interact with various electrode sets (e.g., 5, 5) along the longitudinal length of the trough member 30 (discussed in greater detail in the Examples section). Such growth, observed near or at, for example, electrode sets 5, 5, seems to be greatly accelerated when the liquid 3 has previously been contacted with an electrode set 1, 5 and/or 1, 1 and/or 5, 1; or when certain processing enhancer(s) have been added; and such growth can also be influenced by the temperature of the liquid 3. Depending on the particular final uses of the liquid 3 produced according to the invention, certain nanoparticles, some constituents in the liquid 3, etc., could be considered to be very desirable; whereas other constituents could be considered to be undesirable. However, due to the versatility of the electrode design, number of electrode sets, electrode set configuration, fluid composition, fluid temperature, processing enhancer, processing conditions at each electrode (e.g., voltage, amps, frequency, etc.) or in each electrode assembly or set, sequencing of different electrode assemblies or sets along the longitudinal direction of the trough member 30, shape of the trough member 30, cross-sectional size and shape of the trough member 30, all such conditions can contribute to more or less of desirable or undesirable constituents or components (transient or semi-permanent) present in the liquid 3 and/or differing structures of the liquid per se during at least a portion of the processes disclosed herein.

Figure 7B:
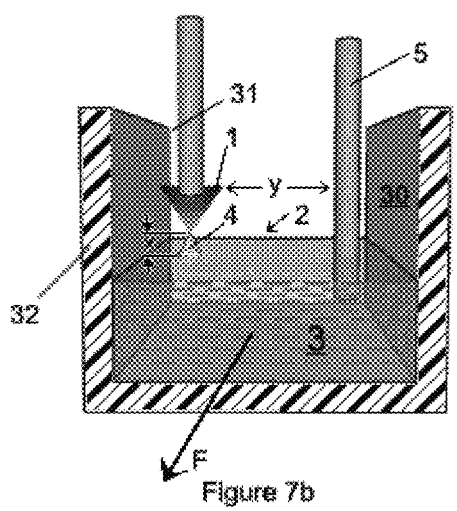

FIG. 7B shows a cross-sectional perspective view of the electrode configuration shown in FIG. 2A (as well as in FIG. 3A), however, these electrodes 1 and 5 are rotated on the page 90 degrees relative to the electrodes 1 and 5 shown in FIGS. 2A and 3A. In this embodiment of the invention, the liquid 3 contacts the adjustable plasma 4 generated between the electrode 1 and the surface 2 of the liquid 3, and the electrode 5 at substantially the same point along the longitudinal flow direction "F" (i.e., out of the page) of the trough member 30. The direction of liquid 3 flow is longitudinally along the trough member 30 and is out of the paper toward the reader, as in FIG. 7A. Accordingly, as discussed immediately above herein, it becomes clear that the electrode assembly shown in FIG. 7B can be utilized with one or more of the electrode assemblies or sets discussed above herein as well as later herein. For example, one use for the assembly shown in FIG. 7B is that when the constituents created in the adjustable plasma 4 (or resultant products in the liquid 3) flow downstream from the contact point with the surface 2 of the liquid 3, a variety of subsequent processing steps can occur. For example, the distance "y" between the electrode 1 and the electrode 5 (as shown, for example, in FIG. 7B) is limited to certain minimum distances as well as certain maximum distances. The minimum distance "y" is that distance where the distance slightly exceeds the electric breakdown "$E_c$" of the atmosphere provided between the closest points between the electrodes 1 and 5. Whereas the maximum distance "y" corresponds to the distance at a maximum which at least some conductivity of the fluid permits there to be an electrical connection from the power source 10 into and through each of the electrode(s) 1 and 5 as well as through the liquid 3. The maximum distance "y" will vary as a function of, for example, constituents within the liquid 3 (e.g., conductivity of the liquid 3), temperature of the liquid 3, etc. Accordingly, some of those highly energized constituents comprising the adjustable plasma 4 could be very reactive and could create compounds (reactive or otherwise) within the liquid 3 and a subsequent processing step could be enhanced by the presence of such constituents or such very reactive components or constituents could become less reactive as a function of, for example, time. Moreover, certain desirable or undesirable reactions could be minimized or maximized by locations and/or processing conditions associated with additional electrode sets downstream from that electrode set shown in, for example, FIG. 7B. Further, some of the components in the adjustable plasma 4 could be increased or decreased in presence in the liquid 3 by controlling the temperature of the liquid 3.

Figure 8A:
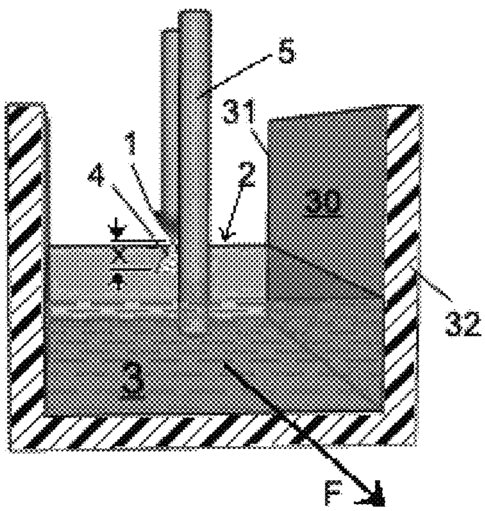
FIGS. 8A-8D show schematic perspective views of four different electrode assemblies corresponding to those electrode assemblies shown in FIGS. 3A-3D, respectively.
Figure 8B:
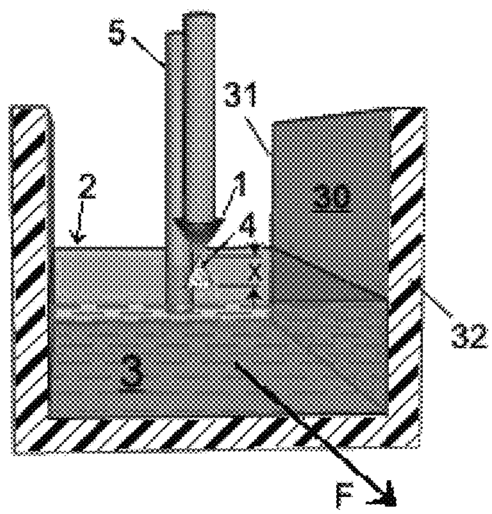

FIG. 8A shows a cross-sectional perspective view of the same embodiment shown in FIG. 7A. In this embodiment, as in the embodiment shown in FIG. 7A, the fluid 3 firsts interacts with the adjustable plasma 4 created between the electrode 1 and the surface 2 of the liquid 3. Thereafter the plasma influenced or conditioned fluid 3, having been changed (e.g., conditioned, or modified or prepared) by the adjustable plasma 4, thereafter communicates with the electrode 5 thus permitting various electrochemical reactions to occur, such reactions being influenced by the state (e.g., chemical composition, physical or crystal structure, excited state(s), temperature, etc., of the fluid 3 (and constituents or components in the fluid 3)). An alternative embodiment is shown in FIG. 8B. This embodiment essentially corresponds in general to those embodiments shown in FIGS. 3B and 4B. In this embodiment, the fluid 3 first communicates with the electrode 5, and thereafter the fluid 3 communicates with the adjustable plasma 4 created between the electrode 1 and the surface 2 of the liquid 3.

Figure 8C:
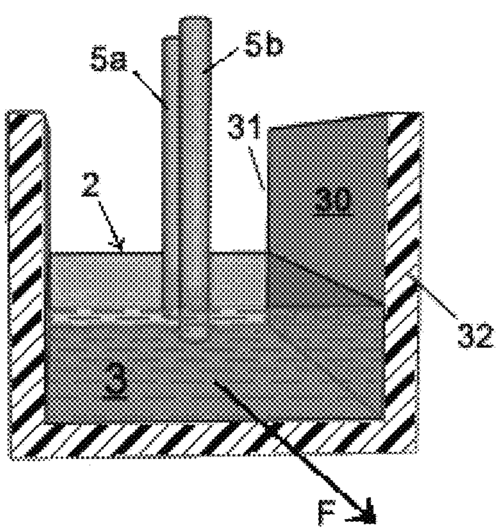

FIG. 8C shows a cross-sectional perspective view of two electrodes 5*a* and 5*b* (corresponding to the embodiments shown in FIGS. 3C and 4C) wherein the longitudinal flow direction "F" of the fluid 3 contacts the first electrode 5*a* and thereafter contacts the second electrode 5*b* in the direction "F" of fluid flow.

Figure 8D:
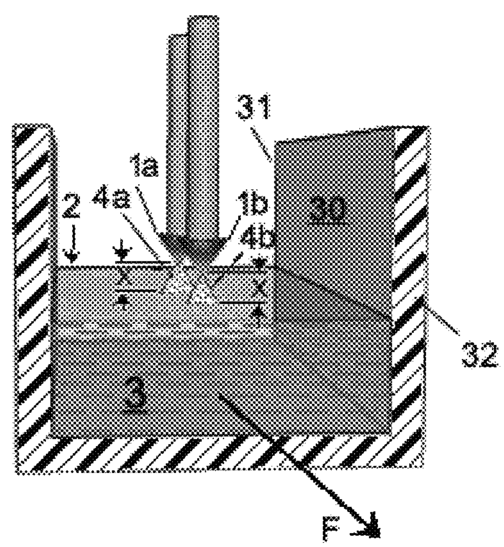

Likewise, FIG. 8D is a cross-sectional perspective view and corresponds to the embodiments shown in FIGS. 3D and 4D. In this embodiment, the fluid 3 communicates with a first adjustable plasma 4*a* created by a first electrode 1*a* and thereafter communicates with a second adjustable plasma 4*b* created between a second electrode 1*b* and the surface 2 of the fluid 3.

Accordingly, it should be clear from the disclosed embodiments that the various electrode configurations or sets shown in FIGS. 8A-8D can be used alone or in combination with each other in a variety of different configurations. A number of factors direct choices for which electrode configurations are best to be used to achieve various desirable results. As well, the number of such electrode configurations and the location of such electrode configurations relative to each other all influence resultant constituents within the liquid 3, zeta potential, nanoparticles and/or nanoparticle/liquid solutions or colloids resulting therefrom. Some specific examples of electrode configuration dependency are included in the "Examples" section herein. However, it should be apparent to the reader a variety of differing products and desirable set-ups are possible according to the teachings (both expressly and inherently) present herein, which differing set-ups can result in very different products (discussed further in the "Examples" section herein).

Figure 9A:
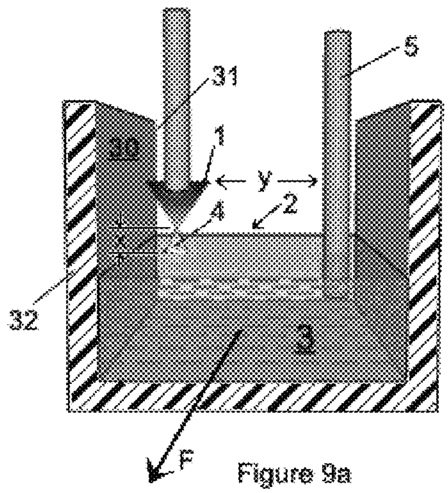
FIGS. 9A-9D show schematic perspective views of four different electrode assemblies corresponding to those electrode assemblies shown in FIGS. 4A-4D, respectively.

FIG. 9A shows a cross-sectional perspective view and corresponds to the electrode configuration shown in FIG. 7B (and generally to the electrode configuration shown in FIGS. 3A and 4A but is rotated 90 degrees relative thereto). All of the electrode configurations shown in FIGS. 9A-9D are situated such that the electrode pairs shown are located substantially at the same longitudinal point along the trough member 30, as in FIG. 7B.

Figure 9B:
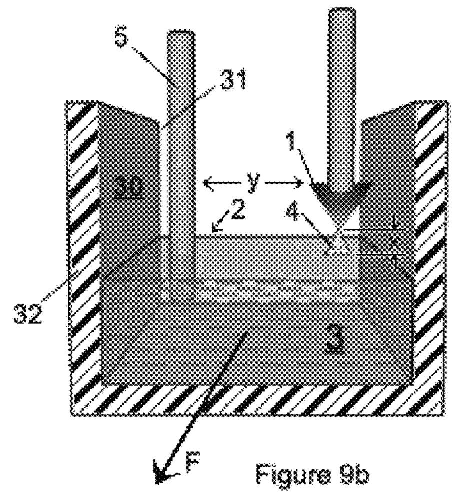

Likewise, FIG. 9B corresponds generally to the electrode configuration shown in FIGS. 3B and 4B, and is rotated 90 degrees relative to the configuration shown in FIG. 8B.

Figure 9C:
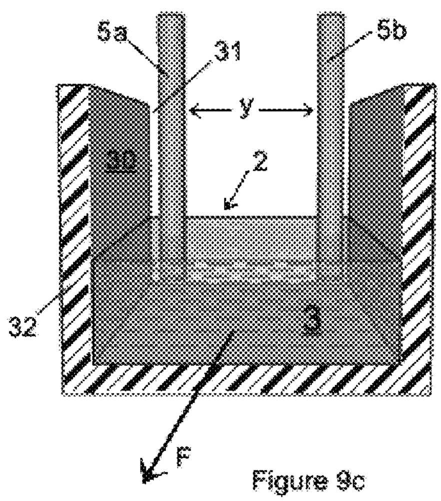

FIG. 9C shows an electrode configuration corresponding generally to FIGS. 3C and 4C, and is rotated 90 degrees relative to the electrode configuration shown in FIG. 8C.

Figure 9D:
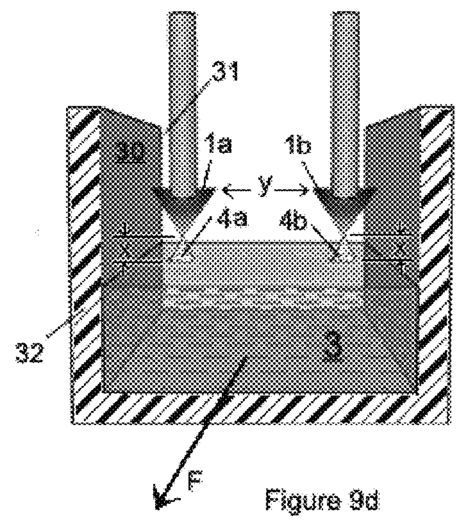

FIG. 9D shows an electrode configuration corresponding generally to FIGS. 3D and 4D and is rotated 90 degrees relative to the electrode configuration shown in FIG. 8D.

As discussed herein, the electrode configurations or sets shown generally in FIGS. 7, 8 and 9, all can create different results (e.g., different sizes, shapes, amounts, compounds, constituents, functioning of nanoparticles present in a liquid, different liquid structures, different pH's, different zeta potentials, etc.) as a function of their orientation and position relative to the fluid flow direction "F" and relative to their positioning in the trough member 30, relative to each other. Further, the electrode number, compositions, size, specific shapes, voltages applied, amperages applied, frequencies applied, fields created, distance between electrodes in each electrode set, distance between electrode sets, etc., can all influence the properties of the liquid 3 as it flows past these electrodes and hence resultant properties of the materials (e.g., the constituents in the fluid 3, the nanoparticles and/or the nanoparticle/solution or colloids) produced therefrom. Additionally, the liquid-containing trough member 30, in some preferred embodiments, contains a plurality of the electrode combinations shown in FIGS. 7, 8 and 9. These electrode assemblies may be all the same or may be a combination of various different electrode configurations. Moreover, the electrode configurations may sequentially communicate with the fluid "F" or may simultaneously, or in parallel communicate with the fluid "F". Different exemplary electrode configurations are shown in additional FIGS. later herein and are discussed in greater detail later herein (e.g., in the "Examples" section) in conjunction with different constituents produced in the liquid 3, nanoparticles and/or different nanoparticle/solutions or colloids produced therefrom.

Figure 10A:
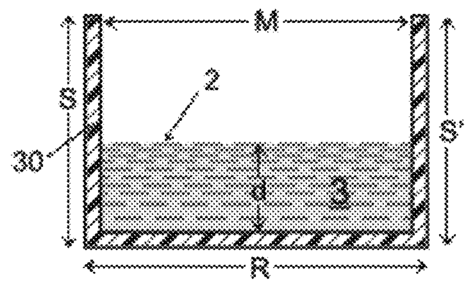
FIGS. 10A-10E show cross-sectional views of various trough members 30.

FIG. 10A shows a cross-sectional view of the liquid containing trough member 30 shown in FIGS. 7, 8 and 9. This trough member 30 has a cross-section corresponding to that of a rectangle or a square and the electrodes (not shown in FIG. 10A) can be suitably positioned therein.

Likewise, several additional alternative cross-sectional embodiments for the liquid-containing trough member 30 are shown in FIGS. 10B, 10C, 10D and 10E. The distance "S" and "S'" for the preferred embodiments shown in each of FIGS. 10A-10E measures, for example, between about 1" and about 3" (about 2.5 cm-7.6 cm). The distance "M" ranges from about 2" to about 4" (about 5 cm-10 cm). The distance "R" ranges from about 1/16"-1/2" to about 3" (about 1.6 mm-13 mm to about 76 mm) All of these embodiments (as well as additional configurations that represent alternative embodiments are within the metes and bounds of this inventive disclosure) can be utilized in combination with the other inventive aspects of the invention. It should be noted that the amount of liquid 3 contained within each of the liquid containing trough members 30 is a function not only of the depth "d", but also a function of the actual cross-section. Briefly, the amount or volume and/or temperature of liquid 3 present in and around the electrode(s) 1 and 5 can influence one or more effect(s) (e.g., fluid or concentration effects including field concentration effects) of the adjustable plasma 4 upon the liquid 3 as well as one or more chemical or electrochemical interaction(s) of the electrode 5 with the liquid 3. These effects include not only adjustable plasma 4 conditioning effects (e.g., interactions of the plasma electric and magnetic fields, interactions of the electromagnetic radiation of the plasma, creation of various chemical species (e.g., Lewis acids, Bronsted-Lowry acids, etc.) within the liquid, pH changes, zeta potentials, etc.) upon the liquid 3, but also the concentration or interaction of the adjustable plasma 4 with the liquid 3 and electrochemical interactions of the electrode 5 with the liquid 3. Different effects are possible due to, for example, the actual volume of liquid present around a longitudinal portion of each electrode assembly 1 and/or 5. In other words, for a given length along the longitudinal direction of the trough member 30, different amounts or volume of liquid 3 will be present as a function of cross-sectional shape. As a specific example, reference is made to FIGS. 10A and 10C. In the case of FIG. 10A, the rectangular shape shown therein has a top portion about the same distance apart as the top portion shown in FIG. 10C. However, the amount of fluid along the same given longitudinal amount (i.e., into the page) will be significantly different in each of FIGS. 10A and 10C.

Similarly, the influence of many aspects of the electrode 5 on the liquid 3 (e.g., electrochemical interactions) is also, at least partially, a function of the amount of fluid juxtaposed to the electrode(s) 5, the temperature of the fluid 3, etc., as discussed immediately above herein.

Further, electric and magnetic field concentrations can also significantly affect the interaction of the plasma 4 with the liquid 3, as well as affect the interactions of the electrode(s) 5 with the liquid 3. For example, without wishing to be bound by any particular theory or explanation, when the liquid 3 comprises water, a variety of electric field, magnetic field and/or electromagnetic field influences can occur. Specifically, water is a known dipolar molecule which can be at least partially aligned by an electric field. Having partial alignment of water molecules with an electric field can, for example, cause previously existing hydrogen bonding and bonding angles to be oriented at an angle different than prior to electric field exposure, cause different vibrational activity, or such bonds may actually be broken. Such changing in water structure can result in the water having a different (e.g., higher) reactivity. Further, the presence of electric and magnetic fields can have opposite effects on ordering or structuring of water and/or nanoparticles present in the water. It is possible that unstructured or small structured water having relatively fewer hydrogen bonds relative to, for example, very structured water, can result in a more reactive (e.g., chemically more reactive) environment. This is in contrast to open or higher hydrogen-bonded networks which can slow reactions due to, for example, increased viscosity, reduced diffusivities and a smaller activity of water molecules. Accordingly, factors which apparently reduce hydrogen bonding and hydrogen bond strength (e.g., electric fields) and/or increase vibrational activity, can encourage reactivity and kinetics of various reactions.

Further, electromagnetic radiation can also have direct and indirect effects on water and it is possible that the electromagnetic radiation per se (e.g., that radiation emitted from the plasma 4), rather than the individual electric or magnetic fields alone can have such effects, as disclosed in the aforementioned published patent application entitled Methods for Controlling Crystal Growth, Crystallization, Structures and Phases in Materials and Systems which has been incorporated by reference herein. Different spectra associated with different plasmas 4 are discussed in the "Examples" section herein.

Further, by passing an electric current through the electrode(s) 1 and/or 5 disclosed herein, the voltages present on, for example, the electrode(s) 5 can have an orientation effect (i.e., temporary, semi-permanent or longer) on the water molecules. The presence of other constituents (i.e., charged species) in the water may enhance such orientation effects. Such orientation effects may cause, for example, hydrogen bond breakage and localized density changes (i.e., decreases). Further, electric fields are also known to lower the dielectric constant of water due to the changing (e.g., reduction of) the hydrogen bonding network. Such changing of networks should change the solubility properties of water and may assist in the concentration or dissolution of a variety of gases and/or constituents or reactive species in the liquid 3 (e.g., water) within the trough member 30. Still further, it is possible that the changing or breaking of hydrogen bonds from application of electromagnetic radiation (and/or electric and magnetic fields) can perturb gas/liquid interfaces and result in more reactive species. Still further, changes in hydrogen bonding can affect carbon dioxide hydration resulting in, among other things, pH changes. Thus, when localized pH changes occur around, for example, at least one or more of the electrode(s) 5 (or electrode(s) 1), many of the possible reactants (discussed elsewhere herein) will react differently with themselves and/or the atmosphere and/or the adjustable plasma(s) 4 as well as the electrode(s) 1 and/or 5, per se. The presence of Lewis acids and/or Bronsted-Lowry acids, can also greatly influence reactions.

Further, a trough member 30 may comprise more than one cross-sectional shapes along its entire longitudinal length. The incorporation of multiple cross-sectional shapes along the longitudinal length of a trough member 30 can result in, for example, a varying field or concentration or reaction effects being produced by the inventive embodiments disclosed herein. Additionally, various modifications can be added at points along the longitudinal length of the trough member 30 which can enhance and/or diminish various of the field effects discussed above herein. In this regard, compositions of materials in and/or around the trough (e.g., metals located outside or within at least a portion of the trough member 30) can act as concentrators or enhancers of various of the fields present in and around the electrode(s) 1 and/or 5. Additionally, applications of externally-applied fields (e.g., electric, magnetic, electromagnetic, etc.) and/or the placement of certain reactive materials within the trough member 30 (e.g., at least partially contacting a portion of the liquid 3 flowing thereby) can also result in: (1) a gathering, collecting or filtering of undesirable species; or (2) placement of desirable species onto, for example, at least a portion of an outer surface of nanoparticles already formed upstream therefrom. Further, it should be understood that a trough member 30 may not be linear or "I-shaped", but rather may be "Y-shaped" or "Ψ-shaped", with each portion of the "Y" or "Ψ" having a different (or similar) cross-section. One reason for a "Y" or "Ψ-shaped" trough member 30 is that two (or more) different sets of processing conditions can exist in the two (or more) upper portions of the "Y-shaped" or "Ψ-shaped" trough member 30. Additionally, the "Y-shaped" or "Ψ-shaped" trough members 30 permit certain transient or semi-permanent constituents present in the liquids 3 to interact; in contrast to separately manufactured liquids 3 in "I-shaped" trough members and mixing such liquids 3 together at a point in time which is minutes, hours or days after the formation of the liquids 3. Further, another additional set of processing conditions can exist in the bottom portion of the "Y-shaped" or "Ψ-shaped" trough members 30. Thus, different fluids 3, of different compositions and/or different reactants (e.g., containing certain transient or semi-permanent species), could be brought together into the bottom portion of the "Y-shaped" or "Ψ-shaped" trough members 30 and processed together to from a large variety of final products.

Also, the initial temperature of the liquid 3 input into the trough member 30 can also affect a variety of properties of products produced according to the disclosure herein. For example, different temperatures of the liquid 3 can affect particle size and shape, concentration or amounts of various formed constituents (e.g., transient, semi-permanent or permanent constituents), pH, zeta potential, etc. Likewise, temperature controls along at least a portion of, or substantially all of, the trough member 30 can have desirable effects. For example, by providing localized cooling, resultant properties of products formed can be controlled desirably.

Further, certain processing enhancers may also be added to or mixed with the liquid(s) 3. The processing enhancers include both solids and liquids (and gases in some cases). The processing enhancer(s) may provide certain processing advantages and/or desirable final product characteristics. Some portion of the processing enhancer(s) may function as, for example, desirable seed crystals and/or crystal plane growth promoters in the electrochemical growth processes of the invention. Such processing enhancers may also desirably affect current and/or voltage conditions between electrodes 1/5 and/or 5/5. Examples of processing enhancers may include certain acids, certain bases, salts, carbonates, nitrates, etc. Processing enhancers may assist in one or more of the electrochemical reactions disclosed herein; and/or may assist in achieving one or more desirable properties in products formed according to the teachings herein.

For example, certain processing enhancers may dissociate into positive ions (cations) and negative ions (anions). The anions and/or cations, depending on a variety of factors including liquid composition, concentration of ions, applied fields, frequency of applied fields, temperature, pH, zeta potential, etc., will navigate or move toward oppositely charged electrodes. When said ions are located at or near such electrodes, the ions may take part in one or more reactions with the electrode(s) and/or other constituent(s) located at or near such electrode(s). Sometimes ions may react with one or more materials in the electrode (e.g., when NaCl is used as a processing enhancer, various metal chloride (MCl, $MCl_2$, etc.) may form). Such reactions may be desirable in some cases or undesirable in others. Further, sometimes ions present in a solution between electrodes may not react to form a product such as MCl, $MCl_2$, etc., but rather may influence material in the electrode (or near the electrode) to form metallic crystals that are "grown" from material provided by the electrode. For example, certain metal ions may enter the liquid 3 from the electrode 5 and be caused to come together (e.g., nucleate) to form constituents (e.g., ions, nanoparticles, etc.) within the liquid 3. In the case of gold, a variety of surface planes from which crystal growth can occur are available. For example, single crystal surfaces {111}, {100} and {110} are among the most frequently studied and well understood surfaces. The presence of certain species such as ions (e.g., added to or being donated by electrode 5) in an electrochemical crystal growth process can influence (e.g., nucleate and/or promote) the presence or absence of one or more of such surfaces. Specifically, a certain anion under certain field conditions may assist in the presence of more {111} surfaces relative to other crystal surfaces which can result in a preponderance of certain shapes of nanocrystals relative to other shapes (e.g., more decahedral shapes relative to other shapes such as triangles). For example, in one embodiment herein related to the contiguous production of a gold colloid by the inventive techniques herein (i.e., sample GB-139) the mean percentage of triangular-shaped nanoparticles was at least 15% and the mean percentage of pentagon-shaped nanoparticles was at least 29%. Accordingly, not less than about 45% of the nanoparticles were highly reactive triangular and pentagonal-shapes. Additional highly reactive shapes were also present, however, the aforementioned shapes were more prevalent. By controlling the presence or absence (e.g., relative amounts) of such faces, crystal shapes (e.g., hexagonal plates, octahedron, triangles and pentagonal decahedrons) and/or crystal sizes can thus be relatively controlled and/or relative catalytic activity can be controlled.

Moreover, the presence of certain shaped crystals containing specific crystal planes can cause different reactions and/or different reactions selectively to occur under substantially identical conditions. One crystal shape of a gold nanoparticle (e.g., {111}) can result in one set of reactions to occur (e.g., causing a particular enantiomer to result) whereas a different crystal shape (e.g., {100}) can result in a different endpoint. Thus, by controlling amount (e.g., concentration), size, the presence or absence of certain crystal planes, and/or shape of nanoparticles, certain reactions (e.g., biological, chemical, etc. reactions) can be desirably influenced and/or controlled.

Further, certain processing enhancers may also include materials that may function as charge carriers, but may themselves not be ions. Specifically, metallic-based particles, either introduced or formed in situ in the electrochemical processing techniques disclosed herein, can also function as charge carriers, crystal nucleators and/or promoters, which may result in the formation of a variety of different shapes (e.g., hexagonal plates, octahedron, triangles and pentagonal decahedrons). Once again, the presence of particular particle sizes, crystal planes and/or shapes of such crystals can desirably influence certain reactions, such as catalytic reactions to occur.

Still further, once a set of crystal planes begins to grow and/or a seed crystal occurs (or is provided) the amount of time that a formed particle is permitted to dwell at or near one or more electrodes in an electrochemical process can result in the size of such particles increasing as a function of time (e.g., they can grow).

In many of the preferred embodiments herein, one or more AC sources are utilized. The rate of change from "+" polarity on one electrode to "−" polarity on the same electrode is known as Hertz, Hz, Frequency, or cycles per second. In the United States, the standard output frequency is 60 Hz, while in Europe it is predominantly 50 Hz. The frequency can also influence size and/or shape of crystals formed according to the electrochemical techniques herein. For example, initiating or growing crystals the first have attractive forces exerted on constituents forming the crystal(s) and/or the crystals themselves (once formed) (e.g., due to different charges) and then repulsive forces exerted on such constituents (e.g., due to like charges). These factors also clearly play a large role in particle size and/or shapes.

Temperature also plays an important role. In some of the preferred embodiments disclosed herein, the boiling point temperature of the water is approached in at least a portion of the processing vessel where gold nanoparticles are formed. For example, output water temperature in some of the gold Examples herein ranges from about 60° C.-99° C. Temperature influences resultant product as well as the amount of resultant product. For example, while it is possible to cool the liquid 3 in the trough member 30 by a variety of known techniques (as disclosed in some of the later Examples herein), many of the Examples herein do not cool the liquid 3, resulting in evaporation of a portion of the liquid 3 during processing thereof.

Figure 10B:
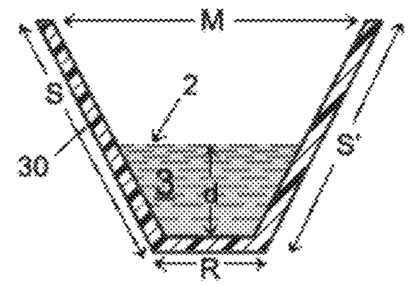
Figure 10C:
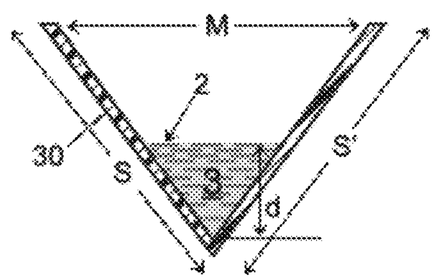
Figure 10D:
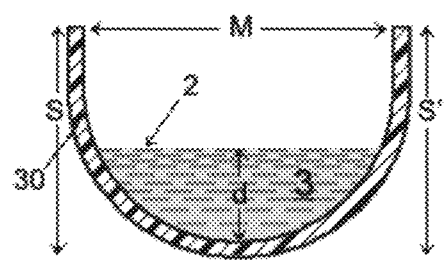
Figure 10E:
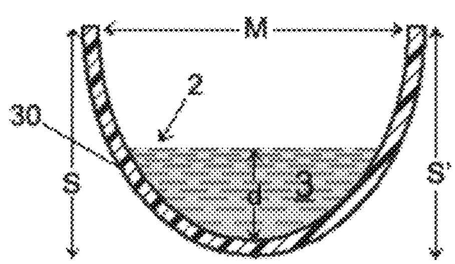

FIG. 11A shows a perspective view of one embodiment of substantially all of the trough member 30 shown in FIG. 10B including an inlet portion or inlet end 31 and an outlet portion or outlet end 32. The flow direction "F" discussed in other FIGS. herein corresponds to a liquid entering at or near the end 31 (e.g., utilizing an appropriate means for delivering fluid into the trough member 30 at or near the inlet portion 31) and exiting the trough member 30 through the outlet end 32. Additionally, while a single inlet end 31 is shown in FIG. 11A, multiple inlet(s) 31 could be present near that shown in FIG. 11A, or could be located at various positions along the longitudinal length of the trough member 30 (e.g., immediately upstream from one or more of the electrode sets positioned along the trough member 30). Thus, the plurality of inlet(s) 31 can permit the introduction of more than one liquid 3 (or different temperatures of a similar liquid 3) at a first longitudinal end 31 thereof; or the introduction of multiple liquids 3 (or multiple temperatures of similar liquids 3) at the longitudinal end 31; the introduction of different liquids 3 (or different temperatures of similar liquids 3) at different positions along the longitudinal length of the trough member 30; and/or one or more processing enhancers at different positions along the longitudinal length of the trough member 30.

FIG. 11B shows the trough member 30 of FIG. 11A containing three control devices 20 removably attached to a top portion of the trough member 30. The interaction and operations of the control devices 20 containing the electrodes 1 and/or 5 are discussed in greater detail later herein.

FIG. 11C shows a perspective view of the trough member 30 incorporating an atmosphere control device cover 35'. The atmosphere control device or cover 35' has attached thereto a plurality of control devices 20 (in FIG. 11C, three control devices 20*a*, 20*b* and 20*c* are shown) containing electrode(s) 1 and/or 5. The cover 35' is intended to provide the ability to control the atmosphere within and/or along a substantial portion of (e.g., greater than 50% of) the longitudinal direction of the trough member 30, such that any adjustable plasma(s) 4 created at any electrode(s) 1 can be a function of voltage, current, current density, etc., as well as any controlled atmosphere provided. The atmosphere control device 35' can be constructed such that one or more electrode sets can be contained within. For example, a localized atmosphere can be created between the end portions 39*a* and 39*b* along substantially all or a portion of the longitudinal length of the trough member 30 and a top portion of the atmosphere control device 35'. An atmosphere can be caused to flow into at least one inlet port (not shown) incorporated into the atmosphere control device 35' and can exit through at least one outlet port (not shown), or be permitted to enter/exit along or near, for example, the portions 39*a* and 39*b*. In this regard, so long as a positive pressure is provided to an interior portion of the atmosphere control device 35' (i.e., positive relative to an external atmosphere) then any such gas can be caused to bubble out around the portions 39*a* and/or 39*b*. Further, depending on, for example, if one portion of 39*a* or 39*b* is higher relative to the other, an internal atmosphere may also be appropriately controlled. A variety of atmospheres suitable for use within the atmosphere control device 35' include conventionally regarded non-reactive atmospheres like noble gases (e.g., argon or helium) or conventionally regarded reactive atmospheres like, for example, oxygen, nitrogen, ozone, controlled air, etc. The precise composition of the atmosphere within the atmosphere control device 35' is a function of desired processing techniques and/or desired constituents to be present in the plasma 4 and/or the liquid 3, desired nanoparticles/composite nanoparticles and/or desired nanoparticles/solutions or colloids.

FIG. 11D shows the apparatus of FIG. 11C including an additional support means 34 for supporting the trough member 30 (e.g., on an exterior portion thereof), as well as supporting (at least partially) the control devices 20 (not shown in this FIG. 11C). It should be understood that various details can be changed regarding, for example, the cross-sectional shapes shown for the trough member 30, atmosphere control(s) (e.g., the atmosphere control device 35') and external support means (e.g., the support means 34) all of which should be considered to be within the metes and bounds of this inventive disclosure. The material(s) comprising the additional support means 34 for supporting the trough member 30 can be any material which is convenient, structurally sound and non-reactive under the process conditions practiced for the present inventive disclosure. Acceptable materials include polyvinyls, acrylics, plexiglass, structural plastics, nylons, teflons, etc., as discussed elsewhere herein.

FIG. 11E shows an alternative configuration for the trough member 30. Specifically, the trough member 30 is shown in perspective view and is "Y-shaped". Specifically, the trough member 30 comprises top portions 30*a* and 30*b* and a bottom portion 30*o*. Likewise, inlets 31*a* and 31*b* are provided along with outlet 32. A portion 30*d* corresponds to the point where 30*a* and 30*b* meet 30*o*.

FIG. 11F shows the same "Y-shaped" trough member shown in FIG. 11E, except that the portion 30*d* of FIG. 11 is now shown as a mixing section 30*d'*. In this regard, certain constituents manufactured or produced in the liquid 3 in one or all of, for example, the portions 30*a*, 30*b* and/or 30*c*, may be desirable to be mixed together at the point 30*d* (or 30*d'*). Such mixing may occur naturally at the intersection 30*d* shown in FIG. 11E (i.e., no specific or special section 30*d'* may be needed), or may be more specifically controlled at the portion 30*d'*. It should be understood that the portion 30*d'* could be shaped in any effective shape, such as square, circular, rectangular, etc., and be of the same or different depth relative to other portions of the trough member 30. In this regard, the area 30*d* could be a mixing zone or subsequent reaction zone. Further, it should be understood that liquids 3 having substantially similar or substantially different composition(s) can be produced at substantially similar or substantially different temperatures along the portions 30*a*, 30*b* and/or 30*c*. Also, the temperature of the liquid(s) input into each of the portions 30*a*, 30*b* and/or 30*c* an also be controlled to desirably affect processing conditions within these portions 30*a*, 30*b* and/or 30*c*.

FIGS. 11G and 11H show a "Ψ-shaped" trough member 30. Specifically, a new portion 30C has been added. Other features of FIGS. 11G and 11H are similar to those features shown in 11E and 11F.

It should be understood that a variety of different shapes can exist for the trough member 30, any one of which can produce desirable results.

Figure 12A:
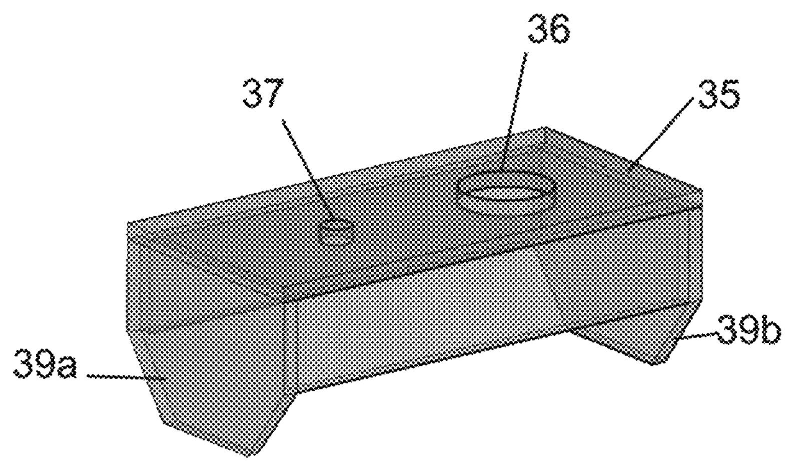
FIGS. 12A and 12B show various atmosphere control devices for locally controlling atmosphere around electrode sets 1 and/or 5.

FIG. 12A shows a perspective view of a local atmosphere control apparatus 35 which functions as a means for controlling a local atmosphere around at least one electrode set 1 and/or 5 so that various localized gases can be utilized to, for example, control and/or effect certain parameters of the adjustable plasma 4 between electrode 1 and surface 2 of the liquid 3, as well as influence certain constituents within the liquid 3 and/or adjustable electrochemical reactions at and/or around the electrode(s) 5. The through-holes 36 and 37 shown in the atmosphere control apparatus 35 are provided to permit external communication in and through a portion of the apparatus 35. In particular, the hole or inlet 37 is provided as an inlet connection for any gaseous species to be introduced to the inside of the apparatus 35. The hole 36 is provided as a communication port for the electrodes 1 and/or 5 extending therethrough which electrodes are connected to, for example, the control device 20 above the apparatus 35. Gasses introduced through the inlet 37 can simply be provided at a positive pressure relative to the local external atmosphere and may be allowed to escape by any suitable means or pathway including, but not limited to, bubbling out around the portions 39*a* and/or 39*b* of the apparatus 35, when such portions are caused, for example, to be at least partially submerged beneath the surface 2 of the liquid 3. Generally, the portions 39*a* and 39*b* can break the surface 2 of the liquid 3 effectively causing the surface 2 to act as part of the seal to form a localized atmosphere around electrode sets 1 and/or 5. When a positive pressure of a desired gas enters through the inlet port 37, small bubbles can be caused to bubble past, for example, the portions 39*a* and/or 39*b*. Additionally, the precise location of the inlet 37 can also be a function of the gas flowing therethrough. Specifically, if a gas providing at least a portion of a localized atmosphere is heavier than air, then an inlet portion above the surface 2 of the liquid 3 should be adequate. However, it should be understood that the inlet 37 could also be located in, for example, 39*a* or 39*b* and could be bubbled through the liquid 3 and trapped within an interior portion of the localized atmosphere control apparatus 35. Accordingly, precise locations of inlets and/or outlets in the atmosphere control device 35 are a function of several factors.

Figure 12B:
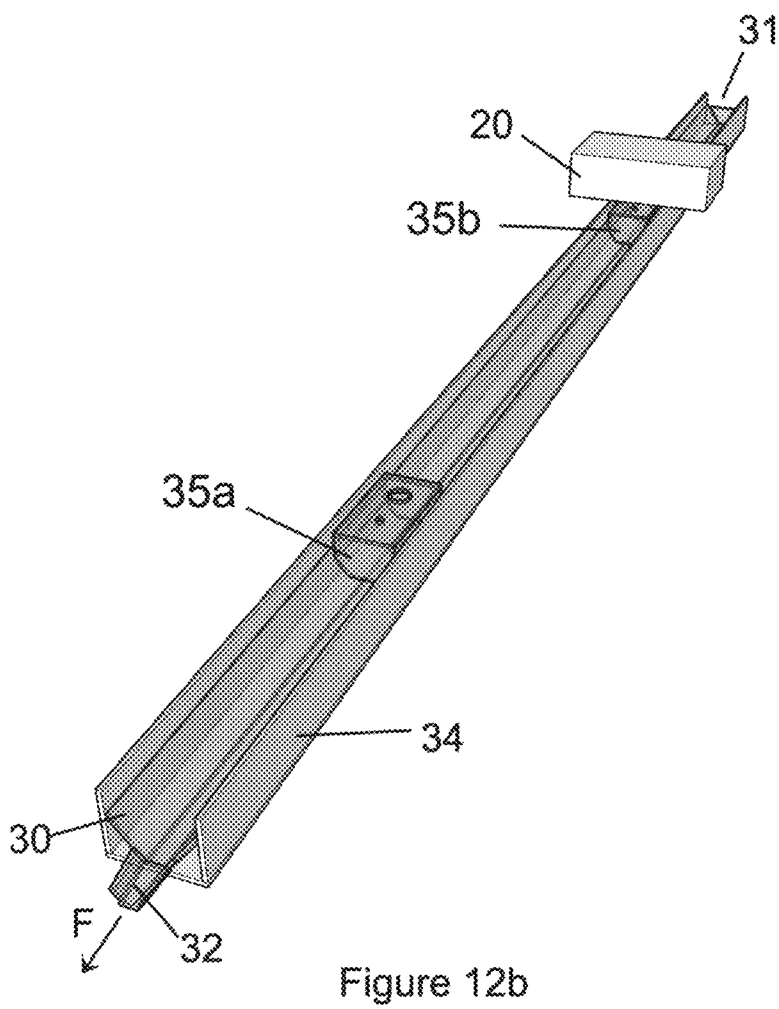

FIG. 12B shows a perspective view of first atmospheric control apparatus 35*a* in the foreground of the trough member 30 contained within the support housing 34. A second atmospheric control apparatus 35*b* is included and shows a control device 20 located thereon. "F" denotes the longitudinal direction of flow of liquid 3 through the trough member 30. A plurality of atmospheric control apparatuses 35*a*, 35*b* (as well as 35*c*, 35*d*, etc. not shown in drawings) can be utilized instead of a single atmosphere control device such as that shown in FIG. 11C. The reason for a plurality of localized atmosphere control devices 35*a*-35*x* is that different atmospheres can be present around each electrode assembly, if desired. Accordingly, specific aspects of the adjustable plasma(s) 4 as well as specific constituents present in the liquid 3 and specific aspects of the adjustable electrochemical reactions occurring at, for example, electrode(s) 5, will be a function of, among other things, the localized atmosphere. Accordingly, the use of one or more localized atmosphere control device 35*a* provides tremendous flexibility in the formation of desired constituents, nanoparticles, and nanoparticle solution mixtures.

Figure 13:
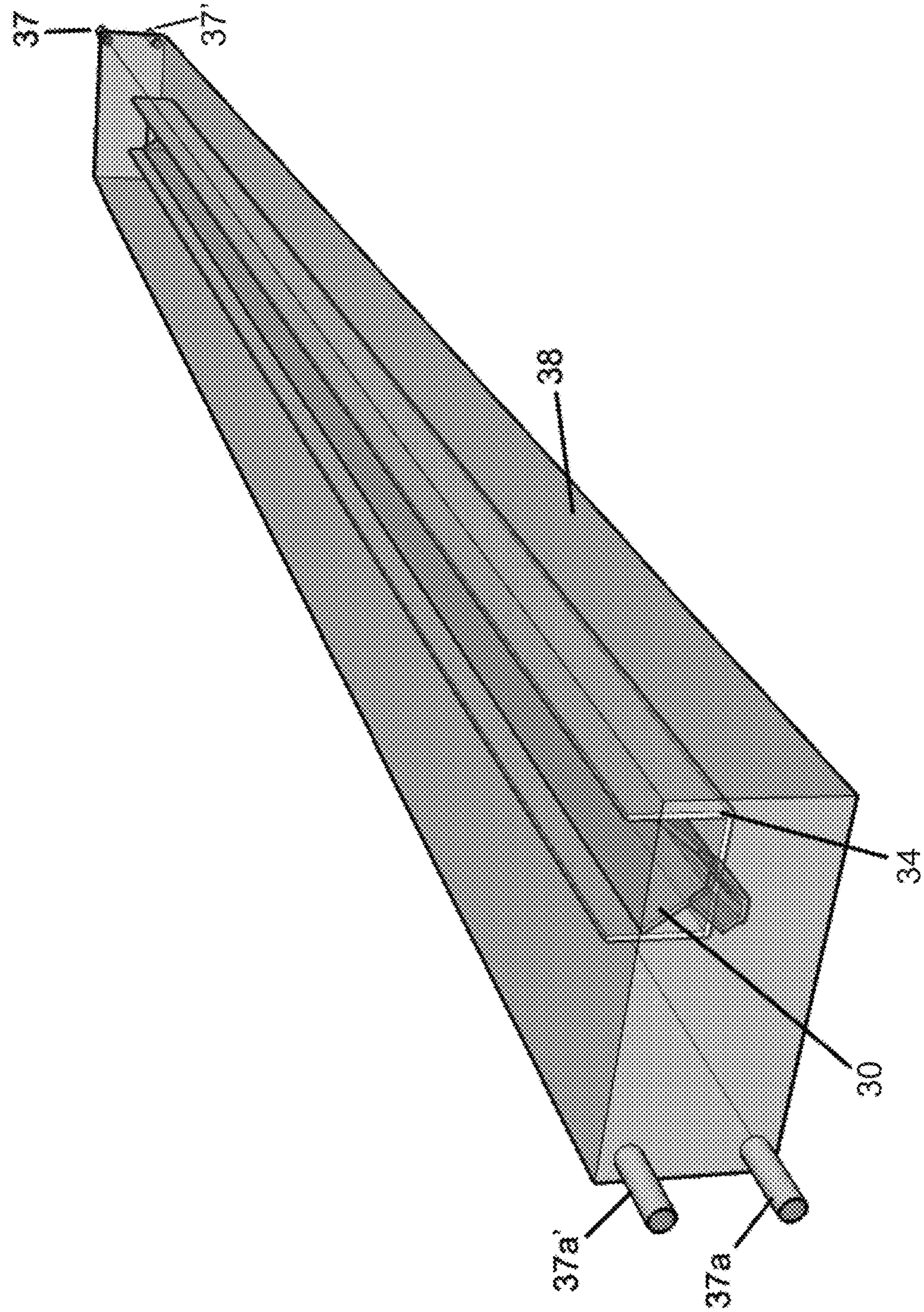
FIG. 13 shows an atmosphere control device for controlling atmosphere around the entire trough member 30.

FIG. 13 shows a perspective view of an alternative atmosphere control apparatus 38 wherein the entire trough member 30 and support means 34 are contained within the atmospheric control apparatus 38. In this case, for example, one or more gas inlets 37, 37' can be provided along with one or more gas outlets 37*a*, 37*a*'. The exact positioning of the gas inlets 37, 37' and gas outlets 37*a*, 37*a*' on the atmospheric control apparatus 38 is a matter of convenience, as well as a matter of the composition of the atmosphere. In this regard, if, for example, the atmosphere provided is heavier than air or lighter than air, inlet and outlet locations can be adjusted accordingly. As discussed elsewhere herein, the gas inlet and gas outlet portions could be provided above or below the surface 2 of the liquid 3. Of course, when gas inlet portions are provided below the surface 2 of the liquid 3 (not specifically shown in this FIG.), it should be understood that bubbled (e.g., nanobubbles and/or microbubbles) of the gas inserted through the gas inlet 37 could be incorporated into the liquid 3, for at least a portion of the processing time. Such bubbles could be desirable reaction constituents (i.e., reactive with) the liquid 3 and/or constituents within the liquid 3 and/or the electrode(s) 5, etc. Accordingly, the flexibility of introducing a localized atmosphere below the surface 2 of the liquid 3 can provide additional processing control and/or processing enhancements.

Figure 14:
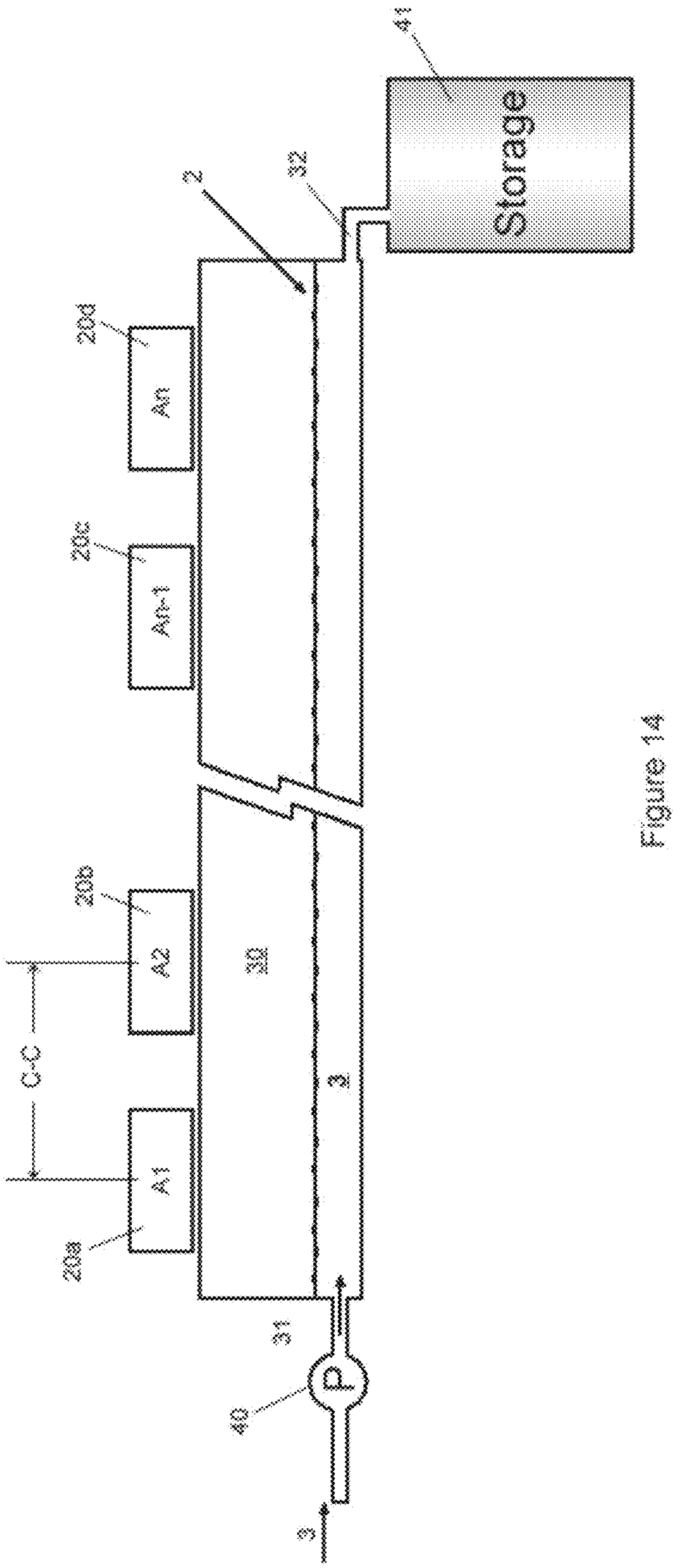
FIG. 14 shows a schematic cross-sectional view of a set of control devices 20 located on a trough member 30 with a liquid 3 flowing therethrough.

FIG. 14 shows a schematic view of the general apparatus utilized in accordance with the teachings of some of the preferred embodiments of the present invention. In particular, this FIG. 14 shows a side schematic view of the trough member 30 containing a liquid 3 therein. On the top of the trough member 30 rests a plurality of control devices 20*a*-20*d* (i.e., four of which are shown) which are, in this embodiment, removably attached thereto. The control devices 20 may of course be permanently fixed in position when practicing various embodiments of the invention. The precise number of control devices 20 (and corresponding electrode(s) 1 and/or 5 as well as the configuration(s) of such electrodes) and the positioning or location of the control devices 20 (and corresponding electrodes 1 and/or 5) are a function of various preferred embodiments of the invention some of which are discussed in greater detail in the "Examples" section herein. However, in general, an input liquid 3 (for example water) is provided to a liquid transport means 40 (e.g., a liquid peristaltic pump or a liquid pumping means for pumping liquid 3) for pumping the liquid water 3 into the trough member 30 at a first-end 31 thereof. For example, the input liquid 3 (e.g., water) could be introduced calmly or could be introduced in an agitated manner. Agitation includes, typically, the introduction of nanobubbles or microbubbles, which may or may not be desirable. If a gentle introduction is desired, then such input liquid 3 (e.g., water) could be gently provided (e.g., flow into a bottom portion of the trough). Alternatively, a reservoir (not shown) could be provided above the trough member 30 and liquid 3 could be pumped into such reservoir. The reservoir could then be drained from a lower portion thereof, a middle portion thereof or an upper portion thereof as fluid levels provided thereto reached an appropriate level. The precise means for delivering an input liquid 3 into the trough member 30 at a first end 31 thereof is a function of a variety of design choices. Further, as mentioned above herein, it should be understood that additional input portions 31 could exist longitudinally along different portions of the trough member 30. The distance "c-c" is also shown in FIG. 14. In general, the distance "c-c" (which corresponds to center-to-center longitudinal measurement between each control device 20) can be any amount or distance which permits desired functioning of the embodiments disclosed herein.

The distance "c-c" should not be less than the distance "y" (e.g., ¼"-2"; 6 mm-51 mm) and in a preferred embodiment about 1.5" (about 38 mm) shown in, for example, FIGS. 1-4 and 7-9. The Examples show various distances "c-c", however, to give a general understanding of the distance "c-c", approximate distances vary from about 4" to about 8" (about 102 mm to about 203 mm) apart, however, more or less separation is of course possible (or required) as a function of application of all of the previous embodiments disclosed herein. In the Examples disclosed later herein, preferred distances "c-c" in many of the Examples are about 7"-8" (about 177-203 mm), however, such distances "c-c" are smaller in many of the gold-based Examples herein.

Figure 15A:
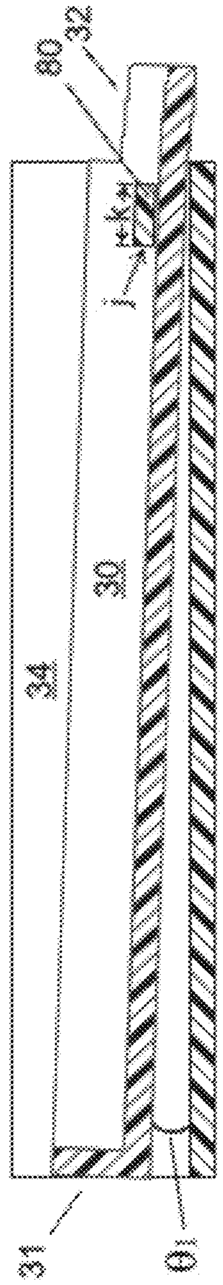
FIGS. 15A and 15B show schematic cross-sectional views of various angles $\theta_1$ and $\theta_2$ for the trough member 30.
Figure 15B:
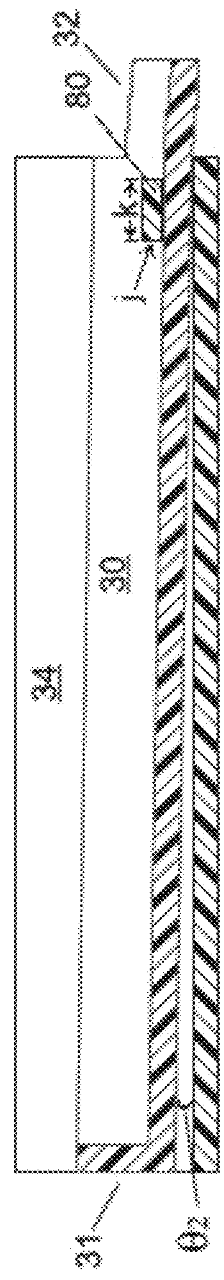

In general, the liquid transport means 40 may include any means for moving liquids 3 including, but not limited to a gravity-fed or hydrostatic means, a pumping means, a peristaltic pumping means, a regulating or valve means, etc. However, the liquid transport means 40 should be capable of reliably and/or controllably introducing known amounts of the liquid 3 into the trough member 30. Once the liquid 3 is provided into the trough member 30, means for continually moving the liquid 3 within the trough member 30 may or may not be required. However, a simple means includes the trough member 30 being situated on a slight angle θ (e.g., less than one degree to a few degrees) relative to the support surface upon which the trough member 30 is located. For example, the difference in vertical height between an inlet portion 31 and an outlet portion 32 relative to the support surface may be all that is required, so long as the viscosity of the liquid 3 is not too high (e.g., any viscosity around the viscosity of water can be controlled by gravity flow once such fluids are contained or located within the trough member 30). In this regard, FIG. 15 shows cross-sectional views of the trough member 30 forming an angle $\theta_1$; and FIG. 15B shows a cross-sectional view of the trough member 30 forming an angle $\theta_2$; and a variety of acceptable angles for trough member 30 that handle various viscosities, including low viscosity fluids such as water. The angles that are desirable for different cross-sections of the trough member 30 and low viscosity fluids typically range between a minimum of about 0.1-5 degrees for low viscosity fluids and a maximum of 5-10 degrees for higher viscosity fluids. However, such angles are a function of a variety of factors already mentioned, as well as, for example, whether a specific fluid interruption means or a dam 80 is included along a bottom portion or interface where the liquid 3 contacts the trough member 30. Such flow interruption means could include, for example, partial mechanical dams or barriers along the longitudinal flow direction of the trough member 30. In this regard, $\theta_1$ is approximately 5-10° and $\theta_2$ is approximately 0.1-5°. FIGS. 15A and 15B show a dam 80 near an outlet portion 32 of the trough member 30. Multiple dam 80 devices can be located at various portions along the longitudinal length of the trough member 30. The dimension "j" can be, for example, about ⅛"-½" (about 3-13 mm) and the dimension "k" can be, for example, about ¼"-¾" (about 6-19 mm) The cross-sectional shape (i.e., "j-k" shape) of the dam 80 can include sharp corners, rounded corners, triangular shapes, cylindrical shapes, and the like, all of which can influence liquid 3 flowing through various portions of the trough member 30.

Further, when viscosities of the liquid 3 increase such that gravity alone is insufficient, other phenomena such as specific uses of hydrostatic head pressure or hydrostatic pressure can also be utilized to achieve desirable fluid flow. Further, additional means for moving the liquid 3 along the trough member 30 could also be provided inside the trough member 30, Such means for moving the liquid 3 include mechanical means such as paddles, fans, propellers, augers, etc., acoustic means such as transducers, thermal means such as heaters and or chillers (which may have additional processing benefits), etc. The additional means for moving the liquid 3 can cause liquid 3 to flow in differing amounts in different portions along the longitudinal length of the trough member 30. In this regard, for example, if liquid 3 initially flowed slowly through a first longitudinal portion of the trough member 30, the liquid 3 could be made to flow more quickly further downstream thereof by, for example, as discussed earlier herein, changing the cross-sectional shape of the trough member 30. Additionally, cross-sectional shapes of the trough member 30 could also contain therein additional fluid handling means which could speed up or slow down the rate the liquid 3 flows through the trough member 30. Accordingly, great flexibility can be achieved by the addition of such means for moving the fluid 3.

FIG. 14 also shows a storage tank or storage vessel 41 at the end 32 of the trough member 30. Such storage vessel 41 can be any acceptable vessel and/or pumping means made of one or more materials which, for example, do not negatively interact with the liquid 3 introduced into the trough member 30 and/or products produced within the trough member 30. Acceptable materials include, but are not limited to plastics such as high density polyethylene (HDPE), glass, metal(s) (such a certain grades of stainless steel), etc. Moreover, while a storage tank 41 is shown in this embodiment, the tank 41 should be understood as including a means for distributing or directly bottling or packaging the liquid 3 processed in the trough member 30.

Figure 16A:
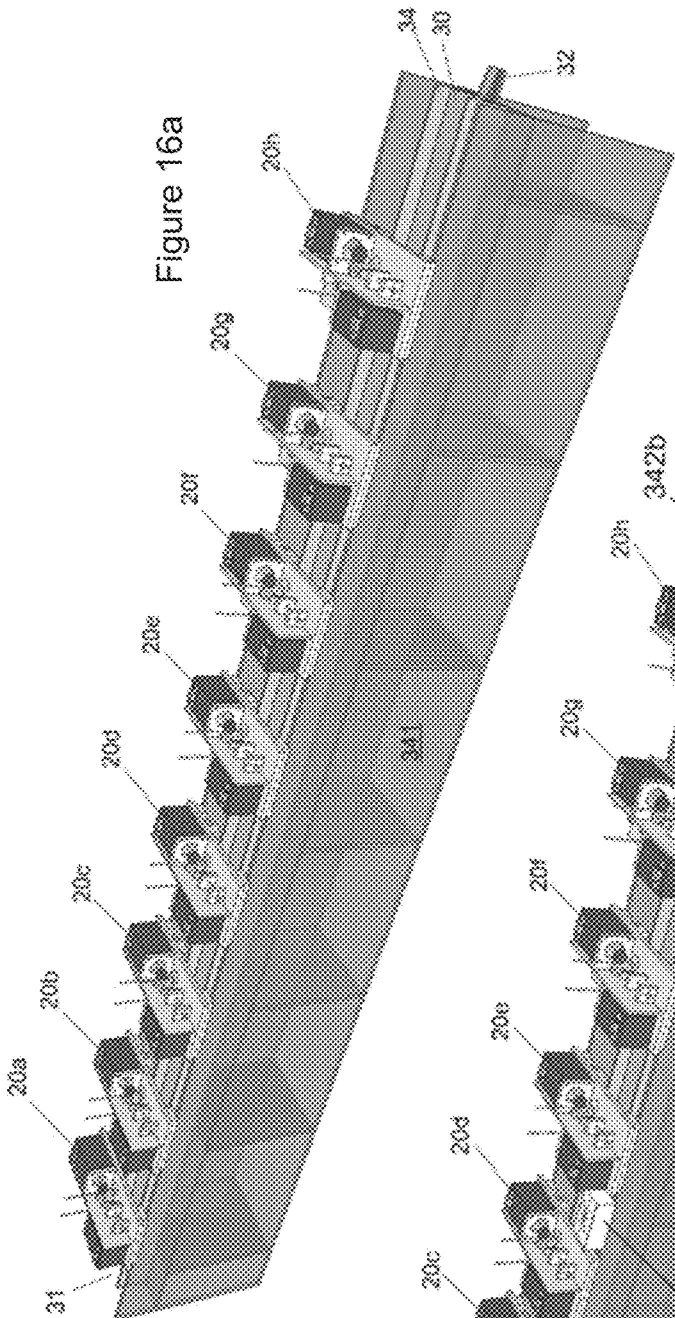
FIGS. 16A, 16B and 16C show perspective views of various control devices 20 containing electrode assemblies 1 and/or 5 thereon located on top of a trough member 30.
Figure 16B:
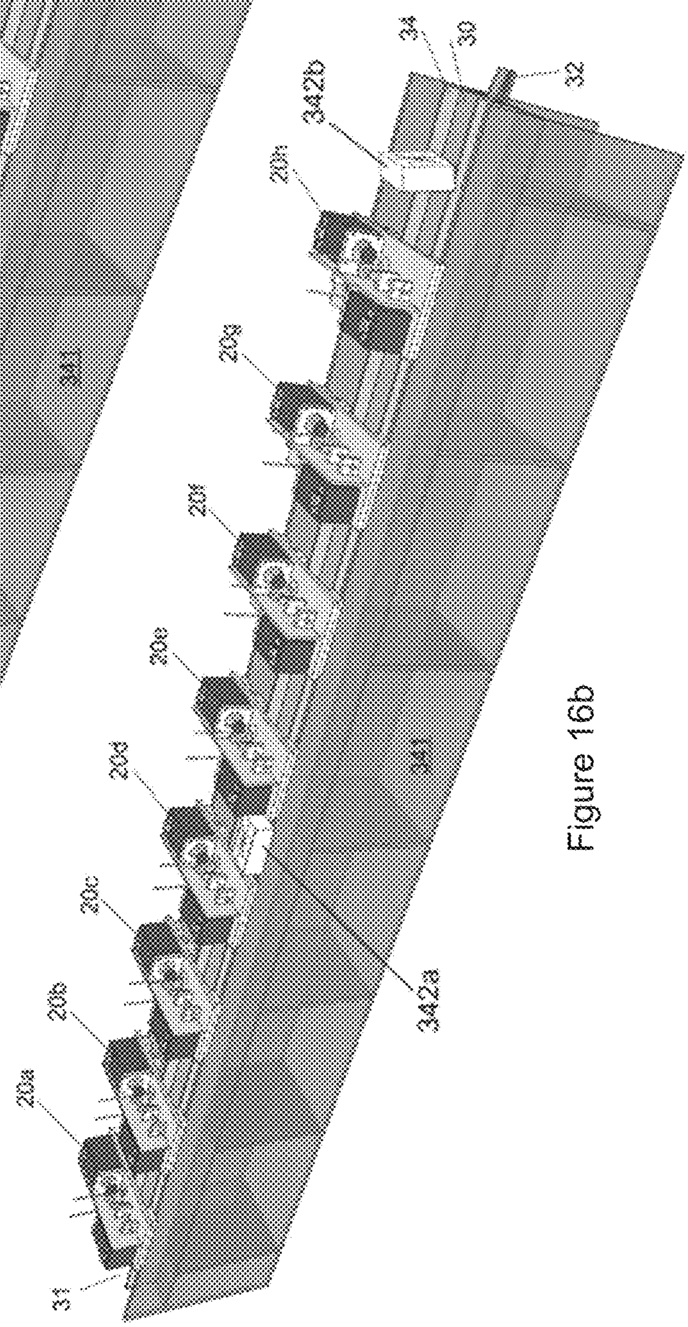
Figure 16C:
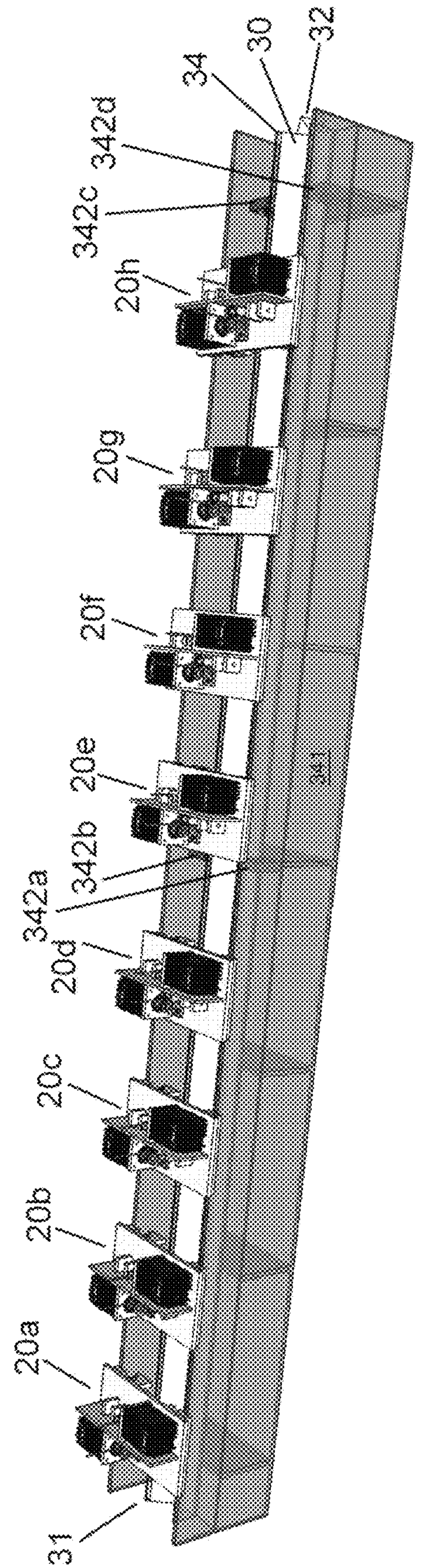

FIGS. 16A, 16B and 16C show perspective views of one preferred embodiment of the invention. In these FIGS. 16A, 16B and 16C, eight separate control devices 20*a*-20*h* are shown in more detail. Such control devices 20 can utilize one or more of the electrode configurations shown in, for example, FIGS. 8A, 8B, 8C and 8D. The precise positioning and operation of the control devices 20 are discussed in greater detail elsewhere herein. However, each of the control devices 20 are separated by a distance "c-c" (see FIG. 14) which, in some of the preferred embodiments discussed herein, measures about 8" (about 203 mm) FIG. 16B includes use of two air distributing or air handling devices (e.g., fans 342*a* and 342*b*); and FIG. 16C includes use of two alternative or desirable air handling devices 342*c* and 342*d*. The fans 342*a*, 342*b*, 342*c* and/or 342*d* can be any suitable fan. For example a Dynatron DF124020BA, DC brushless, 9000 RPM, ball bearing fan measuring about 40 mm×40 mm×20 mm works well. Specifically, this fan has an air flow of approximately 10 cubic feet per minute.

FIG. 17D shows a perspective view of one embodiment of the inventive control device 20 utilized in some of the Examples which make gold-based solutions or colloids.

First, FIG. 17D is similar to many of the other control devices 20. However, a primary difference are two refractory compositions similar to, for example, the refractory component 29 shown in FIG. 28F (and discussed later herein), are provided as electrode guides for the electrodes 5*a*/5*b*.

Figure 17:
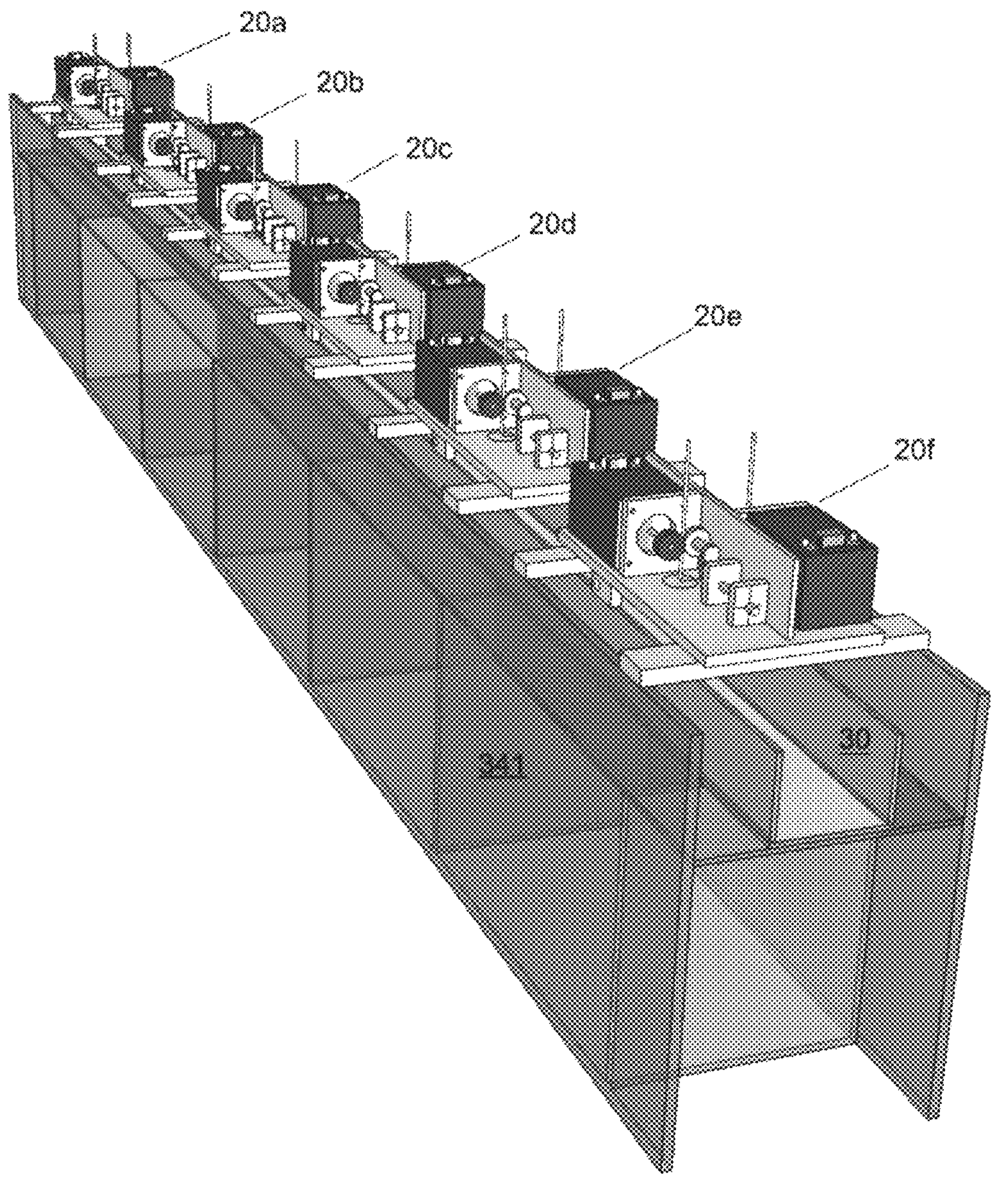
FIG. 17 shows a perspective view of various control devices 20 containing electrode assemblies 1 and/or 5 thereon located on top of a trough member 30.

FIG. 17 shows another perspective view of another embodiment of the apparatus according to another preferred embodiment wherein six control devices 20*a*-20*f* (i.e., six electrode sets) are rotated approximately 90 degrees relative to the eight control devices 20*a*-20*h* shown in FIGS. 16A and 16B. Accordingly, the embodiment corresponds generally to the electrode assembly embodiments shown in, for example, FIGS. 9A-9D.

Figure 18:
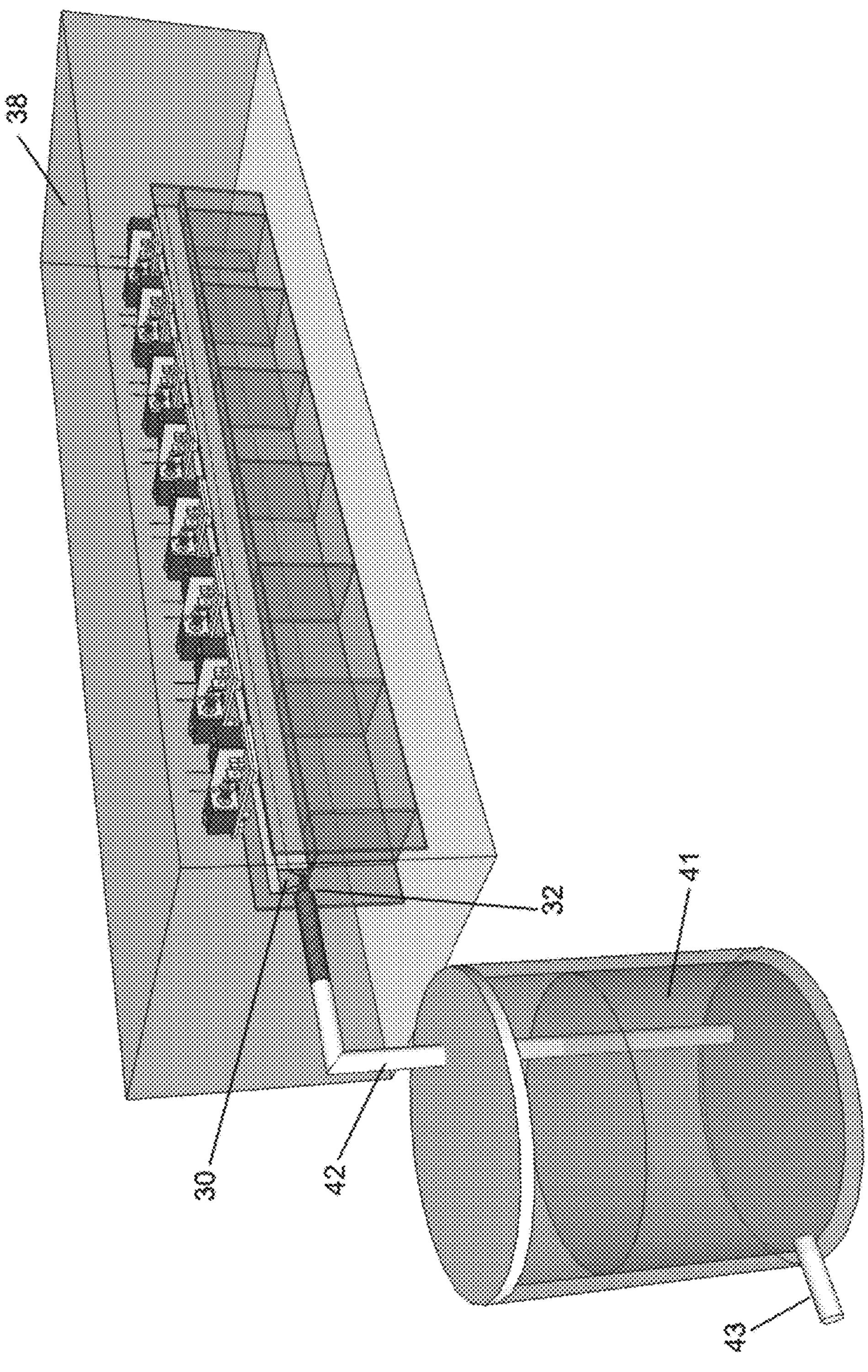
FIG. 18 shows a perspective view of various control devices 20 containing electrode assemblies 1 and/or 5 thereon located on top of a trough member 30 and including an enclosure 38 which controls the environment around the entire device and further including a holding tank 41.

FIG. 18 shows a perspective view of the apparatus shown in FIG. 16A, but such apparatus is now shown as being substantially completely enclosed by an atmosphere control apparatus 38. Such apparatus 38 is a means for controlling the atmosphere around the trough member 30, or can be used to isolate external and undesirable material from entering into the trough member 30 and negatively interacting therewith. Further, the exit 32 of the trough member 30 is shown as communicating with a storage vessel 41 through an exit pipe 42. Moreover, an exit 43 on the storage tank 41 is also shown. Such exit pipe 43 can be directed toward any other suitable means for storage, packing and/or handling the liquid 3. For example, the exit pipe 43 could communicate with any suitable means for bottling or packaging the liquid product 3 produced in the trough member 30. Alternatively, the storage tank 41 could be removed and the exit pipe 42 could be connected directly to a suitable means for handling, bottling or packaging the liquid product 3.

FIGS. 19A, 19B, 19C and 19D show additional cross-sectional perspective views of additional electrode configuration embodiments which can be used according to the present invention.

Figure 19A:
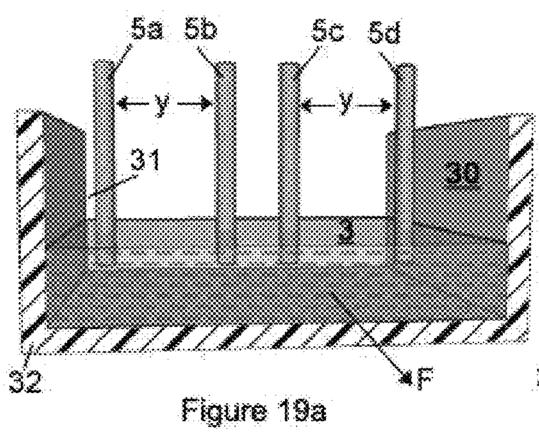
FIGS. 19A-19D are perspective schematic views of multiple electrode sets contained within a trough member 30.
Figure 19B:
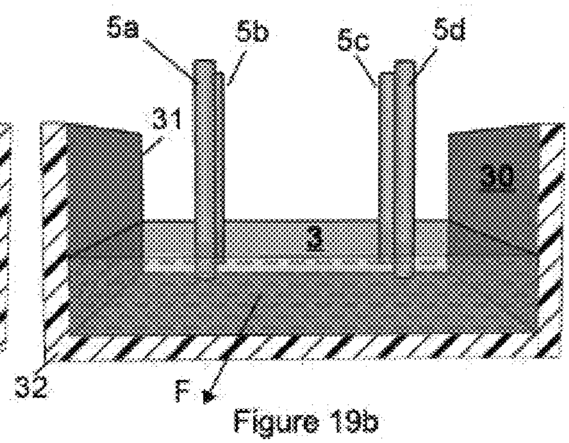

In particular, FIG. 19A shows two sets of electrodes 5 (i.e., 4 total electrodes 5*a*, 5*b*, 5*c* and 5*d*) located approximately parallel to each other along a longitudinal direction of the trough member 30 and substantially perpendicular to the flow direction "F" of the liquid 3 through the trough member 30. In contrast, FIG. 19B shows two sets of electrodes 5 (i.e., 5*a*, 5*b*, 5*c* and 5*d*) located adjacent to each other along the longitudinal direction of the trough member 30.

Figure 19C:
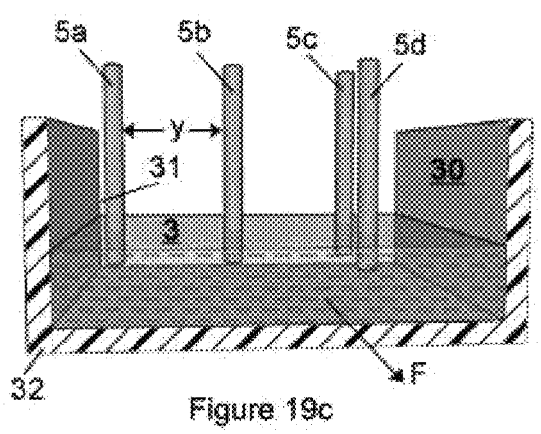
Figure 19D:
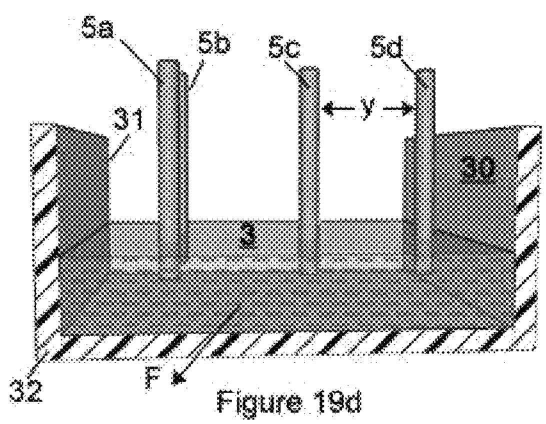

In contrast, FIG. 19C shows one set of electrodes 5 (i.e., 5*a*, 5*b*) located substantially perpendicular to the direction of fluid flow "F" and another set of electrodes 5 (i.e., 5*c*, 5*d*) located substantially parallel to the direction of the fluid flow "F". FIG. 19D shows a mirror image of the electrode configuration shown in FIG. 19C. While each of FIGS. 19A, 19B, 19C and 19D show only electrode(s) 5 it is clear that electrode(s) 1 could be substituted for some or all of those electrode(s) 5 shown in each of FIGS. 19A-19D, and/or intermixed therein (e.g., similar to the electrode configurations disclosed in FIGS. 8A-8D and 9A-9D). These alternative electrode configurations provide a variety of alternative electrode configuration possibilities all of which can result in different desirable nanoparticle or nanoparticle/solutions. It should now be clear to the reader that electrode assemblies located upstream of other electrode assemblies can provide raw materials, pH changes, zeta potential changes, ingredients and/or conditioning or crystal or structural changes to at least a portion of the liquid 3 such that reactions occurring at electrode(s) 1 and/or 5 downstream from a first set of electrode(s) 1 and/or 5 can result in, for example, growth of nanoparticles, shrinking (e.g., partial or complete dissolution) of nanoparticles, placing of different composition(s) on existing nanoparticles (e.g., surface feature comprising a variety of sizes and/or shapes and/or compositions which modify the performance of the nanoparticles), removing existing surface features or coatings on nanoparticles, changing and/or increasing or decreasing zeta potential, etc. In other words, by providing multiple electrode sets of multiple configurations and one or more atmosphere control devices along with multiple adjustable electrochemical reactions and/or adjustable plasmas 4, the variety of constituents produced, nanoparticles, composite nanoparticles, thicknesses of shell layers (e.g., partial or complete) coatings, zeta potential, or surface features on substrate nanoparticles, are numerous, and the structure and/or composition of the liquid 3 can also be reliably controlled.

Figure 20A:
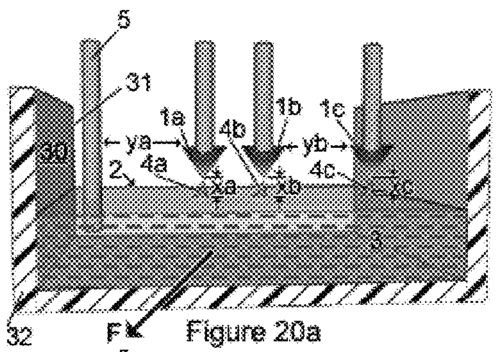
FIGS. 20A-20P show perspective views of multiple electrode sets 1/5 in 16 different possible combinations.
Figure 20B:
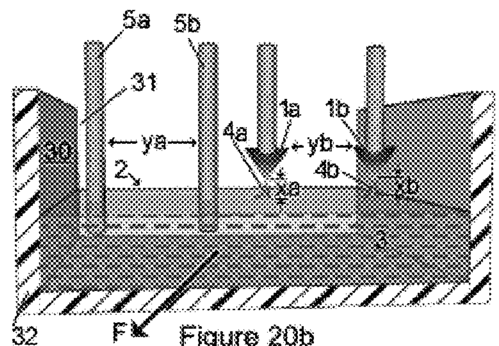
Figure 20C:
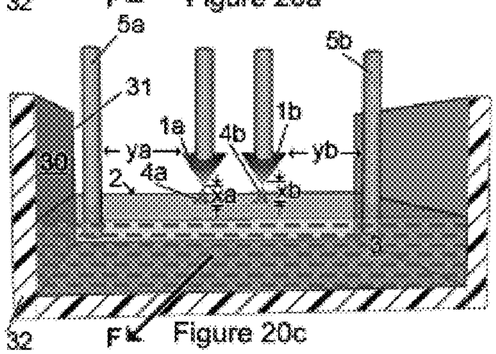
Figure 20D:
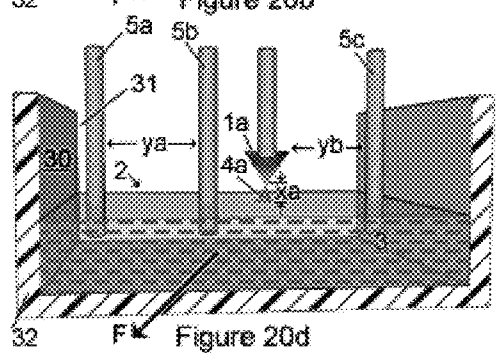
Figure 20E:
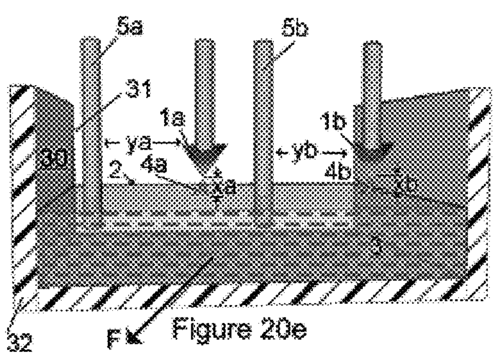
Figure 20F:
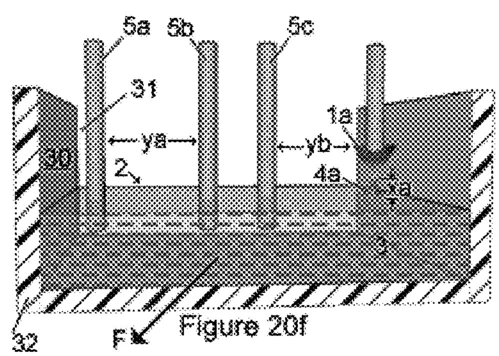
Figure 20G:
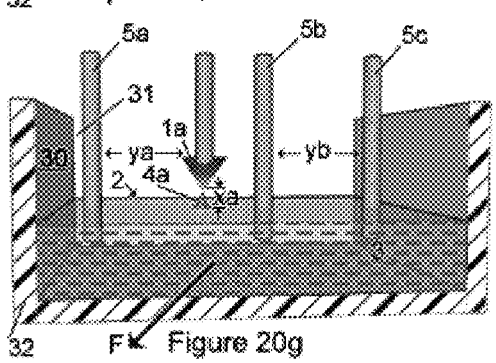
Figure 20H:
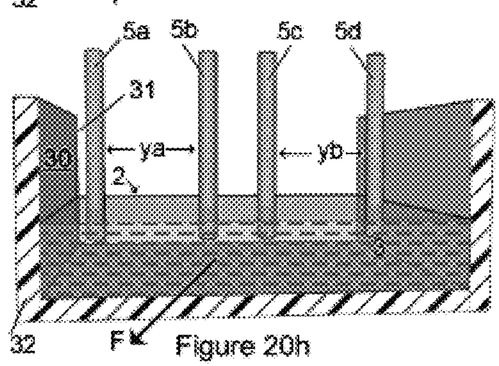
Figure 20I:
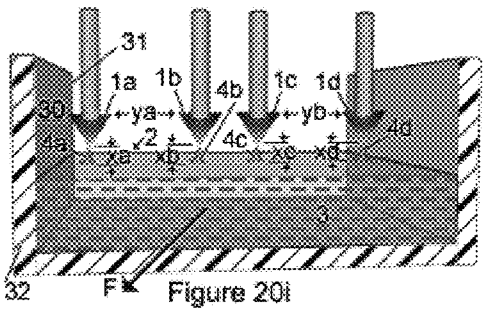
Figure 20J:
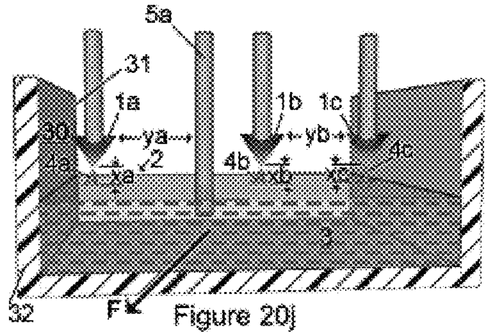
Figure 20K:
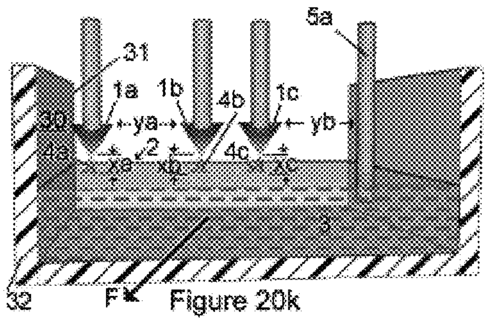
Figure 20L:
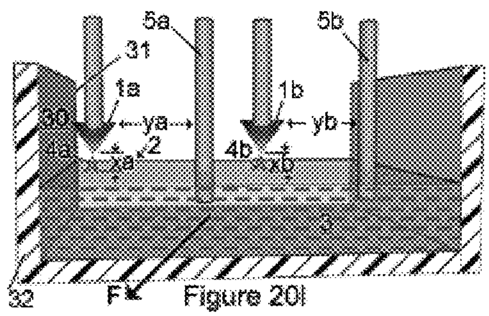
Figure 20M:
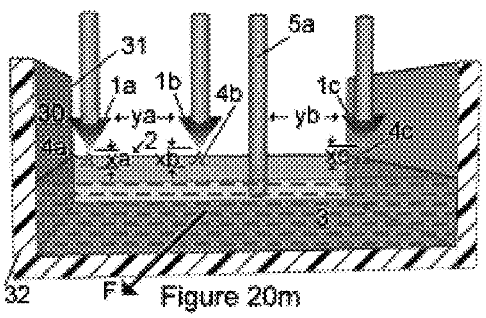
Figure 20N:
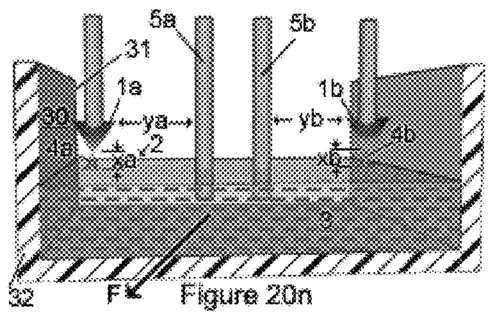
Figure 20O:
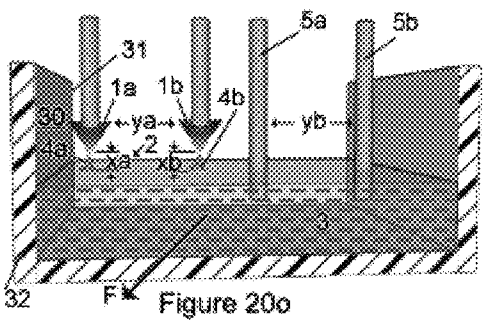
Figure 20P:
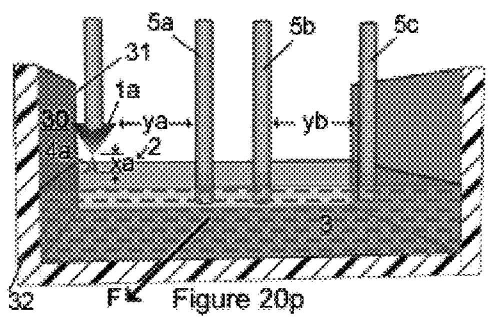
Figure 21A:
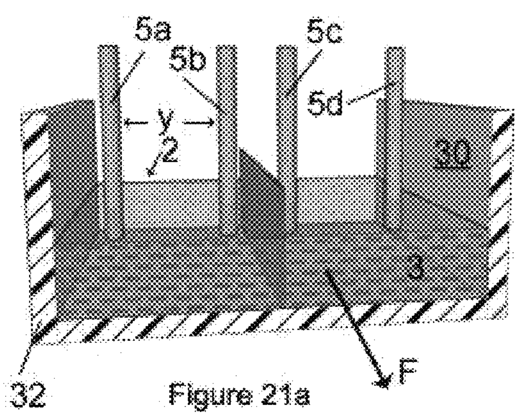
FIGS. 21A-21D show four perspective schematic views of possible electrode configurations separated by a membrane 50.
Figure 21B:
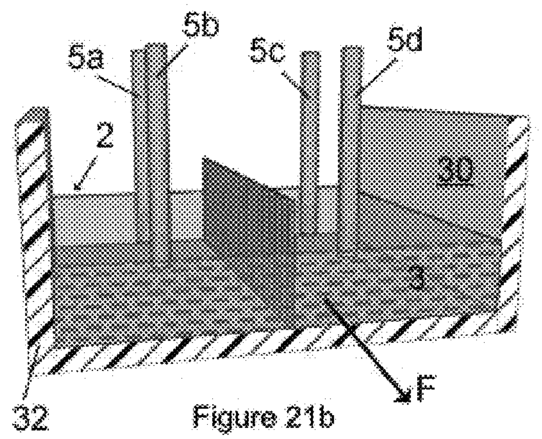
Figure 21C:
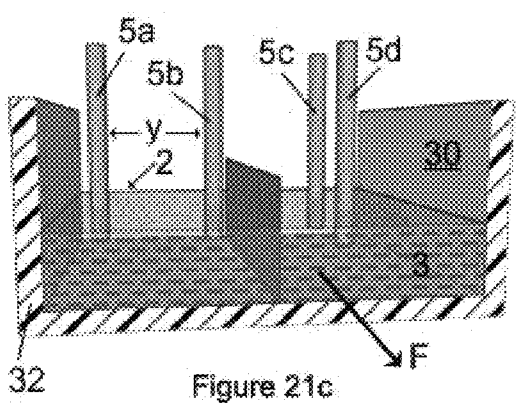
Figure 21D:
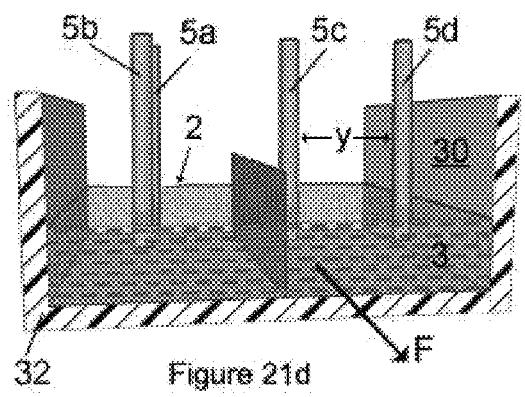

FIGS. 20A-20P show a variety of cross-sectional perspective views of the various electrode configuration embodiments possible and usable for all those configurations of electrodes 1 and 5 corresponding only to the embodiment shown in FIG. 19A. In particular, for example, the number of electrodes 1 or 5 varies in these FIGS. 20A-20P, as well as the specific locations of such electrode(s) 1 and 5 relative to each other. Of course, these electrode combinations 1 and 5 shown in FIGS. 20A-20P could also be configured according to each of the alternative electrode configurations shown in FIGS. 19B, 19C and 19D (i.e., sixteen additional FIGS. corresponding to each of FIGS. 19B, 19C and 19D) but additional FIGS. have not been included herein for the sake of brevity. Specific advantages of these electrode assemblies, and others, are disclosed in greater detail elsewhere herein.

As disclosed herein, each of the electrode configurations shown in FIGS. 20A-20P, depending on the particular run conditions, can result in different products coming from the mechanisms, apparatuses and processes of the inventive disclosures herein.

FIGS. 21A, 21B, 21C and 21D show cross sectional perspective views of additional embodiments of the present invention. The electrode arrangements shown in these FIGS. 21A-21D are similar in arrangement to those electrode arrangements shown in FIGS. 19A, 19B, 19C and 19D, respectively. However, in these FIGS. 21A-21D a membrane or barrier assembly 5*m* is also included. In these embodiments of the invention, a membrane 5*m* is provided as a means for separating different products made at different electrode sets so that any products made by the set of electrodes 1 and/or 5 on one side of the membrane 5*m* can be at least partially isolated, or segregated, or substantially completely isolated from certain products made from electrodes 1 and/or 5 on the other side of the membrane 5*m*. This membrane means 5*m* for separating or isolating different products may act as a mechanical barrier, physical barrier, mechano-physical barrier, chemical barrier, electrical barrier, etc. Accordingly, certain products made from a first set of electrodes 1 and/or 5 can be at least partially, or substantially completely, isolated from certain products made from a second set of electrodes 1 and/or 5. Likewise, additional serially located electrode sets can also be similarly situated. In other words, different membrane(s) 5*m* can be utilized at or near each set of electrodes 1 and/or 5 and certain products produced therefrom can be controlled and selectively delivered to additional electrode sets 1 and/or 5 longitudinally downstream therefrom. Such membranes 5*m* can result in a variety of different compositions of the liquid 3 and/or nanoparticles or ions present in the liquid 3 produced in the trough member 30.

Possible ion exchange membranes 5*m* which function as a means for separating for use with the present invention include Anionic membranes and Cationic membranes. These membranes can be homogenous, heterogeneous or microporous, symmetric or asymmetric in structure, solid or liquid, can carry a positive or negative charge or be neutral or bipolar. Membrane thickness may vary from as small as 100 micron to several mm.

Some specific ionic membranes for use with certain embodiments of the present invention include, but are not limited to:

- Homogeneous polymerization type membranes such as sulfonated and aminated styrene—divinylbenzene copolymers
- condensation and heterogeneous membranes
- perfluorocarbon cation exchange membranes
- membrane chlor-alkali technology
- Most of cation and anion exchange membranes used in the industrial area are composed of derivatives of styrene—divinylbenzene copolymer, chloromethylstyrene-divinylbenzene copolymer or vinylpyridines—divinylbenzene copolymer.
- The films used that are the basis of the membrane are generally polyethylene, polypropylene (ref 'U, polytetrafluoroethylene, PFA, FEP and so on.
- Trifluoroacrylate and styrene are used in some cases.
- Conventional polymers such as polyethersulfone, polyphenylene oxide, polyvinyl chloride, polyvinylidene fluoride and so on. Especially, sulfonation or chloromethylation and amination of polyethersulfone or polyphenylene oxide.
- Hydrocarbon ion exchange membranes are generally composed of derivatives of styrene—divinylbenzene copolymer and other inert polymers such as polyethylene, polyvinyl chloride and so on.

Figure 22A:
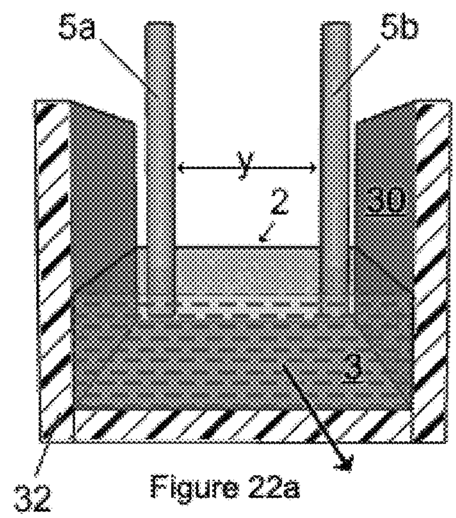
FIGS. 22A-22D show a perspective schematic views of four different electrode combinations separated by a membrane 50.
Figure 22B:
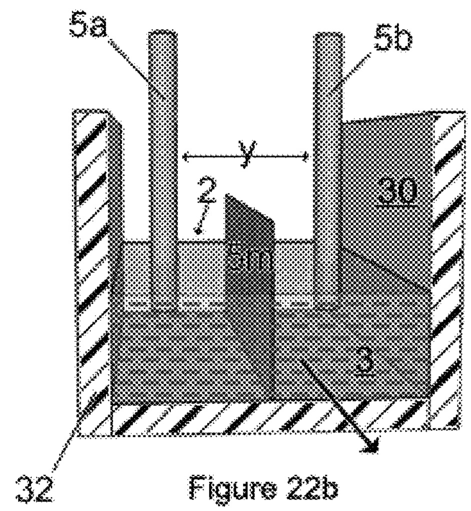

FIG. 22A shows a perspective cross-sectional view of an electrode assembly which corresponds to the electrode assembly 5*a*, 5*b* shown in FIG. 9C. This electrode assembly can also utilize a membrane 5*m* for chemical, physical, chemo-physical and/or mechanical separation. In this regard, FIG. 22B shows a membrane 5*m* located between the electrodes 5*a*, 5*b*. It should be understood that the electrodes 5*a*, 5*b* could be interchanged with the electrodes 1 in any of the multiple configurations shown, for example, in FIGS. 9A-9C. In the case of FIG. 22B, the membrane assembly 5*m* has the capability of isolating partially or substantially completely, some or all of the products formed at electrode 5*a*, from some or all of those products formed at electrode 5*b*. Accordingly, various species formed at either of the electrodes 5*a* and 5*b* can be controlled so that they can sequentially react with additional electrode assembly sets 5*a*, 5*b* and/or combinations of electrode sets 5 and electrode sets 1 in the longitudinal flow direction "F" that the liquid 3 undertakes along the longitudinal length of the trough member 30. Accordingly, by appropriate selection of the membrane 5*m*, which products located at which electrode (or subsequent or downstream electrode set) can be controlled. In a preferred embodiment where the polarity of the electrodes 5*a* and 5*b* are opposite, a variety of different products may be formed at the electrode 5*a* relative to the electrode 5*b*.

Figure 22C:
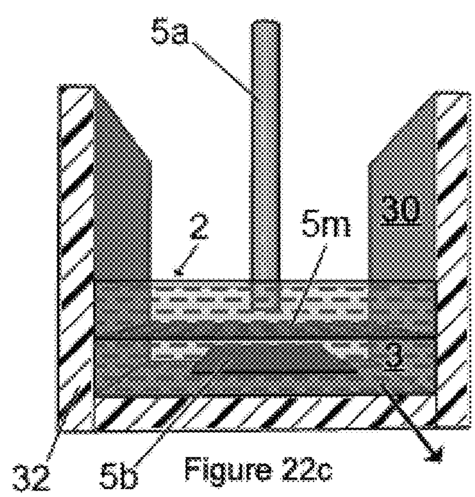

FIG. 22C shows another different embodiment of the invention in a cross-sectional schematic view of a completely different alternative electrode configuration for electrodes 5*a* and 5*b*. In this case, electrode(s) 5*a* (or of course electrode(s) 1*a*) are located above a membrane 5*m* and electrode(s) 5*b* are located below a membrane 5*m* (e.g., are substantially completely submerged in the liquid 3). In this regard, the electrode, 5*b* can comprise a plurality of electrodes or may be a single electrode running along at least some or the entire longitudinal length of the trough member 30. In this embodiment, certain species created at electrodes above the membrane 5*m* can be different from certain species created below the membrane 5*m* and such species can react differently along the longitudinal length of the trough member 30. In this regard, the membrane 5*m* need not run the entire length of the trough member 30, but may be present for only a portion of such length and thereafter sequential assemblies of electrodes 1 and/or 5 can react with the products produced therefrom. It should be clear to the reader that a variety of additional embodiments beyond those expressly mentioned here would fall within the spirit of the embodiments expressly disclosed.

Figure 22D:
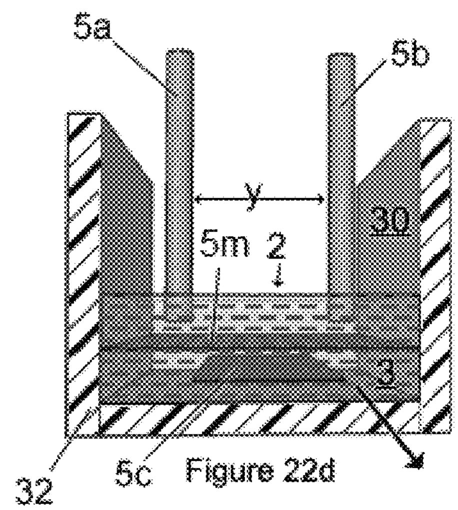

FIG. 22D shows another alternative embodiment of the invention whereby a configuration of electrodes 5*a* (and of course electrodes 1) shown in FIG. 22C are located above a portion of a membrane 5*m* which extends at least a portion along the length of a trough member 30 and a second electrode (or plurality of electrodes) 5*b* (similar to electrode(s) 5*b* in FIG. 22C) run for at least a portion of the longitudinal length along the bottom of the trough member 30. In this embodiment of utilizing multiple electrodes 5*a*, additional operational flexibility can be achieved. For example, by splitting the voltage and current into at least two electrodes 5*a*, the reactions at the multiple electrodes 5*a* can be different from those reactions which occur at a single electrode 5*a* of similar size, shape and/or composition. Of course this multiple electrode configuration can be utilized in many of the embodiments disclosed herein, but have not been expressly discussed for the sake of brevity. However, in general, multiple electrodes 1 and/or 5 (i.e., instead of a single electrode 1 and/or 5) can add great flexibility in products produced according to the present invention. Details of certain of these advantages are discussed elsewhere herein.

Figure 23A:
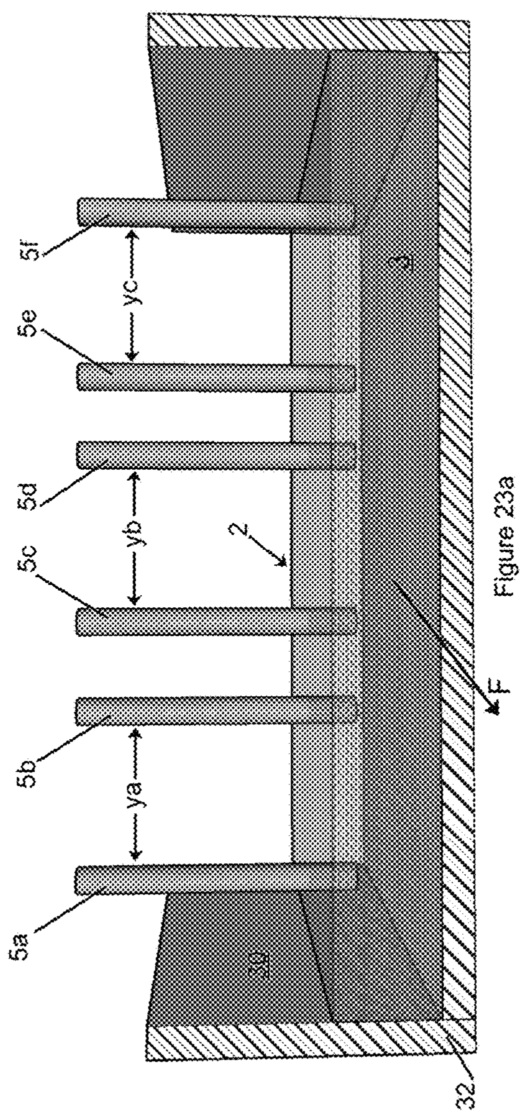
FIGS. 23A and 23B show a perspective schematic view of three sets of electrodes and three sets of electrodes separated by two membranes 50*a* and 50*b*, respectively.

FIG. 23A is a cross-sectional perspective view of another embodiment of the invention which shows a set of electrodes 5 corresponding generally to that set of electrodes 5 shown in FIG. 19A, however, the difference between the embodiment of FIG. 23A is that a third set of electrode(s) 5*e*, 5*f* have been provided in addition to those two sets of electrodes 5*a*, 5*b*, 5*c* and 5*d* shown in FIG. 19A. Of course, the sets of electrodes 5*a*, 5*b*, 5*c*, 5*d*, 5*d* and 5*f* can also be rotated 90 degrees so they would correspond roughly to those two sets of electrodes shown in FIG. 19B. Additional FIGS. showing additional embodiments of those sets of electrode configurations have not been included here for the sake of brevity.

Figure 23B:
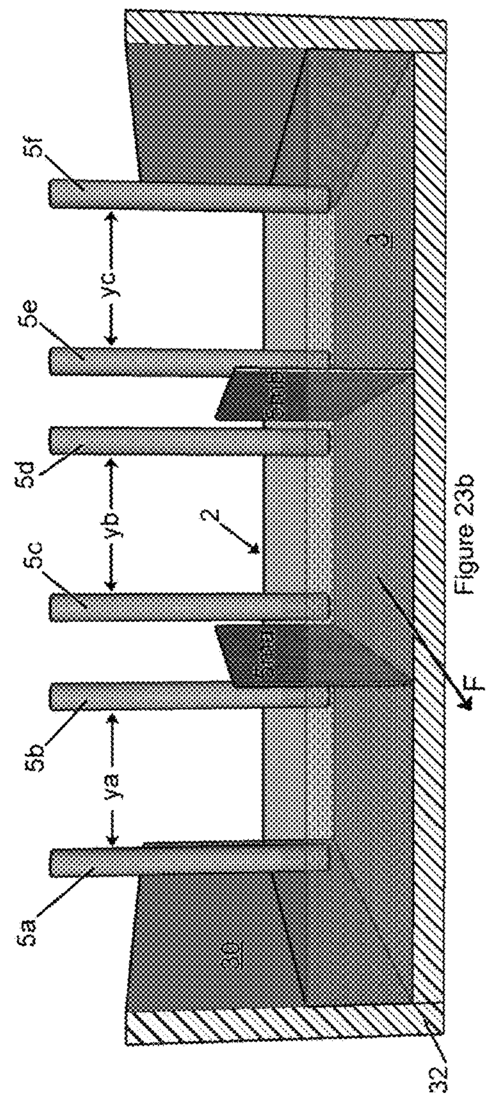

FIG. 23B shows another embodiment of the invention which also permutates into many additional embodiments, wherein membrane assemblies 5*ma* and 5*mb* have been inserted between the three sets of electrodes 5*a*, 5*b*; 5*c*, 5*d*; and 5*e*, 5*f*. It is of course apparent that the combination of electrode configuration(s), number of electrode(s) and precise membrane(s) means 5*m* used to achieve separation includes many embodiments, each of which can produce different products when subjected to the teachings of the present invention. More detailed discussion of such products and operations of the present invention are discussed elsewhere herein.

FIGS. 24A-24E; 25A-25E; and 26A-26E show cross-sectional views of a variety of membrane 5*m* locations that can be utilized according to the present invention. Each of these membrane 5*m* configurations can result in different nanoparticles and/or nanoparticle/solution mixtures. The desirability of utilizing particular membranes in combination with various electrode assemblies add a variety of processing advantages to the present invention. This additional flexibility results in a variety of novel nanoparticle/nanoparticle solution mixtures.

Electrode Control Devices

Figure 27:
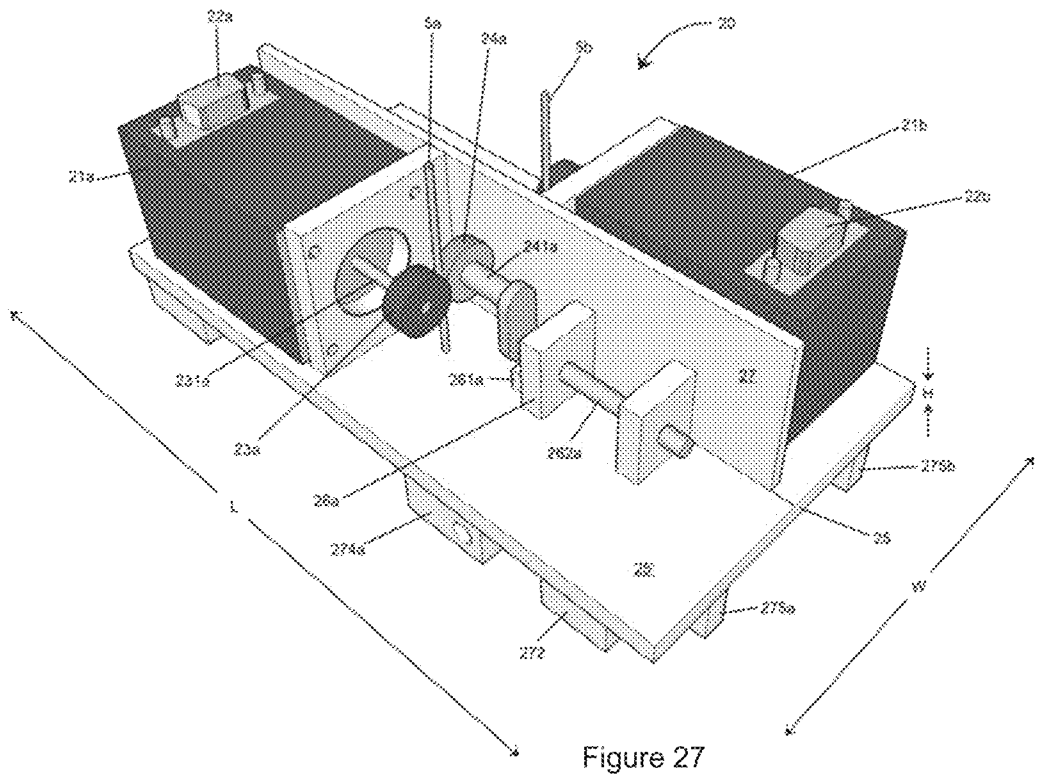
FIG. 27 shows a perspective view of a control device 20.

The electrode control devices shown generally in, for example, FIGS. 2, 3, 11, 12, 14, 16, 17 and 18 are shown in greater detail in FIG. 27 and FIGS. 28A-28M. In particular, FIG. 27 shows a perspective view of one embodiment of an inventive control device 20. Further, FIGS. 28A-28M show perspective views of a variety of embodiments of control devices 20. FIG. 28B shows the same control device 20 shown in FIG. 28A, except that two electrode(s) 1*a*/1*b* are substituted for the two electrode(s) 5*a*/5*b*.

Figure 28A:
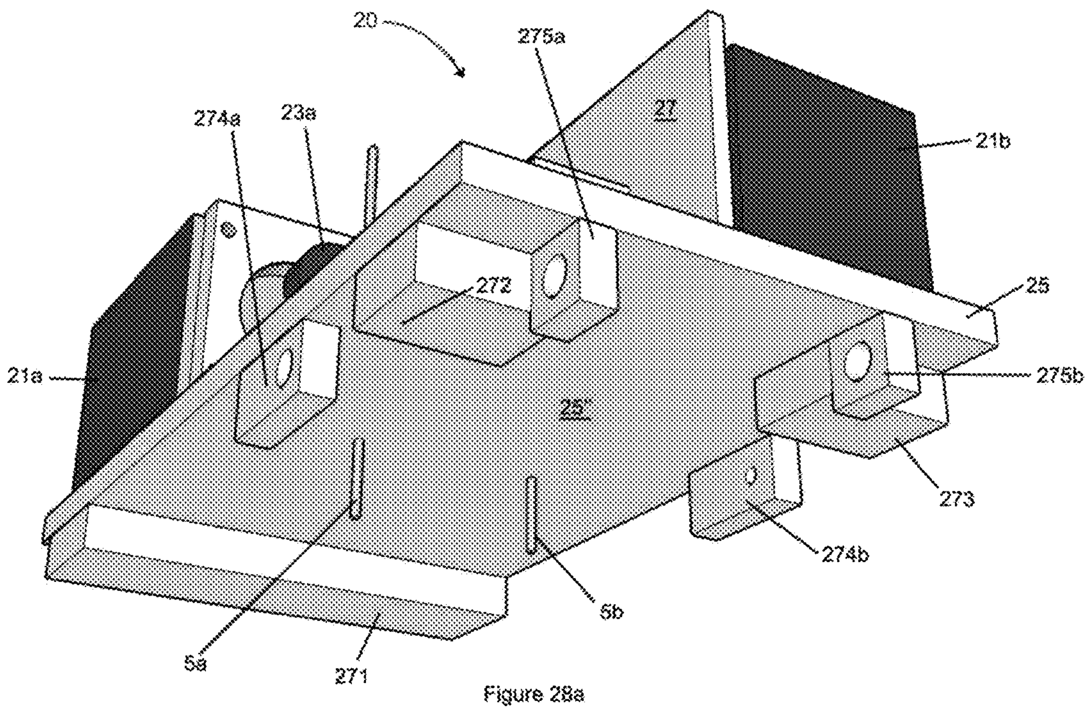
FIGS. 28A and 28B show a perspective view of a control device 20.
Figure 28B:
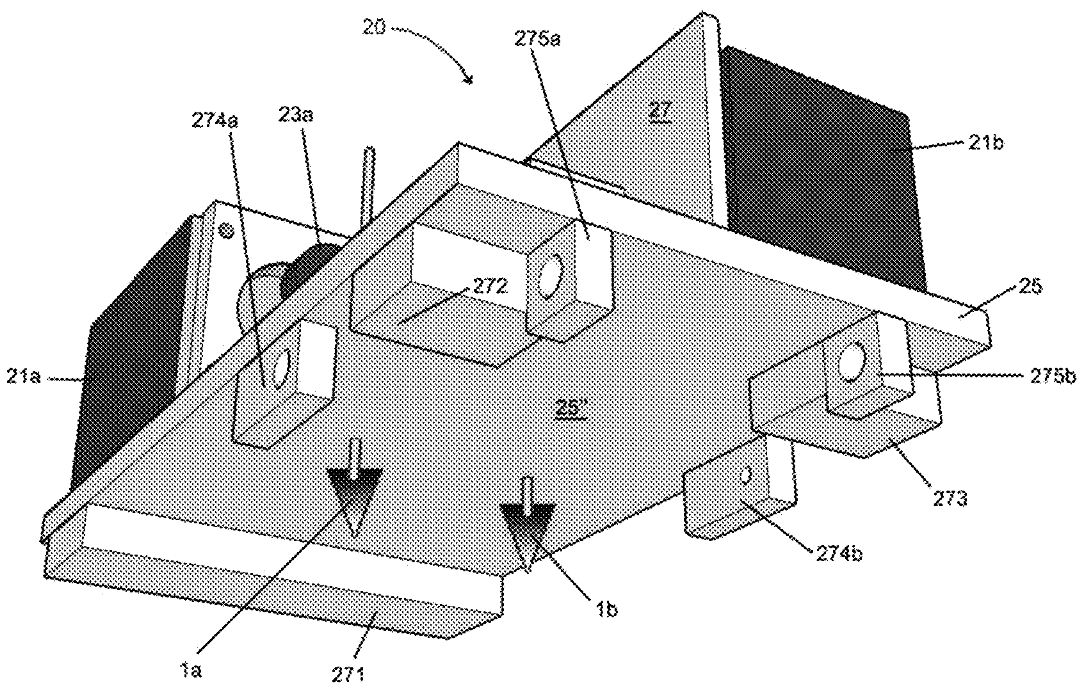

First, specific reference is made to FIGS. 27, 28A and 28B. In each of these three FIGS., a base portion 25 is provided, said base portion having a top portion 25' and a bottom portion 25". The base portion 25 is made of a suitable rigid plastic material including, but not limited to, materials made from structural plastics, resins, polyurethane, polypropylene, nylon, teflon, polyvinyl, etc. A dividing wall 27 is provided between two electrode adjustment assemblies. The dividing wall 27 can be made of similar or different material from that material comprising the base portion 25. Two servo-step motors 21*a* and 21*b* are fixed to the surface 25' of the base portion 25. The step motors 21*a*, 21*b* could be any step motor capable of slightly moving (e.g., on a 360 degree basis, slightly less than or slightly more than 1 degree) such that a circumferential movement of the step motors 21*a*/21*b* results in a vertical raising or lowering of an electrode 1 or 5 communicating therewith. In this regard, a first wheel-shaped component 23*a* is the drivewheel connected to the output shaft 231*a* of the drive motor 21*a* such that when the drive shaft 231*a* rotates, circumferential movement of the wheel 23*a* is created. Further, a slave wheel 24*a* is caused to press against and toward the drivewheel 23*a* such that frictional contact exists therebetween. The drivewheel 23*a* and/or slavewheel 24*a* may include a notch or groove on an outer portion thereof to assist in accommodating the electrodes 1,5. The slavewheel 24*a* is caused to be pressed toward the drivewheel 23*a* by a spring 285 located between the portions 241*a* and 261*a* attached to the slave wheel 24*a*. In particular, a coiled spring 285 can be located around the portion of the axis 262*a* that extends out from the block 261*a*. Springs should be of sufficient tension so as to result in a reasonable frictional force between the drivewheel 24*a* and the slavewheel 24*a* such that when the shaft 231*a* rotates a determined amount, the electrode assemblies 5*a*, 5*b*, 1*a*, 1*b*, etc., will move in a vertical direction relative to the base portion 25. Such rotational or circumferential movement of the drivewheel 23*a* results in a direct transfer of vertical directional changes in the electrodes 1,5 shown herein. At least a portion of the drivewheel 23*a* should be made from an electrically insulating material; whereas the slavewheel 24*a* can be made from an electrically conductive material or an electrically insulating material, but preferably, an electrically insulating material.

The drive motors 21*a*/21*b* can be any suitable drive motor which is capable of small rotations (e.g., slightly below 1°/360° or slightly above 1°/360° such that small rotational changes in the drive shaft 231*a* are translated into small vertical changes in the electrode assemblies. A preferred drive motor includes a drive motor manufactured by RMS Technologies model 1MC17-S04 step motor, which is a DC-powered step motor. This step motors 21*a*/21*b* include an RS-232 connection 22*a*/22*b*, respectively, which permits the step motors to be driven by a remote control apparatus such as a computer or a controller.

With reference to FIGS. 27, 28A and 28B, the portions 271, 272 and 273 are primarily height adjustments which adjust the height of the base portion 25 relative to the trough member 30. The portions 271, 272 and 273 can be made of same, similar or different materials from the base portion 25. The portions 274*a*/274*b* and 275*a*/275*b* can also be made of the same, similar or different material from the base portion 25. However, these portions should be electrically insulating in that they house various wire components associated with delivering voltage and current to the electrode assemblies 1*a*/1*b*, 5*a*/5*b*, etc.

The electrode assembly specifically shown in FIG. 28A comprises electrodes 5*a* and 5*b* (corresponding to, for example, the electrode assembly shown in FIG. 3C). However, that electrode assembly could comprise electrode(s) 1 only, electrode(s) 1 and 5, electrode(s) 5 and 1, or electrode(s) 5 only. In this regard, FIG. 28B shows an assembly where two electrodes 1*a*/1*b* are provided instead of the two electrode(s) 5*a*/5*b* shown in FIG. 28A. All other elements shown in FIG. 28B are similar to those shown in FIG. 28A.

With regard to the size of the control device 20 shown in FIGS. 27, 28A and 28B, the dimensions "L" and "W" can be any dimension which accommodates the size of the step motors 21*a*/21*b*, and the width of the trough member 30. In this regard, the dimension "L" shown in FIG. 27 needs to be sufficient such that the dimension "L" is at least as long as the trough member 30 is wide, and preferably slightly longer (e.g., 10-30%). The dimension "W" shown in FIG. 27 needs to be wide enough to house the step motors 21*a*/21*b* and not be so wide as to unnecessarily underutilize longitudinal space along the length of the trough member 30. In one preferred embodiment of the invention, the dimension "L" is about 7 inches (about 19 millimeters) and the dimension "W" is about 4 inches (about 10.5 millimeters). The thickness "H" of the base member 25 is any thickness sufficient which provides structural, electrical and mechanical rigidity for the base member 25 and should be of the order of about ¼"-¾" (about 6 mm-19 mm) While these dimensions are not critical, the dimensions give an understanding of size generally of certain components of one preferred embodiment of the invention.

Further, in each of the embodiments of the invention shown in FIGS. 27, 28A and 28B, the base member 25 (and the components mounted thereto), can be covered by a suitable cover 290 (first shown in FIG. 28D) to insulate electrically, as well as creating a local protective environment for all of the components attached to the base member 25. Such cover 290 can be made of any suitable material which provides appropriate safety and operational flexibility. Exemplary materials include plastics similar to that used for other portions of the trough member 30 and/or the control device 20 and is preferably transparent.

Figure 28C:
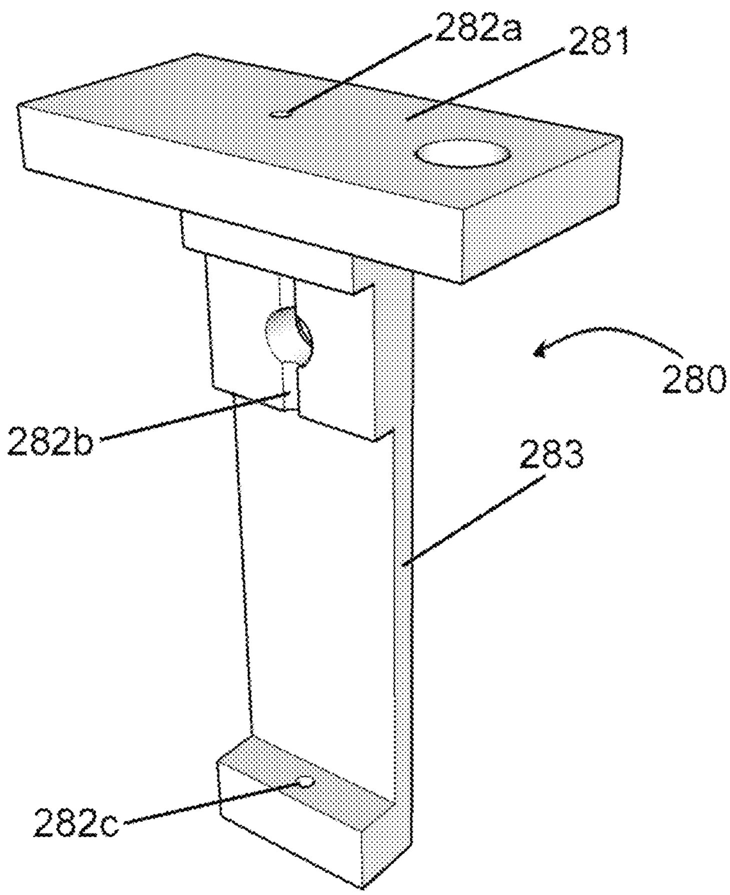
FIG. 28C shows a perspective view of an electrode holder.

FIG. 28C shows a perspective view of an electrode guide assembly 280 utilized to guide, for example, an electrode 5. Specifically, a top portion 281 is attached to the base member 25. A through-hole/slot combination 282*a*, 282*b* and 282*c*, all serve to guide an electrode 5 therethrough. Specifically, the portion 283 specifically directs the tip 9' of the electrode 5 toward and into the liquid 3 flowing in the trough member 30. The guide 280 shown in FIG. 28C can be made of materials similar, or exactly the same, as those materials used to make other portions of the trough member 30 and/or base member 25, etc.

Figure 28D:
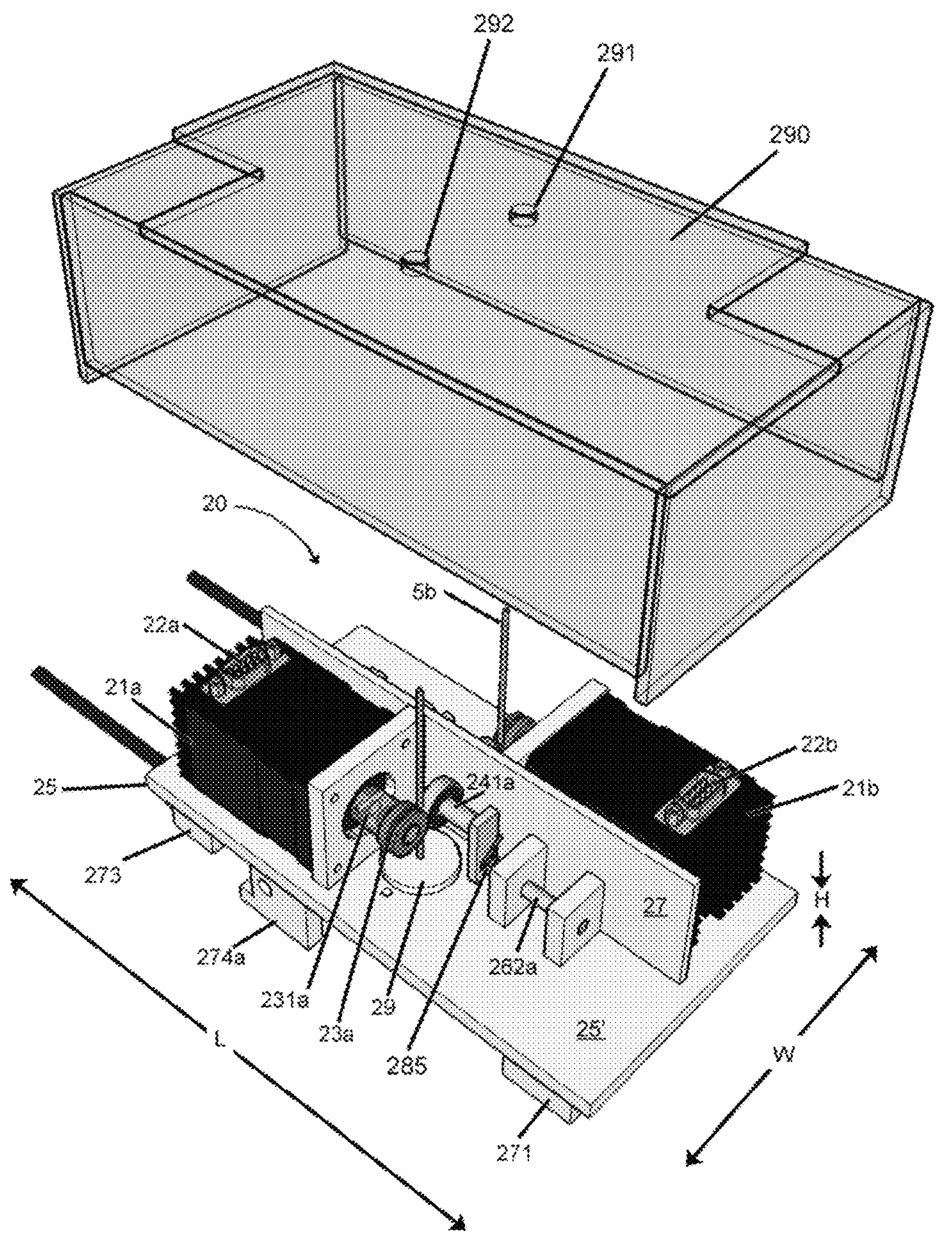

FIG. 28D shows a similar control device 20 as those shown in FIGS. 27 and 28, but also now includes a cover member 290. This cover member 290 can also be made of the same type of materials used to make the base portion 25. The cover 290 is also shown as having 2 through-holes 291 and 292 therein. Specifically, these through-holes can, for example, be aligned with excess portions of, for example, electrodes 5, which can be connected to, for example, a spool of electrode wire (not shown in these drawings).

Figure 28E:
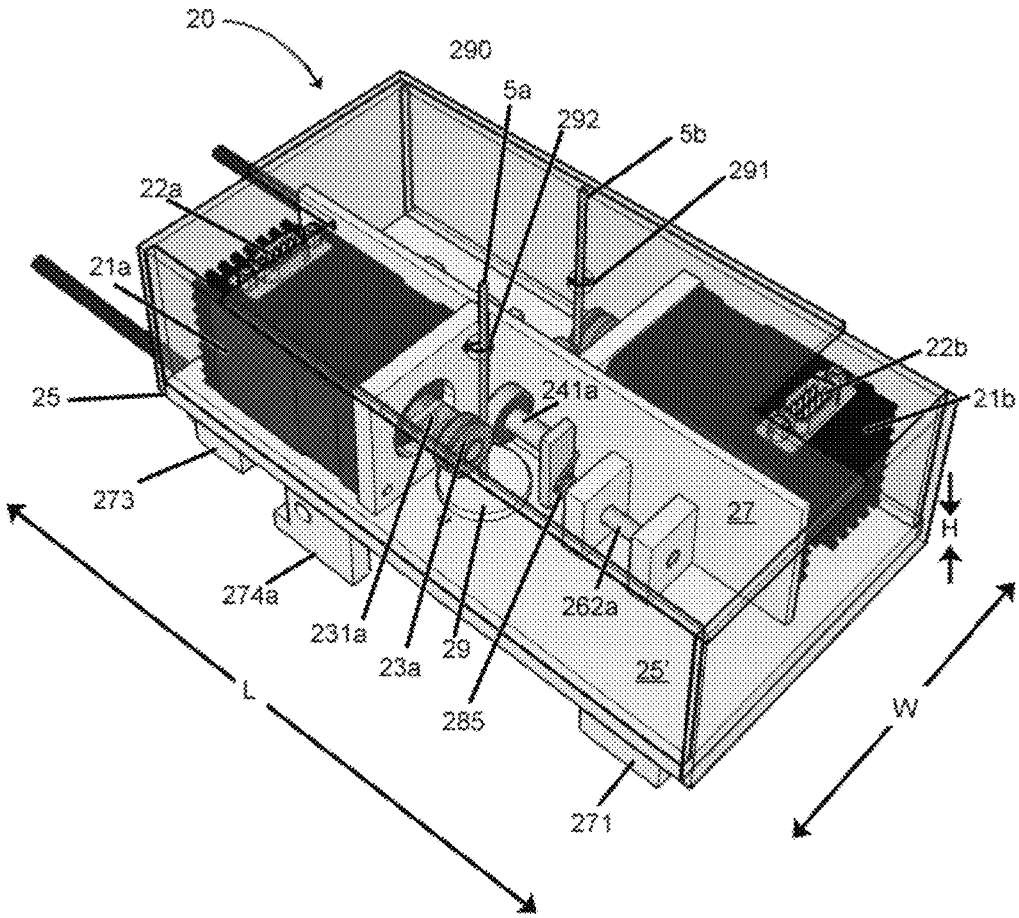

FIG. 28E shows the cover portion 290 attached to the base portion 25 with the electrodes 5*a*, 5*b* extending through the cover portion 290 through the holes 292, 291, respectively.

Figure 28F:
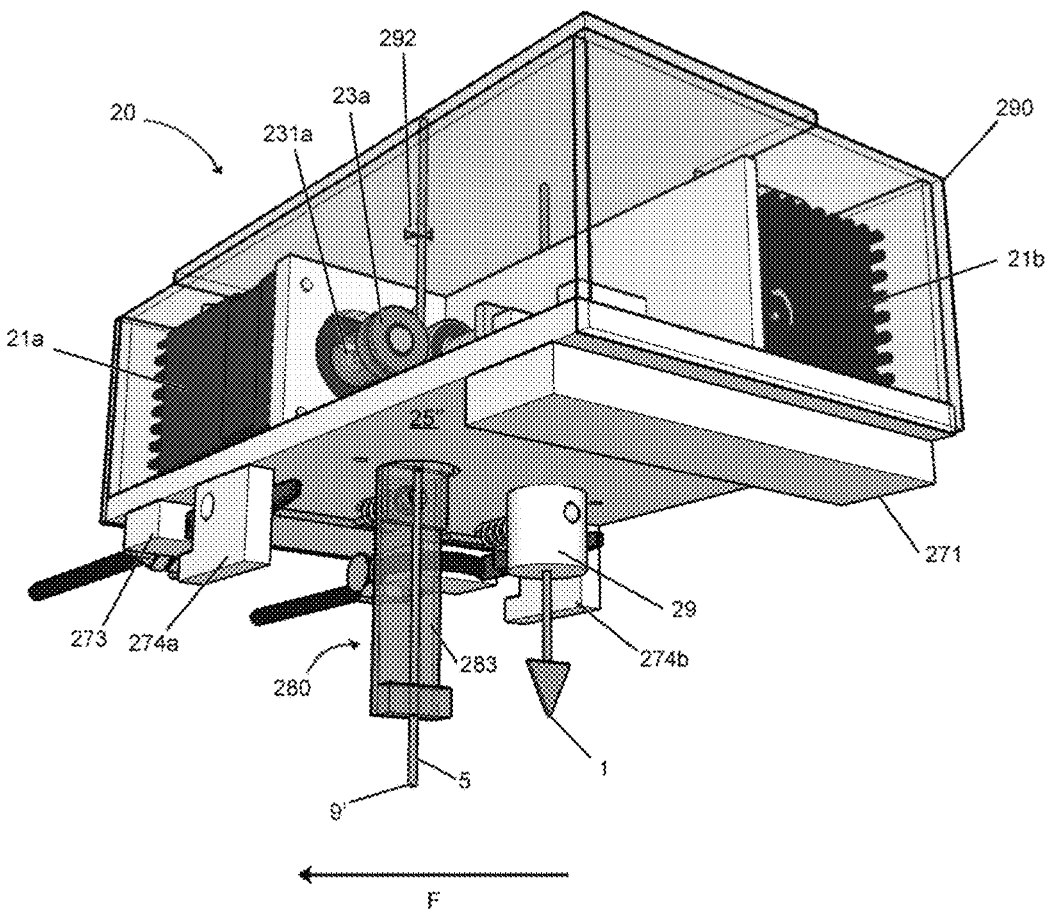

FIG. 28F shows a bottom-oriented perspective view of the control device 20 having a cover 290 thereon. Specifically, the electrode guide apparatus 280 is shown as having the electrode 5 extending therethrough. More specifically, this FIG. 28F shows an arrangement where an electrode 1 would first contact a fluid 3 flowing in the direction "F", as represented by the arrow in FIG. 28F.

Figure 28G:
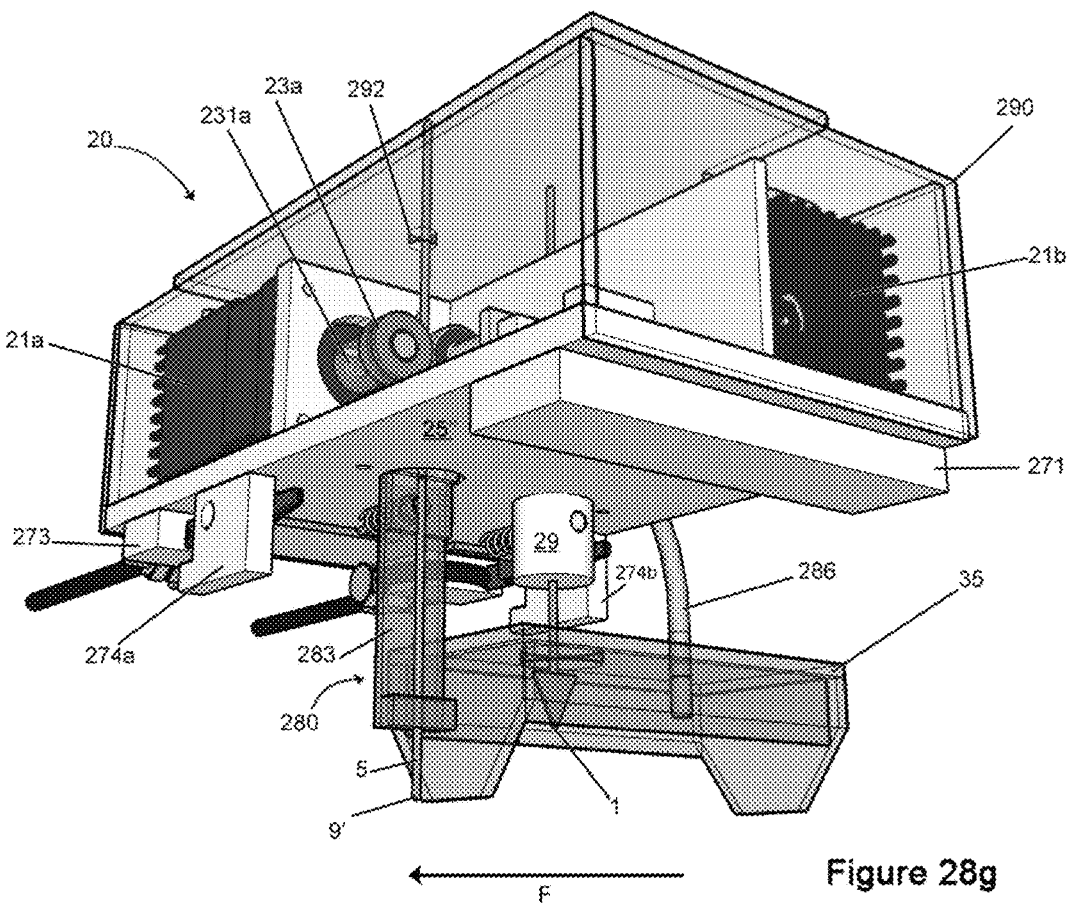

FIG. 28G shows the same apparatus as that shown in FIG. 28F with an atmosphere control device 35 added thereto. Specifically, the atmosphere control device is shown as providing a controlled atmosphere for the electrode 1. Additionally, a gas inlet tube 286 is provided. This gas inlet tube provides for flow of a desirable gas into the atmosphere control device 35 such that plasmas 4 created by the electrode 1 are created in a controlled atmosphere.

Figure 28H:
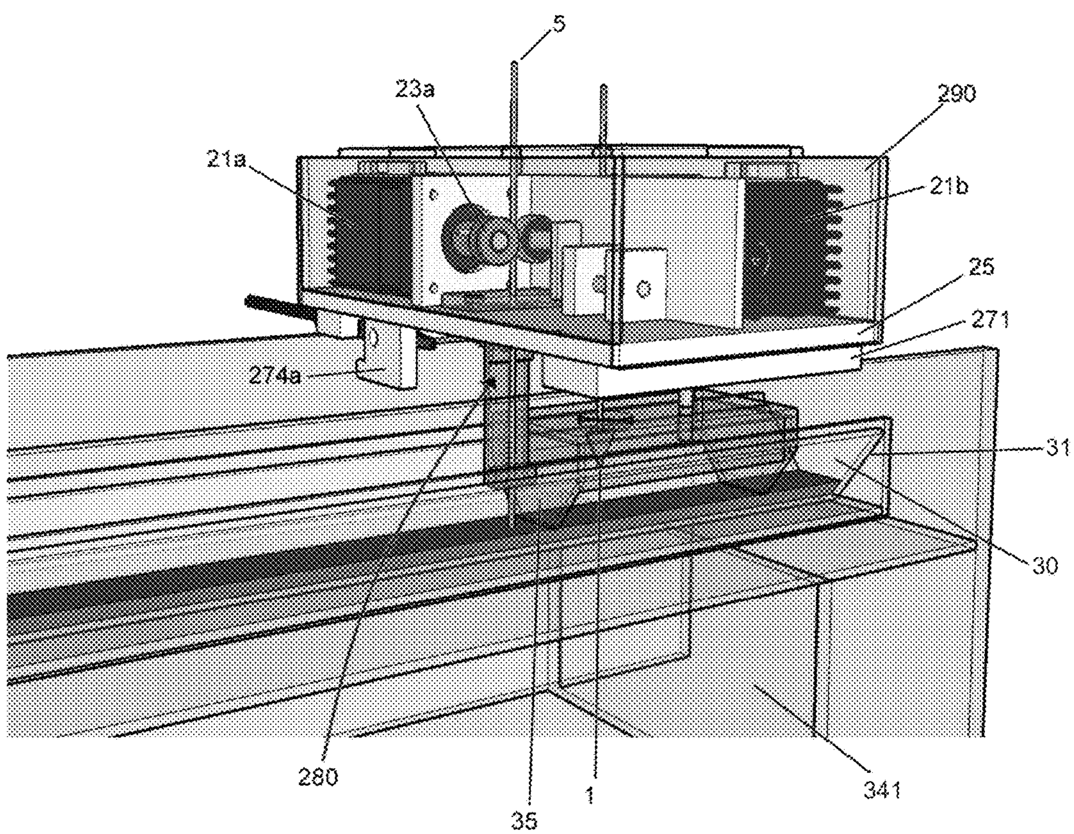

FIG. 28H shows the assembly of FIG. 28G located within a trough member 30 and a support means 341.

Figure 28I:
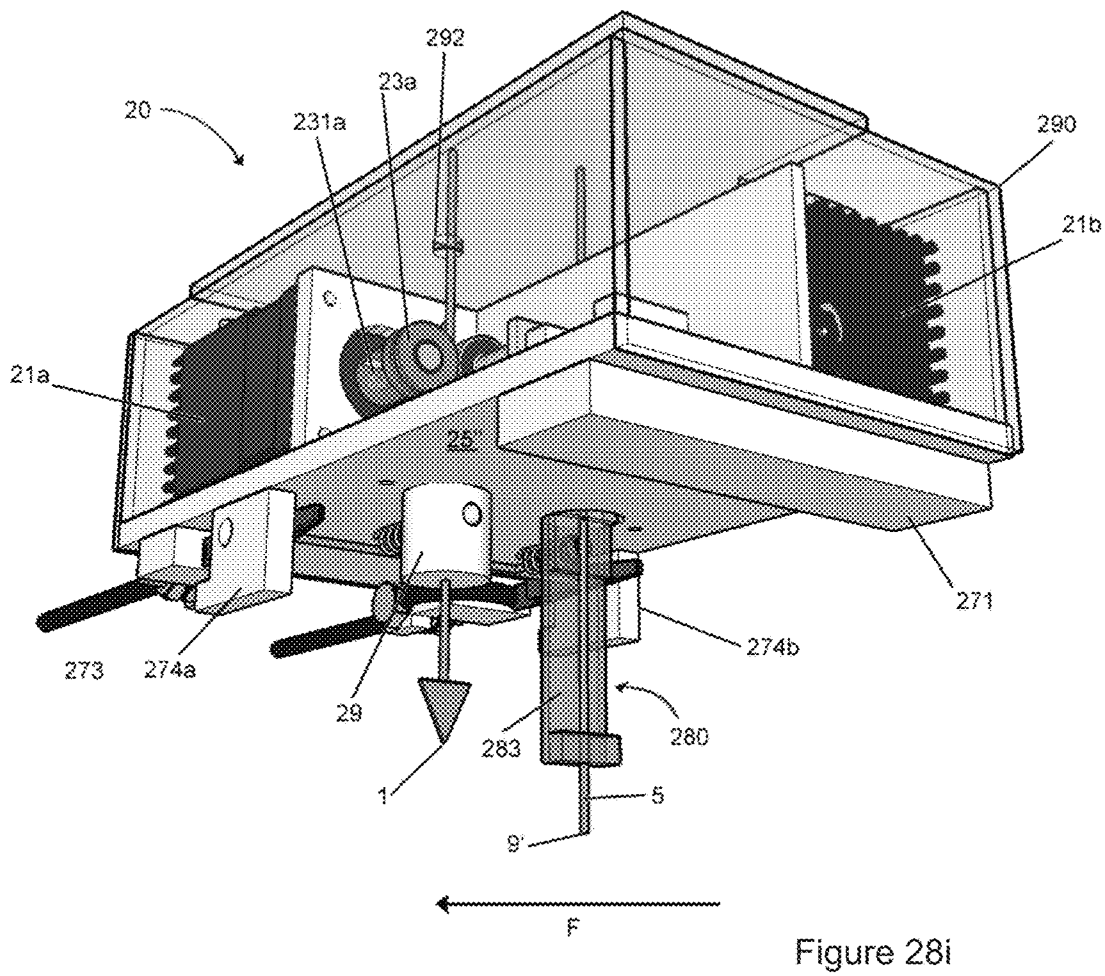

FIG. 28I is similar to FIG. 28F except now an electrode 5 is the first electrode that contacts a liquid 3 flowing in the direction of the arrow "F" within the trough member 30.

Figure 28J:
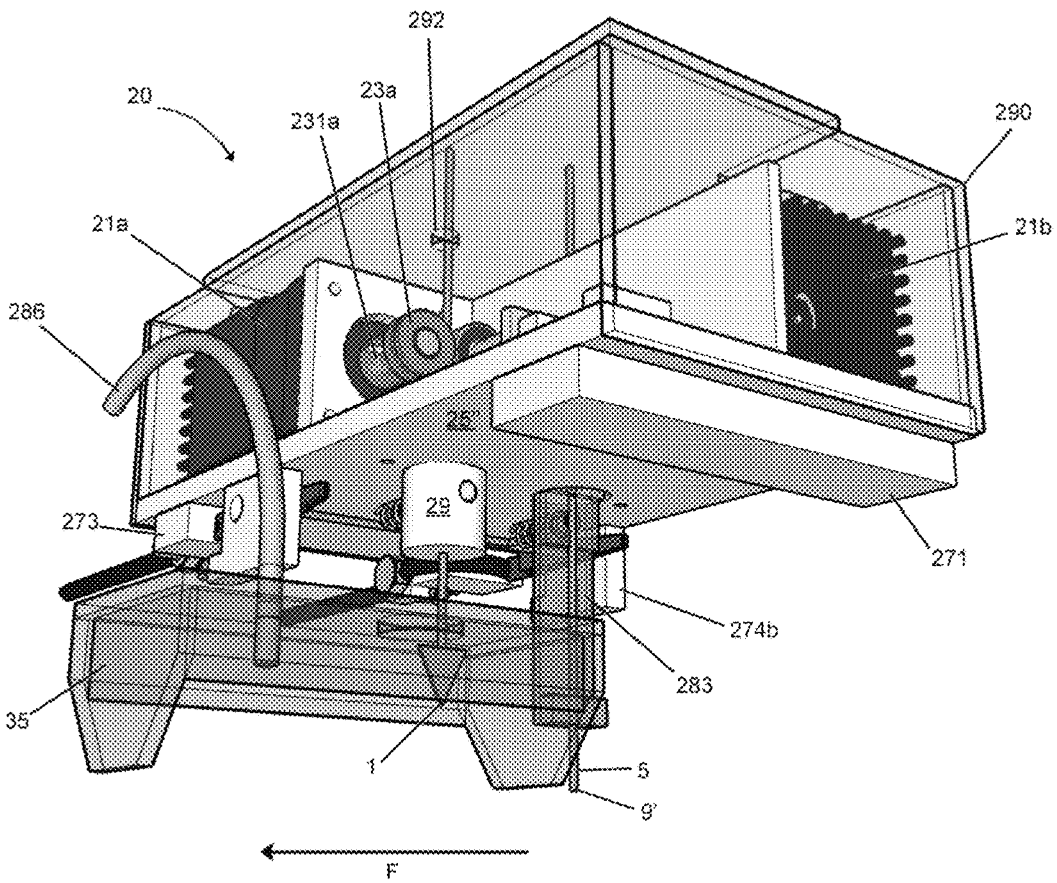

FIG. 28J corresponds to FIG. 28G except that the electrode 5 first contacts the flowing liquid 3 in the trough member 30.

Figure 28K:
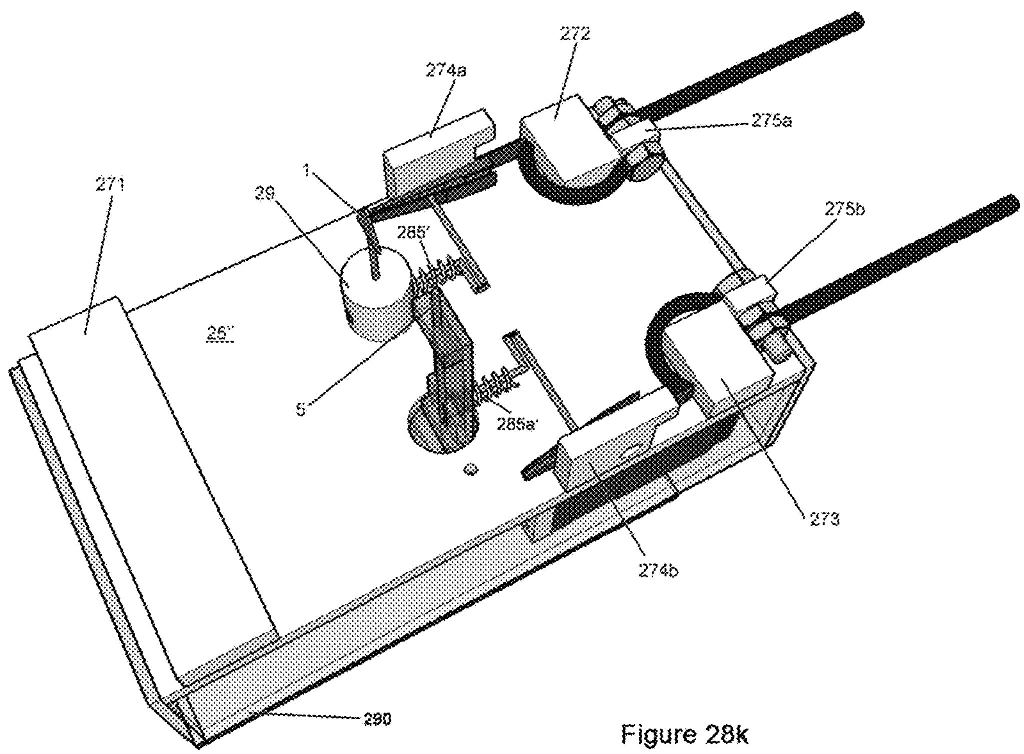
Figure 28I:
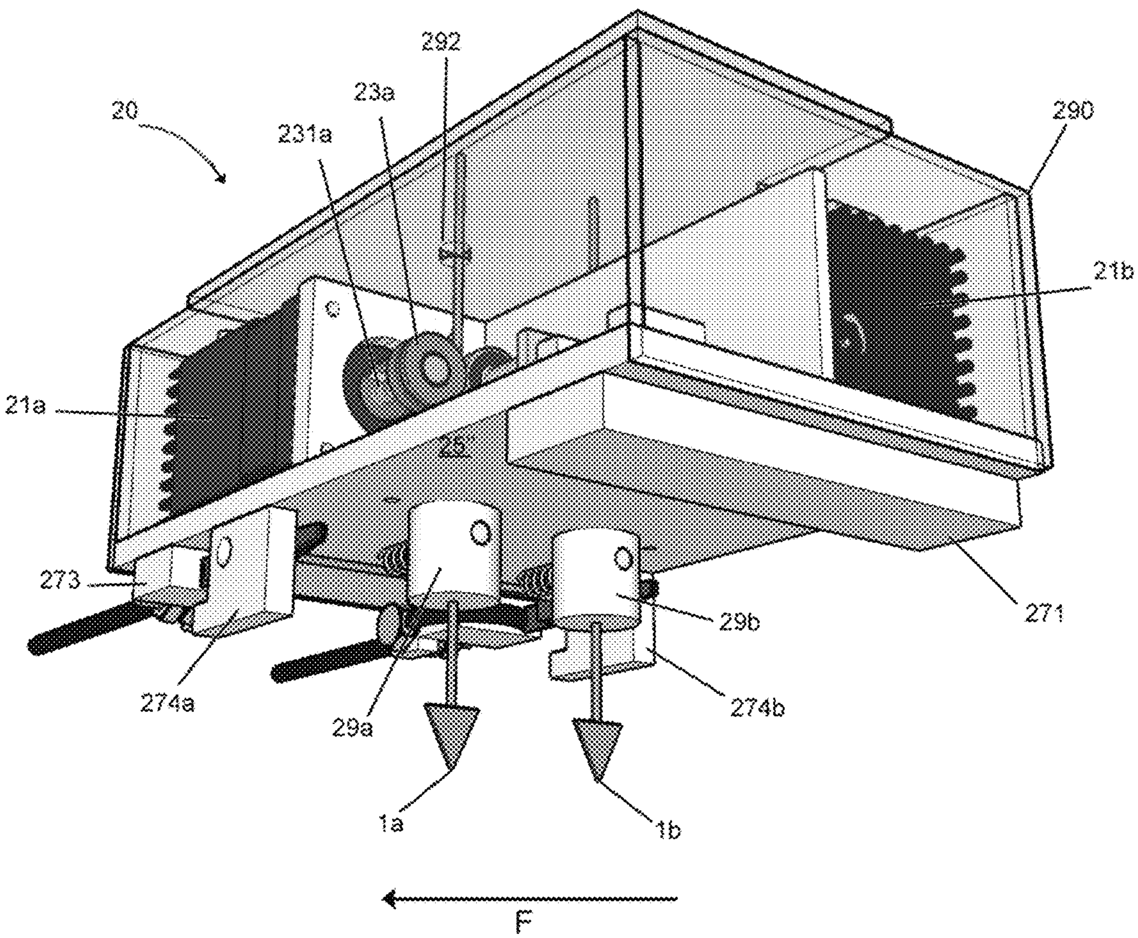

FIG. 28K shows a more detailed perspective view of the underside of the apparatus shown in the other FIG. 28's herein.

FIG. 28L shows the control device 20 similar to that shown in FIGS. 28F and 281, except that two electrodes 1 are provided.

Figure 28M:
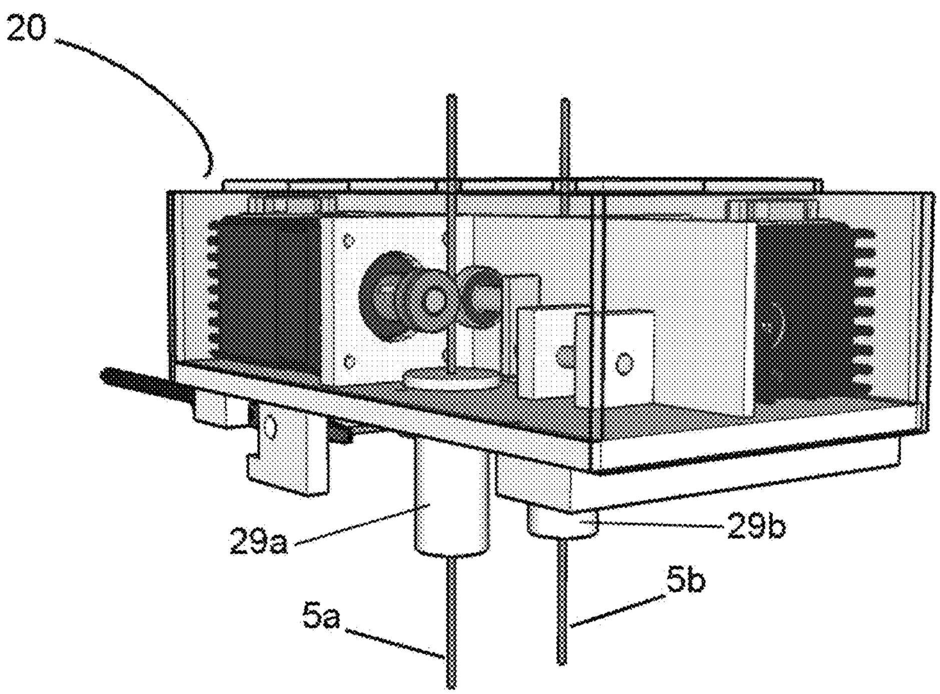

FIG. 28M shows the control device 20 similar to that shown in FIG. 28L except that two refractory electrode guide portions 29*a* and 29*b* are provided for the electrodes 5*a*, 5*b*, respectively.

Figure 29:
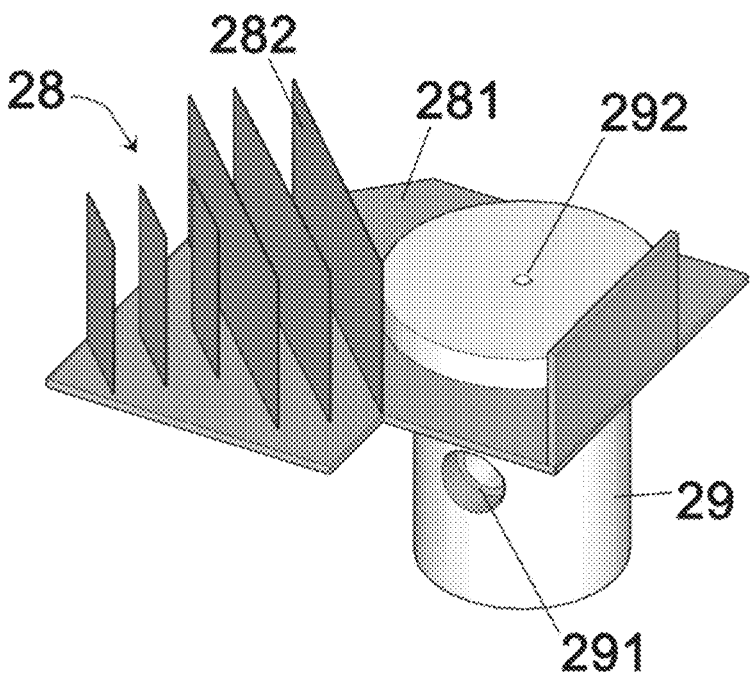
FIG. 29 shows a perspective view of a thermal management device including a refractory member 29 and a heat sink 28.

FIG. 29 shows another preferred embodiment of the invention wherein a refractory material 29 is combined with a heat sink 28 such that heat generated during processes practiced according to embodiments of the invention generate sufficient amounts of heat that necessitate a thermal management program. In this regard, the component 29 is made of, for example, suitable refractory component, including, for example, aluminum oxide or the like. The refractory component 29 has a transverse through-hole 291 therein which provides for electrical connections to the electrode(s) 1 and/or 5. Further a longitudinal through-hole 292 is present along the length of the refractory component 29 such that electrode assemblies 1/5 can extend therethrough. The heat sink 28 thermally communicates with the refractory member 29 such that any heat generated from the electrode assembly 1 and/or 5 is passed into the refractory member 29, into the heat sink 28 and out through the fins 282, as well as the base portion 281 of the heat sink 28. The precise number, size, shape and location of the fins 282 and base portion 281 are a function of, for example, the amount of heat required to be dissipated. Further, if significant amounts of heat are generated, a cooling means such as a fan can be caused to blow across the fins 282. The heat sink is preferably made from a thermally conductive metal such as copper, aluminum, etc.

Figure 30:
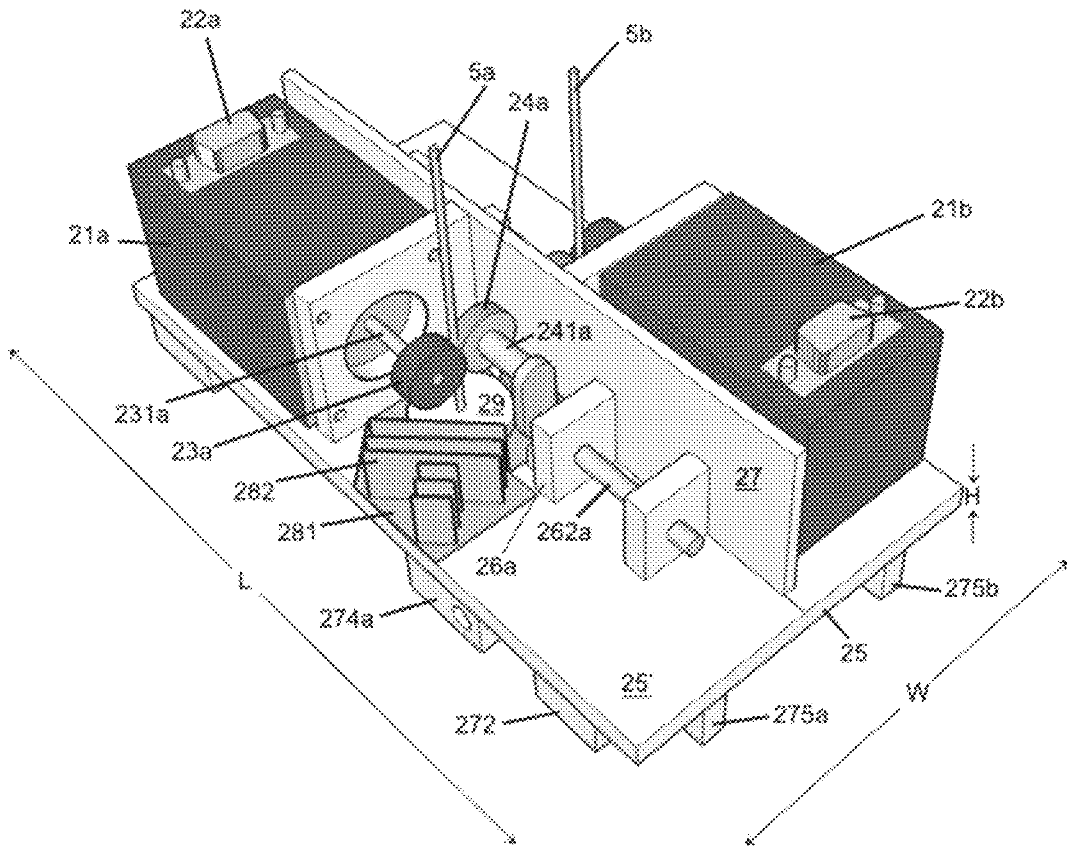
FIG. 30 shows a perspective view of a control device 20.

FIG. 30 shows a perspective view of the heat sink of FIG. 29 as being added to the device shown in FIG. 27. In this regard, rather than the electrode 5*a* directly contacting the base portion 25, the refractory member 29 is provided as a buffer between the electrodes 1/5 and the base member 25.

A fan assembly, not shown in the drawings, can be attached to a surrounding housing which permits cooling air to blow across the cooling fins 282. The fan assembly could comprise a fan similar to a computer cooling fan, or the like. A preferred fan assembly comprises, for example, a Dynatron DF124020BA, DC brushless, 9000 RPM, ball bearing fan measuring about 40 mm×40 mm×20 mm works well. Specifically, this fan has an air flow of approximately 10 cubic feet per minute.

Figure 31:
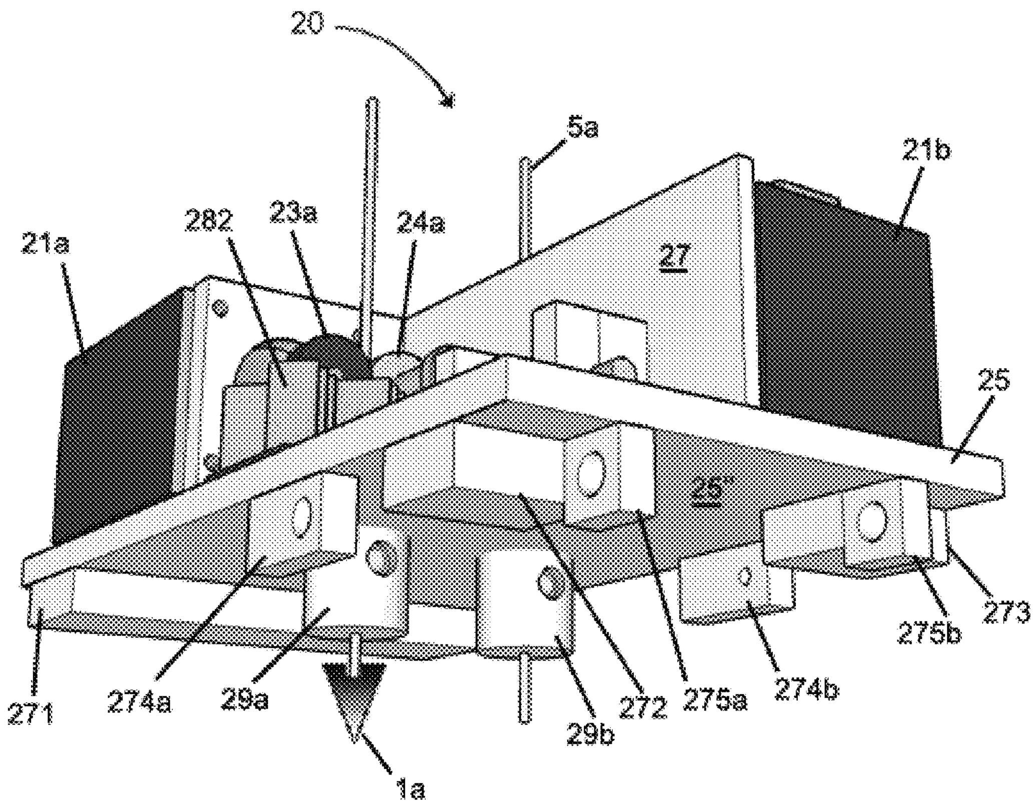
FIG. 31 shows a perspective view of a control device 20.

FIG. 31 shows a perspective view of the bottom portion of the control device 20 shown in FIG. 30A. In this FIG. 31, one electrode(s) 1*a* is shown as extending through a first refractory portion 29*a* and one electrode(s) 5*a* is shown as extending through a second refractory portion 29*b*. Accordingly, each of the electrode assemblies expressly disclosed herein, as well as those referred to herein, can be utilized in combination with the preferred embodiments of the control device shown in FIGS. 27-31. In order for the control devices 20 to be actuated, two general processes need to occur. A first process involves electrically activating the electrode(s) 1 and/or 5 (e.g., applying power thereto from a preferred power source 10), and the second general process occurrence involves determining how much power is applied to the electrode(s) and appropriately adjusting electrode 1/5 height in response to such determinations (e.g., manually and/or automatically adjusting the height of the electrodes 1/5). In the case of utilizing a control device 20, suitable instructions are communicated to the step motor 21 through the RS-232 ports 22*a* and 22*b*. Important embodiments of components of the control device 20, as well as the electrode activation process, are discussed later herein.

Power Sources

A variety of power sources are suitable for use with the present invention. Power sources such as AC sources of a variety of frequencies, DC sources of a variety of frequencies, rectified AC sources of various polarities, etc., can be used. However, in the preferred embodiments disclosed herein, an AC power source is utilized directly, or an AC power source has been rectified to create a specific DC source of variable polarity.

Figure 32A:
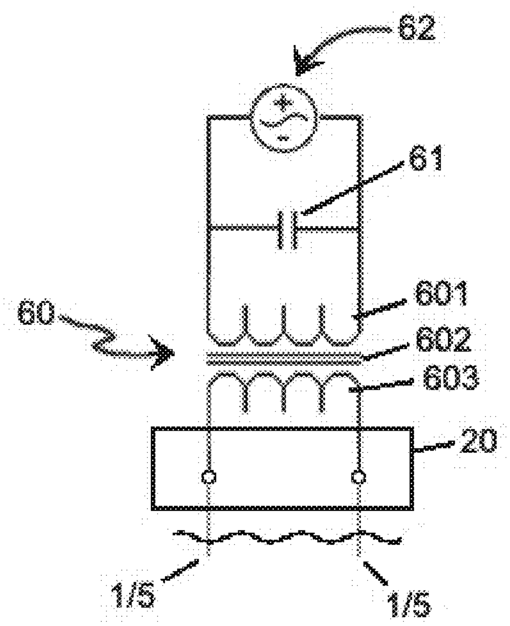
FIGS. 32A, 32B and 32C show AC transformer electrical wiring diagrams for use with different embodiments of the invention.

FIG. 32A shows a source of AC power 62 connected to a transformer 60. In addition, a capacitor 61 is provided so that, for example, loss factors in the circuit can be adjusted. The output of the transformer 60 is connected to the electrode(s) 1/5 through the control device 20. A preferred transformer for use with the present invention is one that uses alternating current flowing in a primary coil 601 to establish an alternating magnetic flux in a core 602 that easily conducts the flux.

When a secondary coil 603 is positioned near the primary coil 601 and core 602, this flux will link the secondary coil 603 with the primary coil 601. This linking of the secondary coil 603 induces a voltage across the secondary terminals. The magnitude of the voltage at the secondary terminals is related directly to the ratio of the secondary coil turns to the primary coil turns. More turns on the secondary coil 603 than the primary coil 601 results in a step up in voltage, while fewer turns results in a step down in voltage.

Preferred transformer(s) 60 for use in various embodiments disclosed herein have deliberately poor output voltage regulation made possible by the use of magnetic shunts in the transformer 60. These transformers 60 are known as neon sign transformers. This configuration limits current flow into the electrode(s) 1/5. With a large change in output load voltage, the transformer 60 maintains output load current within a relatively narrow range.

The transformer 60 is rated for its secondary open circuit voltage and secondary short circuit current. Open circuit voltage (OCV) appears at the output terminals of the transformer 60 only when no electrical connection is present. Likewise, short circuit current is only drawn from the output terminals if a short is placed across those terminals (in which case the output voltage equals zero). However, when a load is connected across these same terminals, the output voltage of the transformer 60 should fall somewhere between zero and the rated OCV. In fact, if the transformer 60 is loaded properly, that voltage will be about half the rated OCV.

The transformer 60 is known as a Balanced Mid-Point Referenced Design (e.g., also formerly known as balanced midpoint grounded). This is most commonly found in mid to higher voltage rated transformers and most 60 mA transformers. This is the only type transformer acceptable in a "mid-point return wired" system. The "balanced" transformer 60 has one primary coil 601 with two secondary coils 603, one on each side of the primary coil 601 (as shown generally in the schematic view in FIG. 33A). This transformer 60 can in many ways perform like two transformers. Just as the unbalanced midpoint referenced core and coil, one end of each secondary coil 603 is attached to the core 602 and subsequently to the transformer enclosure and the other end of the each secondary coil 603 is attached to an output lead or terminal Thus, with no connector present, an unloaded 15,000 volt transformer of this type, will measure about 7,500 volts from each secondary terminal to the transformer enclosure but will measure about 15,000 volts between the two output terminals.

In alternating current (AC) circuits possessing a line power factor or 1 (or 100%), the voltage and current each start at zero, rise to a crest, fall to zero, go to a negative crest and back up to zero. This completes one cycle of a typical sinewave. This happens 60 times per second in a typical US application. Thus, such a voltage or current has a characteristic "frequency" of 60 cycles per second (or 60 Hertz) power. Power factor relates to the position of the voltage waveform relative to the current waveform. When both waveforms pass through zero together and their crests are together, they are in phase and the power factor is 1, or 100%. FIG. 33B shows two waveforms "V" (voltage) and "C" (current) that are in phase with each other and have a power factor of 1 or 100%; whereas FIG. 33C shows two waveforms "V" (voltage) and "C" (current) that are out of phase with each other and have a power factor of about 60%; both waveforms do not pass through zero at the same time, etc. The waveforms are out of phase and their power factor is less than 100%.

The normal power factor of most such transformers 60 is largely due to the effect of the magnetic shunts 604 and the secondary coil 603, which effectively add an inductor into the output of the transformer's 60 circuit to limit current to the electrodes 1/5. The power factor can be increased to a higher power factor by the use of capacitor(s) 61 placed across the primary coil 601 of the transformer, 60 which brings the input voltage and current waves more into phase.

The unloaded voltage of any transformer 60 to be used in the present invention is important, as well as the internal structure thereof. Desirable unloaded transformers for use in the present invention include those that are around 9,000 volts, 10,000 volts, 12,000 volts and 15,000 volts. However, these particular unloaded volt transformer measurements should not be viewed as limiting the scope acceptable power sources as additional embodiments. A specific desirable transformer for use with various embodiments of the invention disclosed herein is made by Franceformer, Catalog No. 9060-P-E which operates at: primarily 120 volts, 60 Hz; and secondary 9,000 volts, 60 mA.

Figure 32B:
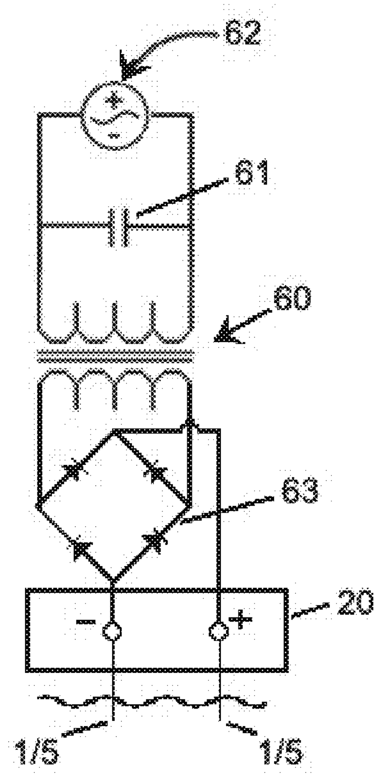
Figure 32C:
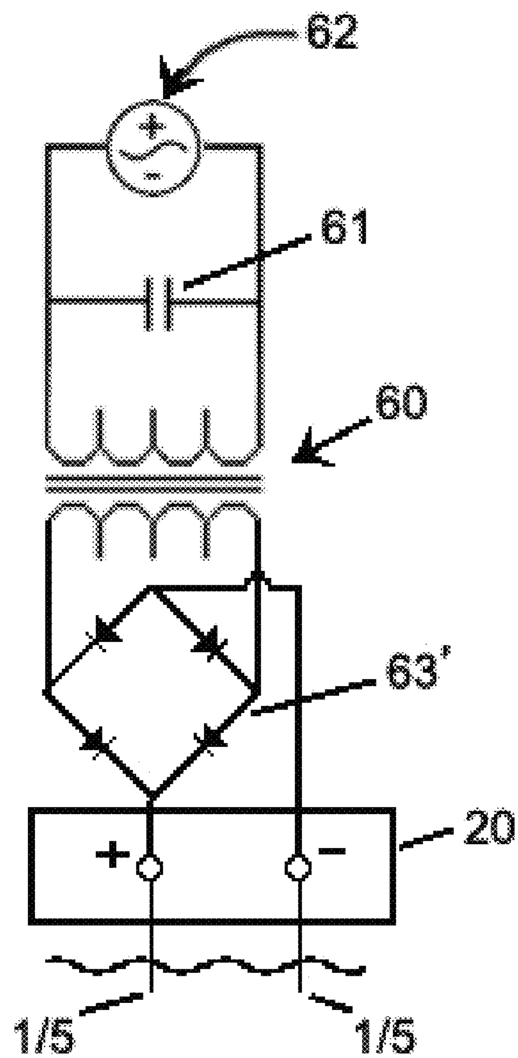

FIGS. 32B and 32C show another embodiment of the invention, wherein the output of the transformer 60 that is input into the electrode assemblies 1/5 has been rectified by a diode assembly 63 or 63'. The result, in general, is that an AC wave becomes substantially similar to a DC wave. In other words, an almost flat line DC output results (actually a slight 120 Hz pulse can sometimes be obtained). This particular assembly results in two additional preferred embodiments of the invention (e.g., regarding electrode orientation). In this regard, a substantially positive terminal or output and substantially negative terminal or output is generated from the diode assembly 63. An opposite polarity is achieved by the diode assembly 63'. Such positive and negative outputs can be input into either of the electrode(s) 1 and/or 5. Accordingly, an electrode 1 can be substantially negative or substantially positive; and/or an electrode 5 can be substantially negative and/or substantially positive. Further, when utilizing the assembly of FIG. 32B, it has been found that the assemblies shown in FIGS. 29, 30 and 31 are desirable. In this regard, the wiring diagram shown in FIG. 32B can generate more heat (thermal output) than that shown in, for example, FIG. 32A under a given set of operating (e.g., power) conditions. Further, one or more rectified AC power source(s) can be particularly useful in combination with the membrane assemblies shown in, for example, FIGS. 21-26.

Figure 34A:
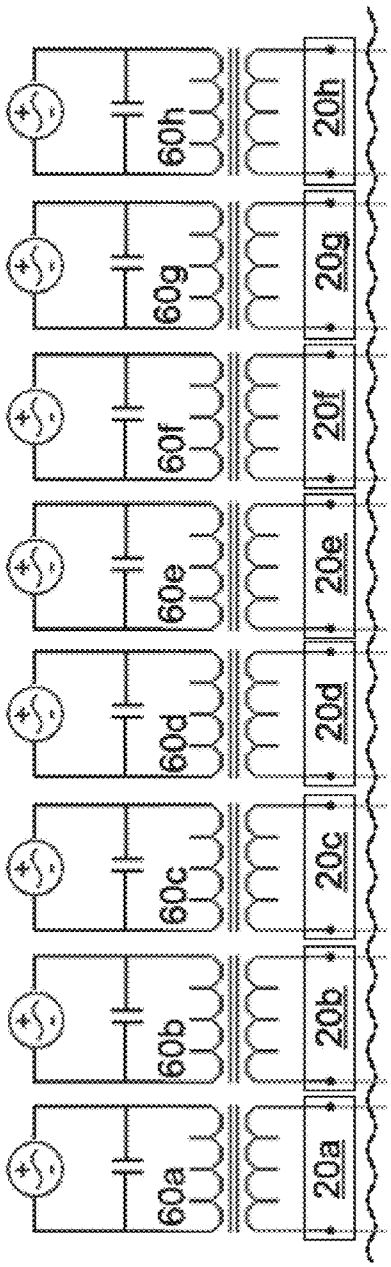
FIGS. 34A, 34B and 34C each show schematic views of eight electrical wiring diagrams for use with 8 sets of electrodes.

FIG. 34A shows 8 separate transformer assemblies 60*a*-60*h* each of which is connected to a corresponding control device 20*a*-20*h*, respectively. This set of transformers 60 and control devices 20 is utilized in one preferred embodiment discussed in the Examples section later herein.

Figure 34B:
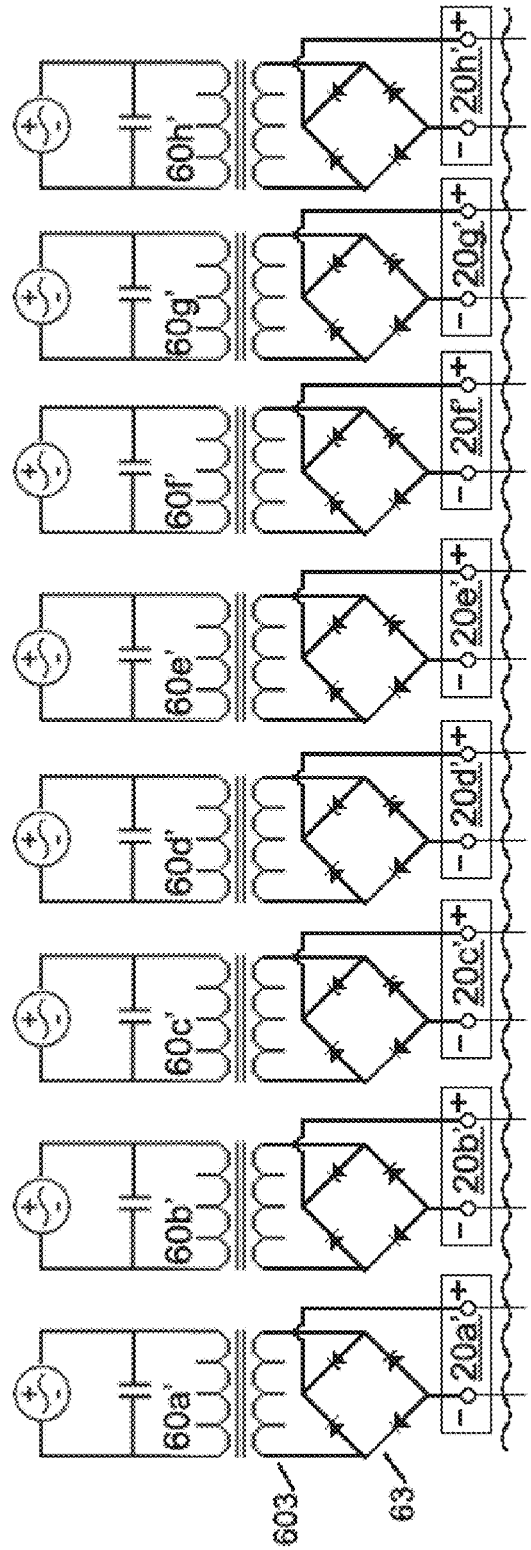

FIG. 34B shows 8 separate transformers 60*a*'-60*h*', each of which corresponds to the rectified transformer diagram shown in FIG. 32B. This transformer assembly also communicates with a set of control devices 20*a*-20*h* and can be used as a preferred embodiment of the invention.

Figure 34C:
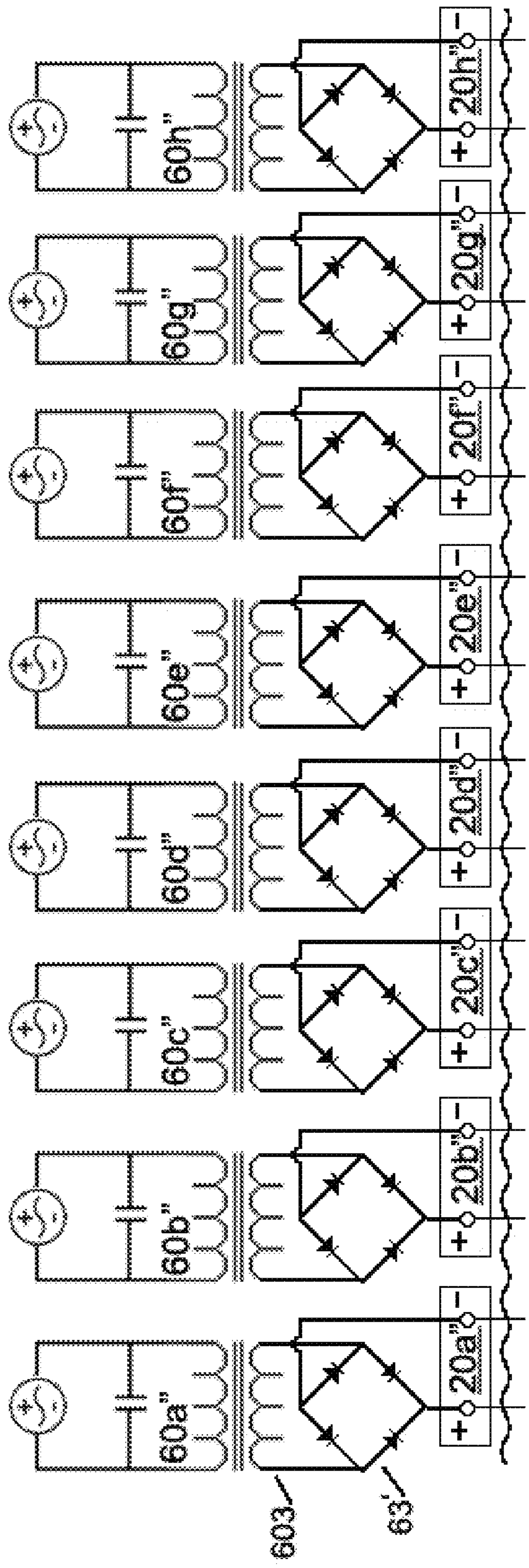

FIG. 34C shows 8 separate transformers 60*a*"-60*h*", each of which corresponds to the rectified transformer diagram shown in FIG. 32C. This transformer assembly also communicates with a set of control devices 20*a*-20*h* and can be used as a preferred embodiment of the invention.

Accordingly, each transformer assembly 60*a*-60*h* (and/or 60*a*'-60*h*'; and/or 60*a*"-60*h*") can be the same transformer, or can be a combination of different transformers (as well as different polarities). The choice of transformer, power factor, capacitor(s) 61, polarity, electrode designs, electrode location, electrode composition, cross-sectional shape(s) of the trough member 30, local or global electrode composition, atmosphere(s), local or global liquid 3 flow rate(s), liquid 3 local components, volume of liquid 3 locally subjected to various fields in the trough member 30, neighboring (e.g., both upstream and downstream) electrode sets, local field concentrations, the use and/or position and/or composition of any membrane 5*m*, etc., are all factors which influence processing conditions as well as composition and/or volume of constituents produced in the liquid 3, nanoparticles and nanoparticle/solutions made according to the various embodiments disclosed herein. Accordingly, a plethora of embodiments can be practiced according to the detailed disclosure presented herein.

Another preferred AC power source used in some of the Examples herein was a variable AC transformer. Specifically, each transformer 50/50*a* was a variable AC transformer constructed of a single coil/winding of wire. This winding acts as part of both the primary and secondary winding. The input voltage is applied across a fixed portion of the winding. The output voltage is taken between one end of the winding and another connection along the winding. By exposing part of the winding and making the secondary connection using a sliding brush, a continuously variable ratio can be obtained. The ratio of output to input voltages is equal to the ratio of the number of turns of the winding they connect to. Specifically, each transformer was a Mastech TDGC2-5kVA, 10A Voltage Regulator, Output 0-250V.

Electrode Height Control/Automatic Control Device

Figure 35A:
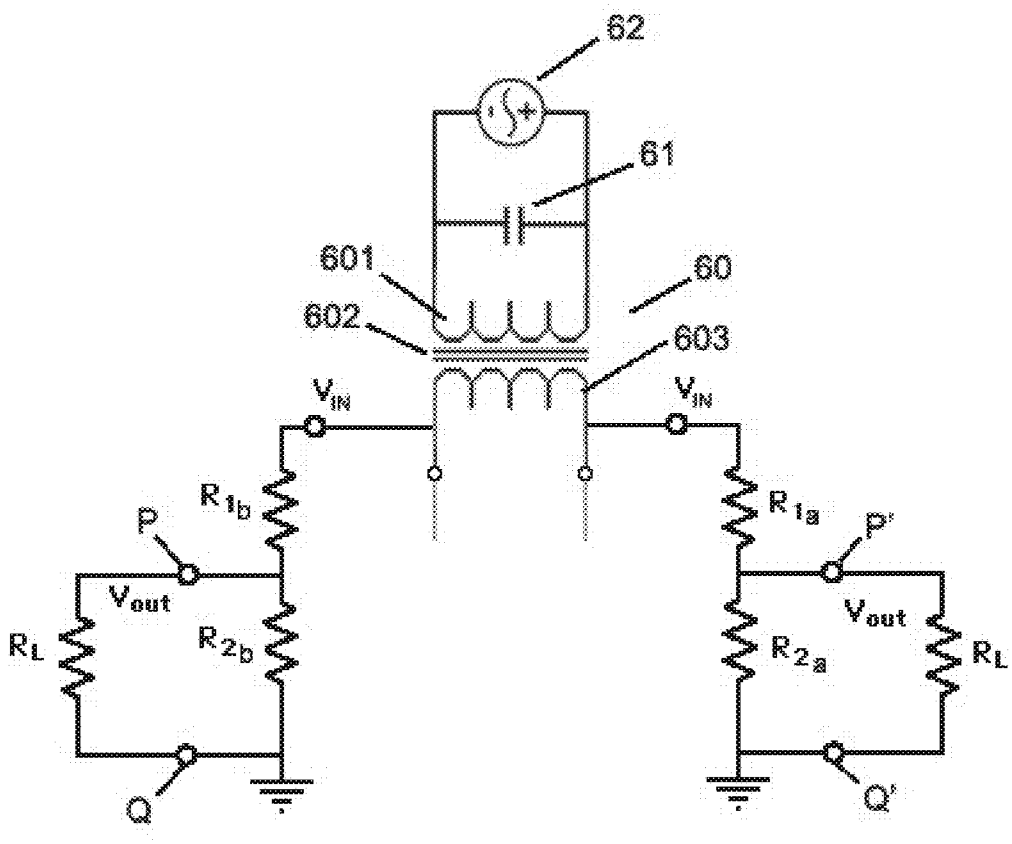
FIGS. 35A and 35B show schematic views of electrical wiring diagrams utilized to monitor voltages (35A) and amperages (35B) from the outputs of a secondary coil of a transformer.

A preferred embodiment of the invention utilizes the automatic control devices 20 shown in various FIGS. herein. The step motors 21*a* and 21*b* shown in, for example, FIGS. 27-31, are controlled by an electrical circuit diagrammed in each of FIGS. 35, 36A, 36B and 36C. In particular, the electrical circuit of FIG. 35 is a voltage monitoring circuit. Specifically, voltage output from each of the output legs of the secondary coil 603 in the transformer 60 are monitored over the points "P-Q" and the points "P'-V". Specifically, the resistor denoted by "$R_L$" corresponds to the internal resistance of the multi-meter measuring device (not shown). The output voltages measured between the points "P-Q" and "P'-V" typically, for several preferred embodiments shown in the Examples later herein, range between about 200 volts and about 4,500 volts. However, higher and lower voltages can work with many of the embodiments disclosed herein. In the Examples later herein, desirable target voltages have been determined for each electrode set 1 and/or 5 at each position along a trough member 30. Such desirable target voltages are achieved as actual applied voltages by, utilizing, for example, the circuit control shown in FIGS. 36A, 36B and 36C. These FIG. 36 refer to sets of relays controlled by a Velleman K8056 circuit assembly (having a micro-chip PIC16F630-I/P). In particular, a voltage is detected across either the "P-Q" or the "P'-V" locations and such voltage is compared to a predetermined reference voltage (actually compared to a target voltage range). If a measured voltage across, for example, the points "P-Q" is approaching a high-end of a pre-determined voltage target range, then, for example, the Velleman K8056 circuit assembly causes a servo-motor 21 (with specific reference to FIG. 28A) to rotate in a clockwise direction so as to lower the electrode 5*a* toward and/or into the fluid 3. In contrast, should a measured voltage across either of the points "P-Q" or "P'-V" be approaching a lower end of a target voltage, then, for example, again with reference to FIG. 28A, the server motor 21*a* will cause the drive-wheel 23*a* to rotate in a counter-clockwise position thereby raising the electrode 5*a* relative to the fluid 3.

Each set of electrodes in each embodiment of the invention has an established target voltage range. The size or magnitude of acceptable range varies by an amount between about 1% and about 10%-15% of the target voltage. Some embodiments of the invention are more sensitive to voltage changes and these embodiments should have, typically, smaller acceptable voltage ranges; whereas other embodiments of the invention are less sensitive to voltage and should have, typically, larger acceptable ranges. Accordingly, by utilizing the circuit diagram shown in FIG. 35A, actual voltages output from the secondary coil 603 of the transformer 60 are measured at "$R_L$" (across the terminals "P-Q" and "P'-Q'"), and are then compared to the predetermined voltage ranges. The servo-motor 21 responds by rotating a predetermined amount in either a clockwise direction or a counter-clockwise direction, as needed. Moreover, with specific reference to FIG. 36, it should be noted that an interrogation procedure occurs sequentially by determining the voltage of each electrode, adjusting height (if needed) and then proceeding to the next electrode. In other words, each transformer 60 is connected electrically in a manner shown in FIG. 35. Each transformer 60 and associated measuring points "P-Q" and "P'-Q'" are connected to an individual relay. For example, the points "P-Q" correspond to relay number 501 in FIG. 36A and the points "P'-Q'" correspond to the relay 502 in FIG. 36A. Accordingly, two relays are required for each transformer 60. Each relay, 501, 502, etc., sequentially interrogates a first output voltage from a first leg of a secondary coil 603 and then a second output voltage from a second leg of the secondary coil 603; and such interrogation continues onto a first output voltage from a second transformer 60*b* on a first leg of its secondary coil 603, and then on to a second leg of the secondary coil 603, and so on.

Figure 35B:
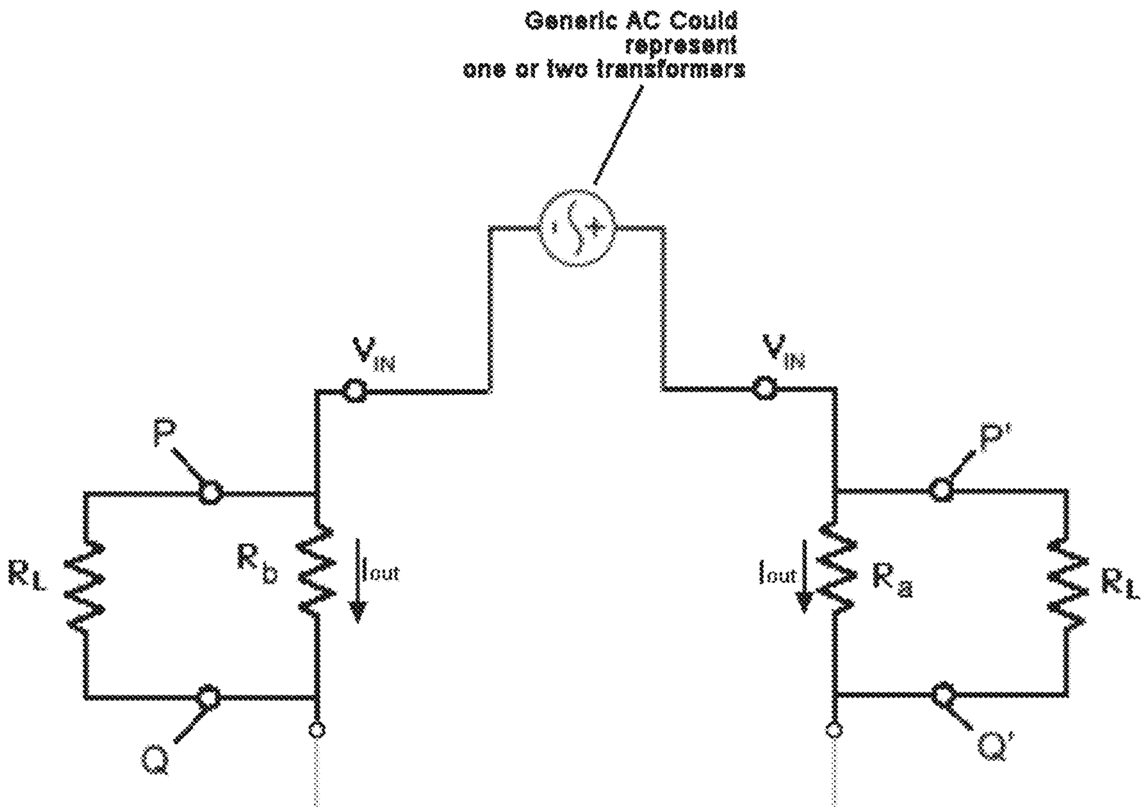
Figure 36A:
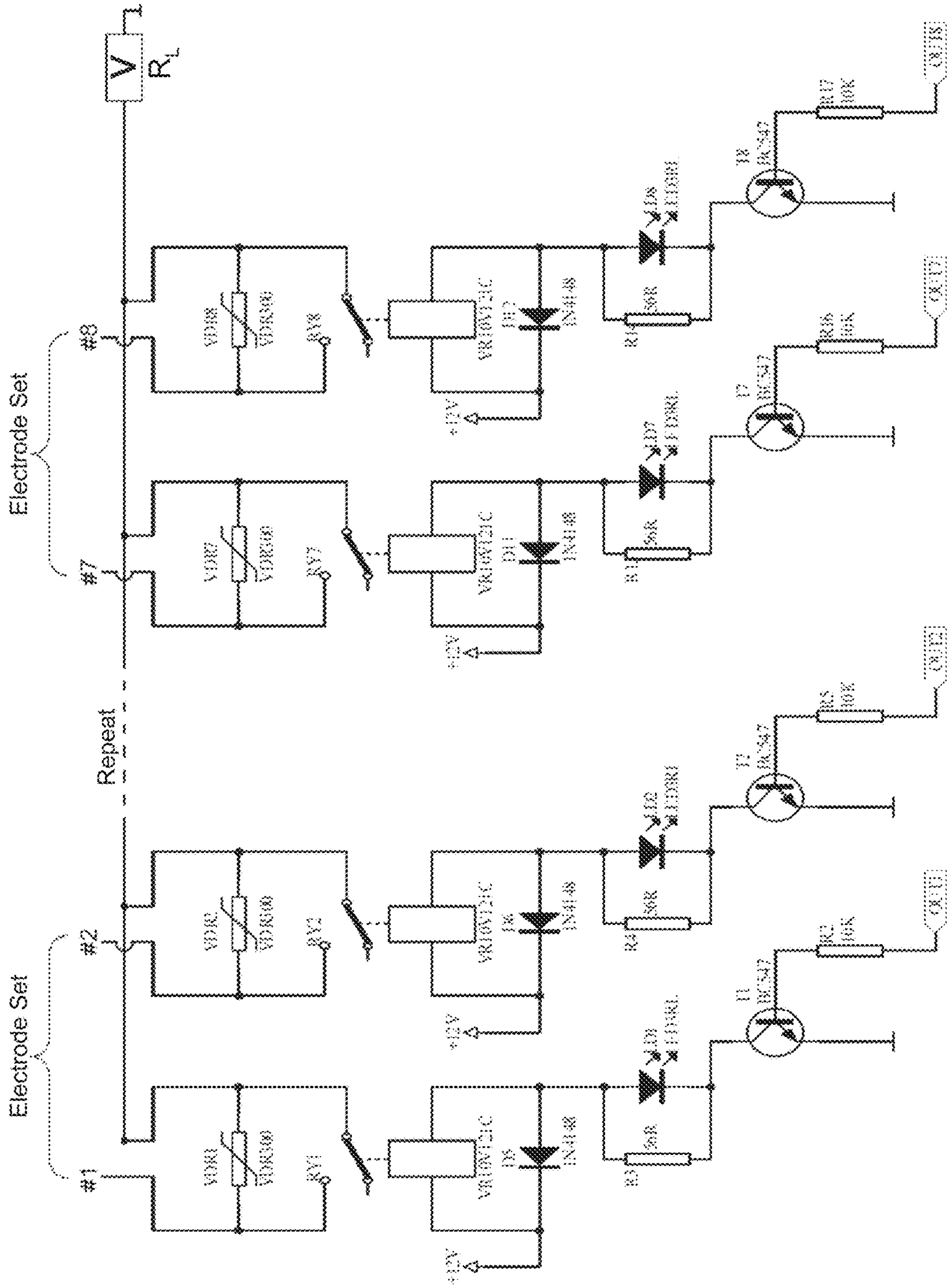
FIGS. 36A, 36B and 36C show schematic views of wiring diagrams associated with a Velleman K8056 circuit relay board.
Figure 36C:
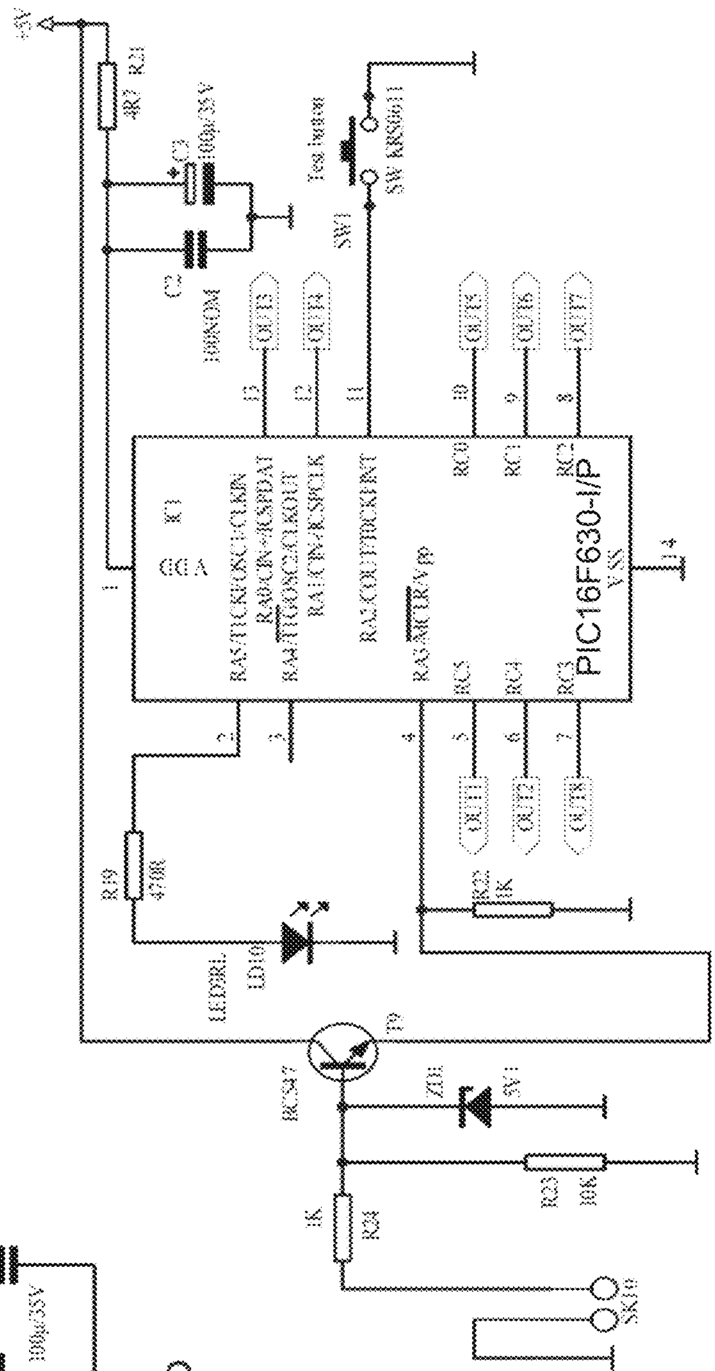
Figure 36B:
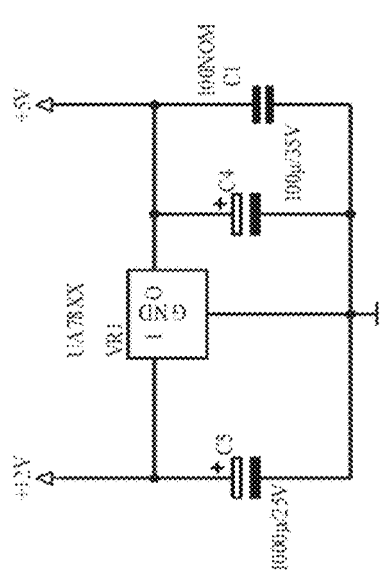
Figure 36D:
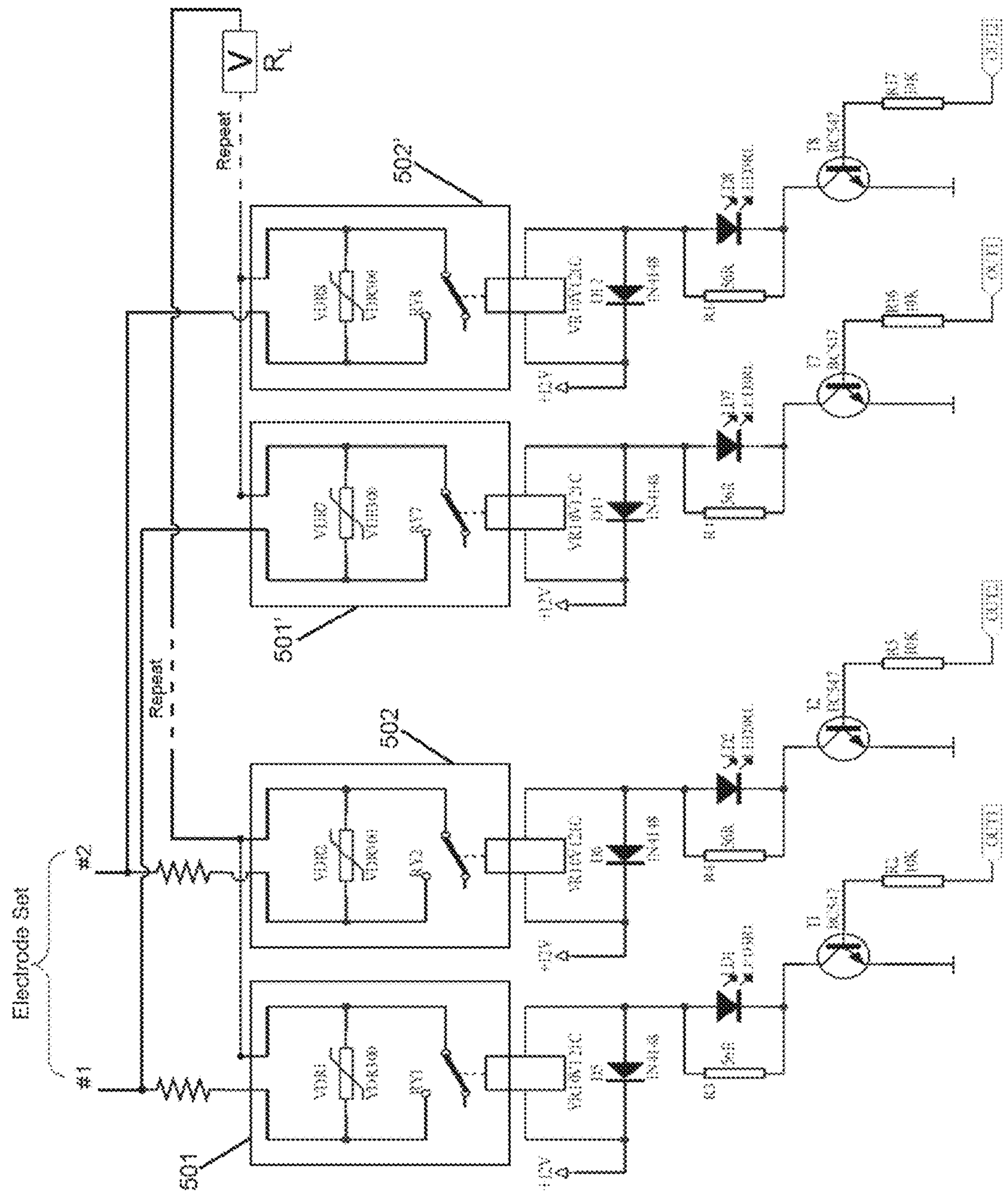
FIG. 36D shows a similar wiring diagram associated with a Velleman K8056 circuit relay board.

Further, in another preferred embodiment of the invention utilized in Example 15 for the electrode sets 5/5', the automatic control devices 20 are controlled by the electrical circuits of FIGS. 36D, 36E, 36F and 35B. In particular, the electrical circuit of FIG. 35B is a voltage monitoring circuit used to measure current. In this case, voltage and current are the same numerical value due to choice of a resistor (discussed later herein). Specifically, voltage output from each of the transformers 50 (utilized in certain of the gold solution or colloid embodiments discussed later herein) are monitored over the points "P-Q" and the points "P'-Q'". Specifically, the resistor denoted by "$R_L$" corresponds to the internal resistance of the multi-meter measuring device (not shown). The output voltages measured between the points "P-Q" and "P'-Q'" typically, for several preferred embodiments shown in the Examples later herein, range between about 0.05 volts and about 5 volts. However, higher and lower voltages can work with many of the embodiments disclosed herein. Desirable target voltages have been determined for each electrode set 5/5' at each position along a trough member 30*b*'. Such desirable target voltages are achieved as actual applied voltages by, utilizing, for example, the circuit control shown in FIGS. 36D, 36E, 36F and 35B. These FIGS. refer to sets of relays controlled by a Velleman K8056 circuit assembly (having a micro-chip PIC16F630-I/P).

In particular, in the Example 15 embodiments the servo-motor 21 is caused to rotate at a specific predetermined time in order to maintain a desirable electrode 5 profile. The servo-motor 21 responds by rotating a predetermined amount in a clockwise direction. Specifically the servo-motor 21 rotates a sufficient amount such that about 0.009 inches (0.229 mm) of the electrode 5 is advanced toward and into the female receiver portion o5. Such electrode 5 movement occurs about every 5.8 minutes. Accordingly, the rate of vertical movement of each electrode 5 into the female receiver portion o5 is about ¾inches (about 1.9 cm) every 8 hours.

Moreover, with specific reference to FIGS. 36D, 36E, 36F and 35B, it should be noted that an interrogation procedure occurs sequentially by determining the voltage of each electrode, which in the embodiments of Example 15, are equivalent to the amps because in FIG. 35B the resistors Ra and Rb are approximately 1 ohm, accordingly, V=I. In other words, each transformer 50 is connected electrically in a manner shown in 36*d*, 36*e*, 36*f* and 35*b*. Each transformer 50 and associated measuring points "P-Q" and "P'-Q'" are connected to two individual relays. For example, the points "P-Q" correspond to relay number 501 and 501' in FIG. 36F and the points "P'-Q'" correspond to the relay 502, 502' in FIG. 36F. Accordingly, relays are required for each electrode set 5/5. Each relay, 501/501' and 502/502', etc., sequentially interrogates the output voltage from the transformer 50 and then a second voltage from the same transformer 50, and so on.

The computer or logic control for the disclosed electrode height adjustment techniques are achieved by any conventional program or controller, including, for example, in a preferred embodiment, standard visual basic programming steps utilized in a PC. Such programming steps include reading and sending an appropriate actuation symbol to lower an electrode relative to the surface 2 of the liquid 3. Such techniques should be understood by an artisan of ordinary skill.

The following Examples serve to illustrate certain embodiments of the invention but should not to be construed as limiting the scope of the disclosure as defined in the appended claims.

EXAMPLES 1-4

Manufacturing Gold-Based Nanoparticles/Nanoparticle Solutions GT032, GT031, GT019 and GT033

Figure 33A:
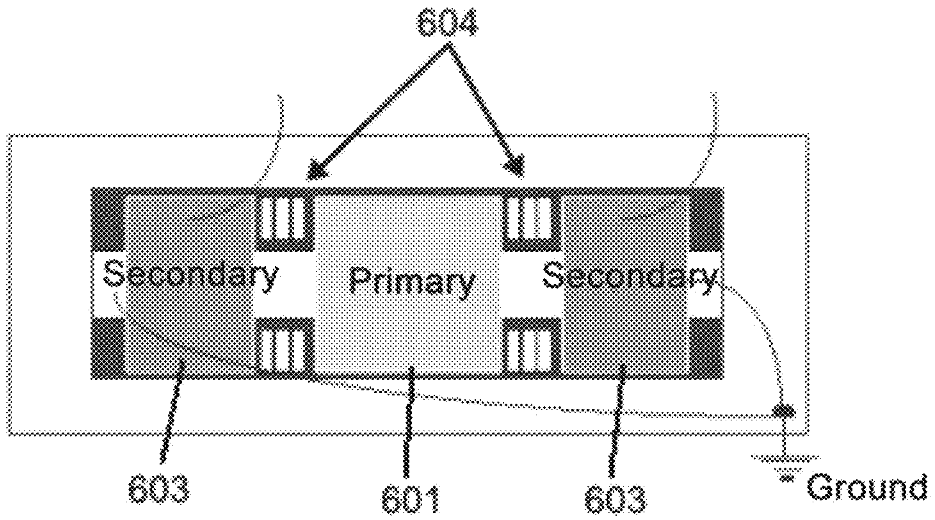
FIG. 33A shows a schematic view of a transformer and FIGS. 33B and 33C show schematic representations of two sine waves in phase and out of phase, respectively.
Figure 33B:
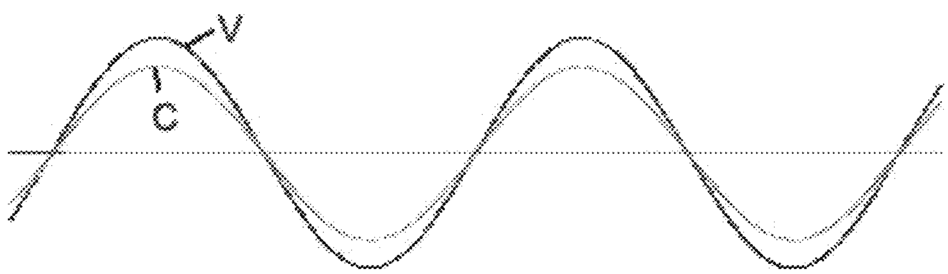
Figure 33C:
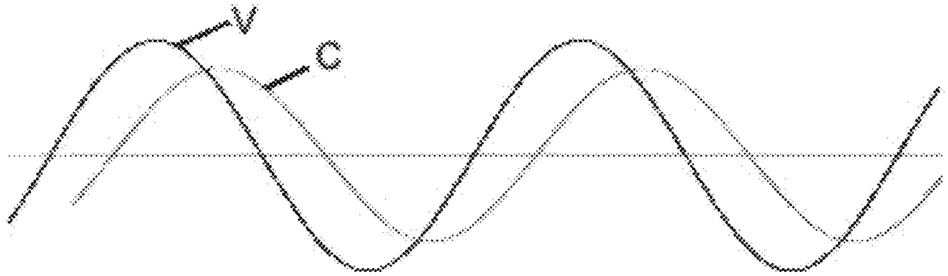

In general, each of Examples 1-4 utilizes certain embodiments of the invention associated with the apparatuses generally shown in FIGS. 16B, 16C and 33A. Specific differences in processing and apparatus will be apparent in each Example. The trough member 30 was made from plexiglass, all of which had a thickness of about 3 mm-4 mm (about ⅛"). The support structure 34 was also made from plexiglass which was about ¼" thick (about 6-7 mm thick). The cross-sectional shape of the trough member 30 corresponds to that shape shown in FIG. 10B (i.e., a truncated "V"). The base portion "R" of the truncated "V" measured about 0.5" (about 1 cm), and each side portion "S", "S'" measured about 1.5" (about 3.75 cm). The distance "M" separating the side portions "S", "S'" of the V-shaped trough member 30 was about 2¼"-2 5/16" (about 5.9 cm) (measured from inside to inside). The thickness of each portion also measured about ⅛" (about 3 mm) thick. The longitudinal length "$L_T$" (refer to FIG. 11A) of the V-shaped trough member 30 measured about 6 feet (about 2 meters) long from point 31 to point 32. The difference in vertical height from the end 31 of the trough member 30 to the end 32 was about ¼-½" (about 6-12.7 mm) over its 6 feet length (about 2 meters) (i.e., less than 1°).

Purified water (discussed later herein) was used as the input liquid 3 in Example 1. In Examples 2-4, a processing enhancer was added to the liquid 3 being input into the trough member 30. The specific processing enhancer added, as well as the specific amounts of the same, were effective in these examples. However, other processing enhancer(s) and amounts of same, should be viewed as being within the metes and bounds of this disclosure and these specific examples should not be viewed as limiting the scope of the invention. The depth "d" (refer to FIG. 10B) of the water 3 in the V-shaped trough member 30 was about 7/16" to about ½" (about 11 mm to about 13 mm) at various points along the trough member 30. The depth "d" was partially controlled through use of the dam 80 (shown in FIGS. 15A and 15B). Specifically, the dam 80 was provided near the end 32 and assisted in creating the depth "d" (shown in FIG. 10B) to be about 7/16"-½" (about 11-13 mm) in depth. The height "j" of the dam 80 measured about ¼" (about 6 mm) and the longitudinal length "k" measured about ½" (about 13 mm) The width (not shown) was completely across the bottom dimension "R" of the trough member 30. Accordingly, the total volume of water 3 in the V-shaped trough member 30 during operation thereof was about 26 $in^3$ (about 430 ml).

The rate of flow of the water 3 into the trough member 30 was about 90 ml/minute. Due to some evaporation within the trough member 30, the flow out of the trough member 30 was slightly less, about 60-70 ml/minute. Such flow of water 3 into the trough member 30 was obtained by utilizing a Masterflex® L/S pump drive 40 rated at 0.1 horsepower, 10-600 rpm. The model number of the Masterflex® pump 40 was 77300-40. The pump drive had a pump head also made by Masterflex® known as Easy-Load Model No. 7518-10. In general terms, the head for the pump 40 is known as a peristaltic head. The pump 40 and head were controlled by a Masterflex® LS Digital Modular Drive. The model number for the Digital Modular Drive is 77300-80. The precise settings on the Digital Modular Drive were, for example, 90 milliliters per minute. Tygon® tubing having a diameter of ¼" (i.e., size 06419-25) was placed into the peristaltic head. The tubing was made by Saint Gobain for Masterflex®. One end of the tubing was delivered to a first end 31 of the trough member 30 by a flow diffusion means located therein. The flow diffusion means tended to minimize disturbance and bubbles in water 3 introduced into the trough member 30 as well as any pulsing condition generated by the peristaltic pump 40. In this regard, a small reservoir served as the diffusion means and was provided at a point vertically above the end 31 of the trough member 30 such that when the reservoir overflowed, a relatively steady flow of water 3 into the end 31 of the V-shaped trough member 30 occurred.

With regard to FIGS. 16B and 16C, 8 separate electrode sets (Set 1, Set 2, Set 3, -Set 8) were attached to 8 separate control devices 20. Each of Tables 1a-1d refers to each of the 8 electrode sets by "Set #". Further, within any Set #, electrodes 1 and 5, similar to the electrode assemblies shown in FIGS. 3A and 3C were utilized. Each electrode of the 8 electrode sets was set to operate within specific target voltage range. Actual target voltages are listed in each of Tables 1a-1d. The distance "c-c" (with reference to FIG. 14) from the centerline of each electrode set to the adjacent electrode set is also represented. Further, the distance "x" associated with any electrode(s) 1 utilized is also reported. For any electrode 5's, no distance "x" is reported. Other relevant distances are reported, for example, in each of Tables 1a-1d.

The power source for each electrode set was an AC transformer 60. Specifically, FIG. 32A shows a source of AC power 62 connected to a transformer 60. In addition, a capacitor 61 is provided so that, for example, loss factors in the circuit can be adjusted. The output of the transformer 60 is connected to the electrode(s) 1/5 through the control device 20. A preferred transformer for use with the present invention is one that uses alternating current flowing in a primary coil 601 to establish an alternating magnetic flux in a core 602 that easily conducts the flux.

When a secondary coil 603 is positioned near the primary coil 601 and core 602, this flux will link the secondary coil 603 with the primary coil 601. This linking of the secondary coil 603 induces a voltage across the secondary terminals. The magnitude of the voltage at the secondary terminals is related directly to the ratio of the secondary coil turns to the primary coil turns. More turns on the secondary coil 603 than the primary coil 601 results in a step up in voltage, while fewer turns results in a step down in voltage.

Preferred transformer(s) 60 for use in these Examples have deliberately poor output voltage regulation made possible by the use of magnetic shunts in the transformer 60. These transformers 60 are known as neon sign transformers. This configuration limits current flow into the electrode(s) 1/5. With a large change in output load voltage, the transformer 60 maintains output load current within a relatively narrow range.

The transformer 60 is rated for its secondary open circuit voltage and secondary short circuit current. Open circuit voltage (OCV) appears at the output terminals of the transformer 60 only when no electrical connection is present. Likewise, short circuit current is only drawn from the output terminals if a short is placed across those terminals (in which case the output voltage equals zero). However, when a load is connected across these same terminals, the output voltage of the transformer 60 should fall somewhere between zero and the rated OCV. In fact, if the transformer 60 is loaded properly, that voltage will be about half the rated OCV.

The transformer 60 is known as a Balanced Mid-Point Referenced Design (e.g., also formerly known as balanced midpoint grounded). This is most commonly found in mid to higher voltage rated transformers and most 60 mA transformers. This is the only type transformer acceptable in a "mid-point return wired" system. The "balanced" transformer 60 has one primary coil 601 with two secondary coils 603, one on each side of the primary coil 601 (as shown generally in the schematic view in FIG. 33A). This transformer 60 can in many ways perform like two transformers.

Just as the unbalanced midpoint referenced core and coil, one end of each secondary coil 603 is attached to the core 602 and subsequently to the transformer enclosure and the other end of the each secondary coil 603 is attached to an output lead or terminal Thus, with no connector present, an unloaded 15,000 volt transformer of this type, will measure about 7,500 volts from each secondary terminal to the transformer enclosure but will measure about 15,000 volts between the two output terminals.

In alternating current (AC) circuits possessing a line power factor or 1 (or 100%), the voltage and current each start at zero, rise to a crest, fall to zero, go to a negative crest and back up to zero. This completes one cycle of a typical sinewave. This happens 60 times per second in a typical US application. Thus, such a voltage or current has a characteristic “frequency” of 60 cycles per second (or 60 Hertz) power. Power factor relates to the position of the voltage waveform relative to the current waveform. When both waveforms pass through zero together and their crests are together, they are in phase and the power factor is 1, or 100%. FIG. 33B shows two waveforms “V” (voltage) and “C” (current) that are in phase with each other and have a power factor of 1 or 100%; whereas FIG. 33C shows two waveforms “V” (voltage) and “C” (current) that are out of phase with each other and have a power factor of about 60%; both waveforms do not pass through zero at the same time, etc. The waveforms are out of phase and their power factor is less than 100%.

The normal power factor of most such transformers 60 is largely due to the effect of the magnetic shunts 604 and the secondary coil 603, which effectively add an inductor into the output of the transformer’s 60 circuit to limit current to the electrodes 1/5. The power factor can be increased to a higher power factor by the use of capacitor(s) 61 placed across the primary coil 601 of the transformer, 60 which brings the input voltage and current waves more into phase.

The unloaded voltage of any transformer 60 to be used in the present invention is important, as well as the internal structure thereof. Desirable unloaded transformers for use in the present invention include those that are around 9,000 volts, 10,000 volts, 12,000 volts and 15,000 volts. However, these particular unloaded volt transformer measurements should not be viewed as limiting the scope acceptable power sources as additional embodiments. A specific desirable transformer for use in these Examples is made by Franceformer, Catalog No. 9060-P-E which operates at: primarily 120 volts, 60 Hz; and secondary 9,000 volts, 60 mA.

FIGS. 32B and 32C show an alternative embodiment of the invention (i.e., not used in this Example), wherein the output of the transformer 60 that is input into the electrode assemblies 1/5 has been rectified by a diode assembly 63 or 63'. The result, in general, is that an AC wave becomes substantially similar to a DC wave. In other words, an almost flat line DC output results (actually a slight 120 Hz pulse can sometimes be obtained). This particular assembly results in two additional preferred embodiments of the invention (e.g., regarding electrode orientation). In this regard, a substantially positive terminal or output and substantially negative terminal or output is generated from the diode assembly 63. An opposite polarity is achieved by the diode assembly 63'. Such positive and negative outputs can be input into either of the electrode(s) 1 and/or 5. Accordingly, an electrode 1 can be substantially negative or substantially positive; and/or an electrode 5 can be substantially negative and/or substantially positive.

FIG. 34A shows 8 separate transformer assemblies 60a-60h each of which is connected to a corresponding control device 20a-20h, respectively. This set of transformers 60 and control devices 20 are utilized in these Examples 1-4.

FIG. 34B shows 8 separate transformers 60a'-60h', each of which corresponds to the rectified transformer diagram shown in FIG. 32B. This transformer assembly also communicates with a set of control devices 20a-20h and can be used as a preferred embodiment of the invention, although was not used in these Examples.

FIG. 34C shows 8 separate transformers 60a"-60h", each of which corresponds to the rectified transformer diagram shown in FIG. 32C. This transformer assembly also communicates with a set of control devices 20a-20h and can be used as a preferred embodiment of the invention, although was not used in these Examples.

Accordingly, each transformer assembly 60a-60h (and/or 60a'-60h'; and/or 60a"-60h") can be the same transformer, or can be a combination of different transformers (as well as different polarities). The choice of transformer, power factor, capacitor(s) 61, polarity, electrode designs, electrode location, electrode composition, cross-sectional shape(s) of the trough member 30, local or global electrode composition, atmosphere(s), local or global liquid 3 flow rate(s), liquid 3 local components, volume of liquid 3 locally subjected to various fields in the trough member 30, neighboring (e.g., both upstream and downstream) electrode sets, local field concentrations, the use and/or position and/or composition of any membrane used in the trough member, etc., are all factors which influence processing conditions as well as composition and/or volume of constituents produced in the liquid 3, nanoparticles and nanoparticle/solutions or colloids made according to the various embodiments disclosed herein. Accordingly, a plethora of embodiments can be practiced according to the detailed disclosure presented herein.

The size and shape of each electrode 1 utilized was about the same. The shape of each electrode 1 was that of a right triangle with measurements of about 14 mm×23 mm×27 mm. The thickness of each electrode 1 was about 1 mm. Each triangular-shaped electrode 1 also had a hole therethrough at a base portion thereof, which permitted the point formed by the 23 mm and 27 mm sides to point toward the surface 2 of the water 3. The material comprising each electrode 1 was 99.95% pure (i.e., 3N5) unless otherwise stated herein. When gold was used for each electrode 1, the weight of each electrode was about 9 grams.

The wires used to attach the triangular-shaped electrode 1 to the transformer 60 were, for Examples 1-3, 99.95% (3N5) platinum wire, having a diameter of about 1 mm.

The wires used for each electrode 5 comprised 99.95% pure (3N5) gold each having a diameter of about 0.5 mm. All materials for the electrodes 1/5 were obtained from ESPI having an address of 1050 Benson Way, Ashland, Oreg. 97520.

The water 3 used in Example 1 as an input into the trough member 30 (and used in Examples 2-4 in combination with a processing enhancer) was produced by a Reverse Osmosis process and deionization process. In essence, Reverse Osmosis (RO) is a pressure driven membrane separation process that separates species that are dissolved and/or suspended substances from the ground water. It is called “reverse” osmosis because pressure is applied to reverse the natural flow of osmosis (which seeks to balance the concentration of materials on both sides of the membrane). The applied pressure forces the water through the membrane leaving the contaminants on one side of the membrane and the purified water on the other. The reverse osmosis membrane utilized several thin layers or sheets of film that are bonded together and rolled in a spiral configuration around a plastic tube. (This is also known as a thin film composite or TFC membrane.) In addition to the removal of dissolved species, the RO membrane also separates out suspended materials including microorganisms that may be present in the water. After RO processing a mixed bed deionization filter was used. The total dissolved solvents ("TDS") after both treatments was about 0.2 ppm, as measured by an Accumet® AR20 pH/conductivity meter.

These examples use gold electrodes for the 8 electrode sets. In this regard, Tables 1a-1d set forth pertinent operating parameters associated with each of the 16 electrodes in the 8 electrode sets utilized to make gold-based nanoparticles/nanoparticle solutions.

TABLE 1a

Cold Input Water (Au)

| | |
|---|---|
| Run ID: | GT032 |
| Flow Rate: | 90 ml/min |
| Wire Dia.: | .5 mm |
| Configuration: | Straight/Straight |
| PPM: | 0.4 |
| Zeta: | n/a |

| Set # | Elec-trode # | Target Voltage (kV) | Distance "c-c" in/mm | Distance "x" in/mm | Average Voltage (kV) |
|---|---|---|---|---|---|
| | | | 7/177.8* | | |
| 1 | 1a | 1.6113 | | 0.22/5.59 | 1.65 |
| | 5a | 0.8621 | | N/A | 0.84 |
| | | | 8/203.2 | | |
| 2 | 5b | 0.4137 | | N/A | 0.39 |
| | 5b' | 0.7679 | | N/A | 0.76 |
| | | | 8/203.2 | | |
| 3 | 5c | 0.491 | | N/A | 0.49 |
| | 5c' | 0.4816 | | N/A | 0.48 |
| | | | 8/203.2 | | |
| 4 | 1d | 0.4579 | | N/A | 0.45 |
| | 5d | 0.6435 | | N/A | 0.6 |
| | | | 9/228.6 | | |
| 5 | 5e | 0.6893 | | N/A | 0.67 |
| | 5e' | 0.2718 | | N/A | 0.26 |
| | | | 8/203.2 | | |
| 6 | 5f | 0.4327 | | N/A | 0.43 |
| | 5f' | 0.2993 | | N/A | 0.3 |
| | | | 8/203.2 | | |
| 7 | 5g | 0.4691 | | N/A | 0.43 |
| | 5g' | 0.4644 | | N/A | 0.46 |
| | | | 8/203.2 | | |
| 8 | 5h | 0.3494 | | N/A | 0.33 |
| | 5h' | 0.6302 | | N/A | 0.61 |
| | | | 8/203.2** | | |

| | |
|---|---|
| Output Water Temperature | 65 C. |

*Distance from water inlet to center of first electrode set

**Distance from center of last electrode set to water outlet

TABLE 1b

.0383 mg/mL of $NaHCO_3$ (Au)

| | |
|---|---|
| Run ID: | GT031 |
| Flow Rate: | 90 ml/min |
| $NaHCO_3$: | 0.038 mg/ml |
| Wire Dia.: | .5 mm |
| Configuration: | Straight/Straight |
| PPM: | 1.5 |
| Zeta: | n/a |

| Set # | Elec-trode # | Target Voltage (kV) | Distance "c-c" in/mm | Distance "x" in/mm | Average Voltage (kV) |
|---|---|---|---|---|---|
| | | | 7/177.8* | | |
| 1 | 1a | 1.7053 | | 0.22/5.59 | 1.69 |
| | 5a | 1.1484 | | N/A | 1.13 |
| | | | 8/203.2 | | |
| 2 | 5b | 0.6364 | | N/A | 0.63 |
| | 5b' | 0.9287 | | N/A | 0.92 |
| | | | 8/203.2 | | |
| 3 | 5c | 0.7018 | | N/A | 0.71 |
| | 5c' | 0.6275 | | N/A | 0.62 |
| | | | 8/203.2 | | |
| 4 | 5d | 0.6798 | | N/A | 0.68 |
| | 5d | 0.7497 | | N/A | 0.75 |
| | | | 9/228.6 | | |
| 5 | 5e | 0.8364 | | N/A | 0.85 |
| | 5e' | 0.4474 | | N/A | 0.45 |
| | | | 8/203.2 | | |
| 6 | 5f | 0.5823 | | N/A | 0.59 |
| | 5f' | 0.4693 | | N/A | 0.47 |
| | | | 8/203.2 | | |
| 7 | 5g | 0.609 | | N/A | 0.61 |
| | 5g' | 0.5861 | | N/A | 0.59 |
| | | | 8/203.2 | | |
| 8 | 5h | 0.4756 | | N/A | 0.48 |
| | 5h' | 0.7564 | | N/A | 0.76 |
| | | | 8/203.2** | | |

| | |
|---|---|
| Output Water Temperature | 64 C. |

*Distance from water inlet to center of first electrode set

**Distance from center of last electrode set to water outlet

TABLE 1c

.045 mg/ml of NaCl (Au)

| | |
|---|---|
| Run ID: | GT019 |
| Flow Rate: | 90 ml/min |
| NaCl: | .045 mg/ml |
| Wire Dia.: | .5 mm |
| Configuration: | Straight/Straight |
| PPM: | 6.1 |
| Zeta: | n/a |

| Set # | Elec-trode # | Target Voltage (kV) | Distance "c-c" in/mm | Distance "x" in/mm | Average Voltage (kV) |
|---|---|---|---|---|---|
| | | | 7/177.8* | | |
| 1 | 1a | 1.4105 | | 0.22/5.59 | 1.41 |
| | 5a | 0.8372 | | N/A | 0.87 |
| | | | 8/203.2 | | |
| 2 | 5b | 0.3244 | | N/A | 0.36 |
| | 5b' | 0.4856 | | N/A | 0.65 |
| | | | 8/203.2 | | |
| 3 | 5c | 0.3504 | | N/A | 0.37 |
| | 5c' | 0.3147 | | N/A | 0.36 |
| | | | 8/203.2 | | |
| 4 | 5d | 0.3526 | | N/A | 0.37 |
| | 5d | 0.4539 | | N/A | 0.5 |
| | | | 9/228.6 | | |
| 5 | 5e | 0.5811 | | N/A | 0.6 |
| | 5e' | 0.2471 | | N/A | 0.27 |
| | | | 8/203.2 | | |

TABLE 1c-continued

| .045 mg/ml of NaCl (Au) | | | | | |
|---|---|---|---|---|---|
| 6 | 5f | 0.3624 | | N/A | 0.38 |
| | 5f' | 0.2905 | | N/A | 0.31 |
| | | | 8/203.2 | | |
| 7 | 5g | 0.3387 | | N/A | 0.36 |
| | 5g' | 0.3015 | | N/A | 0.33 |
| | | | 8/203.2 | | |
| 8 | 5h | 0.2995 | | N/A | 0.33 |
| | 5h' | 0.5442 | | N/A | 0.57 |
| | | | 8/203.2** | | |
| | Output Water Temperature | | 77 C. | | |

*Distance from water inlet to center of first electrode set
**Distance from center of last electrode set to water outlet TABLE 1d .038 mg/mL of $NaHCO_3$ (Au)

| | |
|---|---|
| Run ID: | GT033 |
| Flow Rate: | 90 ml/min |
| $NaHCO_3$: | 0.038 mg/ml |
| Wire Dia.: | .5 mm |
| Configuration: | Straight/Straight |
| PPM: | 2.0 |
| Zeta: | n/a |

| Set # | Electrode # | Target Voltage (kV) | Distance "c-c" in/mm | Distance "x" in/mm | Average Voltage (kV) |
|---|---|---|---|---|---|
| | | | 7/177.8* | | |
| 1 | 1a | 1.6033 | | 0.22/5.59 | 1.641826 |
| | 5a | 1.1759 | | N/A | 1.190259 |
| | | | 8/203.2 | | |
| 2 | 5b | 0.6978 | | N/A | 0.727213 |
| | 5b' | 0.8918 | | N/A | 0.946323 |
| | | | 8/203.2 | | |
| 3 | 5c | 0.6329 | | N/A | 0.795378 |
| | 5c' | 0.526 | | N/A | 0.609542 |
| | | | 8/203.2 | | |
| 4 | 5d | 0.609 | | N/A | 0.613669 |
| | 5d | 0.6978 | | N/A | 0.719777 |
| | | | 9/228.6 | | |
| 5 | 5e | 0.9551 | | N/A | 0.920594 |
| | 5e' | 0.5594 | | N/A | 0.547233 |
| | | | 8/203.2 | | |
| 6 | 5f | 0.6905 | | N/A | 0.657295 |
| | 5f' | 0.5516 | | N/A | 0.521984 |
| | | | 8/203.2 | | |
| 7 | 5g | 0.5741 | | N/A | 0.588502 |
| | 5g' | 0.5791 | | N/A | 0.541565 |
| | | | 8/203.2 | | |
| 8 | 5h | 0.4661 | | N/A | 0.46091 |
| | 5h' | 0.7329 | | N/A | 0.741009 |
| | | | 8/203.2** | | |
| | Output Water Temperature | | 83 C. | | |

*Distance from water inlet to center of first electrode set
Distance from center of last electrode set to water outlet Table 1a shows that a "1/5" electrode configuration was utilized for Electrode Set #1 and for Electrode Set #4, and all other sets were of the 5/5 configuration; whereas Tables 1b, 1c and 1d show that Electrode Set #1 was the only electrode set utilizing the 1/5 configuration, and all other sets were of the 5/5** configuration.

Additionally, the following differences in manufacturing set-up were also utilized:

Example 1

GT032: The input water 3 into the trough member 30 was chilled in a refrigerator unit until it reached a temperature of about 2° C. and was then pumped into the trough member 30;

Example 2

GT031: A processing enhancer was added to the input water 3 prior to the water 3 being input into the trough member 30. Specifically, about 0.145 grams/gallon (i.e., about 38.3 mg/liter) of sodium hydrogen carbonate ("soda"), having a chemical formula of $NaHCO_3$, was added to and mixed with the water 3. The soda was obtained from Alfa Aesar and the soda had a formula weight of 84.01 and a density of about 2.159 g/cm$^3$ (i.e., stock #14707, lot D15T043).

Example 3

GT019: A processing enhancer was added to the input water 3 prior to the water 3 being input into the trough member 30. Specifically, about 0.17 grams/gallon (i.e., about 45 mg/liter) of sodium chloride ("salt"), having a chemical formula of NaCl, was added to and mixed with the water 3.

Example 4

Figure 51A:
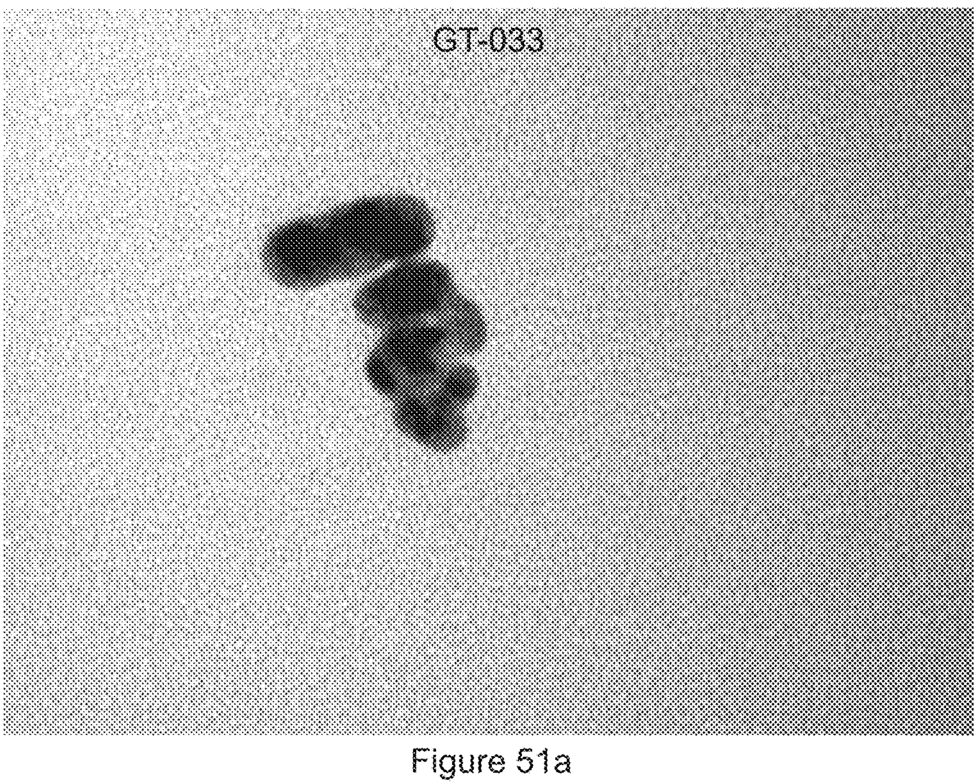
FIG. 51A is a representative TEM photomicrograph of gold nanoparticles made according to Example 4.
Figure 53A:
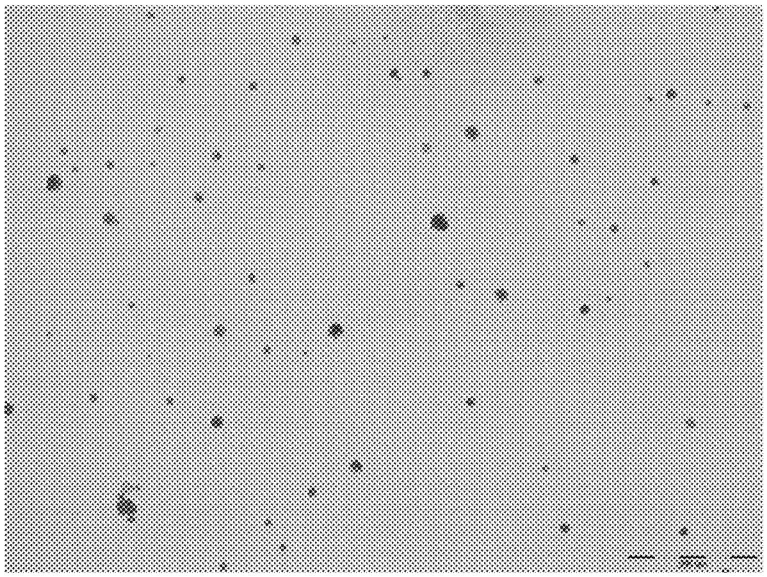
FIGS. 53A-53E are representative TEM photomicrographs of gold nanoparticles from dried solution GB-056 made in accordance with Example 14.
Figure 53B:
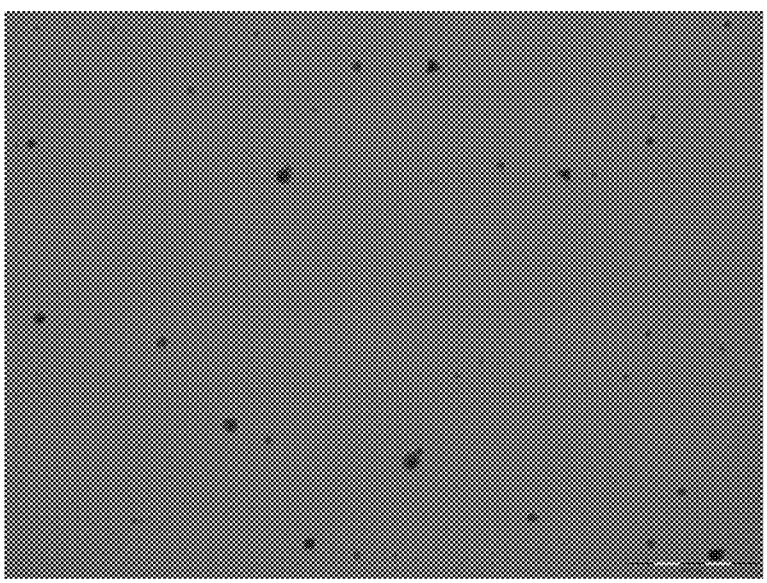
Figure 53C:
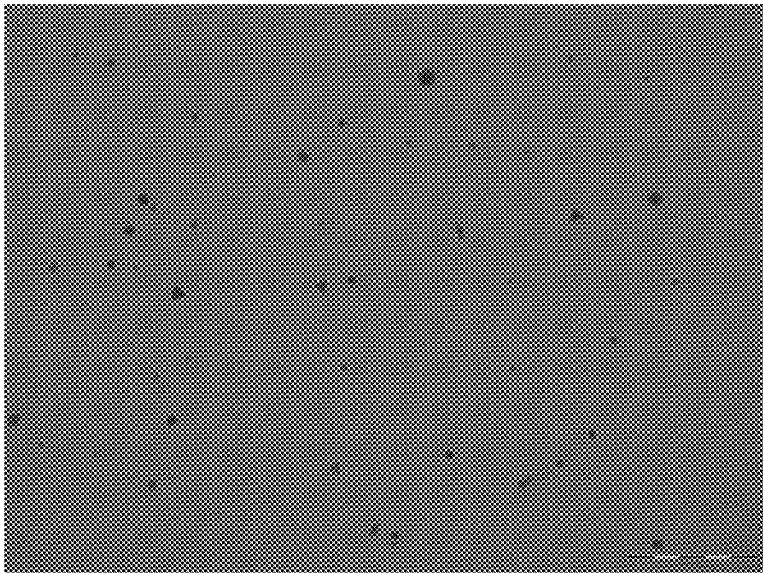
Figure 53D:
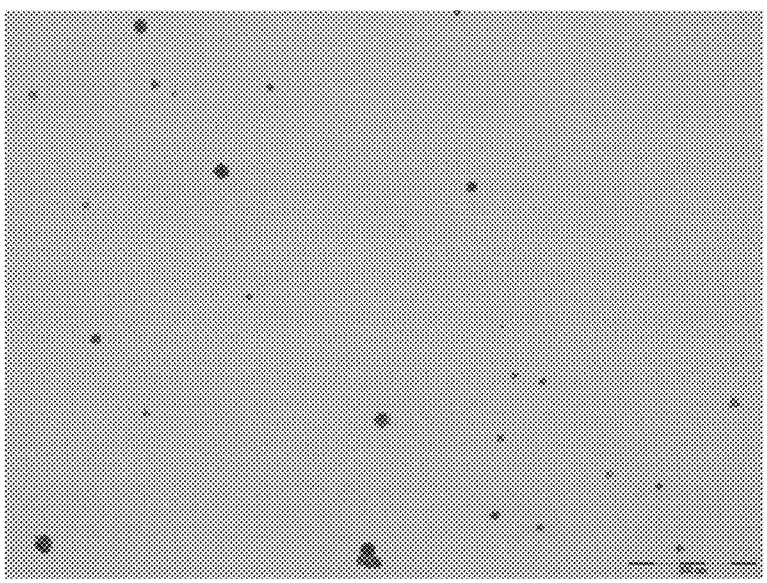
Figure 53E:
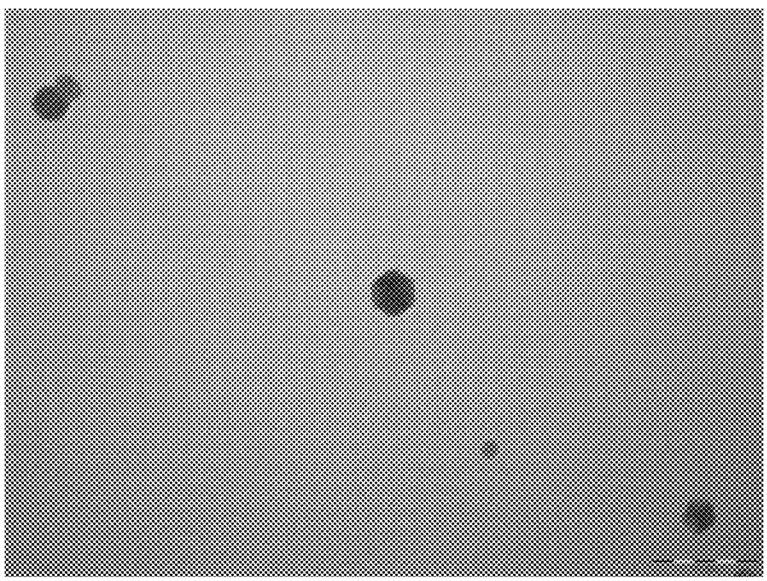

GT033: A processing enhancer was added to the input water 3 prior to the water 3 being input into the trough member 30. Specifically, about 0.145 grams/gallon (i.e., about 38.3 mg/liter) of sodium hydrogen carbonate ("soda"), having a chemical formula of $NaHCO_3$, was added to and mixed with the water 3. The soda was obtained from Alfa Aesar and the soda had a formula weight of 84.01 and a density of about 2.159 g/cm$^3$ (i.e., stock #14707, lot D15T043). A representative TEM photomicrograph of dried solution GT033 is shown in FIG. 51A. Also, FIG. 51B shows dynamic light scattering data (i.e., hydrodynamic radii) of solution GT033.

The salt used in Example 3 was obtained from Fisher Scientific (lot #080787) and the salt had a formula weight of 58.44 and an actual analysis as follows:

| | |
|---|---|
| Assay | 100% |
| Barium (BA) | Pass Test |
| Bromide | <0.010% |
| Calcium | 0.0002% |
| Chlorate & Nitrate | <0.0003% |
| Heavy Metals (AS PB) | <5.0 ppm |
| Identification | Pass Test |
| Insoluble Water | <0.001% |
| Iodide | 0.0020% |
| Iron (FE) | <2.0 ppm |
| Magnesium | <0.0005% |
| Ph 5% Soln @ 25 Deg C. | 5.9 |
| Phosphate (PO4) | <5.0 ppm |
| Potassium (K) | <0.003% |
| Sulfate (SO4) | <0.0040% |

Table 1e summarizes the physical characteristics results for each of the three solutions GT032, GT031 and GT019. Full characterization of GT019 was not completed, however, it is clear that under the processing conditions discussed herein, both processing enhancers (i.e., soda and salt)

increase the measured ppm of gold in the solutions GT031 and GT019 relative to GT032.

TABLE 1e

| | PPM | Zeta Potential (Avg) | PH | DLS % Transmission | Predominant DLS Mass Distribution Peak (Radius in nm) | Color of Solution |
|---|---|---|---|---|---|---|
| GT032 | 0.4 | −19.30 | 3.29 | 11.7% | 3.80 | Clear |
| GT031 | 1.5 | −29.00 | 5.66 | 17.0% | 0.78 | Purple |
| GT019 | 6.1 | ** | ** | ** | ** | Pink |
| GT033 | 2.0 | ** | ** | 30% | ** | Pink |

**Values not measured

EXAMPLES 5-7

Manufacturing Gold-Based Nanoparticles/Nanoparticle Solutions GD-007, GD-016 and GD-015

In general, each of Examples 5-7 utilize certain embodiments of the invention associated with the apparatuses generally shown in FIGS. 4F, 37A, 38A and 40A. Specific differences in processing and apparatus will be apparent in each Example. The trough members 30*a* and 30*b* were made from ⅛" (about 3 mm) thick plexiglass, and ¼" (about 6 mm) thick polycarbonate, respectively. The support structure 34 was also made from plexiglass which was about ¼" thick (about 6-7 mm thick). The cross-sectional shape of the trough member 30*a* shown in FIG. 37A corresponds to that shape shown in FIG. 10B (i.e., a truncated "V"). The base portion "R" of the truncated "V" measured about 0.5" (about 1 cm), and each side portion "S", "S'" measured about 1.5" (about 3.75 cm). The distance "M" separating the side portions "S", "S'" of the V-shaped trough member 30*a* was about 2¼"-2 5/16" (about 5.9 cm) (measured from inside to inside). The thickness of each portion also measured about ⅛" (about 3 mm) thick. The longitudinal length "$L_T$" (refer to FIG. 11A) of the V-shaped trough member 30*a* measured about 3 feet (about 1 meter) long from point 31 to point 32.

Purified water (discussed elsewhere herein) was mixed with about 0.396 g/L of $NaHCO_3$ and was used as the liquid 3 input into trough member 30*a*. While the amount of $NaHCO_3$ used was effective, this amount should not be viewed as limiting the metes and bounds of the invention, and other amounts are within the metes and bounds of this disclosure. The depth "d" (refer to FIG. 10B) of the water 3 in the V-shaped trough member 30*a* was about 7/16" to about ½" (about 11 mm to about 13 mm) at various points along the trough member 30*a*. The depth "d" was partially controlled through use of the dam 80 (shown in FIG. 37A). Specifically, the dam 80 was provided near the end 32 and assisted in creating the depth "d" (shown in FIG. 10B) to be about 7/16"-½" (about 11-13 mm) in depth. The height "j" of the dam 80 measured about ¼" (about 6 mm) and the longitudinal length "k" measured about ½" (about 13 mm) The width (not shown) was completely across the bottom dimension "R" of the trough member 30*a*. Accordingly, the total volume of water 3 in the V-shaped trough member 30*a* during operation thereof was about 6.4 $in^3$ (about 105 ml).

The rate of flow of the water 3 into the trough member 30*a* was about 150 ml/minute (note: there was minimal evaporation in the trough member 30*a*). Such flow of water 3 into the trough member 30*a* was obtained by utilizing a Masterflex® L/S pump drive 40 rated at 0.1 horsepower, 10-600 rpm. The model number of the Masterflex® pump 40 was 77300-40. The pump drive had a pump head also made by Masterflex® known as Easy-Load Model No. 7518-10. In general terms, the head for the pump 40 is known as a peristaltic head. The pump 40 and head were controlled by a Masterflex® LS Digital Modular Drive. The model number for the Digital Modular Drive is 77300-80. The precise settings on the Digital Modular Drive were, for example, 150 milliliters per minute. Tygon® tubing having a diameter of ¼" (i.e., size 06419-25) was placed into the peristaltic head. The tubing was made by Saint Gobain for Masterflex®. One end of the tubing was delivered to a first end 31 of the trough member 30*a* by a flow diffusion means located therein. The flow diffusion means tended to minimize disturbance and bubbles in water 3 introduced into the trough member 30*a* as well as any pulsing condition generated by the peristaltic pump 40. In this regard, a small reservoir served as the diffusion means and was provided at a point vertically above the end 31 of the trough member 30*a* such that when the reservoir overflowed, a relatively steady flow of water 3 into the end 31 of the V-shaped trough member 30*a* occurred.

There were 5 electrode sets used in Examples 5-7 and one set was a single electrode set 1*a*/5*a* located in trough member 30*a*. The plasma 4 in trough member 30*a* from electrode 1*a* was created with an electrode 1*a* similar in shape to that shown in FIG. 5E, and weighed about 9.2 grams. This electrode was 99.95% pure gold. The other electrode 5*a* comprised a right-triangular shaped platinum plate measuring about 14 mm×23 mm×27 mm and about 1 mm thick and having about 9 mm submerged in the liquid 3'. The AC transformer used to create the plasma 4 was that transformer 60 shown in FIG. 32A and discussed elsewhere herein. AC transformers 50 (discussed below) were connected to the other electrode sets 5/5. All other pertinent run conditions are shown in Tables 2a, 2b and 2c.

The output of the processing-enhanced, conditioned water 3' was collected into a reservoir 41 and subsequently pumped by another pump 40' into a second trough member 30*b*, at substantially the same rate as pump 40 (e.g., minimal evaporation occurred in trough member 30*a*). The second trough member 30*b* measured about 30 inches long by 1.5 inches wide by 5.75 inches high and contained about 2500 ml of water 3" therein. Each of four electrode sets 5*b*, 5*b'*-5*e*, 5*e'* comprised 99.95% pure gold wire measuring about 0.5 mm in diameter and about 5 inches (about 12 cm) in length and was substantially straight. About 4.25 inches (about 11 cm) of wire was submerged in the water 3" which was about 4.5 inches (about 11 cm) deep.

Figure 4E:
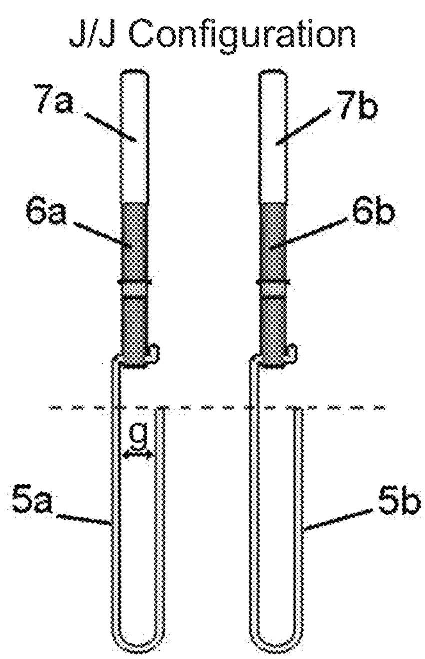
FIG. 4E shows a view of gold wires 5*a* and 5*b* used in the trough section 30*b* of FIG. 41A in connection with Examples 8, 9 and 10.
Figure 4F:
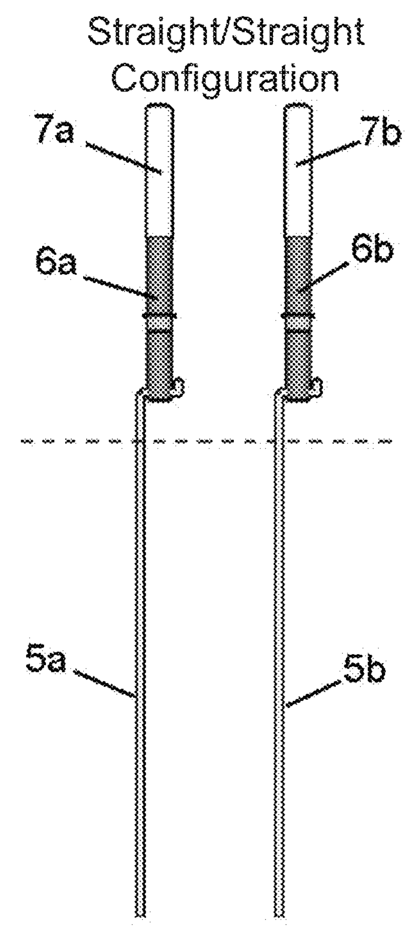
FIG. 4F shows a view of the gold wires 5*a* and 5*b* used in the trough section 30*b* of FIG. 40A in connection with Examples 5, 6 and 7.
Figure 4G:
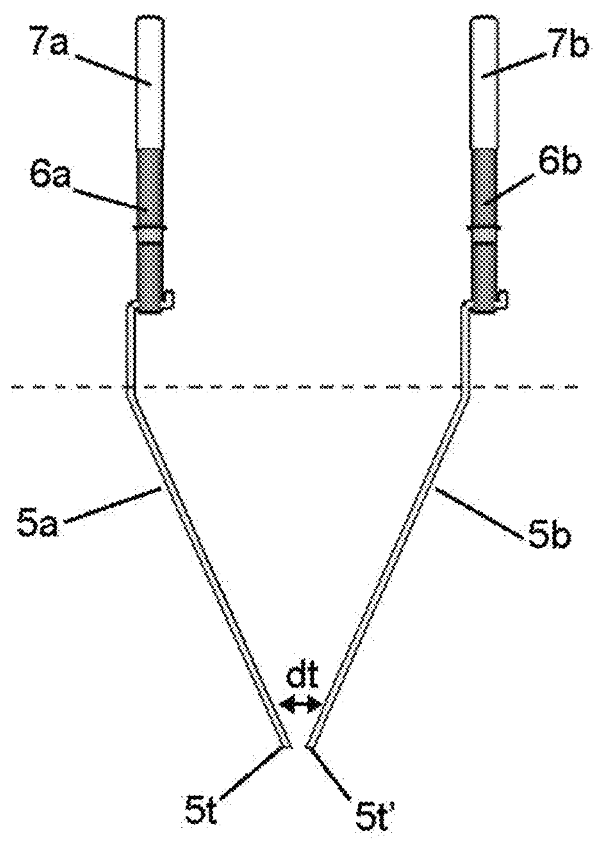
FIG. 4G shows the electrode configuration used to make sample GB-118 in Example 15.
Figure 5A:
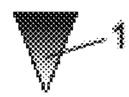
FIGS. 5A-5E show five different representative embodiments of configurations for the electrode 1.
Figure 5B:
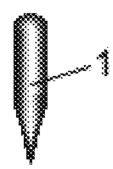
Figure 5C:
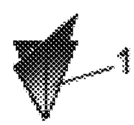
Figure 5D:
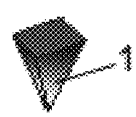
Figure 5E:
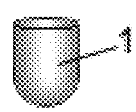
Figure 38A:
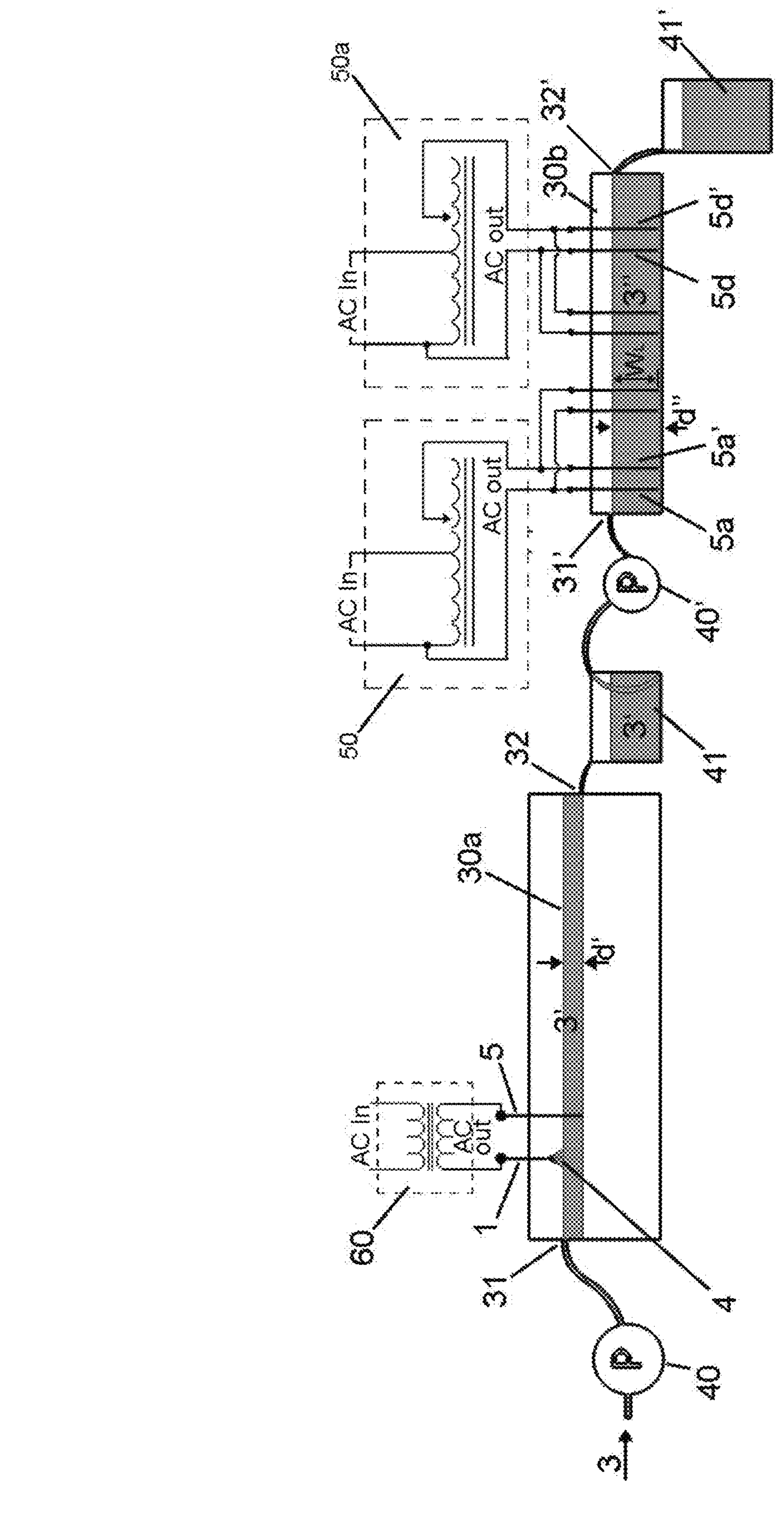
FIGS. 38A and 38B are schematics of two trough members 30*a* and 30*b* having two different electrode 5 wiring arrangements utilizing one transformer (Examples 8 and 9) and utilizing two transformers (Examples 5-7).
Figure 40A:
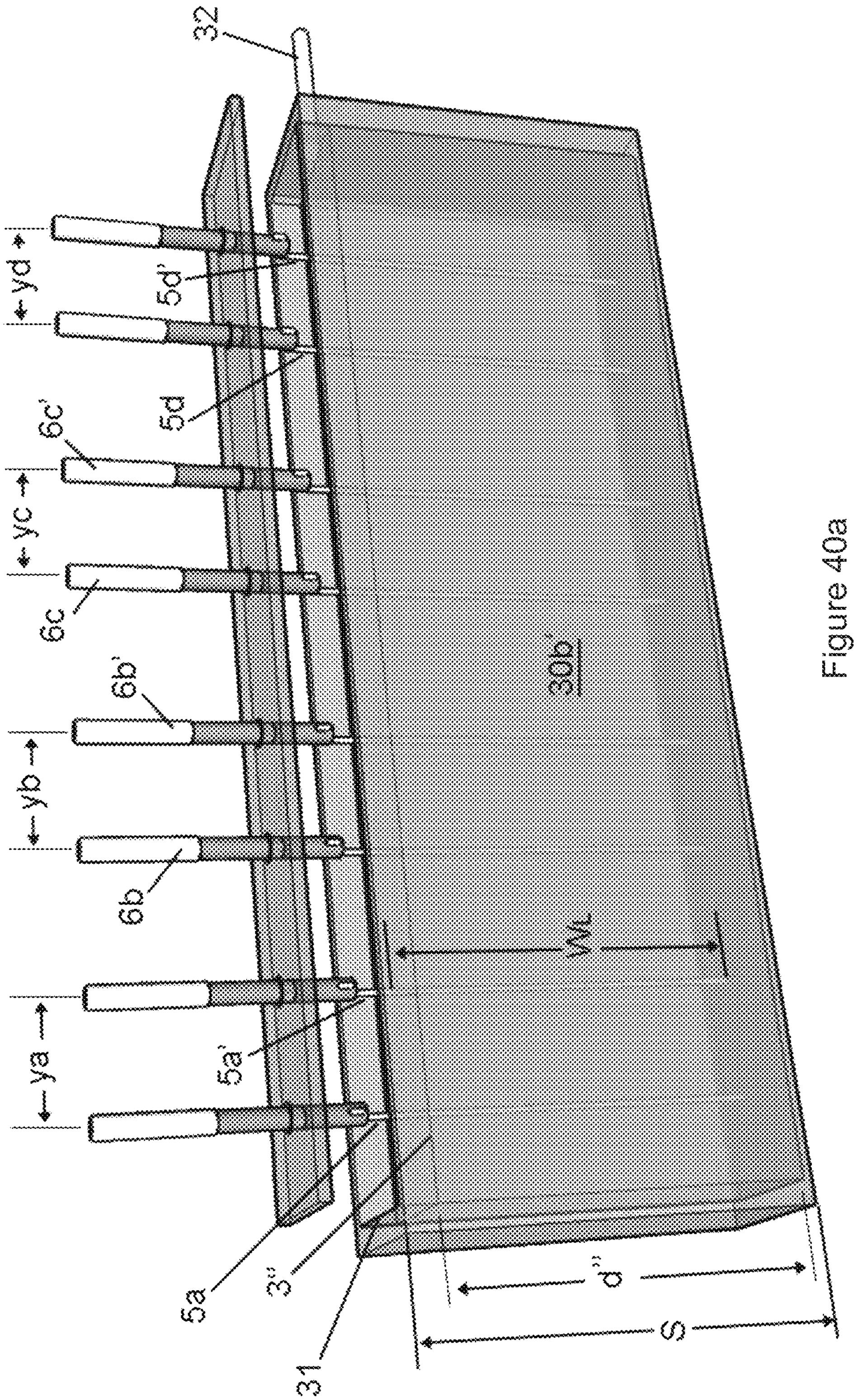
FIGS. 40A-40G show various trough members 30*b* in connection with FIGS. 39A-39H and various Examples herein.
Figure 40B:
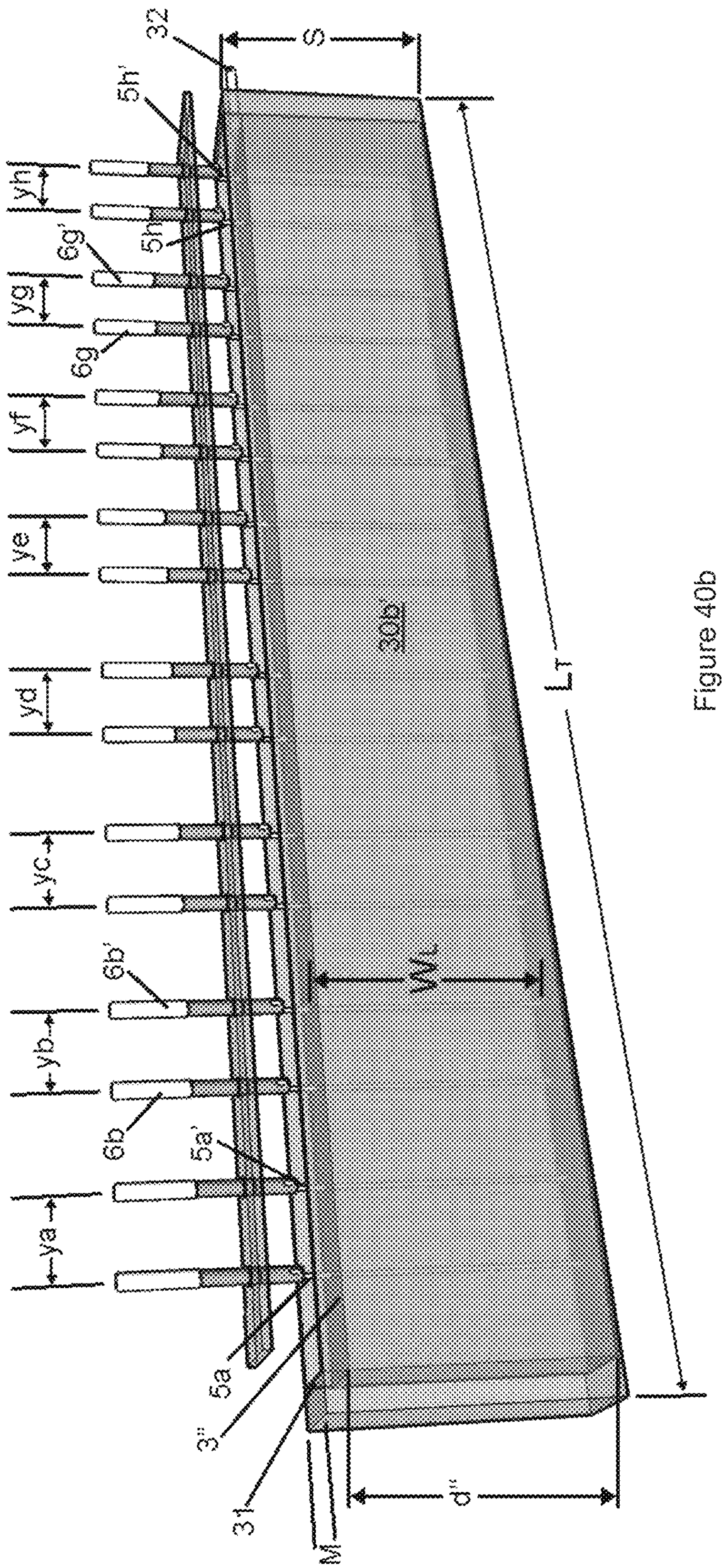
Figure 40C:
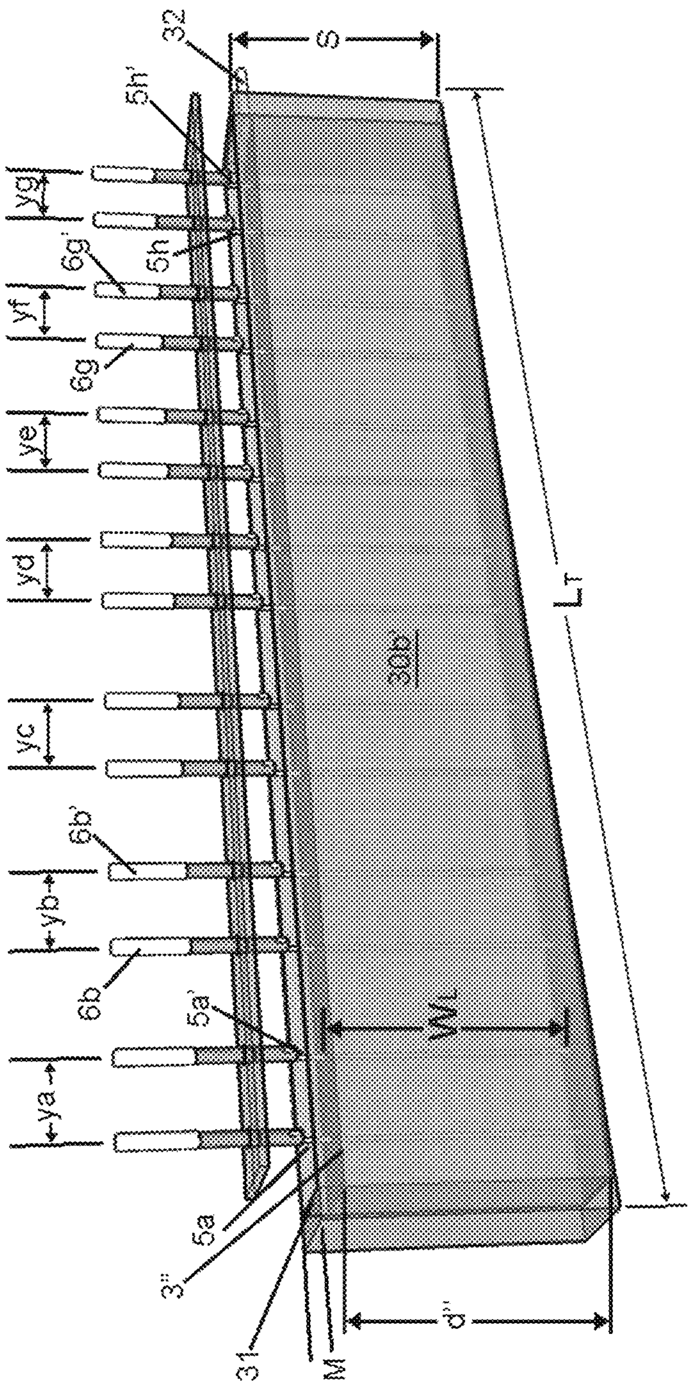

With regard to FIGS. 38A and 40A, 4 separate electrode sets (Set 2, Set 3, Set 4 and Set 5) were attached to 2 separate transformer devices 50 and 50*a*, as shown in FIG. 38A. Specifically, transformers 50 and 50*a* were electrically connected to each electrode set, according to the wiring diagram show in FIG. 38A. Each transformer device 50, 50*a* was connected to a separate AC input line that was 120° out of phase relative to each other. The transformers 50 and 50*a* were electrically connected in a manner so as not to overload a single electrical circuit and cause, for example, an upstream circuit breaker to disengage (e.g., when utilized under these conditions, a single transformer 50/50*a* could draw sufficient current to cause upstream electrical problems). Each transformer 50/50*a* was a variable AC transformer constructed of a single coil/winding of wire. This winding acts as part of both the primary and secondary winding. The input voltage is applied across a fixed portion of the winding. The output voltage is taken between one end of the winding and another connection along the winding. By exposing part of the winding and making the secondary connection using a sliding brush, a continuously variable ratio can be obtained. The ratio of output to input voltages is equal to the ratio of the number of turns of the winding they connect to. Specifically, each transformer was a Mastech TDGC2-5 kVA, 10A Voltage Regulator, Output 0-250V.

Each of Tables 2a-2c contains processing information relating to each of the 4 electrode sets in trough 30*b* by "Set #". Each electrode of the 4 electrode sets in trough 30*b* was set to operate at a specific target voltage. Actual operating voltages of about 255 volts, as listed in each of Tables 2a-2c, were applied across the electrode sets. The distance "c-c" (with reference to FIG. 14) from the centerline of each electrode set to the adjacent electrode set is also represented. Further, the distance "x" associated with the electrode 1 utilized in trough 30*a* is also reported. For the electrode 5's, no distance "x" is reported. Other relevant parameters are also reported in each of Tables 2a-2c.

All materials for the electrodes 1/5 were obtained from ESPI having an address of 1050 Benson Way, Ashland, Oreg. 97520.

The water 3 used in Examples 5-7 was produced by a Reverse Osmosis process and deionization process and was mixed with the $NaHCO_3$ processing-enhancer and together was input into the trough member 30*a*. In essence, Reverse Osmosis (RO) is a pressure driven membrane separation process that separates species that are dissolved and/or suspended substances from the ground water. It is called "reverse" osmosis because pressure is applied to reverse the natural flow of osmosis (which seeks to balance the concentration of materials on both sides of the membrane). The applied pressure forces the water through the membrane leaving the contaminants on one side of the membrane and the purified water on the other. The reverse osmosis membrane utilized several thin layers or sheets of film that are bonded together and rolled in a spiral configuration around a plastic tube. (This is also known as a thin film composite or TFC membrane.) In addition to the removal of dissolved species, the RO membrane also separates out suspended materials including microorganisms that may be present in the water. After RO processing a mixed bed deionization filter was used. The total dissolved solvents ("TDS") after both treatments was about 0.2 ppm, as measured by an Accumet® AR20 pH/conductivity meter.

TABLE 2a

.0396 mg/ml of $NaHCO_3$ (Au)

| | |
|---|---|
| Run ID: | GD-007 |
| Flow Rate: | 150 ml/min |
| Voltage: | 255 V |
| $NaHCO_3$: | 0.396 mg/ml |
| Wire Dia.: | .5 mm |
| Configuration: | Straight/Straight |
| PPM: | 14.8 |
| Zeta: | n/a |

| Set# | Electrode # | Distance "c-c" in/mm | Distance "x" in/mm | Voltage | cross section |
|---|---|---|---|---|---|
| | | 4.5/114.3* | | | |
| 1 | 1a | | 0.25 | 750 | V |
| | 5a | | N/A | 750 | |
| | | 23/584.2** | | | |
| | | 2.5/63.5* | | | |
| 2 | 5b | | N/A | 255 | |
| | 5b' | | N/A | | |
| | | 8.5/215.9 | | | |
| 3 | 5c | | N/A | 255 | Rectangle |
| | 5c' | | N/A | | 5.25" |
| | | 8.5/215.9 | | | Deep |
| 4 | 5d | | N/A | 255 | |
| | 5d' | | N/A | | |
| | | 8/203.2 | | | |
| 5 | 5e | | N/A | 255 | |
| | 5e' | | N/A | | |
| | | 2/50.8** | | | |
| Output Water Temperature | | 96 C. | | | |

TABLE 2a-continued

*Distance from water inlet to center of first electrode set

**Distance from center of last electrode set to water outlet

TABLE 2b 0.396 mg/ml of $NaHCO_3$ (Au)

| | |
|---|---|
| Run ID: | GD-016 |
| Flow Rate: | 150 ml/min |
| Voltage: | 255 V |
| $NaHCO_3$: | 0.396 mg/ml |
| Wire Dia.: | .5 mm |
| Configuration: | Straight/Straight |
| PPM: | 12.5 |
| Zeta: | −56.12 |

| Set# | Electrode# | Distance "c-c" in/mm | Distance "x" in/mm | Voltage | cross section |
|---|---|---|---|---|---|
| | | 4.5/114.3* | | | |
| 1 | 1a | | 0.25 | 750 | V |
| | 5a | | N/A | 750 | |
| | | 23/584.2** | | | |
| | | 2.5/63.5* | | | |
| 2 | 5b | | N/A | 255 | |
| | 5b' | | N/A | | |
| | | 8.5/215.9 | | | |
| 3 | 5c | | N/A | 255 | Rectangle |
| | 5c' | | N/A | | 5.25" |
| | | 8.5/215.9 | | | Deep |
| 4 | 5d | | N/A | 255 | |
| | 5d' | | N/A | | |
| | | 8/203.2 | | | |
| 5 | 5e | | N/A | 255 | |
| | 5e' | | N/A | | |
| | | 2/50.8** | | | |
| Output Water Temperature | | 97 C. | | | |

*Distance from water inlet to center of first electrode set

**Distance from center of last electrode set to water outlet

TABLE 2c

| 0.396 mg/ml of NaHCO3 (Au) | | | | | |
|---|---|---|---|---|---|
| | Run ID: | | | GD-015 | |
| | Flow Rate: | | | 150 ml/min | |
| | Voltage: | | | 255 V | |
| | $NaHCO_3$: | | | 0.396 mg/ml | |
| | Wire Dia.: | | | .5 mm | |
| | Configuration: | | | Straight/Straight | |
| | PPM: | | | 14.5 | |
| | Zeta: | | | −69.1 | |
| **Set#** | **Electrode#** | **Distance "c-c" in/mm** | **Distance "x" in/mm** | **Voltage** | **cross section** |
| | | 4.5/114.3* | | | |
| 1 | 1a | | 0.25 | 750 | V |
| | 5a | | N/A | 750 | |
| | | 23/584.2** | | | |
| | | 2.5/63.5* | | | |
| 2 | 5b | | N/A | 255 | |
| | 5b' | | N/A | | |
| | | 8.5/215.9 | | | |
| 3 | 5c | | N/A | 255 | Rectangle 5.25" Deep |
| | 5c' | | N/A | | |
| | | 8.5/215.9 | | | |
| 4 | 5d | | N/A | 255 | |
| | 5d' | | N/A | | |
| | | 8/203.2 | | | |
| 5 | 5e | | N/A | 255 | |
| | 5e' | | N/A | | |
| | | 2/50.8** | | | |
| | Output Water Temperature | | | 96 C. | |

*Distance from water inlet to center of first electrode set

**Distance from center of last electrode set to water outlet

Representative Transmission Electron Microscopy (TEM) photomicrographs (FIGS. 44A, 45A and 46A) were taken of each dried solution made according to each of these Examples 5-7.

Specifically, TEM samples were prepared by utilizing a Formvar coated grid stabilized with carbon having a mesh size of 200. The grids were first pretreated by a plasma treatment under vacuum. The grids were placed on a microscope slide lined with a rectangular piece of filter paper and then placed into a Denton Vacuum apparatus with the necessary plasma generator accessory installed. The vacuum was maintained at 75 mTorr and the plasma was initiated and run for about 30 seconds. Upon completion, the system was vented and the grids removed. The grids were stable up to 7-10 days depending upon humidity conditions, but in all instances were used within 12 hours.

Approximately 1 μL of each inventive nanoparticle solution was placed onto each grid and was allowed to air dry at room temperature for 20-30 minutes, or until the droplet evaporated. Upon complete evaporation, the grids were placed onto a holder plate until TEM analysis was performed.

A Philips/FEI Tecnai 12 Transmission Electron Microscope was used to interrogate all prepared samples. The instrument was run at an accelerating voltage of 100 keV. After alignment of the beam, the samples were examined at various magnifications up to and including 630,000×. Images were collected via the attached Olympus Megaview III side-mounted camera that transmitted the images directly to a PC equipped with iTEM and Tecnai User Interface software which provided for both control over the camera and the TEM instrument, respectively.

Within the iTEM software, it was possible to randomly move around the grid by adjusting the position of a crosshair on a circular reference plane. By selecting and moving the cross-hairs, one could navigate around the grid. Using this function, the samples were analyzed at four quadrants of the circular reference, allowing for an unbiased representation of the sample. The images were later analyzed with ImageJ 1.42 software. Another similar software program which measured the number of pixels across each particle relative to a known number of pixels in a spacer bar. The particles were measured using the scale bar on the image as a method to calibrate the software prior to measuring each individual particle. The data collected from each sample set was exported to Excel, and using a simple histogram function with 50 bins with a minimum of 5 nm and maximum of 50 nm, generated the histogram.

Figure 44A:
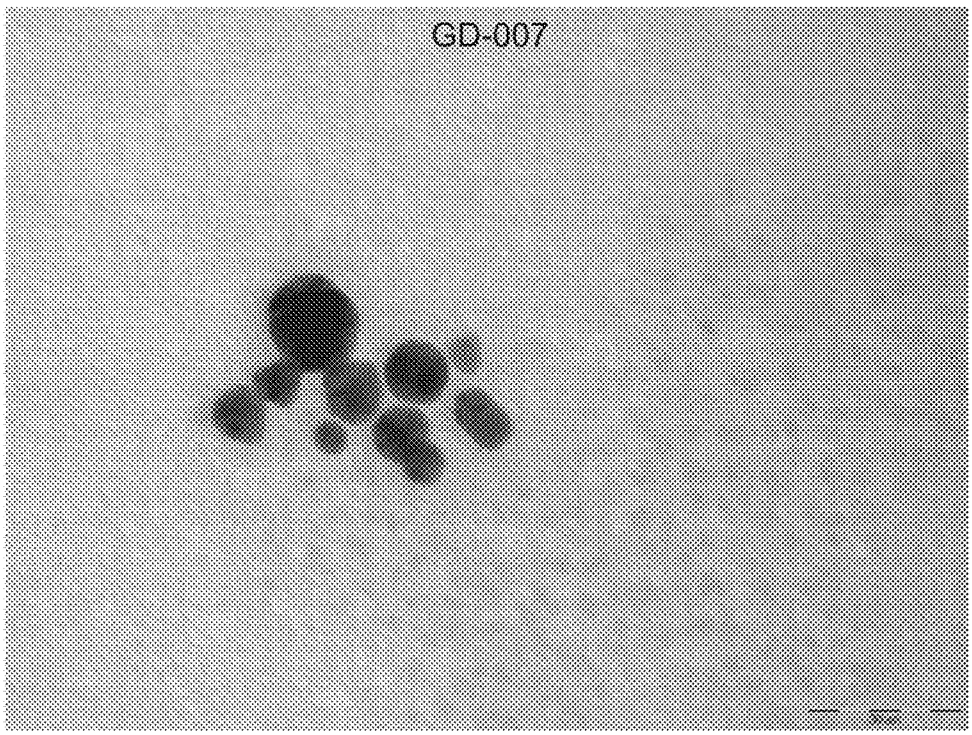
FIG. 44A is a representative TEM photomicrograph of gold nanoparticles from dried solution GD-007 made according to Example 5.
Figure 45A:
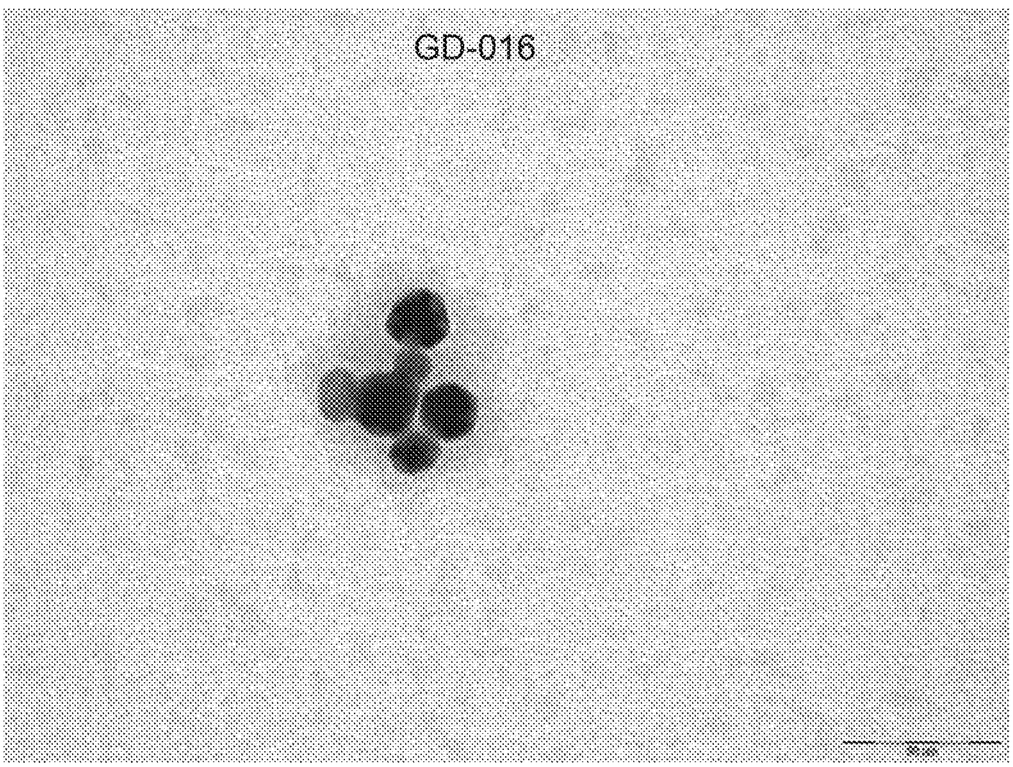
FIG. 45A is a representative TEM photomicrograph of gold nanoparticles from dried solution GD-016 made according to Example 6.
Figure 46A:
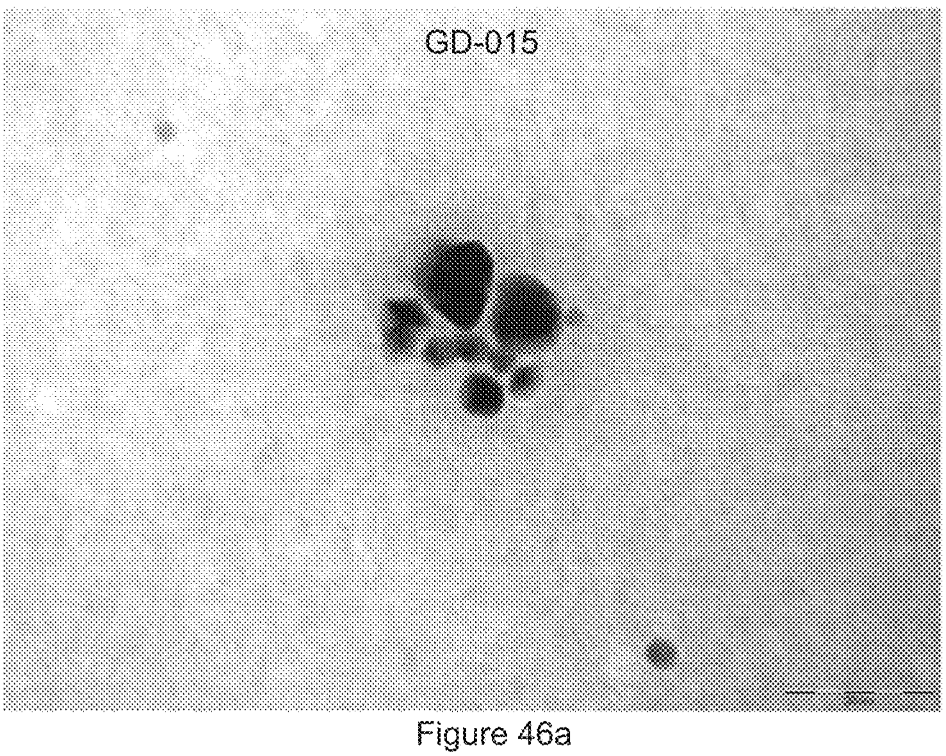
FIG. 46A is a representative TEM photomicrograph of gold nanoparticles from dried solution GD-015 made according to Example 7.

FIGS. 44A, 45A and 46A are representative TEM photomicrographs corresponding to dried solutions GD-007, GD-016 and GD-015 corresponding to Examples 5, 6 and 7, respectively.

Figure 44B:
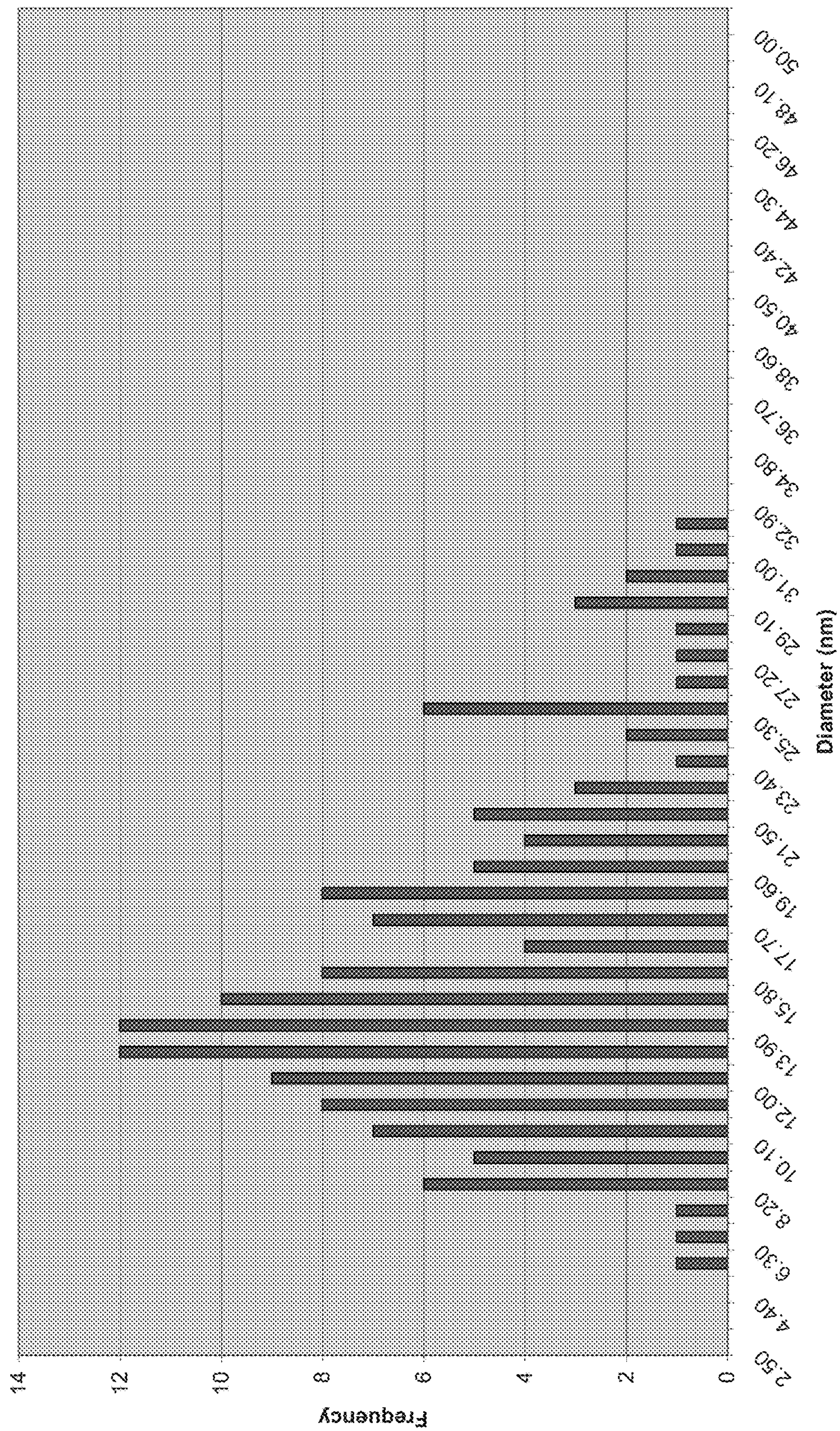
FIG. 44B shows the particle size distribution histogram from TEM measurements for the nanoparticles made according to Example 5.
Figure 45B:
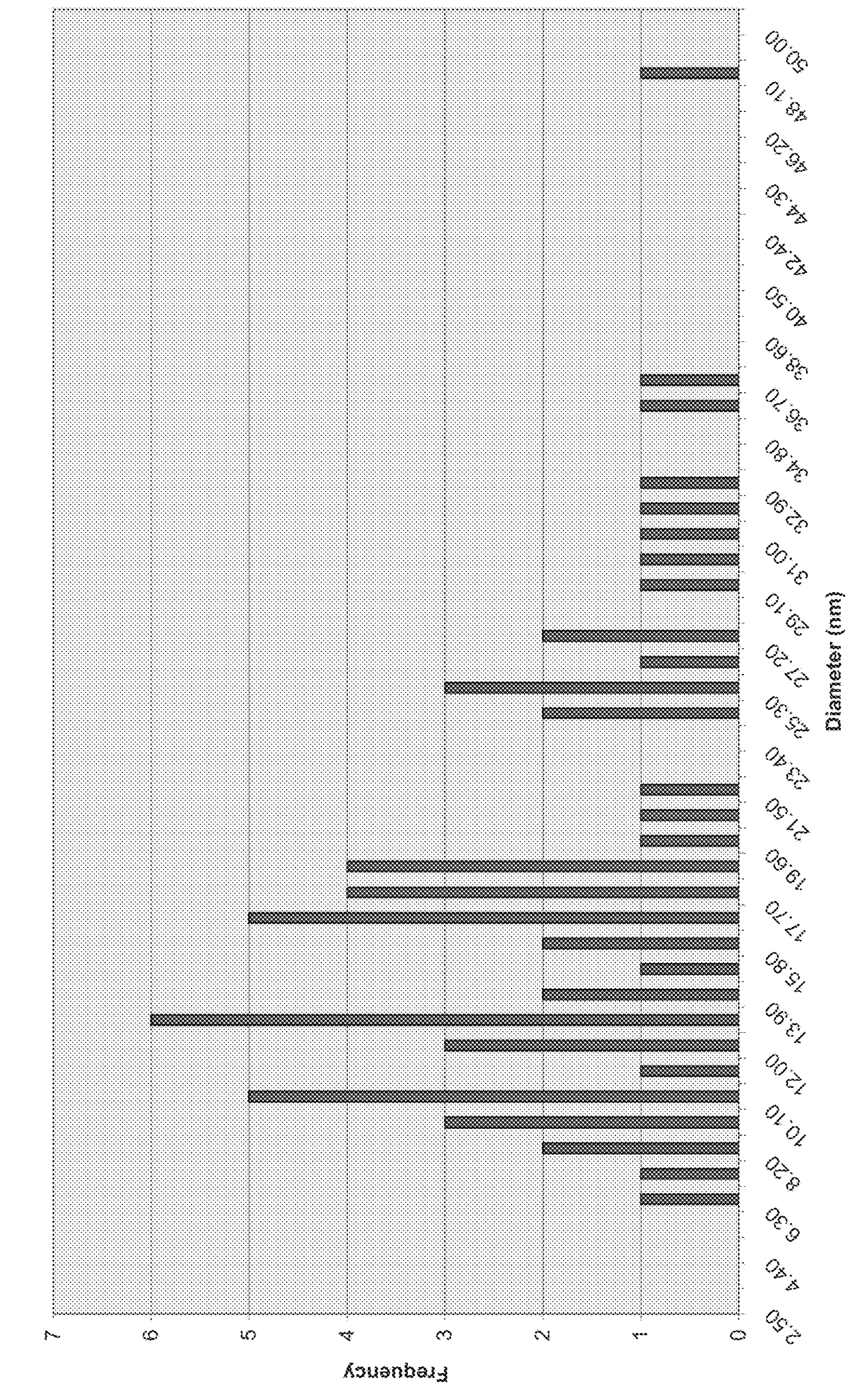
FIG. 45B shows the particle size distribution from TEM measurements for the nanoparticles made according to Example 6.
Figure 46B:
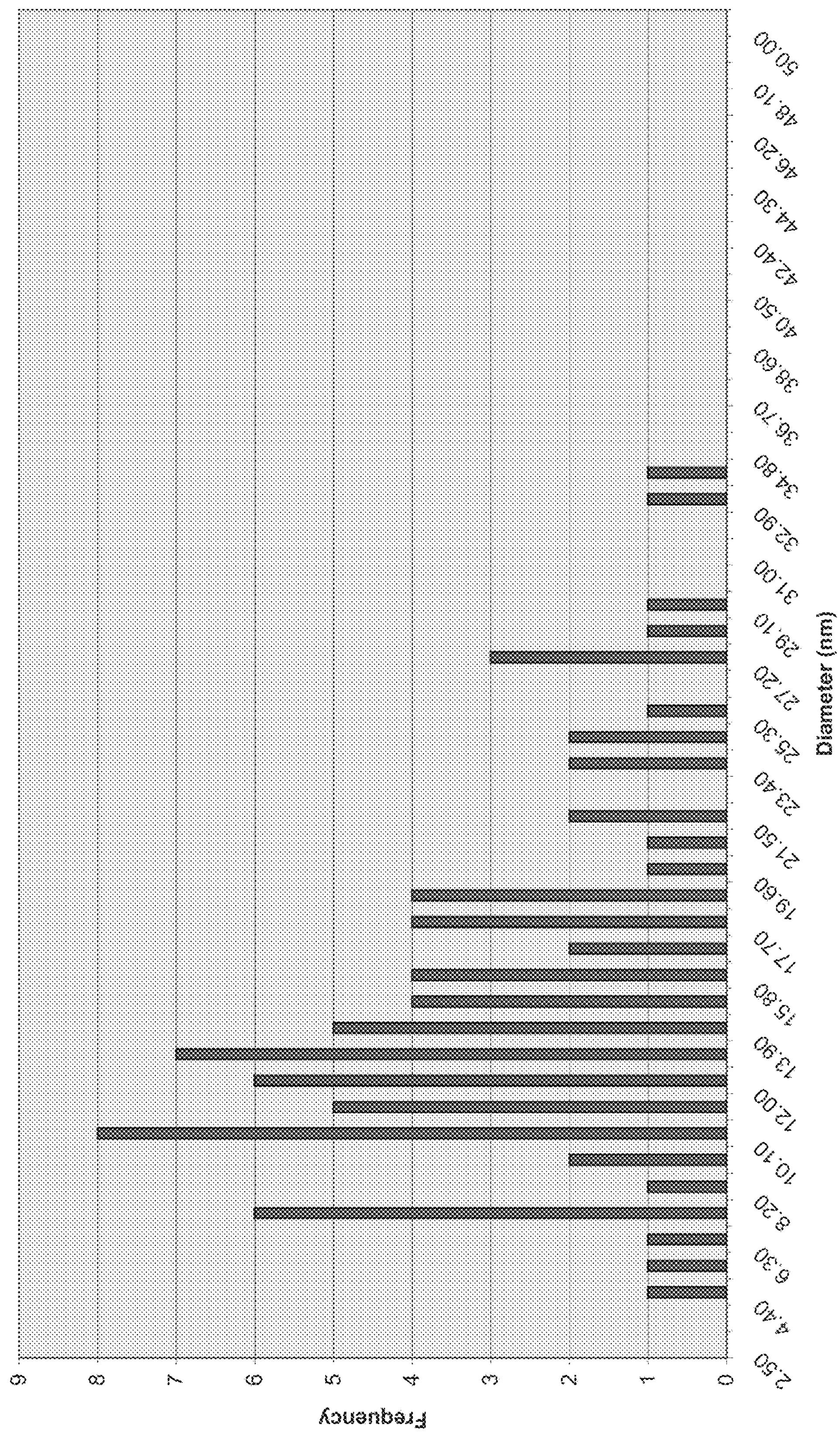
FIG. 46B shows the particle size distribution histogram from TEM measurements for the nanoparticles made according to Example 7.

FIGS. 44B, 45B and 46B are particle size distribution histograms measured from TEM photomicrographs corresponding to dried solutions GD-007, GD-016 and GD-015 corresponding to Examples 5, 6 and 7, respectively.

Further, dynamic light scattering techniques were also utilized to obtain an indication of particle sizes (e.g., hydrodynamic radii) produced according to the Examples herein. FIGS. 44C, 45C and 46C show the graphical result of three separate dynamic light scattering data sets.

Specifically, dynamic light scattering (DLS) measurements were performed on Viscotek 802 DLS instrument. In DLS, as the laser light hits small particles and/or organized water structures around the small particles (smaller than the wavelength), the light scatters in all directions, resulting in a time-dependent fluctuation in the scattering intensity. Intensity fluctuations are due to the Brownian motion of the scattering particles/water structure combination and contain information about the particle size distribution.

The instrument was allowed to warm up for at least 30 min prior to the experiments. The measurements were made using 141 quartz cell. The following procedure was used:

1. First, 1 ml of DI water was added into the cell using 1 ml micropipette, then water was poured out of the cell to a waste beaker and the rest of the water was shaken off the cell measuring cavity. This step was repeated two more times to thoroughly rinse the cell.
2. 100 μl of the sample was added into the cell using 200 μl micropipette. After that all liquid was removed out of the cell with the same pipette using the same pipette tip and expelled into the waste beaker. 100 μl of the sample was added again using the same tip.
3. The cell with the sample was placed into a temperature controlled cell block of the Viscotek instrument with frosted side of the cell facing left. A new experiment in Viscotek OmniSIZE software was opened. The measurement was started 1 min after the temperature equilibrated and the laser power attenuated to the proper value. The results were saved after all runs were over.
4. The cell was taken out of the instrument and the sample was removed out of the cell using the same pipette and the tip used if step 2.
5. Steps 2 to 4 were repeated two more times for each sample.
6. For a new sample, a new pipette tip for 200 μl pipette was taken to avoid contamination with previous sample and steps 1 through 5 were repeated.

Data collection and processing was performed with OmniSIZE software, version 3,0,0,291. The following parameters were used for all the experiments: Run Duration—3s; Experiments—100; Solvent—water, 0 mmol; Viscosity—1 cP; Refractive Index—1.333; Spike Tolerance—20%; Baseline Drift—15%; Target Attenuation—300 kCounts; block temperature—+40° C. After data for each experiment were saved, the results were viewed on "Results" page of the software. Particle size distribution (i.e., hydrodynamic radii) was analyzed in "Intensity distribution" graph. On that graph any peaks outside of 0.1 nm-10 μm range were regarded as artifacts. Particularly, clean water (no particles) results no peaks within 0.1 nm-10 μm range and a broad peak below 0.1 nm. This peak is taken as a noise peak (noise flow) of the instrument. Samples with very low concentration or very small size of suspended nanoparticles may exhibit measurable noise peak in "Intensity distribution" graph. If the peaks within 0.1 nm-10 μm range have higher intensity than the noise peak, those peaks considered being real, otherwise the peaks are questionable and may represent artifacts of data processing.

FIG. 44C shows graphical data corresponding to three representative Viscotek output data sets for Example 5 (i.e., GD-007); FIG. 45C shows graphical data corresponding to three representative Viscotek output data sets for Example 6 (i.e., GD-016); and FIG. 46C shows graphical data corresponding to three representative Viscotek output data sets for Example 7 (i.e., GD-015). The numbers reported at the tops of the peaks in each of FIGS. 44C, 45C and 46C correspond to the average hydrodynamic radii of particles, and light scattered around such particles, detected in each solution. It should be noted that multiple (e.g., hundreds) of data-points were examined to give the numbers reported in each data set, as represented by the "s-shaped" curves (i.e., each curve represents a series of collected data points). The reported "% transmission" in each data set corresponds to the intensity of the interrogation beam required in order to achieve the dynamic light scattering data. In general, but not always, when the reported "% transmission" is below 50%, very strong particle and/or particle/ordered water structures are present. Also, when the "% transmission" approaches 100%, often ions and/or very small particles (e.g., pico-sized particles) are present and the reported hydrodynamic radii may comprise more ordered or structured water then actual solid particles.

It should be noted that the dynamic light scattering particle size information is different from the TEM measured histograms because dynamic light scattering uses algorithms that assume the particles are all spheres (which they are not) as well as measures the hydrodynamic radius (e.g., the particle's influence on the water is also detected and reported in addition to the actual physical radii of the particles). Accordingly, it is not surprising that there is a difference in the reported particle sizes between those reported in the TEM histogram data and those reported in the dynamic light scattering data, just as in the other Examples included herein.

The AAS values were obtained from a Perkin Elmer AAnalyst 400 Spectrometer system.

I) Principle

The technique of flame atomic absorption spectroscopy requires a liquid sample to be aspirated, aerosolized and mixed with combustible gases, such as acetylene and air. The mixture is ignited in a flame whose temperature ranges from about 2100 to about 2400 degrees C. During combustion, atoms of the element of interest in the sample are reduced to free, unexcited ground state atoms, which absorb light at characteristic wavelengths. The characteristic wavelengths are element specific and are accurate to 0.01-0.1 nm. To provide element specific wavelengths, a light beam from a hollow cathode lamp (HCL), whose cathode is made of the element being determined, is passed through the flame. A photodetector detects the amount of reduction of the light intensity due to absorption by the analyte. A monochromator is used in front of the photodetector to reduce background ambient light and to select the specific wavelength from the HCL required for detection. In addition, a deuterium arc lamp corrects for background absorbance caused by non-atomic species in the atom cloud.

II) Sample Preparation 10 mL of sample, 0.6 mL of 36% v/v hydrochloric acid and 0.15 mL of 50% v/v nitric acid are mixed together in a glass vial and incubated for about 10 minutes in 70 degree C. water bath. If gold concentration is expected to be above 10 ppm a sample is diluted with DI water before addition of the acids to bring final gold concentration in the range of 1 to 10 ppm. For example, for a gold concentration around 100 ppm, 0.5 mL of sample is diluted with 9.5 mL of DI water before the addition of acids. Aliquoting is performed with adjustable micropipettes and the exact amount of sample, DI water and acids is measured by an Ohaus PA313 microbalance. The weights of components are used to correct measured concentration for dilution by DI water and acids.

Each sample is prepared in triplicate and after incubation in water bath is allowed to cool down to room temperature before measurements are made.

III) Instrument Setup

The following settings are used for Perkin Elmer AAnalyst 400 Spectrometer system:

a) Burner head: 10 cm single-slot type, aligned in three axes according to the manufacture procedure to obtain maximum absorbance with a 2 ppm Cu standard.
b) Nebulizer: plastic with a spacer in front of the impact bead.
c) Gas flow: oxidant (air) flow rate about 12 L/min, fuel (acetylene) flow rate about 1.9 mL/min.
d) Lamp/monochromator: Au hollow cathode lamp, 10 mA operating current, 1.8/1.35 mm slits, 242.8 nm wavelength, background correction (deuterium lamp) is on.

IV) Analysis Procedure a) Run the Au lamp and the flame for approximately 30 minutes to warm up the system.
b) Calibrate the instrument with 1 ppm, 4 ppm and 10 ppm Au standards in a matrix of 3.7% v/v hydrochloric acid. Use 3.7% v/v hydrochloric acid as a blank.
c) Verify calibration scale by measuring 4 ppm standard as a sample. The measured concentration should be between 3.88 ppm and 4.12 ppm. Repeat step b) if outside that range.
d) Measure three replicas of a sample. If the standard deviation between replicas is higher than 5%, repeat measurement, otherwise proceed to the next sample.
e) Perform verification step c) after measuring six samples or more often. If verification fails, perform steps b) and c) and remeasure all the samples measured after the last successful verification.

V) Data Analysis

Measured concentration value for each replica is corrected for dilution by water and acid to calculate actual sample concentration. The reported Au ppm value is the average of three corrected values for individual replica.

EXAMPLES 8-10

Manufacturing Gold-Based Nanoparticles/Nanoparticle Solutions GB-018, GB-019 and GB-020

In general, each of Examples 8-10 utilize certain embodiments of the invention associated with the apparatuses generally shown in FIGS. 4E, 37A, 38B and 41A (e.g., a tapered trough member 30*b*). Specific differences in processing and apparatus will be apparent in each Example. The trough members 30*a* and 30*b* were made from ⅛" (about 3 mm) thick plexiglass, and ¼" (about 6 mm) thick polycarbonate, respectively. The support structure 34 was also made from plexiglass which was about ¼" thick (about 6-7 mm thick). The cross-sectional shape of the trough member 30*a* shown in FIG. 37A corresponds to that shape shown in FIG. 10B (i.e., a truncated "V"). The base portion "R" of the truncated "V" measured about 0.5" (about 1 cm), and each side portion "S", "S'" measured about 1.5" (about 3.75 cm). The distance "M" separating the side portions "S", "S'" of the V-shaped trough member 30*a* was about 2¼"-2 5/16" (about 5.9 cm) (measured from inside to inside). The thickness of each portion also measured about ⅛" (about 3 mm) thick. The longitudinal length "$L_T$" (refer to FIG. 11A) of the V-shaped trough member 30*a* measured about 3 feet (about 1 meter) long from point 31 to point 32.

Purified water (discussed elsewhere herein) was mixed with $NaHCO_3$ in a range of about 0.396 to 0.528 g/L of $NaHCO_3$ and was used as the liquid 3 input into trough member 30*a*. While this range of $NaHCO_3$ utilized was effective, it should not be viewed as limiting the metes and bounds of the invention. The depth "d" (refer to FIG. 10B) of the water 3 in the V-shaped trough member 30*a* was about 7/16" to about ½" (about 11 mm to about 13 mm) at various points along the trough member 30*a*. The depth "d" was partially controlled through use of the dam 80 (shown in FIG. 37A). Specifically, the dam 80 was provided near the end 32 and assisted in creating the depth "d" (shown in FIG. 10B) to be about 7/16"-½" (about 11-13 mm) in depth. The height "j" of the dam 80 measured about ¼" (about 6 mm) and the longitudinal length "k" measured about ½" (about 13 mm) The width (not shown) was completely across the bottom dimension "R" of the trough member 30*a*. Accordingly, the total volume of water 3 in the V-shaped trough member 30*a* during operation thereof was about 6.4 $in^3$ (about 105 ml).

The rate of flow of the water 3 into the trough member 30*a* ranged from about 150 ml/minute to at least 280 ml/minute. Such flow of water 3 was obtained by utilizing a Masterflex® L/S pump drive 40 rated at 0.1 horsepower, 10-600 rpm. The model number of the Masterflex® pump 40 was 77300-40. The pump drive had a pump head also made by Masterflex® known as Easy-Load Model No. 7518-10. In general terms, the head for the pump 40 is known as a peristaltic head. The pump 40 and head were controlled by a Masterflex® LS Digital Modular Drive. The model number for the Digital Modular Drive is 77300-80. The precise settings on the Digital Modular Drive were, for example, 150 milliliters per minute. Tygon® tubing having a diameter of ¼" (i.e., size 06419-25) was placed into the peristaltic head. The tubing was made by Saint Gobain for Masterflex®. One end of the tubing was delivered to a first end 31 of the trough member 30*a* by a flow diffusion means located therein. The flow diffusion means tended to minimize disturbance and bubbles in water 3 introduced into the trough member 30*a* as well as any pulsing condition generated by the peristaltic pump 40. In this regard, a small reservoir served as the diffusion means and was provided at a point vertically above the end 31 of the trough member 30*a* such that when the reservoir overflowed, a relatively steady flow of water 3 into the end 31 of the V-shaped trough member 30*a* occurred.

There were 5 electrode sets used in Examples 8-10 and one electrode set was a single electrode set 1*a*/5*a* located in the trough member 30*a*. The plasma 4 from electrode 1*a* in trough member 30*a* was created with an electrode 1 similar in shape to that shown in FIG. 5E, and weighed about 9.2 grams. This electrode was 99.95% pure gold. The other electrode 5*a* comprised a right-triangular shaped platinum plate measuring about 14 mm×23 mm×27 mm and about 1 mm thick and having about 9 mm submerged in the liquid 3'. The AC transformer used to create the plasma 4 was that transformer 60 shown in FIG. 32A and discussed elsewhere herein. AC transformers 50 (discussed elsewhere herein) were connected to the other electrode sets 5/5. All other pertinent run conditions are shown in Tables 3a, 3b and 3c.

The output of the processing-enhanced, conditioned water 3' was collected into a reservoir 41 and subsequently pumped by another pump 40' into a second trough member 30*b*, at substantially the same rate as pump 40 (e.g., there was minimal evaporation in trough member 30*a*). The second trough member 30*b* shown in FIG. 22A was tapered and measured about 3.75 inches high, about 3.75 inches wide at the end 32 thereof, and about 1 inch wide at the end 31 thereof, thus forming a tapered shape. This trough member 30*b* contained about 1450 ml of liquid 3" therein which was about 2.5 inches deep. Each of four electrode sets 5*b*, 5*b*'-5*e*, 5*e*' comprised 99.95% pure gold wire which measured about 5 inches (about 13 cm) in length, and about 0.5 mm in diameter in Examples 8 and 9, and about 1.0 mm in diameter in Example 10. In each of Examples 8-10, approximately 4.25 inches (about 11 cm) of the wire was submerged within the water 3", which had a depth of about 2.5 inches (about 6 cm). Each electrode set 5*a*, 5*a*'-5*d*, 5*d*' was shaped like a "J", as shown in FIG. 4E. The distance "g" shown in FIG. 4E measured about 1-8 mm.

Figure 38B:
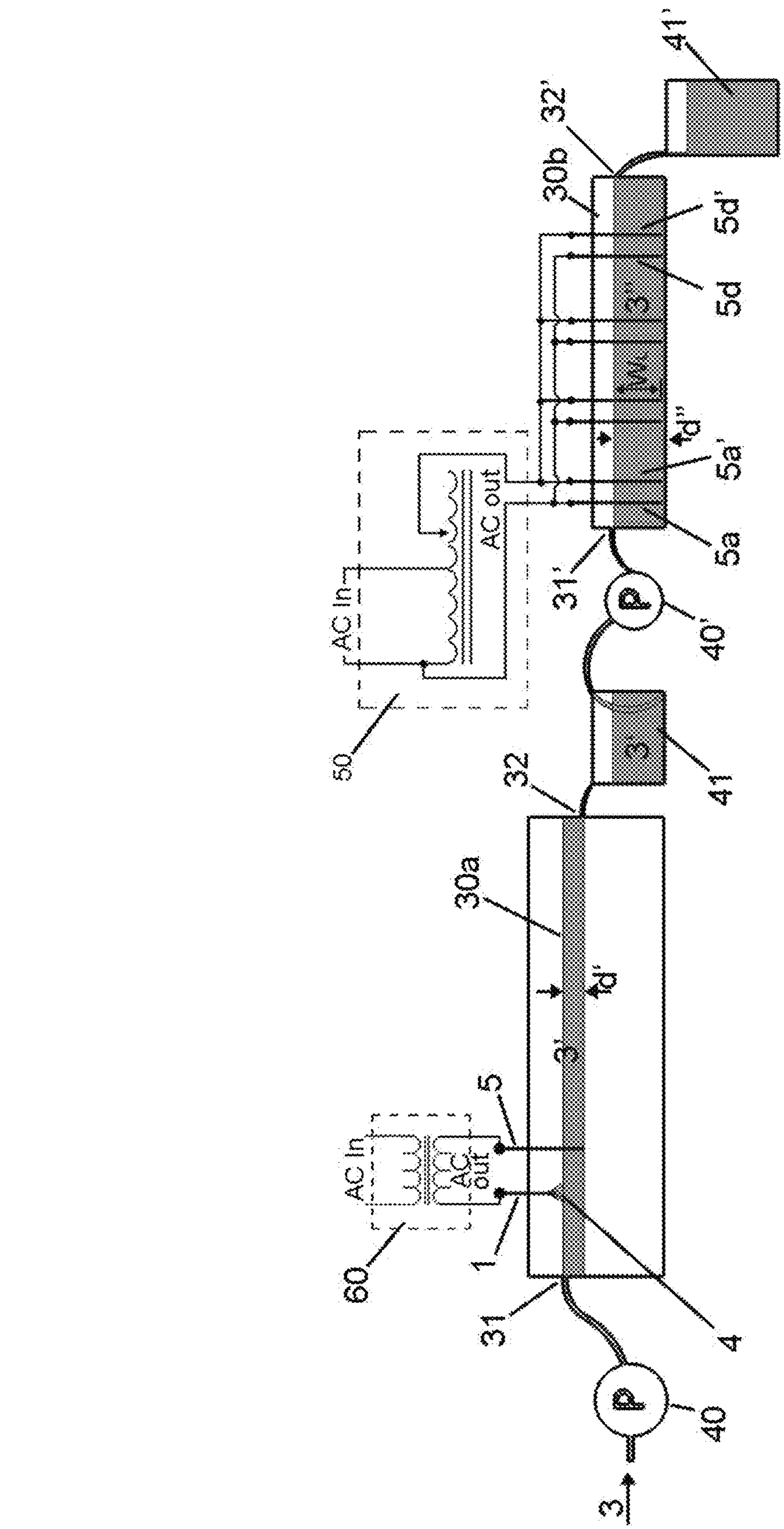
Figure 41A:
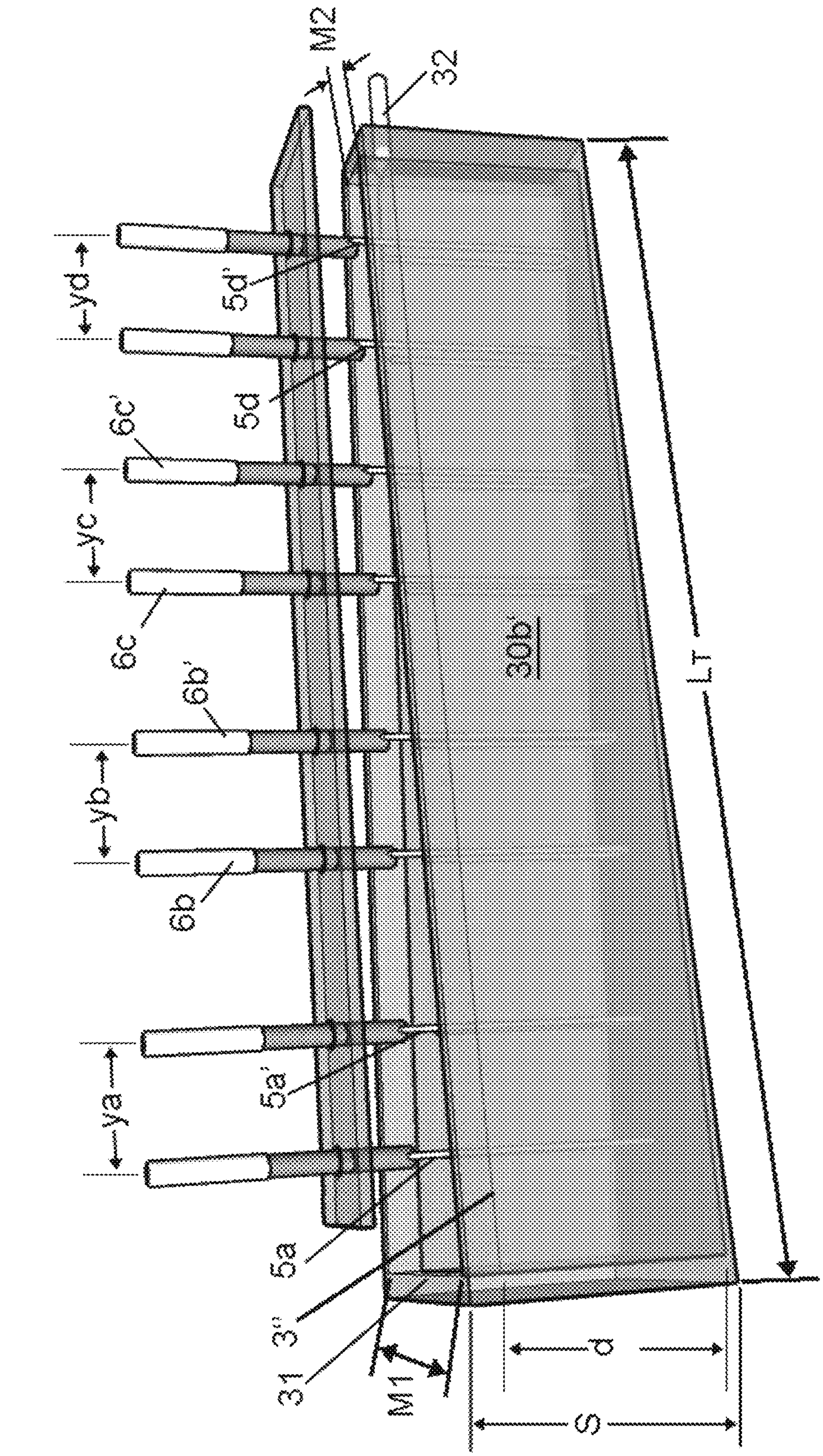
FIGS. 41A and 41B show trough members 30*b* in connection with FIGS. 38A, 38B and 39A-39H and various Examples herein.
Figure 41B:
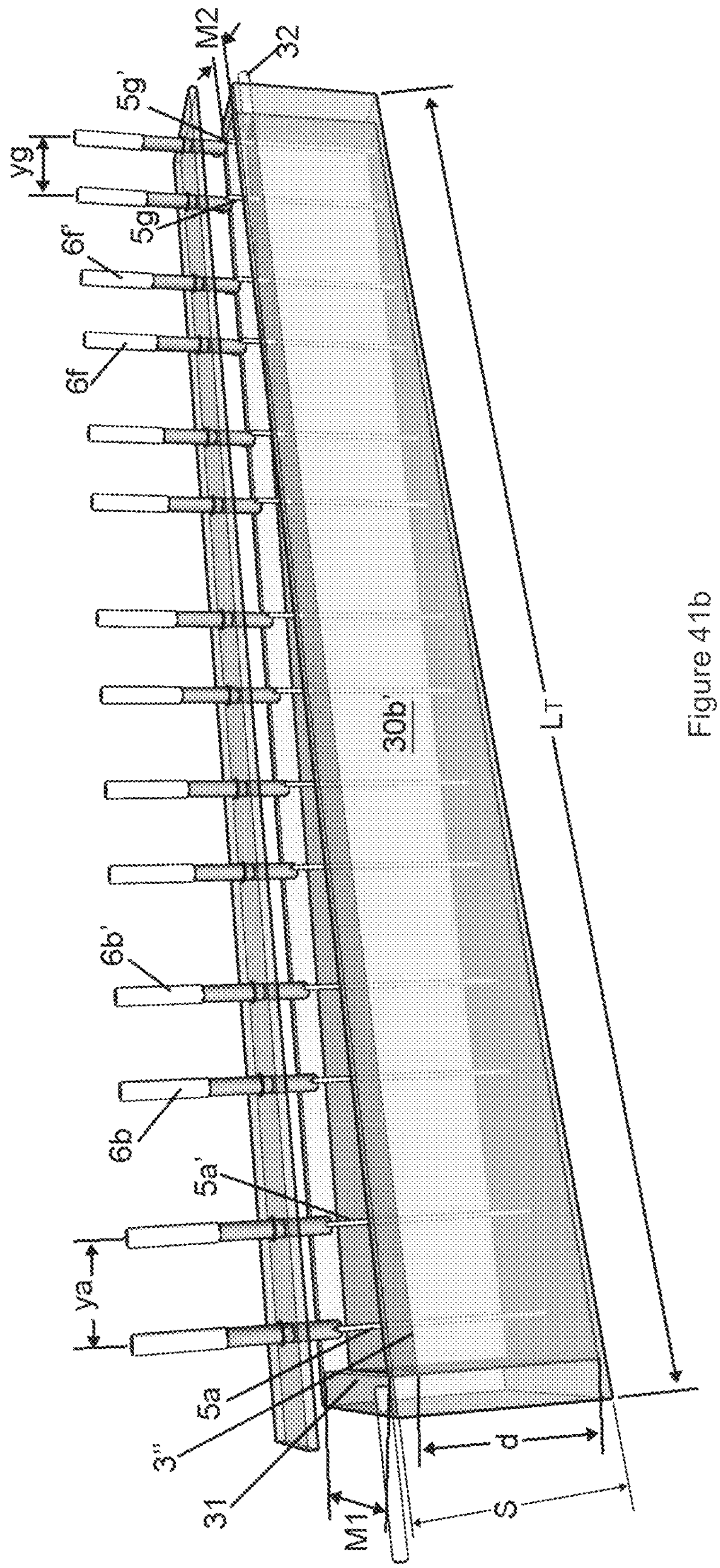

With regard to FIGS. 38B and 41A, 4 separate electrode sets (Set 2, Set 3, Set 4 and Set 5) were attached to a single transformer device 50. Specifically, transformer 50 was the same transformer used in Examples 5-7, but was electrically connected to each electrode set according to the wiring diagram shown in FIG. 38B. In contrast, this wiring configuration was different than that used in Examples 5-7, discussed above, only a single transformer 50 was required due to the lower amperage requirements (e.g., less wire was in contact with the liquid 3) of this inventive trough 30*b* design.

Each of Tables 3a-3c contains processing information relative to each of the 4 electrode sets by "Set #". Each electrode of the 4 electrode sets in trough 30*b* was set to operate at a specific target voltage. Actual operating voltages of about 255 volts, as listed in each of Tables 3a-3c, were applied to the four electrode sets. The distance "c-c" (with reference to FIG. 14) from the centerline of each electrode set to the adjacent electrode set is also represented. Further, the distance "x" associated with the electrode 1 utilized in trough 30*a* is also reported. For the electrode 5's, no distance "x" is reported. Other relevant parameters are reported in each of Tables 3a-3c.

All materials for the electrodes 1/5 were obtained from ESPI having an address of 1050 Benson Way, Ashland, Oreg. 97520.

The water 3 used in Examples 8-10 was produced by a Reverse Osmosis process and deionization process and was mixed with the $NaHCO_3$ processing-enhancer and together was input into the trough member 30*a*. In essence, Reverse Osmosis (RO) is a pressure driven membrane separation process that separates species that are dissolved and/or suspended substances from the ground water. It is called "reverse" osmosis because pressure is applied to reverse the natural flow of osmosis (which seeks to balance the concentration of materials on both sides of the membrane). The applied pressure forces the water through the membrane leaving the contaminants on one side of the membrane and the purified water on the other. The reverse osmosis membrane utilized several thin layers or sheets of film that are bonded together and rolled in a spiral configuration around a plastic tube. (This is also known as a thin film composite or TFC membrane.) In addition to the removal of dissolved species, the RO membrane also separates out suspended materials including microorganisms that may be present in the water. After RO processing a mixed bed deionization filter was used. The total dissolved solvents ("TDS") after both treatments was about 0.2 ppm, as measured by an Accumet® AR20 pH/conductivity meter.

TABLE 3a 0.528 mg/ml of $NaHCO_3$ (Au)

| | |
|---|---|
| Run ID: | GB-018 |
| Flow Rate: | 280 ml/min |
| Voltage: | 255V |
| $NaHCO_3$: | 0.528 mg/ml |
| Wire Dia.: | .5 mm |
| Configuration: | J/J |
| PPM: | 2.9 |
| Zeta: | −98.84 |

| Set# | Electrode# | Distance "c-c" in/mm | Distance "x" in/mm | Voltage | cross section |
|---|---|---|---|---|---|
| | | 4.5/114.3* | | | |
| 1 | 1a | | 0.25 | 750 | V |
| | 5a | | N/A | 750 | |
| | | 23/584.2** | | | |
| | | 2.5/63.5* | | | |
| 2 | 5b | | N/A | 255 | |
| | 5b' | | N/A | | |
| | | 3.5/88.9 | | | |
| 3 | 5c | | N/A | 255 | |
| | 5c' | | N/A | | |
| | | 3.5/88.9 | | | Tapered 3"Deep |
| 4 | 5d | | N/A | 255 | |
| | 5d" | | N/A | | |
| | | 3.5/88.9 | | | |
| 5 | 5e | | N/A | 255 | |
| | 5e' | | N/A | | |
| | | 376.2** | | | |

| | |
|---|---|
| Output Water Temperature | 80 C. |

*Distance from water inlet to center of first electrode set

**Distance from center of last electrode set to water outlet

TABLE 3b 0.396 mg/ml of $NaHCO_3$ (Au)

| | |
|---|---|
| Run ID: | GB-019 |
| Flow Rate: | 150 ml/min |
| Voltage: | 255 V |

TABLE 3b-continued 0.396 mg/ml of $NaHCO_3$ (Au)

| | |
|---|---|
| $NaHCO_3$: | 0.396 mg/ml |
| Wire Dia.: | 1 mm |
| Configuration: | J/J |
| PPM: | 23.6 |
| Zeta: | −56.6 |

| Set# | Electrode# | Distance "c-c" in/mm | Distance "x" in/mm | Voltage | cross section |
|---|---|---|---|---|---|
| | | 4.5/114.3* | | | |
| 1 | 1a | | 0.25/6.35 | 750 | V |
| | 5a | | N/A | 750 | |
| | | 23/584.2** | | | |
| | | 2.5/63.5* | | | |
| 2 | 5b | | N/A | 255 | |
| | 5b' | | N/A | | |
| | | 3.5/88.9 | | | |
| 3 | 5c | | N/A | 255 | |
| | 5c' | | N/A | | |
| | | 3.5/88.9 | | | Tapered 3"Deep |
| 4 | 5d | | N/A | 255 | |
| | 5d' | | N/A | | |
| | | 3.5/88.9 | | | |
| 5 | 5e | | N/A | 255 | |
| | 5e' | | N/A | | |
| | | 376.2** | | | |

| | |
|---|---|
| Output Water Temperature | 97 C. |

*Distance from water inlet to center of first electrode set

**Distance from center of last electrode set to water outlet

TABLE 3c 0.396 mg/ml of $NaHCO_3$ (Au)

| | |
|---|---|
| Run ID: | GB-020 |
| Flow Rate: | 250 ml/min |
| Voltage: | 255 V |
| $NaHCO_3$: | 0.396 mg/ml |
| Wire Dia.: | 1 mm |
| Configuration: | J/J |
| PPM: | 4.9 |
| Zeta: | −58.01 |

| Set# | Electrode# | Distance "c-c" in/mm | Distance "x" in/mm | Voltage | cross section |
|---|---|---|---|---|---|
| | | 4.5/114.3* | | | |
| 1 | 1a | | 0.25 | 750 | V |
| | 5a | | N/A | 750 | |
| | | 23/584.2** | | | |
| | | 2.5/63.5* | | | |
| 2 | 5b | | N/A | 255 | |
| | 5b' | | N/A | | |
| | | 3.5/88.9 | | | |
| 3 | 5c | | N/A | 255 | |
| | 5c' | | N/A | | |
| | | 3.5/88.9 | | | Tapered 3"Deep |
| 4 | 5d | | N/A | 255 | |
| | 5d' | | N/A | | |
| | | 3.5/88.9 | | | |
| 5 | 5e | | N/A | 255 | |
| | 5e' | | N/A | | |
| | | 376.2** | | | |

TABLE 3c-continued

| 0.396 mg/ml of $NaHCO_3$ (Au) | |
|---|---|
| Output Water Temperature | 86 C. |

Figure 47A:
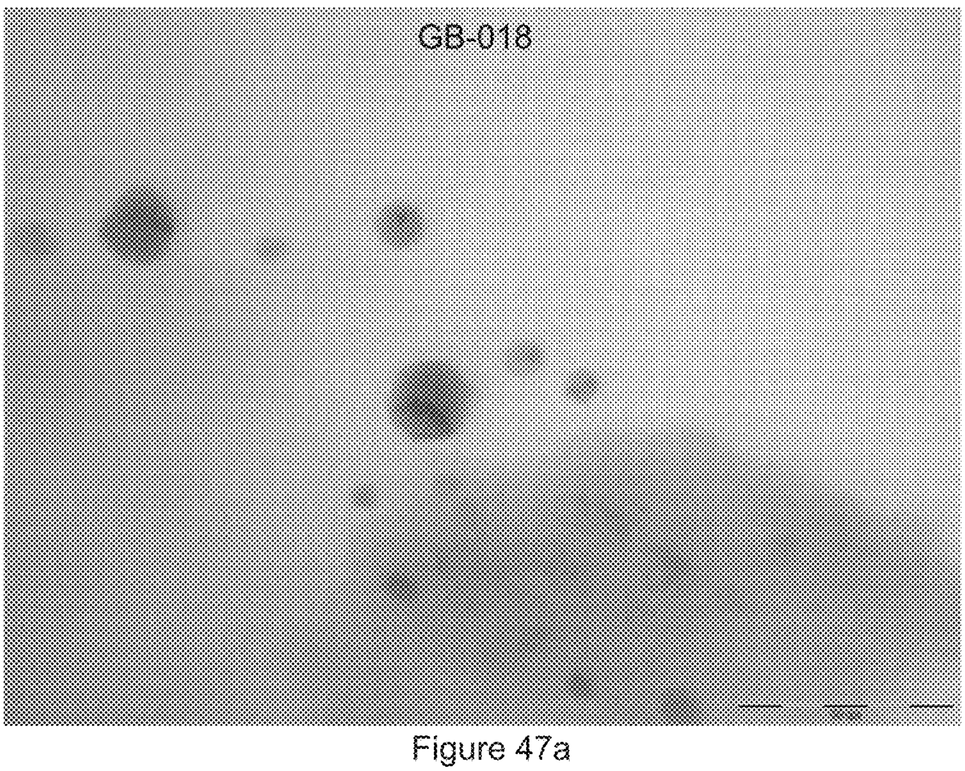
FIG. 47A is a representative TEM photomicrograph of gold nanoparticles from dried solution GB-018 made according to Example 8.
Figure 48A:
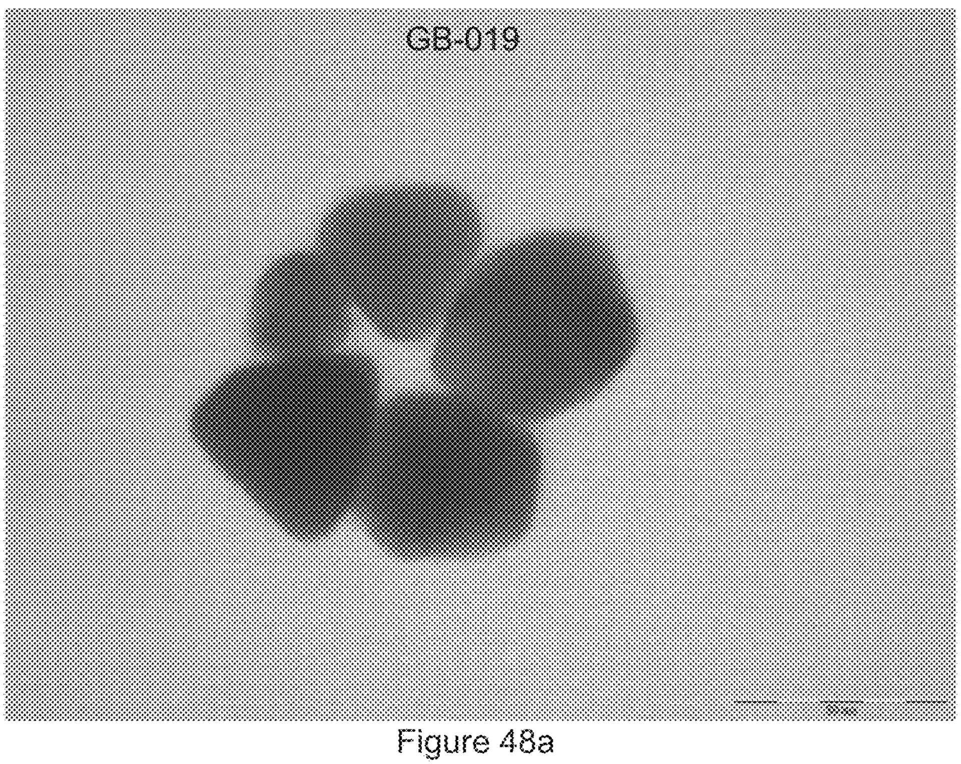
FIG. 48A is a representative TEM photomicrograph of gold nanoparticles from dried solution GB-019 made according to Example 9.
Figure 49A:
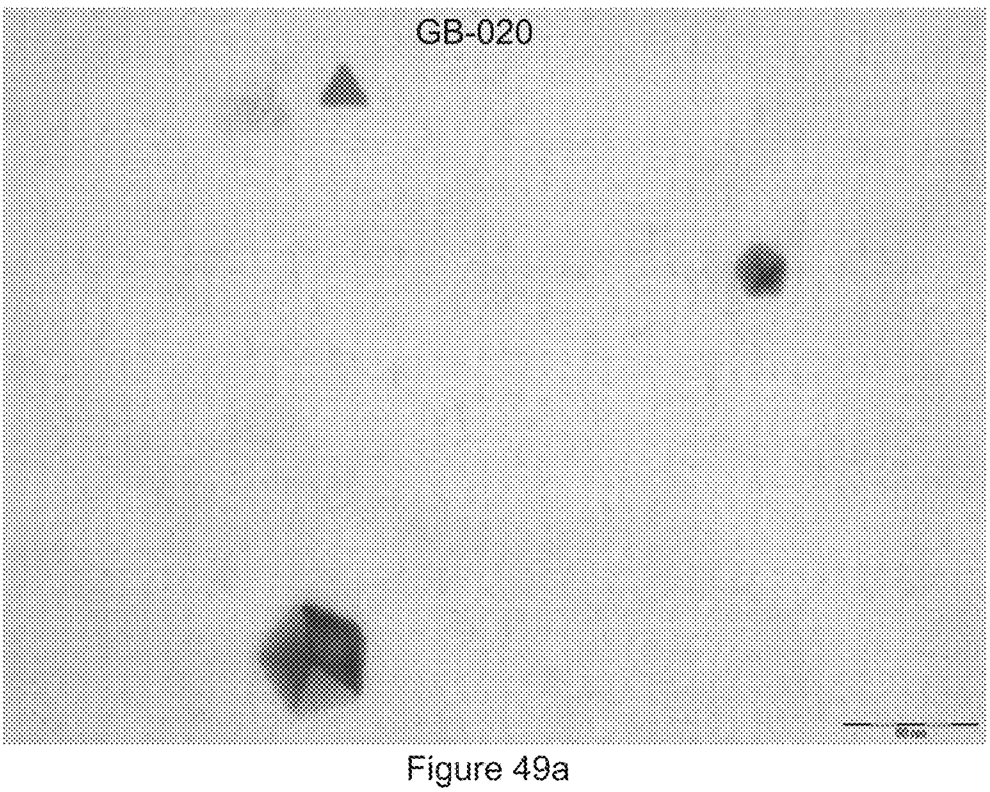
FIG. 49A is a representative TEM photomicrograph of gold nanoparticles from dried solution GB-020 made according to Example 10.

*Distance from water inlet to center of first electrode set
Distance from center of last electrode set to water outlet FIGS. 47A, 48A and 49**A are representative TEM photomicrographs corresponding to dried solutions GB-018, GB-019 and GB-020, respectively, showing gold crystals grown in each of Examples 8, 9 and 10.

Figure 47B:
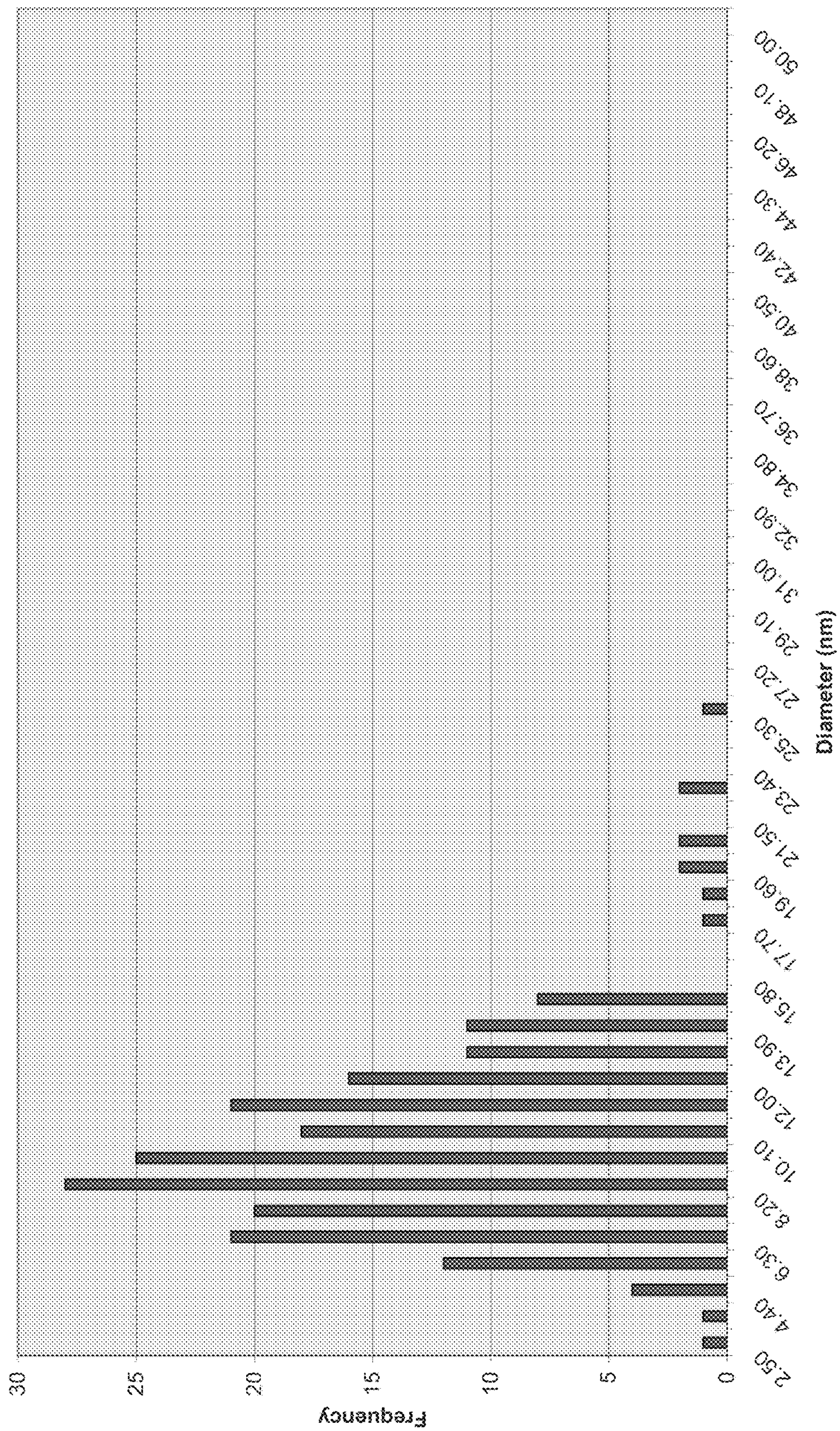
FIG. 47B shows the particle size distribution histogram from TEM measurements for the nanoparticles made according to Example 8.
Figure 48B:
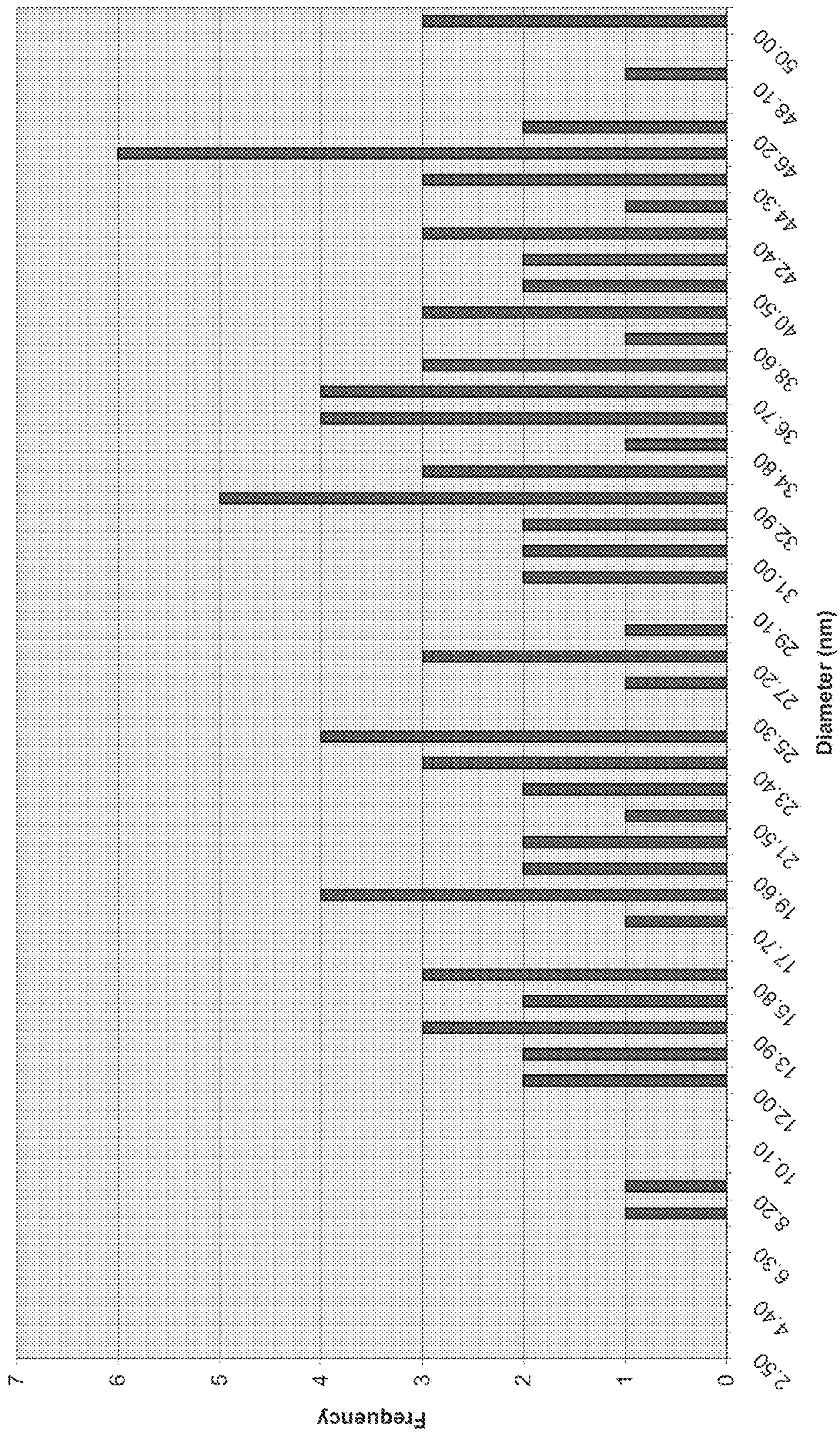
FIG. 48B shows the particle size distribution histogram from TEM measurements for the nanoparticles made according to Example 9.
Figure 49B:
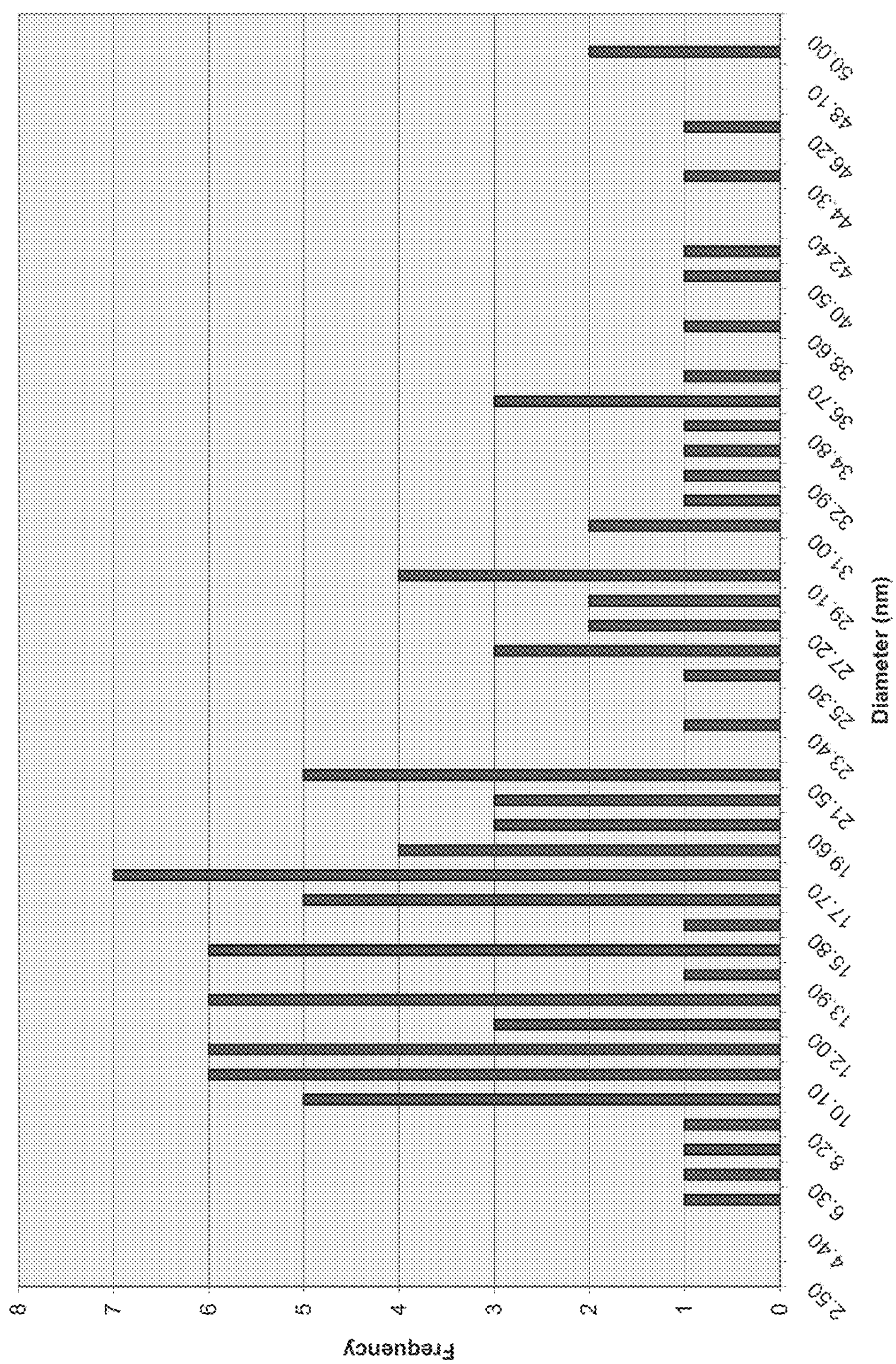
FIG. 49B shows particle size distribution histogram from TEM measurements for the nanoparticles made according to Example 10.

FIGS. 47B, 48B and 49B are particle size distribution histograms measured from the TEM photomicrographs (i.e., using the software described earlier in Examples 5-7) corresponding to dried solutions taken from Examples 8, 9 and 10, respectively.

FIGS. 47C, 48C, and 49C show dynamic light scattering data (i.e., hydrodynamic radii) of the gold nanoparticle solutions made in each of Examples 8, 9 and 10, respectively. Each of these FIGS. shows the graphical results of three separate dynamic light scattering data sets.

It should be noted that the dynamic light scattering particle size information is different from the TEM measured histograms because dynamic light scattering uses algorithms that assume the particles are all spheres (which they are not) as well as measures the hydrodynamic radius (e.g., the particle's influence on the water is also detected and reported in addition to the actual physical radii of the particles). Accordingly, it is not surprising that there is a difference in the reported particle sizes between those reported in the TEM histogram data and those reported in the dynamic light scattering data, just as in the other Examples included herein.

Example 11

Figure 43A:
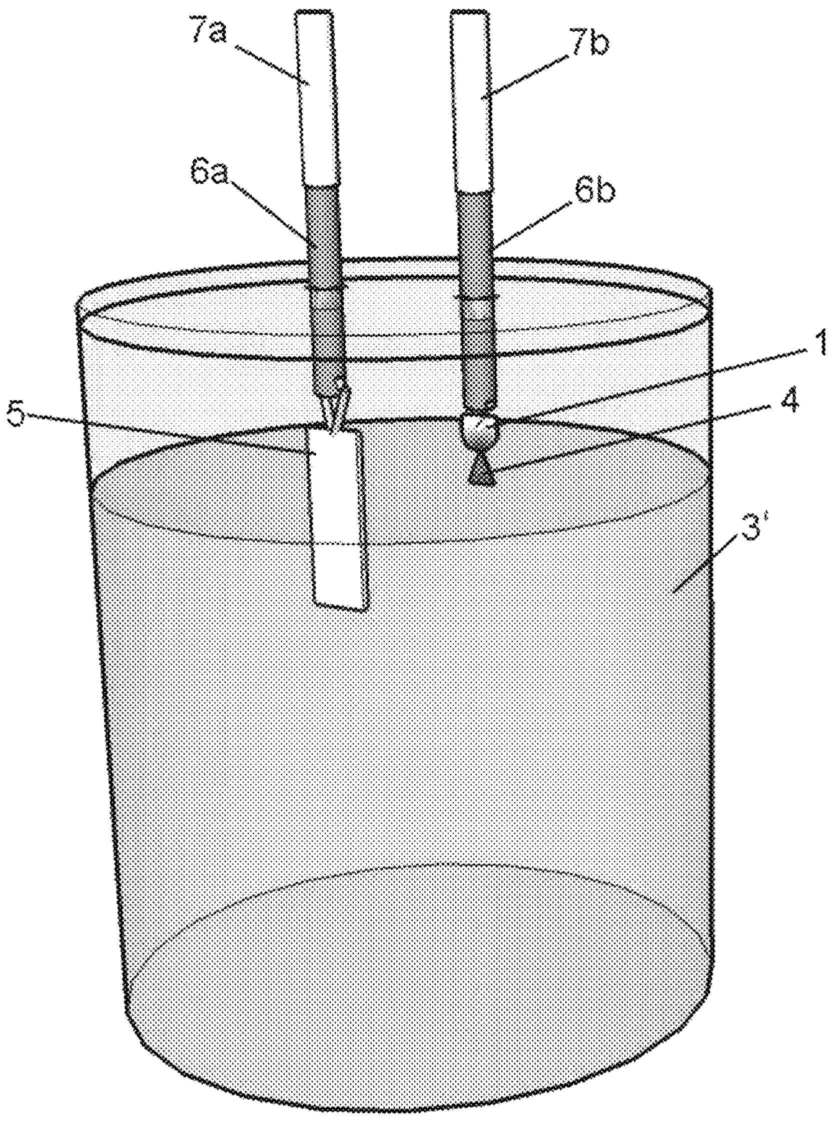
FIG. 43A shows a schematic of an apparatus used in a batch method whereby in a first step, a plasma 4 is created to condition a fluid 3.
Figure 43B:
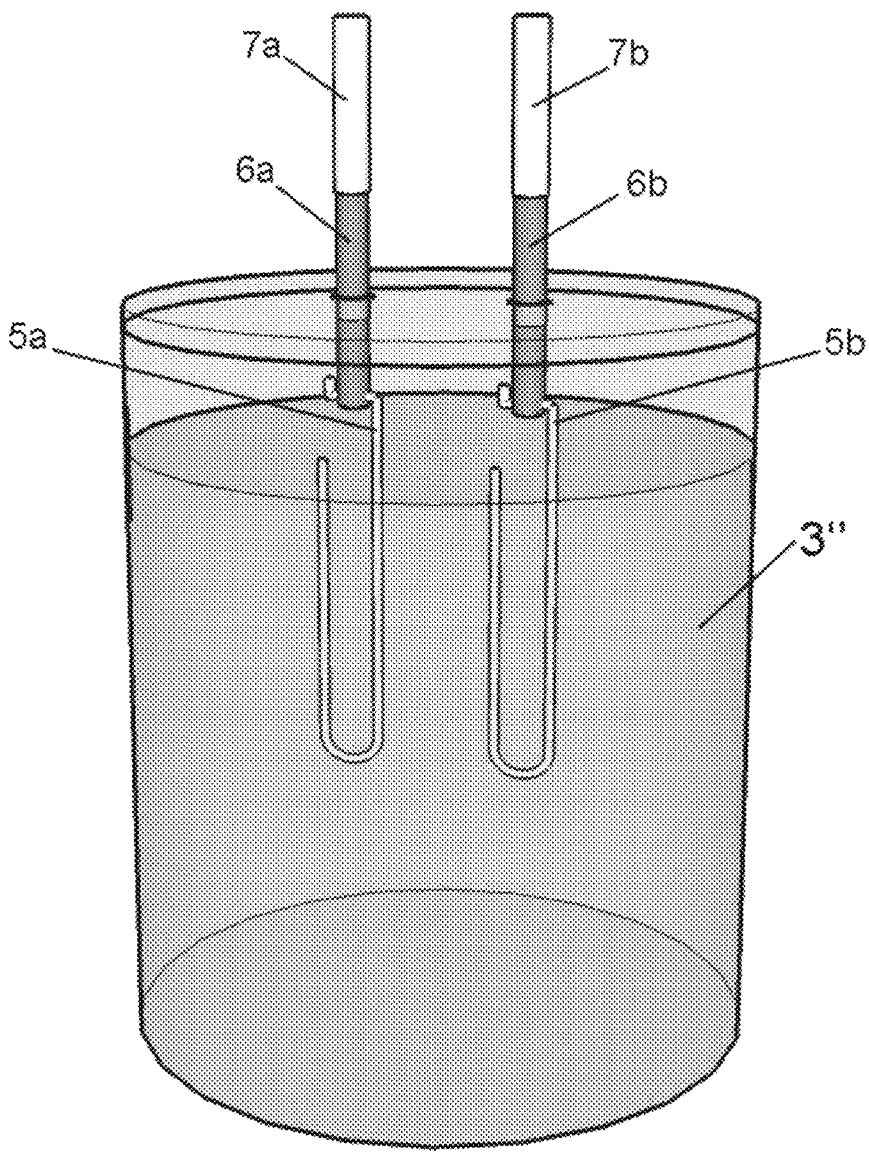
FIGS. 43B and 43C show a schematic of an apparatus used in a batch method utilizing wires 5*a* and 5*b* to make nanoparticles in solution (e.g., a colloid) in association with the apparatus shown in FIG. 43A and as discussed in Examples herein.

Manufacturing Gold-Based Nanoparticles/Nanoparticle Solutions or Colloids IAC-202-7 by a Batch Process This Example utilizes a batch process according to the present invention. FIG. 43A shows the apparatus used to condition the liquid 3. Once conditioned, the liquid 3' was processed in the apparatus shown in FIG. 43C.

Figure 43C:
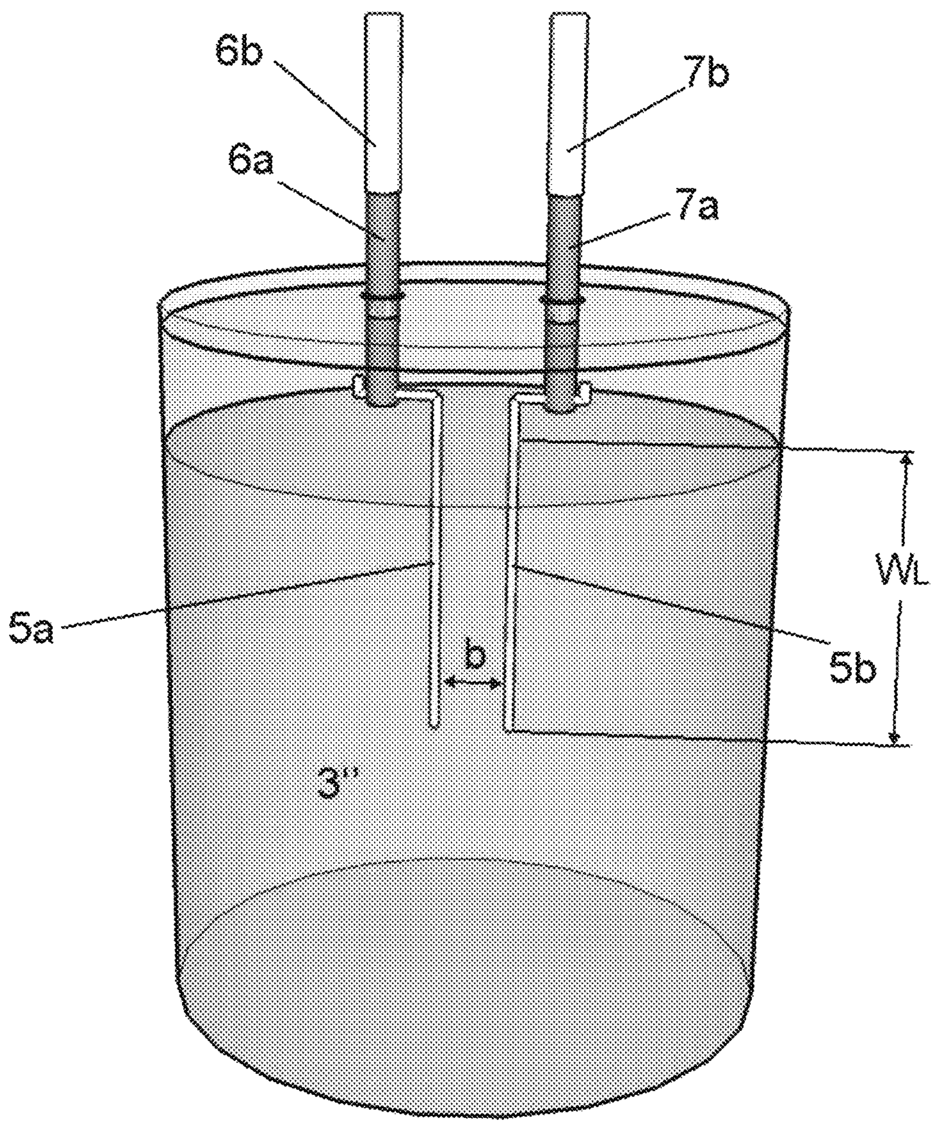

Table 4a shows a matrix where the amount of processing enhancer baking soda (i.e., $NaHCO_3$) varies from about 1 gram/gallon to about 2 grams/gallon (i.e., about 0.264 g/L to about 0.528 g/L); and the dwell time reflected in Table 4a in the apparatus of FIG. 43A (i.e., the amount of time that the water 3 with processing enhancer was exposed to the plasma 4) was varied from about 20 minutes to about 60 minutes, prior to subsequent processing in the apparatus shown in FIG. 43C. The applied voltage for each plasma 4 made by electrode 1 was about 750 volts. This voltage was achieved by a transformer 60 (i.e., the Balanced Mid-Point Referenced Design) discussed elsewhere herein. A second and different transformer was electrically connected to the electrodes 5*a*/5*b* shown in FIG. 43C. This transformer was a hy-AC power source having a voltage range of 0-300V, a frequency range of 47-400 Hz and a maximum power rating of 1 kVA. The applied voltage for each identified run in Tables 4a and 4b was about 250 volts. The current changed as a function of time with minimum and maximum volts reported in Table 4b. All other process variables remained constant.

Accordingly, Table 4a shows that a number of variables (e.g., processing enhancer and predetermined dwell time) influence both the amount or concentration of gold nanoparticles in water, and the size distribution of the gold nanoparticles. In general, as the concentration of the processing enhancer increases from about 1 g/gallon (0.264 g/L) to about 2 g/gallon (0.528 g/L), the concentration (i.e., "ppm") more or less increases under a given set of processing conditions. However, in some cases the particle size distribution ("psd") unfavorably increases such that the formed nanoparticles were no longer stable and they "settled", as a function of time (e.g., an unstable suspension was made). These settling conditions were not immediate thus suggesting that this suspension of nanoparticles in water could be processed immediately into a useful product, such as, for example, a gel or cream. This Example shows clearly various important effects of multiple processing variables which can be translated, at least directionally, to the inventive continuous processes disclosed elsewhere herein. These data are illustrative and should not be viewed as limiting the metes and bounds of the present invention. Moreover, these illustrative data should provide an artisan of ordinary skill with excellent operational directions to pursue.

As a specific example, Table 4c shows that a first electrode Set #1 (i.e., FIG. 43A) was operating at a voltage of about 750 volts, to form the plasma 4. This is similar to the other plasmas 4 reported elsewhere herein. However, electrode Set #2 (i.e., FIG. 43C) was powered by the hy-AC source discussed above.

TABLE 4a

| | | | Pretreatment Dwell (minutes) | | | | | | | | | | | |
|---|---|---|---|---|---|---|---|---|---|---|---|---|---|---|
| | | | 20 | | | | 40 | | | | 60 | | | |
| | | | 1AC-201 | | 1AC-202 | | 1AC-201 | | 1AC-202 | | 1AC-201 | | 1AC-202 | |
| $NaHCO_3$ | .264 | ppm | 1AC- | 11.8 | 1AC- | 11.1 | 1AC- | 13.5 | 1AC- | 11.4 | 1AC- | 14.3 | 1AC- | 12.2 |
| (mg/ml) | | psd | 201-9 | 18.4 | 202-1 | 19.1 | 201-8 | 19.5 | 202-2 | 18.4 | 201-7 | 16.8 | 202-3 | 19.6 |
| | .396 | ppm | 1AC- | 20.1 | 1AC- | 16.1 | 1AC- | 21.4 | 1AC- | settled | 1AC- | 23.3 | 1AC- | settled |
| | | psd | 201-6 | 21.4 | 202-7 | 32.3 | 201-5 | 126 | 202-8 | 84.8 | 201-4 | 36.3 | 202-9 | 23.8 |
| | .528 | ppm | 1AC- | 27.4 | 1AC- | 23 | 1AC- | 31.1 | 1AC- | 24.9 | 1AC- | settled | 1AC- | settled |
| | | psd | 201-1 | 17.1 | 202-4 | 43.8 | 201-2 | 21.6 | 202-5 | 21.4 | 201-3 | 190 | 202-6 | settled |

TABLE 4b

| | | Current | Pretreatment Dwell (minutes) 20 | | | | 40 | | | | 60 | | | |
|---|---|---|---|---|---|---|---|---|---|---|---|---|---|---|
| | | Amps | 1AC-201 | | 1AC-202 | | 1AC-201 | | 1AC-202 | | 1AC-201 | | 1AC-202 | |
| $NaHCO_3$ | .264 | min | 1AC- | 0.405 | 1AC- | 0.382 | 1AC- | 0.41 | 1AC- | 0.411 | 1AC- | 0.432 | 1AC- | 0.461 |
| (mg/ml) | | max | 201-9 | 1.1 | 202-1 | 1 | 201-8 | 1 | 202-2 | 1.06 | 201-7 | 1 | 202-3 | 1.13 |
| | .396 | min | 1AC- | 0.554 | 1AC- | 0.548 | 1AC- | 0.591 | 1AC- | 0.598 | 1AC- | 0.617 | 1AC- | 0.681 |
| | | max | 201-6 | 1.6 | 202-7 | 1.35 | 201-5 | 1.6 | 202-8 | 1.43 | 201-4 | 1.6 | 202-9 | 1.43 |
| | .528 | min | 1AC- | 0.686 | 1AC- | 0.735 | 1AC- | 0.843 | 1AC- | 0.769 | 1AC- | 0.799 | 1AC- | 0.865 |
| | | max | 201-1 | 1.82 | 202-4 | 1.6 | 201-2 | 2.06 | 202-5 | 2 | 201-3 | 2.01 | 202-6 | 2.1 |

TABLE 4c

| 1.5 g/Gal of $NaHCO_3$ (Au) | |
|---|---|
| Run ID: | 1AC-202-7 |
| Pretreatment: | 20 min GZA in 3600 ml |
| Volume: | 800 ml |
| Run time: | 35 minutes |
| Voltage: | 250 V |
| $NaHCO_3$: | 0.396 mg/ml |
| Wire Dia.: | .5 mm |
| Configuration: | J/J |
| PPM: | 16.1 |
| Zeta: | n/a |

| Set# | Electrode# | Distance "x" in/mm | Voltage |
|---|---|---|---|
| 1 | 1a | 0.25/6.35 | 750 |
| | 5a | N/A | 750 |
| 2 | 5b | N/A | 250 |
| | 5b' | N/A | |

Figure 50A:
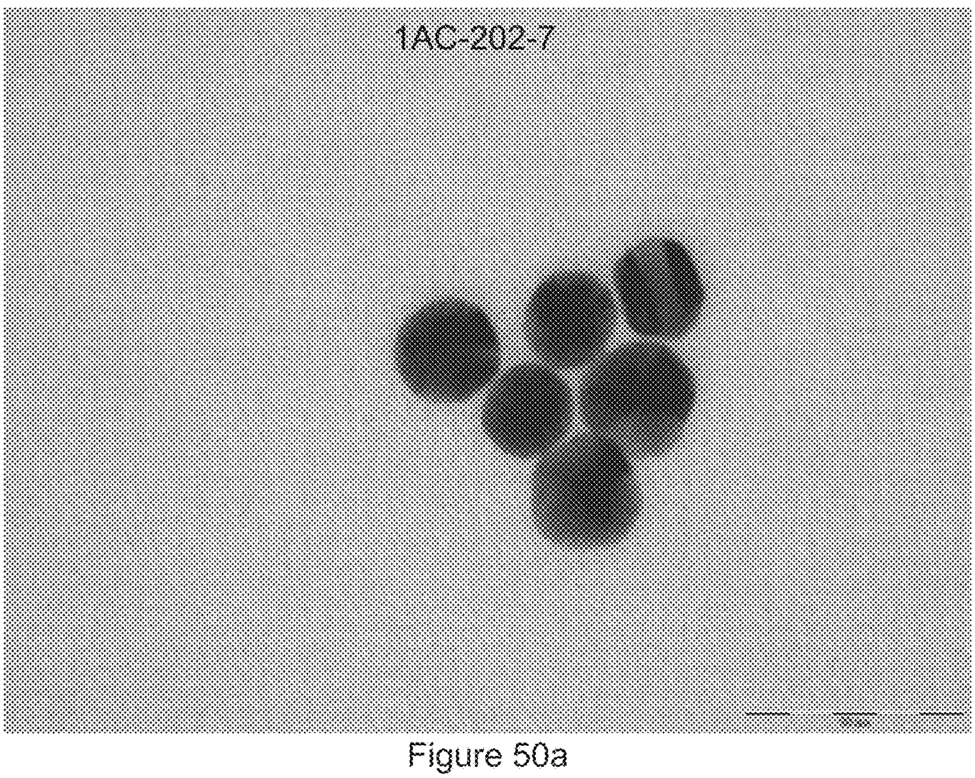
FIG. 50A is a representative TEM photomicrograph of gold nanoparticles from dried solution 1AC-202-7 made according to Example 11.

FIG. 50A shows a representative TEM Photomicrograph of gold crystals, dried from solution, made according to this Example 11.

Figure 50B:
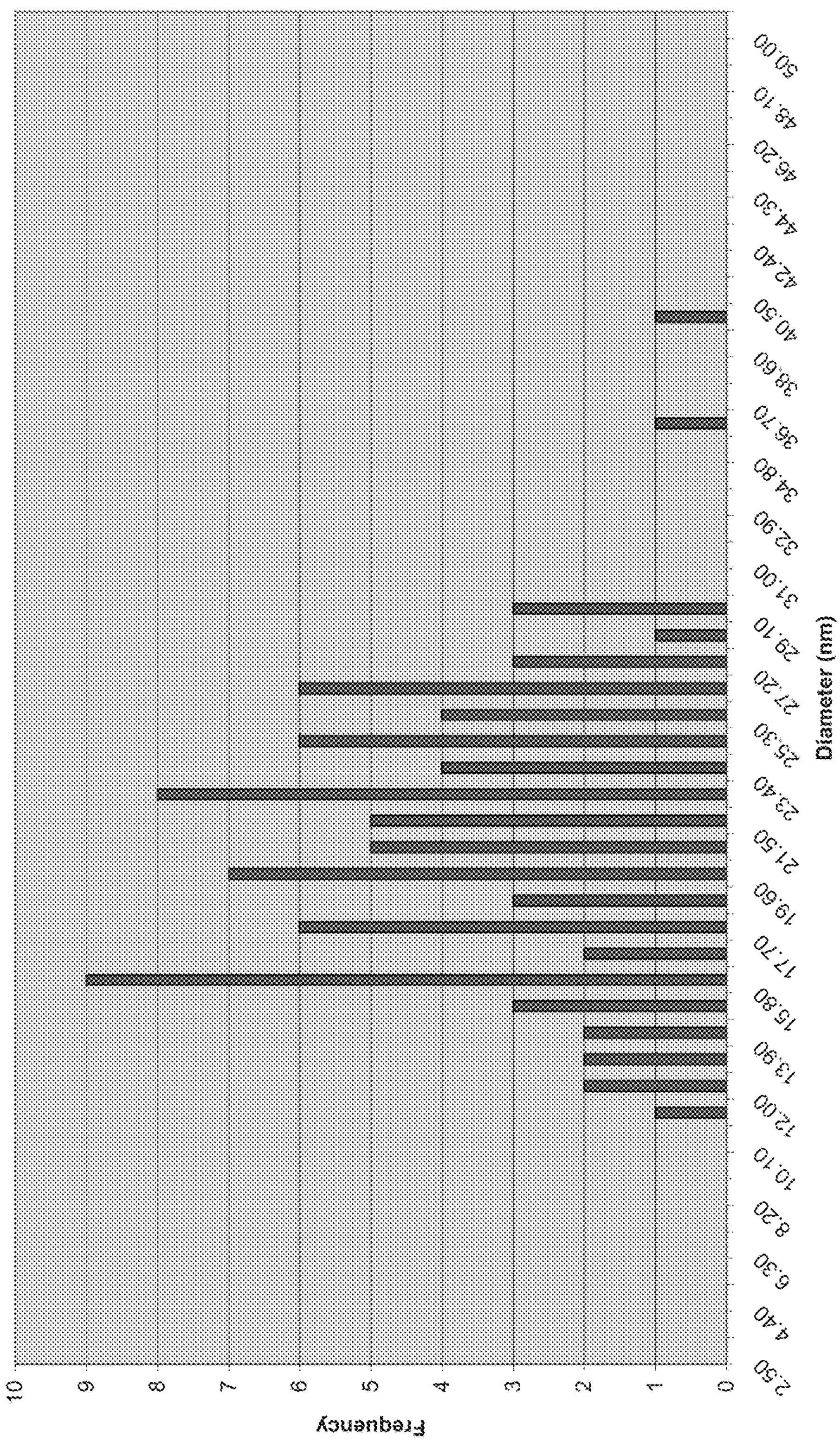
FIG. 50B shows the particle size distribution histogram from TEM measurements for the nanoparticles made according to Example 11.

FIG. 50B shows the particle size distribution histogram based on TEM measurements of the dried gold nanoparticles made according to Example 11.

FIG. 50C shows graphical dynamic light scattering particle size data (i.e., hydrodynamic radii) from this Example 11. Specifically, three representative Viscotek data sets are set forth in this FIG., similar to what is reported elsewhere herein.

It should be noted that the dynamic light scattering particle size information is different from the TEM measured histograms because dynamic light scattering uses algorithms that assume the particles are all spheres (which they are not) as well as measures the hydrodynamic radius (e.g., the particle's influence on the water is also detected and reported in addition to the actual physical radii of the particles). Accordingly, it is not surprising that there is a difference in the reported particle sizes between those reported in the TEM histogram data and those reported in the dynamic light scattering data, just as in the other Examples included herein.

Example 12a

This Example 12a utilized a set of processing conditions similar to those set forth in Examples 5-7. This Example utilized an apparatus similar to those shown in FIGS. 4F, 37A, 38A and 40A. Table 8 sets forth the specific processing conditions of this Example which show the differences between the processing conditions set forth in Examples 5-7. The main differences in this Example includes more processing enhancer added to the liquid 3 and a more rapid liquid 3 input flow rate.

TABLE 8

| 0.528 mg/ml of $NaHCO_3$ (Au) | |
|---|---|
| Run ID: | GD-006 |
| Flow Rate: | 240 ml/min |
| Voltage: | 255 V |
| $NaHCO_3$: | 0.528 mg/ml |
| Wire Dia.: | .5 mm |
| Configuration: | Straight/Straight |
| PPM: | 8.7 |

| Set# | Electrode# | Distance "c-c" in/mm | Distance "x" in/mm | Voltage | cross section |
|---|---|---|---|---|---|
| | | 4.5/114.3* | | | |
| 1 | 1a | | 0.25 | 750 | V |
| | 5a | | N/A | 750 | |
| | | 23/584.2** | | | |
| | | 2.5/63.5* | | | |
| 2 | 5b | | N/A | 255 | |
| | 5b' | | N/A | | |
| | | 8.5/215.9 | | | |
| 3 | 5c | | N/A | 255 | Rectangle |
| | 5c' | | N/A | | 5.25" |
| | | 8.5/215.9 | | | Deep |
| 4 | 5d | | N/A | 255 | |
| | 5d' | | N/A | | |
| | | 8/203.2 | | | |
| 5 | 5e | | N/A | 255 | |
| | 5e' | | N/A | | |
| | | 2/50.8** | | | |
| Output Water Temperature | | | 95 C. | | |

*Distance from water inlet to center of first electrode set

**Distance from center of last electrode set to water outlet

FIG. 52 shows a representative Viscotek output for the solution produced in accordance with Example 12a. The numbers reported correspond to hydrodynamic radii of the particles in the solution.

Example 12b

This Example 12b utilized the solution of Example 12a to manufacture a gel or cream product. Specifically, about 1,300 grams of the solution made according to Example 12a was heated to about 60° C. over a period of about 30 minutes. The GB-139 solution was heated in a 1 liter Pyrex® beaker over a metal hotplate. About 9.5 grams of Carbopol® (ETD 2020, a carbomer manufactured by Noveon, Inc., Cleveland, Ohio) was added slowly to the heated solution, while constantly stirring using a squirrel rotary plastic paint mixer. This mixing occurred for about 20 minutes until large clumps of the Carbopol were dissolved.

About 15 grams of high purity liquid lanolin (Now Personal Care, Bloomingdale, Ill.) was added to the solution and mixed with the aforementioned stirrer.

About 16 grams of high purity jojoba oil were then added and mixed to the solution.

About 16 grams of high purity cocoa butter chunks (Soap Making and Beauty Supplies, North Vancouver, B.C.) were heated in a separate 500 mL Pyrex® beaker and placed on a hotplate until the chunks became liquid and the liquid cocoa butter then was added and mixed to the aforementioned solution.

About 16 grams of potassium hydroxide (18% solution) was then added and mixed together with the aforementioned ingredients to cause the solution to gel. The entire solution was thereafter continuously mixed with the plastic squirrel rotating mixer to result in a cream or gel being formed. During this final mixing of about 15 minutes, additional scent of "tropical island" (2 mL) was added. The result was a pinkish, creamy gel.

Example 13a

This Example 13a utilized the solution made according to Example 7. Specifically, this Example utilized the product of Example 7 to manufacture a gel or cream product. Specifically, about 650 grams of the solution made according to Example 7 was heated to about 60° C. over a period of about 30 minutes. The solution was heated in a 1 liter Pyrex® beaker over a metal hotplate. About 9.6 grams of Carbopol® (ETD 2020, a carbomer manufactured by Noveon, Inc., Cleveland, Ohio) was added slowly to the heated solution, while constantly stirring using a squirrel rotary plastic paint mixer. This mixing occurred for about 20 minutes until large clumps of the carbopol were dissolved.

About 7 grams of high purity liquid lanolin (Now Personal Care, Bloomingdale, Ill.) was added to the solution and mixed with the aforementioned stirrer.

About 8 grams of high purity jojoba oil were then added and mixed to the solution.

About 8 grams of high purity cocoa butter chunks (Soap Making and Beauty Supplies, North Vancouver, B.C.) were heated in a separate 500 mL Pyrex® beaker and placed on a hotplate until the chunks became liquid and the liquid cocoa butter then was added and mixed to the aforementioned solution.

About 45 grams of the liquid contained in Advil® liquid gel caps (e.g., liquid ibuprofen and potassium) was added to, and thoroughly mixed with, the solution.

About 8 grams of potassium hydroxide (18% solution) was then added and mixed in to cause the solution to gel. The entire solution was thereafter continuously mixed with the plastic squirrel rotating mixer to result in a cream or gel being formed. During this final mixing of about 15 minutes, additional scent of "tropical island" (2 mL) was added. The result was a pinkish, creamy gel.

Example 13b

This Example 13b utilized solution equivalent to GB-139 to manufacture a gel or cream product. Specifically, about 650 grams of the solution was heated to about 60° C. over a period of about 30 minutes. The solution was heated in a 1 liter Pyrex® beaker over a metal hotplate. About 6 grams of Carbopol® (ULTREZ10, a carbomer manufactured by Noveon, Inc., Cleveland, Ohio) was added slowly to the heated solution, while constantly stirring using a squirrel rotary plastic paint mixer. This mixing occurred for about 20 minutes until large clumps of the Carbopol were dissolved.

About 7 grams of high purity liquid lanolin (Now Personal Care, Bloomingdale, Ill.) was added to the solution and mixed with the aforementioned stirrer.

About 8 grams of high purity jojoba oil were then added and mixed to the solution.

About 8 grams of high purity cocoa butter chunks (Soap Making and Beauty Supplies, North Vancouver, B.C.) were heated in a separate 500 mL Pyrex® beaker and placed on a hotplate until the chunks became liquid and the liquid cocoa butter then was added and mixed to the aforementioned solution.

About 8 grams of potassium hydroxide (18% solution) was then added and mixed together with the aforementioned ingredients to cause the solution to gel. The entire solution was thereafter continuously mixed with the plastic squirrel rotating mixer to result in a cream or gel being formed. The result was a pinkish, creamy gel.

Example 13c

This Example 13c utilized the solution substantially equivalent to 3AC-021 to manufacture a gel or cream product. Specifically, about 450 grams of the solution was heated to about 60° C. over a period of about 30 minutes. The solution was heated in a 1 liter Pyrex® beaker over a metal hotplate. About 4.5 grams of Carbopol® (ULTREZ10, a carbomer manufactured by Noveon, Inc., Cleveland, Ohio) was added slowly to the heated solution, while constantly stirring using a squirrel rotary plastic paint mixer. This mixing occurred for about 20 minutes until large clumps of the Carbopol were dissolved.

About 6.5 grams of potassium hydroxide (18% solution) was then added and mixed together with the aforementioned ingredients to cause the solution to gel. The entire solution was thereafter continuously mixed with the plastic squirrel rotating mixer to result in a cream or gel being formed. The result was a pinkish, creamy gel.

Example 14

Manufacturing Gold-Based Nanoparticles/Nanoparticle Solutions GB-056

Figure 37A:
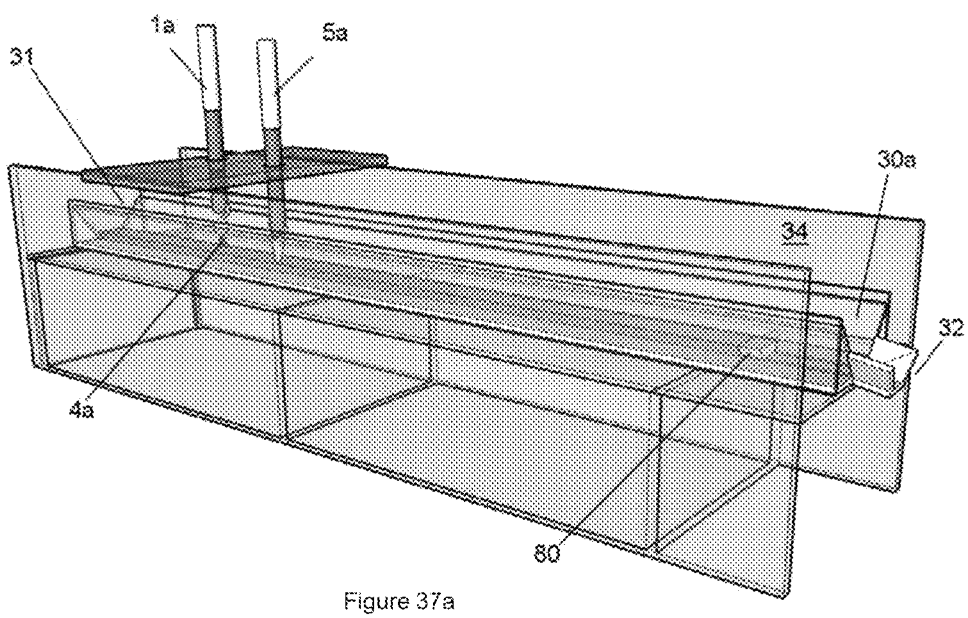
FIGS. 37A and 37B show a first trough member 30*a* wherein one or more plasma(s) 4 is created. The output of this first trough member 30*a* flows into a second trough member 30*b*, as shown in FIGS. 38A and 38B.
Figure 39A:
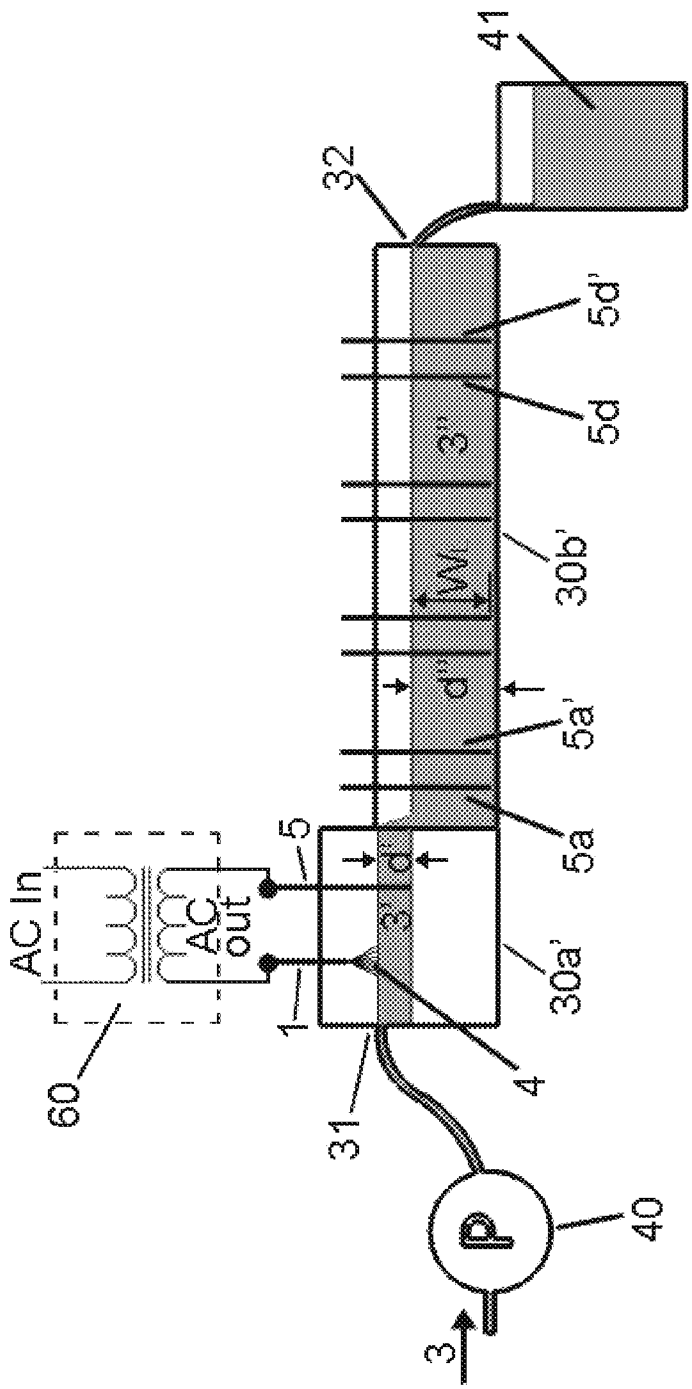
FIGS. 39A-39H are alternatives of the apparatus shown in FIGS. 38A and 38B (again having different electrode 5 wiring arrangements and/or different numbers of electrodes), wherein the trough members 30*a*' and 30*b*' are contiguous.
Figure 39B:
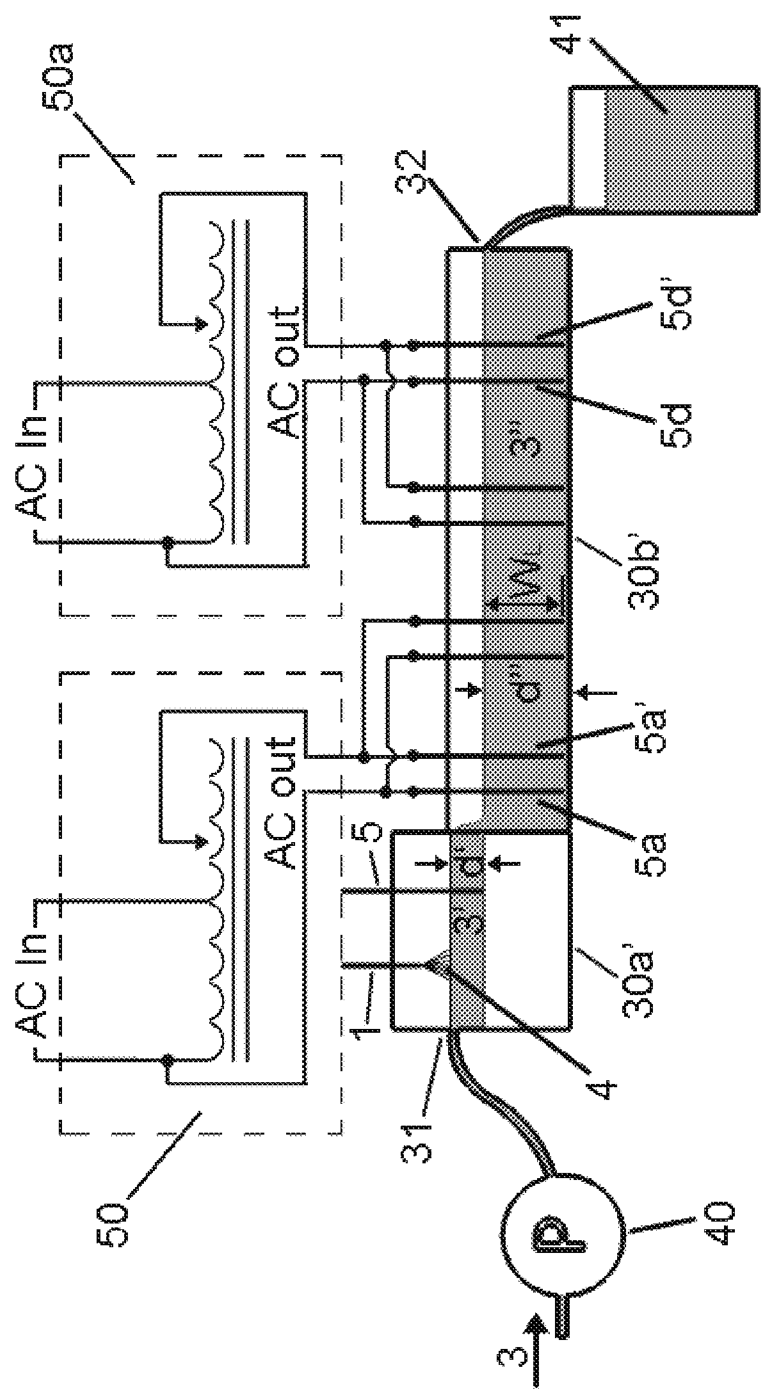
Figure 39C:
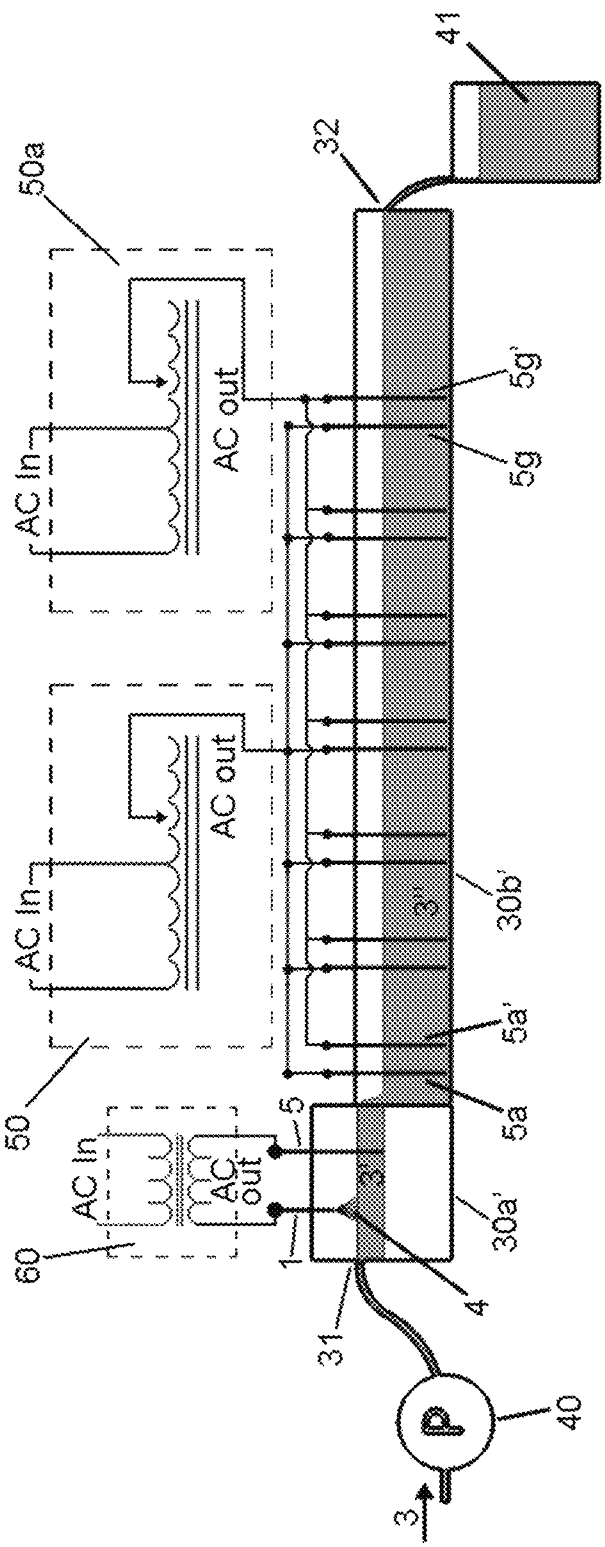
Figure 39D:
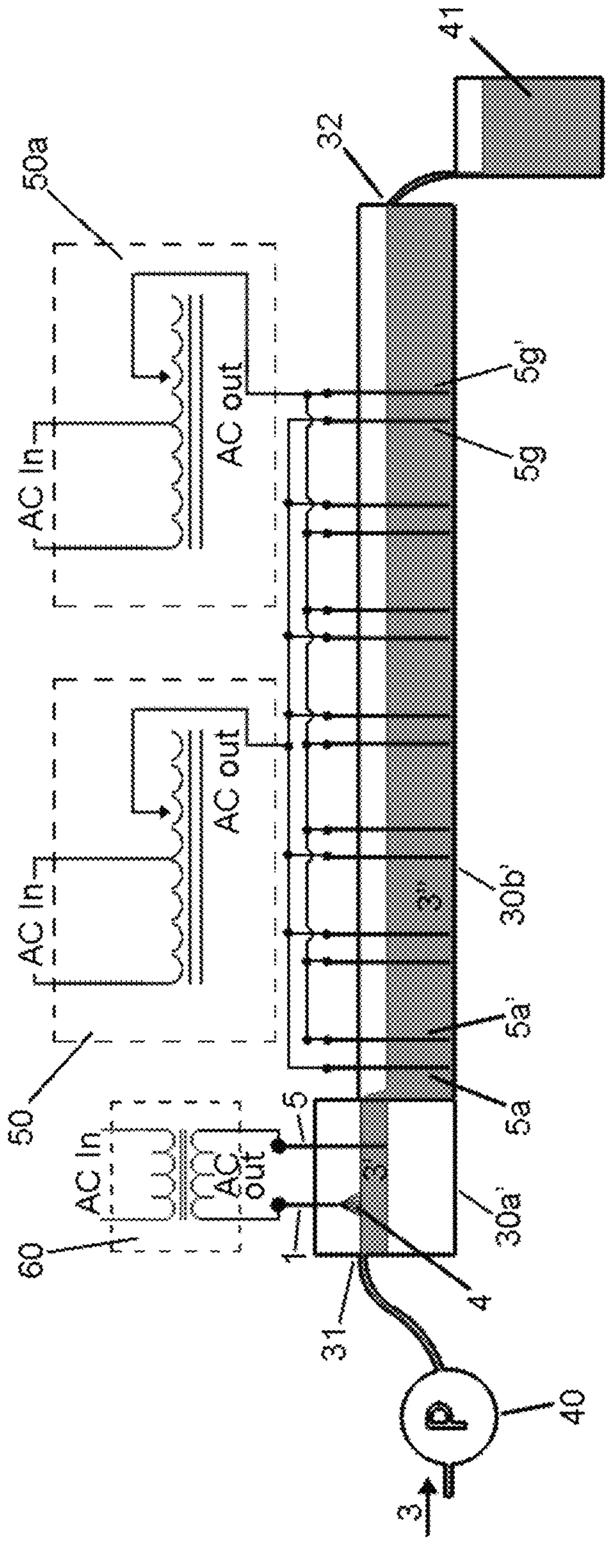
Figure 39E:
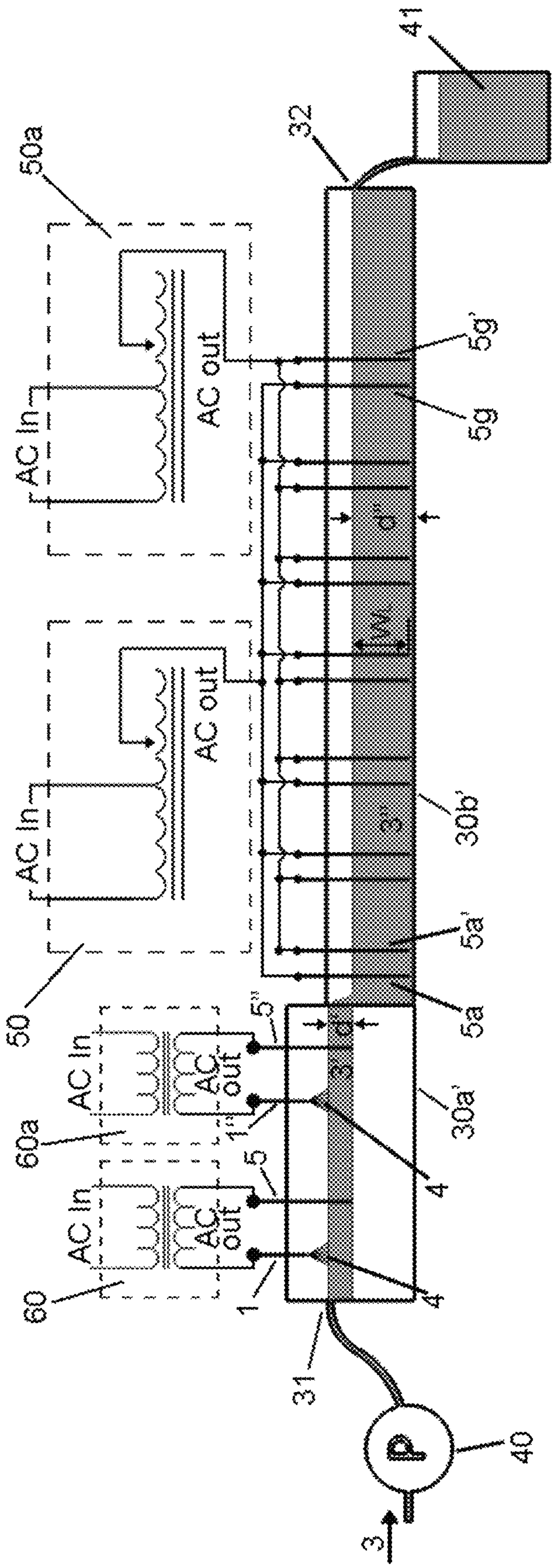
Figure 39F:
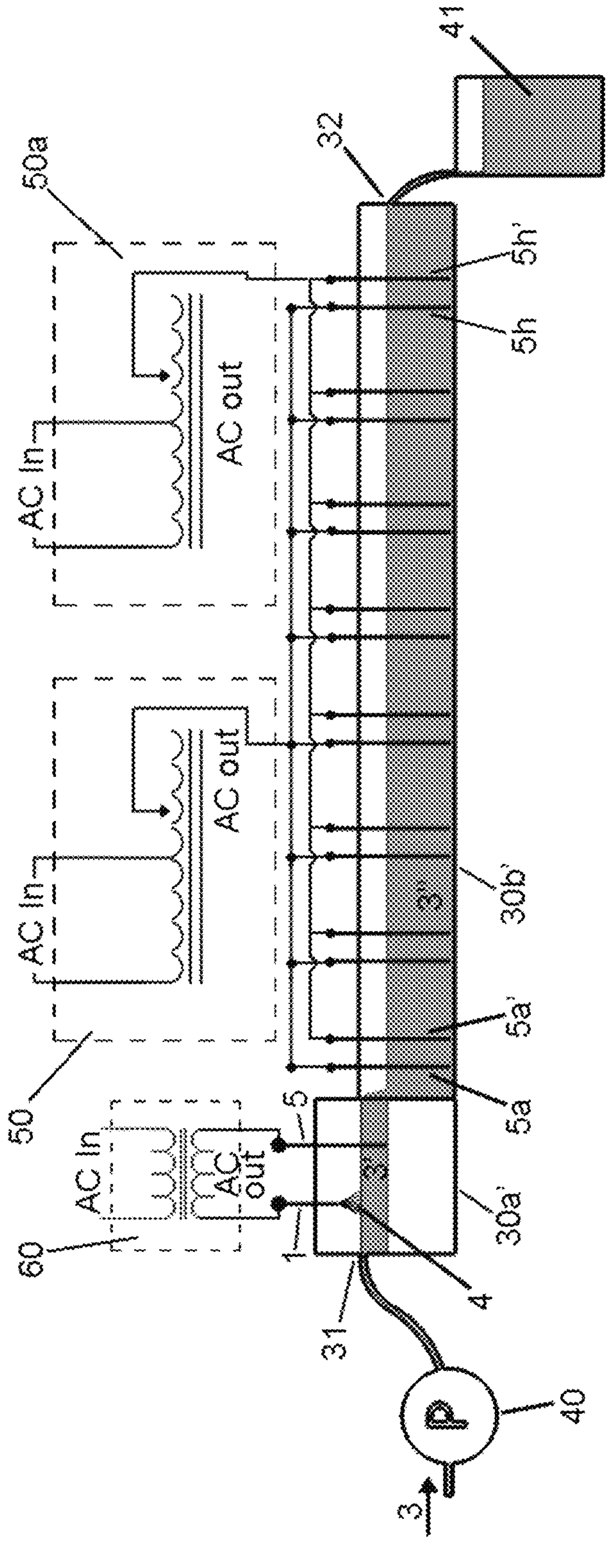
Figure 39G:
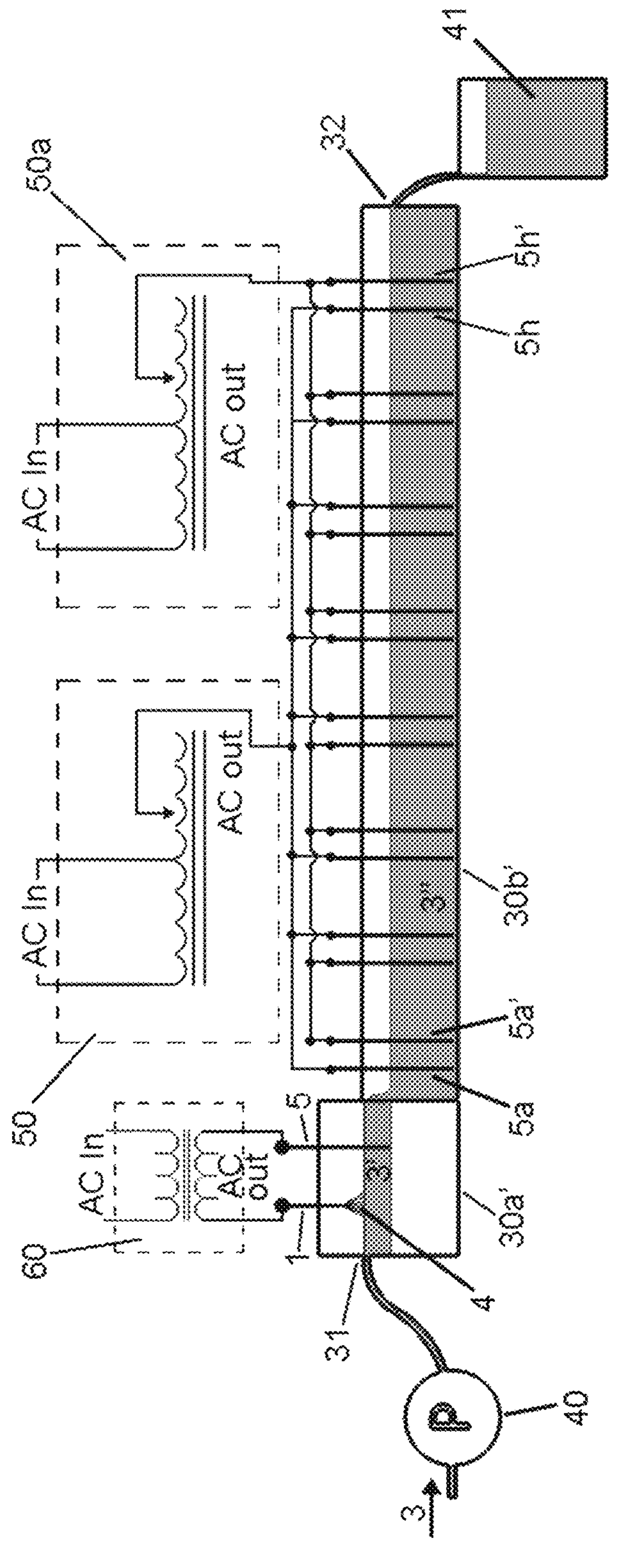
Figure 39H:
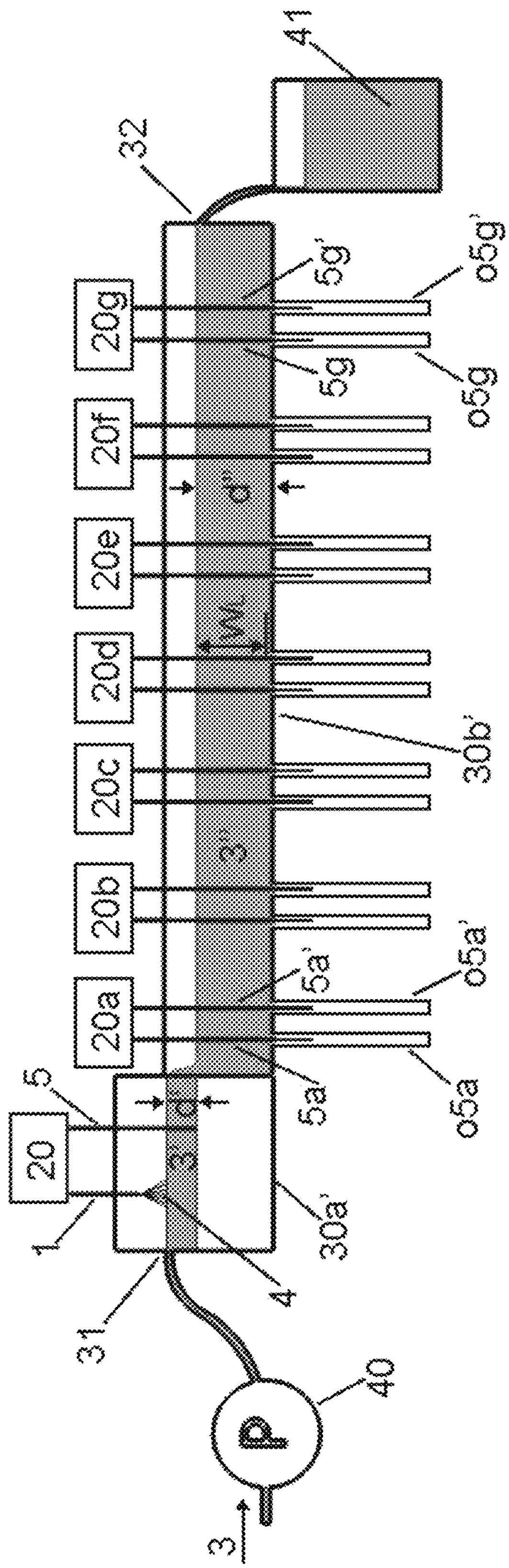

In general, Example 14 utilizes certain embodiments of the invention associated with the apparatuses generally shown in FIGS. 4E, 37A, 39B and 42A. The trough members 30*a* (30*a*') and 30*b* were made from ⅛" (about 3 mm) thick plexiglass, and ¼" (about 6 mm) thick polycarbonate, respectively. The support structure 34 was also made from plexiglass which was about ¼" thick (about 6-7 mm thick). As shown in FIG. 39B, the trough member 30*a* was integrated with trough member 30*b*' and was designated 30*a*' (e.g., no separate pumping means was provided after trough member 30*a*, as in certain previous examples). The cross-sectional shape of the trough member 30*a*' as shown in FIGS. 37A and 39B corresponds to that shape shown in FIG. 10B (i.e., a truncated "V"). The base portion "R" of the truncated "V" measured about 0.5" (about 1 cm), and each side portion "S", "S'" measured about 1.5" (about 3.75 cm). The distance "M" separating the side portions "S", "S'" of the V-shaped trough member 30*a* was about 2¼"-2⁵⁄₁₆" (about 5.9 cm) (measured from inside to inside). The thickness of each sidewall portion also measured about ⅛" (about 3 mm) thick. The longitudinal length "$L_T$" (refer to FIG. 11A) of the V-shaped trough member 30*a*' measured about 1 foot (about 30 cm) long from point 31 to point 32.

Purified water (discussed elsewhere herein) was mixed with about 0.396 g/L of $NaHCO_3$ and was used as the liquid 3 input into trough member 30*a*'. The depth "d" (refer to FIG. 10B) of the liquid 3' in the V-shaped trough member 30*a*' was about 7/16" to about ½" (about 11 mm to about 13 mm) at various points along the trough member 30*a*'. The depth "d" was partially controlled through use of the dam 80 (shown in FIG. 37A). Specifically, the dam 80 was provided near the end 32 and assisted in creating the depth "d" (shown in FIG. 10B) to be about 7/16"-½" (about 11-13 mm) in depth. The height "j" of the dam 80 measured about ¼" (about 6 mm) and the longitudinal length "k" measured about ½" (about 13 mm) The width (not shown) was completely across the bottom dimension "R" of the trough member 30*a*'. Accordingly, the total volume of liquid 3' in the V-shaped trough member 30*a*' during operation thereof was about 2.14 $in^3$ (about 35 ml).

The rate of flow of the liquid 3' into the trough member 30*a*' was about 150 ml/minute and the rate of flow out of the trough member 30*b*' at the point 32 was about 110 ml/minute (i.e., due to evaporation). Such flow of liquid 3' was obtained by utilizing a Masterflex® L/S pump drive 40 rated at 0.1 horsepower, 10-600 rpm. The model number of the Masterflex® pump 40 was 77300-40. The pump drive had a pump head also made by Masterflex® known as Easy-Load Model No. 7518-10. In general terms, the head for the pump 40 is known as a peristaltic head. The pump 40 and head were controlled by a Masterflex® LS Digital Modular Drive. The model number for the Digital Modular Drive is 77300-80. The precise settings on the Digital Modular Drive were, for example, 150 milliliters per minute. Tygon® tubing having a diameter of ¼" (i.e., size 06419-25) was placed into the peristaltic head. The tubing was made by Saint Gobain for Masterflex®. One end of the tubing was delivered to a first end 31 of the trough member 30'*a* by a flow diffusion means located therein. The flow diffusion means tended to minimize disturbance and bubbles in water 3 introduced into the trough member 30*a*' as well as any pulsing condition generated by the peristaltic pump 40. In this regard, a small reservoir served as the diffusion means and was provided at a point vertically above the end 31 of the trough member 30*a*' such that when the reservoir overflowed, a relatively steady flow of liquid 3' into the end 31 of the V-shaped trough member 30*a*' occurred.

There was a single electrode set 1*a*/5*a* utilized in this Example 14. The plasma 4 was created with an electrode 1 similar in shape to that shown in FIG. 5E, and weighed about 9.2 grams. This electrode was 99.95% pure gold. The other electrode 5*a* comprised a right-triangular shaped platinum plate measuring about 14 mm×23 mm×27 mm and about 1 mm thick and having about 9 mm submerged in the liquid 3'. All other pertinent run conditions are shown in Table 10.

As shown in FIG. 39B, the output from the trough member 30*a*' was the conditioned liquid 3' and this conditioned liquid 3' flowed directly into a second trough member 30*b*'. The second trough member 30*b*', shown in FIG. 41A measured about 3.75 inches high, about 3.75 inches wide at the end 32 thereof, and about 1 inch wide at the end 31 thereof. This trough member 30*b*' contained about 1450 ml of liquid 3" therein which was about 2.5 inches deep. In this Example, each of four electrode sets 5*b*, 5*b*'-5*e*, 5*e*' comprised 99.95% pure gold wire measuring about 0.5 mm in diameter. The length of each wire 5 measured about 5 inches (about 12 cm) long. The liquid 3" was about 2.5 inches deep (about 6 cm) with about 4.25 inches (about 11 cm) of the j-shaped wire being submerged therein. Each electrode set 5*b*, 5*b*'-5*e*, 5*e*' was shaped like a "J", as shown in FIG. 4E. The distance "g" shown in FIG. 4E measured about 1-8 mm.

With regard to FIGS. 39B and 41A, 4 separate electrode sets (Set 2, Set 3, Set 4 and Set 5) were attached to 2 separate transformer devices, 50 and 50*a* as shown in FIG. 39B. Specifically, transformers 50 and 50*a* were electrically connected to each electrode set, according to the wiring diagram show in FIG. 19A. Each transformer device 50, 50*a* was connected to a separate AC input line that was 120° out of phase relative to each other. The transformers 50 and 50*a* were electrically connected in a manner so as not to overload a single electrical circuit and cause, for example, an upstream circuit breaker to disengage (e.g., when utilized under these conditions, a single transformer 50/50*a* could draw sufficient current to cause upstream electrical problems). Each transformer 50/50*a* was a variable AC transformer constructed of a single coil/winding of wire. This winding acts as part of both the primary and secondary winding. The input voltage was applied across a fixed portion of the winding. The output voltage was taken between one end of the winding and another connection along the winding. By exposing part of the winding and making the secondary connection using a sliding brush, a continuously variable ratio was obtained. The ratio of output to input voltages is equal to the ratio of the number of turns of the winding they connect to. Specifically, each transformer was a Mastech TDGC2-5kVA, 10A Voltage Regulator, Output 0-250V.

Table 10 refers to each of the 4 electrode sets by "Set #". Each electrode of the 4 electrode sets was set to operate within a specific voltage range. The actual voltages, listed in Table 10, were about 255 volts. The distance "c-c" (with reference to FIG. 14) from the centerline of each electrode set to the adjacent electrode set is also represented. Further, the distance "x" associated with the electrode 1 utilized is also reported. For the electrode 5, no distance "x" is reported. Other relevant parameters are reported in Table 10.

All materials for the electrodes 1/5 were obtained from ESPI having an address of 1050 Benson Way, Ashland, Oreg. 97520.

TABLE 10

0.396 mg/ml of $NaHCO_3$ (Au)

| | |
|---|---|
| Run ID: | GB-056 |
| Flow Rate: | 150 ml/min |
| Voltage: | 255 V |
| $NaHCO_3$: | 0.396 mg/ml |
| Wire Dia.: | .5 mm |
| Configuration: | J/J |
| PPM: | 12 |

| Set# | Electrode# | Distance "c-c" in/mm | Distance "x" in/mm | Voltage | cross section |
|---|---|---|---|---|---|
| | | 4.5/114.3* | | | |
| 1 | 1a | | 0.25/6.35 | 750 | V |
| | 5a | | N/A | 750 | |
| | | 23/584.2** | | | |
| | | 2.5/63.5* | | | |
| 2 | 5b | | N/A | 255 | |
| | 5b' | | N/A | | |
| | | 3.5/88.9 | | | |

TABLE 10-continued

| 0.396 mg/ml of $NaHCO_3$ (Au) | | | | | |
|---|---|---|---|---|---|
| 3 | 5c | | N/A | 255 | |
| | 5c' | | N/A | | |
| | | 3.5/88.9 | | | Tapered 3"Deep |
| 4 | 5d | | N/A | 255 | |
| | 5d' | N/A | | | |
| | | 3.5/88.9 | | | |
| 5 | 5e | | N/A | 255 | |
| | 5e' | | N/A | | |
| | | 376.2** | | | |
| Output Water Temperature | | | | 98 C. | |

*Distance from water inlet to center of first electrode set

**Distance from center of last electrode set to water outlet

FIGS. 53A-53E show five representative TEM photomicrographs of the gold nanoparticles, dried from the solution/colloid GB-056, formed according to Example 14.

Figure 54:
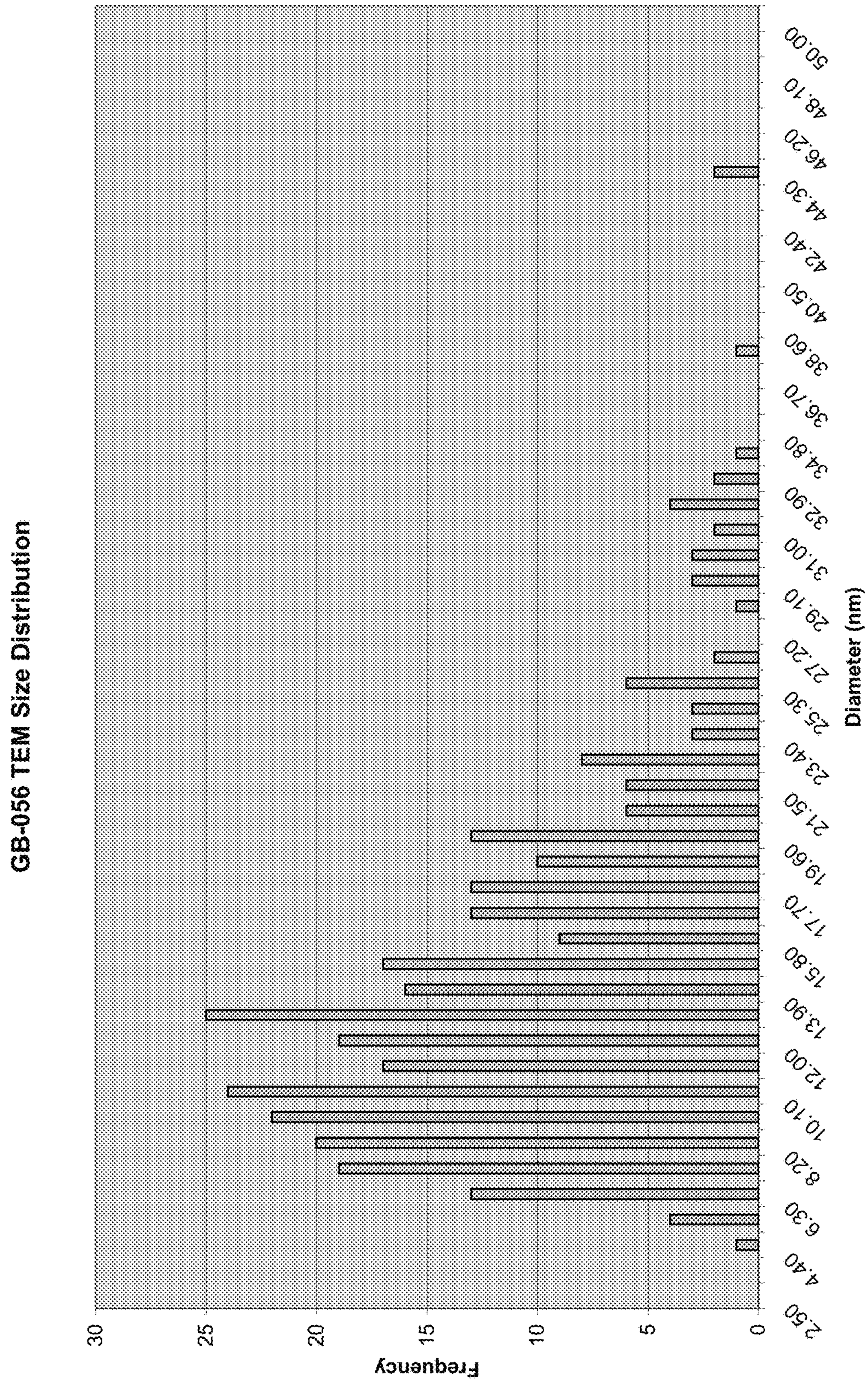
FIG. 54 shows the particle size distribution histogram from TEM measurements for the gold nanoparticles made according to Example 14.
Figure 56A:
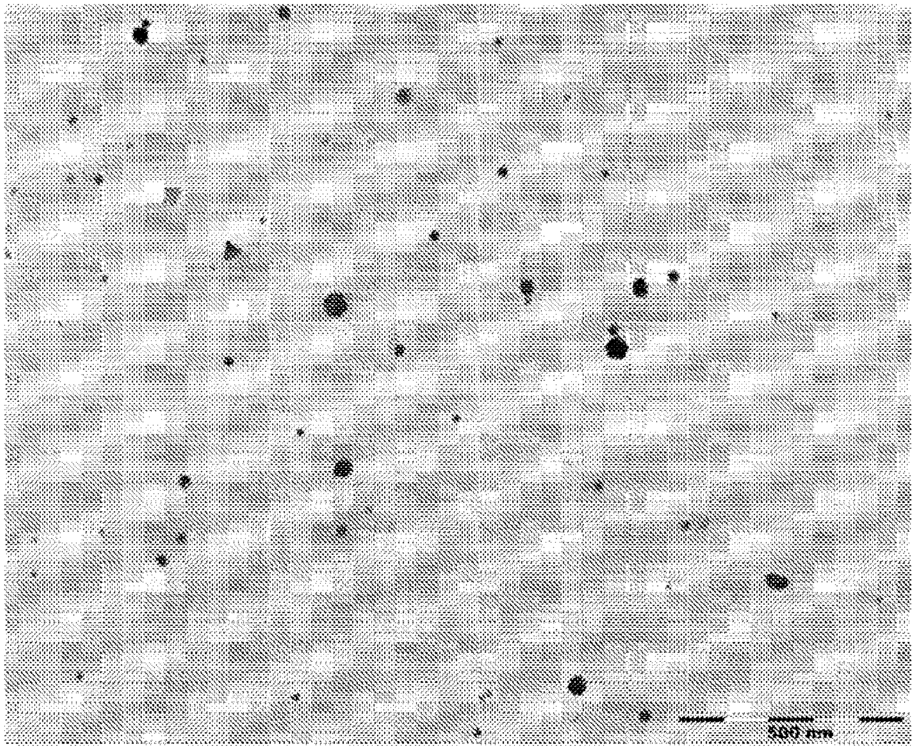
FIGS. 56AA-68AA and FIGS. 56AB-68AB show two representative TEM photomicrographs for dried samples GB-098, GB-113, GB-118, GB-120, GB-123, GB-139, GB-141, GB-144, GB-079, GB-089, GB-062, GB-076 and GB-077, respectively.
Figure 56A:
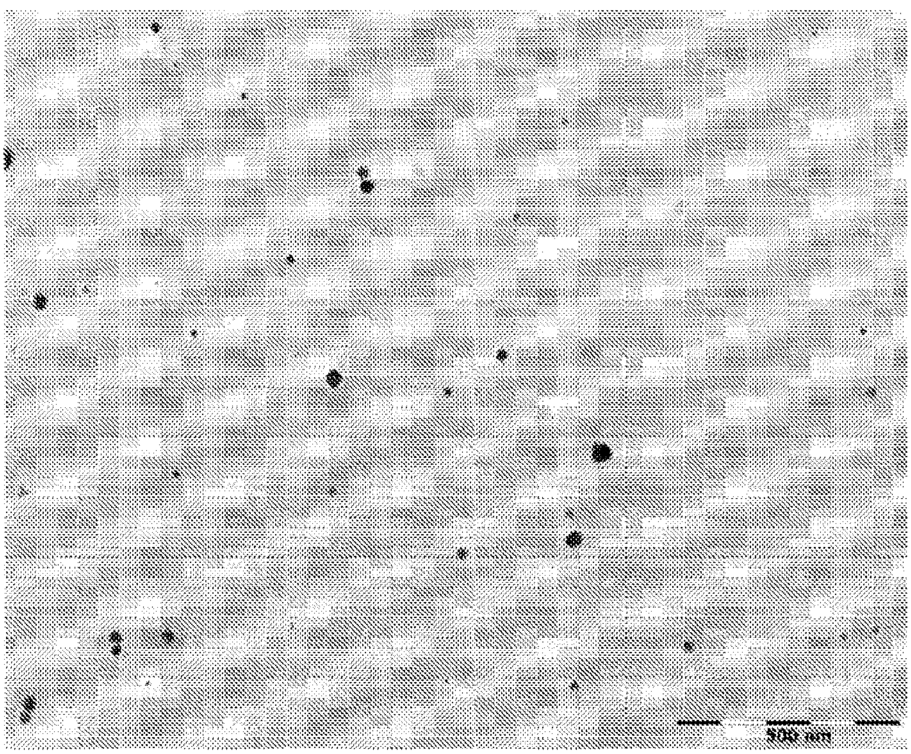
Figure 56B:
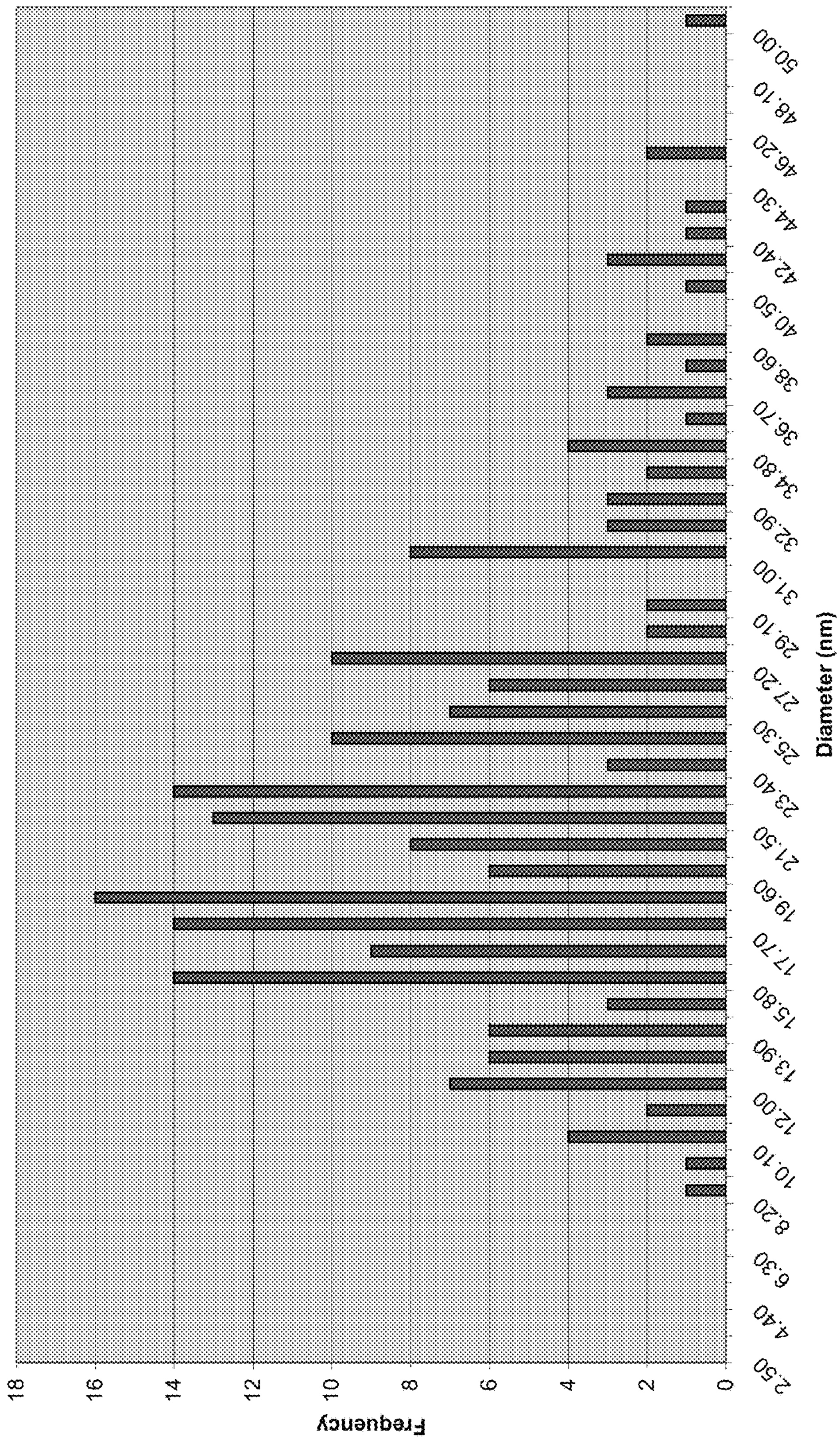
Figure 57A:
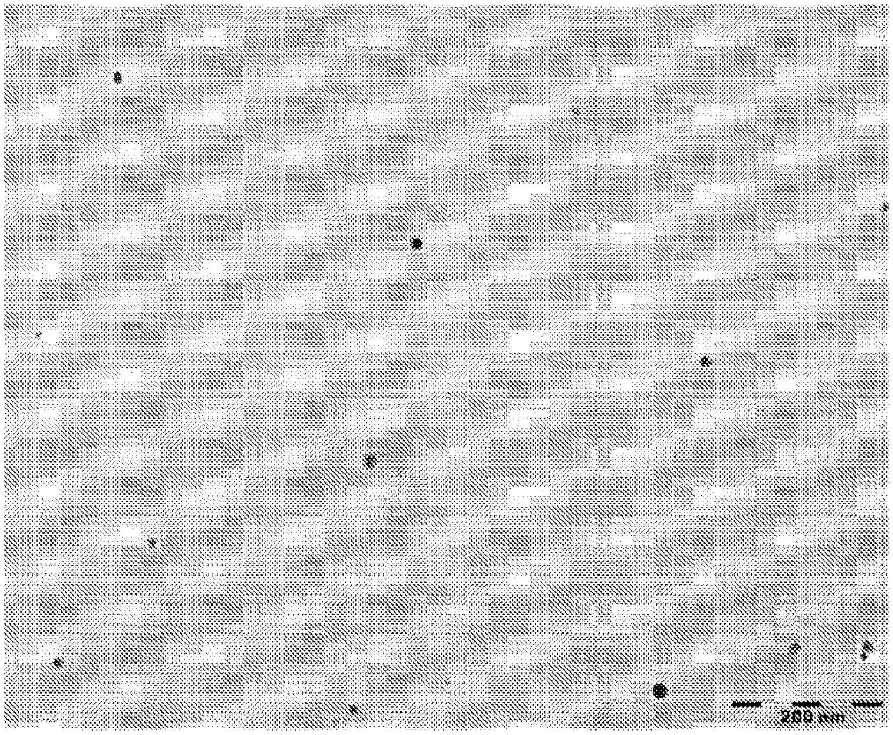
Figure 57A:
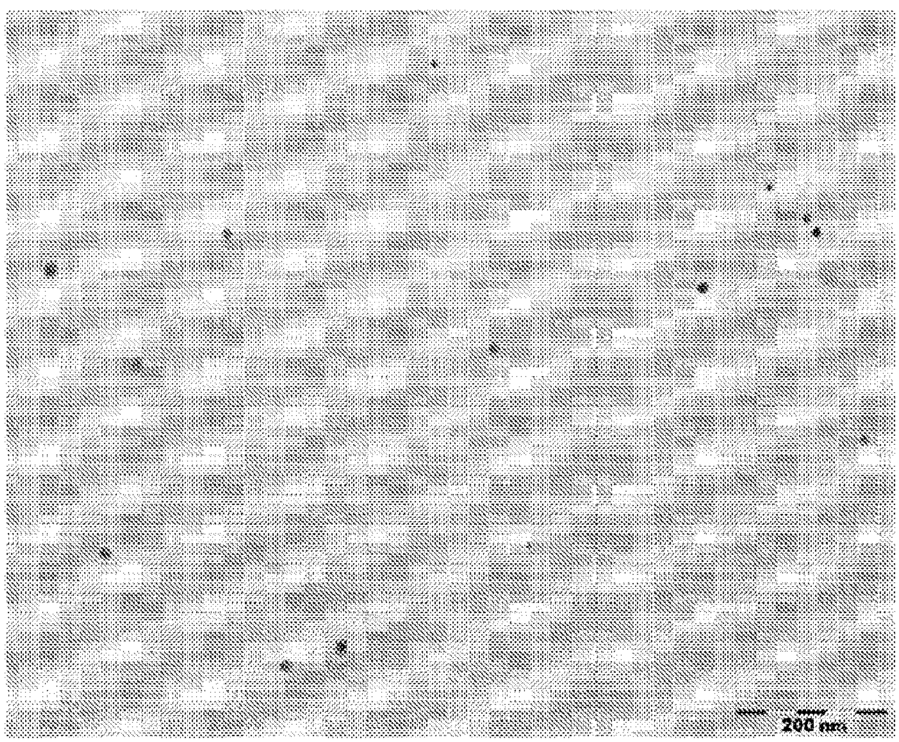
Figure 57B:
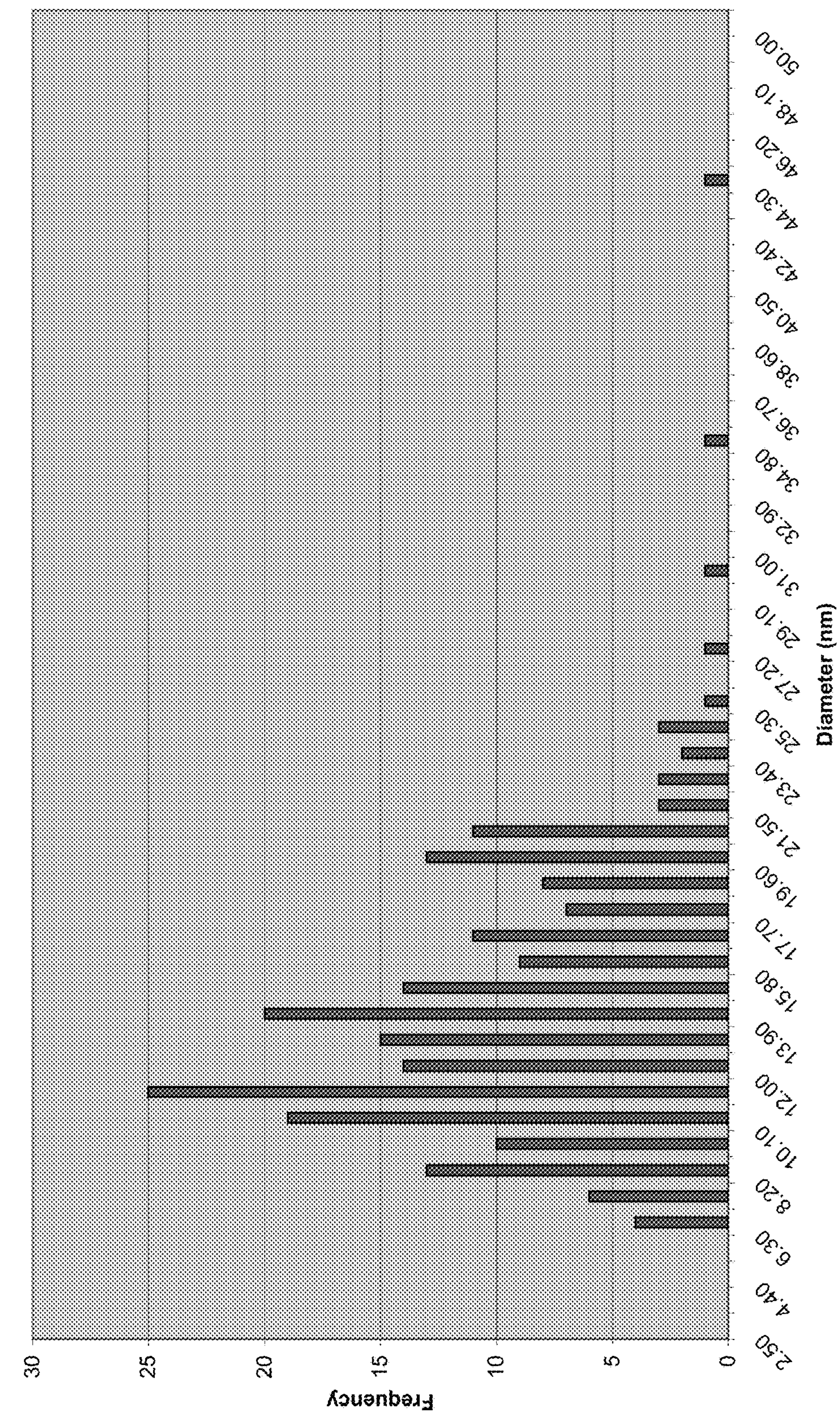
Figure 58A:
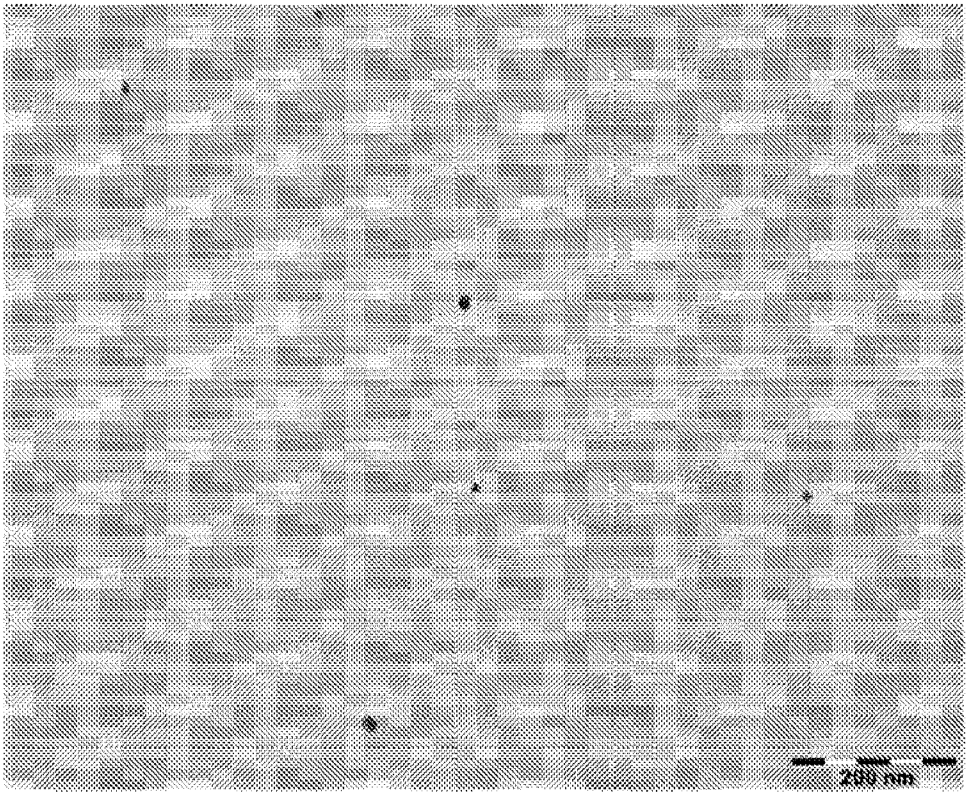
Figure 58A:
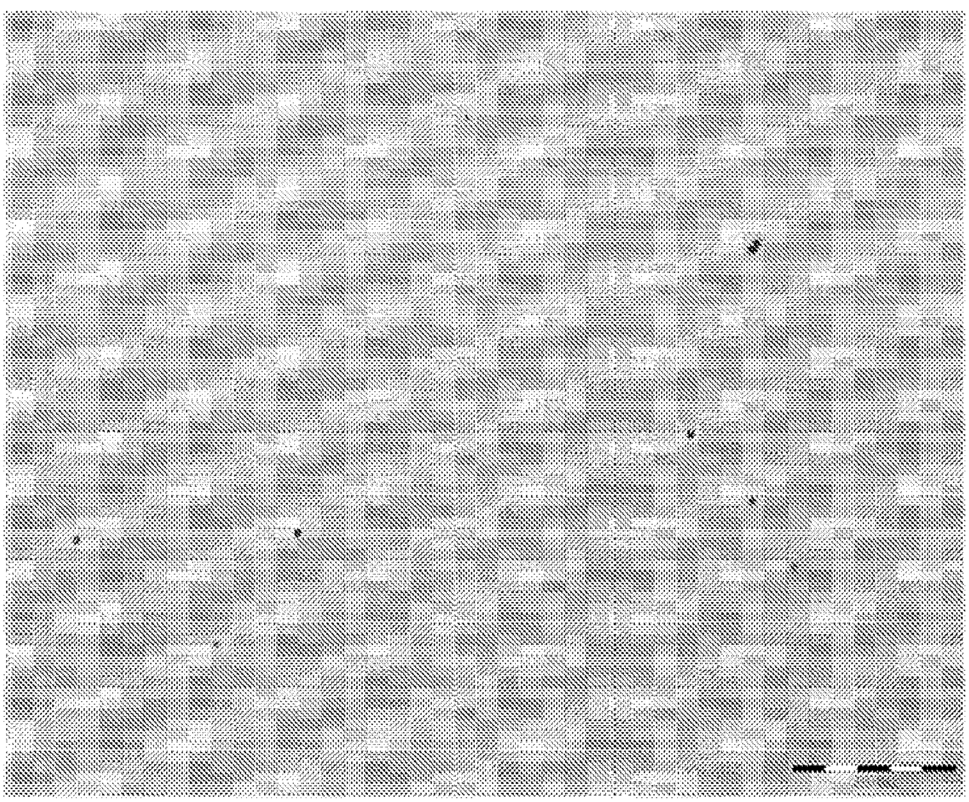
Figure 58B:
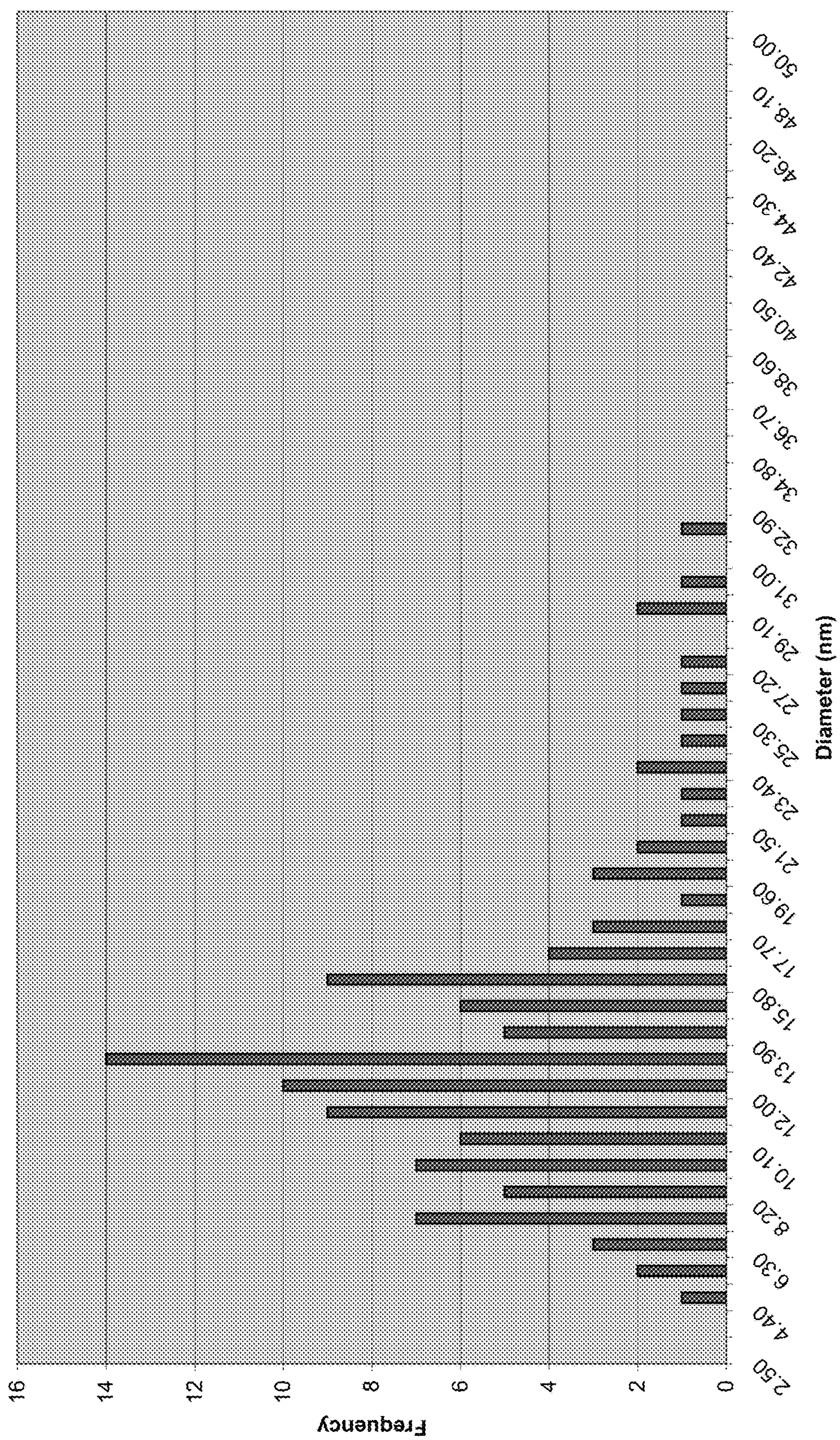
Figure 59A:
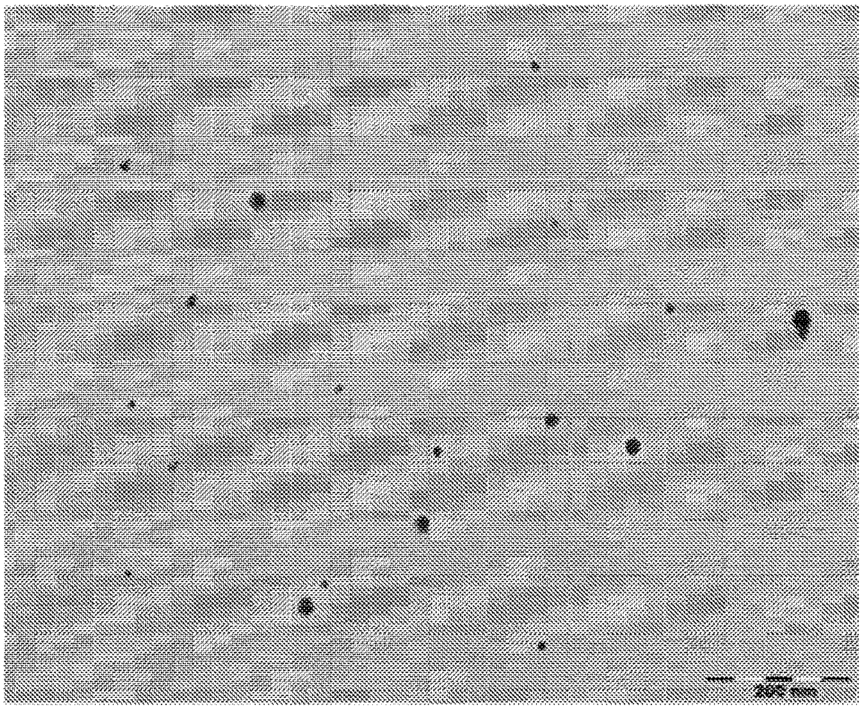
Figure 59A:
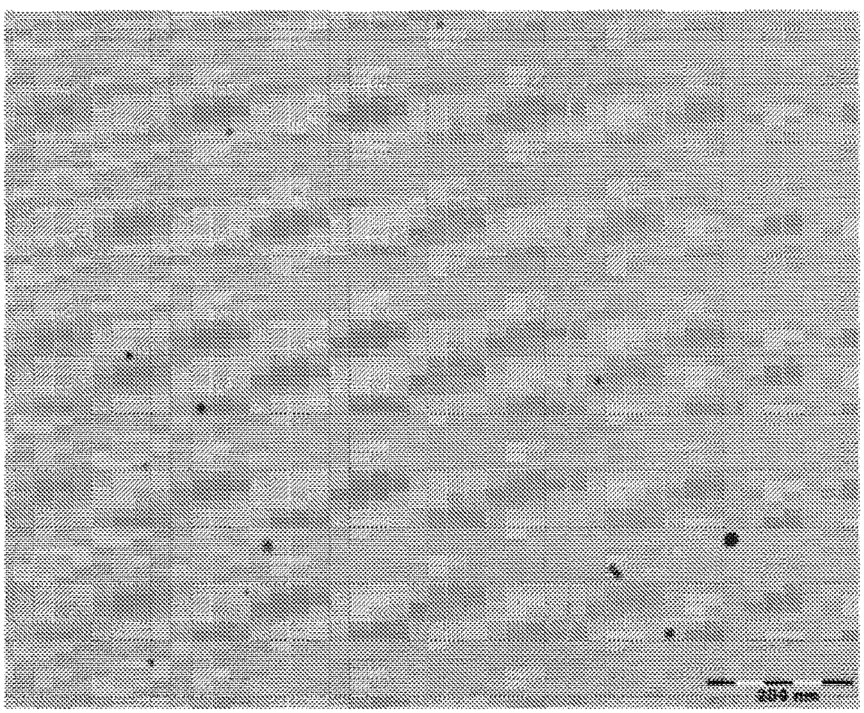
Figure 59B:
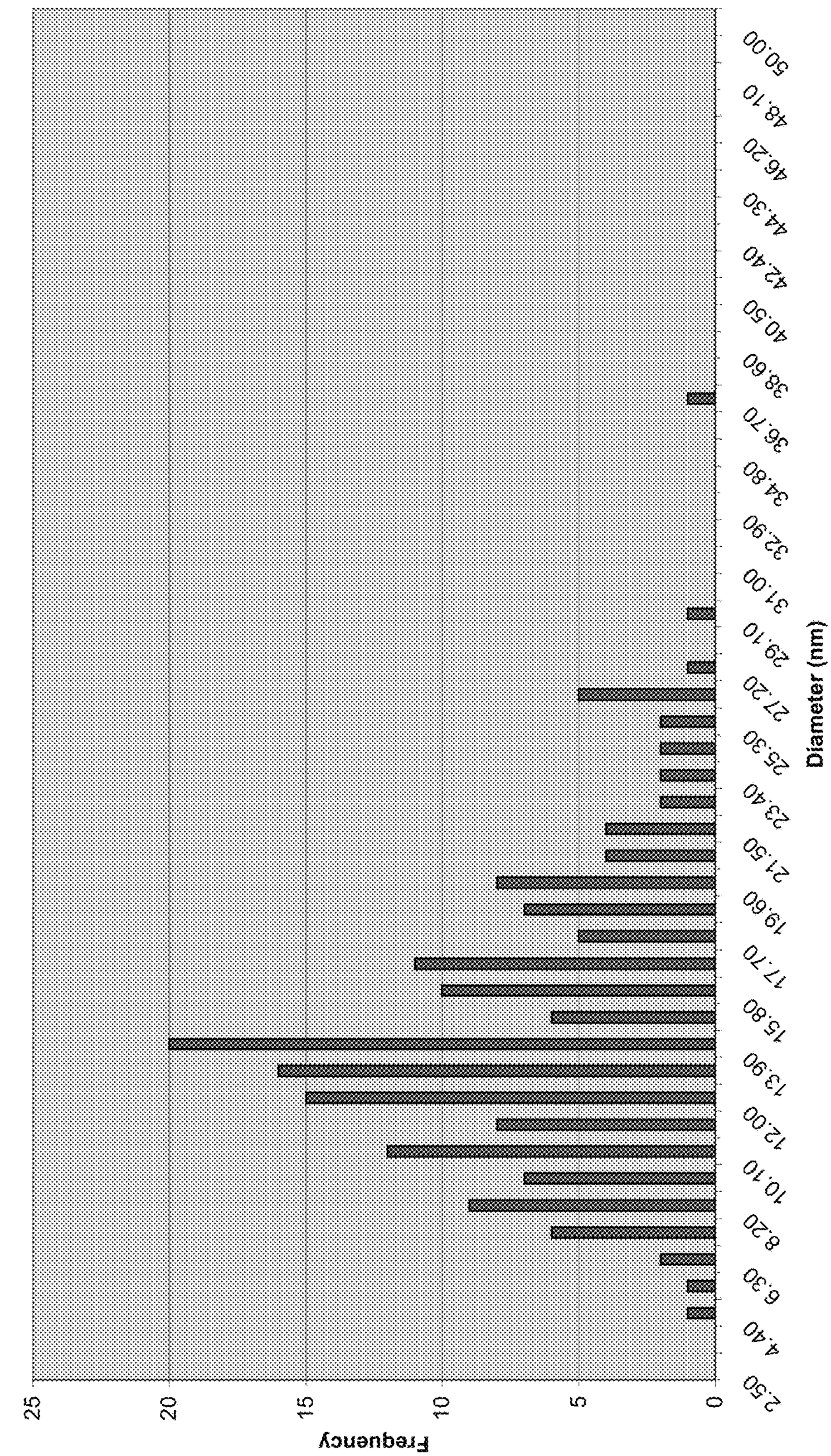
Figure 60A:
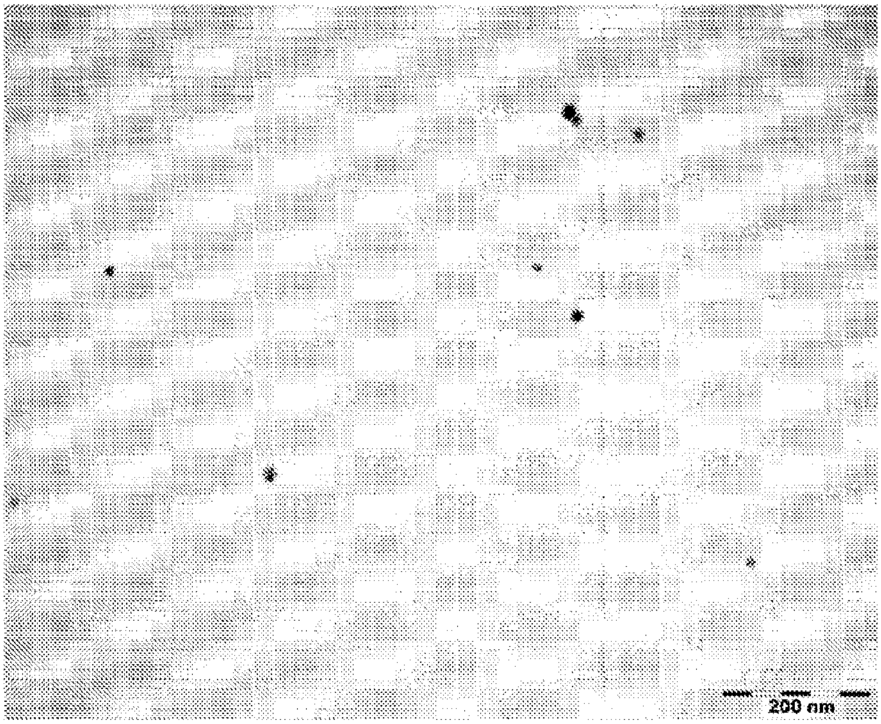
Figure 60A:
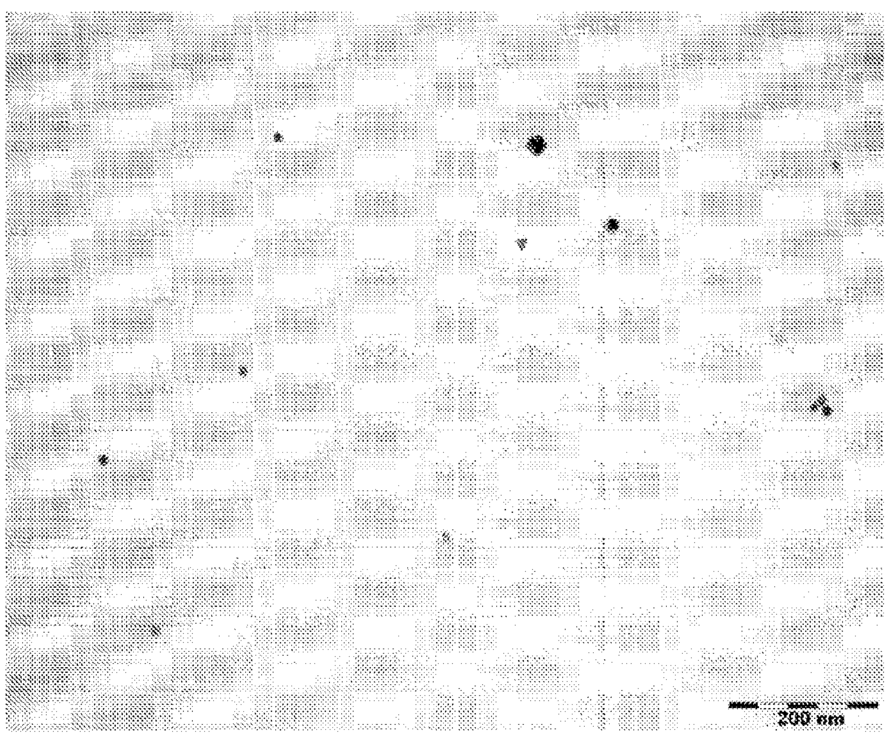
Figure 60B:
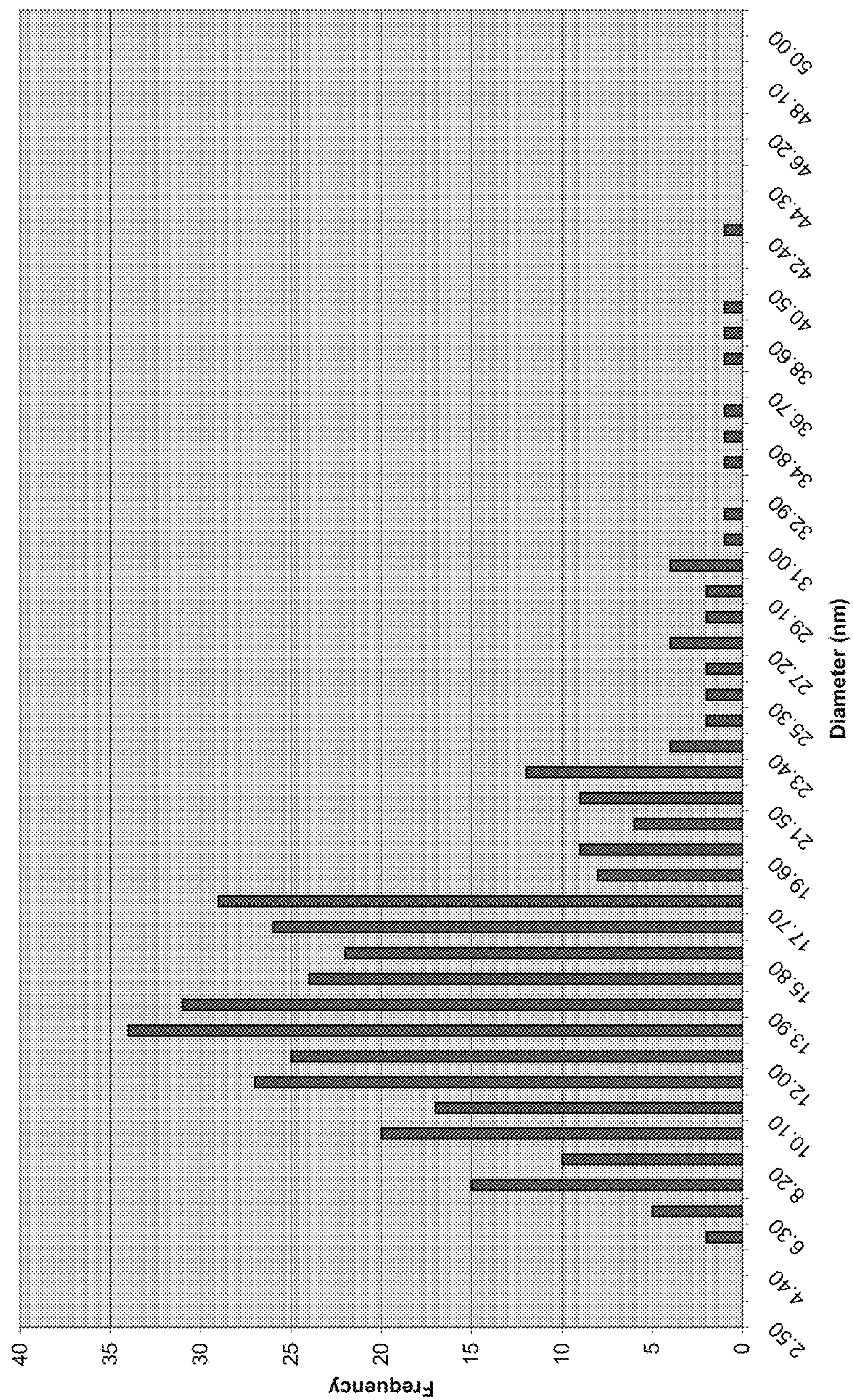

FIG. 54 shows the measured size distribution of the gold particles dried from the solution/colloid measured by using the TEM instrument/software discussed earlier in Examples 5-7.

FIG. 55 shows graphically three dynamic light scattering data measurement sets for the nanoparticles (i.e., the hydrodynamic radii) made according to this Example 14. It should be noted that the dynamic light scattering particle size information is different from the TEM measured histograms because dynamic light scattering uses algorithms that assume the particles are all spheres (which they are not) as well as measures the hydrodynamic radius (e.g., the particle's influence on the water is also detected and reported in addition to the actual physical radii of the particles). Accordingly, it is not surprising that there is a difference in the reported particle sizes between those reported in the TEM histogram data of those reported in the dynamic light scattering data just as in the other Examples included herein.

Example 15

Manufacturing Gold-Based Nanoparticles/Nanoparticle Solutions (GB-098, GB-113 and GB-118); (GB-120 and GB-123); (GB-139); (GB-141 and GB-144); (GB-079, GB-089 and GB-062); and (GB-076 and GB-077)

In general, Example 15 utilizes certain embodiments of the invention associated with the apparatuses generally shown in FIGS. 39C-39H, 40B-40G and 41B. Additionally, Table 12 summarizes key processing parameters used in conjunction with FIGS. 39C-39H, 40B-40G and 41B. Also, Table 12 discloses: 1) resultant "ppm" (i.e., gold nanoparticle concentrations), 2) a single number for "Hydrodynamic Radii" taken from the average of the three highest amplitude peaks shown in each of FIGS. 56C-68C (discussed later herein) and 3) "TEM Average Diameter" which is the mode corresponding to the particle diameter that occurs most frequently, determined by TEM histogram graphs shown in FIGS. 56B-68B. These physical characterizations were performed as discussed elsewhere herein.

TABLE 12

| Run ID: | | GB-098 | GB-113 | GB-118 | GB-120 | GB-123 | GB-139 | GB-141 |
|---|---|---|---|---|---|---|---|---|
| Flow | In (ml/min) | 150 | 150 | 150 | 150 | 150 | 150 | 150 |
| Rate: | Out (ml/min) | 110 | 110 | 110 | 110 | 110 | 110 | 110 |
| Volts: | Set # 1 | 750 | 750 | 750 | 750 | 750 | 750 | 750 |
| | Set # 2 | 297 | 300 | 300 | 300 | 300 | 300 | 299 |
| | Set #'s 3-9 | 297 | 300 | 300 | 300 | 300 | 300 | 299 |
| PE: NaHCO3 (mg/ml) | | 0.40 | 0.53 | 0.53 | 0.53 | 0.53 | 0.53 | 0.53 |
| Wire Diameter (mm) | | 1.0 | 1.0 | 1.0 | 1.0 | 1.0 | 1.0 | 1.0 |
| Contact "$W_L$" (in/mm) | | 1/25 | 0.5/13 | 0.5/13 | 0.5/13 | 0.5/13 | 0.75/19 | 0.5/13 |
| Electrode Config. Figure | | 4f | 4f | 4g | 4f | 4f | 28m | 28m |
| Produced Au PPM | | 8.0 | 10.3 | 9.3 | 10.4 | 10.1 | 10.0 | 10.1 |
| Output Temp ° C. at 32 | | 93 | 88 | 86 | 84 | 93 | 87 | 86 |
| Dimensions | Plasma 4 Figs. | 37a | 37a | 37a | 37a | 37a | 37a | 37a |
| | Process Figures | 39f, 40b | 39f, 40b | 39f, 40b | 39g, 40d | 39g, 40d | 39c, 39h 40e, 40f, 40g | 39c, 39h 40e, 40f, 40g |
| | M1 (in/mm) | 1/25 | 2/51 | 2/51 | 3.5/89 | 2/51 | 2/51 | 2/51 |
| | M2 (in/mm) | n/a | n/a | n/a | n/a | n/a | n/a | n/a |
| | $L_{T\ (in/mm)}$ | 48/1219 | 36/914 | 36/914 | 36/914 | 36/914 | 36/914 | 36/914 |
| | d (in/mm) | 1/25 | 0.5/13 | 0.5/13 | 0.5/13 | 0.5/13 | 0.75/19 | 0.5/13 |
| | S (in/mm) | 3/76.2 | 5 | 5 | 2.5/63.5 | 2.5/63.5 | 1.5/38.1 | 1.5/38.1 |
| Electrode Curr. (A) | | 0.53 | 0.53 | 0.52 | 0.51 | 0.48 | FIG. 61d | FIG. 62d |
| Total Curr. Draw (A) | | n/a | n/a | n/a | n/a | n/a | n/a | n/a |
| Hydrodynamic r (nm) | | 20.03 | 12.5 | 12.5 | 12.93 | 13.27 | 16.3 | 13.33 |
| TEM Avg. Dia. (nm) | | 18.65 | 13.2 | 12.95 | 13.9 | 12.95 | 13.9 | 12.95 |
| | "c-c" (mm) | 83 | 83 | 83 | 83 | 83 | 83 | n/a |
| Set | electrode # | 1a | 1a | 1a | 1a | 1a | 1a | n/a |
| 1 | "x" (in/mm) | 0.25/6.4 | 0.25/6.4 | 0.25/6.4 | 0.25/6.4 | 0.25/6.4 | 0.25/6.4 | n/a |
| | electrode # | 5a | 5a | 5a | 5a | 5a | 5a | n/a |
| | "c-c" (mm) | 83 | 89 | 89 | 89 | 89 | 83 | 83 |
| Set | electrode # | 5b | 5b | 5b | 5b | 5b | 5b | 5b |
| 2 | "x" (in/mm) | n/a | n/a | n/a | n/a | n/a | n/a | n/a |
| | electrode # | 5b' | 5b' | 5b' | 5b' | 5b' | 5b' | 5b' |
| | "c-c" (mm) | 76 | 59 | 56 | 57 | 38 | 76 | 76 |
| Set | electrode # | 5c | 5c | 5c | 5c | 5c | 5c | 5c |
| 3 | electrode # | 5c' | 5c' | 5c' | 5c' | 5c' | 5c' | 5c' |
| | "c-c" (mm) | 105 | 60 | 59 | 64 | 38 | 76 | 76 |
| Set | electrode # | 5d | 5d | 5d | 5d | 5d | 5d | 5d |

TABLE 12-continued

| | | | | | | | | |
|---|---|---|---|---|---|---|---|---|
| 4 | electrode # | 5d' | 5d' | 5d' | 5d' | 5d' | 5d' | 5d' |
| | "c-c" (mm) | 143 | 70 | 68 | 70 | 44 | 127 | 127 |
| Set | electrode # | 5e | 5e | 5e | 5e | 5e | 5e | 5e |
| 5 | electrode # | 5e' | 5e' | 5e' | 5e' | 5e' | 5e' | 5e' |
| | "c-c" (mm) | 165 | 84 | 103 | 70 | 51 | 127 | 127 |
| Set | electrode # | 5f | 5f | 5f | 5f | 5f | 5f | 5f |
| 6 | electrode # | 5f' | 5f' | 5f' | 5f' | 5f' | 5f' | 5f' |
| | "c-c" (mm) | 178 | 108 | 102 | 64 | 54 | 127 | 127 |
| Set | electrode # | 5g | 5g | 5g | 5g | 5g | 5g | 5g |
| 7 | electrode # | 5g' | 5g' | 5g' | 5g' | 5g' | 5g' | 5g' |
| | "c-c" (mm) | 178 | 100 | 100 | 76 | 54 | 216 | 216 |
| Set | electrode # | 5h | 5h | 5h | 5h | 5h | 5h | 5h |
| 8 | electrode # | 5h' | 5h' | 5h' | 5h' | 5h' | 5h' | 5h' |
| | "c-c" (mm) | 216 | 127 | 135 | 76 | 57 | 83 | 83 |
| Set | electrode # | 5i | 5i | 5i | 5i | 5i | n/a | n/a |
| 9 | electrode # | 5i' | 5i' | 5i' | 5i' | 5i' | n/a | n/a |
| | "c-c" (mm) | 76 | 191 | 178 | 324 | 464 | n/a | n/a |
| Run ID: | | GB-144 | GB-079 | GB-089 | GB-062 | GB-076 | GB-077 | |
| Flow | In (ml/min) | 110 | 150 | 150 | 150 | 150 | 150 | |
| Rate: | Out (ml/min) | 62 | 110 | 110 | 110 | 110 | 110 | |
| Volts: | Set # 1 | 750 | 750 | 750 | 750 | 750 | 750 | |
| | Set # 2 | 299 | 255 | 255 | 750 | 750 | 750 | |
| | Set #'s 3-9 | 299 | 255 | 255 | 249 | 306 | 313 | |
| PE: NaHCO3 (mg/ml) | | 0.53 | 0.40 | 0.40 | 0.40 | 0.53 | 0.40 | |
| Wire Diameter (mm) | | 1.0 | 0.5 | 0.5 | 0.5 | 0.5 | 0.5 | |
| Contact "$W_L$" (in/mm) | | 0.5/13 | 2/51 | 2/51 | 2/51 | 1/25 | 1/25 | |
| Electrode Config. Figure | | 28m | 4f | 4f | 4f | 4f | 4f | |
| Produced Au PPM | | 20.2 | 10.8 | 12.4 | 16.7 | 7.8 | 7.5 | |
| Output Temp ° C. at 32 | | 89 | 94 | 99 | 95 | 98 | 97 | |
| Dimensions | Plasma 4 Figs. | 37a | 37a | 37a | 37b | 37b | 37b | |
| | Process Figures | 39c, 39h 40e, 40f, 40g | 39d, 21c | 39d, 21c | 39e, 21c | 39e, 22b | 39e, 22b | |
| | M1 (in/mm) | 2/51 | 1/25 | 0.75/19 | 1/25 | 2.7/68.6 | 2.7/68.6 | |
| | M2 (in/mm) | n/a | n/a | n/a | n/a | 0.5/13 | 0.5/13 | |
| | $L_{T\ (in/mm)}$ | 36/914 | 24/610 | 24/610 | 24/610 | 24/610 | 24/610 | |
| | d (in/mm) | 0.5/13 | 2/51 | 2/51 | 2/51 | 1/25 | 1/25 | |
| | S (in/mm) | 1.5/38.1 | 3.3/83.8 | 3.3/83.8 | 3.3/83.8 | 3.5/88.9 | 3.5/88.9 | |
| Electrode Curr. (A) | | FIG. 63d | 0.66 | n/a | 0.7 | 0.51 | 0.48 | |
| Total Curr. Draw (A) | | n/a | 11.94 | 8.98 | 12.48 | 13.62 | 12.47 | |
| Hydrodynamic r (nm) | | 16.7 | 14.83 | 16.97 | 16.7 | 10.2 | 10.93 | |
| TEM Avg. Dia. (nm) | | 17.7 | 12 | 15.8 | 12.95 | 10.1 | 9.15 | |
| | "c-c" (mm) | 83 | n/m | n/m | n/m | n/m | n/m | |
| Set | electrode # | 1a | 1a | 1a | 1a | 1a | 1a | |
| 1 | "x" (in/mm) | 0.25/6.4 | 0.25/6.4 | 0.25/6.4 | 0.25/6.4 | 0.25/6.4 | 0.25/6.4 | |
| | electrode # | 5a | 5a | 5a | 5a | 5a | 5a | |
| | "c-c" (mm) | 83 | n/m | n/m | n/m | n/m | n/m | |
| Set | electrode # | 5b | 5b | 5b | 1b | 1b | 1b | |
| 2 | "x" (in/mm) | n/a | n/a | n/a | 0.25/6.4 | 0.25/6.4 | 0.25/6.4 | |
| | electrode # | 5b' | 5b' | 5b' | 5b | 5b | 5b | |
| | "c-c" (mm) | 76 | n/m | n/m | n/m | n/m | n/m | |
| Set | electrode # | 5c | 5c | 5c | 5c | 5c | 5c | |
| 3 | electrode # | 5c' | 5c' | 5c' | 5c' | 5c' | 5c' | |
| | "c-c" (mm) | 76 | n/m | n/m | n/m | n/m | n/m | |
| Set | electrode # | 5d | 5d | 5d | 5d | 5d | 5d | |
| 4 | electrode # | 5d' | 5d' | 5d' | 5d' | 5d' | 5d' | |
| | "c-c" (mm) | 127 | n/m | n/m | n/m | n/m | n/m | |
| Set | electrode # | 5e | 5e | 5e | 5e | 5e | 5e | |
| 5 | electrode # | 5e' | 5e' | 5e' | 5e' | 5e' | 5e' | |
| | "c-c" (mm) | 127 | n/m | n/m | n/m | n/m | n/m | |
| Set | electrode # | 5f | 5f | 5f | 5f | 5f | 5f | |
| 6 | electrode # | 5f' | 5f' | 5f' | 5f' | 5f' | 5f' | |
| | "c-c" (mm) | 127 | n/m | n/m | n/m | n/m | n/m | |
| Set | electrode # | 5g | 5g | 5g | 5g | 5g | 5g | |
| 7 | electrode # | 5g' | 5g' | 5g' | 5g' | 5g' | 5g' | |
| | "c-c" (mm) | 216 | n/m | n/m | n/m | n/m | n/m | |
| Set | electrode # | 5h | 5h | 5h | 5h | 5h | 5h | |
| 8 | electrode # | 5h' | 5h' | 5h' | 5h' | 5h' | 5h' | |
| | "c-c" (mm) | 83 | n/m | n/m | n/m | n/m | n/m | |
| Set | electrode # | n/a | n/a | n/a | 5i | 5i | 5i | |
| 9 | electrode # | n/a | n/a | n/a | 5i' | 5i' | 5i' | |
| | "c-c" (mm) | n/a | n/a | n/a | n/m | n/m | n/m | |

All trough members 30*a'* and 30*b'* in the aforementioned FIGS. were made from ⅛" (about 3 mm) thick plexiglass, and ¼" (about 6 mm) thick polycarbonate, respectively. The support structure 34 (not shown in many of the FIGS. but discussed elsewhere herein) was also made from plexiglass which was about ¼" thick (about 6-7 mm thick). In contrast to the embodiments shown in FIGS. 38A and 38B, each trough member 30*a* was integral with trough member 30*b'* and was thus designated 30*a'* (e.g., no separate pumping means was provided after trough member 30*a*, as in certain previous examples). The cross-sectional shape of each trough member 30*a'* used in this Example corresponded to that shape shown in FIG. 10B (i.e., was a trapezoidal-shaped cross-section). Relevant dimensions for each trough member portion 30*b'* are reported in Table 12 as "M1" (i.e., inside width of the trough at the entrance portion of the trough member 30*b'*), "M2" (i.e., inside width of the trough at the exit portion of the trough member 30*b'*), "$L_T$" (i.e., transverse length or flow length of the trough member 30*b'*), "S" (i.e., the height of the trough member 30*b'*), and "d" (i.e., depth of the liquid 3" within the trough member 30*b'*). In some embodiments, the distance "M" separating the side portions "S", "S'" (refer to FIG. 10A) of the trough member 30*b'* were the same. In these cases, Table 12 represents a value dimension for only "M1" and the entry for "M2" is represented as "N/A". In other words, some trough members 30*b'* were tapered along their longitudinal length and in other cases, the trough members 30*b'* were substantially straight along their longitudinal length. The thickness of each sidewall portion also measured about ¼" (about 6 mm) thick. Three different longitudinal lengths "$L_T$" are reported for the trough members 30*b'* (i.e., either 610 mm, 914 mm or 1219 mm) however, other lengths $L_T$ should be considered to be within the metes and bounds of the inventive trough.

Figure 37B:
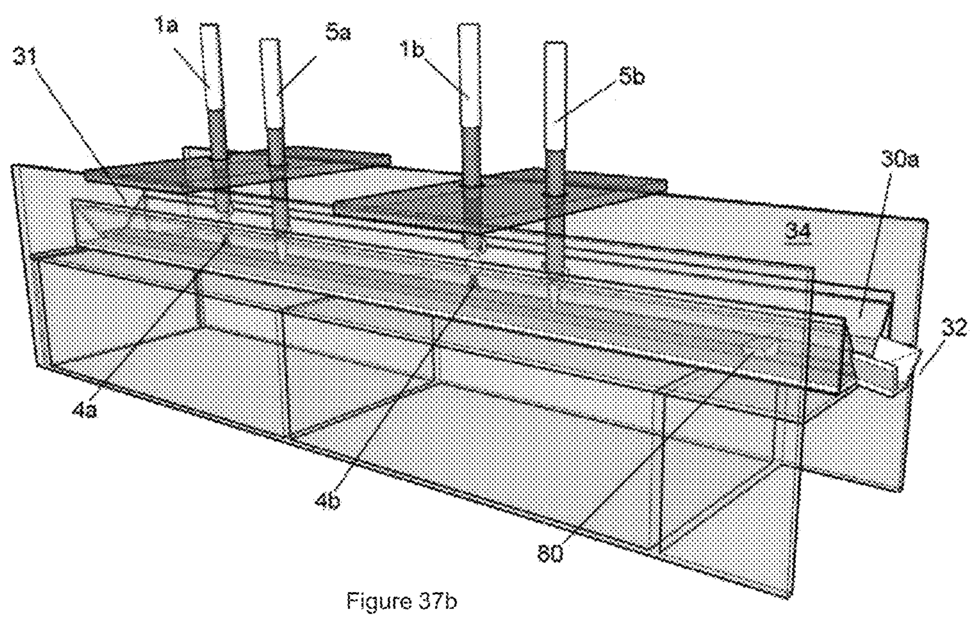

Table 12 shows that the processing enhancer $NaHCO_3$ was added to purified water (discussed elsewhere herein) in amounts of either about 0.4 mg/ml or 0.53 mg/ml. It should be understood that other amounts of this processing enhancer also function within the metes and bounds of the invention. The purified water/$NaHCO_3$ mixture was used as the liquid 3 input into trough member 30*a'*. The depth "d" of the liquid 3' in the trough member 30*a'* (i.e., where the plasma(s) 4 is/are formed) was about 7/16" to about ½" (about 11 mm to about 13 mm) at various points along the trough member 30*a'*. The depth "d'" was partially controlled through use of the dam 80 (shown in FIGS. 37A and 37B). Specifically, the dam 80 was provided near the output end 32 of the trough member 30*a'* and assisted in creating the depth "d" (shown in FIG. 10B as "d") to be about 7/16"-½" (about 11-13 mm) in depth. The height "j" of the dam 80 measured about ¼" (about 6 mm) and the longitudinal length "k" measured about ½" (about 13 mm) The width (not shown) was completely across the bottom dimension "R" of the trough member 30*a'*. Accordingly, the total volume of liquid 3' in the trough member 30*a'* during operation thereof was about 2.14 $in^3$ (about 35 ml) to about 0.89 $in^3$ (about 14.58 ml).

The rate of flow of the liquid 3' into the trough member 30*a'* as well as into trough member 30*b'*, was about 150 ml/minute for all but one of the formed samples (i.e., GB-144 which was about 110 ml/minute) and the rate of flow out of the trough member 30*b'* at the point 32 was about 110 ml/minute (i.e., due to evaporation) for all samples except GB-144, which was about 62 ml/minute. The amount of evaporation that occurred in GB-144 was a greater percent than the other samples because the dwell time of the liquid 3" in the trough member 30*b'* was longer relative to the other samples made according to this embodiment. Other acceptable flow rates should be considered to be within the metes and bounds of the invention.

Such flow of liquid 3' was obtained by utilizing a Masterflex® L/S pump drive 40 rated at 0.1 horsepower, 10-600 rpm. The model number of the Masterflex® pump 40 was 77300-40. The pump drive had a pump head also made by Masterflex® known as Easy-Load Model No. 7518-10. In general terms, the head for the pump 40 is known as a peristaltic head. The pump 40 and head were controlled by a Masterflex® LS Digital Modular Drive. The model number for the Digital Modular Drive is 77300-80. The precise settings on the Digital Modular Drive were, for example, 150 milliliters per minute for all samples except GB-144 which was, for example, 110 ml/minute. Tygon® tubing having a diameter of ¼" (i.e., size 06419-25) was placed into the peristaltic head. The tubing was made by Saint Gobain for Masterflex®. One end of the tubing was delivered to a first end 31 of the trough member 30'*a* by a flow diffusion means located therein. The flow diffusion means tended to minimize disturbance and bubbles in water 3 introduced into the trough member 30*a'* as well as any pulsing condition generated by the peristaltic pump 40. In this regard, a small reservoir served as the diffusion means and was provided at a point vertically above the end 31 of the trough member 30*a'* such that when the reservoir overflowed, a relatively steady flow of liquid 3' into the end 31 of the V-shaped trough member 30*a'* occurred.

Table 12 shows that there was a single electrode set 1*a*/5*a*, or two electrode sets 1*a*/5*a*, utilized in this Example 15. The plasma(s) 4 was/were created with an electrode 1 similar in shape to that shown in FIG. 5E, and weighed about 9.2 grams. This electrode was 99.95% pure gold. The other electrode 5*a* comprised a right-triangular shaped platinum plate measuring about 14 mm×23 mm×27 mm and about 1 mm thick and having about 9 mm submerged in the liquid 3'. All other pertinent run conditions are shown in Table 12.

Figure 40D:
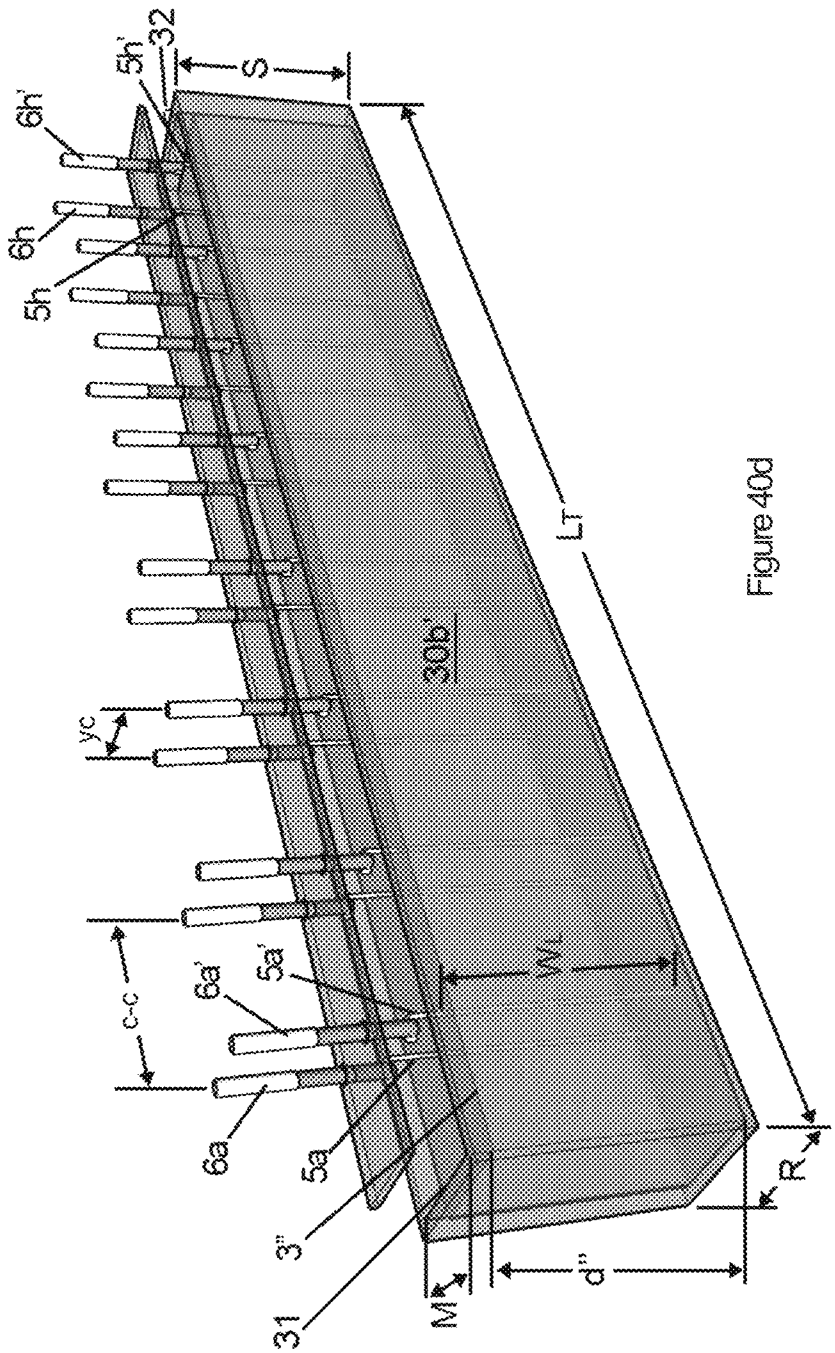

As shown in FIGS. 39C-39H, the output from the trough member 30*a'* was the conditioned liquid 3' and this conditioned liquid 3' flowed directly into a second trough member 30*b'*. The second trough member 30*b'*, shown in FIGS. 40B-40G and 41B had measurements as reported in Table 12. This trough member 30*b'* contained from about 600 ml of liquid 3" therein to about 1100 ml depending on the dimensions of the trough and the depth "d' of the liquid 3" therein. Table 12, in connection with FIGS. 39C-39H, 40B-40G and 41B, show a variety of different electrode configurations. For example, previous examples herein disclosed the use of four sets of electrodes 5/5, with one electrode set 1/5. In this Example, either eight or nine electrode sets were used (e.g., one 1/5 set with seven or eight 5/5' sets; or two 1/5 sets with seven 5/5' sets). Each of the electrode sets 5/5' comprised 99.99% pure gold wire measuring either about 0.5 mm in diameter or 1.0 nm in diameter, as reported in Table 12. The length of each wire electrode 5 that was in contact with the liquid 3" (reported as "$W_L$" in Table 12) measured from about 0.5 inches (about 13 mm) long to about 2.0 inches (about 51 mm) long. Two different electrode set configurations 5/5' were utilized. FIGS. 40B, 40C, 40E, 40F, 40G and 41B all show electrode sets 5/5' oriented along a plane (e.g., arranged in line form along the flow direction of the liquid 3"). Whereas FIG. 40D shows that the electrode sets 5/5' were rotated about 90° relative to the aforementioned electrode sets 5/5'. Further, the embodiments shown in FIGS. 39A-39H show the electrode sets 1/5 and 5/5' were all located along the same plane. However, it should be understood that the imaginary plane created between the electrodes in each electrode set 1/5 and/or 5/5' can be parallel to the flow direction of the liquid 3" or perpendicular to the flow direction of the liquid 3" or at an angle relative to the flow direction of the liquid 3".

With regard to FIGS. 39C-39H, 40B-40G and 41B, each separate electrode set 5/5' (e.g., Set 2, Set 3-Set 8 or Set 9) were electrically connected to the transformer devices, 50 and 50*a*, as shown therein. Specifically, transformers 50 and 50*a* were electrically connected to each electrode set, according to the wiring diagram show in FIGS. 39C-39H. The exact wiring varied between examples and reference should be made to the FIGS. 39C-39G for specific electrical connection information. In most cases, each transformer device 50, 50*a* was connected to a separate AC input line that was 120° out of phase relative to each other. The transformers 50 and 50*a* were electrically connected in a manner so as not to overload a single electrical circuit and cause, for example, an upstream circuit breaker to disengage (e.g., when utilized under these conditions, a single transformer 50/50*a* could draw sufficient current to cause upstream electrical problems). Each transformer 50/50*a* was a variable AC transformer constructed of a single coil/winding of wire. This winding acts as part of both the primary and secondary winding. The input voltage is applied across a fixed portion of the winding. The output voltage is taken between one end of the winding and another connection along the winding. By exposing part of the winding and making the secondary connection using a sliding brush, a continuously variable ratio can be obtained. The ratio of output to input voltages is equal to the ratio of the number of turns of the winding they connect to. Specifically, each transformer was a Mastech TDGC2-5kVA, 10A Voltage Regulator, Output 0-250V.

Table 12 refers to each of the electrode sets by "Set #" (e.g., "Set 1" through "Set 9 "). Each electrode of the 1/5 or 5/5 electrode sets was set to operate within a specific voltage range. The voltages listed in Table 12 are the voltages used for each electrode set. The distance "c-c" (with reference to FIG. 14) from the centerline of each electrode set to the adjacent electrode set is also reported. Further, the distance "x" associated with each electrode 1 utilized is also reported. For the electrode 5, no distance "x" is reported. Sample GB-118 had a slightly different electrode 5*a*/5*b* arrangement from the other examples herein. Specifically, tips or ends 5*t* and 5*f* of the electrodes 5*a*/5*b*, respectively, were located closer to each other than other portions of the electrodes 5*a*/5*b*. The distance "dt" between the tips 5*t* and 5*f* varied between about 7/16 inches (about 1.2 cm) and about 2 inches (about 5 cm). Other relevant parameters are also reported in Table 12.

All materials for the electrodes 1/5 were obtained from ESPI, having an address of 1050 Benson Way, Ashland, Oreg. 97520. All materials for the electrodes 5/5 in runs GB-139, GB-141, GB-144, GB-076, GB-077, GB-079, GB-089, GB-098, GB-113, GB-118, GB-120 and GB-123 were obtained from Alfa Aesar, having an address of 26 Parkridge Road, Ward Hill, Mass. 01835. All materials for the electrodes 5/5 in run GB-062 were obtained from ESPI, 1050 Benson Way, Ashland, Oreg. 97520.

FIGS. 30A-68A show two representative TEM photomicrographs for each of the gold nanoparticles, dried from each solution or colloid referenced in Table 12, and formed according to Example 15.

FIGS. 30B-68B show the measured size distribution of the gold particles measured by using the TEM instrument/software discussed earlier in Examples 5-7 for each dried solution or colloid referenced in Table 12 and formed according to Example 15.

FIGS. 30C-68C show graphically three dynamic light scattering data measurement sets for the nanoparticles (i.e., the hydrodynamic radii) made according to each solution or colloid referenced in Table 12 and formed according to Example 15. It should be noted that the dynamic light scattering particle size information is different from the TEM measured histograms because dynamic light scattering uses algorithms that assume the particles are all spheres (which they are not) as well as measures the hydrodynamic radius (e.g., the particle's influence on the water is also detected and reported in addition to the actual physical radii of the particles). Accordingly, it is not surprising that there is a difference in the reported particle sizes between those reported in the TEM histogram data of those reported in the dynamic light scattering data just as in the other Examples included herein.

Reference is now made to FIGS. 39C, 39H, 40E, 40F and 39G which are representative of structures that were used to make samples GB-139, GB-141 and GB-144. The trough member 30*b*' used to make these samples was different from the other trough members 30*b*' used this Example 15 because: 1) the eight electrode sets 1/5 and 5/5 were all connected to control devices 20 and 20*a*-20*g* (i.e., see FIG. 39H) which automatically adjusted the height of, for example, each electrode 1/5 or 5/5 in each electrode set 1/5; and 2) female receiver tubes o5*a*/o5*a*'-o5*g*/o5*g*' which were connected to a bottom portion of the trough member 30*b*' such that the electrodes in each electrode set 5/5 could be removably inserted into each female receiver tube o5 when, and if, desired. Each female receiver tube o5 was made of polycarbonate and had an inside diameter of about ⅛ inch (about 3.2 mm) and was fixed in place by a solvent adhesive to the bottom portion of the trough member 30*b*'. Holes in the bottom of the trough member 30*b*' permitted the outside diameter of each tube o5 to be fixed therein such that one end of the tube o5 was flush with the surface of the bottom portion of the trough 30*b*'. The inside diameters of the tubes o5 effectively prevented any significant quantities of liquid 3" from entering into the female receiver tube o5. However, some liquid may flow into the inside of one or more of the female receiver tubes o5. The length or vertical height of each female receiver tube o5 used in this Example was about 6 inches (about 15.24 cm) however, shorter or longer lengths fall within the metes and bounds of this disclosure. Further, while the female receiver tubes o5 are shown as being subsequently straight, such tubes could be curved in a J-shaped or U-shaped manner such that their openings away from the trough member 30*b*' could be above the top surface of the liquid 3", if desired.

Figure 40E:
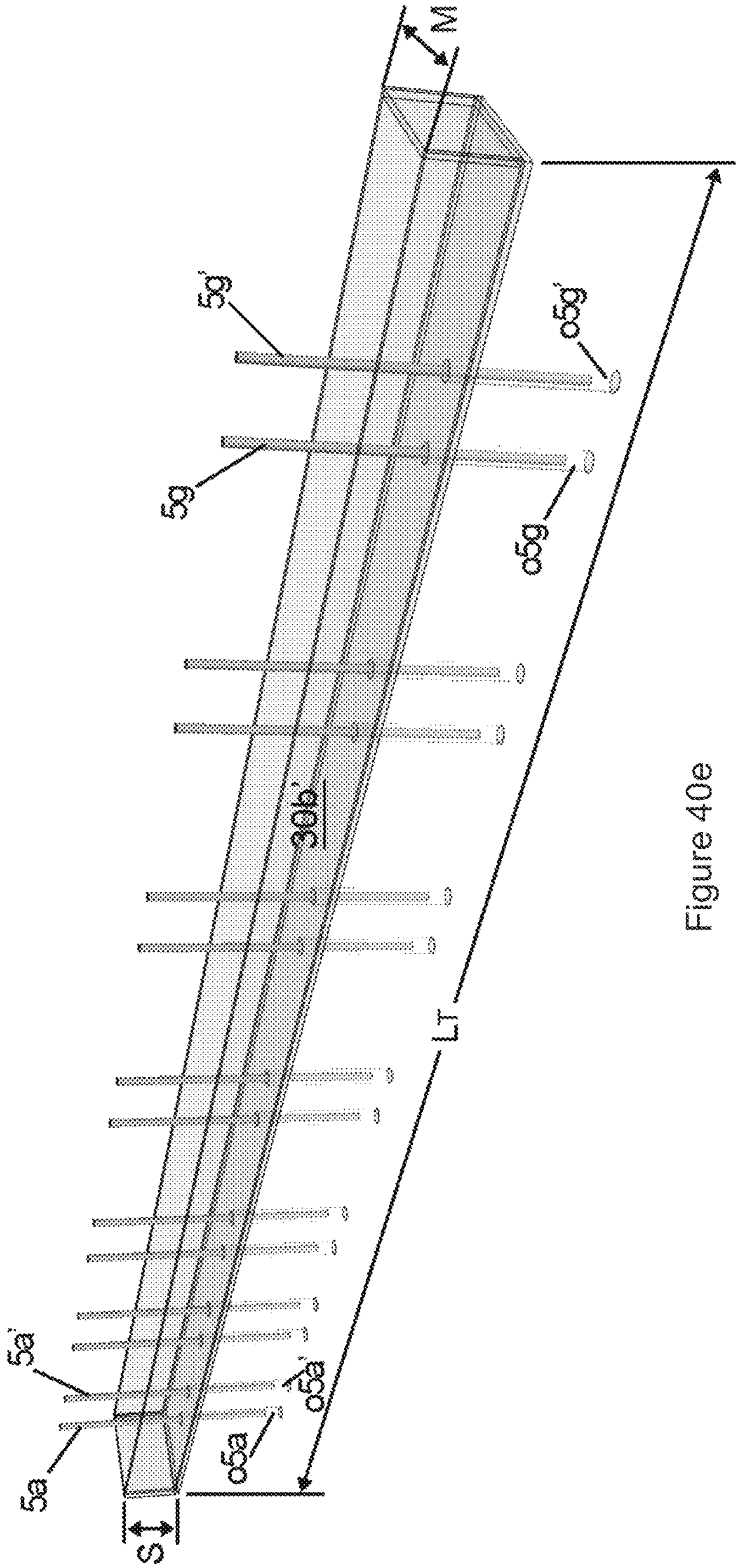
Figure 40F:
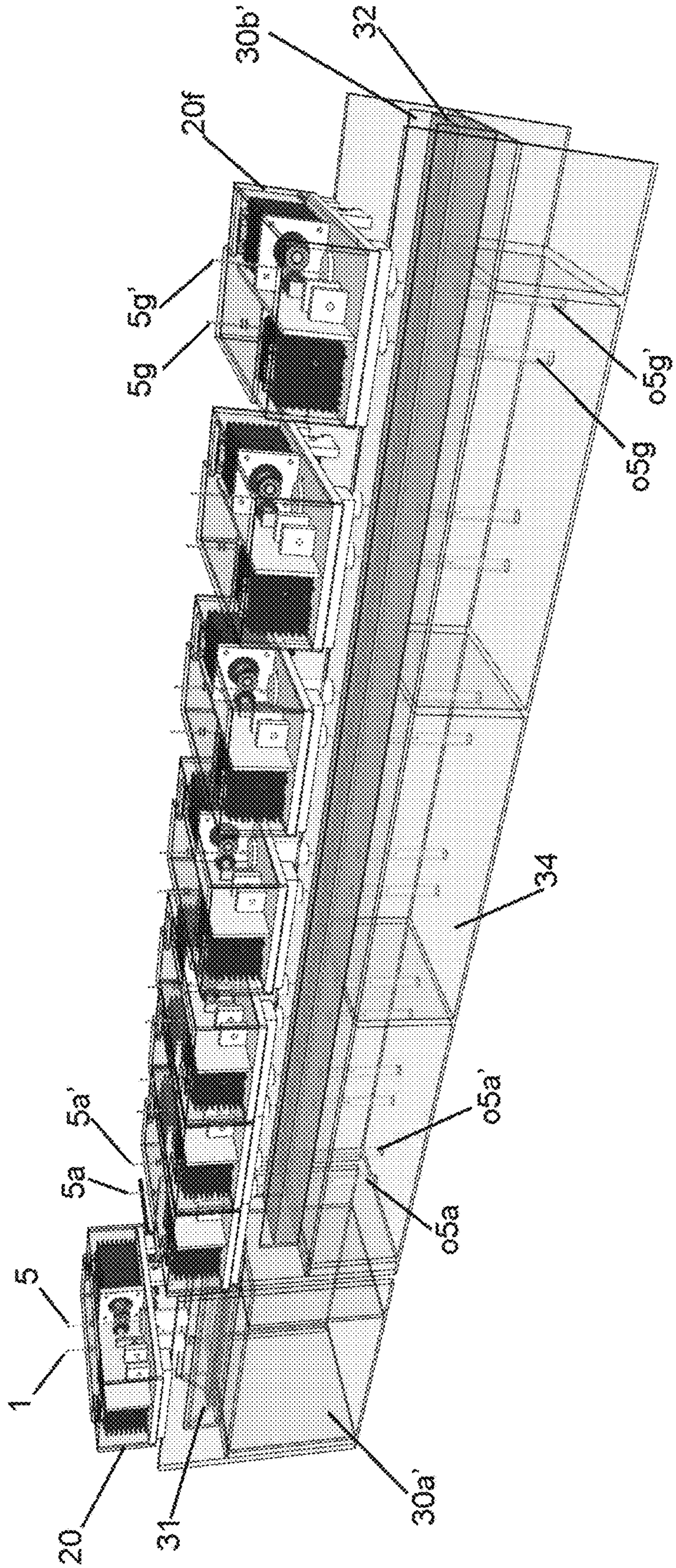
Figure 40G:
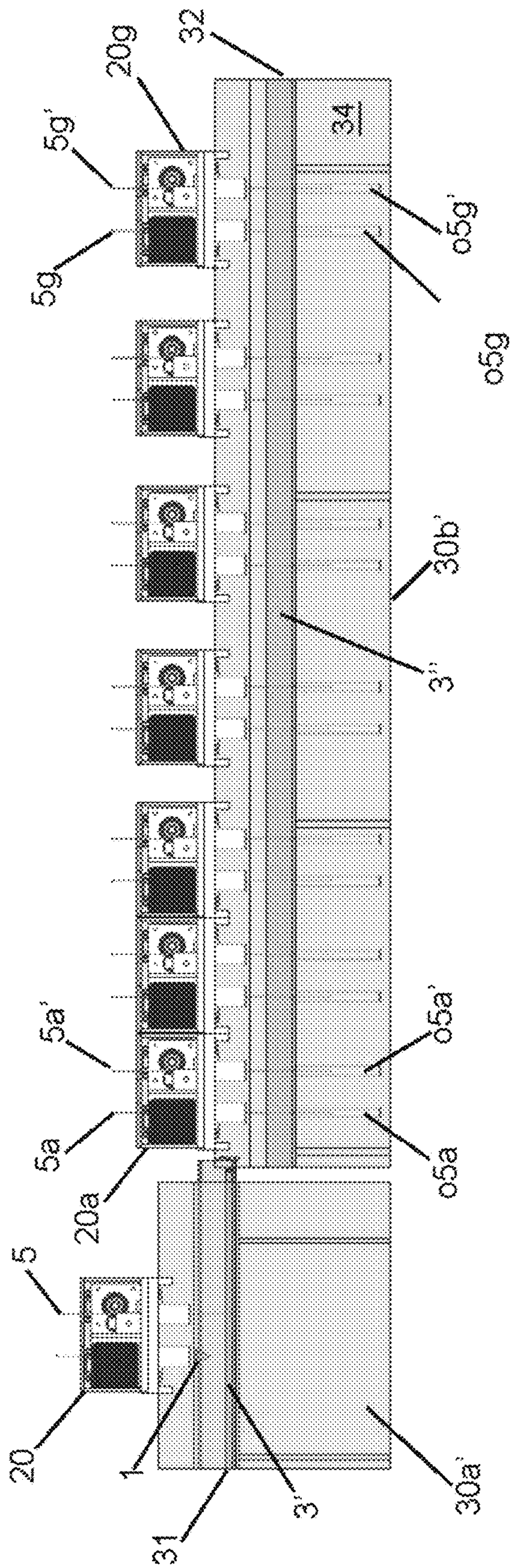

With reference to FIGS. 40E, 40F and 40G, each electrode 5/5' was first placed into contact with the liquid 3" such that it just entered the female receiver tube o5. After a certain amount of process time, gold metal was removed from each wire electrode 5 which caused the electrode 5 to thin (i.e., become smaller in diameter) which changed, for example, current density and/or the rate at which gold nanoparticles were formed. Accordingly, the electrodes 5 were moved toward the female receiver tubes o5 resulting in fresh and thicker electrodes 5 entering the liquid 3" at a top surface portion thereof. In essence, an erosion profile or tapering effect was formed on the electrodes 5 after some amount of processing time has passed (i.e., portions of the wire near the surface of the liquid 3" were typically thicker than portions near the female receiver tubes o5), and such wire electrode profile or tapering can remain essentially constant throughout a production process, if desired, resulting in essentially identical product being produced at any point in time after an initial pre-equilibrium phase during a production run allowing, for example, the process to be cGMP under current FDA guidelines and/or be ISO 9000 compliant as well.

Figure 61A:
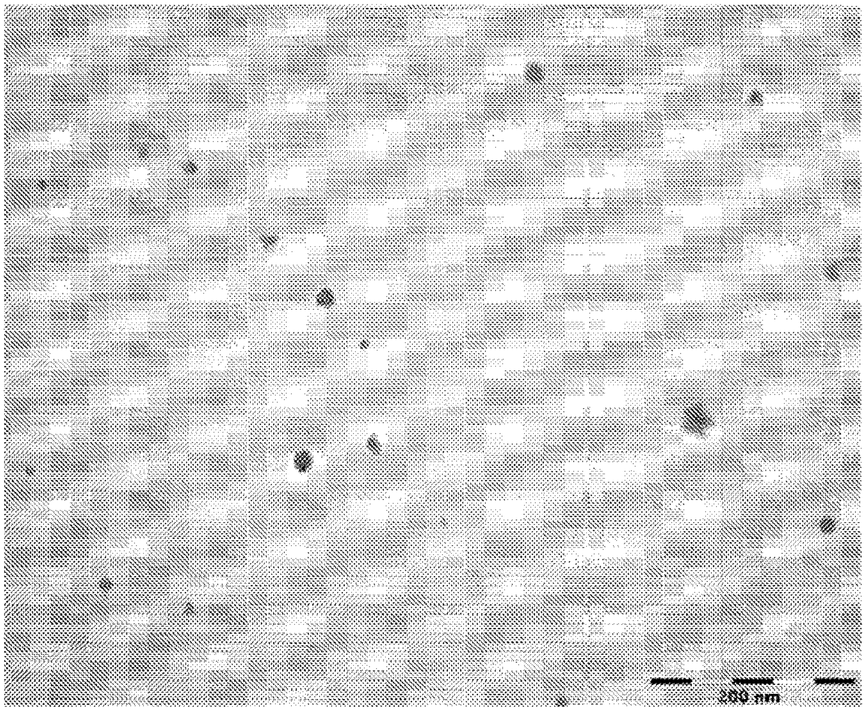
Figure 61A:
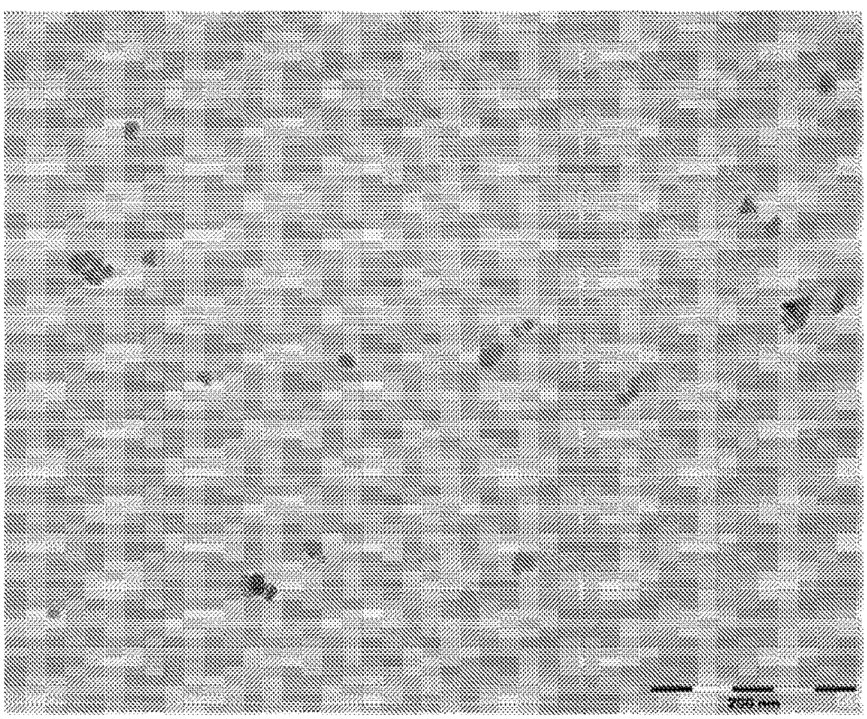
Figure 61B:
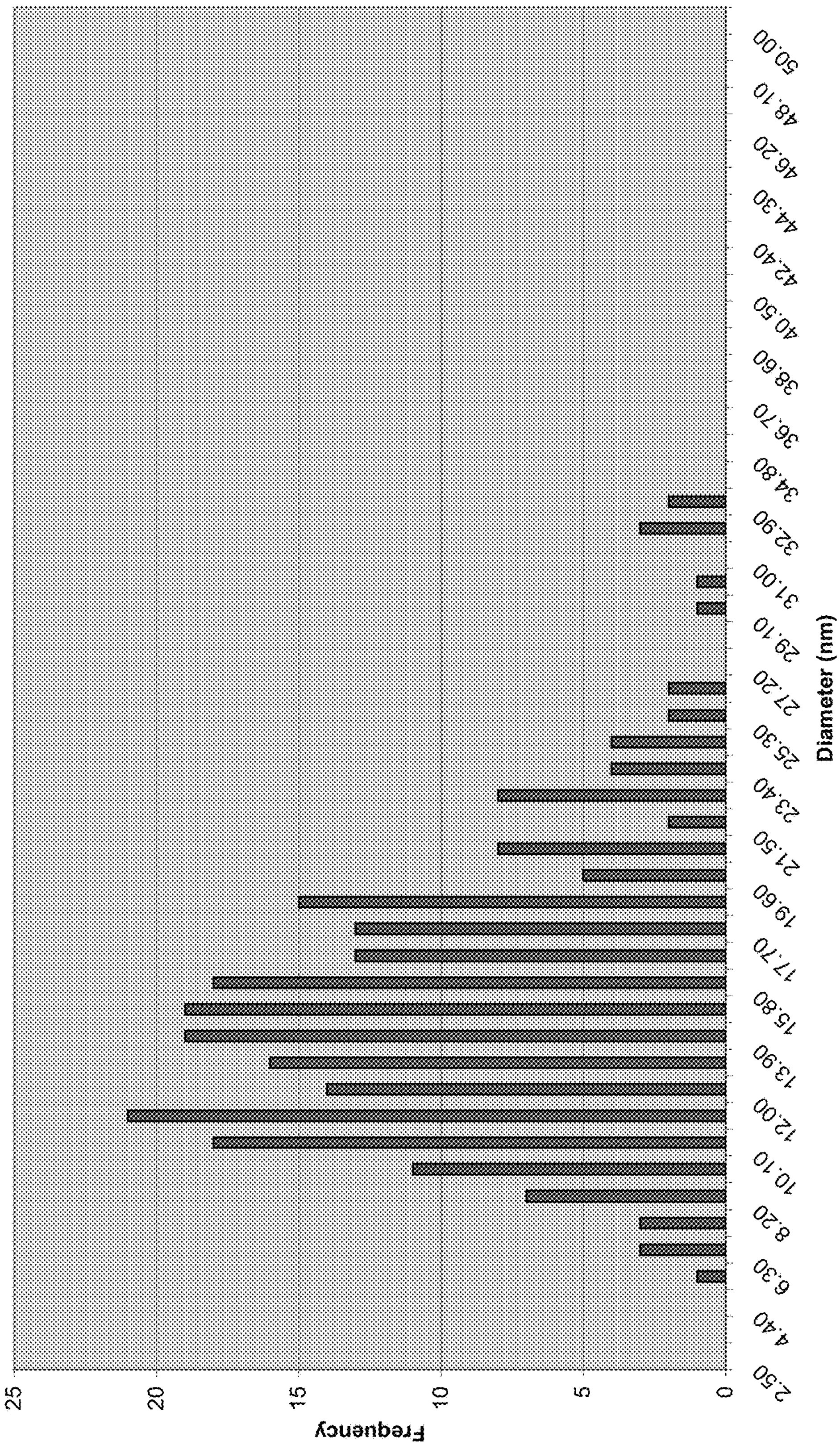
Figure 61D:
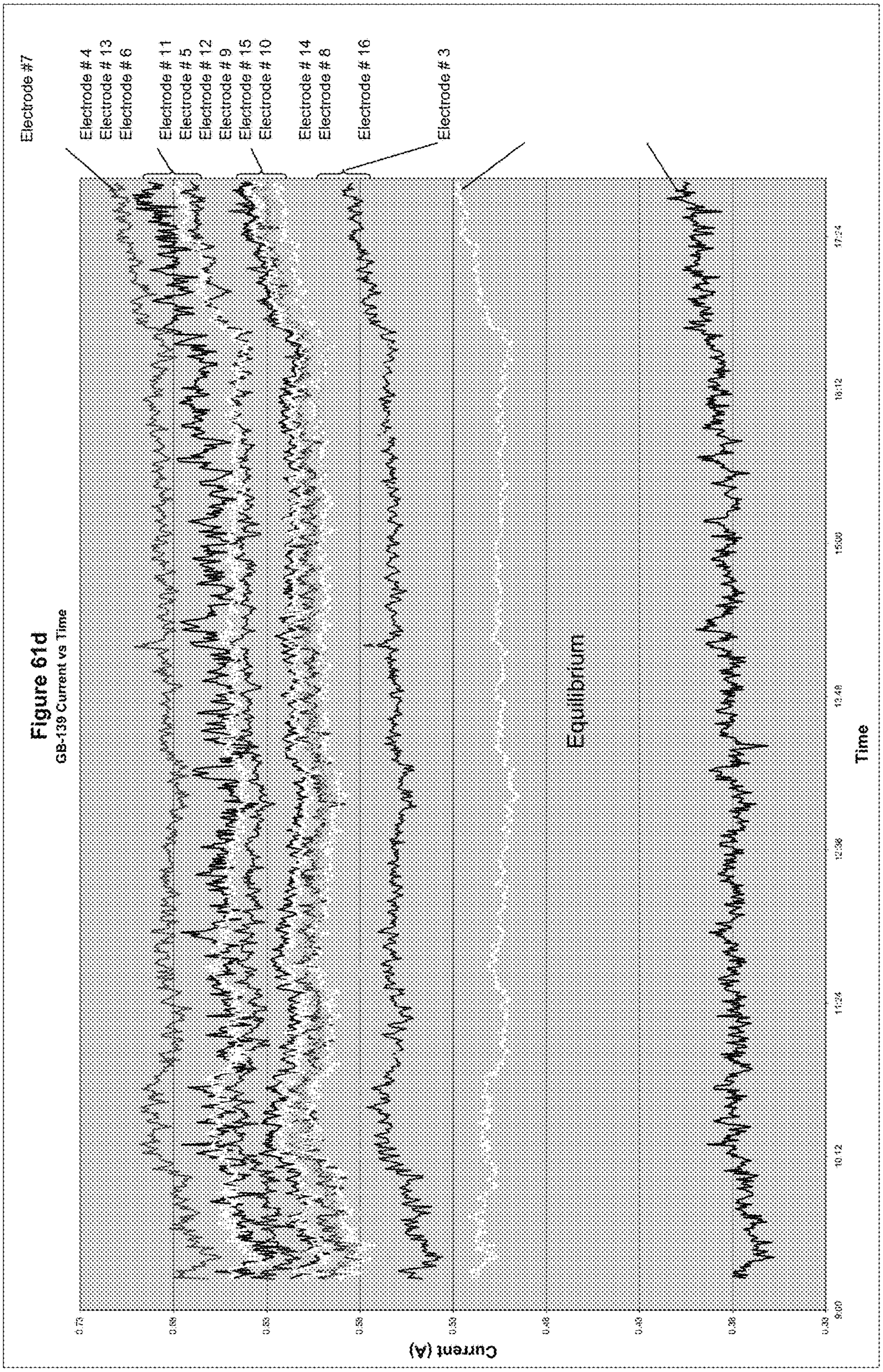
Figure 62A:
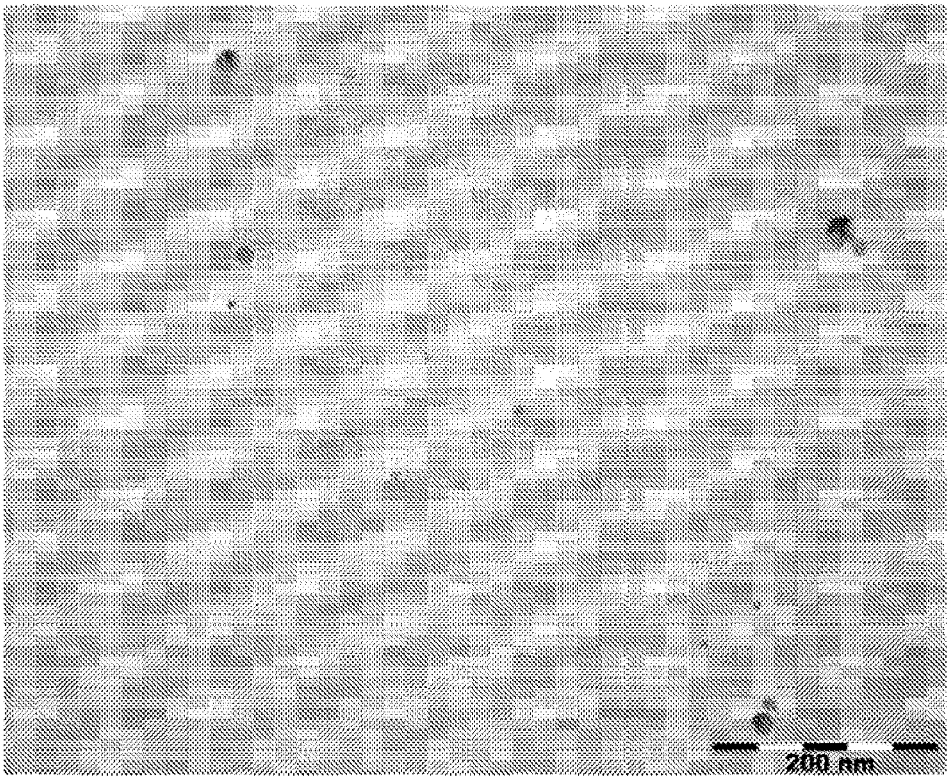
Figure 62A:
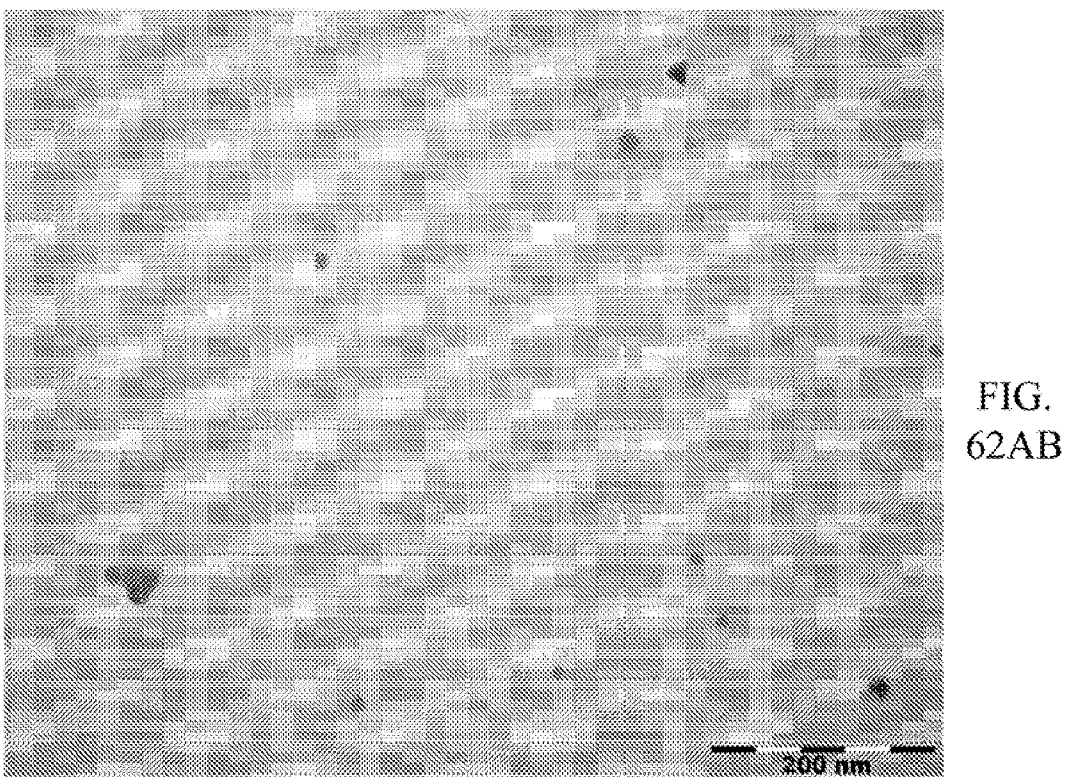
Figure 62B:
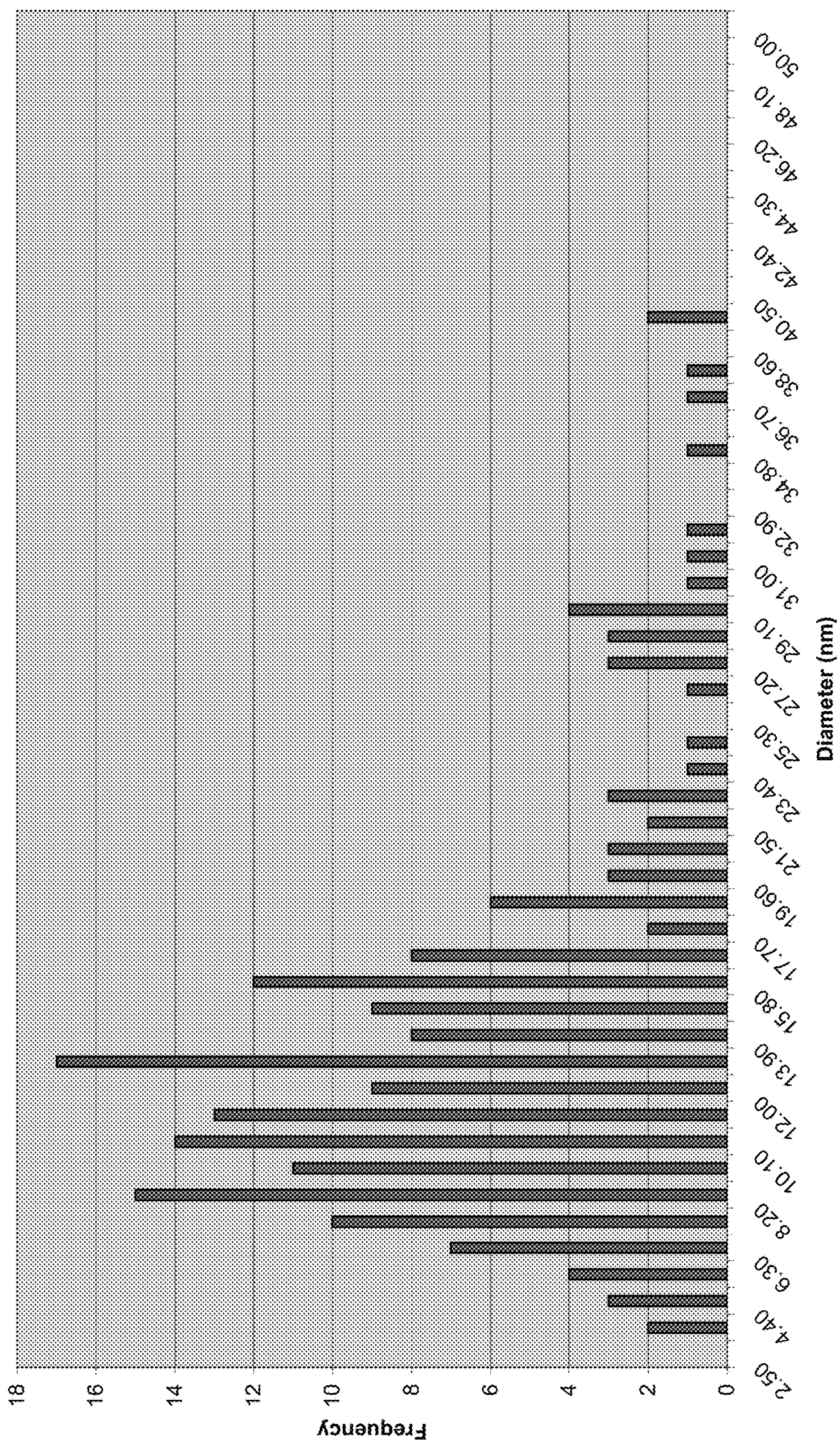
Figure 63A:
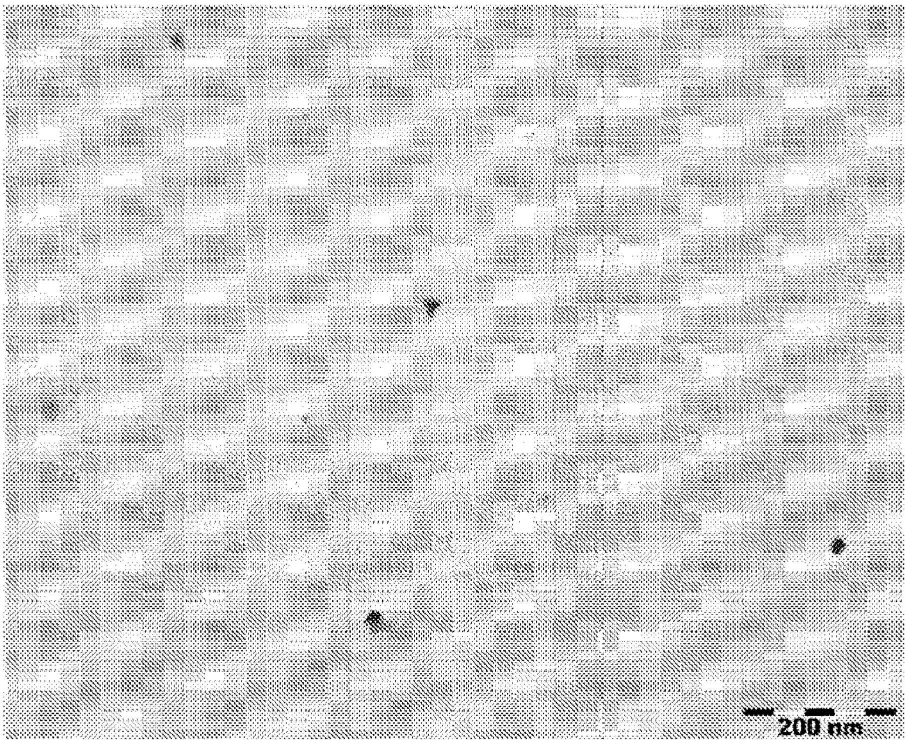
Figure 63A:
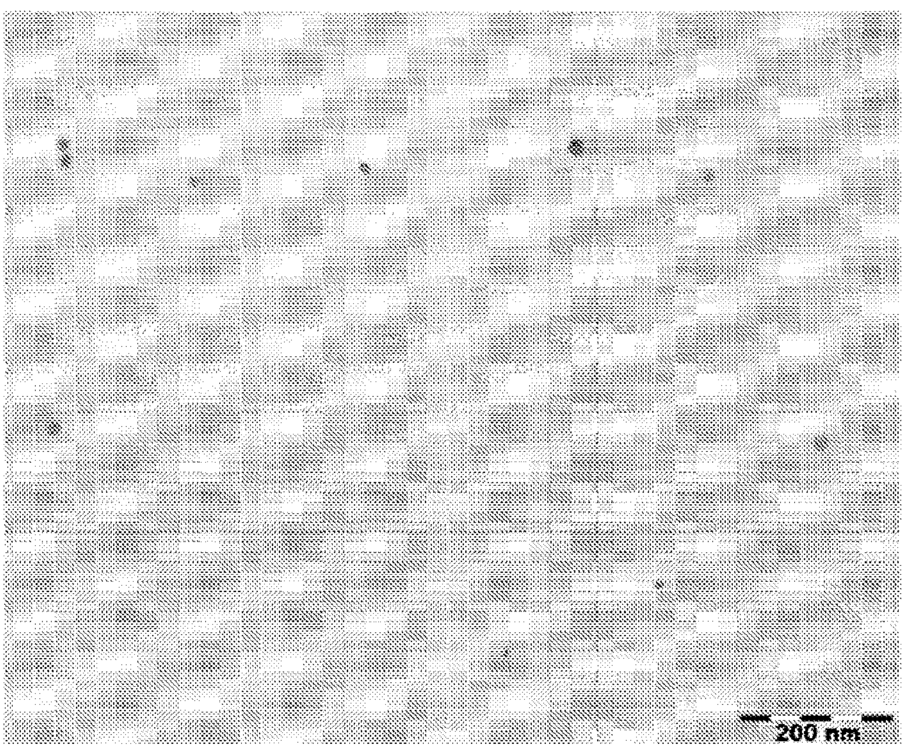
Figure 63B:
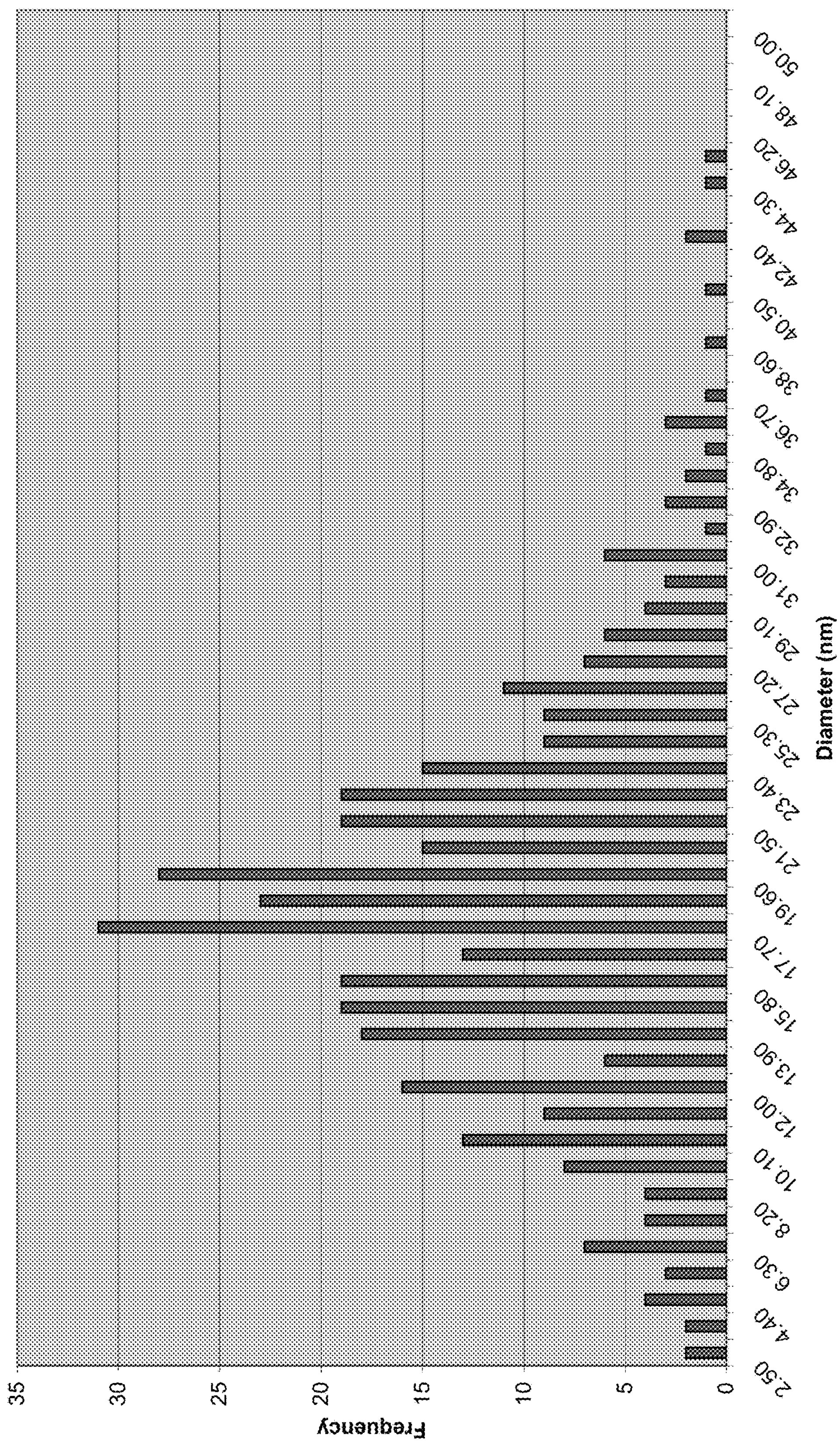
Figure 64A:
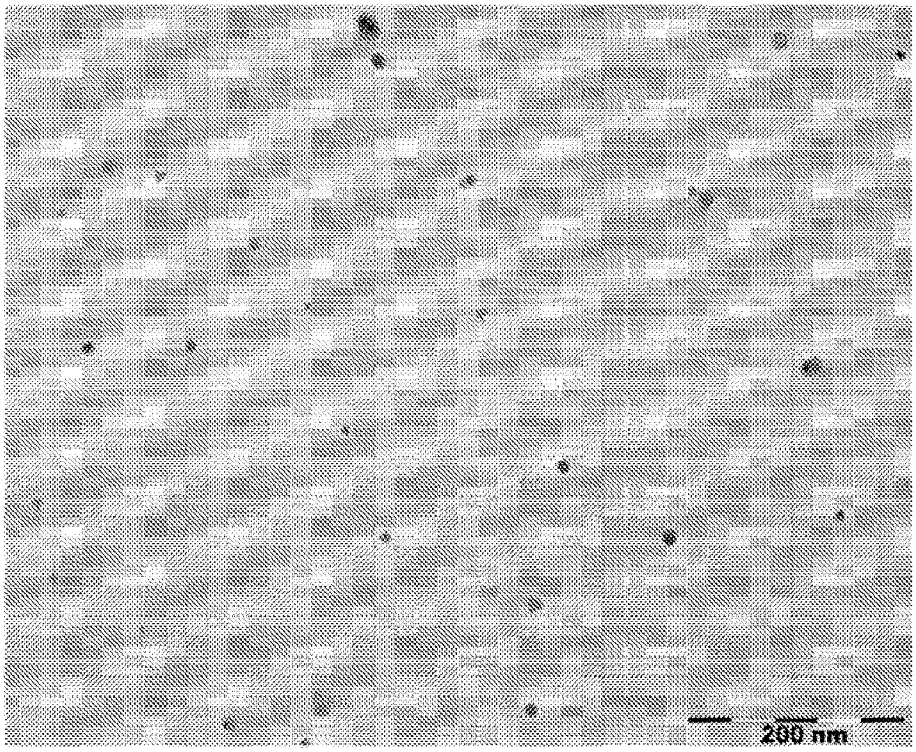
Figure 64A:
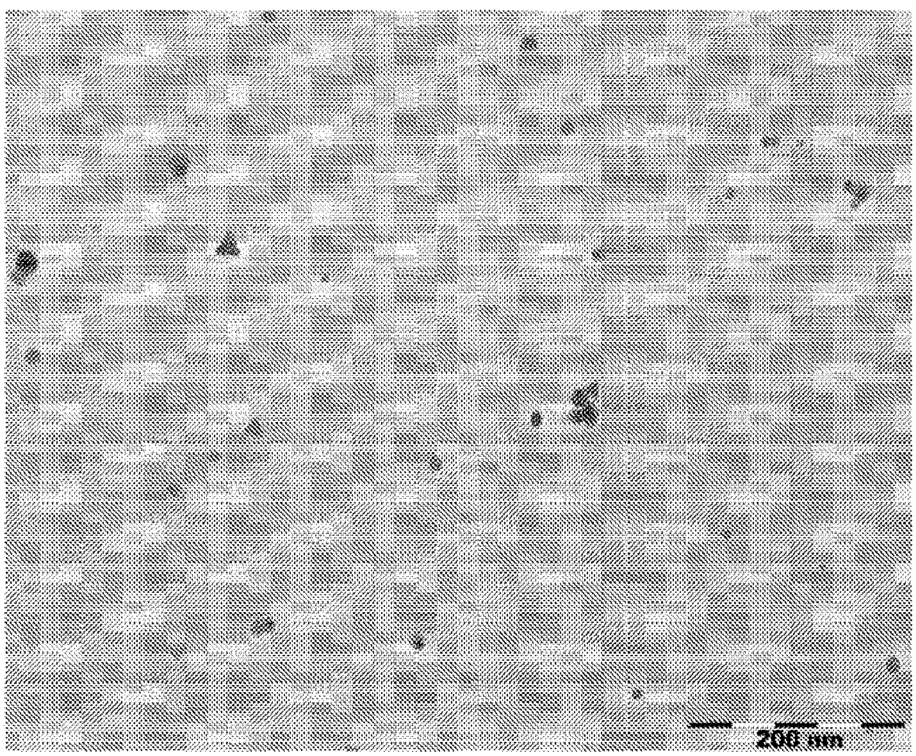
Figure 64B:
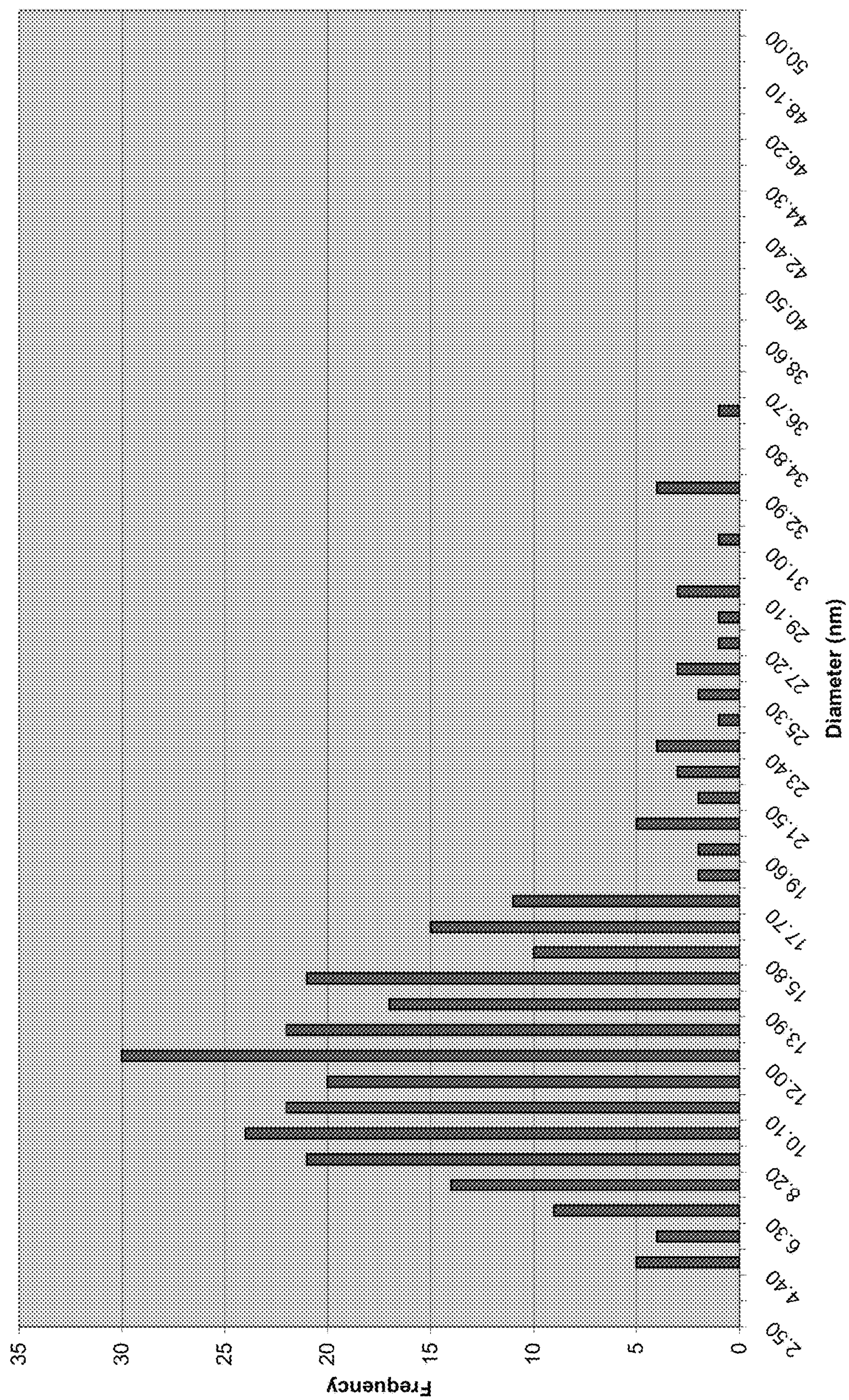
Figure 65A:
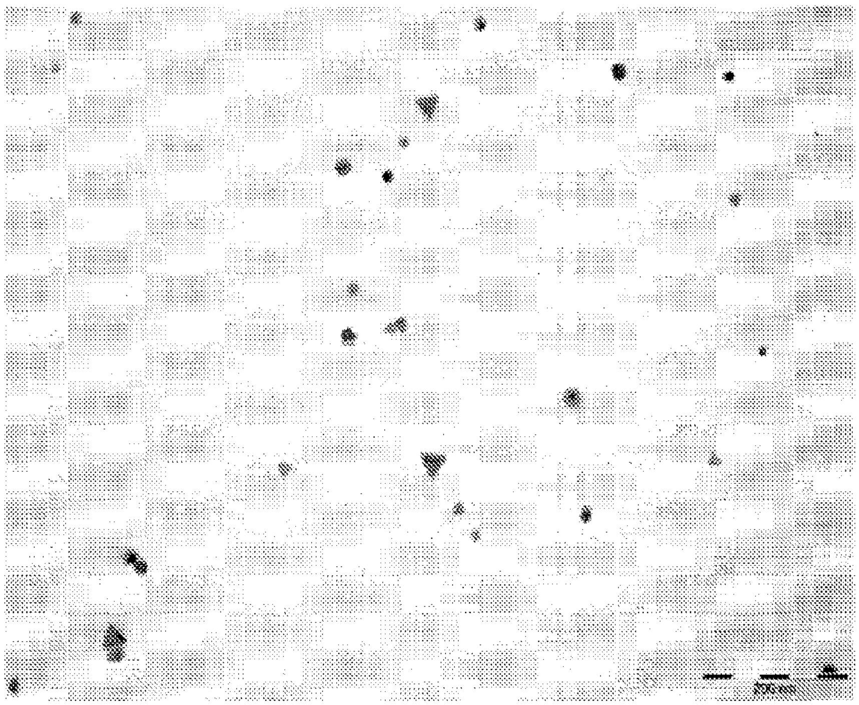
Figure 65A:
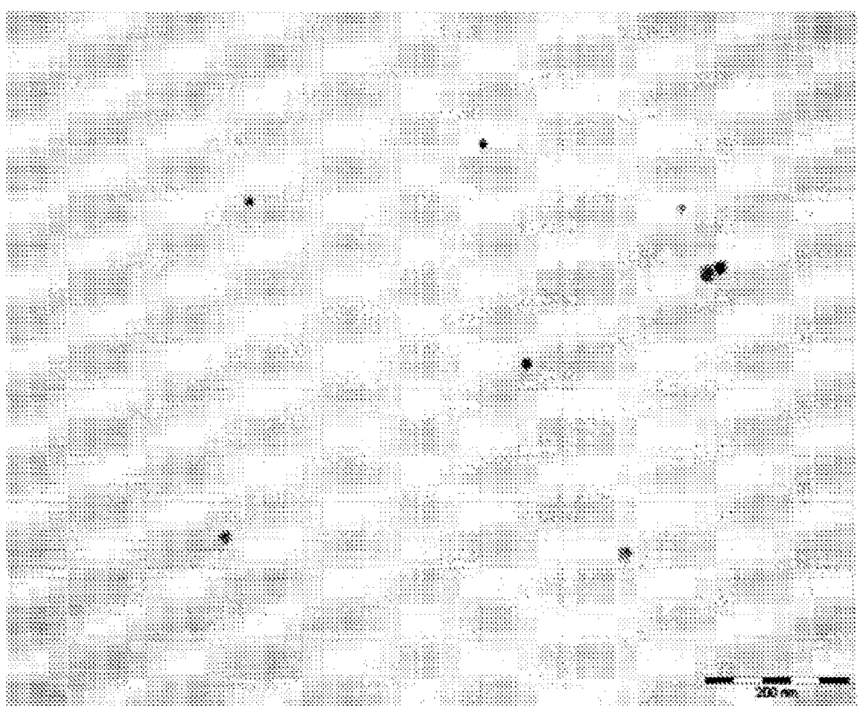
Figure 65B:
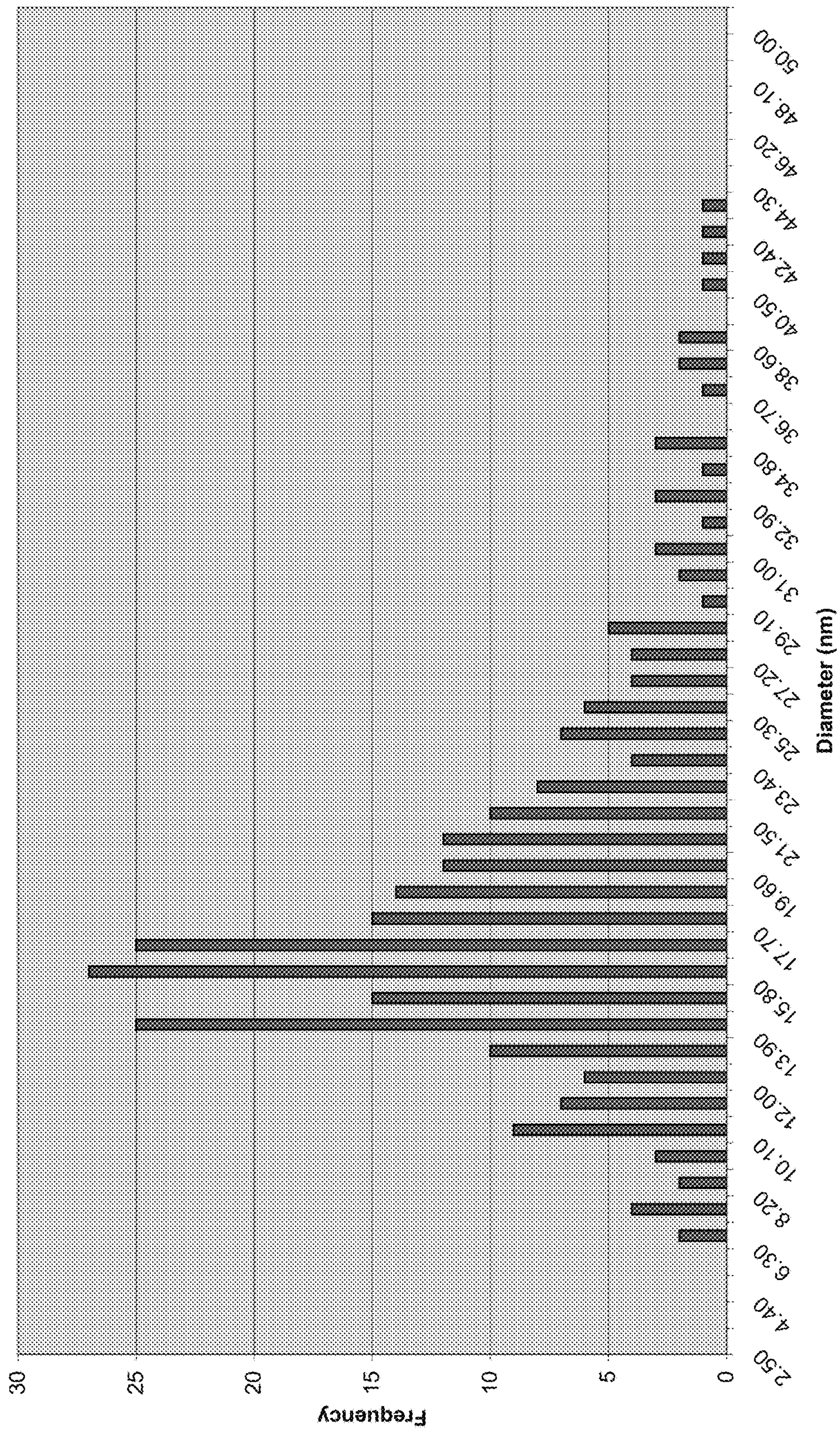
Figure 66A:
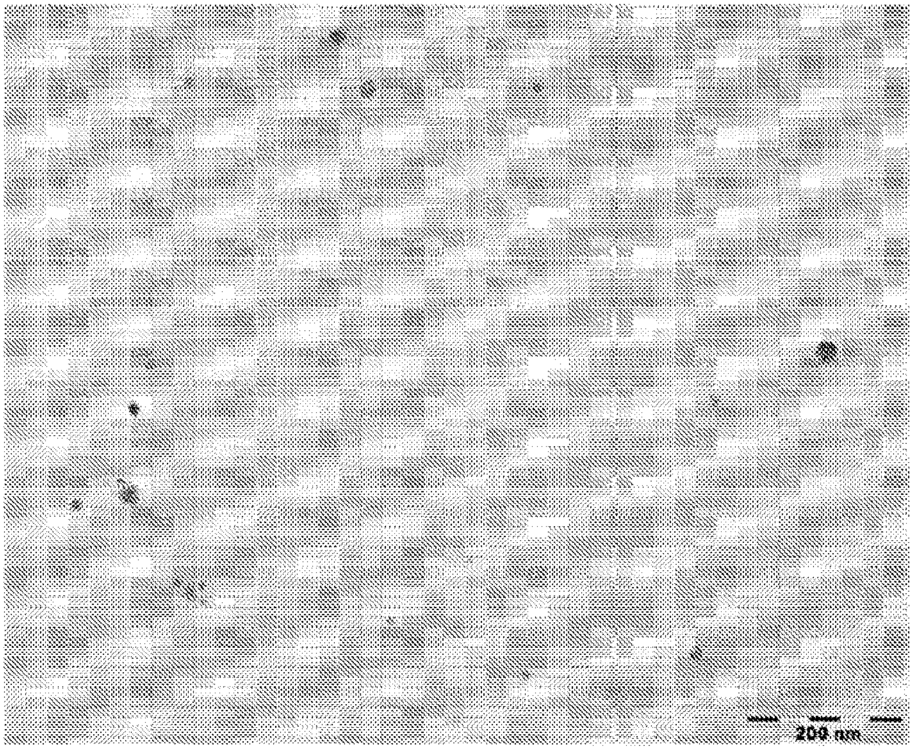
Figure 66A:
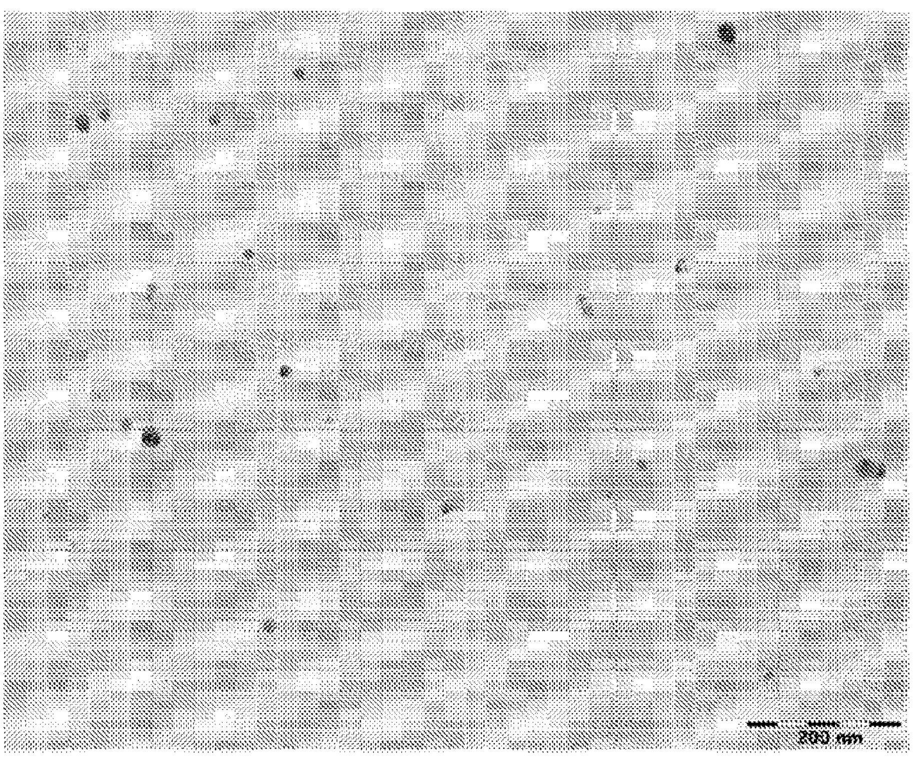
Figure 66B:
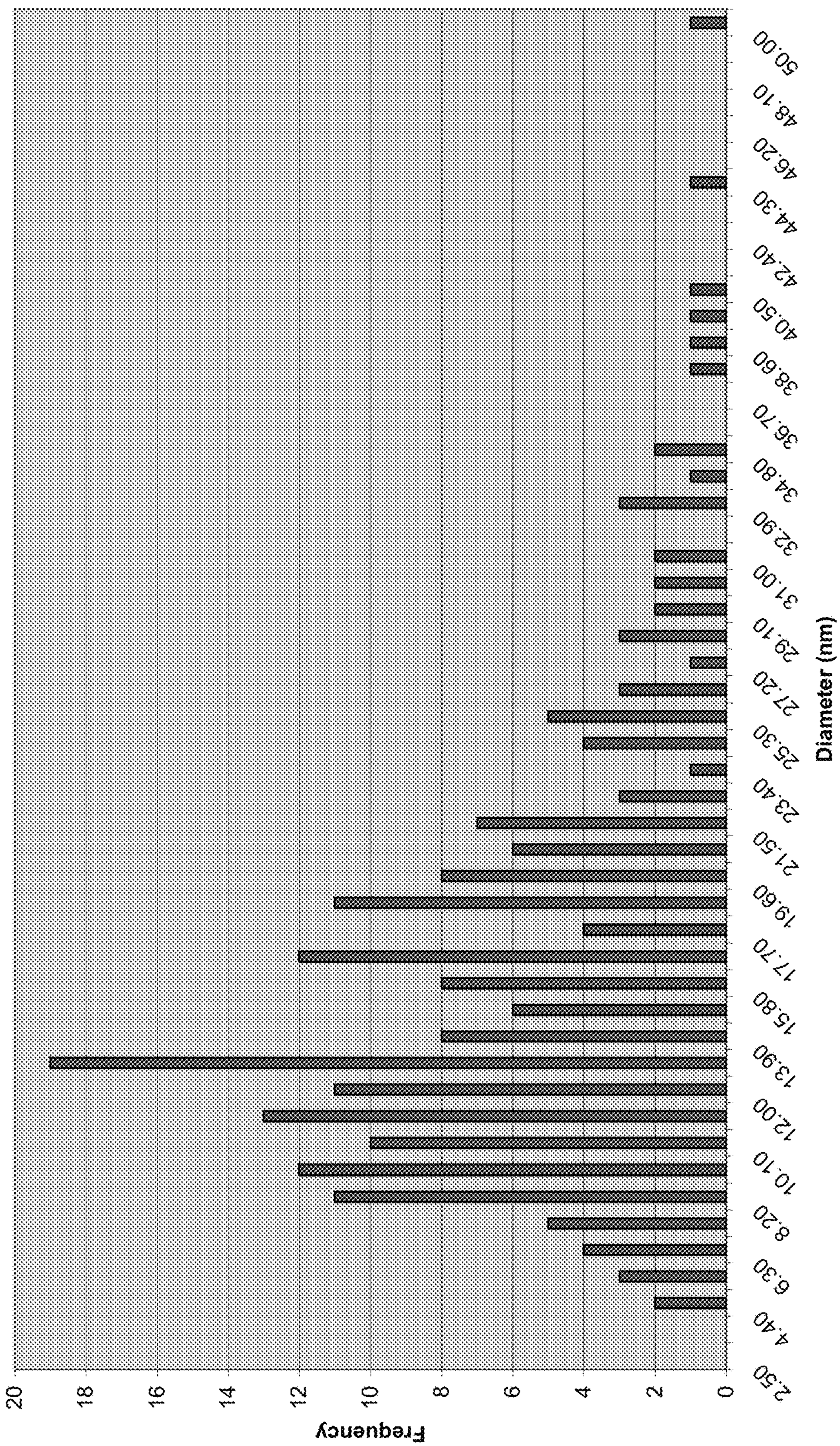
Figure 66C:
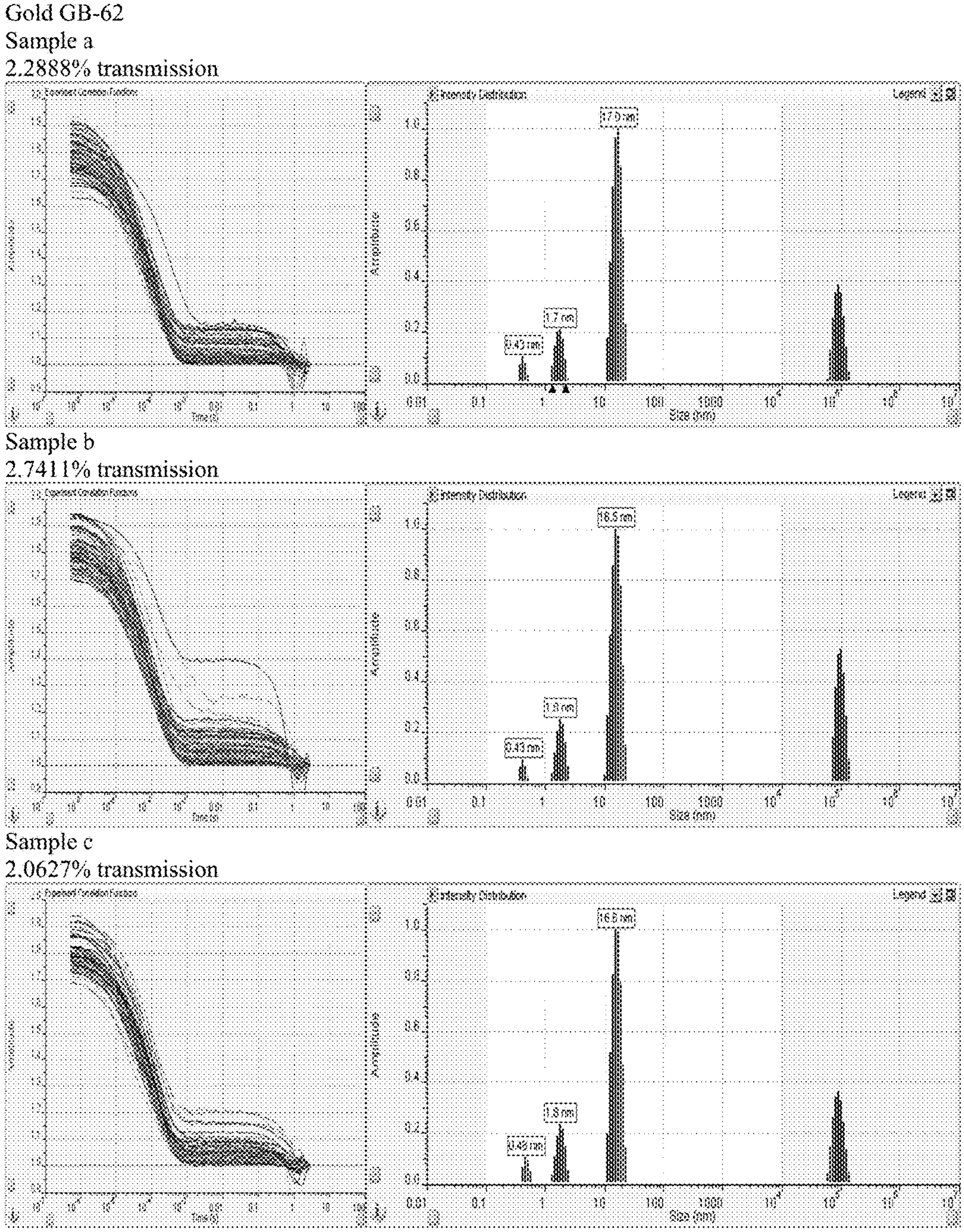
Figure 67A:
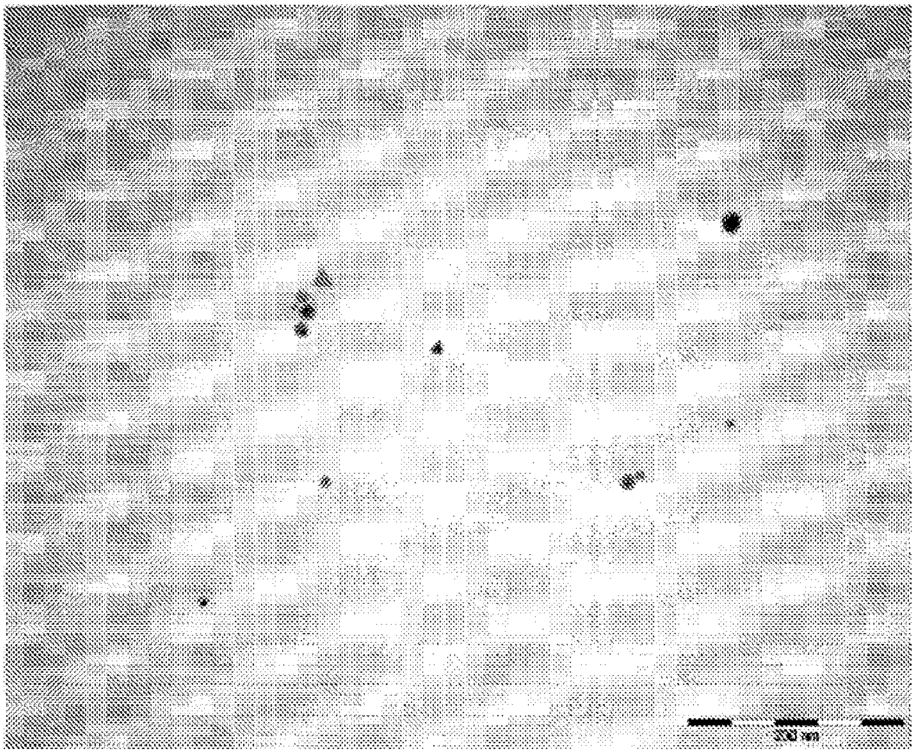
Figure 67A:
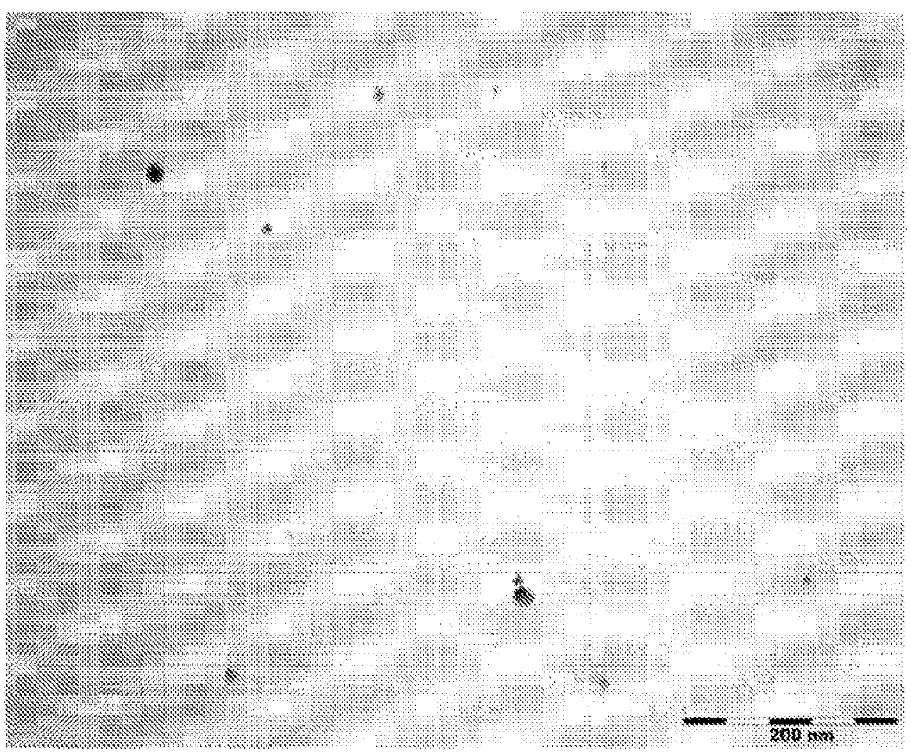
Figure 67B:
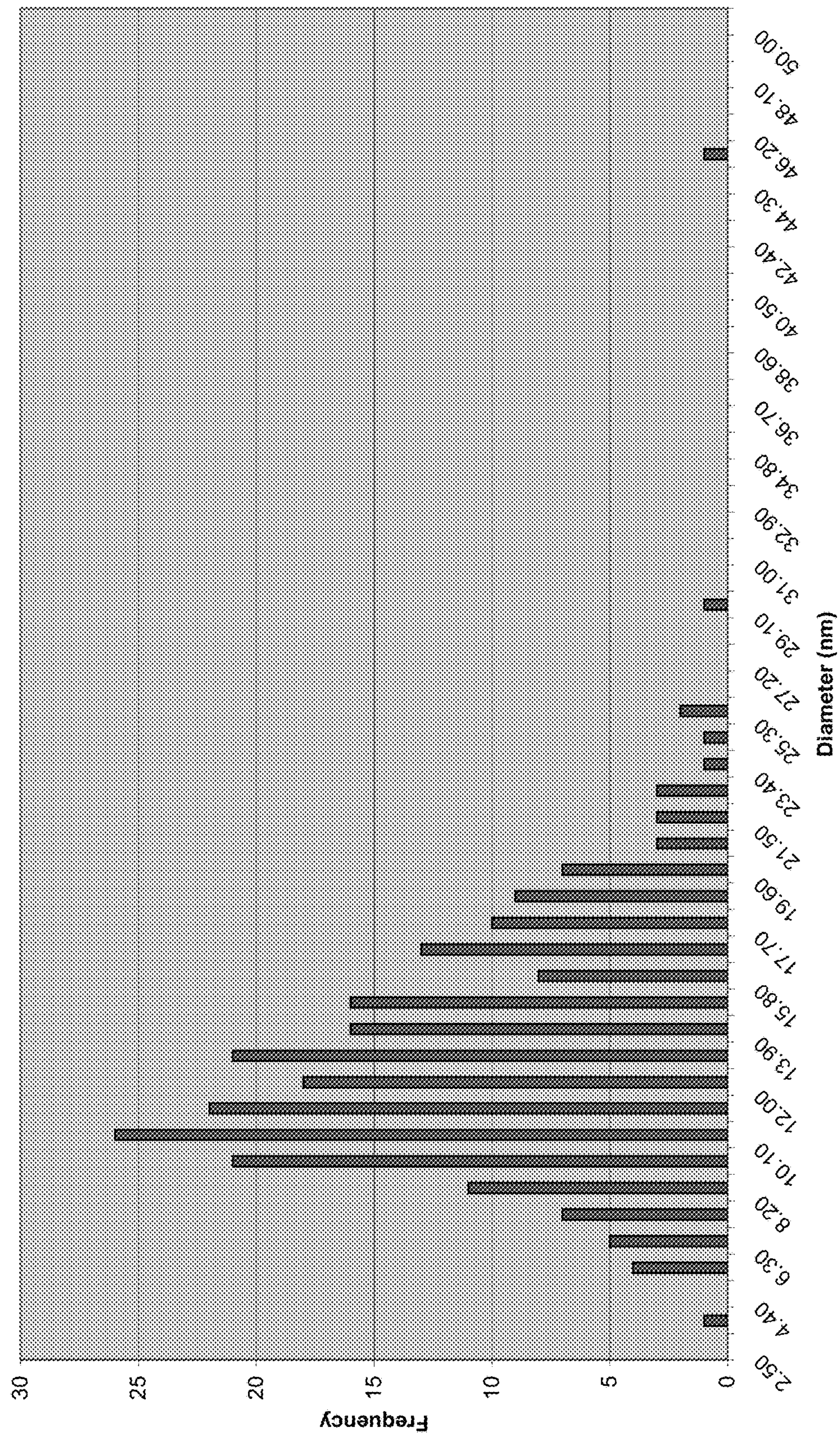
Figure 68A:
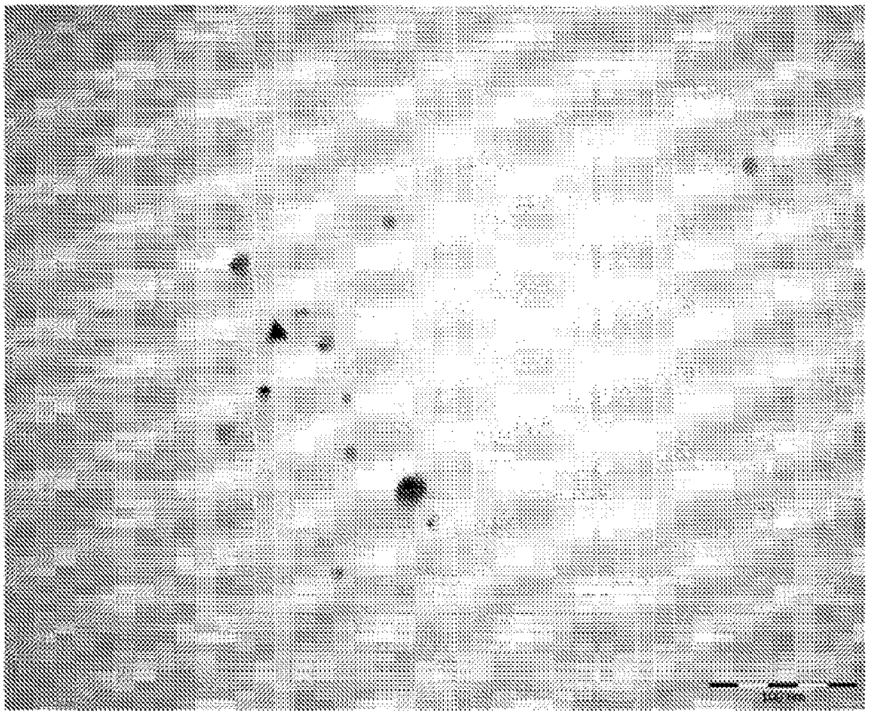
Figure 68A:
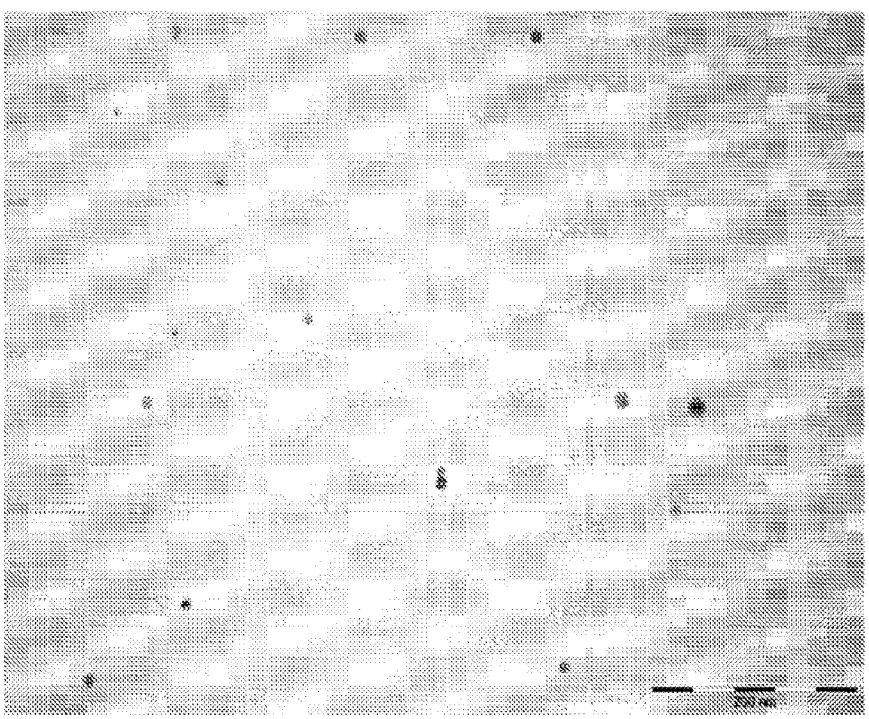
Figure 68B:
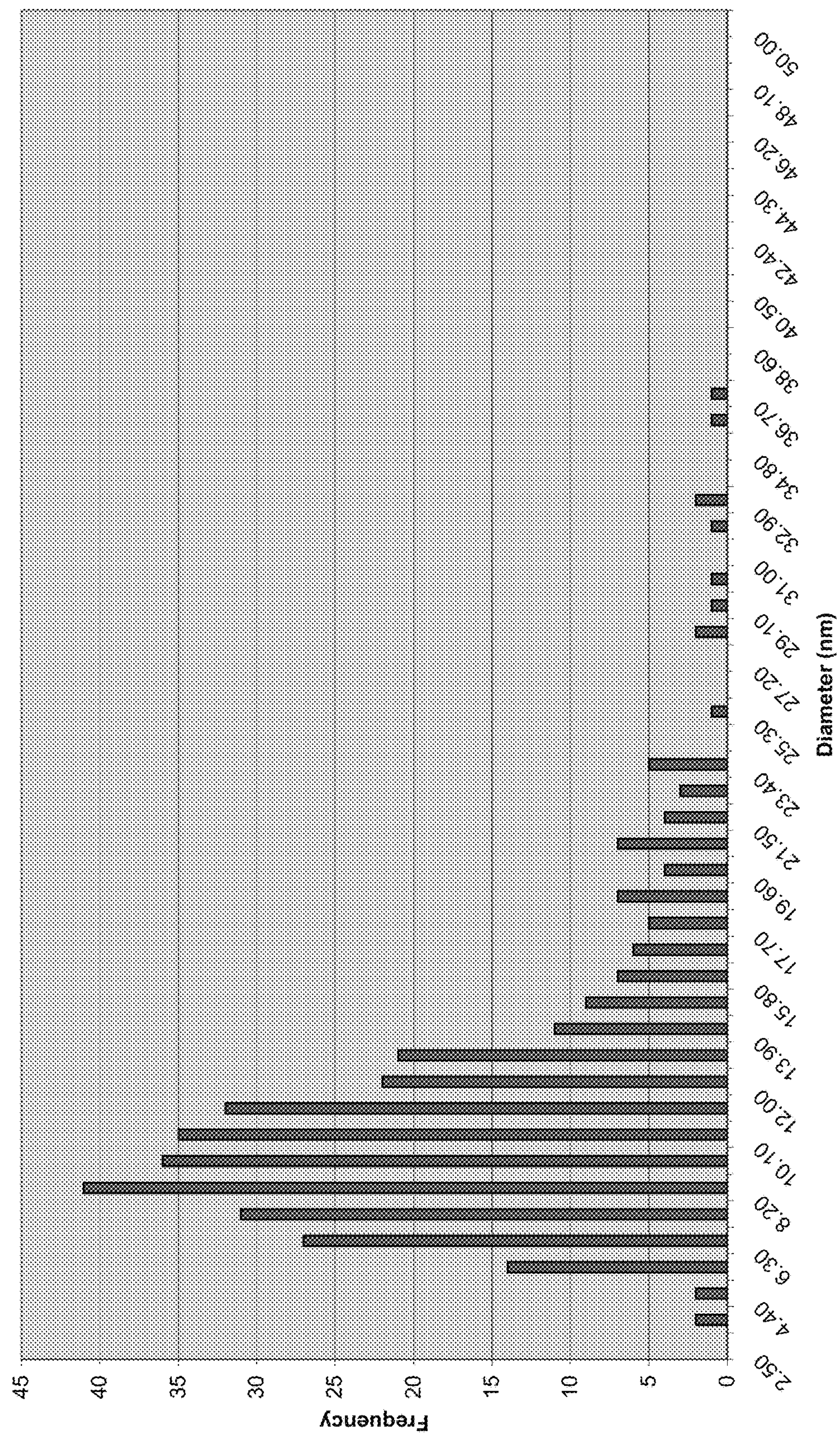

The movement of the electrodes 5 into the female receiver tubes o5 can occur by monitoring a variety of specific process parameters which change as a function of time (e.g., current, amps, nanoparticle concentration, optical density or color, conductivity, pH, etc.) or can be moved a predetermined amount at various time intervals to result in a fixed movement rate, whichever may be more convenient under the totality of the processing circumstances. In this regard, FIGS. 61D, 62D and 63D show that current was monitored/controlled as a function of time for each of the 16 electrodes used to make samples GB-139, GB-141 and GB-144, respectively, causing a vertical movement of the electrodes 5 into the female receiver tubes o5. Under these processing conditions, each electrode 5 was moved at a rate of about ¾inch every 8 hours (about 2.4 mm/hour) to maintain the currents reported in FIGS. 61D, 62D and 63D. FIGS. 62D and 63D show a typical ramp-up or pre-equilibrium phase where the current starts around 0.2-0.4 amps and increases to about 0.4-0.75 after about 20-30 minutes. Samples were collected only from the equilibrium phase. The pre-equilibrium phase occurs because the concentration of nanoparticles produced in the liquid 3" increases as a function of time until the concentration reaches equilibrium conditions, which equilibrium conditions remain substantially constant through the remainder of the processing due to the control processes disclosed herein.

Energy absorption spectra were obtained for the samples in Example 15 by using UV-VIS spectroscopy. This information was acquired using a dual beam scanning monochrometer system capable of scanning the wavelength range of 190 nm to 1100 nm. The Jasco V-530 UV-Vis spectrometer was used to collect absorption spectroscopy. Instrumentation was setup to support measurement of low-concentration liquid samples using one of a number of fuzed-quartz sample holders or "cuvettes". The various cuvettes allow data to be collected at 10 mm, 1 mm or 0.1 mm optic path of sample. Data was acquired over the wavelength range using between 250-900 nm detector with the following parameters; bandwidth of 2 nm, with data pitch of 0.5 nm, a silicon photodiode with a water baseline background. Both deuterium (D2) and halogen (WI) scan speed of 400 nm/mm sources were used as the primary energy sources. Optical paths of these spectrometers were setup to allow the energy beam to pass through the center of the sample cuvette. Sample preparation was limited to filling and capping the cuvettes and then physically placing the samples into the cuvette holder, within the fully enclosed sample compartment. Optical absorption of energy by the materials of interest was determined Data output was measured and displayed as Absorbance Units (per Beer-Lambert's Law) versus wavelength.

Spectral patterns in a UV-Visible range were obtained for each of the solutions/colloids produced in Example 15.

In general, UV-Vis spectroscopy is the measurement of the wavelength and intensity of absorption of near-ultraviolet and visible light by a sample. Ultraviolet and visible light are energetic enough to promote outer electrons to higher energy levels. UV-Vis spectroscopy can be applied to molecules and inorganic ions or complexes in solution.

The UV-Vis spectra have broad features that can be used for sample identification but are also useful for quantitative measurements. The concentration of an analyte in solution can be determined by measuring the absorbance at some wavelength and applying the Beer-Lambert Law.

Particle shapes contained within the solution/colloid GB-139 were determined by statistical analysis. In particular, about 30 different TEM photomicrographs (obtained as described elsewhere herein) were visually examined Each particle observed in each photomicrograph was categorized into one of three different categories, namely, 1) triangular; 2) pentagonal and; 3) other. A total of over 500 particles were categorized. The result of this analysis was, 1) that not less than about 15% of the particles were triangular; 2) that there was not less than about 29% of the particles that were pentagonal; and 3) the other shapes were not as discernable. However, some of the other shapes also showed a variety of crystal planes or facets. These were not analyzed in detail. However, at least about 50% of the particles present showed clearly at least one crystal face or plane.

Example 16

Manufacturing Gold-Based Nanoparticles/Nanoparticle Solutions or Colloids Aurora-002, Aurora-004, Aurora-006, Aurora-007, Aurora-009, Aurora-011, Aurora-012, Aurora-013, Aurora-014, Aurora-016, Aurora-017, Aurora-019, Aurora-020, Aurora-021, Aurora-022, Aurora-023, Aurora-024, Aurora-025, Aurora-026, Aurora-027, Aurora-028, Aurora-029 and Aurora-030

In general, Example 16 utilizes a trough member 30 and electrode 1/5 combination different from any of the other Examples disclosed herein. Specifically, this Example utilizes a first set of four electrodes 1 and a single electrode 5*a* in a trough member 30*a*' which create a plurality of plasmas 4, resulting in conditioned liquid 3'. The conditioned liquid 3' flows into and through a longitudinal trough member 30*b*', wherein parallelly located electrodes 5*b*/5*b*' are positioned along substantially the entire longitudinal or flow length of the trough member 30*b*'. Specific reference is made to FIGS. 42A, 42B, 42C and 42D which show various schematic and perspective views of this embodiment of the invention. Additionally, Table 13 contains relevant processing parameters associated with this embodiment of the invention.

TABLE 13

| Run ID: | | Aurora-002 | Aurora-004 | Aurora-006 | Aurora-007 | Aurora-009 | Aurora-011 | Aurora-012 | Aurora-013 | Aurora-014 |
|---|---|---|---|---|---|---|---|---|---|---|
| Flow Rate: | In (ml/min) | 300 | 300 | 150 | 150 | 150 | 300 | 450 | 60 | 60 |
| Volts: | Set # 1 | 1000 | 1000 | 1000 | 1000 | 1000 | 1000 | 1000 | 1000 | 1000 |
| | Electrodes 5b | 100 | 120 | 100 | 50 | 100 | 90 | 110 | 50 | 40 |
| # of Electrodes 1 | | 4 | 4 | 4 | 4 | 4 | 4 | 4 | 4 | 4 |
| PE: NaHCO3 (mg/ml) | | 0.396 | 0.396 | 0.396 | 0.396 | 0.396 | 0.396 | 0.396 | 0.396 | 0.396 |
| Wire Diameter (mm) | | 0.5 | 0.5 | 0.5 | 0.5 | 0.5 | 0.5 | 0.5 | 0.5 | 0.5 |
| Electrode Config. Figure | | 42a | 42a | 42a | 42a | 42a | 42a | 42a | 42a | 42a |

TABLE 13-continued

| | | | | | | | | | | |
|---|---|---|---|---|---|---|---|---|---|---|
| Produced Au PPM | | 12.3 | 15.9 | 39.6 | 4.1 | 17.8 | 17.4 | 12.7 | 46.5 | 65.7 |
| Dimensions | Plasma 4 Figs. | 42a | 42a | 42a | 42a | 42a | 42a | 42a | 42a | 42a |
| | Process Figures | 42a, 42b, 42c, 42d | 42a, 42b, 42c, 42d | 42a, 42b, 42c, 42d | 42a, 42b, 42c, 42d | 42a, 42b, 42c, 42d | 42a, 42b, 42c, 42d | 42a, 42b, 42c, 42d | 42a, 42b, 42c, 42d | 42a, 42b, 42c, 42d |
| | Wire Length (in) "$W_L$" | 54 | 54 | 54 | 54 | 54 | 54 | 54 | 54 | 54 |
| | $L_T$ (in/mm) | 59/1500 | 59/1500 | 59/1500 | 59/1500 | 59/1500 | 59/1500 | 59/1500 | 59/1500 | 59/1500 |
| | wire apart (in/mm) "b" | 0.125/3.2 | 0.125/3.2 | 0.125/3.2 | 0.125/3.2 | 0.125/3.2 | 0.063/1.6 | 0.063/1.6 | 0.063/1.6 | 0.063/1.6 |
| Electrode Curr. (A) | | 10.03 | 14.2 | 15.3 | 5.2 | 11.9 | 15.9 | 19.5 | 10 | 7.87 |
| Hydrodynamic r (nm) | | 23.2 | 19.4 | 23.2 | 26.2 | 19.6 | 16.3 | 13.1 | 26.2 | 22.0 |
| TEM Avg. Dia. (nm) | | n/a | n/a | n/a | n/a | n/a | n/a | n/a | n/a | n/a |

| Run ID: | | Aurora-016 | Aurora-017 | Aurora-019 | Aurora-020 | Aurora-021 | Aurora-022 | Aurora-023 | Aurora-024 | Aurora-025 |
|---|---|---|---|---|---|---|---|---|---|---|
| Flow Rate: | In (ml/min) | 60 | 30 | 30 | 30 | 30 | 60 | 60 | 60 | 60 |
| Volts: | Set # 1 | 1000 | 1000 | 1000 | 1000 | 1000 | 1000 | 1000 | 1000 | 1000 |
| | Electrodes 5b | 30 | 30 | 30 | 50 | 50 | 50 | 80 | 30 | 30 |
| # of Electrodes 1 | | 4 | 4 | 1 | 1 | 4 | 4 | 4 | 4 | 4 |
| PE: NaHCO3 (mg/ml) | | 0.396 | 0.396 | 0.396 | 0.396 | 0.396 | 0.396 | 0.396 | 3.963 | 3.963 |
| Wire Diameter (mm) | | 0.5 | 0.5 | 0.5 | 0.5 | 0.5 | 0.5 | 0.5 | 0.5 | 0.5 |
| Electrode Config. Figure | | 42a | 42a | 42a | 42a | 42a | 42a | 42a | 42a | 42a |
| Produced Au PPM | | 35.5 | 24.8 | 22.5 | 128.2 | 67.1 | 64.2 | 73.8 | 0.8 | 0.5 |
| Dimensions | Plasma 4 Figs. | 42a | 42a | 42a | 42a | 42a | 42a | 42a | 42a | 42a |
| | Process Figures | 42a, 42b, 42c, 42d | 42a, 42b, 42c, 42d | 42a, 42b, 42c, 42d | 42a, 42b, 42c, 42d | 42a, 42b, 42c, 42d | 42a, 42b, 42c, 42d | 42a, 42b, 42c, 42d | 42a, 42b, 42c, 42d | 42a, 42b, 42c, 42d |
| | Wire Length (in) "$W_L$" | 54 | 54 | 54 | 54 | 54 | 54 | 50 | 50 | 50 |
| | $L_T$ (in/mm) | 59/1500 | 59/1500 | 59/1500 | 59/1500 | 59/1500 | 59/1500 | 59/1500 | 59/1500 | 59/1500 |
| | wire apart (in/mm) "b" | 0.063/1.6 | 0.063/1.6 | 0.063/1.6 | 0.063/1.6 | 0.063/1.6 | 0.063/1.6 | 0.063/1.6 | 0.063/1.6 | 0.063/1.6 |
| Electrode Curr. (A) | | 5.18 | 4.95 | 4.65 | 10.7 | 10 | 9.8 | 18 | 17 | 14.96 |
| Hydrodynamic r (nm) | | 26.6 | 27.4 | 26.0 | 31.0 | 27.1 | 28.3 | 27.0 | n/a | n/a |
| TEM Avg. Dia. (nm) | | n/a | n/a | n/a | 16-40 | n/a | n/a | n/a | n/a | n/a |

| Run ID: | | Aurora-026 | Aurora-027 | Aurora-028 | Aurora-029 | Aurora-030 |
|---|---|---|---|---|---|---|
| Flow Rate: | In (ml/min) | 60 | 60 | 60 | 60 | 60 |
| Volts: | Set # 1 | 1000 | 1000 | 1000 | 1000 | 1000 |
| | Electrodes 5b | 30 | 30 | 100 | 130 | 150 |
| # of Electrodes 1 | | 4 | 4 | 4 | 4 | 4 |
| PE: NaHCO3 (mg/ml) | | 3.963 | 3.963 | 0.106 | 0.106 | 0.106 |
| Wire Diameter (mm) | | 0.5 | 0.5 | 0.5 | 0.5 | 0.5 |
| Electrode Config. Figure | | 42a | 42a | 42a | 42a | 42a |
| Produced Au PPM | | 3.7 | 2.0 | 8.1 | 21.6 | 41.8 |
| Dimensions | Plasma 4 Figs. | 42a | 42a | 42a | 42a | 42a |
| | Process Figures | 42a, 42b, 42c, 42d | 42a, 42b, 42c, 42d | 42a, 42b, 42c, 42d | 42a, 42b, 42c, 42d | 42a, 42b, 42c, 42d |
| | Wire Length (in) "$W_L$" | 50 | 50 | 50 | 50 | 50 |
| | $L_T$ (in/mm) | 59/1500 | 59/1500 | 59/1500 | 59/1500 | 59/1500 |
| | wire apart (in/mm) "b" | 0.063/1.6 | 0.063/1.6 | 0.063/1.6 | 0.063/1.6 | 0.063/1.6 |
| Electrode Curr. (A) | | 13.4 | 16.32 | 6.48 | 10 | 12 |
| Hydrodynamic r (nm) | | 33.7 and 77.5 | n/a | 26.1 | 21.9 | 25.2 |
| TEM Avg. Dia. (nm) | | n/a | n/a | n/a | n/a | n/a |

Figure 42A:
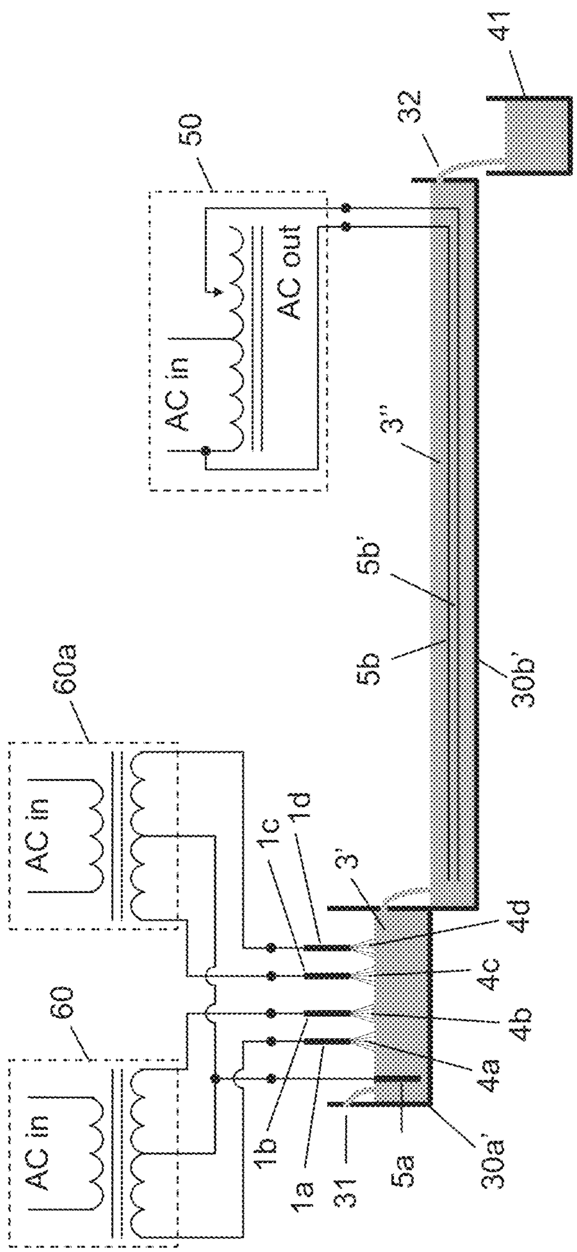
FIGS. 42A-42D show various schematic and perspective views of an alternative trough embodiment utilized in Example 16.
Figure 42B:
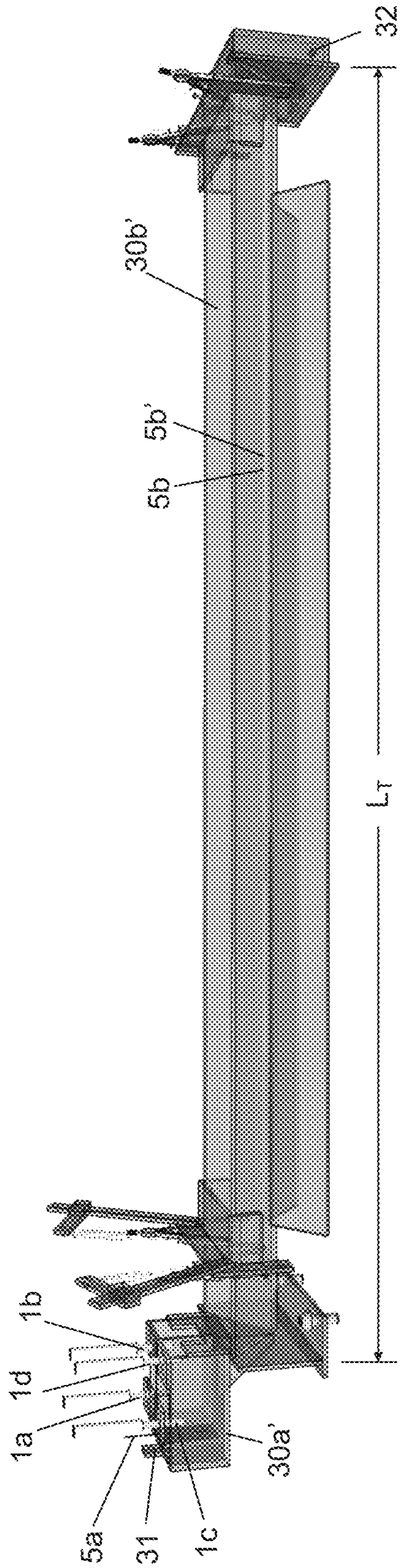
Figure 42C:
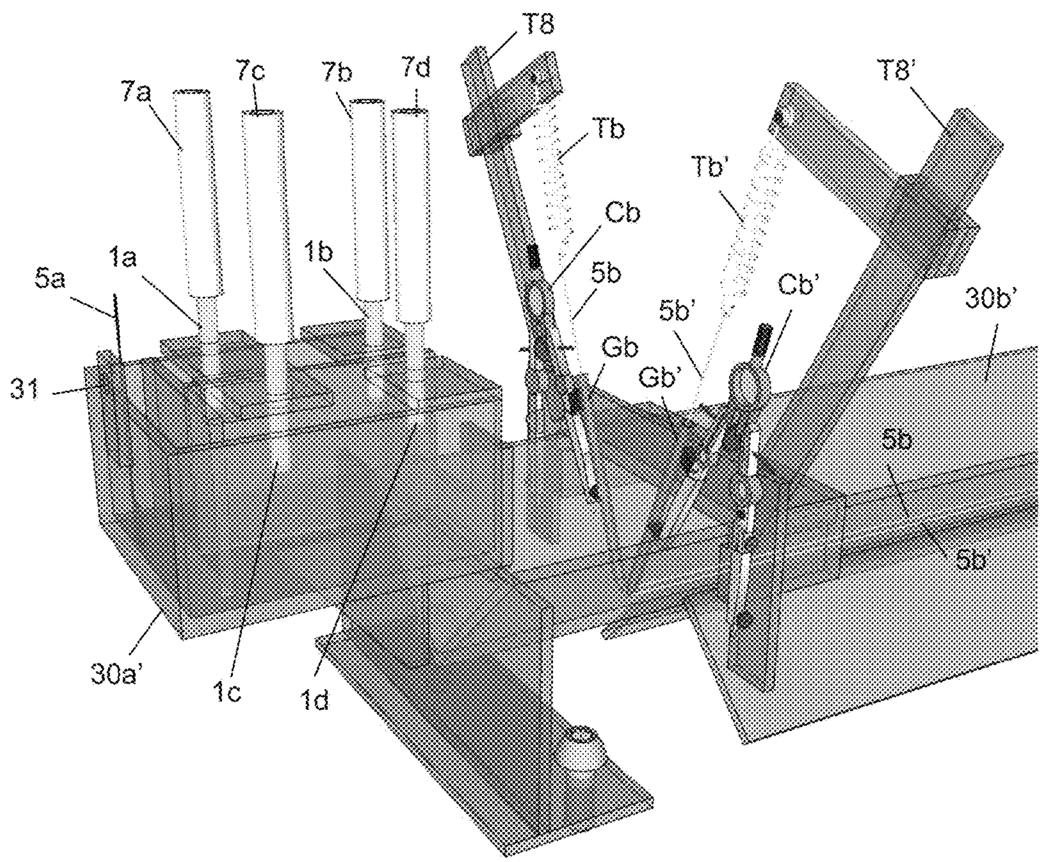
Figure 42D:
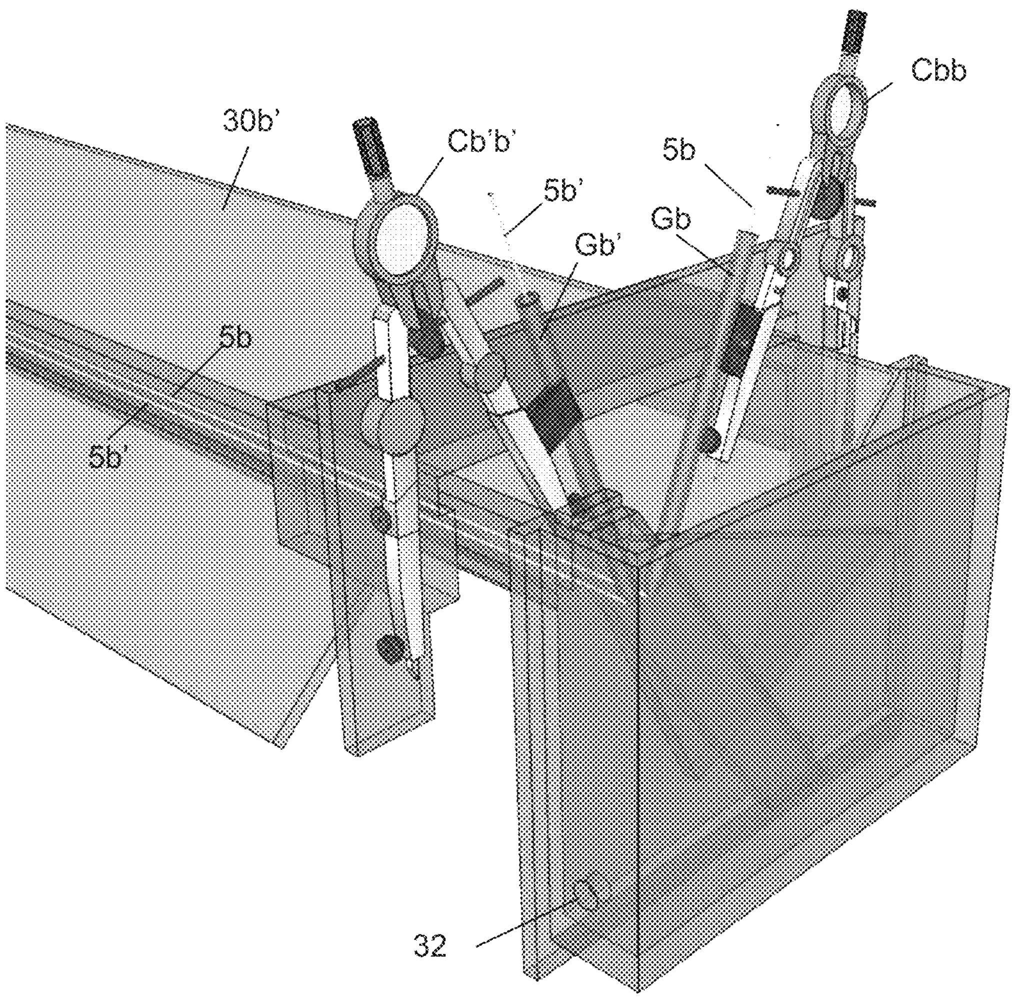

With regard to FIG. 42A, two AC power sources 60 and 60*a* are electrically connected as shown and create four separate plasmas 4*a*, 4*b*, 4c and 4d at four corresponding electrodes 1*a*, 1*b*, 1*c* and 1*d*, in a first trough member portion 30*a*'. As shown in FIG. 42A, only a single electrode 5*a* is electrically connected to all four electrodes 1. These power sources 60 and 60*a* are the same power sources reported in other Examples herein. Two different amounts of processing enhancer $NaHCO_3$ were added to the liquid 3 prior to the four plasmas 4*a*-4*d* conditioning the same as reported in Table 13. The amount and type of processing enhancer reported should not be construed as limiting the invention. The rate of flow of the liquid 3/3' into and out of the trough member 30*a*', as well as into the trough member 30*b*' is also reported in Table 13. The rate of flow out of the trough member 30*b*' was approximately 5% to 50% lower due to liquid loss in evaporation, with higher evaporation at higher power input at electrodes 5*b*/5*b*'. Varying flow rates for the liquid 3/3' can be utilized in accordance with the teachings herein.

Only one set of electrodes 5*b*/5*b*' was utilized in this particular embodiment. These electrodes 5*b*/5*b*' were connected to an AC power source 50, as described in the other Examples herein. The gold wire electrodes 5*b*/5*b*' used in this particular Example were the same gold wires, with dimensions as reported in Table 13, that were used in the other Examples reported herein. However, a relatively long length (i.e., relative to the other Examples herein) of gold wire electrodes was located along the longitudinal length $L_T$ of the trough member 30*b*'. The wire length for the electrodes 5*b*/5*b*' is reported in Table 13. Two different wire lengths either 50 inches (127 cm) or 54 inches (137 cm) were utilized. Further, different transverse distances between the wires 5*b*/5*b*' are also reported. Two separate transverse distances are reported herein, namely, 0.063 inches (1.6 mm) and 0.125 inches (3.2 mm) Different electrode 5*b*/5*b*' lengths are utilizable as well as a plurality of different transverse distances between the electrodes 5*b*/5*b*'.

The wire electrodes 5*b*/5*b*' were spatially located within the liquid 3" in the trough member 30*b*' by the devices Gb, Gb', T8, T8', Tb and Tb' near the input end 31 (refer to FIG. 42C) and corresponding devices Gb, Gb', Cb, Cb', Cbb and Cb'b'near the output end 32. It should be understood that a variety of devices could be utilized to cause the electrodes 5*b*/5*b*' to be contiguously located along the trough member 30*b*' and those reported herein are exemplary. Important requirements for locating the electrodes 5*b*/5*b*' include the ability to maintain desired transverse separation between the electrodes along their entire lengths which are in contact with the liquid 3" (e.g., contact of the electrodes with each other would cause an electrical short circuit). Specifically, the electrodes 5*b*/5*b*' are caused to be drawn through guide members Gb and Gb' made of polycarbonate near the input end 31 and the glass near output end 32. The members Gb and Gb' at each end of the trough member 30*b*' are adjusted in location by the compasses Cbb, Cb'b' near an output end 32 of the trough member 30*b*' and similar compasses Cb and Cb' at the opposite end of the trough 30*b*'. Electrical connection to the electrodes 5*b*/5*b*' was made at the output end 32 of the trough member 30*b*' near the top of the guide members Gb and Gb'. Tension springs Tb and Tb' are utilized to keep the electrode wires 5*b*/5*b*' taught so as to maintain the electrodes in a fixed spatial relationship to each other. In this regard, the electrodes 5*b*/5*b*' can be substantially parallel along their entire length, or they can be closer at one end thereof relative to the other (e.g., creating different transverse distances along their entire length). Controlling the transverse distance(s) between electrode 5*b*/5*b*' influences current, current density concentration, voltages, etc. Of course, other positioning means will occur to those of ordinary skill in the art and the same are within the metes and bounds of the present invention.

Table 13 shows a variety of relevant processing conditions, as well as certain results including, for example, "Hydrodynamic r" (i.e., hydrodynamic radii (reported in nanometers)) and the process current that was applied across the electrodes 5*b*/5*b*'. Additionally, resultant ppm levels are also reported for a variety of process conditions with a low of about 0.5 ppm and a high of about 128 ppm.

Figure 69A:
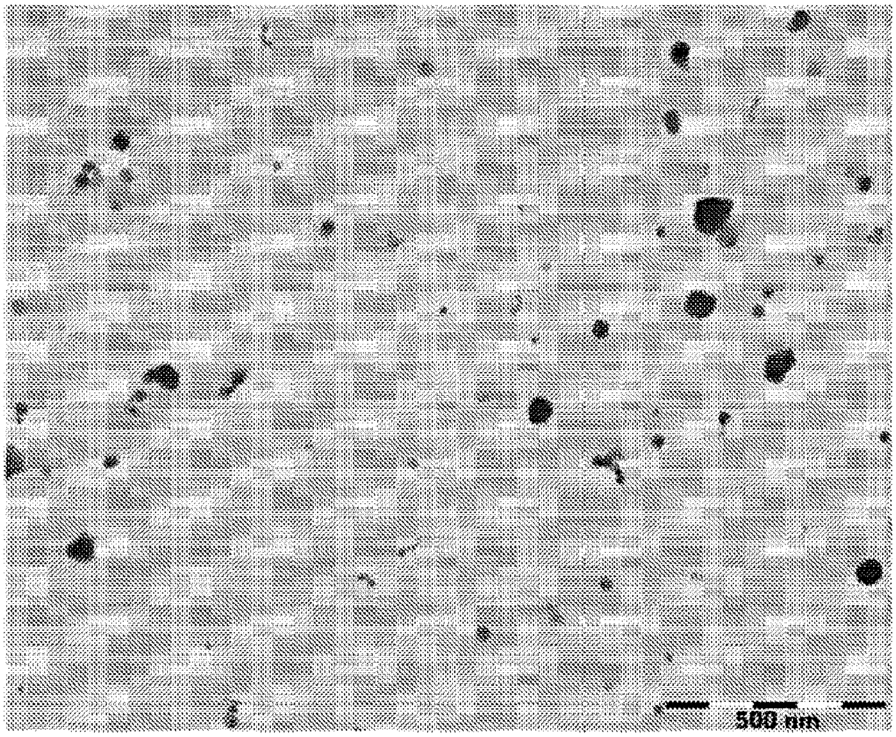
FIG. 69AA and FIG. 69AB show two representative TEM photomicrographs for sample Aurora-020.
Figure 69A:
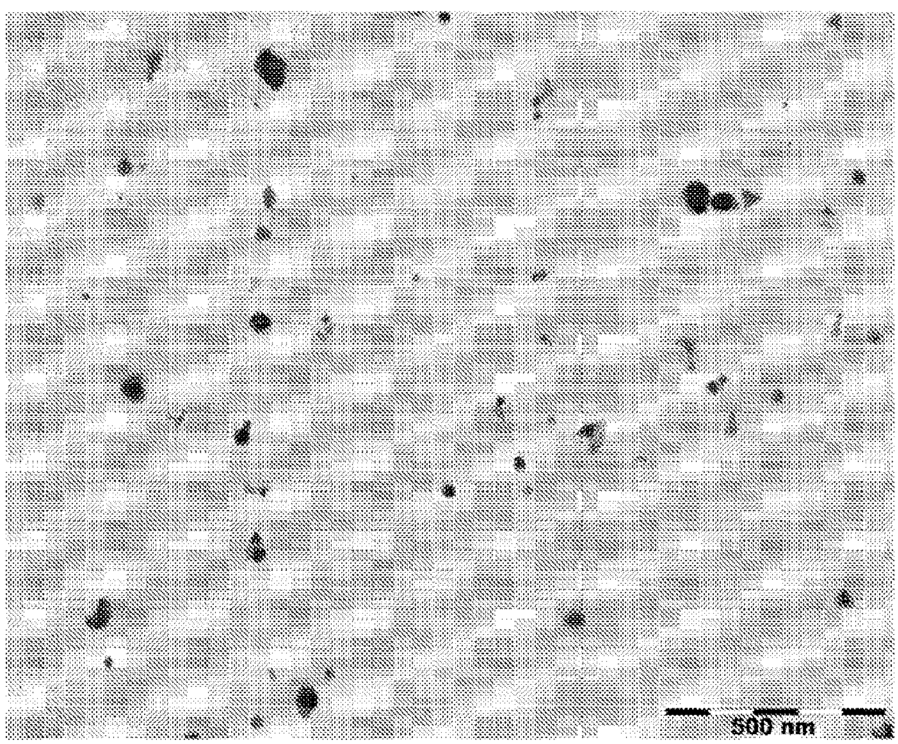

FIG. 69AA and FIG. 69AB show two representative TEM photomicrographs of the gold nanoparticles, dried from the solution or colloid Aurora-020, which has a reported 128 ppm concentration of gold measured next day after synthesis. In two weeks the concentration of that sample reduced to 107 ppm, after another 5 weeks the concentration reduced to 72 ppm.

Figure 69B:
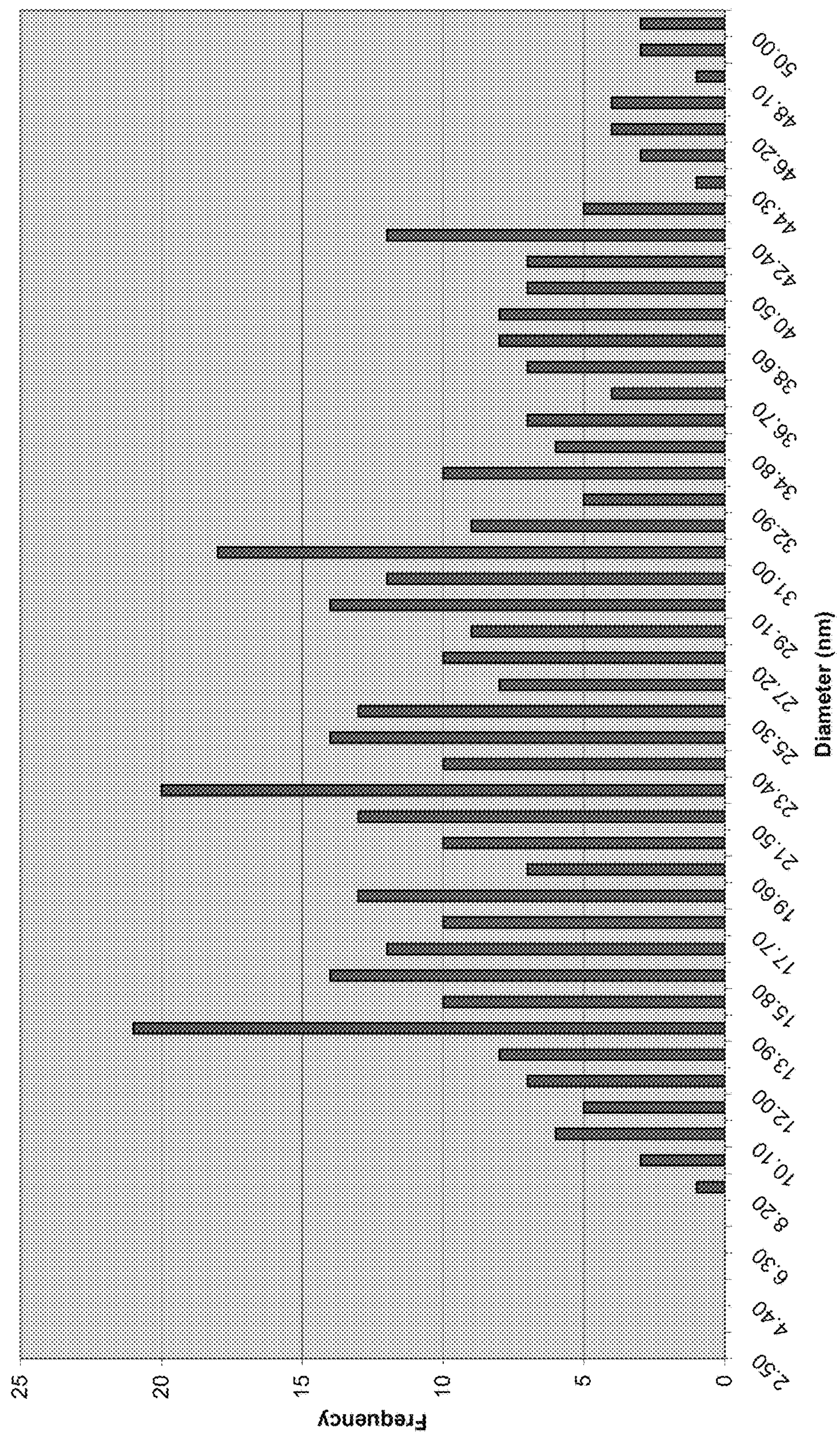
FIG. 69B shows the particle size distribution histogram from TEM measurements for the nanoparticles corresponding to dried sample Aurora-020.
Figure 70A:
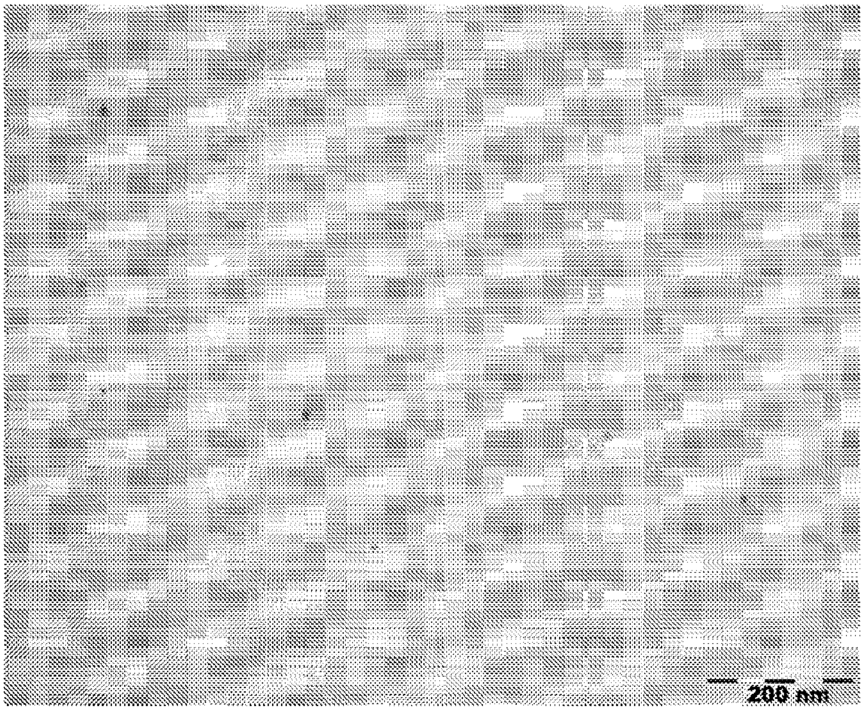
FIGS. 70AA-76AA and FIGS. 70AB-76AB show two representative TEM photomicrographs for dried samples GA-002, GA-003, GA-004, GA-005, GA-009, GA-011 and GA-013, respectively.
Figure 70A:
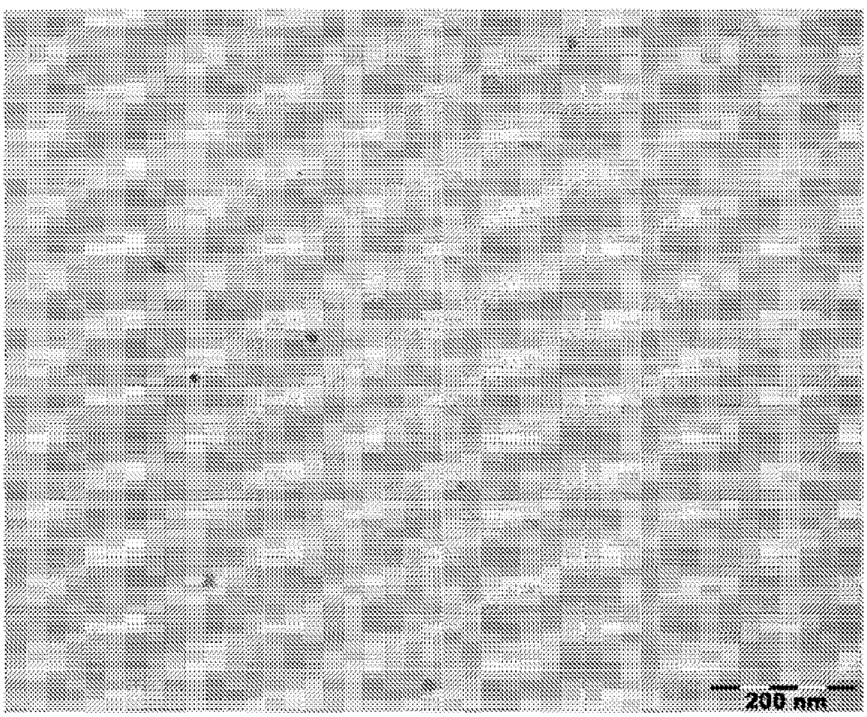
Figure 70B:
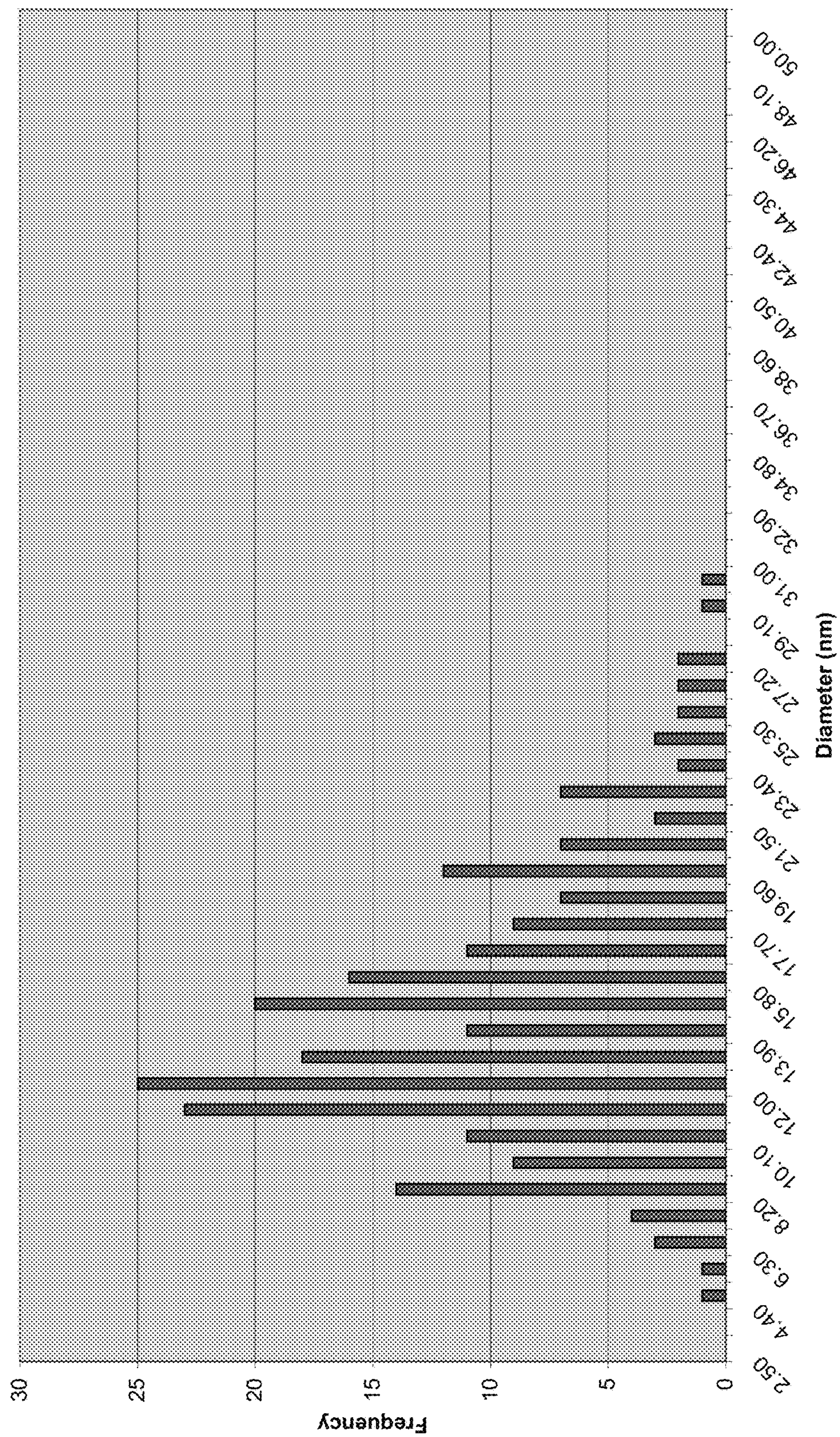
Figure 71A:
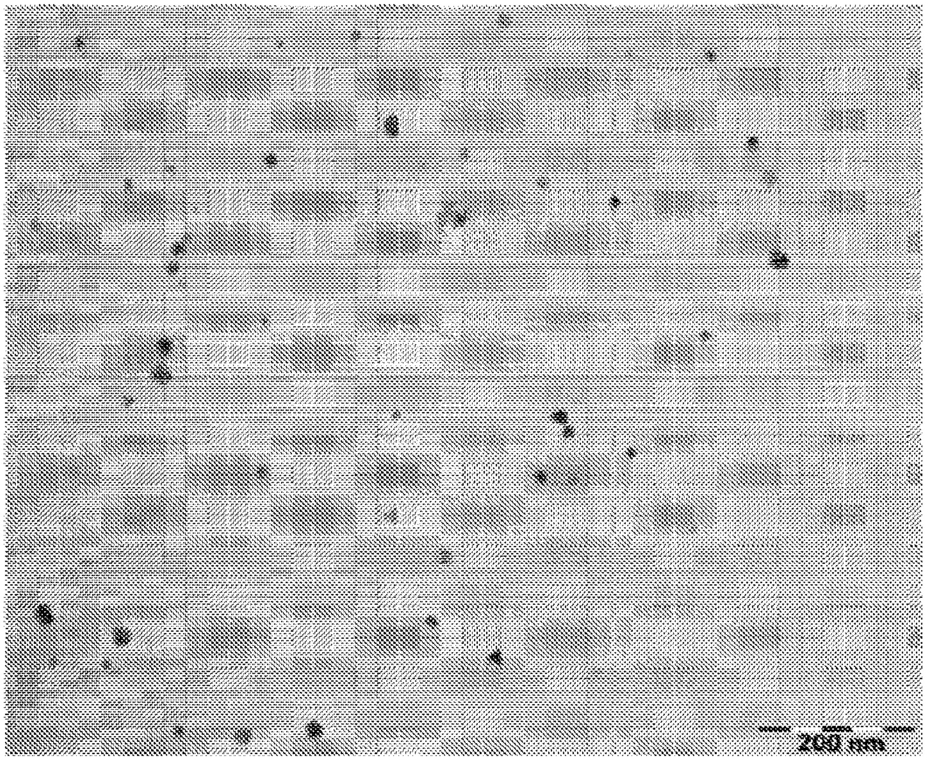
Figure 71A:
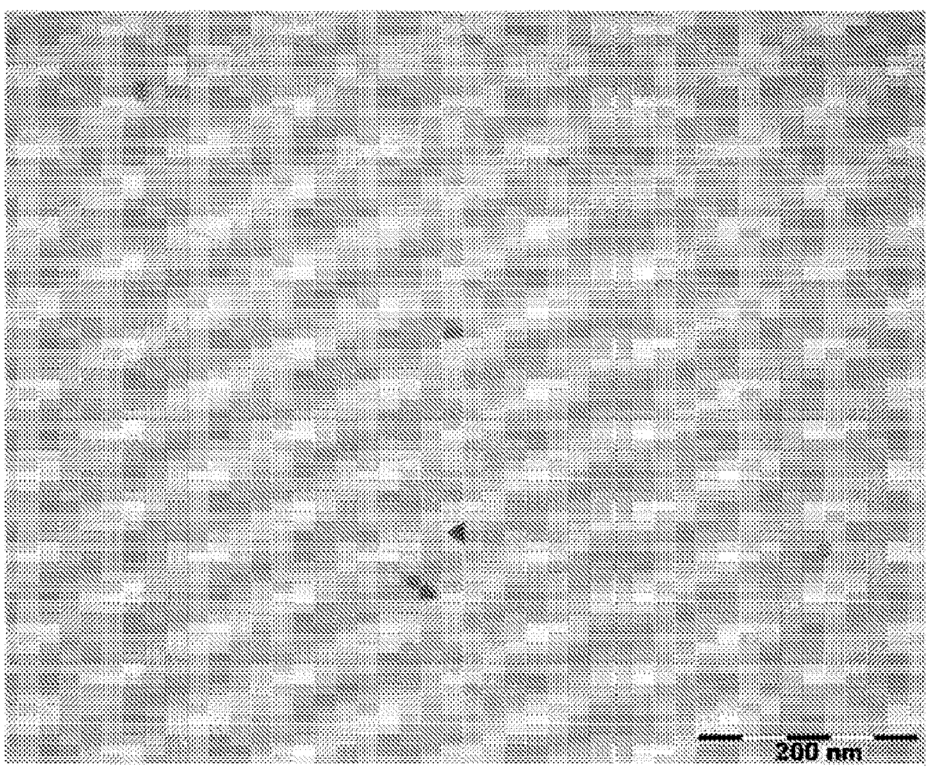
Figure 71B:
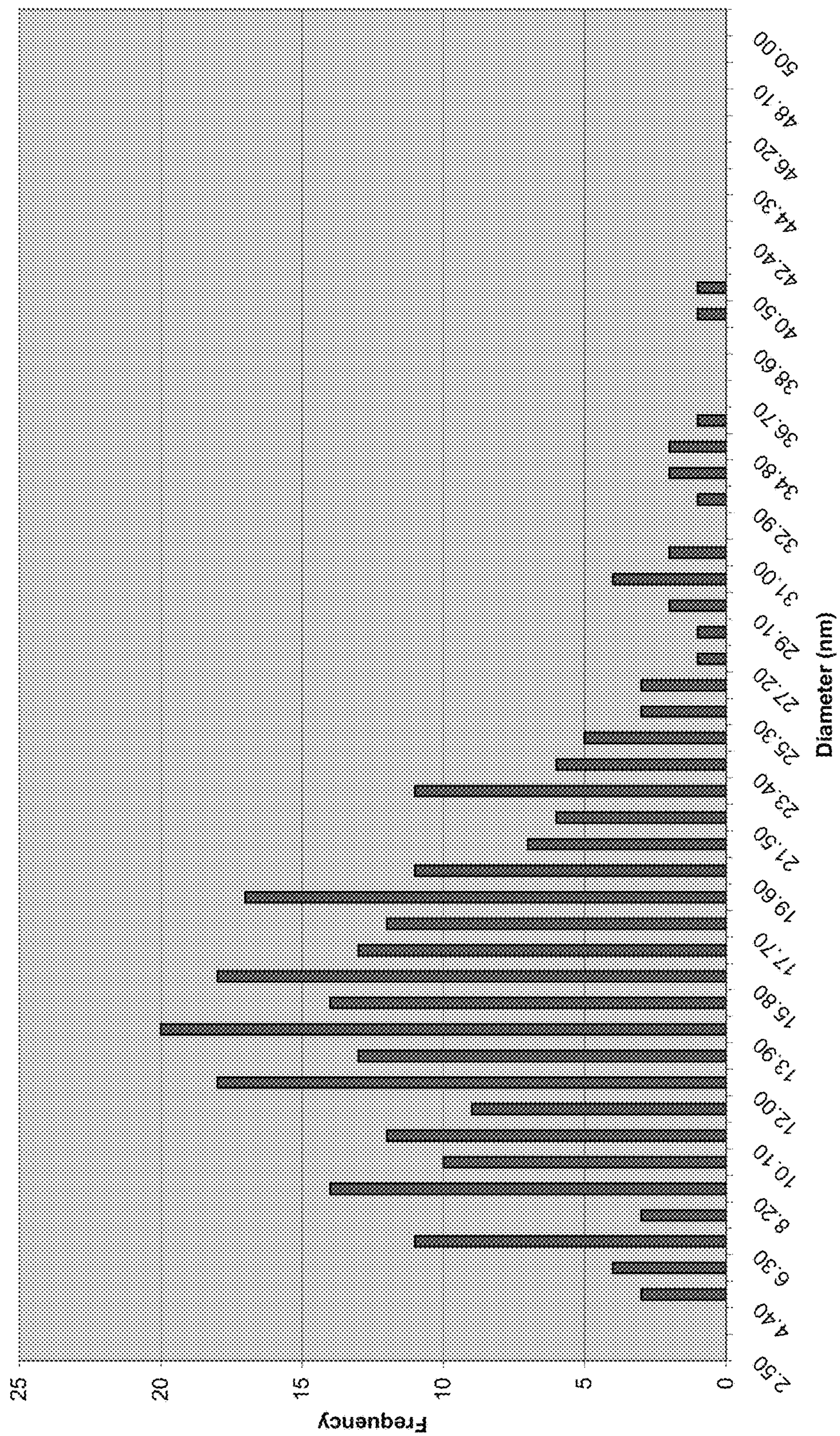
Figure 72A:
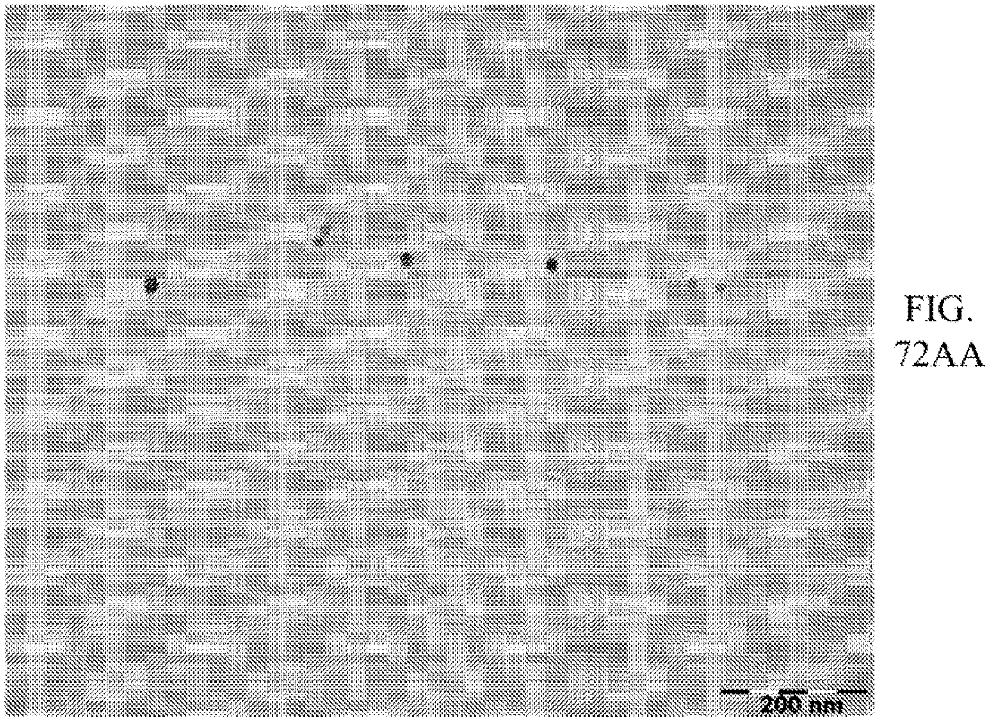
Figure 72A:
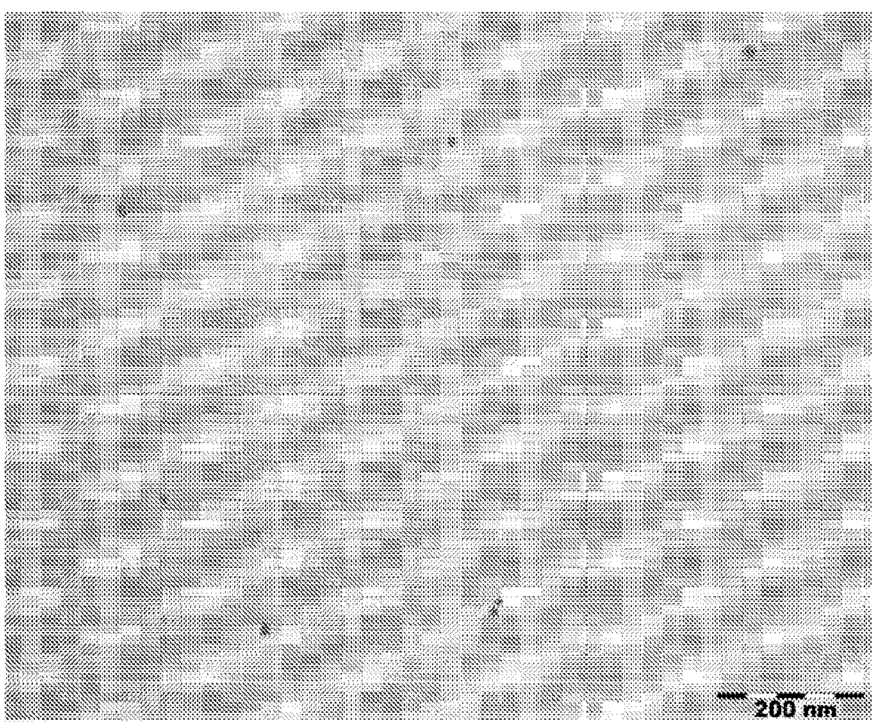
Figure 72B:
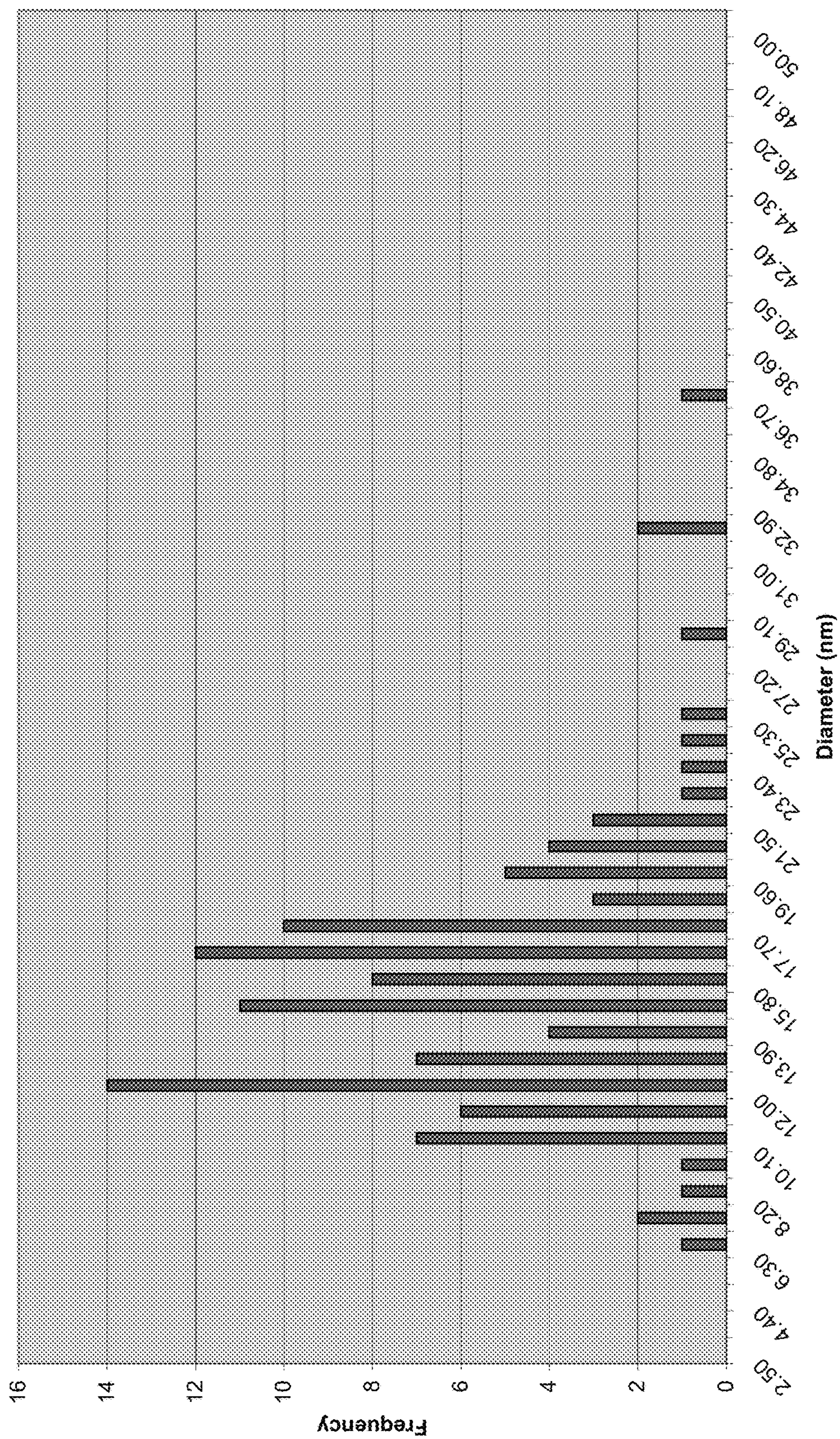
Figure 73A:
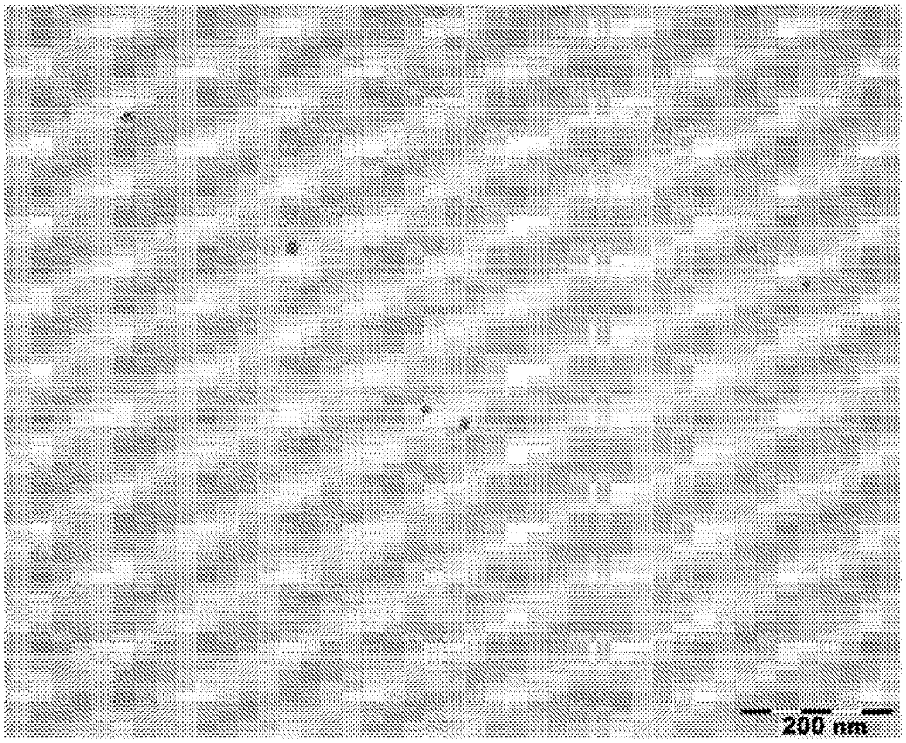
Figure 73A:
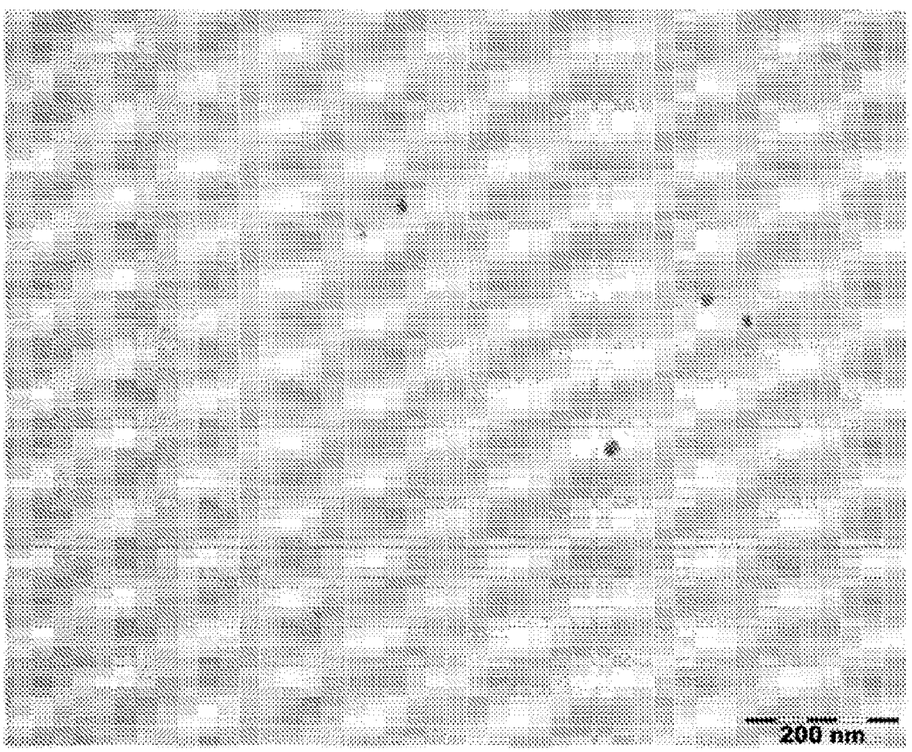
Figure 73B:
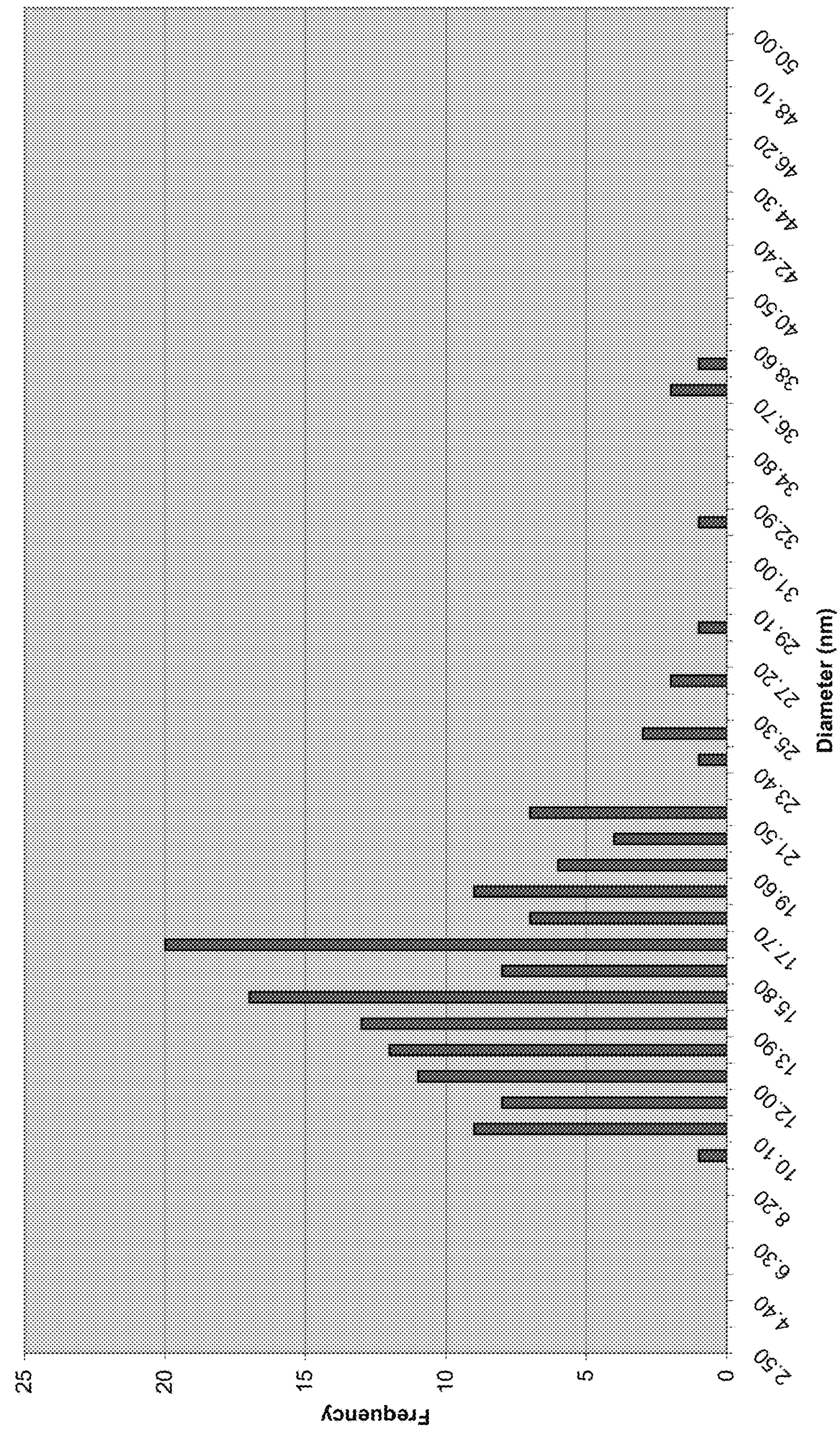
Figure 74A:
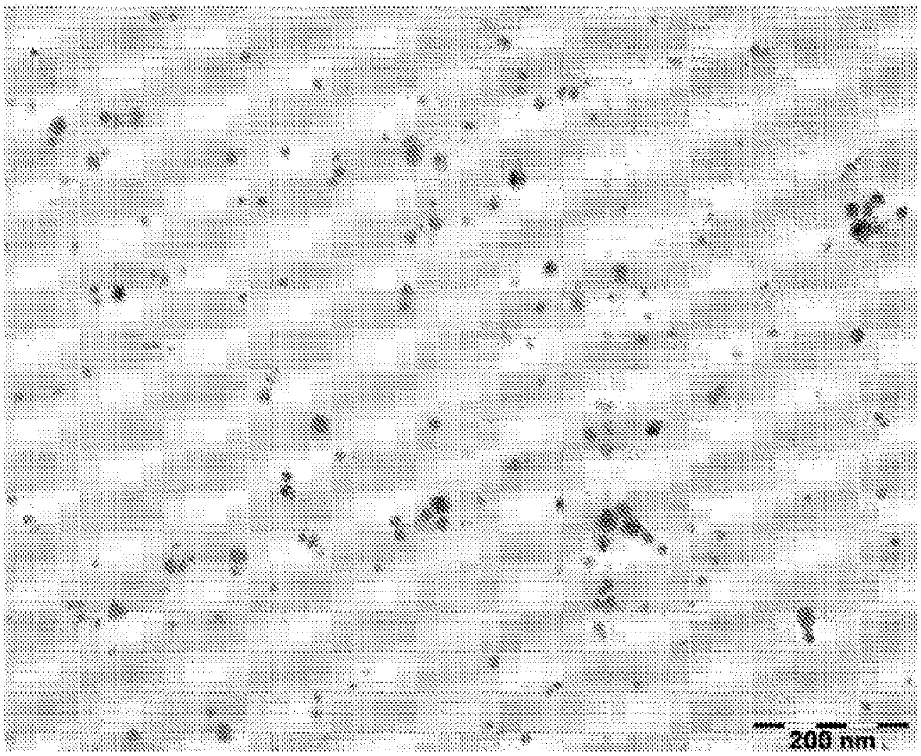
Figure 74A:
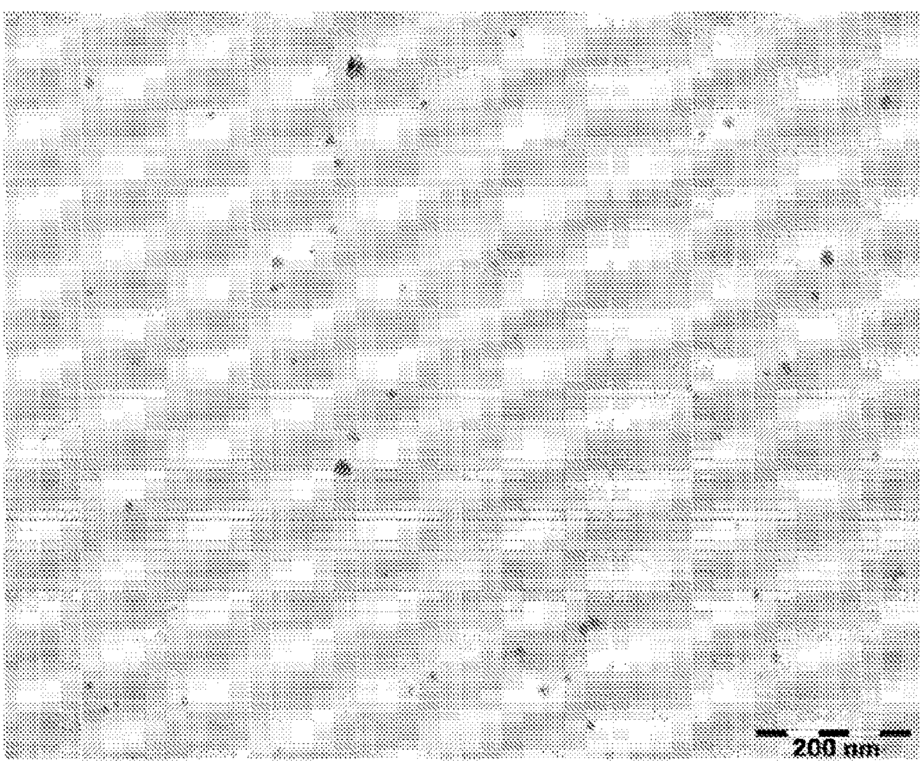
Figure 74B:
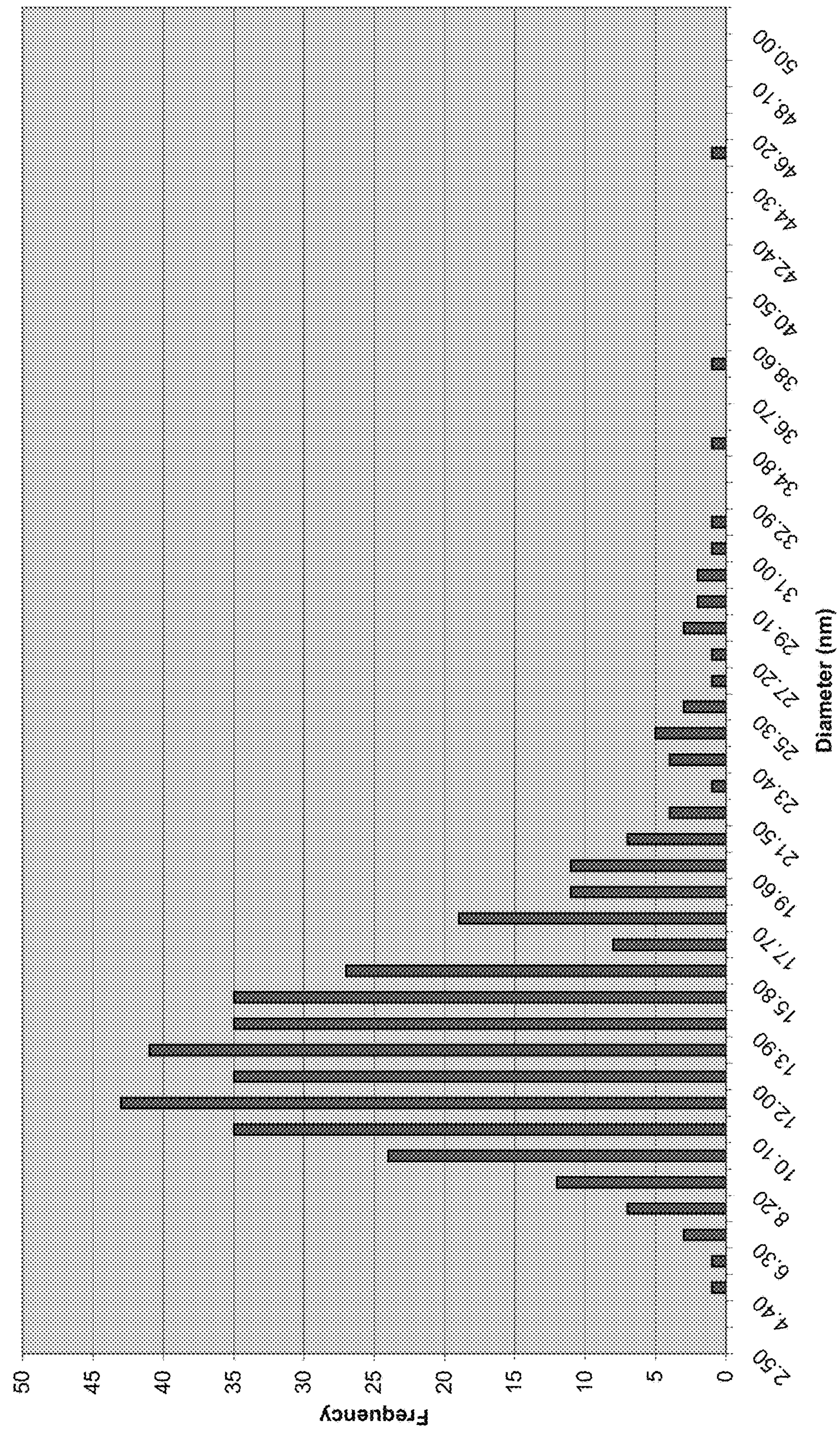
Figure 75A:
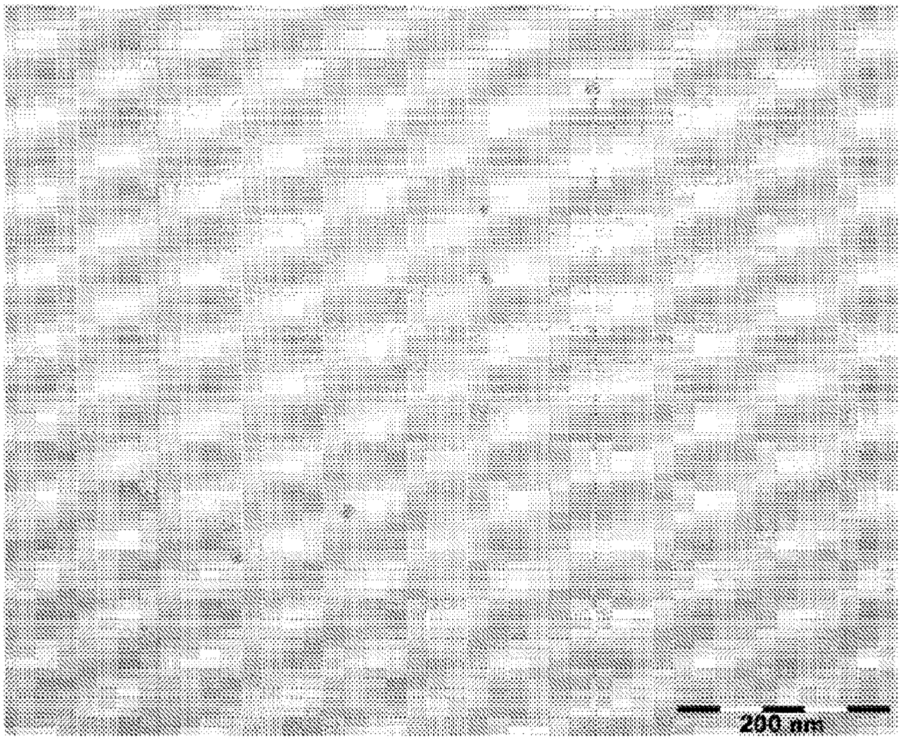
Figure 75A:
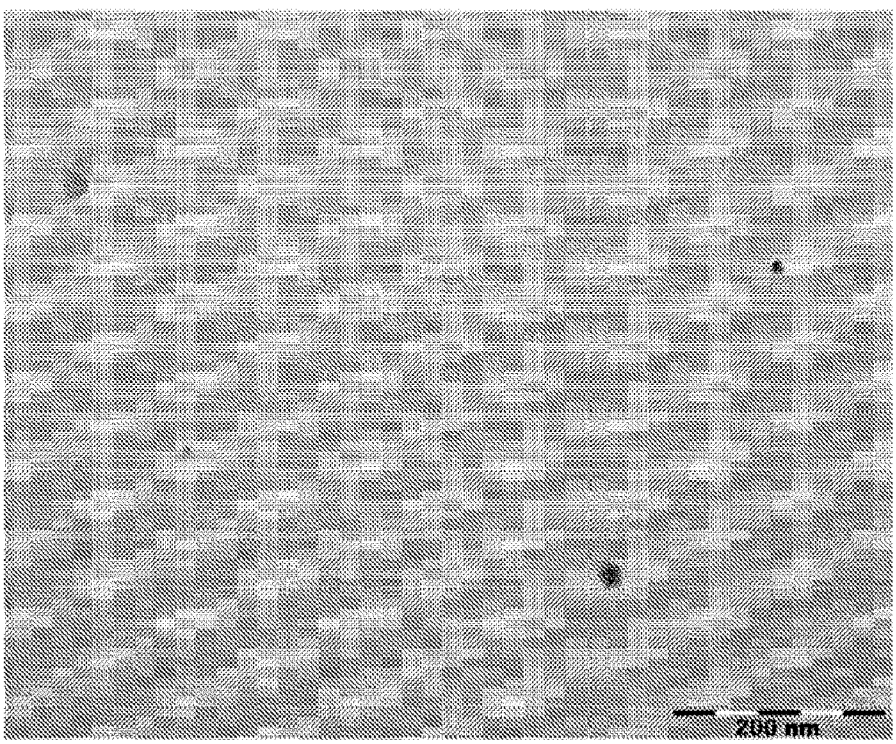
Figure 75B:
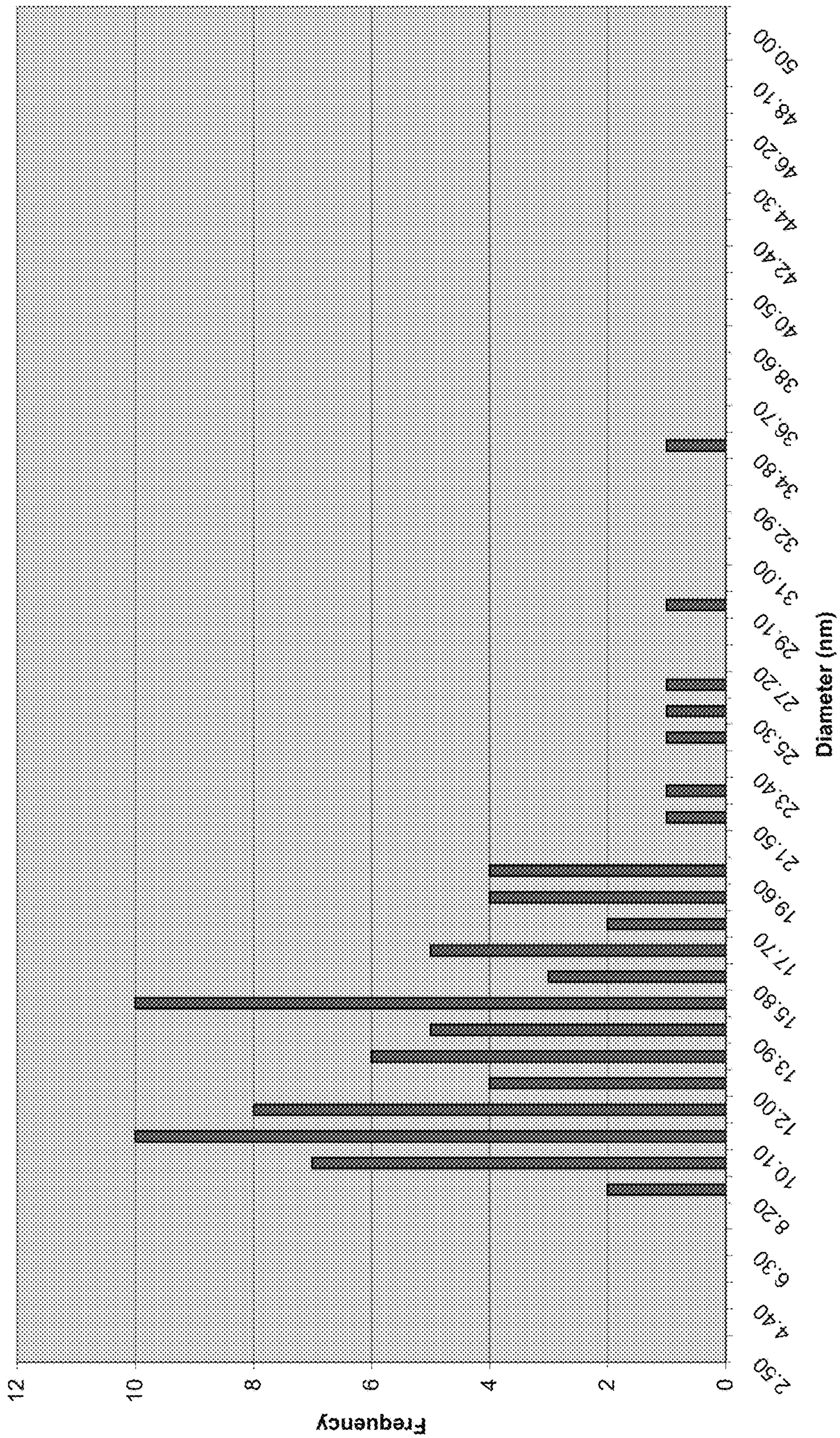
Figure 76A:
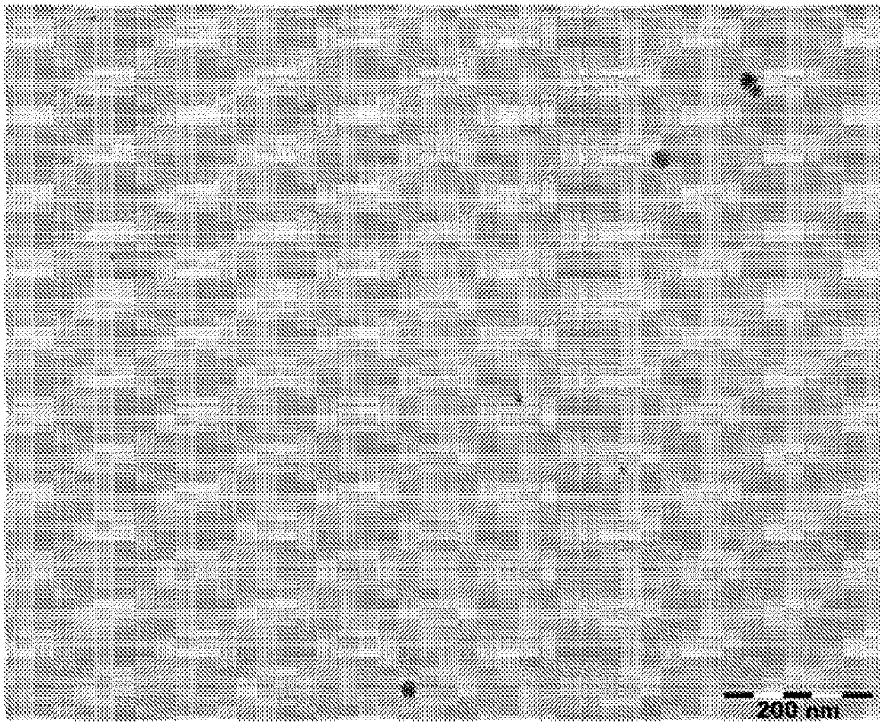
Figure 76A:
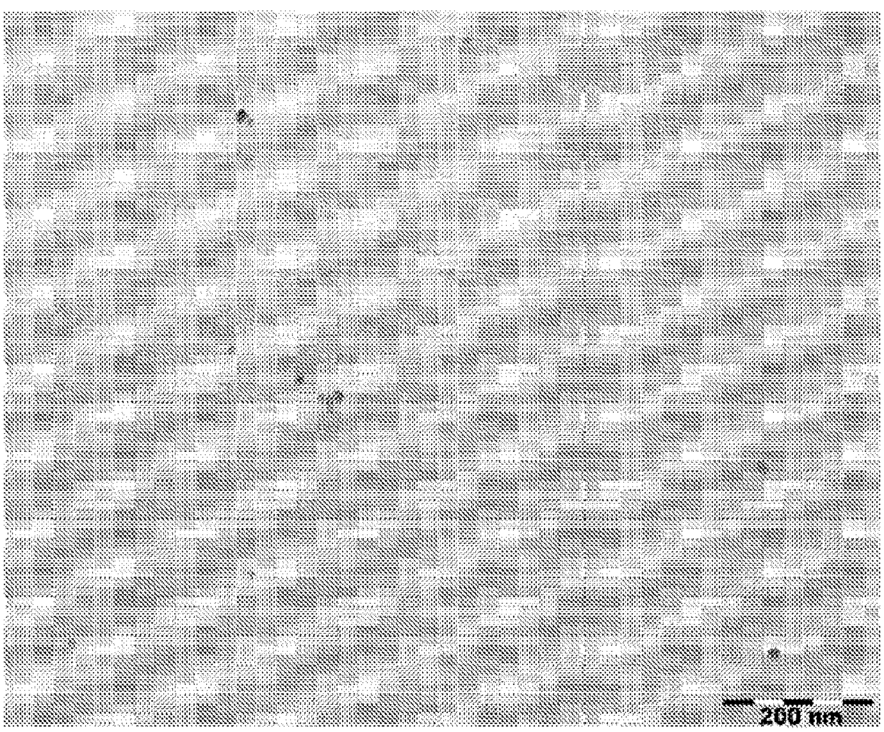
Figure 76B:
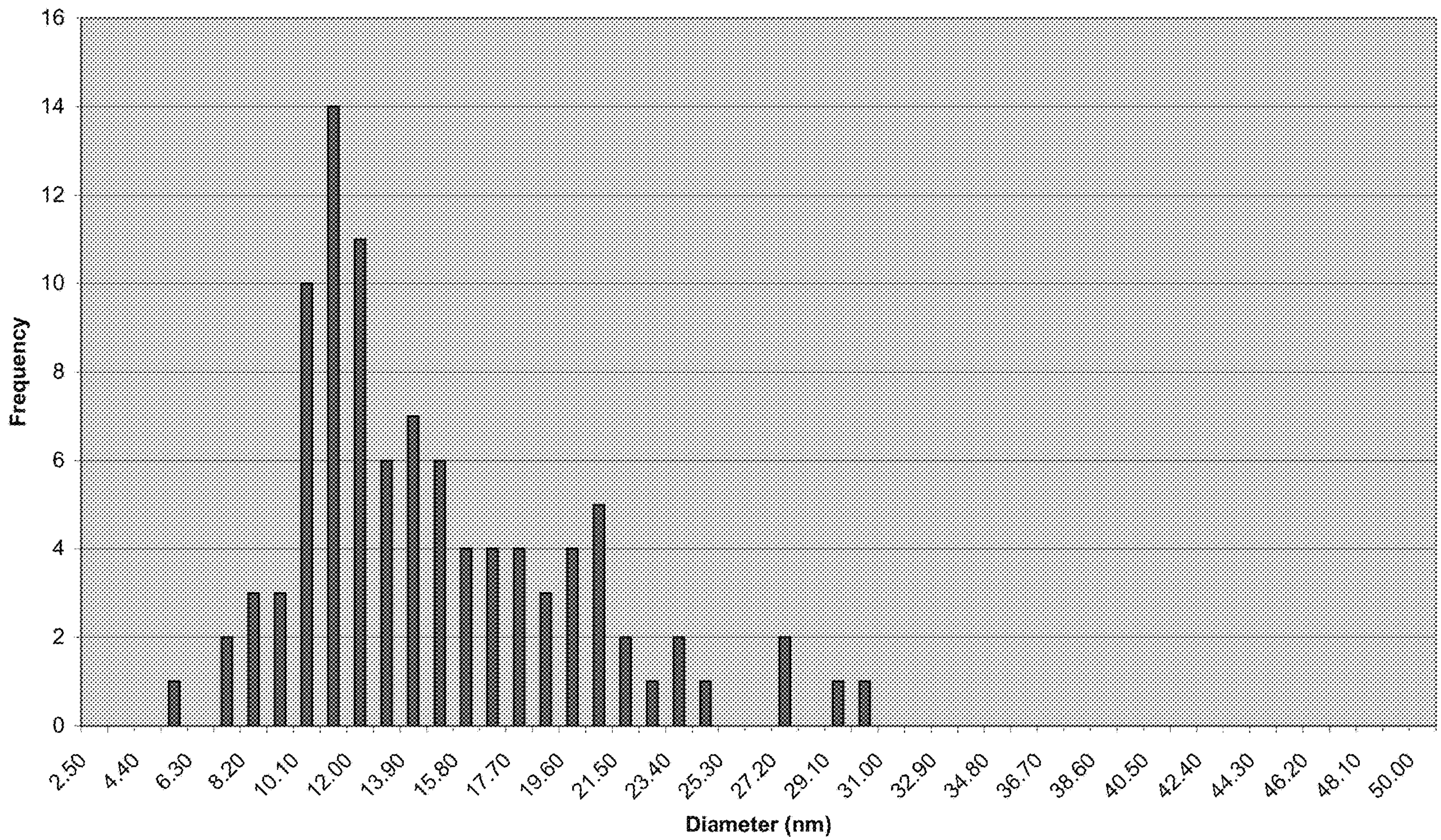
Figure 76C:
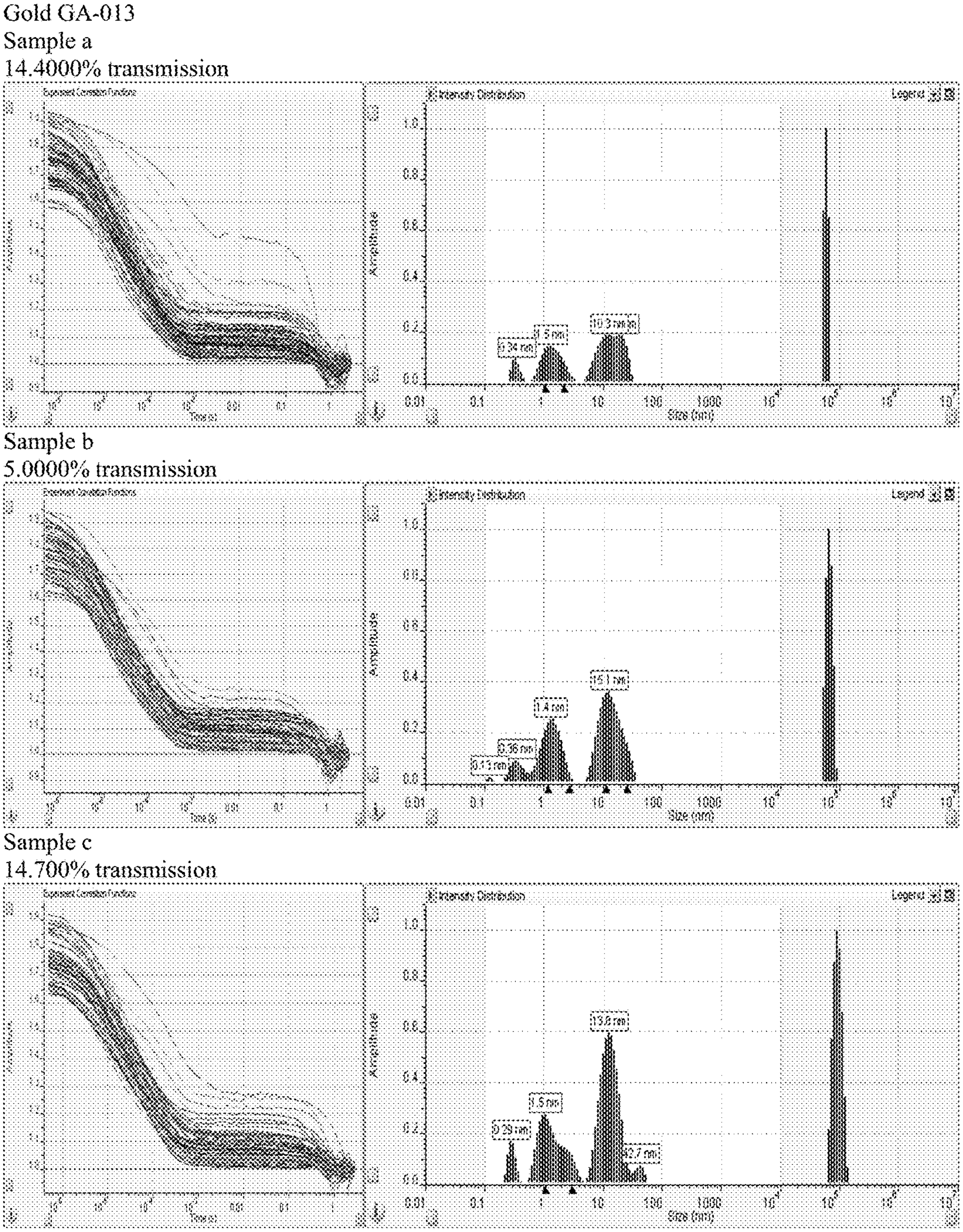

FIG. 69B shows the measured size distribution of the gold nanoparticles measured by the TEM instrument/software discussed earlier in Examples 5-7 corresponding to dried Aurora-020.

FIG. 69C shows graphically three dynamic light scattering data measurement sets for the nanoparticles (i.e., the hydrodynamic radii) made according to Aurora-020 referenced in Table 13 and measured after 7 weeks from the synthesis. The main peak in intensity distribution graph is around 23 nm. Dynamic light scattering measurements on fresh Aurora-020 sample (not shown) resulted in main peak at 31 nm. It should be noted that the dynamic light scattering particle size information is different from the TEM measured histograms because dynamic light scattering uses algorithms that assume the particles are all spheres (which they are not) as well as measures the hydrodynamic radius (e.g., the particle's influence on the water is also detected and reported in addition to the actual physical radii of the particles). Accordingly, it is not surprising that there is a difference in the reported particle sizes between those reported in the TEM histogram data of those reported in the dynamic light scattering data just as in the other Examples included herein.

Accordingly, it is clear from this continuous processing method that a variety of process parameters can influence the resultant product produced.

Example 17

Manufacturing Gold-Based Nanoparticles/Nanoparticle Solutions or Colloids GA-002, GA-003, GA-004, GA-005, GA-009, GA-011 and GA-013 by a Batch Process This Example utilizes a batch process according to the present invention. FIG. 43A shows the apparatus used to condition the liquid 3 in this Example. Once conditioned, the liquid 3' was processed in the apparatus shown in FIG. 43C. A primary goal in this Example was to show a variety of different processing enhancers (listed as "PE" in Table 14). Specifically, Table 14 sets forth voltages used for each of the electrodes 1 and 5, the dwell time for the liquid 3 being exposed to plasma 4 in the apparatus of FIG. 43A; the volume of liquid utilized in each of FIGS. 43A and 43C; the voltages used to create the plasma 4 in FIG. 43A and the voltages used for the electrodes 5*a*/5*b* in FIG. 43C.

TABLE 14

| Run ID: | | GB-002 | GB-003 | GB-004 | GB-005 | GB-009 | GB-011 | GB-013 |
|---|---|---|---|---|---|---|---|---|
| Dwell Times (min) | Plasma 4 | 25 | 25 | 25 | 25 | 25 | 25 | 25 |
| | Electrodes 5a/5b | 42 | 42 | 42 | 42 | 42 | 42 | 42 |
| Volume $H_2O$ & PE (mL) | Plasma 4 | 3790 | 3790 | 3790 | 3790 | 3790 | 3790 | 3790 |
| | Electrodes 5a/5b | 900 | 900 | 900 | 900 | 900 | 900 | 900 |
| Volts: | Plasma 4 | 750 | 750 | 750 | 750 | 750 | 750 | 750 |
| | Electrodes 5a/5b | 300 | 300 | 300 | 300 | 298 | 205.6 | 148 |
| PE* | Type: | $Na_2CO_3$ | $K_2CO_3$ | $KHCO_3$ | $NaHCO_3$ | $NaHCO_3$ | $NaHCO_3$ | $NaHCO_3$ |
| | mg/ml: | 0.22 | 0.29 | 0.44 | 0.47 | 0.52 | 0.51 | 0.51 |
| Wire Diameter (mm) | | 1.0 | 1.0 | 1.0 | 1.0 | 1.0 | 1.0 | 1.0 |
| Wire Configuration Figure | | 4f | 4f | 4f | 4f | 4f | 4f | 4f |
| PPM: | | 7.8 | 10.0 | 10.0 | 11.3 | 9.7 | 10.0 | 7.7 |
| Final Liquid Temp ° C. | | 96 | 93.5 | 90.5 | 89 | 90.5 | 74.5 | 57 |
| Dimension & Configuration | Plasma 4 Figure | 43a | 43a | 43a | 43a | 43a | 43a | 43a |
| | Electrodes 5a/5b Figure | 43c | 43c | 43c | 43c | 43c | 43c | 43c |
| | Contact "$W_L$" (in/mm) | 0.75/19 | 0.75/19 | 0.75/19 | 0.75/19 | 0.75/19 | 0.75/19 | 0.75/19 |
| | Separation (in/mm) | 1.5/38 | 1.5/38 | 1.5/38 | 1.5/38 | 1.5/38 | 0.25/6 | 0.063/1.6 |
| Electrode Current (A) | | 0.69 | 0.65 | 0.64 | 0.66 | 0.76 | 0.78 | 0.60 |
| Hydrodynamic r (nm) | | 11.13 | 12.6 | 13.2 | 11.8 | 13.7 | 17.9 | 13.1 |
| TEM Avg. Diameter (nm) | | 12 | 13.9 | 15.3 | 14.85 | 13.0 | 12.5 | 11.0 |
| | "c-c" (in/mm) | n/m | n/m | n/m | n/m | n/m | n/m | n/m |
| Plasma 4 | electrode # | 1a | 1a | 1a | 1a | 1a | 1a | 1a |
| | "x" (in/mm) | 0.25/6.4 | 0.25/6.4 | 0.25/6.4 | 0.25/6.4 | 0.25/6.4 | 0.25/6.4 | 0.25/6.4 |
| | electrode # | 5a | 5a | 5a | 5a | 5a | 5a | 5a |
| | "c-c" (in/mm) | n/m | n/m | n/m | n/m | n/m | n/m | n/m |
| Electrodes | electrode # | 5a | 5a | 5a | 5a | 5a | 5a | 5a |
| | electrode # | 5b | 5b | 5b | 5b | 5b | 5b | 5b |

With regard to the reported processing enhancers (PE) utilized, different mg/ml amounts were utilized in an effort to have similar conductivity for each solution (e.g., also similar molar quantities of cations present in the liquid 3/3'). The electrode wire diameter used in each Example was the same, about 1.0 mm, and was obtained from ESPI, having an address of 1050 Benson Way, Ashland, Oreg. 97520, as reported elsewhere herein.

Figure 24A:
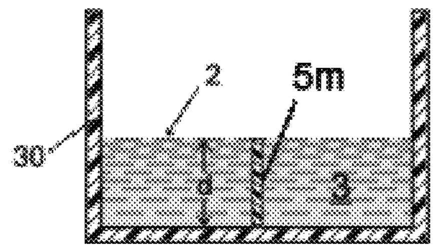
FIGS. 24A-24E show various membranes 50 located in various cross-sections of a trough member 30.
Figure 24B:
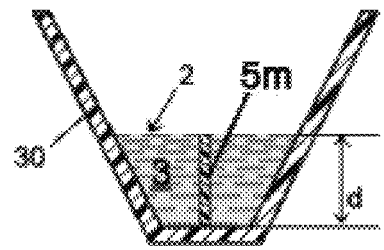
Figure 24C:
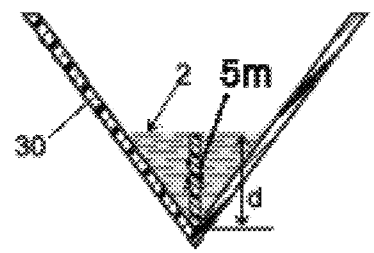
Figure 24D:
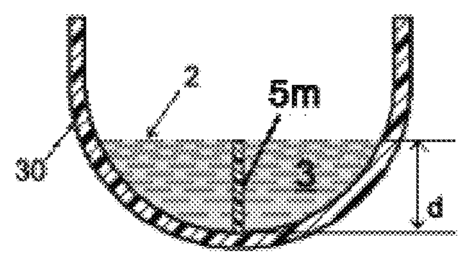
Figure 24E:
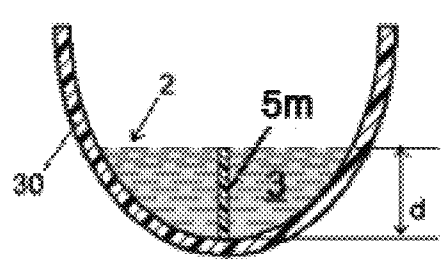
Figure 25A:
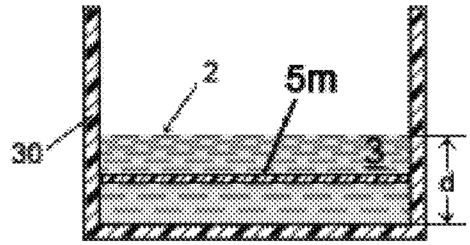
FIGS. 25A-25E show various membranes 50 located in various cross-sections of a trough member 30.
Figure 25B:
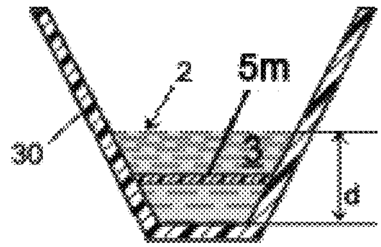
Figure 25C:
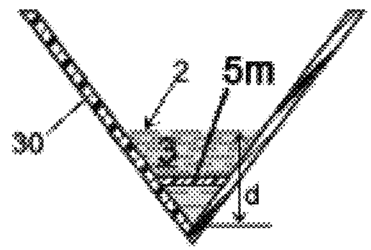
Figure 25D:
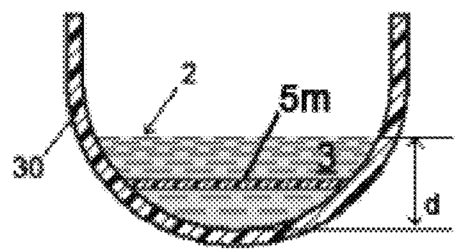
Figure 25E:
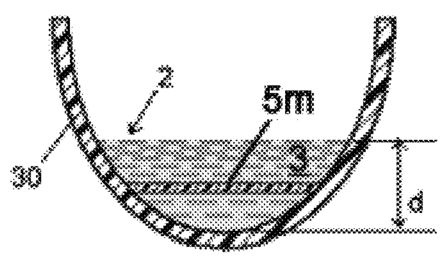
Figure 26A:
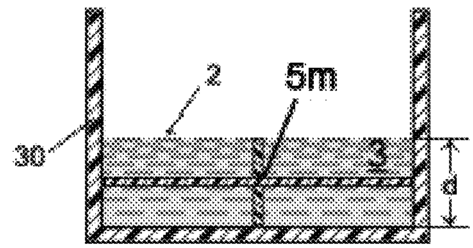
FIGS. 26A-26E show various membranes 50 located in various cross-sections of a trough member 30.
Figure 26B:
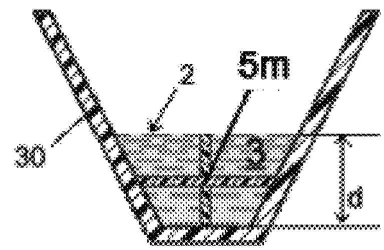
Figure 26C:
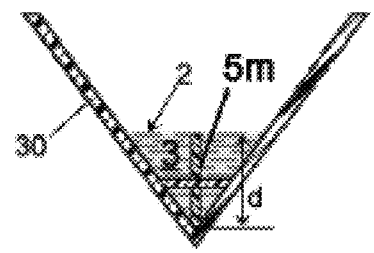
Figure 26D:
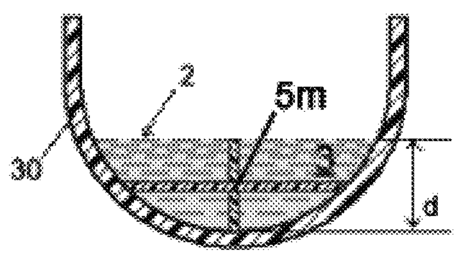
Figure 26E:
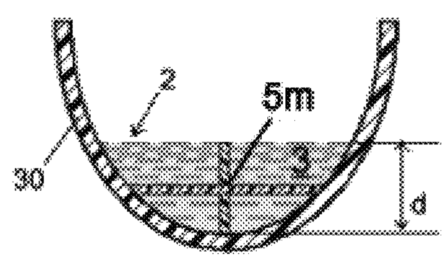

The amount of electrode contacting the liquid 3' in the apparatus shown in FIG. 24C was the same in each case, namely, 0.75 inches (19.05 mm).

Table 14 also shows the effects of transverse electrode separation (i.e., the distance "b" between substantially parallel electrodes 5*a*/5*b* shown in FIG. 43C) for the same processing enhancer, namely, $NaHCO_3$. It is clear that electrode current and corresponding final liquid temperature were less for closer electrode placement (i.e., smaller "b" values).

A voltage source 60 (discussed elsewhere herein) was used to create the plasma 4 shown in FIG. 43A. A voltage source 50 (discussed elsewhere herein) was used to create a voltage and current between the electrodes 5*a*/5*b* shown in FIG. 43C.

Table 14 also reports the measured hydrodynamic radius (i.e., a single number for "Hydrodynamic Radii" taken from the average of the three highest amplitude peaks shown in each of FIGS. 70C-76C and "TEM Average Diameter" which corresponds to the average measured gold nanoparticle size calculated from the TEM histogram graphs shown in FIGS. 70B-76B).

FIGS. 70A-76A show two representative TEM photomicrographs each of the gold nanoparticles, dried from each solution or colloid referenced in Table 14 formed according to this Example.

FIGS. 70B-76B show the measured size distribution of the gold particles measured by using the TEM instrument/software discussed earlier in Examples 5-7 for each solution or colloid referenced in Table 14 formed according to this Example.

FIGS. 70B-76B show graphically three dynamic light scattering data measurement sets for the nanoparticles (i.e., the hydrodynamic radii) made according to each solution or colloid referenced in Table 14 formed according to this Example. It should be noted that the dynamic light scattering particle size information is different from the TEM measured histograms because dynamic light scattering uses algorithms that assume the particles are all spheres (which they are not) as well as measures the hydrodynamic radius (e.g., the particle's influence on the water is also detected and reported in addition to the actual physical radii of the particles). Accordingly, it is not surprising that there is a difference in the reported particle sizes between those reported in the TEM histogram data of those reported in the dynamic light scattering data just as in the other Examples included herein.

Example 18

The Effect of Input Water Temperature on the Manufacturing and Properties of Silver-Based Nanoparticles/Nanoparticle Solutions AT110, AT109 and AT111 and Zinc-Based Nanoparticles/Nanoparticle Solutions BT015, BT014 and BT016; and 50/50 Volumetric Mixtures Thereof This Example utilizes essentially the same basic apparatus used to make the solutions of Examples 1-4, however, this Example uses three different temperatures of water input into the trough member 30.

Specifically: (1) water was chilled in a refrigerator unit until it reached a temperature of about 2° C. and was then pumped into the trough member 30, as in Examples 1-4; (2) water was allowed to adjust to ambient room temperature (i.e., 21° C.) and was then pumped into the trough member 30, as in Examples 1-4; and (3) water was heated in a metal container until it was about 68° C. (i.e., for Ag-based solution) and about 66° C. (i.e., for Zn-based solution), and was then pumped into the trough member 30, as in Examples 1-4.

The silver-based nanoparticle/nanoparticle solutions were all manufactured using a set-up where Electrode Set #1 and Electrode Set #4 both used a "1, 5" electrode configuration. All other Electrode Sets #2, #3 and #5 - #8, used a "5, 5'" electrode configuration. These silver-based nanoparticle/nanoparticle solutions were made by utilizing 99.95% pure silver electrodes for each of electrodes 1 and/or 5 in each electrode set.

Also, the zinc-based nanoparticles/nanoparticle solutions were all manufactured with each of Electrode Sets #1- #8 each having a "1,5" electrode configuration. These zinc-based nanoparticles/nanoparticle solutions also were made by utilizing 99.95% pure zinc electrodes for the electrodes 1,5 in each electrode set.

Tables 15a-15f summarize electrode design, configuration, location and operating voltages. As shown in Tables 15a-15c, relating to silver-based nanoparticle/nanoparticle solutions, the target voltages were set to a low of about 620 volts and a high of about 2,300 volts; whereas with regard to zinc-based solution production, Tables 15d-15f show the target voltages were set to a low of about 500 volts and a high of about 1,900 volts.

Further, bar charts of the actual and target voltages for each electrode in each electrode set, are shown in FIGS. 77A-77F. Accordingly, the data contained in Tables 15a-15f, as well as in FIGS. 77A-77F, give a complete understanding of the electrode design in each electrode set as well as the target and actual voltages applied to each electrode for the manufacturing processes.

TABLE 15a

Cold Input Water (Ag)

Run ID: AT110
Flow Rate: 200 ml/min

| Set # | Electrode # | Target Voltage (kV) | Distance "c-c" in/mm | Distance "x" in/mm | Average Voltage (kV) |
|---|---|---|---|---|---|
| | | | 7/177.8* | | |
| 1 | 1a | 2.35 | | 0.22/5.59 | 2.34 |
| | 5a | 2.00 | | N/A | 2.01 |
| | | | 8/203.2 | | |
| 2 | 5b | 1.40 | | N/A | 1.41 |
| | 5b' | 1.51 | | N/A | 1.51 |
| | | | 8/203.2 | | |
| 3 | 5c | 1.23 | | N/A | 1.22 |
| | 5c' | 1.26 | | N/A | 1.26 |
| | | | 8/203.2 | | |
| 4 | 1d | 1.37 | | 0.19/4.83 | 1.37 |
| | 5d | 0.99 | | N/A | 1.00 |
| | | | 9/228.6 | | |
| 5 | 5e | 1.17 | | N/A | 1.17 |
| | 5e' | 0.62 | | N/A | 0.62 |
| | | | 8/203.2 | | |
| 6 | 5f | 0.63 | | N/A | 0.63 |
| | 5f' | 0.58 | | N/A | 0.58 |
| | | | 8/203.2 | | |

TABLE 15a-continued

Cold Input Water (Ag)

| Set # | Electrode # | Target Voltage (kV) | Distance "c-c" in/mm | Distance "x" in/mm | Average Voltage (kV) |
|---|---|---|---|---|---|
| 7 | 5g | 0.76 | | N/A | 0.76 |
| | 5g' | 0.61 | | N/A | 0.64 |
| | | | 8/203.2 | | |
| 8 | 5h | 0.70 | | N/A | 0.70 |
| | 5h' | 0.94 | | N/A | 0.96 |
| | | | 8/203.2** | | |

Input Water Temp 2 C.
Output Water Temp 70 C.

*Distance from water inlet to center of first electrode set
**Distance from center of last electrode set to water outlet TABLE 15b Room Temperature Input Water (Ag)

Run ID: AT109
Flow Rate: 200 ml/min

| Set # | Electrode # | Target Voltage (kV) | Distance "c-c" in/mm | Distance "x" in/mm | Average Voltage (kV) |
|---|---|---|---|---|---|
| | | | 7/177.8* | | |
| 1 | 1a | 2.23 | | 0.22/5.59 | 2.19 |
| | 5a | 1.80 | | N/A | 1.79 |
| | | | 8/203.2 | | |
| 2 | 5b | 1.26 | | N/A | 1.19 |
| | 5b' | 1.42 | | N/A | 1.42 |
| | | | 8/203.2 | | |
| 3 | 5c | 1.27 | | N/A | 1.25 |
| | 5c' | 1.30 | | N/A | 1.30 |
| | | | 8/203.2 | | |
| 4 | 1d | 1.46 | | 0.19/4.83 | 1.39 |
| | 5d | 1.05 | | N/A | 1.04 |
| | | | 9/228.6 | | |
| 5 | 5e | 1.15 | | N/A | 1.14 |
| | 5e' | 0.65 | | N/A | 0.64 |
| | | | 8/203.2 | | |
| 6 | 5f | 0.74 | | N/A | 0.73 |
| | 5f' | 0.69 | | N/A | 0.69 |
| | | | 8/203.2 | | |
| 7 | 5g | 0.81 | | N/A | 0.80 |
| | 5g' | 0.65 | | N/A | 0.66 |
| | | | 8/203.2 | | |
| 8 | 5h | 0.80 | | N/A | 0.79 |
| | 5h' | 1.05 | | N/A | 1.05 |
| | | | 8/203.2** | | |

Input Water Temp 21 C.
Output Water Temp 75 C.

*Distance from water inlet to center of first electrode set
**Distance from center of last electrode set to water outlet TABLE 15c Hot Input Water (Ag)

Run ID: AT111
Flow Rate: 200 ml/min

| Set # | Electrode # | Target Voltage (kV) | Distance "c-c" in/mm | Distance "x" in/mm | Average Voltage (kV) |
|---|---|---|---|---|---|
| | | | 7/177.8* | | |
| 1 | 1 a | 2.29 | | 0.22/5.59 | 2.19 |
| | 5a | 1.75 | | N/A | 1.76 |
| | | | 8/203.2 | | |
| 2 | 5b | 1.39 | | N/A | 1.39 |
| | 5b' | 1.64 | | N/A | 1.64 |
| | | | 8/203.2 | | |

TABLE 15c-continued

Hot Input Water (Ag)

| Set # | Electrode # | Target Voltage (kV) | Distance "c-c" in/mm | Distance "x" in/mm | Average Voltage (kV) |
|---|---|---|---|---|---|
| 3 | 5c | 1.41 | | N/A | 1.42 |
| | 5c' | 1.49 | | N/A | 1.48 |
| | | | 8/203.2 | | |
| 4 | 1d | 1.62 | | 0.19/4.83 | 1.61 |
| | 5d | 1.29 | | N/A | 1.29 |
| | | | 9/228.6 | | |
| 5 | 5e | 1.41 | | N/A | 1.42 |
| | 5e' | 0.94 | | N/A | 0.93 |
| | | | 8/203.2 | | |
| 6 | 5f | 0.94 | | N/A | 0.94 |
| | 5f' | 0.91 | | N/A | 0.91 |
| | | | 8/203.2 | | |
| 7 | 5g | 1.02 | | N/A | 1.03 |
| | 5g' | 0.88 | | N/A | 0.88 |
| | | | 8/203.2 | | |
| 8 | 5h | 0.95 | | N/A | 0.95 |
| | 5h' | 1.15 | | N/A | 1.16 |
| | | | 8/203.2** | | |

| | |
|---|---|
| Input Water Temp | 68 C. |
| Output Water Temp | 94 C. |

*Distance from water inlet to center of first electrode set
**Distance from center of last electrode set to water outlet TABLE 15d Cold Input Water (Zn)

| | |
|---|---|
| Run ID: | BT015 |
| Flow Rate: | 150 ml/min |

| Set # | Electrode # | Target Voltage (kV) | Distance "c-c" in/mm | Distance "x" in/mm | Average Voltage (kV) |
|---|---|---|---|---|---|
| | | | 7/177.8* | | |
| 1 | 1a | 1.91 | | 0.29/7.37 | 1.90 |
| | 5a | 1.67 | | N/A | 1.65 |
| | | | 8/203.2 | | |
| 2 | 1b | 1.07 | | 0.22/5.59 | 1.11 |
| | 5b | 1.19 | | N/A | 1.20 |
| | | | 8/203.2 | | |
| 3 | 1c | 0.89 | | 0.22/5.59 | 0.85 |
| | 5c | 0.88 | | N/A | 0.88 |
| | | | 8/203.2 | | |
| 4 | 1d | 0.98 | | 0.15/3.81 | 1.08 |
| | 5d | 0.77 | | N/A | 0.76 |
| | | | 9/228.6 | | |
| 5 | 1e | 1.31 | | 0.22/5.59 | 1.37 |
| | 5e | 0.50 | | N/A | 0.50 |
| | | | 8/203.2 | | |
| 6 | 1f | 1.07 | | 0.22/5.59 | 1.07 |
| | 5f | 0.69 | | N/A | 0.69 |
| | | | 8/203.2 | | |
| 7 | 1g | 0.79 | | 0.22/5.59 | 0.79 |
| | 5g | 0.73 | | N/A | 0.74 |
| | | | 8/203.2 | | |
| 8 | 1h | 0.61 | | 0.15/3.81 | 0.60 |
| | 5h | 0.88 | | N/A | 0.85 |
| | | | 8/203.2** | | |

| | |
|---|---|
| Input Water Temp | 2 C. |
| Output Water Temp | 63 C. |

*Distance from water inlet to center of first electrode set
**Distance from center of last electrode set to water outlet Table 15e Room Temperature Input Water (Zn)

| | |
|---|---|
| Run ID: | BT014 |
| Flow Rate: | 150 ml/min |

| Set # | Electrode # | Target Voltage (kV) | Distance "c-c" in/mm | Distance "x" in/mm | Average Voltage (kV) |
|---|---|---|---|---|---|
| | | | 7/177.8* | | |
| 1 | 1a | 1.82 | | 0.29/7.37 | 1.79 |
| | 5a | 1.58 | | N/A | 1.57 |
| | | | 8/203.2 | | |
| 2 | 1b | 1.06 | | 0.22/5.59 | 1.04 |
| | 5b | 1.14 | | N/A | 1.14 |
| | | | 8/203.2 | | |
| 3 | 1c | 0.91 | | 0.22/5.59 | 0.90 |
| | 5c | 0.84 | | N/A | 0.85 |
| | | | 8/203.2 | | |
| 4 | 1d | 0.88 | | 0.15/3.81 | 0.88 |
| | 5d | 0.71 | | N/A | 0.73 |
| | | | 9/228.6 | | |
| 5 | 1e | 1.55 | | 0.22/5.59 | 1.30 |
| | 5e | 0.50 | | N/A | 0.50 |
| | | | 8/203.2 | | |
| 6 | 1f | 1.06 | | 0.22/5.59 | 1.08 |
| | 5f | 0.72 | | N/A | 0.72 |
| | | | 8/203.2 | | |
| 7 | 1g | 0.82 | | 0.22/5.59 | 0.82 |
| | 5g | 0.76 | | N/A | 0.76 |
| | | | 8/203.2 | | |
| 8 | 1h | 0.83 | | 0.15/3.81 | 0.60 |
| | 5h | 0.92 | | N/A | 0.88 |
| | | | 8/203.2** | | |

| | |
|---|---|
| Input Water Temp | 21 C. |
| Output Water Temp | 69 C. |

*Distance from water inlet to center of first electrode set
**Distance from center of last electrode set to water outlet Table 15f Hot Input Water (Zn)

| | |
|---|---|
| Run ID: | BT016 |
| Flow Rate: | 150 ml/min |

| Set # | Electrode # | Target Voltage (kV) | Distance "c-c" in/mm | Distance "x" in/mm | Average Voltage (kV) |
|---|---|---|---|---|---|
| | | | 7/177.8* | | |
| 1 | 1a | 1.87 | | 0.29/7.37 | 1.81 |
| | 5a | 1.62 | | N/A | 1.62 |
| | | | 8/203.2 | | |
| 2 | 1b | 1.22 | | 0.22/5.59 | 1.17 |
| | 5b | 1.27 | | N/A | 1.23 |
| | | | 8/203.2 | | |
| 3 | 1c | 1.06 | | 0.22/5.59 | 1.00 |
| | 5c | 1.02 | | N/A | 1.00 |
| | | | 8/203.2 | | |
| 4 | 1d | 1.13 | | 0.15/3.81 | 1.12 |
| | 5d | 0.94 | | N/A | 0.92 |
| | | | 9/228.6 | | |
| 5 | 1e | 1.46 | | 0.22/5.59 | 1.43 |
| | 5e | 0.67 | | N/A | 0.69 |
| | | | 8/203.2 | | |
| 6 | 1f | 1.25 | | 0.22/5.59 | 1.23 |
| | 5f | 0.89 | | N/A | 0.89 |
| | | | 8/203.2 | | |
| 7 | 1g | 0.95 | | 0.22/5.59 | 0.95 |
| | 5g | 0.87 | | N/A | 0.83 |
| | | | 8/203.2 | | |

Table 15f-continued

| Hot Input Water (Zn) | | | | | |
|---|---|---|---|---|---|
| 8 | 1h | 0.75 | | 0.15/3.81 | 0.71 |
| | 5h | 1.01 | | N/A | 0.99 |
| | | | 8/203.2** | | |
| | Input Water Temp | | 66 C. | | |
| | Output Water Temp | | 82 C. | | |

*Distance from water inlet to center of first electrode set
**Distance from center of last electrode set to water outlet Once each of the silver-based nanoparticle/nanoparticle solutions AT110, AT109 and AT111, as well as the zinc-based nanoparticle/nanoparticle solutions BT015, BT014 and BT016 were manufactured, these six solutions were mixed together to make nine separate 50/50 volumetric mixtures. Reference is made to Table 15g which sets forth a variety of physical and biological characterization results for the six "raw materials" as well as the nine mixtures made therefrom.

TABLE 15g

| | PPM Ag | PPM Zn | Zeta Potential (Avg) | pH | DLS % Trans-mission | Predominant DLS Mass Distribution Peak (Radius in nm) |
|---|---|---|---|---|---|---|
| Cold Ag (AT 110) | 49.4 | N/A | −8.4 | 3.8 | 40% | 41.8 |
| RT Ag (AT 109) | 39.5 | N/A | −19.7 | 4.5 | 5% | 46.3* |
| Hot Ag (AT 111) | 31.1 | N/A | −38.2 | 5.2 | 4% | 15.6* |
| Cold Zn (BT 015) | N/A | 24.1 | 19.2 | 2.8 | 100% | 46.2 |
| RT Zn (BT 014) | N/A | 24.6 | 11.2 | 2.9 | 100% | 55.6 |
| Hot Zn (BT 016) | N/A | 17.7 | 11.9 | 3.1 | 100% | 12.0* |
| Cold Ag/Cold Zn | 24.3 | 11.9 | 26.4 | 3.0 | 100% | 25.2* |
| Cold Ag/RT Zn | 24.2 | 12.0 | 25.2 | 3.3 | 100% | 55.0 |
| Cold Ag/Hot Zn | 24.3 | 8.6 | 24.5 | 3.3 | 100% | 28.3* |
| RT Ag/Cold Zn | 19.9 | 11.8 | 23.0 | 3.1 | 100% | 58.6 |
| RT Ag/RT Zn | 20.2 | 12.4 | 18.3 | 3.3 | 100% | 1.5 |
| RT Ag/Hot Zn | 20.2 | 8.6 | 27.0 | 3.4 | 100% | 52.9 |
| Hot Ag/Cold Zn | 14.0 | 12.0 | 24.6 | 3.2 | 100% | 51.4 |
| Hot Ag/RT Zn | 14.2 | 12.0 | 13.7 | 3.3 | 100% | 48.7 |
| Hot Ag/Hot Zn | 15.0 | 8.5 | 7.2 | 3.4 | 100% | 44.6 |

*DLS data varies significantly suggesting very small particulate and/or significant ionic character Specifically, for example, in reference to the first mixture listed in Table 15g, that mixture is labeled as "Cold Ag/Cold Zn". Similarly, the last of the mixtures referenced in Table 15g is labeled "Hot Ag/Hot Zn". "Cold Ag" or "Cold Zn" refers to the input water temperature into the trough member 30 being about 2° C. "RT Ag" or "RT Zn" refers to the input water temperature being about 21° C. "Hot Ag" refers to refers to the input water temperature being about 68° C.; and "Hot Zn" refers to the input water temperature to the trough member 30 being about 66° C.

The physical parameters reported for the individual raw materials, as well as for the mixtures, include "PPM Ag" and "PPM Zn". These ppm's (parts per million) were determined by the Atomic Absorption Spectroscopy techniques discussed above herein. It is interesting to note that the measured PPM of the silver component in the silver-based nanoparticle/nanoparticle solutions was higher when the input temperature of the water into the trough member 30 was lower (i.e., Cold Ag (AT110) corresponds to an input water temperature of 2° C. and a measured PPM of silver of 49.4). In contrast, when the input temperature of the water used to make sample AT111 was increased to 68° C. (i.e., the "Hot Ag"), the measured amount of silver decreased to 31.1 ppm (i.e., a change of almost 20 ppm). Accordingly, when mixtures were made utilizing the raw material "Cold Ag" versus "Hot Ag", the PPM levels of the silver in the resulting mixtures varied.

Each of the nine mixtures formulated were each approximately 50% by volume of the silver-based nanoparticle solution and 50% by volume of the zinc-based nanoparticle solution. Thus, whenever "Hot Ag" solution was utilized, the resulting PPM in the mixture would be roughly half of 31.1 ppm; whereas when the "Cold Ag" solution was utilized the silver PPM would be roughly half of 49.4 ppm.

The zinc-based nanoparticle/nanoparticle solutions behaved similarly to the silver-based nanoparticle/nanoparticle solutions in that the measured PPM of zinc decreased as a function of increasing water input temperature, however, the percent decrease was less. Accordingly, whenever "Cold Zn" was utilized as a 50 volume percent component in a mixture, the measured zinc ppm in the mixtures was larger than the measured zinc ppm when "Hot Zn" was utilized.

Table 15g includes a third column, entitled, "Zeta Potential (Avg)". "Zeta potential" is known as a measure of the electro-kinetic potential in colloidal systems. Zeta potential is also referred to as surface charge on particles. Zeta potential is also known as the potential difference that exists between the stationary layer of fluid and the fluid within which the particle is dispersed. A zeta potential is often measured in millivolts (i.e., mV). The zeta potential value of approximately 25 mV is an arbitrary value that has been chosen to determine whether or not stability exists between a dispersed particle in a dispersion medium. Thus, when reference is made herein to "zeta potential", it should be understood that the zeta potential referred to is a description or quantification of the magnitude of the electrical charge present at the double layer.

The zeta potential is calculated from the electrophoretic mobility by the Henry equation:

$$U_E = \frac{2\varepsilon z f(ka)}{3\eta}$$

where z is the zeta potential, $U_E$ is the electrophoretic mobility, $\in$ is a dielectric constant, $\eta$ is a viscosity, $f(ka)$ is Henry's function. For Smoluchowski approximation $f(ka)=1.5$.

Electrophoretic mobility is obtained by measuring the velocity of the particles in an applied electric field using Laser Doppler Velocimetry ("LDV"). In LDV the incident laser beam is focused on a particle suspension inside a folded capillary cell and the light scattered from the particles is combined with the reference beam. This produces a fluctuating intensity signal where the rate of fluctuation is proportional to the speed of the particles (i.e. electrophoretic mobility).

In this Example, a Zeta-Sizer "Nano-ZS" produced by Malvern Instruments was utilized to determine zeta potential. For each measurement a 1 ml sample was filled into clear disposable zeta cell DTS1060C. Dispersion Technology Software, version 5.10 was used to run the Zeta-Sizer and to calculate the zeta potential. The following settings were used: dispersant—water, temperature—25° C., viscosity—0.8872 cP, refraction index—1.330, dielectric constant—78.5, approximation model—Smoluchowski. One run of hundred repetitions was performed for each sample.

Table 15g shows clearly that for the silver-based nanoparticle/nanoparticle solutions the zeta potential increased in negative value with a corresponding increasing input water temperature into the trough member 30. In contrast, the Zeta-Potential for the zinc-based nanoparticle/nanoparticle solutions was positive and decreased slightly in positive value as the input temperature of the water into the trough member 30 increased.

It is also interesting to note that the zeta potential for all nine of the mixtures made with the aforementioned silver-based nanoparticle/nanoparticle solutions and zinc-based nanoparticle/nanoparticle solutions raw materials were positive with different degrees of positive values being measured.

The fourth column in Table 15g reports the measured pH. The pH was measured for each of the raw material solutions, as well as for each of the mixtures. These pH measurements were made in accordance with the teachings for making standard pH measurements discussed elsewhere herein. It is interesting to note that the pH of the silver-based nanoparticle/nanoparticle solutions changed significantly as a function of the input water temperature into the trough member 30 starting with a low of 3.8 for the cold input water (i.e., 2° C.) and increasing to a value of 5.2 for the hot water input (i.e., 68° C.). In contrast, while the measured pH for each of three different zinc-based nanoparticle/nanoparticle solutions were, in general, significantly lower than any of the silver-based nanoparticle/nanoparticle solutions pH measurements, the pH did not vary as much in the zinc-based nanoparticle/nanoparticle solutions.

The pH values for each of the nine mixtures were much closer to the pH values of the zinc-based nanoparticle/nanoparticle solutions, namely, ranging from a low of about 3.0 to a high of about 3.4.

The fifth column in Table 15g reports "DLS % Transmission". The "DLS" corresponds to Dynamic Light Scattering. Specifically, the DLS measurements were made according to the DLS measuring techniques discussed above herein (e.g., Example 7). The "% Transmission" is reported in Table 15g because it is important to note that lower numbers correspond to a lesser amount of laser intensity being required to report detected particle sizes (e.g., a reduced amount of laser light is required to interact with species when such species have a larger radius and/or when there are higher amounts of the species present). Accordingly, the DLS % Transmission values for the three silver-based nanoparticle/nanoparticle solutions were lower than all other % Transmission values. Moreover, a higher "% of Transmission" number (i.e., 100%) is indicative of very small nanoparticles and/or significant ionic character present in the solution (e.g., at least when the concentration levels or ppm's of both silver and zinc are as low as those reported herein).

The next column entitled, "Predominant DLS Mass Distribution Peak (Radius in nm)" reports numbers that correspond to the peak in the Gaussian curves obtained in each of the DLS measurements. For example, these reported peak values come from Gaussian curves similar to the ones reported elsewhere herein. For the sake of brevity, the entire curves have not been included as FIGS. in this Example. However, wherever an "*" occurs, that "*" is intended to note that when considering all of the DLS reported data, it is possible that the solutions may be largely ionic in character, or at least the measurements from the DLS machine are questionable. It should be noted that at these concentration levels, in combination with small particle sizes and/or ionic character, it is often difficult to get an absolutely perfect DLS report. However, the relative trends are very informative.

Without wishing to be bound by any particular theory or explanation, it is clear that the input temperature of the liquid into the trough member 30 does have an effect on the inventive solutions made according to the teachings herein. Specifically, not only are amounts of components (e.g., ppm) affected by water input temperature, but physical properties are also affected. Thus, control of water temperature, in combination with control of all of the other inventive parameters discussed herein, can permit a variety of particle sizes to be achieved, differing zeta potentials to be achieved, different pH's to be achieved and corresponding different performance to be achieved.

Example 19

Y-Shaped Trough Member 30

Figure 79A:
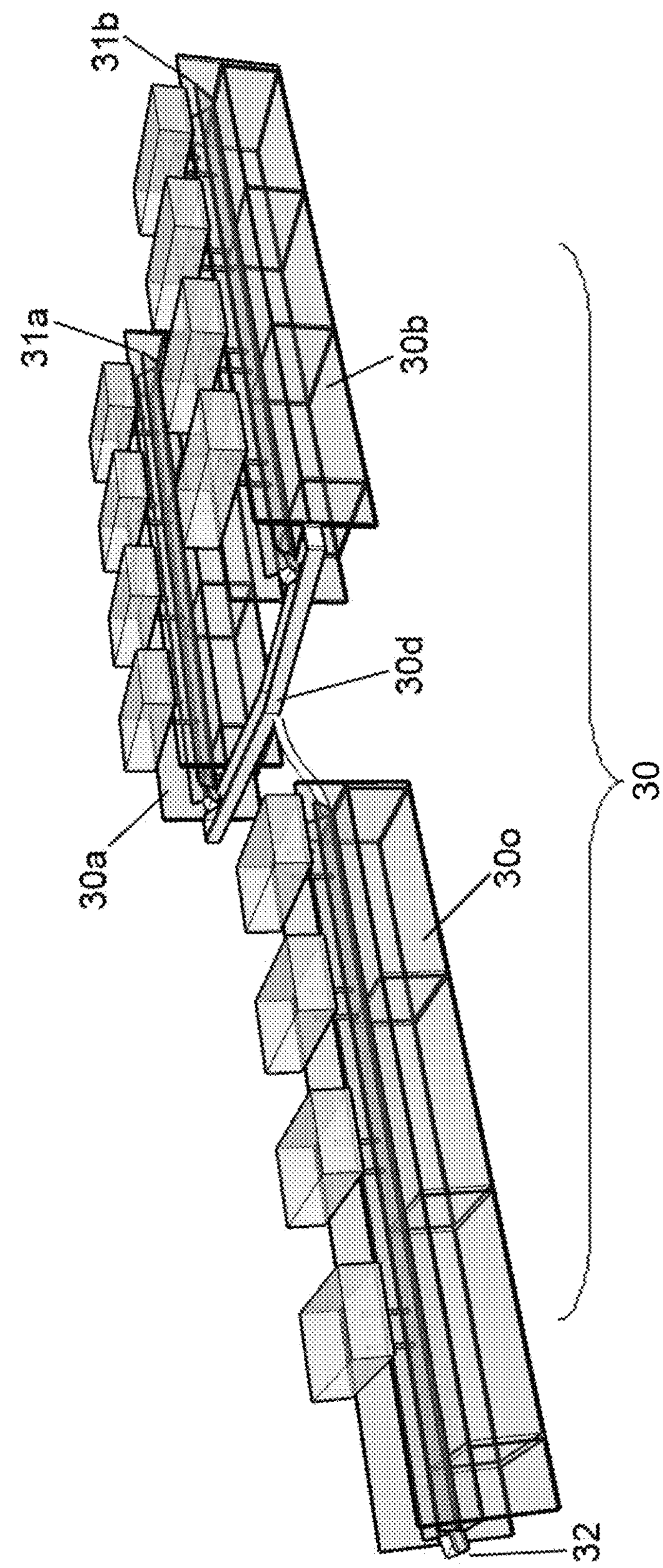
FIG. 79A is a perspective view of a Y-shaped trough member 30 made according to the invention and utilized in Example 15.

This Example utilized a different apparatus from those used to make the solutions in Examples 1-4, however, this Example utilized similar technical concepts to those disclosed in the aforementioned Examples. In reference to FIG. 79A, two trough member portions 30*a* and 30*b*, each having a four electrode set, were run in parallel to each other and functioned as "upper portions" of the Y-shaped trough member 30. A first Zn-based solution was made in trough member 30*a* and a second Ag-based solution was made substantially simultaneously in trough member 30*b*.

Once the solutions made in trough members 30*a* and 30*b* had been manufactured, these solutions were then processed in three different ways, namely:

(i) The Zn-based and Ag-based solutions were mixed together at the point 30*d* and flowed to the base portion 30*o* of the Y-shaped trough member 30 immediately after being formed in the upper portions, 30*a* and 30*b*, respectively. No further processing occurred in the base portion 30*o;*

(ii) The Zn-based and Ag-based solutions made in trough members 30*a* and 30*b* were mixed together after about 24 hours had passed after manufacturing each solution in each upper portion trough member 30*a* and 30*b* (i.e., the solutions were separately collected from each trough member 30*a* and 30*b* prior to being mixed together); and (iii) The solutions made in trough members 30*a* and 30*b* were mixed together in the base portion 30*o* of the y-shaped trough member 30 substantially immediately after being formed in the upper portions 30*a* and 30*b*, and were thereafter substantially immediately processed in the base portion 30*o* of the trough member 30 by another four electrode set.

Table 16a summarizes the electrode design, configuration, location and operating voltages for each of trough members 30*a* and 30*b* (i.e., the upper portions of the trough member 30) discussed in this Example. Specifically, the operating parameters associated with trough member 30*a* were used to manufacture a zinc-based nanoparticle/nanoparticle solution; whereas the operating parameters associated with trough member 30*b* were used to manufacture a silver-based nanoparticle/nanoparticle solution. Once these silver-based and zinc-based solutions were manufactured, they were mixed together substantially immediately at the point 30*d* and flowed to the base portion 30*o*. No further processing occurred.

TABLE 16a

Y-Shaped trough target voltage tables, for upper portions 30a and 30b
Run ID: YT-002

| 30a (Zn-based Solution) Flow Rate: 80 ml/min | | | | | 30b (Ag-based Solution) Flow Rate: 80 ml/min | | | | |
|---|---|---|---|---|---|---|---|---|---|
| Set # | Electrode # | Target Voltage (kV) | Distance "c-c" in/mm | Distance "x" in/mm | Set # | Electrode # | Target Voltage (kV) | Distance "c-c" in/mm | Distance "x" in/mm |
| | | | 6/152.4* | | | | | 6/152.4* | |
| 1 | 1a | 1.80 | | 0.29/7.37 | 1 | 1a | 1.59 | | 0.29/7.37 |
| | 5a | 1.45 | | N/A | | 5a | 1.15 | | N/A |
| | | | 8/203.2 | | | | | 8/203.2 | |
| 2 | 1b | 0.94 | | 0.22/5.59 | 2 | 5b | 0.72 | | 0.22/5.59 |
| | 5b | 1.02 | | N/A | | 5b′ | 0.72 | | N/A |
| | | | 8/203.2 | | | | | 8/203.2 | |
| 3 | 1c | 0.89 | | 0.22/5.59 | 3 | 5c | 0.86 | | 0.22/5.59 |
| | 5c | 0.96 | | N/A | | 5c′ | 0.54 | | N/A |
| | | | 8/203.2 | | | | | 8/203.2 | |
| 4 | 1d | 0.85 | | 0.22/5.59 | 4 | 5d | 0.78 | | 0.22/5.59 |
| | 5d | 0.99 | | N/A | | 5d′ | 0.98 | | N/A |
| | | | 5/127** | | | | | 5/127** | |

Output Water Temp 65 C. Output Water Temp 69 C.

Zn-based and Ag-based Solutions flow into base portion 30o and mix together

*Distance from water inlet to center of first electrode set
Distance from center of last electrode set to water outlet Table 16b summarizes the electrode design, configuration, location and operating voltages for each of trough members 30***a* and 30*b* (i.e., the upper portions of the trough member 30) discussed in this Example. Specifically, the operating parameters associated with trough member 30*a* were used to manufacture a zinc-based nanoparticle/nanoparticle solution; whereas the operating parameters associated with trough member 30*b* were used to manufacture a silver-based nanoparticle/nanoparticle solution. Once these silver-based and zinc-based solutions were manufactured, they were separately collected from each trough member 30*a* and 30*b* and were not mixed together until about 24 hours had passed. In this regard, each of the solutions made in 30*a* and 30*b* were collected at the outputs thereof and were not allowed to mix in the base portion 30*o* of the trough member 30, but were later mixed in another container.

TABLE 16b

Y-shaped trough target voltage tables, for upper portions 30a and 30b
Run IDs: YT-003/YT-004

| 30a (Zn-based Solution) YT-003 Flow Rate: 80 ml/min | | | | | 30b (Ag-based Solution) YT-004 Flow Rate: 80 ml/min | | | | |
|---|---|---|---|---|---|---|---|---|---|
| Set # | Electrode # | Target Voltage (kV) | Distance "c-c" in/mm | Distance "x" in/mm | Set # | Electrode # | Target Voltage (kV) | Distance "c-c" in/mm | Distance "x" in/mm |
| | | | 6/152.4* | | | | | 6/152.4* | |
| 1 | 1a | 1.80 | | 0.29/7.37 | 1 | 1a | 1.59 | | 0.29/7.37 |
| | 5a | 1.45 | | N/A | | 5a | 1.15 | | N/A |
| | | | 8/203.2 | | | | | 8/203.2 | |
| 2 | 1a | 0.94 | | 0.22/5.59 | 2 | 5b | 0.72 | | 0.22/5.59 |
| | 5a | 1.02 | | N/A | | 5b' | 0.72 | | N/A |
| | | | 8/203.2 | | | | | 8/203.2 | |
| 3 | 1c | 0.89 | | 0.22/5.59 | 3 | 5c | 0.86 | | 0.22/5.59 |
| | 5c | 0.96 | | N/A | | 5c' | 0.54 | | N/A |
| | | | 8/203.2 | | | | | 8/203.2 | |
| 4 | 1d | 0.85 | | 0.22/5.59 | 4 | 5d | 0.78 | | 0.22/5.59 |
| | 5d | 0.99 | | N/A | | 5d' | 0.98 | | N/A |
| | | | 5/127** | | | | | 5/127** | |

Output Water Temp 65 C. ↓ Zn-based solution collected seperately***

Output Water Temp 69 C. ↓ Ag-based solution collected seperately***

*Distance from water inlet to center of first electrode set
**Distance from center of last electrode set to water outlet
***Mixed together after 24 hours (YT-005)

Table 16c summarizes the electrode design, configuration, location and operating voltages for each of trough members 30*a* and 30*b* (i.e., the upper portions of the trough member 30) discussed in this Example. Specifically, the operating parameters associated with trough member 30*a* were used to manufacture a zinc-based nanoparticle/nanoparticle solution; whereas the operating parameters associated with trough member 30*b* were used to manufacture a silver-based nanoparticle/nanoparticle solution. Once these silver-based and zinc-based solutions were manufactured, they were mixed together substantially immediately at the point 30*d* and flowed to the base portion 30*o* and the mixture was subsequently processed in the base portion 30*o* of the trough member 30. In this regard, Table 19c shows the additional processing conditions associated with the base portion 30*o* of the trough member 30. Specifically, once again, electrode design, configuration, location and operating voltages are shown.

TABLE 16c

Y-shaped trough target voltage tables, for upper portions 30a and 30b

Run ID: YT-001

30a (Zn-based Solution)
Flow Rate: 80 ml/min

| Set # | Electrode # | Target Voltage (kV) | Distance "c-c" in/mm | Distance "x" in/mm |
|---|---|---|---|---|
| | | | 6/152.4* | |
| 1 | 1a | 1.80 | | 0.29/7.37 |
| | 5a | 1.45 | | N/A |
| | | | 8/203.2 | |
| 2 | 1b | 0.94 | | 0.22/5.59 |
| | 5b | 1.02 | | N/A |
| | | | 8/203.2 | |
| 3 | 1c | 0.89 | | 0.22/5.59 |
| | 5c | 0.96 | | N/A |
| | | | 8/203.2 | |
| 4 | 1d | 0.85 | | 0.22/5.59 |
| | 5d | 0.99 | | N/A |
| | | | 5/127** | |

Output Water Temp 65 C.

30b (Ag-based Solution)
Flow Rate: 80 ml/min

| Set # | Electrode # | Target Voltage (kV) | Distance "c-c" in/mm | Distance "x" in/mm |
|---|---|---|---|---|
| | | | 6/152.4* | |
| 1 | 1a | 1.59 | | 0.29/7.37 |
| | 5a | 1.15 | | N/A |
| | | | 8/203.2 | |
| 2 | 5b | 0.72 | | 0.22/5.59 |
| | 5b' | 0.72 | | N/A |
| | | | 8/203.2 | |
| 3 | 5c | 0.86 | | 0.22/5.59 |
| | 5c' | 0.54 | | N/A |
| | | | 8/203.2 | |
| 4 | 5d | 0.78 | | 0.22/5.59 |
| | 5d' | 0.98 | | N/A |
| | | | 5/127** | |

Output Water Temp 69 C.

30o Zn/Ag-based Solution (Zn-based and Ag-based Solutions flow into base portion 30o and mix together and are subsequently further processed.)

Flow Rate: 160 ml/min

| Set # | Electrode # | Target Voltage (kV) | Distance "c-c" in/mm | Distance "x" in/mm |
|---|---|---|---|---|
| | | | 7/177.8* | |
| 1 | 1a | 1.26 | | 0.29/7.37 |
| | 5a | 0.83 | | N/A |
| | | | 8/203.2 | |
| 2 | 1b | 0.85 | | 0.22/5.59 |
| | 5b | 0.87 | | N/A |
| | | | 8/203.2 | |
| 3 | 1c | 0.83 | | 0.22/5.59 |
| | 5c | 0.79 | | N/A |
| | | | 8/203.2 | |
| 4 | 1d | 0.70 | | 0.15/3.81 |
| | 5d | 0.97 | | N/A |
| | | | 41/1041.4** | |

Output Water Temp 71 C.

*Distance from water inlet to center of first electrode set

**Distance from center of last electrode set to water outlet

Table 16d shows a summary of the physical and biological characterization of the materials made in accordance with this Example 19.

TABLE 16d (Y-shaped trough summary)

| | PPM Ag | PPM Zn | Zeta Potential (Avg) | pH | DLS % Transmission | Predominant DLS Mass Distribution Peak (Radius in nm) | Time to Bacteria Growth Beginning |
|---|---|---|---|---|---|---|---|
| YT-002BA | 21.7 | 11.5 | 12.0 | 3.25 | 100% | 50.0 | 12.50 |
| YT-003BX | N/A | 23.2 | −13.7 | 2.86 | 100% | 60.0 | 0.00 |
| YT-004XA | 41.4 | N/A | −26.5 | 5.26 | 40% | 9.0 | 14.00 |
| YT-005 | 21.0 | 11.0 | 2.6 | 3.10 | 25% | 70.0 | 15.25 |
| YT-001BAB | 22.6 | 19.5 | −0.6 | 3.16 | 100% | 60.0 | 15.50 |

Example 20

Plasma Irradiance and Characterization

This Example provides a spectrographic analysis of various adjustable plasmas 4, all of which were formed in air, according to the teachings of the inventive concepts disclosed herein. In this Example, three different spectrometers with high sensitivities were used to collect spectral information about the plasmas 4. Specifically, spectrographic analysis was conducted on several plasmas, wherein the electrode member 1 comprised a variety of different metal compositions. Different species in the plasmas 4, as well as different intensities of some of the species, were observed. The presence/absence of such species can affect (e.g., positively and negatively) processing parameters and products made according to the teachings herein.

Figure 80:
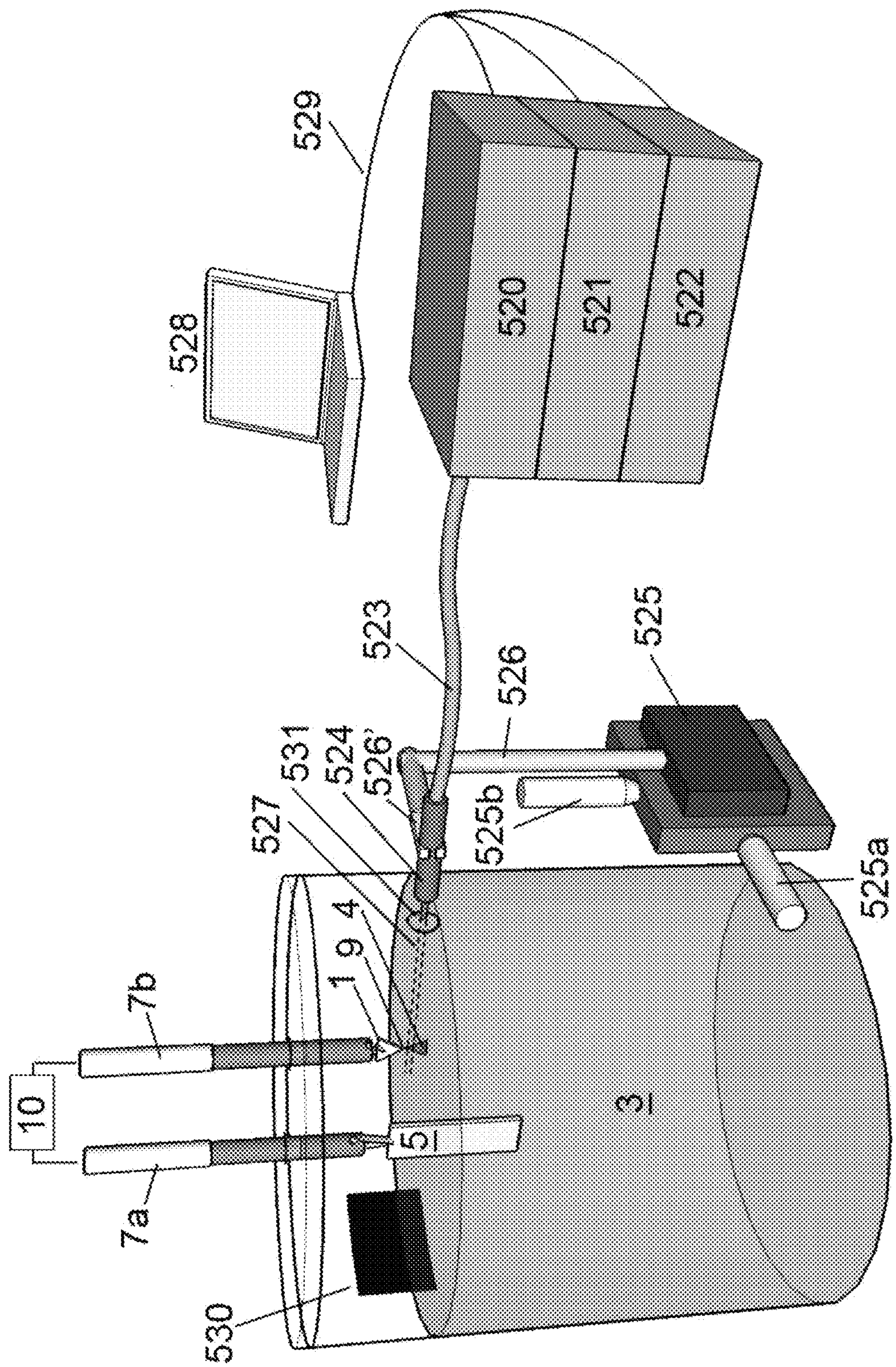
FIG. 80 is a schematic perspective view of the apparatus utilized to collect plasma emission spectroscopy data in Example 20.

In this regard, FIG. 80 shows a schematic view, in perspective, of the experimental setup used to collect emission spectroscopy information from the adjustable plasmas 4 utilized herein.

Specifically, the experimental setup for collecting plasma emission data (e.g., irradiance) is depicted in FIG. 80. In general, three spectrometers 520, 521 and 522 receive emission spectroscopy data through a UV optical fiber 523 which transmits collimated spectral emissions collected by the assembly 524, along the path 527. The assembly 524 can be vertically positioned to collect spectral emissions at different vertical locations within the adjustable plasma 4 by moving the assembly 524 with the X-Z stage 525. Accordingly, the presence/absence and intensity of plasma species can be determined as a function of interrogation location within the plasma 4. The output of the spectrometers 520, 521 and 522 was analyzed by appropriate software installed in the computer 528. All irradiance data was collected through the hole 531 which was positioned to be approximately opposite to the non-reflective material 530. The bottom of the hole 531 was located at the top surface of the liquid 3. More details of the apparatus for collecting emission radiance follows below.

The assembly 524 contained one UV collimator (LC-10U) with a refocusing assembly (LF-10U100) for the 170-2400 nm range. The assembly 524 also included an SMA female connector made by Multimode Fiber Optics, Inc. Each LC-10U and LF-10U100 had one UV fused silica lens associated therewith. Adjustable focusing was provided by LF-10U100 at about 100 mm from the vortex of the lens in LF-10U100 also contained in the assembly 524.

The collimator field of view at both ends of the adjustable plasma 4 was about 1.5 mm in diameter as determined by a 455 μm fiber core diameter comprising the solarization resistant UV optical fiber 523 (180-900 nm range and made by Mitsubishi). The UV optical fiber 523 was terminated at each end by an SMA male connector (sold by Ocean Optics; QP450-1-XSR).

The UV collimator-fiber system 523 and 524 provided 180-900 nm range of sensitivity for plasma irradiance coming from the 1.5 mm diameter plasma cylinder horizontally oriented in different locations in the adjustable plasma 4.

The X-Z stage 525 comprised two linear stages (PT1) made by Thorlabs Inc., that hold and control movement of the UV collimator 524 along the X and Z axes. It is thus possible to scan the adjustable plasma 4 horizontally and vertically, respectively.

Emission of plasma radiation collected by UV collimator-fiber system 523, 524 was delivered to either of three fiber coupled spectrometers 520, 521 or 522 made by StellarNet, Inc. (i.e., EPP2000-HR for 180-295 nm, 2400g/mm grating, EPP2000-HR for 290-400 nm, 1800g/mm grating, and EPP2000-HR for 395-505 nm, 1200g/mm grating). Each spectrometer 520, 521 and 522 had a 7 μm entrance slit, 0.1 nm optical resolution and a 2048 pixel CCD detector. Measured instrumental spectral line broadening is 0.13 nm at 313.1 nm.

Spectral data acquisition was controlled by SpectraWiz software for Windows/XP made by StellarNet. All three EPP2000-HR spectrometers 520, 521 and 522 were interfaced with one personal computer 528 equipped with 4 USB ports. The integration times and number of averages for various spectral ranges and plasma discharges were set appropriately to provide unsaturated signal intensities with the best possible signal to noise ratios. Typically, spectral integration time was order of 1 second and number averaged spectra was in range 1 to 10. All recorded spectra were acquired with subtracted optical background. Optical background was acquired before the beginning of the acquisition of a corresponding set of measurements each with identical data acquisition parameters.

Each UV fiber-spectrometer system (i.e., 523/520, 523/521 and 523/522) was calibrated with an AvaLight -DH-CAL Irradiance Calibrated Light Source, made by Avantes (not shown). After the calibration, all acquired spectral intensities were expressed in (absolute) units of spectral irradiance (mW/m$^2$/nm), as well as corrected for the non-linear response of the UV-fiber-spectrometer. The relative error of the AvaLight -DH-CAL Irradiance Calibrated Light Source in 200-1100 nm range is not higher than 10%.

Alignment of the field of view of the UV collimator assembly 524 relative to the tip 9 of the metal electrode 1 was performed before each set of measurements. The center of the UV collimator assembly 524 field of view was placed at the tip 9 by the alignment of two linear stages and by sending a light through the UV collimator-fiber system 523, 524 to the center of each metal electrode 1.

The X-Z stage 525 was utilized to move the assembly 524 into roughly a horizontal, center portion of the adjustable plasma 4, while being able to move the assembly 524 vertically such that analysis of the spectral emissions occurring at different vertical heights in the adjustable plasma 4 could be made. In this regard, the assembly 524 was positioned at different heights, the first of which was located as close as possible of the tip 9 of the electrode 1, and thereafter moved away from the tip 9 in specific amounts. The emission spectroscopy of the plasma often did change as a function of interrogation position, as shown in FIGS. 81-84 herein.

For example, FIGS. 81A-81D show the irradiance data associated with a silver (Ag) electrode 1 utilized to form the adjustable plasma 4. Each of the aforementioned FIG. 81 show emission data associated with three different vertical interrogation locations within the adjustable plasma 4. The vertical position "0" (0 nm) corresponds to emission spectroscopy data collected immediately adjacent to the tip 9 of the electrode 1; the vertical position "1/40" (0.635 nm) corresponds to emission spectroscopy data 0.635 mm away from the tip 9 and toward the surface of the water 3; and the vertical position "3/20" (3.81 mm) corresponds to emission spectroscopy data 3.81 mm away from the tip 9 and toward the surface of the water 3.

Table 17a shows specifically each of the spectral lines identified in the adjustable plasma 4 when a silver electrode 1 was utilized to create the plasma 4.

TABLE 17a

| Transition | λ tab. (nm) | λ meas. (nm) | λ meas. −λ tab. (nm) | En (1/cm) | Em (1/cm) | gn | gm | Amn (1/s) |
|---|---|---|---|---|---|---|---|---|
| Ag II 5s $^3D_3$-5p $^3D_3$ | 211.382 | 211.4000 | 0.0180 | 39168.032 | 86460.65 | 7 | 7 | 3.26E8 |
| NO $A^2\Sigma^+$-$X^2\Pi$ γ-system: (1-0) | 214.7 | 214.7000 | 0.0000 | | | | | |
| Ag II 5s $^3D_2$-5p $^3D_3$ | 218.676 | 218.6900 | 0.0140 | 40745.335 | 86460.65 | 5 | 7 | |
| Ag II 5s $^1D_2$-5p $^3D_2$ | 222.953 | 222.9800 | 0.0270 | 46049.029 | 90887.81 | 5 | 5 | |
| Ag II 5s $^3D_3$-5p $^3F_4$ | 224.643 | 224.67 | 0.0270 | 39167.986 | 83669.614 | 7 | 9 | 3.91E8 |
| Ag II 5s $^3D_3$-5p $^3P_1$ | 224.874 | 224.9 | 0.0260 | 40745.335 | 85200.721 | 7 | 5 | 2.95E8 |
| NO $A^2\Sigma^+$-$X^2\Pi$ γ-system: (0-0) | 226.9 | 226.8300 | −0.0700 | | | | | |
| Ag II 5s $^1D_2$-5p $^1P_1$ | 227.998 | 228.02 | 0.0220 | 46049.029 | 89895.502 | 5 | 3 | 1.39E8 |
| Ag II 5s $^3D_1$-5p $^1D_2$ | 231.705 | 231.7700 | 0.0650 | 43742.7 | 86888.06 | 3 | 5 | |
| Ag II 5s $^1D_2$-5p $^1F_3$ | 232.029 | 232.0500 | 0.0210 | 46049.029 | 89134.688 | 5 | 7 | 2.74E8 |
| Ag II 5s $^3D_3$-5p $^3F_3$ | 232.468 | 232.5100 | 0.0420 | 39167.986 | 82171.697 | 7 | 7 | 0.72E8 |
| Ag II 5s $^3D_2$-5p $^3P_1$ | 233.14 | 233.1900 | 0.0500 | 40745.335 | 83625.479 | 5 | 3 | 2.54E8 |
| NO $A^2\Sigma^+$-$X^2\Pi$ γ-system: (0-1) | 236.3 | 236.2100 | −0.0900 | | | | | |
| Ag II 5s $^3D_2$-5p $^3F_3$ | 241.323 | 241.3000 | −0.0230 | 40745.335 | 82171.697 | 5 | 7 | 2.21E8 |
| Ag II 5s $^3D_3$-5p $^3P_2$ | 243.781 | 243.7700 | −0.0110 | 39167.986 | 80176.425 | 7 | 5 | 2.88E8 |
| Ag II 5s $^1D_2$-5p $^1D_2$ | 244.793 | 244.8000 | 0.0070 | 46049.029 | 86883.06 | 5 | 5 | |
| NO $A^2\Sigma^+$-$X^2\Pi$ γ-system: (0-2) | 247.1 | 246.9300 | −0.1700 | | | | | |
| NO $A^2\Sigma^+$-$X^2\Pi$ γ-system: (0-3) | 258.3 | 258.5300 | 0.2300 | | | | | |
| NO $A^2\Sigma^+$-$X^2\Pi$ γ-system: (1-1) | 267.1 | 267.0600 | −0.0400 | | | | | |
| NO $A^2\Sigma^+$-$X^2\Pi$ γ-system: (0-4) | 271 | 271.1400 | 0.1400 | | | | | |
| OH $A^2\Sigma$-$X^2\Pi$ (1-0) | 281.2 | 281.2000 | 0.0000 | | | | | |
| OH $A^2\Sigma$-$X^2\Pi$ (1-0) | 282 | 281.9600 | −0.0400 | | | | | |
| $N_2$ ($C^3\Pi_u$-$B^3\Pi_g$) $2^+$-system (4-2) | 295.32 | 295.3300 | 0.0100 | | | | | |
| $N_2$ ($C^3\Pi_u$-$B^3\Pi_g$) $2^+$-system (3-1) | 296.2 | 296.1900 | −0.0100 | | | | | |
| $N_2$ ($C^3\Pi_u$-$B^3\Pi_g$) $2^+$-system (2-0) | 297.7 | 297.7000 | 0.0000 | | | | | |
| OH $A^2\Sigma$-$X^2\Pi$: (0-0) | 306.537 | 306.4600 | −0.0770 | | | | | |
| OH $A^2\Sigma$-$X^2\Pi$: (0-0) | 306.776 | 306.8400 | 0.0640 | | | | | |
| OH $A^2\Sigma$-$X^2\Pi$: (0-0) | 307.844 | 307.8700 | 0.0260 | | | | | |
| OH $A^2\Sigma$-$X^2\Pi$: (0-0) | 308.986 | 309.0700 | 0.0840 | | | | | |
| $N_2$ ($C^3\Pi_u$-$B^3\Pi_g$) $2^+$-system (2-1) | 313.057 | 313.1564 | 0.0994 | | | | | |
| $N_2$ ($C^3\Pi_u$-$B^3\Pi_g$) $2^+$-system (1-0) | 316 | 315.8700 | −0.1300 | | | | | |
| Cu I $3d^{10}$ ($^1S$) 4s $^2S_{1/2}$-$3d^{10}$($^1S$) 4p $^2P^0_{3/2}$ | 324.754 | 324.7800 | 0.0260 | 0 | 30783.686 | 2 | 4 | 1.37E+8 |
| Ag I $4d^{10}$($^1S$) 5s $^2S_{1/2}$-$4d^{10}$($^1S$) 5p $^2P^0_{3/2}$ | 328.068 | 328.1200 | 0.0520 | 0 | 30472.703 | 2 | 4 | 1.47E+8 |
| $O_2$ ($B^3\Sigma^-_u$-$X^3\Sigma^-_g$) (0-14) | 337 | 337.0800 | 0.0800 | | | | | |
| $N_2$ ($C^3\Pi_u$-$B^3\Pi_g$) $2^+$-system (0-0) | 337.1 | 337.1400 | 0.0400 | | | | | |
| Ag I $4d^{10}$($^1S$) 5s $^2S_{1/2}$-$4d^{10}$($^1S$) 5p $^2P^0_{1/2}$ | 338.2887 | 338.3500 | 0.0613 | 0 | 29552.061 | 2 | 2 | 1.35.E+8 |
| $N_2$ ($C^3\Pi_u$-$B^3\Pi_g$) $2^+$-system (2-3) | 350.05 | 349.9700 | −0.0800 | | | | | |
| $N_2$ ($C^3\Pi_u$-$B^3\Pi_g$) $2^+$-system (1-2) | 353.67 | 353.6400 | −0.0300 | | | | | |
| $N_2$ ($C^3\Pi_u$-$B^3\Pi_g$) $2^+$-system (0-1) | 357.69 | 357.6500 | −0.0400 | | | | | |
| $N_2^+$ ($B^2\Sigma^+_u$-$X^{2+}_g$) $1^+$-system (1-0) | 358.2 | 358.2000 | 0.0000 | | | | | |
| $N_2$ ($C^3\Pi_u$-$B^3\Pi_g$) $2^+$-system (2-4) | 371 | 370.9500 | −0.0500 | | | | | |
| $N_2$ ($C^3\Pi_u$-$B^3\Pi_g$) $2^+$-system (1-3) | 375.54 | 375.4500 | −0.0900 | | | | | |
| $N_2$ ($C^3\Pi_u$-$B^3\Pi_g$) $2^+$-system (0-2) | 380.49 | 380.4000 | −0.0900 | | | | | |
| $N_2^+$ ($B^2\Sigma^+_u$-$X^{2+}_g$) $1^-$-system (1-1) | 388.4 | 388.4200 | 0.0200 | | | | | |
| $N_2^+$ ($B^2\Sigma^+_u$-$X^{2+}_g$) $1^-$-system (0-0) | 391.4 | 391.3700 | −0.0300 | | | | | |
| $N_2$ ($C^3\Pi_u$-$B^3\Pi_g$) $2^+$-system (1-4) | 399.8 | 399.7100 | −0.0900 | | | | | |
| $N_2$ ($C^3\Pi_u$-$B^3\Pi_g$) $2^+$-system (0-3) | 405.94 | 405.8600 | −0.0800 | | | | | |
| $N_2$ ($C^3\Pi_u$-$B^3\Pi_g$) $2^+$-system (4-8) | 409.48 | 409.4900 | 0.0100 | | | | | |
| $N_2$ ($C^3\Pi_u$-$B^3\Pi_g$) $2^+$-system (1-5) | 421.2 | 421.1600 | −0.0400 | | | | | |
| $N_2^+$ ($B^2\Sigma^+_u$-$X^{2+}_g$) $1^-$-system (1-2) | 424 | 423.6400 | −0.3600 | | | | | |
| $N_2^+$ ($B^2\Sigma^+_u$-$X^{2+}_g$) $1^-$-system (0-1) | 427.81 | 427.8300 | 0.0200 | | | | | |
| $N_2$ ($C^3\Pi_u$-$B^3\Pi_g$) $2^+$-system (3-8) | 441.67 | 441.6200 | −0.0500 | | | | | |
| $N_2^+$ ($B^2\Sigma^+_u$-$X^{2+}_g$) $1^-$-system (1-3) | 465.1 | 465.1300 | 0.0300 | | | | | |
| Ag I $4d^{10}$($^1S$) 5p $^2P^0_{3/2}$-$4d^{10}$($^1S$) 7s $^2S_{1/2}$ | 466.8477 | 466.9100 | 0.0623 | 30472.703 | 51886.971 | 4 | 2 | |

TABLE 17a-continued

| Transition | λ tab. (nm) | λ meas. (nm) | λ meas. −λ tab. (nm) | En (1/cm) | Em (1/cm) | gn | gm | Amn (1/s) |
|---|---|---|---|---|---|---|---|---|
| $N_2^+$ ($B^2\Sigma^+_u$-$X^{2+}_g$) $1^-$-system (0-2) | 470.9 | 470.8400 | −0.0600 | | | | | |
| Ag I $4d^{10}(^1S)$ 5p $^2P^0_{1/2}$-$4d^{10}(^1S)$ 5d $^2D_{3/2}$ | 520.9078 | 520.8653 | −0.0425 | 29552.061 | 48743.969 | 2 | 4 | 7.50E+7 |
| Ag I $4d^{10}(^1S)$ 5p $^2P^0_{3/2}$-$4d^{10}(^1S)$ 5d $^2D_{5/2}$ | 546.5497 | 546.5386 | −0.0111 | 30472.703 | 48764.219 | 4 | 6 | 8.60E+7 |
| Na I 3s $^2S_{1/2}$-3p $^2P^0_{3/2}$ | 588.99 | 588.995 | 0.0050 | | | | | |
| H I 2p $^2P_{3/2}$-3d $^2D_{5/2}$ | 656.2852 | 655.8447 | −0.4405 | 82259.287 | 97492.357 | 4 | 6 | 6.47E+7 |
| N I 3s $^4P_{5/2}$-3p $^4S_{3/2}$ | 746.8312 | 746.8815 | 0.0503 | 83364.62 | 96750.84 | 6 | 4 | 1.93E+7 |
| $N_2$ ($B^3\Pi_g$-$A^3\Sigma^-_u$) $1^+$-system | 750 | 749.9618 | −0.0382 | | | | | |
| Ag I $4d^{10}(^1S)$ 5p $^2P^0_{1/2}$-$4d^{10}(^1S)$ 6s $^2S_{1/2}$ | 768.7772 | 768.4540 | −0.3232 | 29552.061 | 42556.152 | 2 | 2 | |
| O I 3s $^5S_2$-3p$^5P_3$ | 777.1944 | 776.8659 | −0.3285 | 73768.2 | 86631.454 | 5 | 7 | 3.69E+7 |
| Ag I $4d^{10}(^1S)$ 5p $^2P^0_{3/2}$-$4d^{10}(^1S)$ 6s $^2S_{1/2}$ | 827.3509 | 827.1320 | −0.2189 | 30472.703 | 42556.152 | 4 | 2 | |
| O I 3s $^3S_1$-3p $^3P_2$ | 844.6359 | 844.2905 | −0.3454 | 76794.978 | 88631.146 | 3 | 5 | 3.22E+7 |
| N I 3s $^4P_{5/2}$-3p $^4D_{7/2}$ | 868.0282 | 868.2219 | 0.1937 | 83364.62 | 94881.82 | 6 | 8 | 2.46E+7 |
| O I 3p $^5P_3$-3d $^5D_4$ | 926.6006 | 926.3226 | −0.2780 | 86631.454 | 97420.63 | 7 | 9 | 4.45E+7 |

FIGS. 82A-82D, along with Table 17b, show similar emission spectra associated with a gold electrode 1 was utilized to create the plasma 4.

TABLE 17b

| Transition | λ tab. (nm) | λ meas. (nm) | λ meas. −λ tab. (nm) | En (1/cm) | Em (1/cm) | gn | gm | Amn (1/s) |
|---|---|---|---|---|---|---|---|---|
| NO $A^2\Sigma^+$-$X^2\Pi$ γ-system: (1-0) | 214.7 | 214.7000 | 0.0000 | | | | | |
| NO $A^2\Sigma^+$-$X^2\Pi$ γ-system: (0-0) | 226.9 | 226.8300 | 0.0700 | | | | | |
| NO $A^2\Sigma^+$-$X^2\Pi$ γ-system: (0-1) | 236.3 | 236.2100 | −0.0900 | | | | | |
| NO $A^2\Sigma^+$-$X^2\Pi$ γ-system: (0-2) | 247.1 | 246.9300 | −0.1700 | | | | | |
| NO $A^2\Sigma^+$-$X^2\Pi$ γ-system: (0-3) | 258.3 | 258.5300 | 0.2300 | | | | | |
| Pt I $5d^96s$ $^1D_2$-$5d^8(^1D)6s6p(3P^0)$ $^3F^0_2$ | 262.80269 | 262.8200 | 0.0173 | 775.892 | 38815.908 | 7 | 5 | 4.82E+7 |
| Pt I $5d^96s$ $^3D_3$-$5d^96p^3F^0_4$ | 265.94503 | 265.9000 | −0.0450 | 0 | 37590.569 | 7 | 9 | 8.90E+7 |
| NO $A^2\Sigma^+$-$X^2\Pi$ γ-system: (1-1) | 267.1 | 267.0600 | −0.0400 | | | | | |
| Pt I $5d^96s$ $^1D_2$-$5d^96p^3D^0_3$ | 270.23995 | 270.2100 | −0.0300 | 775.892 | 37769.073 | 5 | 7 | 5.23E+7 |
| Pt I $5d^86s^2$ $^3F_4$-$5d^96p^3D^0_3$ | 270.58951 | 270.5600 | −0.0295 | 823.678 | 37769.073 | 9 | 7 | 3.80E+7 |
| NO $A^2\Sigma^+$-$X^2\Pi$ γ-system: (0-4) | 271 | 271.1400 | 0.1400 | | | | | |
| Pt I $5d^96s$ $^1D_2$-$5d^96p^3P^0_2$ | 273.39567 | 273.3600 | −0.0357 | 775.892 | 37342.101 | 5 | 5 | 6.72E+7 |
| OH $A^2\Sigma$-$X^2\Pi$ (1-0) | 281.2 | 281.2000 | 0.0000 | | | | | |
| OH $A^2\Sigma$-$X^2\Pi$ (1-0) | 282 | 281.9600 | −0.0400 | | | | | |
| Pt I $5d^96s$ $^3D_3$-$5d^8(^3F)6s6p(^3P^0)$ $^5D^0_3$ | 283.02919 | 283.0200 | −0.0092 | 0 | 35321.653 | 7 | 7 | 1.68E+7 |
| Pt I $5d^96s$ $^1D_2$-$5d^8(^3F)6s6p(^3P^0)$ $^5D^0_3$ | 289.3863 | 289.4200 | 0.0337 | 775.892 | 35321.653 | 5 | 7 | 6.47E+6 |
| $N_2$ ($C^3\Pi_u$-$B^3\Pi_g$) $2^+$-system (4-2) | 295.32 | 295.3300 | 0.0100 | | | | | |
| $N_2$ ($C^3\Pi_u$-$B^3\Pi_g$) $2^+$-system (3-1) | 296.2 | 296.1900 | −0.0100 | | | | | |
| $N_2$ ($C^3\Pi_u$-$B^3\Pi_g$) $2^+$-system (2-0) | 297.7 | 297.7000 | 0.0000 | | | | | |
| Pt I $5d^96s$ $^1D_2$-$5d^96p^3F^0_3$ | 299.79622 | 299.8600 | 0.0638 | 775.892 | 34122.165 | 5 | 7 | 2.88E+7 |
| Pt I $5d^86s^2$ $^3F_4$-$5d^8(^3F)6s6p(^3P^0)$ $^5F^0_5$ | 304.26318 | 304.3500 | 0.0868 | 823.678 | 33680.402 | 9 | 11 | 7.69E+6 |
| OH $A^2\Sigma$-$X^2\Pi$: (0-0) | 306.537 | 306.4600 | −0.0770 | | | | | |
| OH $A^2\Sigma$-$X^2\Pi$: (0-0) | 306.776 | 306.8400 | 0.0640 | | | | | |
| OH $A^2\Sigma$-$X^2\Pi$: (0-0) | 307.844 | 307.8700 | 0.0260 | | | | | |
| OH $A^2\Sigma$-$X^2\Pi$: (0-0) | 308.986 | 309.0700 | 0.0840 | | | | | |
| $N_2$ ($C^3\Pi_u$-$B^3\Pi_g$) $2^+$-system (2-1) | 313.57 | 313.5800 | 0.0100 | | | | | |
| $N_2$ ($C^3\Pi_u$-$B^3\Pi_g$) $2^+$-system (1-0) | 316 | 315.9200 | −0.0800 | | | | | |
| $O_2$ ($B^3\Sigma^-_u$-$X^3\Sigma^-_g$) (0-14) | 337 | 337.0800 | 0.0800 | | | | | |
| $N_2$ ($C^3\Pi_u$-$B^3\Pi_g$) $2^+$-system (0-0) | 337.1 | 337.1400 | 0.0400 | | | | | |
| $N_2$ ($C^3\Pi_u$-$B^3\Pi_g$) $2^+$-system (2-3) | 350.05 | 349.9700 | −0.0800 | | | | | |
| $N_2$ ($C^3\Pi_u$-$B^3\Pi_g$) $2^+$-system (1-2) | 353.67 | 353.6400 | −0.0300 | | | | | |
| $N_2$ ($C^3\Pi_u$-$B^3\Pi_g$) $2^+$-system (0-1) | 357.69 | 357.6500 | −0.0400 | | | | | |
| $N_2^+$ ($B^2\Sigma^+_u$-$X^{2+}_g$) $1^-$-system (1-0) | 358.2 | 358.2000 | 0.0000 | | | | | |
| $N_2$ ($C^3\Pi_u$-$B^3\Pi_g$) $2^+$-system (2-4) | 371 | 370.9500 | −0.0500 | | | | | |
| $N_2$ ($C^3\Pi_u$-$B^3\Pi_g$) $2^+$-system (1-3) | 375.54 | 375.4500 | −0.0900 | | | | | |
| $N_2$ ($C^3\Pi_u$-$B^3\Pi_g$) $2^+$-system (0-2) | 380.49 | 380.4000 | −0.0900 | | | | | |
| $N_2^+$ ($B^2\Sigma^+_u$-$X^{2+}_g$) $1^-$-system (1-1) | 388.4 | 388.4200 | 0.0200 | | | | | |
| $N_2^+$ ($B^2\Sigma^+_u$-$X^{2+}_g$) $1^-$-system (0-0) | 391.4 | 391.3700 | −0.0300 | | | | | |
| $N_2$ ($C^3\Pi_u$-$B^3\Pi_g$) $2^+$-system (1-4) | 399.8 | 399.7100 | −0.0900 | | | | | |
| $N_2$ ($C^3\Pi_u$-$B^3\Pi_g$) $2^+$-system (0-3) | 405.94 | 405.8100 | −0.1300 | | | | | |
| $N_2$ ($C^3\Pi_u$-$B^3\Pi_g$) $2^+$-system (4-8) | 409.48 | 409.4900 | 0.0100 | | | | | |
| $N_2^+$ ($B^2\Sigma^+_u$-$X^{2+}_g$) $1^-$-system (2-3) | 419.96 | 420.0000 | 0.0400 | | | | | |
| $N_2^+$ ($B^2\Sigma^+_u$-$X^{2+}_g$) $1^-$-system (1-2) | 423.65 | 423.6400 | −0.0100 | | | | | |
| $N_2^+$ ($B^2\Sigma^+_u$-$X^{2+}_g$) $1^-$-system (0-1) | 427.785 | 427.7700 | −0.0150 | | | | | |
| $N_2$ ($C^3\Pi_u$-$B^3\Pi_g$) $2^+$-system (3-8) | 441.67 | 441.6200 | −0.0500 | | | | | |
| $N_2^+$ ($B^2\Sigma^+_u$-$X^{2+}_g$) $1^-$-system (1-3) | 465.1 | 465.1300 | 0.0300 | | | | | |

TABLE 17b-continued

| Transition | λ tab. (nm) | λ meas. (nm) | λ meas. −λ tab. (nm) | En (1/cm) | Em (1/cm) | gn | gm | Amn (1/s) |
|---|---|---|---|---|---|---|---|---|
| $N_2^+$ ($B^2\Sigma^+_u$-$X^{2+}_g$) $1^-$-system (0-2) | 470.9 | 470.8400 | −0.0600 | | | | | |
| Na I 3s $^2S_{1/2}$-3p $^2P^0_{3/2}$ | 588.99 | 588.995 | 0.0050 | | | | | |
| H I 2p $^2P_{3/2}$-3d $^2D_{5/2}$ | 656.2852 | 655.8447 | −0.4405 | 82259.287 | 97492.357 | 4 | 6 | 6.47E+07 |
| N I 3s $^4P_{5/2}$-3d $^4S_{3/2}$ | 746.8312 | 746.8815 | 0.0503 | 83364.62 | 96750.84 | 6 | 4 | 1.93E+07 |
| $N_2$ ($B^3\Pi_g$-$A^3\Sigma^-_u$) $1^+$-system | 750 | 749.9618 | −0.0382 | | | | | |
| O I 3s $^5S_2$-3p$^5P_3$ | 777.1944 | 776.8659 | −0.3285 | 73768.2 | 86631.454 | 5 | 7 | 3.69E+07 |
| O I 3s $^3S_1$-3p $^3P_2$ | 844.6359 | 844.2905 | −0.3454 | 76794.978 | 88631.146 | 3 | 5 | 3.22E+07 |
| N I 3s $^4P_{5/2}$-3d $^4D_{7/2}$ | 868.0282 | 868.2219 | 0.1937 | 83364.62 | 94881.82 | 6 | 8 | 2.46E+07 |
| O I 3p $^5P_3$-3d $^5D_4$ | 926.6006 | 926.3226 | −0.2780 | 86631.454 | 97420.63 | 7 | 9 | 4.45E+07 |

FIGS. 83A-83D, along with Table 17c, show similar emission spectra associated with a platinum electrode 1 was utilized to create the plasma 4.

TABLE 17c

| Transition | λ tab. (nm) | λ meas. (nm) | λ meas. −λ tab. (nm) | En (1/cm) | Em (1/cm) | gn | gm | Amn (1/s) |
|---|---|---|---|---|---|---|---|---|
| NO $A^2\Sigma^+$-$X^2\Pi$ γ-system: (1-0) | 214.7 | 214.7000 | 0.0000 | | | | | |
| NO $A^2\Sigma^+$-$X^2\Pi$ γ-system: (0-0) | 226.9 | 226.8300 | −0.0700 | | | | | |
| NO $A^2\Sigma^+$-$X^2\Pi$ γ-system: (0-1) | 236.3 | 236.2100 | −0.0900 | | | | | |
| Au I 5d$^{10}$6s $^2S_{1/2}$-5d$^{10}$6p $^2P^0_{3/2}$ | 242.795 | 242.7990 | −0.0050 | 0 | 41174.613 | 2 | 4 | 1.99E4+8 |
| NO $A^2\Sigma^+$-$X^2\Pi$ γ-system: (0-2) | 247.1 | 246.9300 | −0.1700 | | | | | |
| NO $A^2\Sigma^+$-$X^2\Pi$ γ-system: (0-3) | 258.3 | 258.5300 | 0.2300 | | | | | |
| NO $A^2\Sigma^+$-$X^2\Pi$ γ-system: (1-1) | 267.1 | 267.0600 | −0.0400 | | | | | |
| Au I 5d$^{10}$6s $^2S_{1/2}$-5d$^{10}$6p $^2P^0_{1/2}$ | 267.595 | 267.59 | −0.0050 | 0 | 37358.991 | 2 | 2 | 1.64E+8 |
| NO $A^2\Sigma^+$-$X^2\Pi$ γ-system: (0-4) | 271 | 271.1400 | 0.1400 | | | | | |
| Au I 5d$^9$6s$^2$ $^2D_{5/2}$-5d$^9$($^2D_{5/2}$)6s6p $^24^0_{7/2}$ | 274.825 | 274.82 | −0.0050 | 9161.177 | 45537.195 | 6 | 8 | |
| OH $A^2\Sigma$-$X^2\Pi$ (1-0) | 281.2 | 281.2000 | 0.0000 | | | | | |
| OH $A^2\Sigma$-$X^2\Pi$ (1-0) | 282 | 281.9600 | −0.0400 | | | | | |
| $N_2$ ($C^3\Pi_u$-$B^3\Pi_g$) $2^+$-system (4-2) | 295.32 | 295.3300 | 0.0100 | | | | | |
| $N_2$ ($C^3\Pi_u$-$B^3\Pi_g$) $2^+$-system (3-1) | 296.2 | 296.1900 | −0.0100 | | | | | |
| $N_2$ ($C^3\Pi_u$-$B^3\Pi_g$) $2^+$-system (2-0) | 297.7 | 297.7000 | 0.0000 | | | | | |
| OH $A^2\Sigma$-$X^2\Pi$: (0-0) | 306.537 | 306.4600 | −0.0770 | | | | | |
| OH $A^2\Sigma$-$X^2\Pi$: (0-0) | 306.776 | 306.8400 | 0.0640 | | | | | |
| OH $A^2\Sigma$-$X^2\Pi$: (0-0) | 307.844 | 307.8700 | 0.0260 | | | | | |
| OH $A^2\Sigma$-$X^2\Pi$: (0-0) | 308.986 | 309.0700 | 0.0840 | | | | | |
| $N_2$ ($C^3\Pi_u$-$B^3\Pi_g$) $2^+$-system (2-1) | 313.57 | 313.5800 | 0.0100 | | | | | |
| $N_2$ ($C^3\Pi_u$-$B^3\Pi_g$) $2^+$-system (1-0) | 316 | 315.9200 | −0.0800 | | | | | |
| $O_2$ ($B^3\Sigma^-_u$-$X^3\Sigma^-_g$) (0-14) | 337 | 337.0800 | 0.0800 | | | | | |
| $N_2$ ($C^3\Pi_u$-$B^3\Pi_g$) $2^+$-system (0-0) | 337.1 | 337.1400 | 0.0400 | | | | | |
| $N_2$ ($C^3\Pi_u$-$B^3\Pi_g$) $2^+$-system (2-3) | 350.05 | 349.9700 | −0.0800 | | | | | |
| $N_2$ ($C^3\Pi_u$-$B^3\Pi_g$) $2^+$-system (1-2) | 353.67 | 353.6400 | −0.0300 | | | | | |
| $N_2$ ($C^3\Pi_u$-$B^3\Pi_g$) $2^+$-system (0-1) | 357.69 | 357.6500 | −0.0400 | | | | | |
| $N_2^+$ ($B^2\Sigma^+_u$-$X^{2+}_g$) $1^-$-system (1-0) | 358.2 | 358.2000 | 0.0000 | | | | | |
| $N_2$ ($C^3\Pi_u$-$B^3\Pi_g$) $2^+$-system (2-4) | 371 | 370.9500 | −0.0500 | | | | | |
| $N_2$ ($C^3\Pi_u$-$B^3\Pi_g$) $2^+$-system (1-3) | 375.54 | 375.4500 | −0.0900 | | | | | |
| $N_2$ ($C^3\Pi_u$-$B^3\Pi_g$) $2^+$-system (0-2) | 380.49 | 380.4000 | −0.0900 | | | | | |
| $N_2^+$ ($B^2\Sigma^+_u$-$X^{2+}_g$) $1^-$-system (1-1) | 388.4 | 388.4200 | 0.0200 | | | | | |
| $N_2^+$ ($B^2\Sigma^+_u$-$X^{2+}_g$) $1^-$-system (0-0) | 391.4 | 391.3700 | −0.0300 | | | | | |
| $N_2$ ($C^3\Pi_u$-$B^3\Pi_g$) $2^+$-system (1-4) | 399.8 | 399.7100 | −0.0900 | | | | | |
| $N_2$ ($C^3\Pi_u$-$B^3\Pi_g$) $2^+$-system (0-3) | 405.94 | 405.8100 | −0.1300 | | | | | |
| $N_2$ ($C^3\Pi_u$-$B^3\Pi_g$) $2^+$-system (4-8) | 409.48 | 409.4900 | 0.0100 | | | | | |
| $N_2^+$ ($B^2\Sigma^+_u$-$X^{2+}_g$) $1^-$-system (2-3) | 419.96 | 420.0000 | 0.0400 | | | | | |
| $N_2^+$ ($B^2\Sigma^+_u$-$X^{2+}_g$) $1^-$-system (1-2) | 423.65 | 423.6400 | −0.0100 | | | | | |
| $N_2^+$ ($B^2\Sigma^+_u$-$X^{2+}_g$) $1^-$-system (0-1) | 427.785 | 427.7700 | −0.0150 | | | | | |
| $N_2$ ($C^3\Pi_u$-$B^3\Pi_g$) $2^+$-system (3-8) | 441.67 | 441.6200 | −0.0500 | | | | | |
| Au I 5d$^9$($^2D_{5/2}$)6s6p $^24^0_{7/2}$-5d$^9$($^2D_{5/2}$) 6s7sp $10_{7/2}$ | 448.8263 | 448.7500 | −0.0763 | | | | | |
| $N_2^+$ ($B^2\Sigma^+_u$-$X^{2+}_g$) $1^-$-system (1-3) | 465.1 | 465.1300 | 0.0300 | | | | | |
| $N_2^+$ ($B^2\Sigma^+_u$-$X^{2+}_g$) $1^-$-system (0-2) | 470.9 | 470.8400 | −0.0600 | | | | | |
| Na I 3s $^2S_{1/2}$-3p $^2P^0_{3/2}$ | 588.99 | 588.995 | 0.0050 | | | | | |
| H I 2p $^2P_{3/2}$-3d $^2D_{5/2}$ | 656.2852 | 655.8447 | −0.4405 | 82259.287 | 97492.357 | 4 | 6 | 6.47E+7 |
| N I 3s $^4P_{5/2}$-3p $^4S_{3/2}$ | 746.8312 | 746.8815 | 0.0503 | 83364.62 | 96750.84 | 6 | 4 | 1.93E+7 |
| $N_2$ ($B^3\Pi_g$-$A^3\Sigma^-_u$) $1^+$-system | 750 | 749.9618 | −0.0382 | | | | | |
| O I 3s $^5S_2$-3p$^5P_3$ | 777.1944 | 776.8659 | −0.3285 | 73768.2 | 86631.454 | 5 | 7 | 3.69E+7 |
| O I 3s $^3S_1$-3p $^3P_2$ | 844.6359 | 844.2905 | −0.3454 | 76794.978 | 88631.146 | 3 | 5 | 3.22E+7 |
| N I 3s $^4P_{5/2}$-3p $^4D_{7/2}$ | 868.0282 | 868.2219 | 0.1937 | 83364.62 | 94881.82 | 6 | 8 | 2.46E+7 |
| O I 3p $^5P_3$-3d $^5D_4$ | 926.6006 | 926.3226 | −0.2780 | 86631.454 | 97420.63 | 7 | 9 | 4.45E+7 |

FIG. 83E, along with Table 17d, show the emission spectra associated with a platinum electrode 1 utilized to create the plasma 4. A difference between the spectra shown in FIGS. 83D and 83E is apparent. The primary reason for the differences noted is that the power source transformer 60 (described elsewhere herein) increased from about 60 mA to about 120 mA by electrically connecting two transformers (discussed above herein) together in parallel. The voltage output from the two transformers 60 was about 800-3,000 volts, in comparison to about 900-2,500 volts when a single transformer was used. Many more "Pt" peaks become apparent. Table 17d sets forth all of the species identified when two transformers 60 are utilized.

TABLE 17d

| Transition | λ tab. (nm) | λ meas. (nm) | λ meas. −λ tab. (nm) | En (1/cm) | Em (1/cm) | gn | gm | Amn (1/s) |
|---|---|---|---|---|---|---|---|---|
| NO $A^2\Sigma^+$-$X^2\Pi$ γ-system: (1-0) | 214.7 | 214.7000 | 0.0000 | | | | | |
| Pt I | 217.46853 | 217.5100 | 0.0415 | | | | | |
| NO $A^2\Sigma^+$-$X^2\Pi$ γ-system: (0-0) | 226.9 | 226.8300 | −0.0700 | | | | | |
| NO $A^2\Sigma^+$-$X^2\Pi$ γ-system: (0-1) | 236.3 | 236.2100 | −0.0900 | | | | | |
| Pt I | 242.804 | 242.8500 | 0.0460 | | | | | |
| Pt I | 244.00608 | 244.0000 | −0.0061 | | | | | |
| NO $A^2\Sigma^+$-$X^2\Pi$ γ-system: (0-2) | 247.1 | 246.9300 | −0.1700 | | | | | |
| Pt I $5d^96s\ ^1D_2$-$5d^8(^3F)6s6p(3P^0)^5G^0_3$ | 248.71685 | 248.7100 | −0.0068 | 775.892 | 4070.65 | 5 | 7 | |
| Pt I | 251.5577 | 251.5900 | 0.0323 | | | | | |
| NO $A^2\Sigma^+$-$X^2\Pi$ γ-system: (0-3) | 258.3 | 258.5300 | 0.2300 | | | | | |
| Pt I $5d^96s\ ^1D_2$-$5d^8(^1D)6s6p(3P^0)^3F^0_2$ | 262.80269 | 262.8200 | 0.0173 | 775.892 | 38815.908 | 7 | 5 | 4.82E+7 |
| Pt I | 264.68804 | 264.6200 | −0.0680 | | | | | |
| Pt I $5d^96s\ ^3D_3$-$5d^96p^3F^0_4$ | 265.94503 | 265.9000 | −0.0450 | 0 | 3750.569 | 7 | 9 | 8.90E+7 |
| NO $A^2\Sigma^+$-$X^2\Pi$ γ-system: (1-1) | 267.1 | 267.0600 | −0.0400 | | | | | |
| Pt I | 267.71477 | 267.6500 | −0.0648 | | | | | |
| Pt I $5d^96s\ ^1D_2$-$5d^96p^3D^0_3$ | 270.23995 | 270.2100 | −0.0300 | 775.892 | 37769.073 | 5 | 7 | 5.23E+7 |
| Pt I $5d^86s^2\ ^3F_4$-$5d^96p^3D^0_3$ | 270.58951 | 270.5600 | −0.0295 | 823.678 | 37769.073 | 9 | 7 | 3.80E+7 |
| NO $A^2\Sigma^+$-$X^2\Pi$ γ-system: (0-4) | 271 | 271.1400 | 0.1400 | | | | | |
| Pt I | 271.90333 | 271.9000 | −0.0033 | | | | | |
| Pt II $5d^8(^3F_3)6p_{1/2}$ (3, ½)$^0$-$5d^8(^1D)$ 7s $^2D_{3/2}$ | 271.95239 | 271.9000 | −0.0524 | 64757.343 | 101517.59 | 6 | 4 | |
| Pt I $5d^96s\ ^1D_2$-$5d^96p^3P^0_2$ | 273.39567 | 273.3600 | −0.0357 | 775.892 | 37342.101 | 5 | 5 | 6.72E+7 |
| Pt I | 275.38531 | 275.4600 | 0.0747 | | | | | |
| Pt I | 277.16594 | 277.2200 | 0.0541 | | | | | |
| OH $A^2\Sigma^+$-$X^2\Pi$ (1-0) | 281.2 | 281.2600 | 0.0600 | | | | | |
| OH $A^2\Sigma^+$-$X^2\Pi$ (1-0) | 282 | 281.9600 | −0.0400 | | | | | |
| Pt I $5d^96s\ ^3D_3$-$5d^8(^3F)6s6p(^3P^0)^5D^0_3$ | 283.02919 | 283.0200 | −0.0092 | 0 | 35321.653 | 7 | 7 | 1 .68E+7 |
| Pt I $5d^96s\ ^1D_2$-$5d^8(^3F)6s6p(^3P^0)^5D^0_3$ | 289.3863 | 289.4200 | 0.0337 | 775.892 | 35321.653 | 5 | 7 | 6.47E+6 |
| Pt I $5d^96s\ ^3D_3$-$5d^96p^3F^0_3$ | 292.97894 | 293.0700 | 0.0911 | 0 | 34122.165 | 7 | 7 | 1.85E+7 |
| $N_2$ ($C^3\Pi_u$-$B^3\Pi_g$) $2^+$-system (4-2) | 295.32 | 295.3300 | 0.0100 | | | | | |
| $N_2$ ($C^3\Pi_u$-$B^3\Pi_g$) $2^+$-system (3-1) | 296.2 | 296.1900 | −0.0100 | | | | | |
| $N_2$ ($C^3\Pi_u$-$B^3\Pi_g$) $2^+$-system (2-0) | 297.7 | 297.7000 | 0.0000 | | | | | |
| Pt I $5d^96s\ ^1D_2$-$5d^96p^3F^0_3$ | 299.79622 | 299.8600 | 0.0638 | 775.892 | 34122.165 | 5 | 7 | 2.88E+7 |
| Pt I $5d^86s^2\ ^3F_4$-$5d^8(^3F)6s6p(^3P^0)^5F^0_5$ | 304.26318 | 304.3500 | 0.0868 | 823.678 | 33680.402 | 9 | 11 | 7.69E+6 |
| OH $A^2\Sigma$-$X^2\Pi$: (0-0) | 306.537 | 306.4600 | −0.0770 | | | | | |
| OH $A^2\Sigma$-$X^2\Pi$: (0-0) | 306.776 | 306.8400 | 0.0640 | | | | | |
| OH $A^2\Sigma$-$X^2\Pi$: (0-0) | 307.844 | 307.8700 | 0.0260 | | | | | |
| OH $A^2\Sigma$-$X^2\Pi$: (0-0) | 308.986 | 309.0700 | 0.0840 | | | | | |
| $N_2$ ($C^3\Pi_u$-$B^3\Pi_g$) $2^+$-system (2-1) | 313.57 | 313.5800 | 0.0100 | | | | | |
| $N_2$ ($C^3\Pi_u$-$B^3\Pi_g$) $2^+$-system (1-0) | 316 | 315.9200 | −0.0800 | | | | | |
| $O_2$ ($B^3\Sigma^-_u$-$X^3\Sigma^-_g$) (0-14) | 337 | 337.0800 | 0.0800 | | | | | |
| $N_2$ ($C^3\Pi_u$-$B^3\Pi_g$) $2^+$-system (0-0) | 337.1 | 337.1400 | 0.0400 | | | | | |
| $N_2$ ($C^3\Pi_u$-$B^3\Pi_g$) $2^+$-system (2-3) | 350.05 | 349.9700 | −0.0800 | | | | | |
| $N_2$ ($C^3\Pi_u$-$B^3\Pi_g$) $2^+$-system (1-2) | 353.67 | 353.6400 | −0.0300 | | | | | |
| $N_2$ ($C^3\Pi_u$-$B^3\Pi_g$) $2^+$-system (0-1) | 357.69 | 357.6500 | −0.0400 | | | | | |
| $N_2^+$ ($B^2\Sigma^+_u$-$X^{2+}_g$) $1^-$-system (1-0) | 358.2 | 358.2000 | 0.0000 | | | | | |
| $N_2$ ($C^3\Pi_u$-$B^3\Pi_g$) $2^+$-system (2-4) | 371 | 370.9500 | −0.0500 | | | | | |
| $N_2$ ($C^3\Pi_u$-$B^3\Pi_g$) $2^+$-system (1-3) | 375.54 | 375.4500 | −0.0900 | | | | | |
| $N_2$ ($C^3\Pi_u$-$B^3\Pi_g$) $2^+$-system (0-2) | 380.49 | 380.4000 | −0.0900 | | | | | |
| $N_2^+$ ($B^2\Sigma^+_u$-$X^{2+}_g$) $1^-$-system (1-1) | 388.4 | 388.4200 | 0.0200 | | | | | |
| $N_2^+$ ($B^2\Sigma^+_u$-$X^{2+}_g$) $1^-$-system (0-0) | 391.4 | 391.3700 | −0.0300 | | | | | |
| $N_2$ ($C^3\Pi_u$-$B^3\Pi_g$) $2^+$-system (1-4) | 399.8 | 399.7100 | −0.0900 | | | | | |
| $N_2$ ($C^3\Pi_u$-$B^3\Pi_g$) $2^+$-system (0-3) | 405.94 | 405.8110 | −0.1300 | | | | | |
| $N_2$ ($C^3\Pi_u$-$B^3\Pi_g$) $2^+$-system (4-8) | 409.48 | 409.4900 | 0.0100 | | | | | |
| $N_2^+$ ($B^2\Sigma^+_u$-$X^{2+}_g$) $1^-$-system (2-3) | 419.96 | 420.0000 | 0.0400 | | | | | |
| $N_2^+$ ($B^2\Sigma^+_u$-$X^{2+}_g$) $1^-$-system (1-2) | 423.65 | 423.6400 | −0.0100 | | | | | |
| $N_2^+$ ($B^2\Sigma^+_u$-$X^{2+}_g$) $1^-$-system (0-1) | 427.785 | 427.7700 | −0.0150 | | | | | |
| $N_2$ ($C^3\Pi_u$-$B^3\Pi_g$) $2^+$-system (3-8) | 441.67 | 441.6200 | −0.0500 | | | | | |
| $N_2^+$ ($B^2\Sigma^+_u$-$X^{2+}_g$) $1^-$-system (1-3) | 465.1 | 465.1300 | 0.0300 | | | | | |
| $N_2^+$ ($B^2\Sigma^+_u$-$X^{2+}_g$) $1^-$-system (0-2) | 470.9 | 470.8400 | −0.0600 | | | | | |
| Na I 3s $^2S_{1/2}$-3p $^2P^0_{3/2}$ | 588.99 | 588.995 | 0.0050 | | | | | |
| H I 2p $^2P_{3/2}$-3d $^2D_{5/2}$ | 656.2852 | 655.8447 | −0.4405 | 82259.287 | 97492.357 | 4 | 6 | 6.47E+7 |
| N I 3s $^4P_{5/2}$-3p $^4S_{3/2}$ | 746.8312 | 746.8815 | 0.0503 | 83364.62 | 96750.84 | 6 | 4 | 1.93E+7 |
| $N_2$ ($B^3\Pi_g$-$A^3\Sigma^-_u$) $1^+$-system | 750 | 749.9618 | −0.0382 | | | | | |

TABLE 17d-continued

| Transition | λ tab. (nm) | λ meas. (nm) | λ meas. −λ tab. (nm) | En (1/cm) | Em (1/cm) | gn | gm | Amn (1/s) |
|---|---|---|---|---|---|---|---|---|
| O I 3s $^5S_2$-3p$^5P_3$ | 777.1944 | 776.8659 | −0.3285 | 73768.2 | 86631.454 | 5 | 7 | 3.69E+7 |
| O I 3s $^3S_1$-3p $^3P_2$ | 844.6359 | 844.2905 | −0.3454 | 76794.978 | 88631.146 | 3 | 5 | 3.22E+7 |
| N I 3s $^4P_{5/2}$-3p $^4D_{7/2}$ | 868.0282 | 868.2219 | 0.1937 | 83364.62 | 94881.82 | 6 | 8 | 2.46E+7 |
| O I 3p $^5P_3$-3d $^5D_4$ | 926.6006 | 926.3226 | −0.2780 | 86631.454 | 97420.63 | 7 | 9 | 4.45E+7 |

A variety of similar species associated with each metallic electrode composition plasma are identified in Tables 17a-17d. These species include, for example, the various metal (s) from the electrodes 1, as well as common species including, NO, OH, $N_2$, etc. It is interesting to note that some species' existence and/or intensity (e.g., amount) is a function of location within the adjustable plasma. Accordingly, this suggests that various species can be caused to occur as a function of a variety of processing conditions (e.g., power, location, composition of electrode 1, etc.) of the invention.

FIGS. 17A-17D show additional information derived from the apparatus shown in FIG. 80. FIG. 84A notes three different peak heights "$G_0$", "$G_1$" and $G_{ref}$". These spectra come from a portion of FIG. 81B (i.e., that portion between d=305 and d=310). Generally, the ratio of the height of these peaks can be used to determine the temperature of the adjustable plasma 4. The molecular OH temperatures (FIG. 84B) for a plasma 4 created by a silver electrode discharging in air above water, were measured from the spectral line ratios $G_0/G_{Ref}$ and $G_1/G_{Ref}$ originating from $A^2S$—$X^2P$ transitions in OH (FIG. 84A) for the instrumental line broadening of 0.13 nm at 313.3 nm, following the procedures described in Reference 2, expressly incorporated by reference herein.

Moreover, the plasma electron temperatures (see FIG. 84B) for a plasma 4 created by a silver electrode 1 discharging in air above water, were measured from the Boltzmann plot (see Reference 1), expressly incorporated by reference herein] of the "Ag I" line intensities originating from two spectral doublets:

Ag I $4d^{10}(^1S)$ 5s $^2S_{1/2}$-$4d^{10}(^1S)$ 5p $^2P^0_{3/2}$

Ag I $4d^{10}(^1S)$ 5s $^2S_{1/2}$-$4d^{10}(^1S)$ 5p $^2P^0_{1/2}$

Ag I $4d^{10}(^1S)$ 5p $^2P^0_{1/2}$-$4d^{10}$ $(^1S)$ 5d $^2D_{3/2}$

Ag I $4d^{10}(^1S)$ 5p $^2P^0_{3/2}$-$4d^{10}(^1S)$ 5d$^2D_{5/2}$

Spectral line intensities used in all temperature measurements are given in units of spectral irradiance (mW/m$^2$/nm) after the irradiance calibration of the spectrometers was performed.

FIG. 84B plots the plasma temperature, as a function of position away from the tip 9 of the electrode 1, when a silver electrode is present.

FIGS. 84C and 84D show the integrated intensities of "NO" and "OH" as a function of position and electrode 1 composition. Note that in FIG. 84C, the lines from "Ag" and "Au" overlap substantially.

REFERENCES

[1] Hans R. Griem, *Principles of Plasma Spectroscopy*, Cambridge Univ. Press (1996).

[2] Charles de Izarra, J. Phys. D: Appl. Phys. 33 (2000) 1697-1704.

Example 21

Comparison of Zeta Potential of Silver-Based Nanoparticles/Nanoparticle Solutions by Adding Variable Zinc Nanoparticles/Nanoparticle Solutions Materials similar to those disclosed in Example 18, namely, AT-109 and BT-014, were mixed together in varying proportions to form several different solutions to determine if any differences in zeta potential could be observed as a function of volumetric proportions in the various mixtures.

In this Example, a Zeta-Sizer "Nano-ZS" produced by Malvern Instruments was utilized to determine the zeta potential of each solution. For each measurement, a 1 ml sample was filled into clear disposable zeta cell DTS1060C. Dispersion Technology Software, version 5.10 was used to run the Zeta-Sizer and to calculate the zeta potential. The following settings were used: dispersant—water, temperature—25° C., viscosity—0.8872 cP, refraction index—1.330, dielectric constant—78.5, approximation model—Smoluchowski. One run of hundred repetitions was performed for each sample.

"Zeta potential" is known as a measure of the electrokinetic potential in colloidal systems. Zeta potential is also referred to as surface charge on particles. Zeta potential is also known as the potential difference that exists between the stationary layer of fluid and the fluid within which the particle is dispersed. A zeta potential is often measured in millivolts (i.e., mV). The zeta potential value of approximately 25 mV is an arbitrary value that has been chosen to determine whether or not stability exists between a dispersed particle in a dispersion medium. Thus, when reference is made herein to "zeta potential", it should be understood that the zeta potential referred to is a description or quantification of the magnitude of the electrical charge present at the double layer.

The zeta potential is calculated from the electrophoretic mobility by the Henry equation:

$$U_E = \frac{2\varepsilon z f(ka)}{3\eta}$$

where z is the zeta potential, $U_E$ is the electrophoretic mobility, ∈ is a dielectric constant, η is a viscosity, ƒ(ka) is Henry's function. For Smoluchowski approximation ƒ(ka) =1.5.

Electrophoretic mobility is obtained by measuring the velocity of the particles in applied electric field using Laser Doppler Velocimetry (LDV). In LDV the incident laser beam is focused on a particle suspension inside a folded capillary cell and the light scattered from the particles is combined with the reference beam. This produces a fluctuating intensity signal where the rate of fluctuation is proportional to the speed of the particles, i.e. electrophoretic mobility.

As Table 18a below indicates, AT-109, BT-014 and DI water were mixed in different proportions and the zeta potential was measured right after mixing and one day after mixing. The results for zeta potential are shown in the table below. A clear trend exists for zeta potential of Ag:Zn 4:0 (−28.9) to Ag:Zn 0:4 (+22.7).

TABLE 18a

| Sample ID | Composition of Sample (ml) AT109 | BT014 | DI Water | Concentration (ppm) Ag | Zn | Zeta Potential (mV) Freshly Mixed | After One Day |
|---|---|---|---|---|---|---|---|
| Ag:Zn 4:0 | 2 | 0 | 2 | 20 | 0 | −28.9 | n/a |
| Ag:Zn 4:1 | 2 | 0.5 | 1.5 | 20 | 3 | −16.7 | −22.5 |
| Ag:Zn 4:2 | 2 | 1 | 1 | 20 | 6 | −13.9 | −18.1 |
| Ag:Zn 4:3 | 2 | 1.5 | 0.5 | 20 | 9 | −12.4 | −11.4 |
| Ag:Zn 4:4 | 2 | 2 | 0 | 20 | 12 | −12.4 | −10.3 |
| Ag:Zn 0:4 | 0 | 2 | 2 | 0 | 12 | +22.7 | n/a |

As a comparison, zinc sulfate heptahydrate ($ZnSO_47H_2O$) having a formula weight of 287.58 was added in varying quantities to the AT-109 solution to determine if a similar trend in zeta potential change could be observed for different amounts of zinc sulfate being added. The zinc sulfate heptahydrate was obtained from Fisher Scientific, had a Product # of Z68-500, a Cas # of 7446-20-0 and a Lot # of 082764. After mixing, the zeta potential of the AT-060/$ZnSO_47H_2O$ mixture was measured. The data were very mixed and no clear trends in changes in zeta potential were evident.

Example 22

Manufacturing Gold-Based Nanoparticles/Nanoparticle Solution 3AC-037

In general, Example 22 utilizes certain embodiments of the invention associated with the apparatuses generally shown in FIGS. 43A and 85A-85E. Additionally, Table 19 summarizes key processing parameters used in conjunction with FIGS. 43A and 85A-85E. Also, Table 19 discloses: 1) resultant "ppm" (i.e., gold nanoparticle concentrations), 2) a single number for "Hydrodynamic Radii" taken from the average of the three highest amplitude peaks shown in each of FIGS. 86CA and 86CB) "TEM Average Diameter" which corresponds to the mean measured gold nanoparticle size calculated from the data used to generate the TEM histogram graphs shown in FIG. 86B. These physical characterizations were performed as discussed elsewhere herein.

TABLE 19

| Run ID: | | 3AC-037 | 3AC-037 | 3AC-037 | 3AC-037 |
|---|---|---|---|---|---|
| Electrolyte Volume (mL) | | 2700 | 2700 | 2700 | 2700 |
| Electrolyte Flow Rate: | In (ml/min) | 0 | 40 | 30 | 30 |
| | Out (ml/min) | 0 | 40 | 30 | 30 |
| Volts (V): | Start | 150 | 150 | 150 | 150 |
| | End | 63 | 80 | 75 | 76 |
| | Time Ave. | 73.3 | 74 | 74.3 | 74.7 |
| Temp. (° C.) | Start | 23.0 | 23.0 | 23.0 | 23.0 |
| | End | 90.0 | 93.0 | 99.0 | 100.0 |
| | Time Ave. | 74.5 | 85.5 | 88.1 | 90.1 |
| Current (A) | Start | 5.75 | 5.75 | 5.75 | 5.75 |
| | End | 5.72 | 7.45 | 7.12 | 7.21 |
| | Time Ave. | 6.13 | 6.28 | 6.46 | 6.61 |
| PE* | Type: | $NaHCO_3$ | $NaHCO_3$ | $NaHCO_3$ | $NaHCO_3$ |
| | mg/ml: | 0.528 | 0.528 | 0.528 | 0.528 |
| Total Run Time (min) | | 70 | 85 | 102 | 131 |
| Electrodes | Electrode Figure | 85d | 85d | 85d | 85d |
| | Wire Diameter (mm) | 0.5 | NM | NM | NM |
| | $W_L$, Length of Wire Exposed, per Electrode (in/mm) | 46/1168 | 46/1168 | 46/1168 | 46/1168 |
| Water Coolant | Coolant Figure | 85e | 85e | 85e | 85e |
| | Coolant Flow Rate (mL/min) | 700 | 700 | 700 | 700 |
| | Input Temp. (° C.) | 16 | 16 | 16 | 16 |
| Dimensions | Plasma Figures | 43a | 43a | 43a | 43a |
| | Process Figures | 85b, c, d | 85b, c, d | 85b, c, d | 85b, c, d |
| | M (in/mm) | 5.5/139.7 | 5.5/139.7 | 5.5/139.7 | 5.5/139.7 |
| | S (in/mm) | 9.5/241 | 9.5/241 | 9.5/241 | 9.5/241 |
| | d (in/mm) | 7/178 | 7/178 | 7/178 | 7/178 |
| PPM: | | 31.5 | 32.1 | 31.1 | 29.0 |
| Hydrodynamic r. (nm) | | 26.00 | 26.00 | 22.00 | 24.00 |
| TEM Avg. Dia. (nm) | | NM | NM | NM | NM |

TABLE 19-continued

| Run ID: | | 3AC-037 | 3AC-037 | 3AC-037 | 3AC-037 |
|---|---|---|---|---|---|
| Electrolyte Volume (mL) | | 2700 | 2700 | 2700 | 2700 |
| Electrolyte Flow Rate: | In (ml/min) | 30 | 30 | 30 | 30 |
| | Out (ml/min) | 30 | 30 | 30 | 30 |
| Volts (V): | Start | 150 | 150 | 150 | 150 |
| | End | 76 | 81 | 81 | 81 |
| | Time Ave. | 75.4 | 76.4 | 77.3 | 77.8 |
| Temp. (° C.) | Start | 23.0 | 23.0 | 23.0 | 23.0 |
| | End | 99.0 | 104.0 | 103.5 | 104.0 |
| | Time Ave. | 93.6 | 94.9 | 96.5 | 97.6 |
| Current (A) | Start | 5.75 | 5.75 | 5.75 | 5.75 |
| | End | 9.43 | 7.84 | 7.73 | 7.7 |
| | Time Ave. | 6.83 | 6.96 | 7.12 | 7.2 |
| PE* | Type: | $NaHCO_3$ | $NaHCO_3$ | $NaHCO_3$ | $NaHCO_3$ |
| | mg/ml: | 0.528 | 0.528 | 0.528 | 0.528 |
| Total Run Time (min) | | 198 | 224 | 270 | 300 |
| Electrodes | Electrode Figure | 85d | 85d | 85d | 85d |
| | Wire Diameter (mm) | NM | NM | NM | 0.4 |
| | $W_L$, Length of Wire Exposed, per Electrode (in/mm) | 46/1168 | 46/1168 | 46/1168 | 46/1168 |
| Water Coolant | Coolant Figure | 85e | 85e | 85e | 85e |
| | Coolant Flow Rate (mL/min) | 700 | 700 | 700 | 700 |
| | Input Temp. (° C.) | 16 | 16 | 16 | 16 |
| Dimensions | Plasma Figures | 43a | 43a | 43a | 43a |
| | Process Figures | 85b, c, d | 85b, c, d | 85b, c, d | 85b, c, d |
| | M (in/mm) | 5.5/139.7 | 5.5/139.7 | 5.5/139.7 | 5.5/139.7 |
| | S (in/mm) | 9.5/241 | 9.5/241 | 9.5/241 | 9.5/241 |
| | d (in/mm) | 7/178 | 7/178 | 7/178 | 7/178 |
| PPM: | | 24.4 | 25.6 | 25.7 | 25.2 |
| Hydrodynamic r. (nm) | | 20.67 | 19.67 | 26.33 | 22.00 |
| TEM Avg. Dia. (nm) | | NM | NM | NM | 20.38 |

Figure 85A:
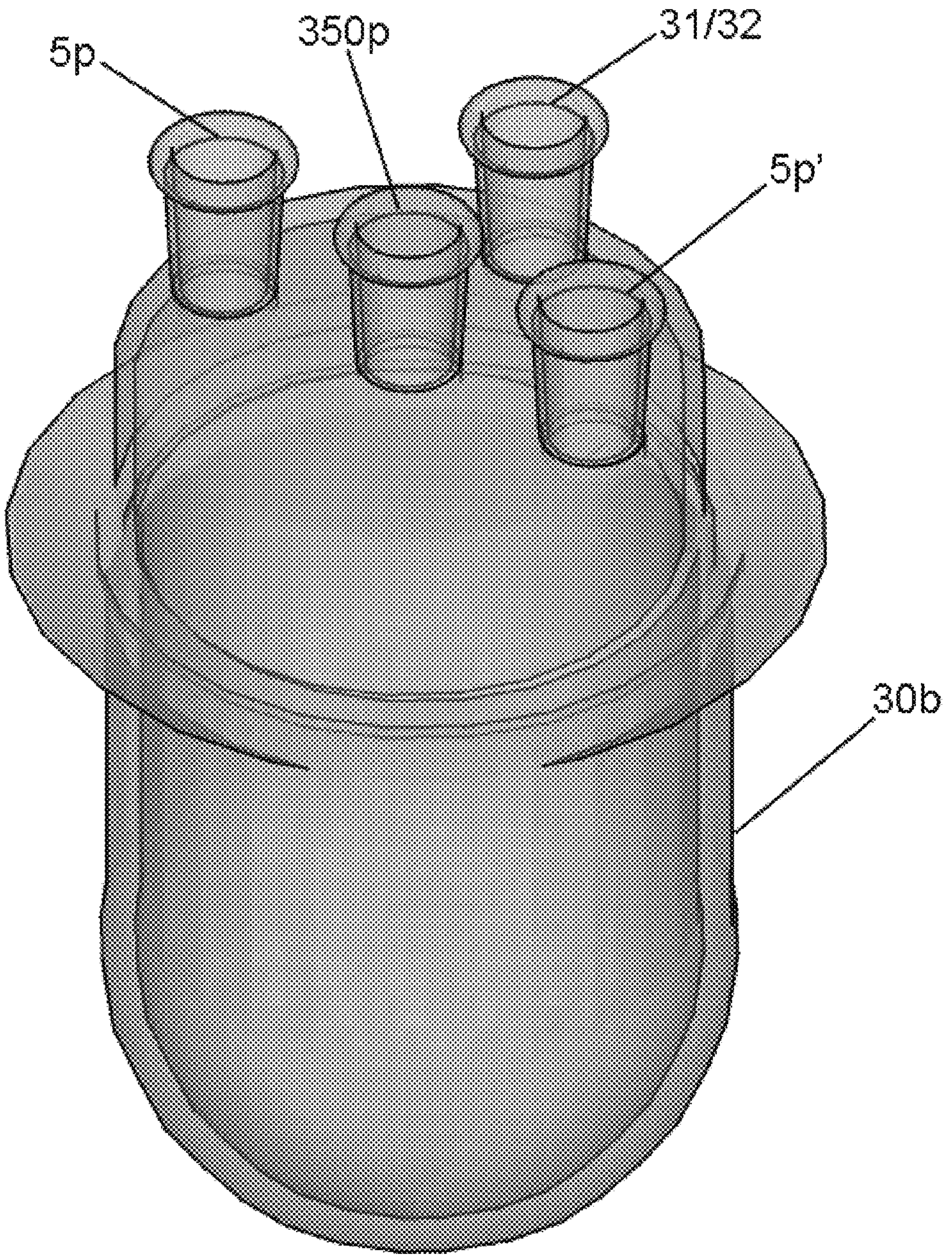
FIGS. 85A-85E show perspective and cross-sectional views of the trough reaction vessel 30*b* used in Example 22.
Figure 85B:
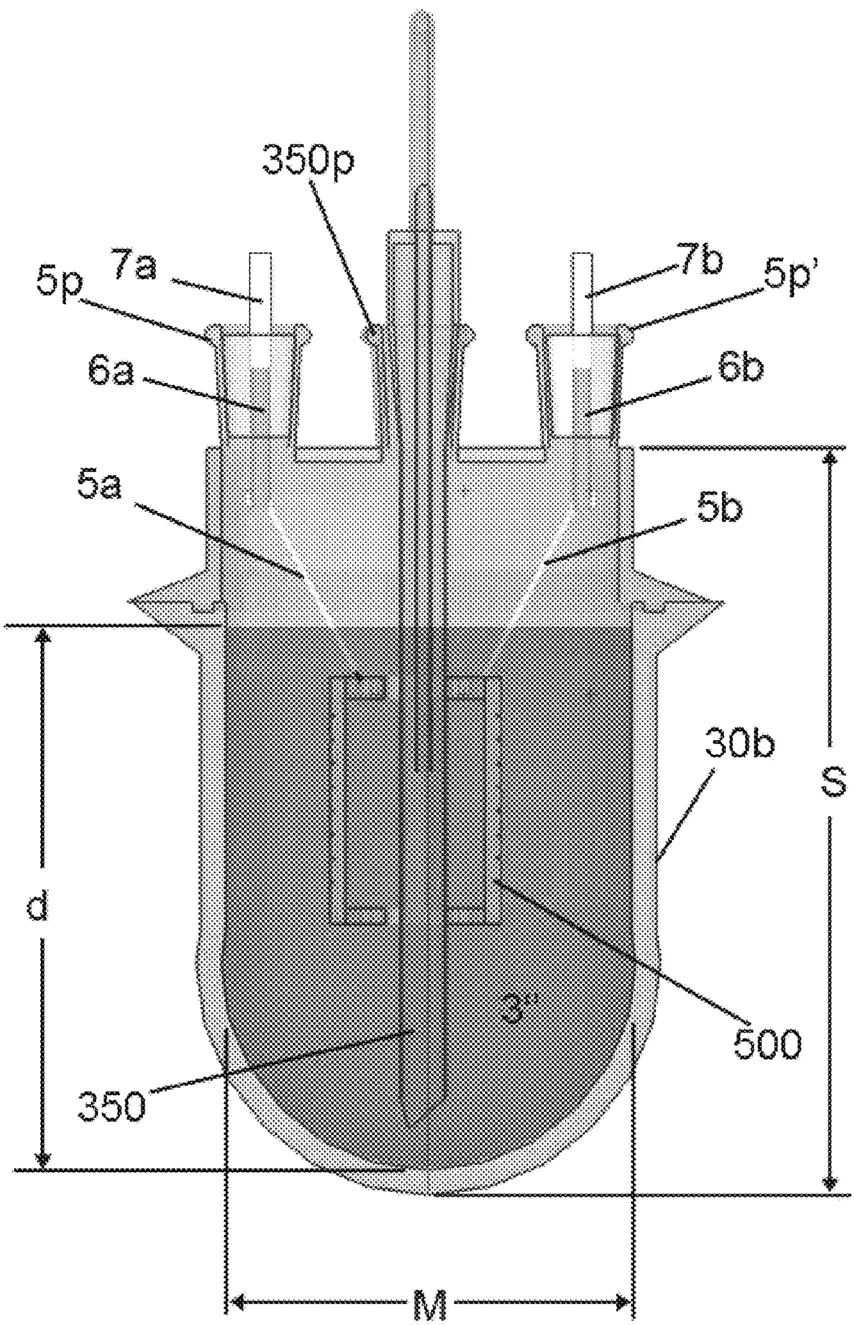
Figure 85C:
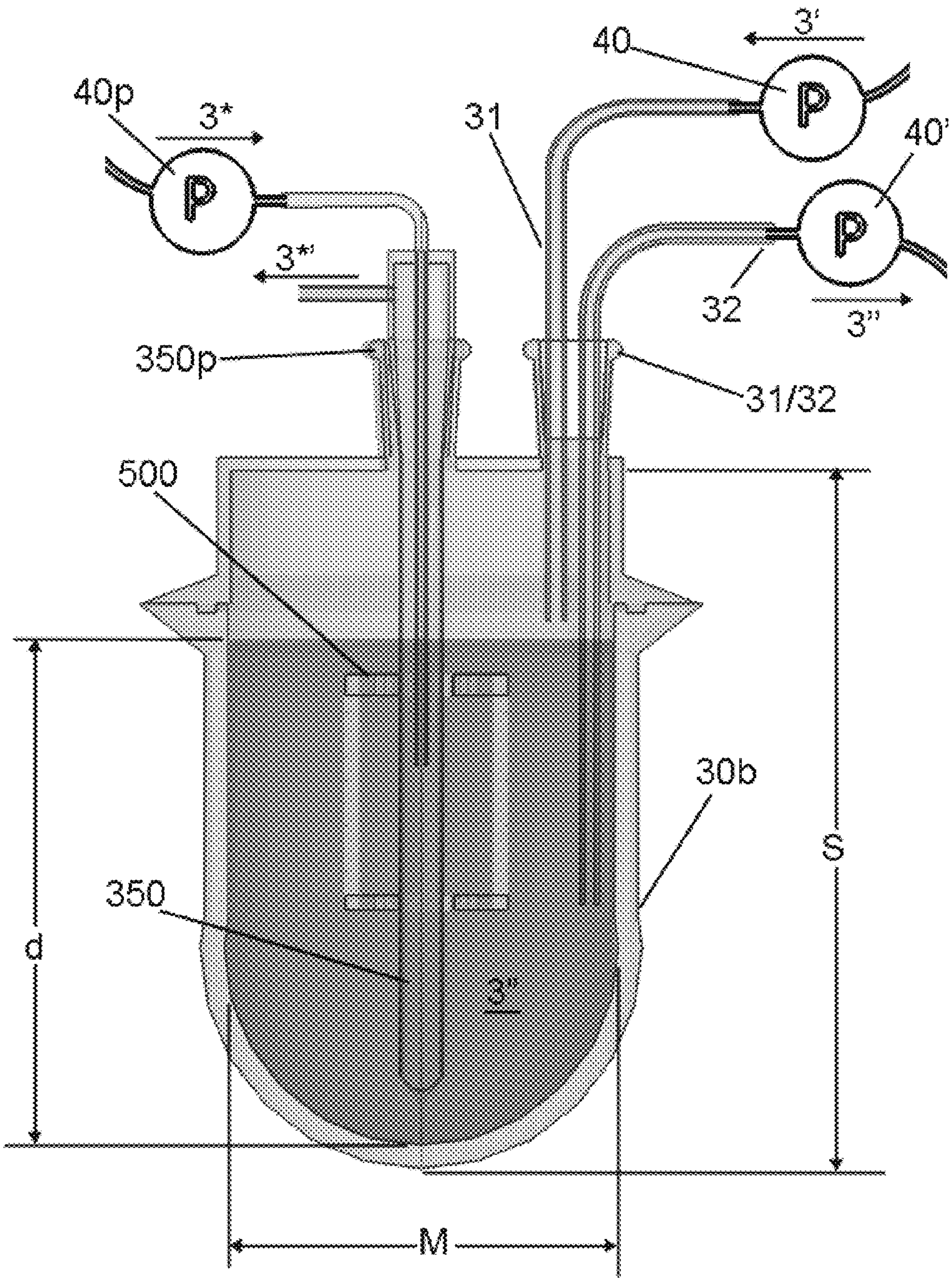

The trough reaction vessel 30*b* shown in FIGS. 85A-85C was made from laboratory grade glassware approximately ⅛" (3 mm) thick. The cross-sectional shape of the trough reaction vessel 30*b* corresponds to that shape shown in FIGS. 85B and 85C. Relevant dimensions for the reaction vessel are shown in Table 19 as "M" (i.e., the approximate inner diameter of the vessel), "S" (i.e., the approximate height of the inner chamber if the vessel) and "d" (i.e., the depth of liquid 3" within the trough reaction vessel 30*b*).

Accordingly, the total volume of liquid 3" within the trough reaction vessel 30*b* during the operation thereof was about 170 $in^3$ (about 2800 ml). The trough reaction vessel 30*b* had four ports 5*p*, 5*p*', 350*p* and 31/32. The ports 5*p* and 5*p*' housed electrodes 5*a* and 5*b*, respectively, therein. The port 350 housed a cooling apparatus (i.e., cold finger), described herein. The port 31/32 housed both the inlet portion 31 and the outlet portion 32. Specifically, glass tubes 31 and 32 were held in place in the port 31/32 by a rubber stopper with the glass tubes 31 and 32 protruding therethrough.

Table 19 shows that the processing enhancer $NaHCO_3$ was added to purified water (discussed elsewhere herein) in amounts of 0.53 mg/ml. It should be understood that other amounts of this processing enhancer also function within the metes and bounds of the invention. The water and processing enhancer were treated with the plasma 4 according to the apparatus shown in FIG. 43A and discussed elsewhere herein.

The purified water/$NaHCO_3$ mixture, after being subjected to the apparatus of FIG. 43A, was used as the liquid 3 input into trough reaction vessel 30*b*. The depth "d" of liquid 3" in the trough reaction vessel 30*b* was about 7" (about 178 mm) at various points along the trough reaction vessel. After an initial dwell time of about 70 minutes in the trough reaction vessel 30*b*, the rate of flow of the liquid 3' into and out of the trough reaction vessel 30*b* was either 30 ml/minute or 40 ml/minute. Other acceptable flow rates should be considered to be within the metes and bounds of the invention. The evaporation of liquid 3" in the trough reaction vessel 30*b* was minimal due to the condensation of the vapors of liquid 3" on the exposed surface of the cooling apparatus 350 (i.e., cold finger) shown in FIG. 85E.

Liquid 3*, which flowed into and out of cooling apparatus 350, was tap water at an initial temperature of approximately 16° C. The cooling liquid 3* was pumped through the cold finger 350 with the pump 40*p*. This pump 40*p* was similar to the other pumps 40 described elsewhere herein. The submerged section of cold finger 350 served to maintain a sub-boiling operating temperature of the liquid 3". In this regard, the cold finger 350 was placed inside the through hole in the electrode assembly 500. The juxtaposition of the cold finger 350 and electrode assembly 500 resulted in a cooling effect under the processing conditions.

As shown in FIG. 85C, the output 32 of trough reaction vessel 30*b* was the product liquid 3". The rate of flow of liquid 3" out of the trough reaction vessel 30*b* was either 30 or 40 ml/minute and was always equal to the rate of flow of liquid 3' into the trough reaction vessel at the inlet 31. Thus, the total volume of liquid 3" in trough reaction vessel 30*b* during 3AC-037 was maintained at about 170 in' (about 2800 ml) and the depth of liquid 3" was maintained at about 7 in (about 178 mm) for the entire process.

Figure 85D:
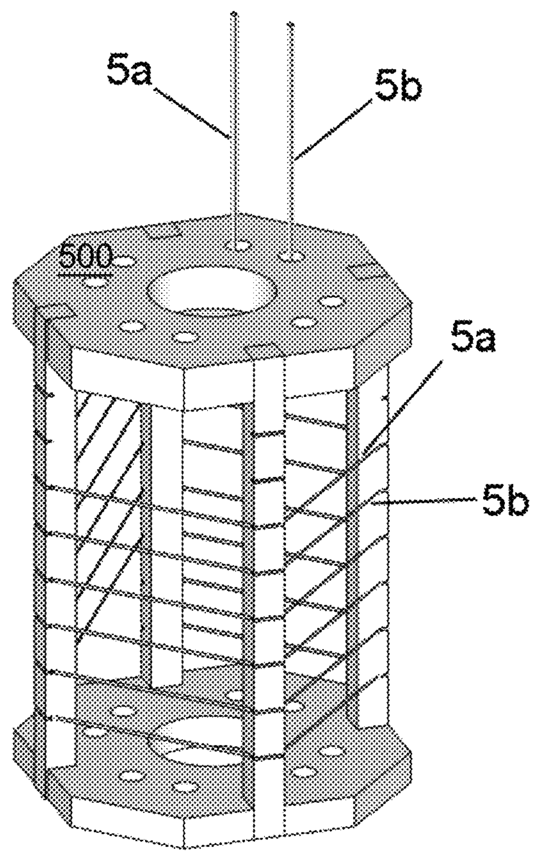
Figure 85E:
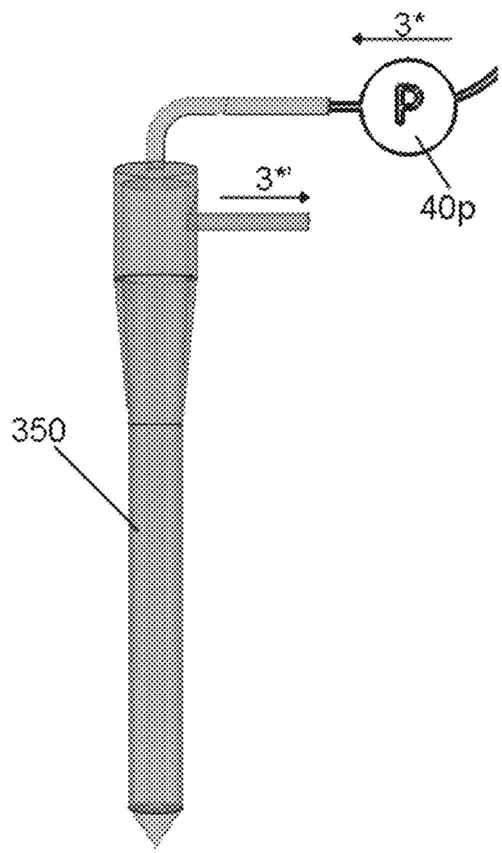

Table 19, in connection with FIGS. 85B, 85C, and 85D, describe important aspects of the electrode assembly 500 used for continuous process 3AC-037. Specifically, FIG. 85D shows the electrode assembly 500, which is made from polycarbonate about ¼ in (about 6 mm) thick. Two electrodes 5*a* and 5*b* were collocated around assembly 500. The electrodes 5*a* and 5*b* were comprised of 99.99% pure gold wire approximately 0.5 mm in diameter. The length of each wire electrode 5*a* and 5*b* that was in contact with liquid 3" (reported as $W_L$ in Table 19) measured about 43 in (about 1168 mm) All materials for the electrodes 5*a* and 5*b* were obtained from ESPI, having an address of 1050 Benson Way, Ashland, Oreg. 97520. The power source was a by Voltage source (described elsewhere herein) which was electrically connected to each electrode 5*a*/5*b*.

The flow of the liquid 3' was obtained by utilizing a Masterflex® L/S pump drive 40 rated at 0.1 horsepower, 10-600 rpm. The model number of the Masterflex® pump 40 was 77300-40. The pump drive had a pump head also made by Masterflex® known as Easy-Load Model No. 7518-10. In general terms, the head for the pump 40 is known as a peristaltic head. The pump 40 and head were controlled by a Masterflex® LS Digital Modular Drive. The model number for the Digital Modular Drive is 77300-80. The precise settings on the Digital Modular Drive were, for example, 40 or 30 milliliters per minute. Tygon® tubing having a diameter of ¼" (i.e., size 06419-25) was placed into the peristaltic head. The tubing was made by Saint Gobain for Masterflex®. One end of the tubing was delivered to an input 31 of the trough reaction vessel 30*b*.

Figure 86A:
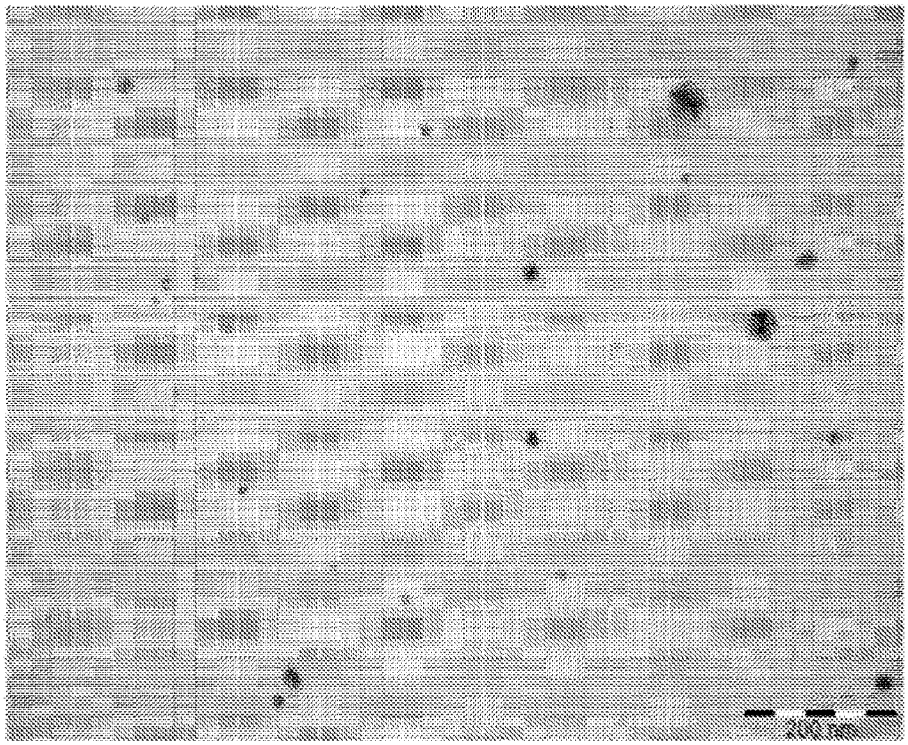
FIGS. 86AA and 86AB show two representative TEM photomicrographs for the gold nanoparticles dried from the final solution or colloid collected after 300 minutes of processing, as referenced in Table 19.
Figure 86A:
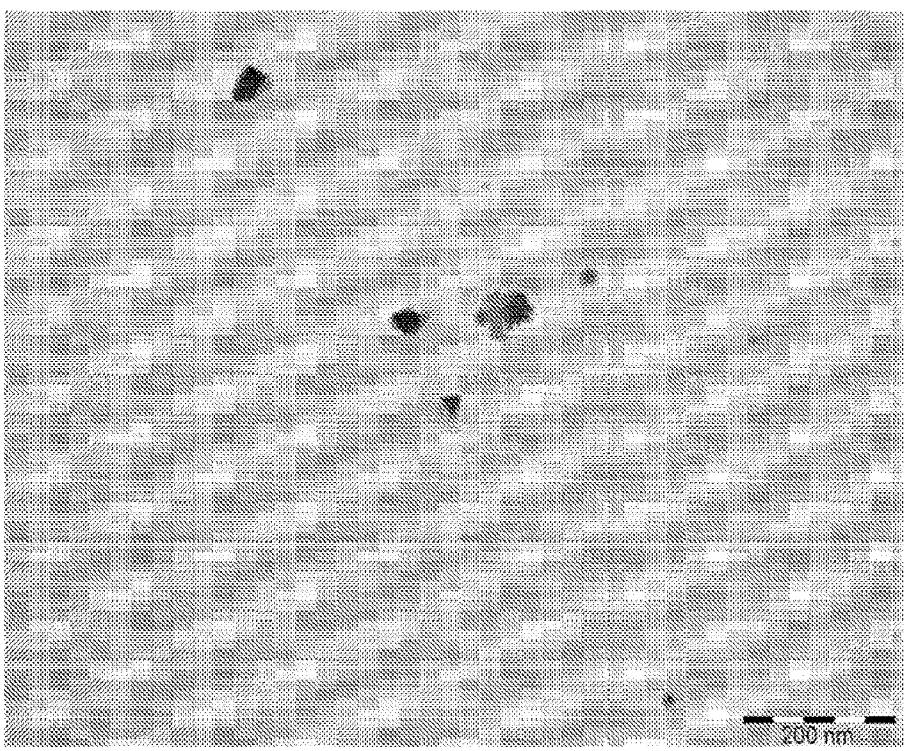

FIGS. 86AA and 86AB show two representative TEM photomicrographs for the gold nanoparticles dried from the final solution or colloid collected after 300 minutes of processing, as referenced in Table 19.

Figure 86B:
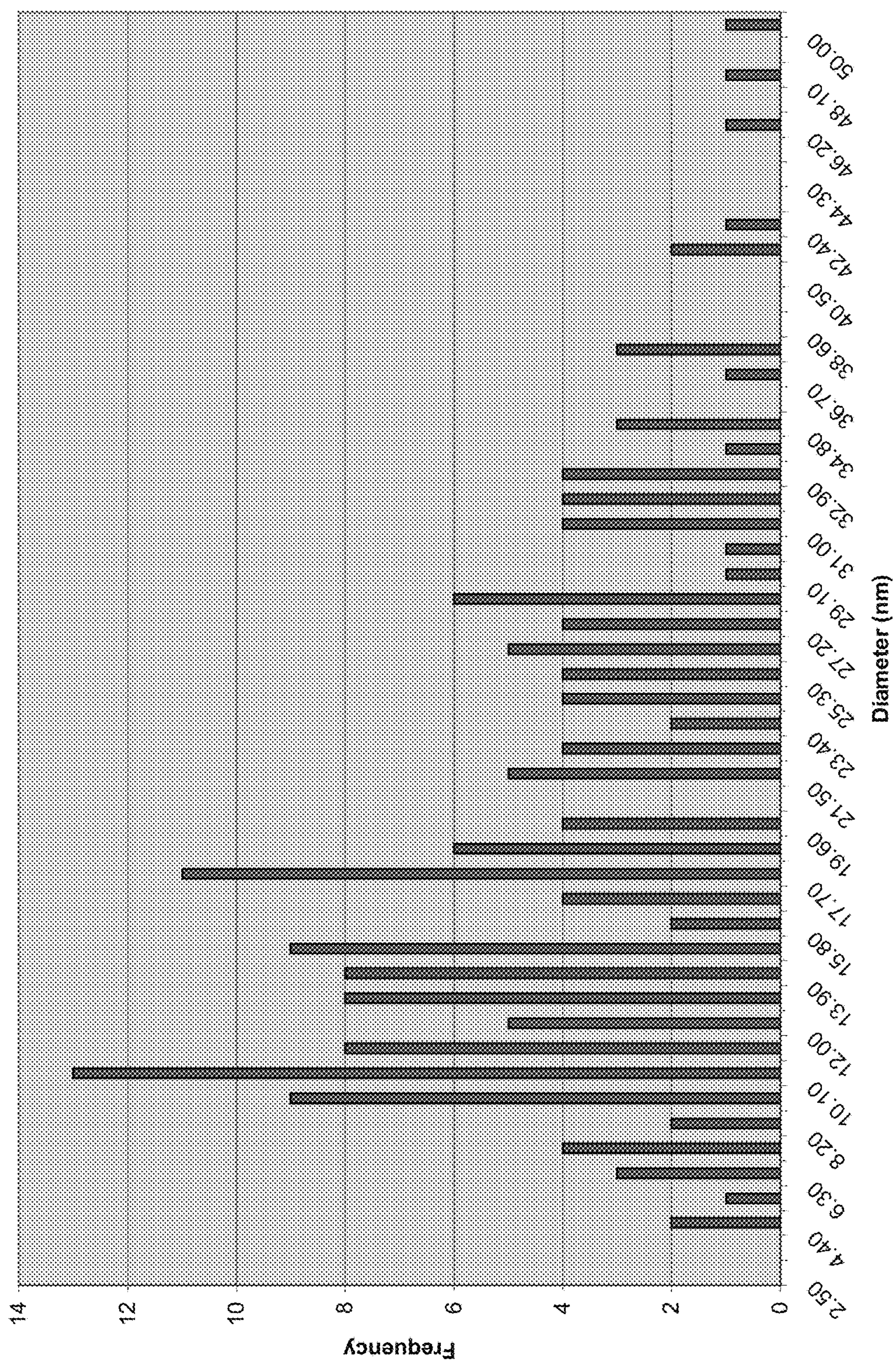
FIG. 86B shows the measured size distribution of the gold particles measured by using the TEM instrument/software discussed earlier in Examples 5-7 for the dried solution or colloid.

FIG. 86B shows the measured size distribution of the gold particles measured by using the TEM instrument/software discussed earlier in Examples 5-7 for the dried solution or colloid.

FIGS. 86CA and 86CB each show graphically three dynamic light scattering data measurement sets for the nanoparticles (i.e., the hydrodynamic radii) made according to two different processing times (i.e., 70 minutes and 300 minutes, respectively) for the solution or colloid referenced in Table 19. Specifically, FIG. 86CA shows dynamic light scattering data for a portion of the solution or colloid made according to this Example sampled 70 minutes after starting the reaction vessel. In this regard, liquid 3 (with processing enhancer) dwelled with the trough reaction vessel 30*b* for about 70 minutes before a flow rate was established. Thereafter the established flow rate was continuous. All liquid 3 processed within the trough reaction vessel 30*b* was collected in another vessel, not shown. FIG. 86CB shows dynamic light scattering data for all processed liquid collected after 300 minutes of total run time.

It should be noted that the dynamic light scattering particle size information is different from the TEM measured histograms because dynamic light scattering uses algorithms that assume the particles are all spheres (which they are not) as well as measures the hydrodynamic radius (e.g., the particle's influence on the water is also detected and reported in addition to the actual physical radii of the particles). Accordingly, it is not surprising that there is a difference in the reported particle sizes between those reported in the TEM histogram data of those reported in the dynamic light scattering data just as in the other Examples included herein.

The invention claimed is:

1. A substantially continuous process for forming gold nanoparticles in at least one liquid comprising:

flowing at least one liquid comprising water through at least one trough member, said at least one trough member comprising at least one set of electrode female receiving portions, said at least one flowing liquid having an upper surface and a flow direction and said at least one flowing liquid further comprising at least one processing enhancer comprising at least one material selected from the group consisting of $NaHCO_3$, $Na_2CO_3$, $K_2CO_3$ and $KHCO_3$;

holding a first moveable set of electrodes comprising gold wires in a first electrode control device, said first electrode control device comprising a servo-motor and at least one drive wheel connected to said servo-motor, one of said at least one drive wheel directly contacting each electrode in said first moveable set of electrodes comprising gold wires such that each of said gold wires can be moved into said at least one flowing liquid;

partially immersing said first moveable set of electrodes comprising gold wires within said at least one flowing liquid and advancing each gold wire in said first moveable set of electrodes comprising gold wires into said at least one liquid such that each of said gold wires in said at least one set of electrodes comprising gold wires advances toward and into each corresponding said female receiving portion and causing at least one electrochemical reaction to occur at said first set of moveable electrodes comprising gold wires;

holding at least one second moveable set of electrodes comprising gold wires in at least one second electrode control device, each said at least one second electrode control device comprising a second servo-motor and at least one second drive wheel connected to each of said second servo-motor, each said at least one second drive wheel directly contacting each of said electrodes in said second moveable set of electrodes comprising gold wires such that each of said gold wires can be moved into said at least one flowing liquid; and partially immersing said at least one second moveable set of electrodes comprising gold wires within said at least one flowing liquid, said at least one second moveable set of electrodes being located downstream in said flow direction of said at least one flowing liquid from said first moveable set of electrodes comprising gold wires and advancing each of said gold wires in said second moveable set of electrodes comprising gold wires toward and into said at least one liquid such that each of said gold wires in said at least one second moveable set of electrodes comprising gold wires advances into each corresponding said female receiving portion and causing at least one electrochemical reaction to occur at said at least one second moveable set of electrodes to produce at least some gold nanoparticles within said at least one flowing liquid.

2. The process of claim 1, wherein each of said female receiving portions are located on a bottom portion of said trough member opposite from said upper surface of said flowing liquid.

3. The process of claim 1, wherein said at least one processing enhancer is added to said at least one flowing liquid before said at least one flowing liquid is contacted with said first moveable set of electrodes.

4. The process of claim 1, wherein said at least one processing enhancer comprises $NaHCO_3$.

5. The process of claim 1, wherein said at least one processing enhancer comprises $Na_2CO_3$.

6. The process of claim 1, wherein said at least one processing enhancer comprises $K_2CO_3$.

7. The process of claim 1, wherein said gold wires in said first moveable set of electrodes comprise gold wires and said gold wires in said at least one second moveable set of electrodes comprising gold wires each having a diameter of about 0.5 mm.

8. The process of claim 1, wherein said gold wires in said first moveable set of electrodes comprising gold wires and said gold wires in said at least one second moveable set of electrodes comprising gold wires each having a diameter of about 1.0 mm.

9. The process of claim 1, wherein said at least one second moveable set of electrodes comprising gold wires comprises at least four moveable sets of electrodes comprising gold wires.

10. The process of claim 1, wherein said at least one second moveable set of electrodes comprising gold wires comprises at least seven moveable sets of gold electrodes comprising gold wires.

11. The process of claim 1, wherein said first electrode control device causes said at least one moveable set of electrodes to operate at a continuous voltage of about 250 volts while said at least one flowing liquid passes by.

12. The process of claim 1, wherein said first moveable set of electrodes comprising gold have an imaginary plane created between the electrodes of said first moveable set of electrodes and such plane is substantially perpendicular to said flowing liquid.

13. The process of claim 1, wherein electrodes in said at least one second moveable set of electrodes comprising gold each have an imaginary plane created between the electrodes of each of said second moveable set of electrodes and each such plane is substantially parallel to said flowing liquid.

14. The process of claim 1, wherein each said second servo-motor rotates a predetermined amount at a predetermined time such that each electrode of said first moveable set of electrodes comprising gold wires and each electrode of said at least one second set of electrodes comprising gold wires are advanced toward and into each corresponding said female receiving portion.

15. The process of claim 14, wherein each of said sets of electrodes comprising gold wires are advanced into each said female receiving portion about every 5.8 minutes.

16. The process of claim 14, wherein each of said sets of electrodes comprising gold wires are advanced into said female receiving portions at a rate of about 1.9 cm every 8 hours.

17. A substantially continuous process for forming gold nanoparticles in at least one liquid comprising:

flowing at least one liquid comprising water through at least one trough member, said at least one trough member comprising at least one set of electrode female receiving portions, said at least one flowing liquid having an upper surface and a flow direction and said at least one flowing liquid further comprising at least one processing enhancer;

holding a first moveable set of electrodes comprising gold wires in a first electrode control device, said first electrode control device comprising a servo-motor and at least one drive wheel connected to said servo-motor, one of said at least one drive wheel directly contacting each electrode in said first moveable set of electrodes comprising gold wires such that each gold wire can be moved into said at least one flowing liquid;

partially immersing said first moveable set of electrodes comprising gold wires within said at least one flowing liquid and advancing each gold wire in said first moveable set of electrodes comprising gold wires into said at least one liquid such that each of said at least one set of electrodes comprising gold wires advances toward and into each corresponding said female receiving portion;

applying a first voltage across the gold wires in said first moveable set of electrodes and maintaining said first voltage while said at least one liquid is flowing by to cause at least one electrochemical reaction to occur;

holding at least one second moveable set of electrodes comprising gold wires in at least one second electrode control device, each said at least one second electrode control device comprising a second servo-motor and at least one second drive wheel connected to each of said servo-motor, each said at least one second drive wheel directly contacting each of said electrodes in said second moveable set of electrodes comprising gold wires such that each of said gold wires can be moved into said at least one flowing liquid;

partially immersing said at least one second moveable set of electrodes comprising gold wires within said at least one flowing liquid, said at least one second moveable set of electrodes being located downstream in said flow direction of said at least one flowing liquid from said first moveable set of electrodes comprising gold wires and advancing each of said second moveable set of electrodes comprising gold wires toward and into said at least one liquid such that each of said gold wires in said at least one second moveable set of electrodes comprising gold wires advances into each corresponding said female receiving portion; and applying at least one second voltage across the gold wires in each of said at least one second moveable set of electrodes while said at least one liquid is flowing by to cause at least one second chemical reaction to occur to produce at least some gold nanoparticles within said at least one flowing liquid.

18. The process of claim 17, wherein said first voltage and each of said at least one second voltage are within a range of about 200 volts to about 4500 volts.

19. The process of claim 17, wherein said processing enhancer comprises at least one material selected from the group consisting of $NaHCO_3$, $Na_2CO_3$, $K_2CO_3$ and $KHCO_3$.

20. A substantially continuous process for forming gold nanoparticles in water comprising:

providing in water at least one processing enhancer comprising at least one material selected from the group consisting of $NaHCO_3$, $Na_2CO_3$,$K_2CO_3$ and $KHCO_3$;

flowing said water through at least one trough member, said at least one trough member comprising at least one set of electrode female receiving portions, said flowing water having an upper surface;

providing at least one plasma-forming electrode comprising gold spaced apart from said upper surface of said flowing water;

forming at least one plasma between said at least one plasma-forming electrode and said upper surface of said flowing water;

holding at least one moveable set of electrodes comprising gold wires in a first electrode control device, said first electrode control device comprising a servo-motor and at least one drive wheel connected to said servo-motor, one of said at least one drive wheel directly contacting each electrode in said at least one moveable set of electrodes comprising gold wires such that each gold wire can be moved into said at least one flowing water;

partially immersing said at least one moveable set of electrodes comprising gold wires within said at least one flowing water and advancing each gold wire in said at least one moveable set of electrodes comprising gold wires into said at least one flowing water such that each of said at least one set of electrodes comprising gold wires advances toward and into each corresponding said female receiving portion;

applying a first voltage across the gold wires in said at least one moveable set of electrodes and maintaining said first voltage while said flowing water is flowing by; and causing said at least one moveable set of electrodes comprising gold to react with at least a portion of said flowing water to form at least some gold nanoparticles in said flowing water.

* * * * *